(12) United States Patent
Murakami

(10) Patent No.: US 12,355,515 B2
(45) Date of Patent: *Jul. 8, 2025

(54) COMMUNICATION SYSTEM, TERMINAL, AND CONTROL METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,262

(22) Filed: May 1, 2024

(65) Prior Publication Data

US 2024/0283492 A1 Aug. 22, 2024

Related U.S. Application Data

(63) Continuation of application No. 17/161,163, filed on Jan. 28, 2021, now Pat. No. 12,009,885, which is a
(Continued)

(30) Foreign Application Priority Data

Jan. 11, 2019 (JP) ................................ 2019-003829

(51) Int. Cl.
*H04B 7/0413* (2017.01)
*H04B 7/06* (2006.01)
(Continued)

(52) U.S. Cl.
CPC ............ *H04B 7/0413* (2013.01); *H04B 7/06* (2013.01); *H04B 7/08* (2013.01); *H04L 5/0007* (2013.01); *H04W 84/12* (2013.01)

(58) Field of Classification Search
CPC .......... H04B 7/0413; H04B 7/06; H04B 7/08; H04B 7/0617; H04L 5/0007; H04L 5/001;
(Continued)

(56) References Cited

U.S. PATENT DOCUMENTS

2011/0053495 A1 3/2011 Hara et al.
2011/0199988 A1 8/2011 Yang et al.
(Continued)

FOREIGN PATENT DOCUMENTS

CN 101552632 10/2009
JP 2015-128313 7/2015
(Continued)

OTHER PUBLICATIONS

International Search Report (ISR) issued on Dec. 17, 2019 in International (PCT) Application No. PCT/JP2019/037762.
(Continued)

*Primary Examiner* — Fred A Casca

(74) *Attorney, Agent, or Firm* — Wenderoth, Lind & Ponack, L.L.P.

(57) ABSTRACT

In a communication system that includes an access point, a repeater #1, and a repeater #2 and wirelessly communicates with a terminal, the access point wirelessly communicates with the repeater #1 on at least a first channel included in a first frequency band and wirelessly communicates with the repeater #2 on at least a second channel included in a second frequency band different than the first frequency band, the repeater #1 wirelessly communicates with the terminal on at least a third channel included in the second frequency band,
(Continued)

and the repeater #2 wirelessly communicates with the terminal on at least a fourth channel included in the first frequency band.

3 Claims, 157 Drawing Sheets

Related U.S. Application Data continuation of application No. 17/130,792, filed on Dec. 22, 2020, now Pat. No. 11,463,135, which is a continuation of application No. PCT/JP2019/037762, filed on Sep. 26, 2019.

(60) Provisional application No. 62/805,025, filed on Feb. 13, 2019, provisional application No. 62/776,135, filed on Dec. 6, 2018, provisional application No. 62/745,633, filed on Oct. 15, 2018, provisional application No. 62/738,379, filed on Sep. 28, 2018.

(51) Int. Cl.
*H04B 7/08* (2006.01)
*H04L 5/00* (2006.01)
*H04W 84/12* (2009.01)

(58) Field of Classification Search
CPC ..... H04L 5/0042; H04L 5/0044; H04L 27/26; H04W 84/12; H04W 16/26; H04W 72/04; H04J 1/10; H04J 1/00
See application file for complete search history.

(56) References Cited

U.S. PATENT DOCUMENTS

| | | |
|---|---|---|
| 2011/0250917 A1 | 10/2011 | Zhu et al. |
| 2012/0220239 A1 | 8/2012 | Hosoya et al. |
| 2012/0307715 A1 | 12/2012 | Maeda et al. |
| 2018/0041324 A1 | 2/2018 | Maeda et al. |
| 2018/0270894 A1* | 9/2018 | Park ................... H04W 76/14 |
| 2021/0007080 A1* | 1/2021 | Zhou ................... H04W 24/10 |
| 2021/0022129 A1* | 1/2021 | Yuan ................... H04L 1/1812 |
| 2021/0111766 A1 | 4/2021 | Murakami |
| 2021/0152220 A1 | 5/2021 | Murakami |
| 2022/0124782 A1* | 4/2022 | Park ................... H04W 72/23 |
| 2022/0217687 A1* | 7/2022 | Matsumura ......... H04W 72/044 |
| 2024/0283492 A1 | 8/2024 | Murakami |

FOREIGN PATENT DOCUMENTS

| | | |
|---|---|---|
| WO | 2009/154279 | 12/2009 |
| WO | 2011/055536 | 5/2011 |
| WO | 2020/067242 | 4/2020 |

OTHER PUBLICATIONS

Wook Bong Lee et al., "Virtual BSS For Multi AP Coordination", IEEE 802.11-19/1019r0, Jul. 2019.
Office Action issued Feb. 17, 2022 in U.S. Appl. No. 17/130,792.
Search Report issued Dec. 27, 2023 in corresponding Chinese Patent Application No. 201980041847.5, with English translation.

* cited by examiner

INDOOR GATEWAY AND OUTDOOR GATEWAY CONFIGURATION

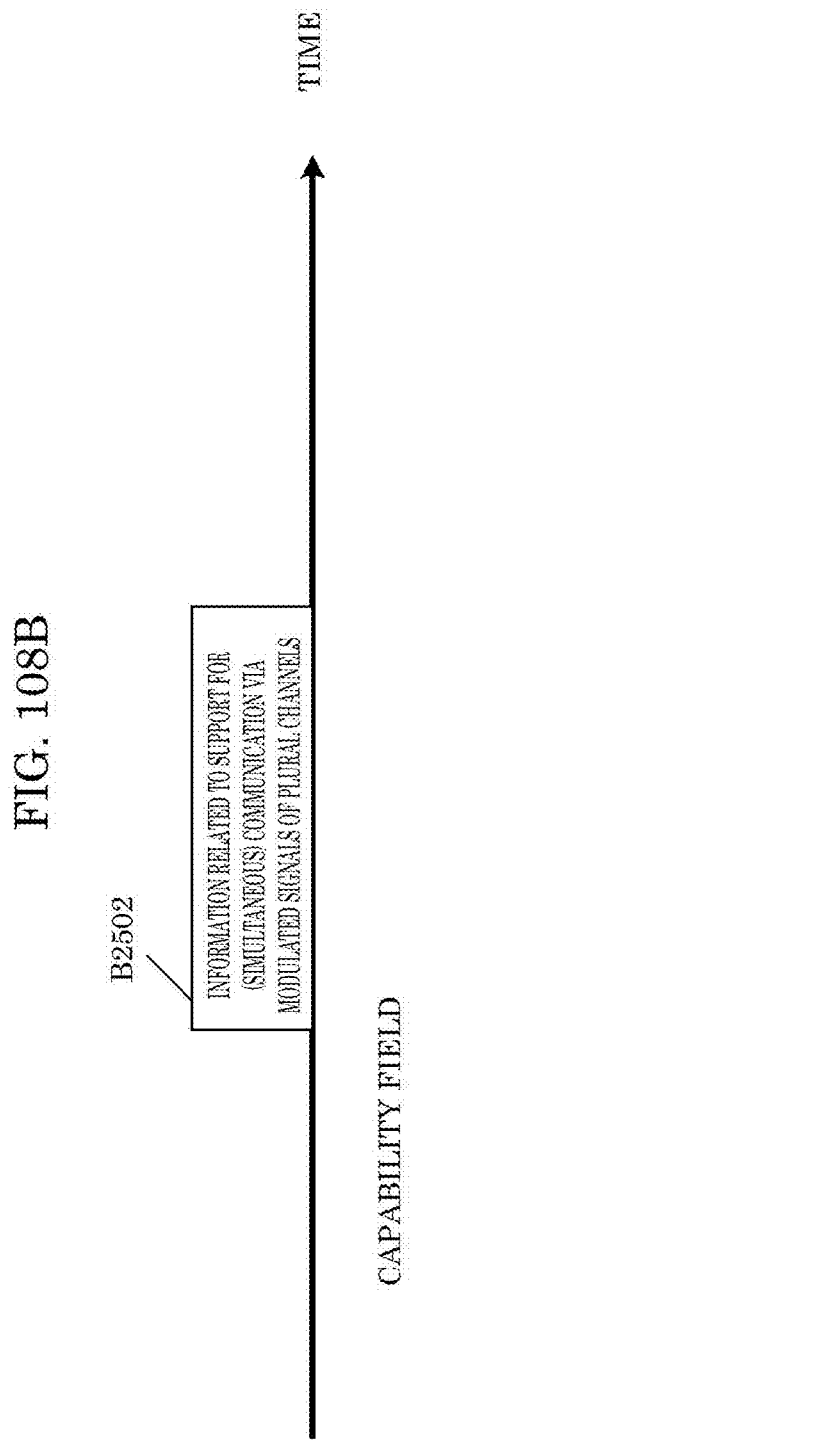

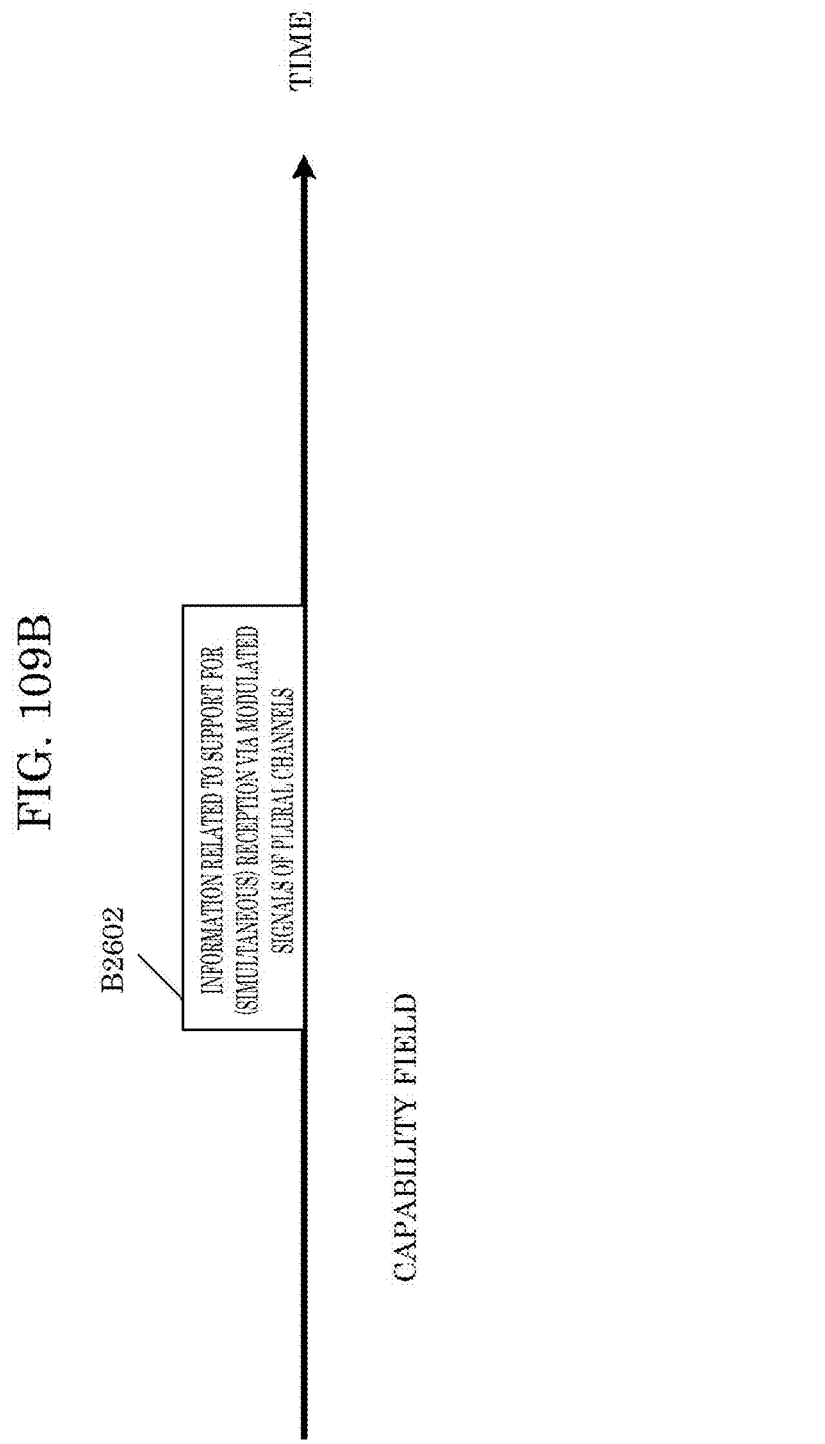

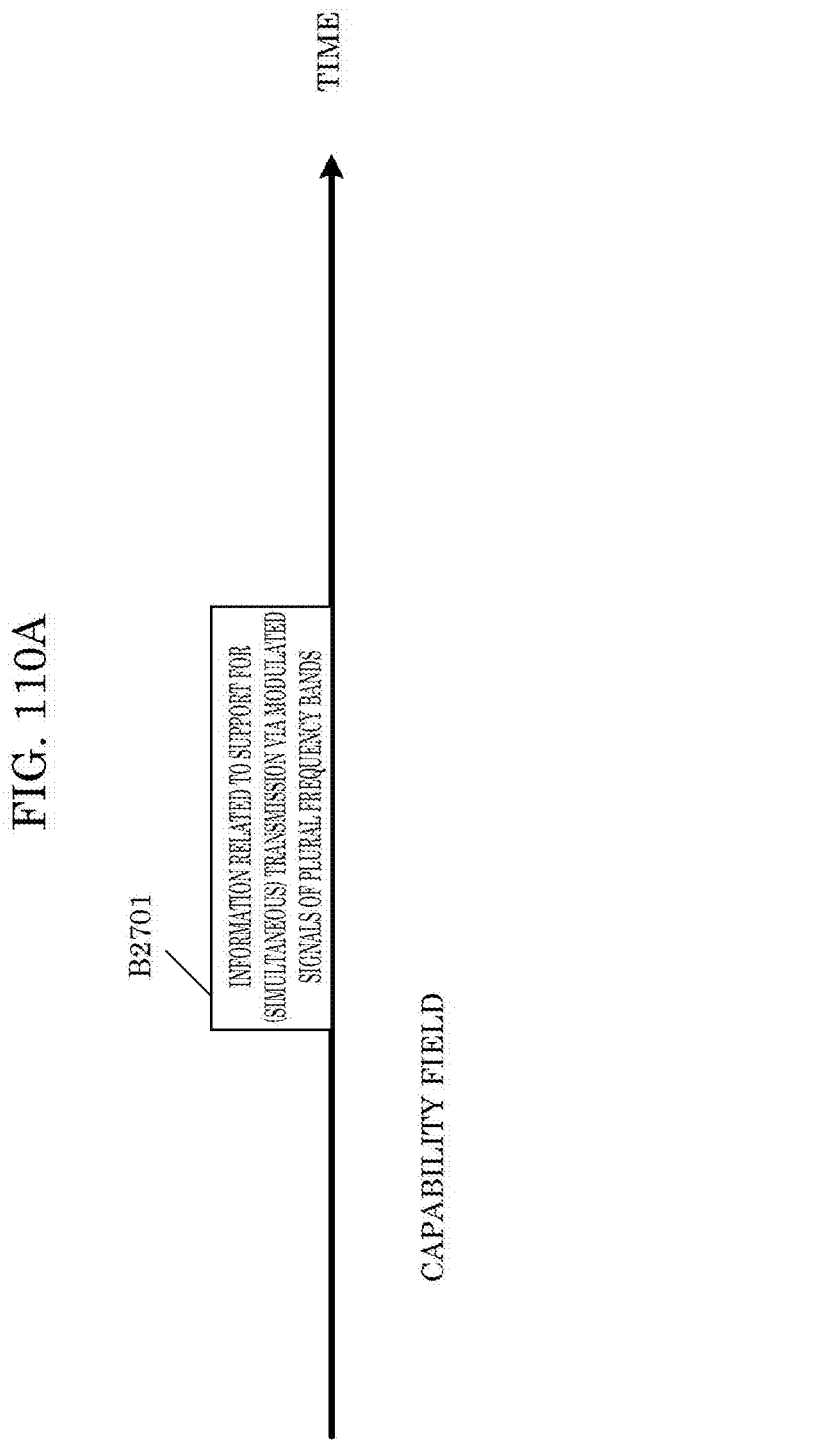

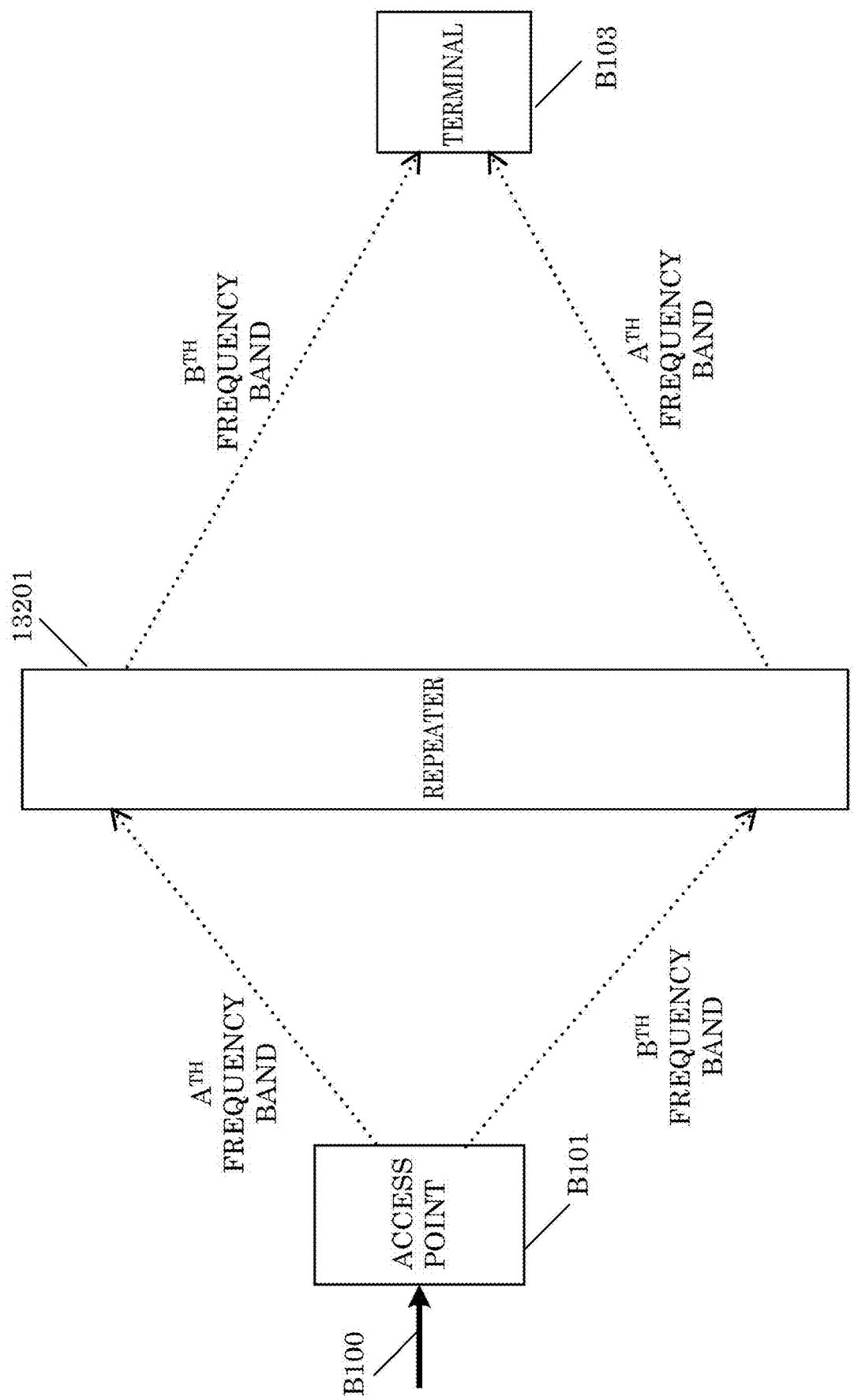

COMMUNICATION SYSTEM, TERMINAL, AND CONTROL METHOD

CROSS REFERENCE TO RELATED APPLICATIONS

This application is a continuation of U.S. application Ser. No. 17/161,163, filed Jan. 28, 2021, which is a continuation of U.S. application Ser. No. 17/130,792, filed Dec. 22, 2020, now U.S. Pat. No. 11,463,135, which is a U.S. continuation application of PCT International Patent Application Number PCT/JP2019/037762 filed on Sep. 26, 2019, claiming the benefit of priority of U.S. Provisional Patent Application No. 62/738,379 filed on Sep. 28, 2018, U.S. Provisional Patent Application No. 62/745,633 filed on Oct. 15, 2018, U.S. Provisional Patent Application No. 62/776,135 filed on Dec. 6, 2018, Japanese Patent Application Number 2019-003829 filed on Jan. 11, 2019, and U.S. Provisional Patent Application No. 62/805,025 filed on Feb. 13, 2019, the entire contents of which are hereby incorporated by reference.

BACKGROUND

1. Technical Field

The present disclosure relates to a communication system, a terminal, and a control method.

2. Description of the Related Art

An example of one conventionally known communication method that uses a plurality of antennas is the communication method known as multiple-input multiple-output (MIMO). In multi-antenna communication, which is typified by MIMO, one or more streams of transmission data is modulated, and the generated one or more modulated signals are transmitted at the same time and frequency (using a common frequency) using a plurality of antennas. Multi-antenna communication facilitates the improvement of data reception quality and/or the improvement of data communication speed (per unit time). For example, WO 2011/055536 discloses a communication system that transmits modulated signals using a plurality of antennas having a quasi-omni pattern which has a substantially constant antenna gain in various directions in a space.

However, in communication systems, not only is the improvement of reception quality and communication speed between specific communication devices desired, but, in a communication system that uses, for example, multicast/broadcast communication or relayed communication, improvement in performance in part or all of the system as well support for new forms of services are also desired.

SUMMARY

Provided is a communication system, communication device, communication method, and control method capable of, in a network including relayed communication, facilitating improvement in performance in part or all of a system as well as facilitate support for new forms of services.

A communication system according to one aspect of the present disclosure is configured to wirelessly communicate with a terminal, and includes: an access point; a first communication device; and a second communication device. The access point is configured to wirelessly communicate with the first communication device on at least a first channel included in a first frequency band and wirelessly communicate with the second communication device on at least a second channel included in a second frequency band different than the first frequency band. The first communication device is configured to wirelessly communicate with the terminal on at least a third channel included in the second frequency band. The second communication device is configured to wirelessly communicate with the terminal on at least a fourth channel included in the first frequency band.

General and specific aspect(s) disclosed above may be implemented using a system, a method, an integrated circuit, a computer program, or a computer-readable recording medium such as a CD-ROM, or any combination thereof.

According to the present disclosure, in a network including relayed communication, it may be possible to facilitate improvement in performance in part or all of a system as well as facilitate support for new forms of services.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 108B illustrates one example of information transmission time;

FIG. 109B illustrates one example of information transmission time;

FIG. 110A illustrates one example of information transmission time;

FIG. 114 illustrates an example of a control method of the communication system;

FIG. 115 illustrates one example of a control method of a terminal;

FIG. 116 illustrates one example of a system configuration;

FIG. 117 illustrates one example of frame transmission time and frequency;

FIG. 118 illustrates one example of frame transmission time and frequency;

FIG. 119 illustrates one example of frame transmission time and frequency;

FIG. 120 illustrates one example of frame transmission time and frequency;

FIG. 121 illustrates one example of a system configuration;

FIG. 122 illustrates one example of a system configuration;

FIG. 123 illustrates one example of a system configuration;

FIG. 124 illustrates one example of frame transmission time;

FIG. 125 illustrates one example of frame transmission time;

Figure 126:
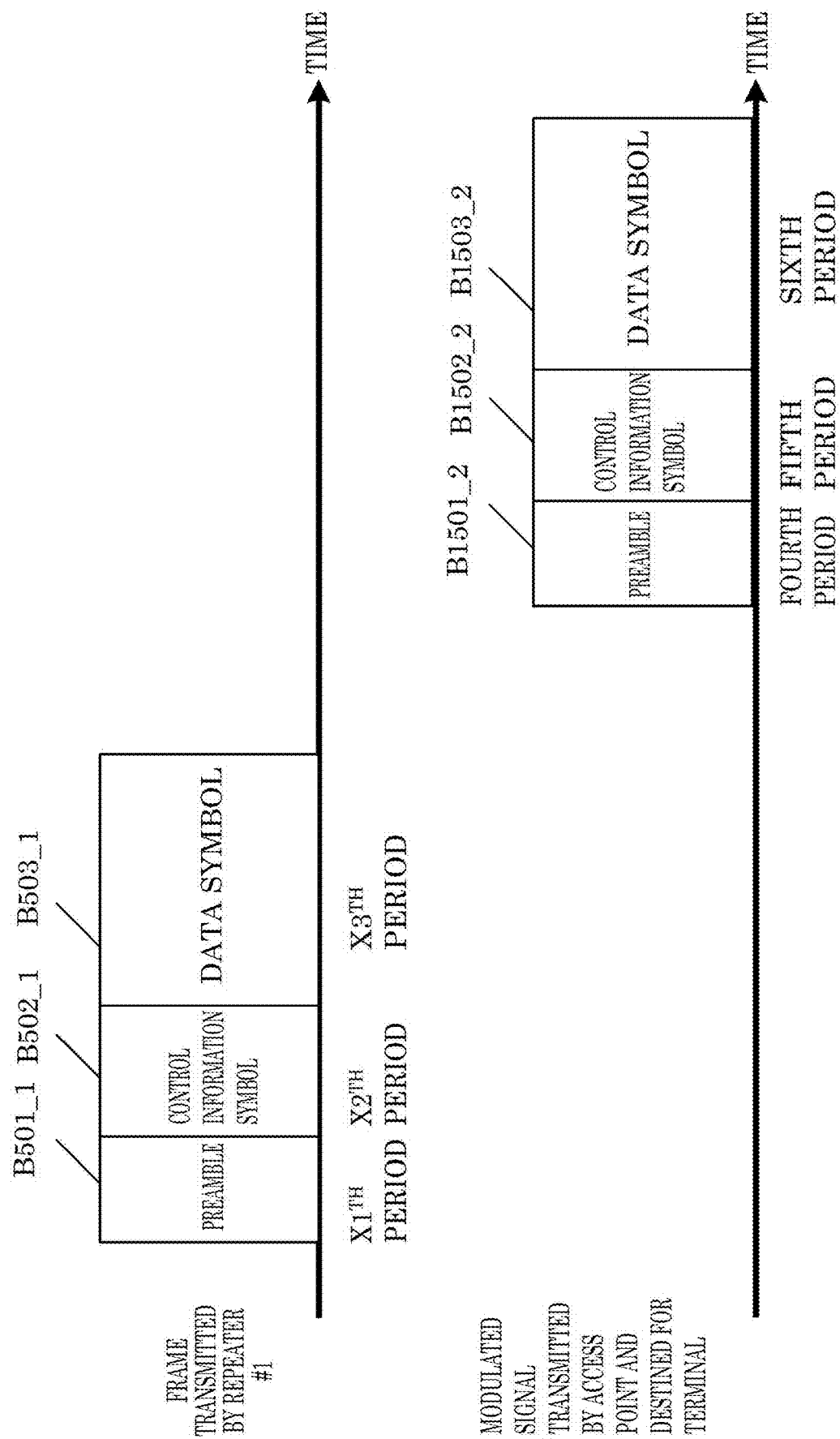
Figure 127:
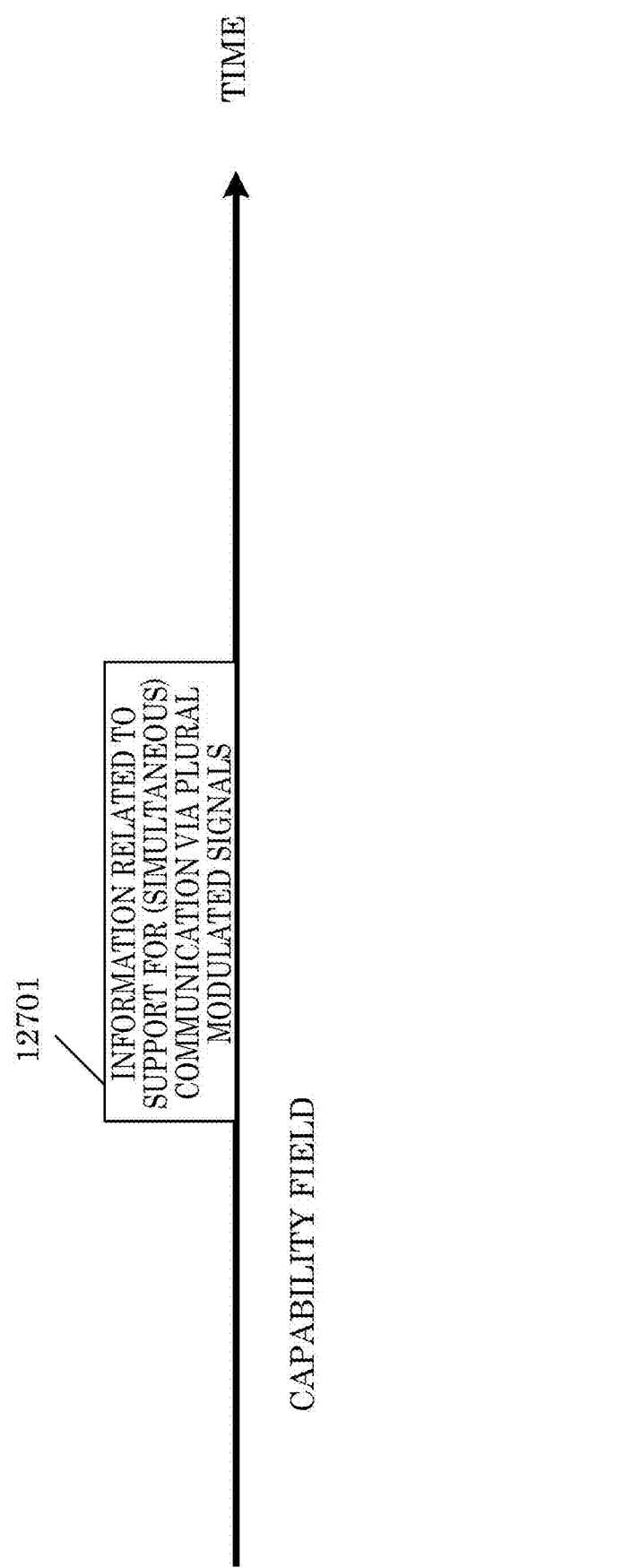
Figure 128:
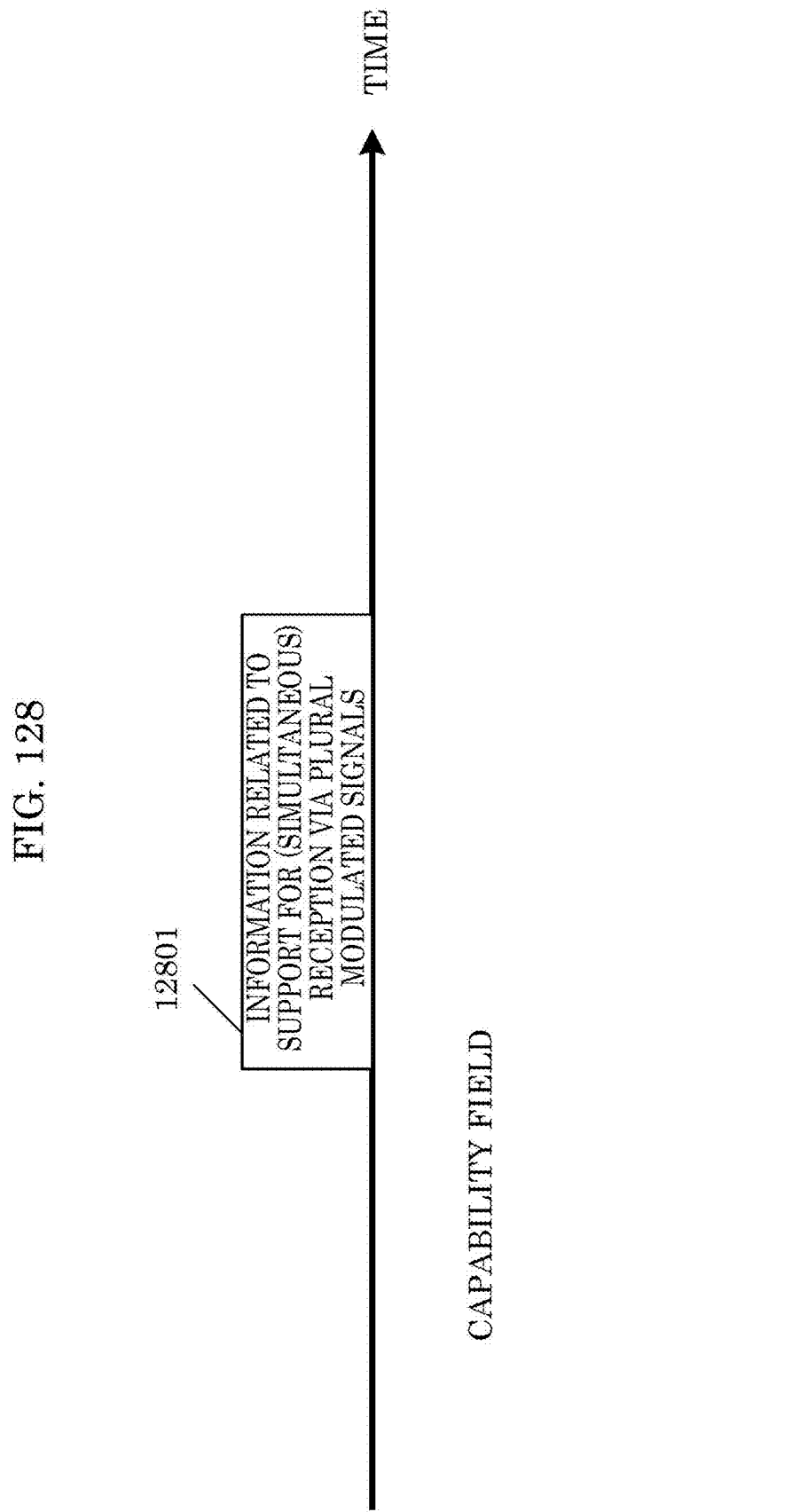
Figure 129:
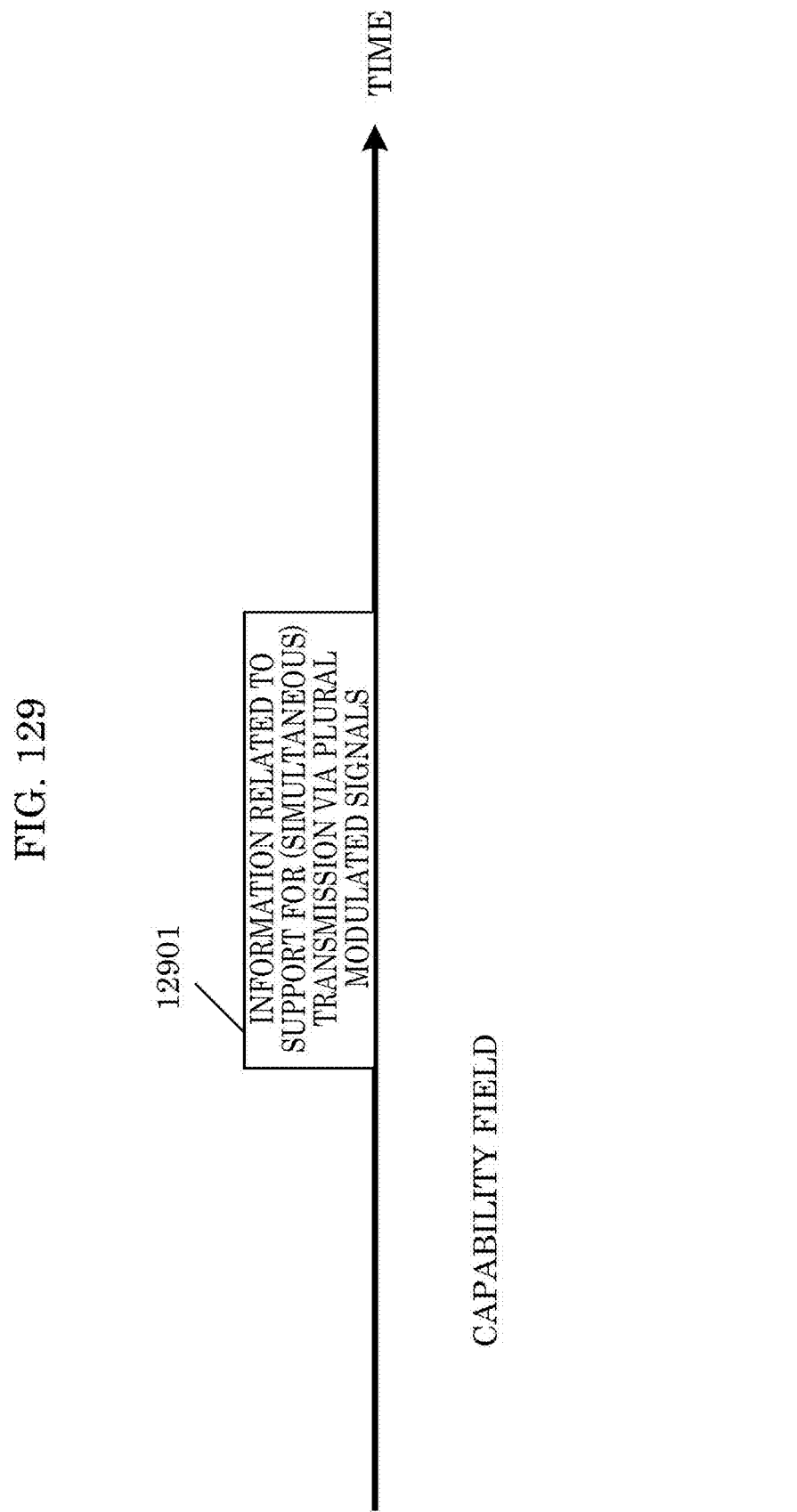
Figure 130:
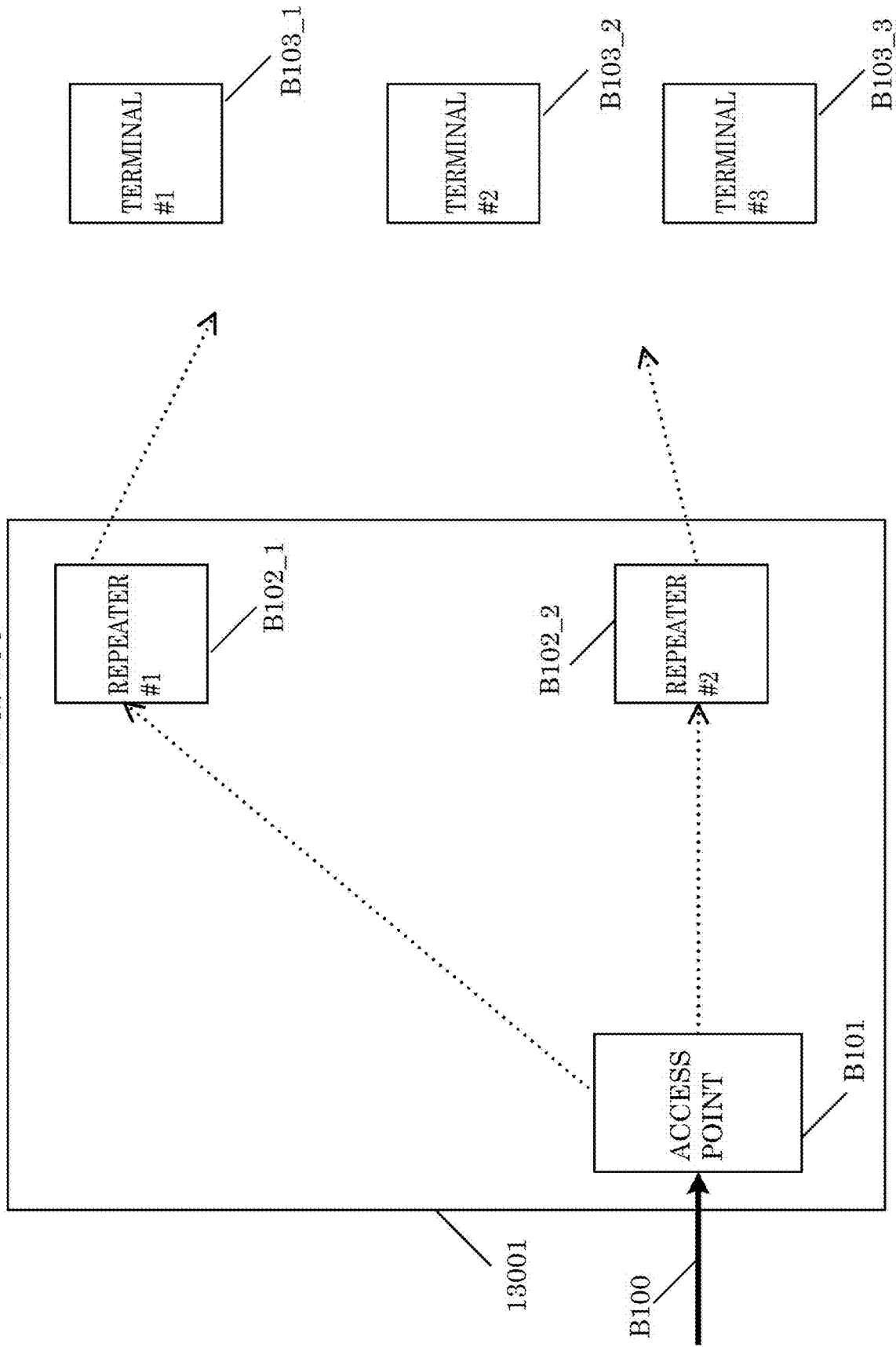
Figure 131:
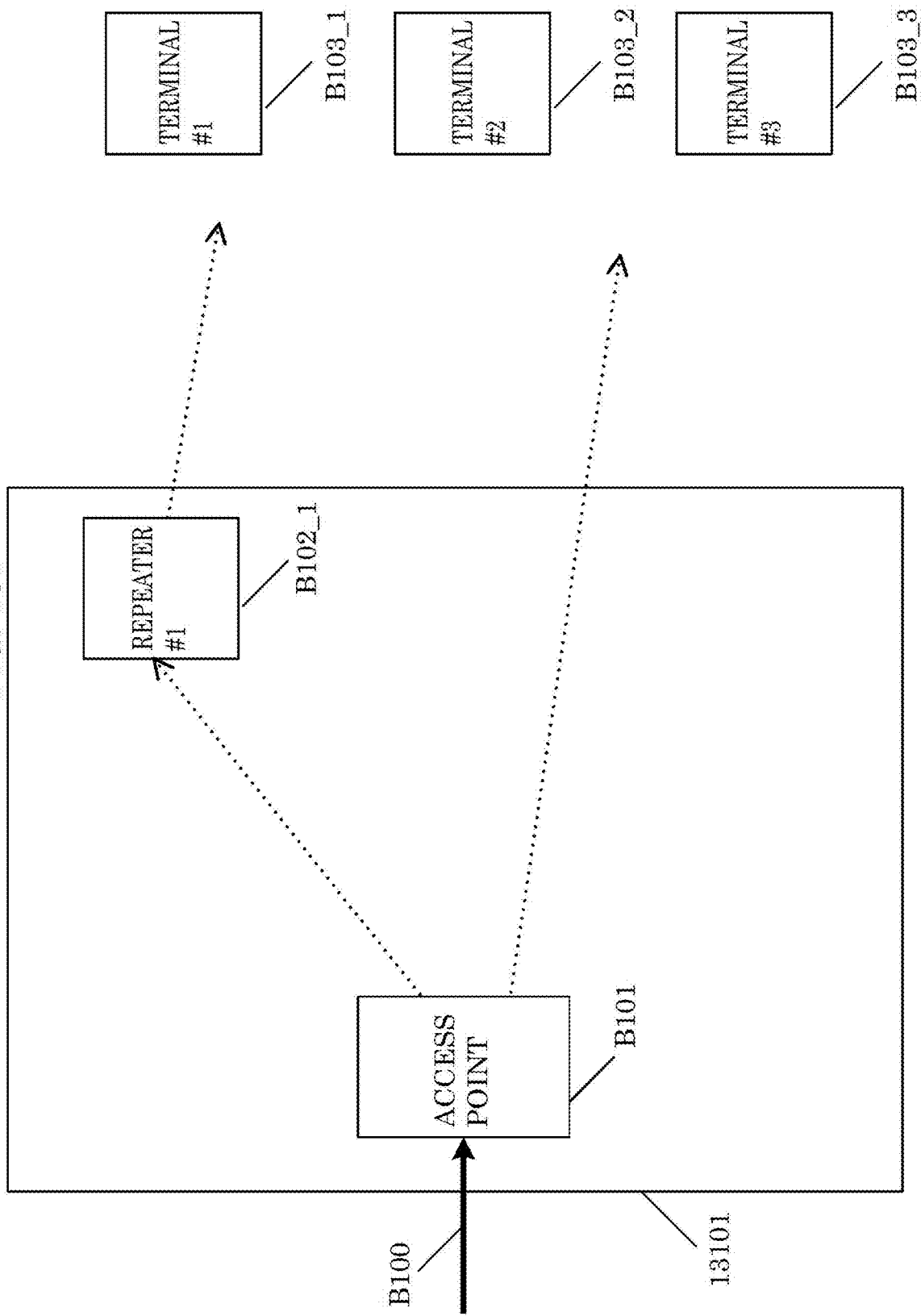
Figure 132B:
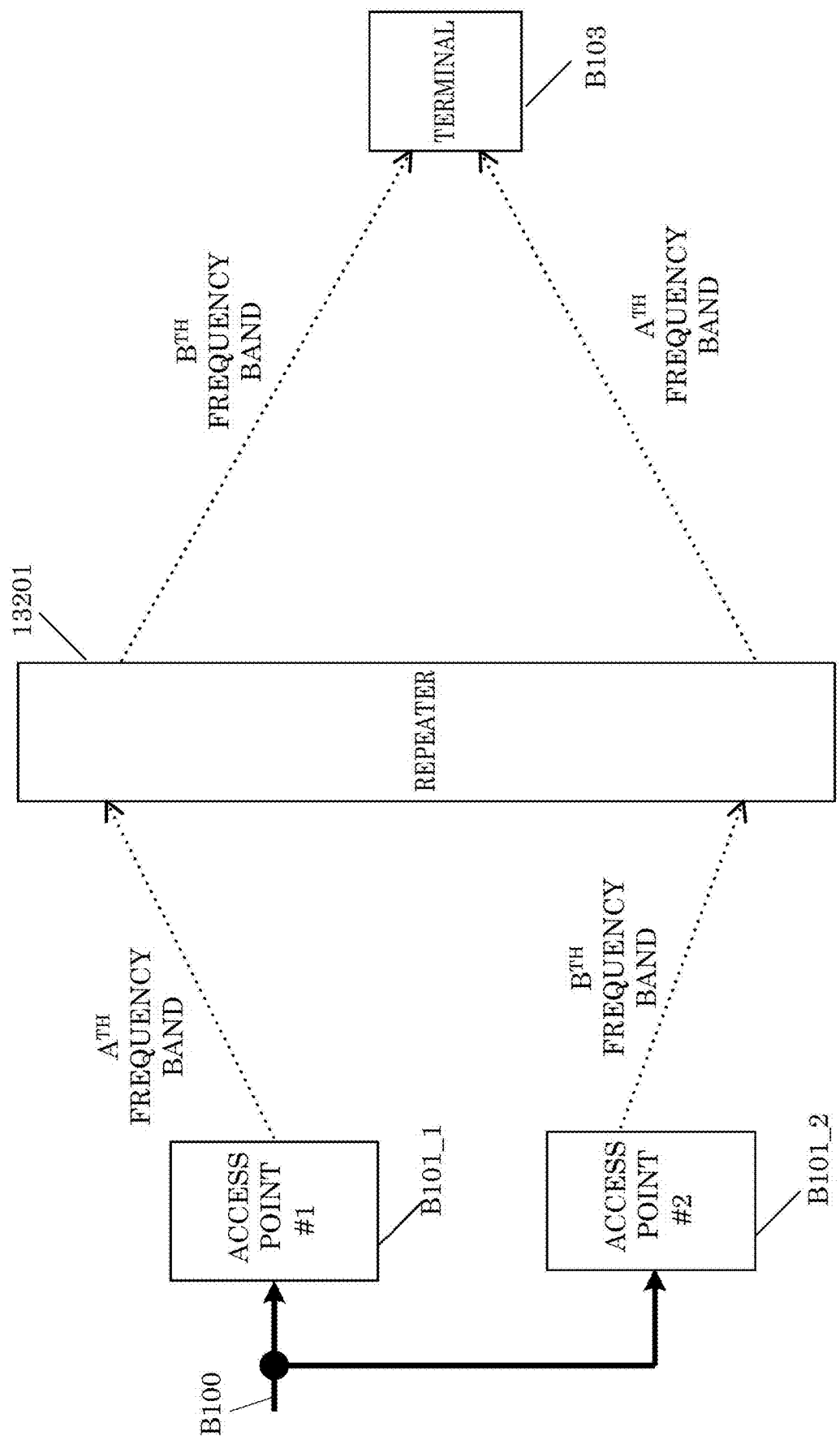
Figure 132C:
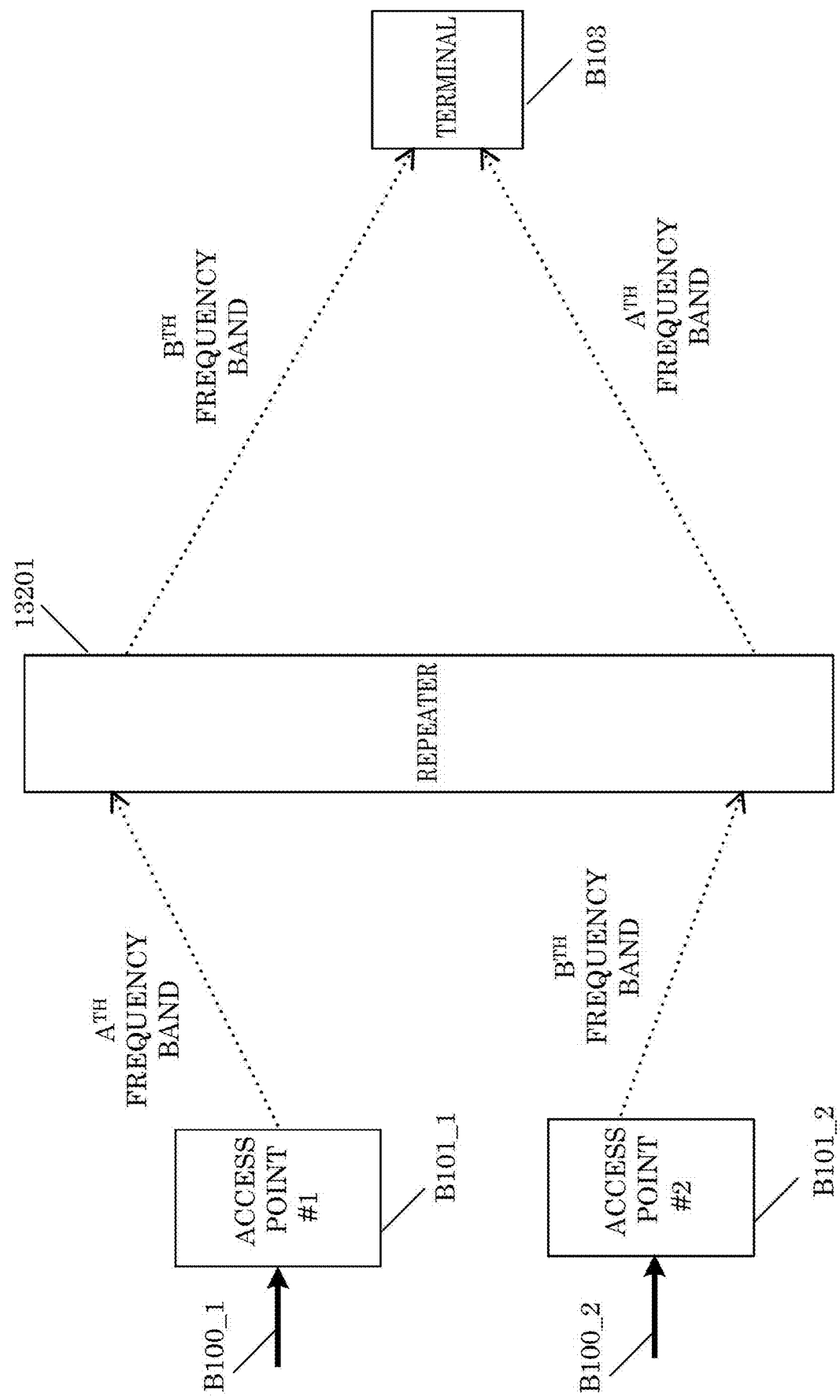
Figure 133:
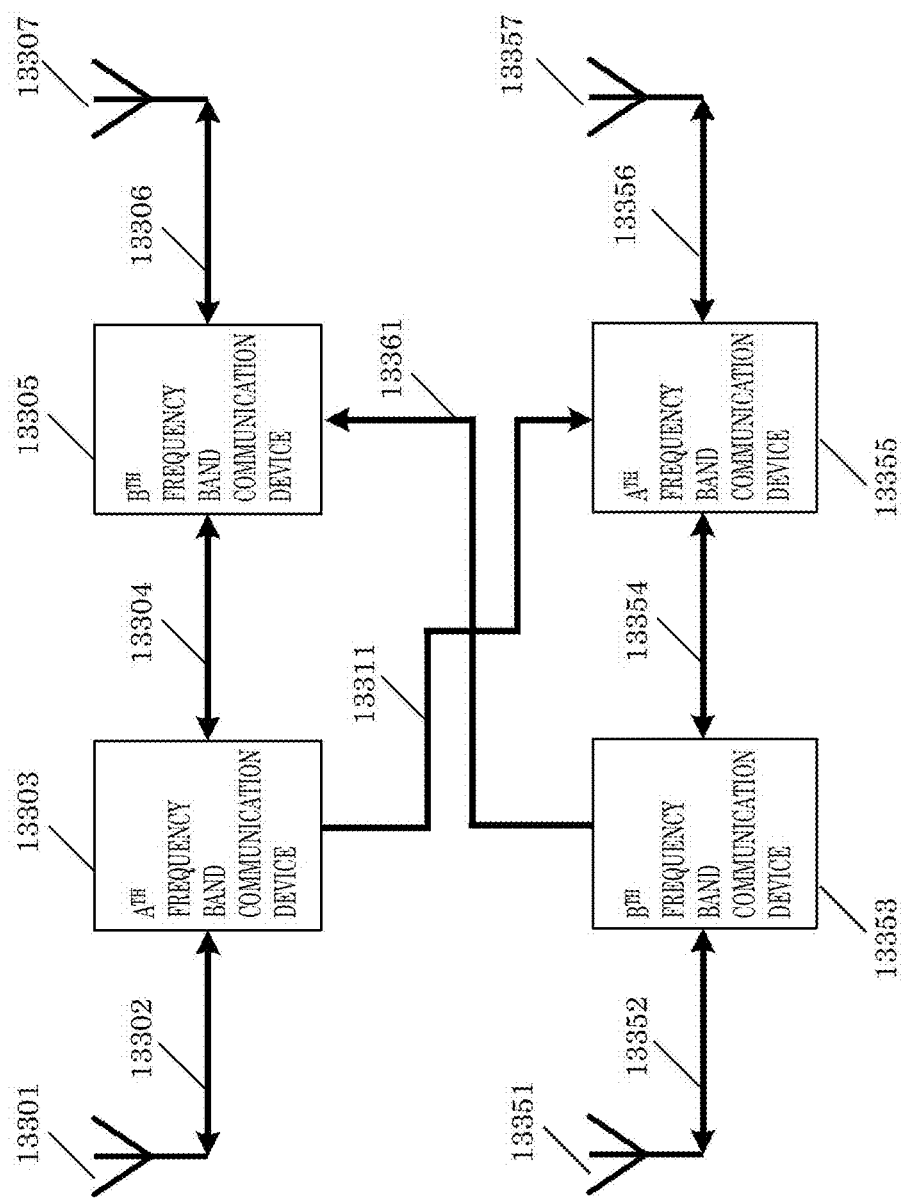
Figure 134:
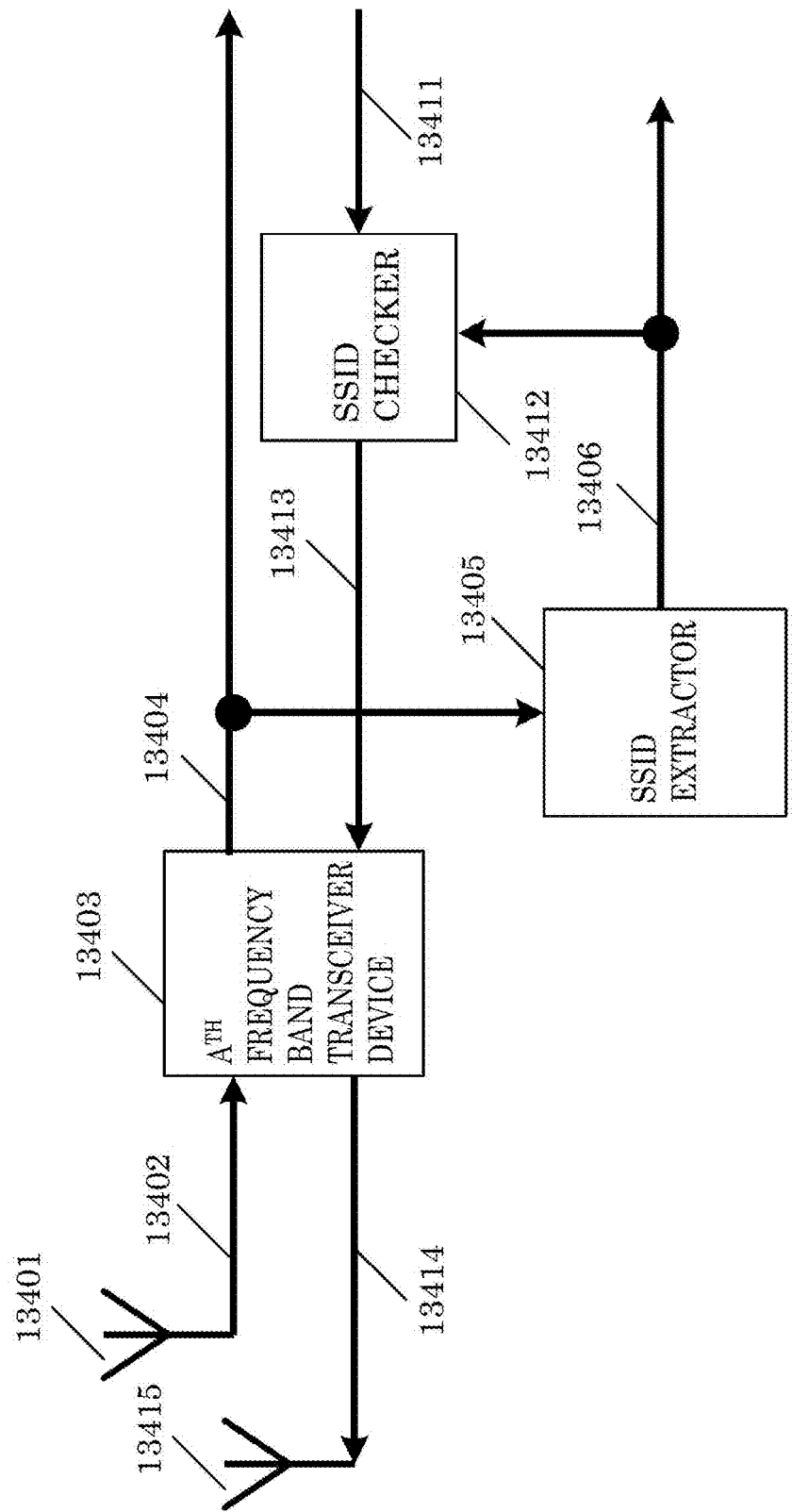
Figure 135:
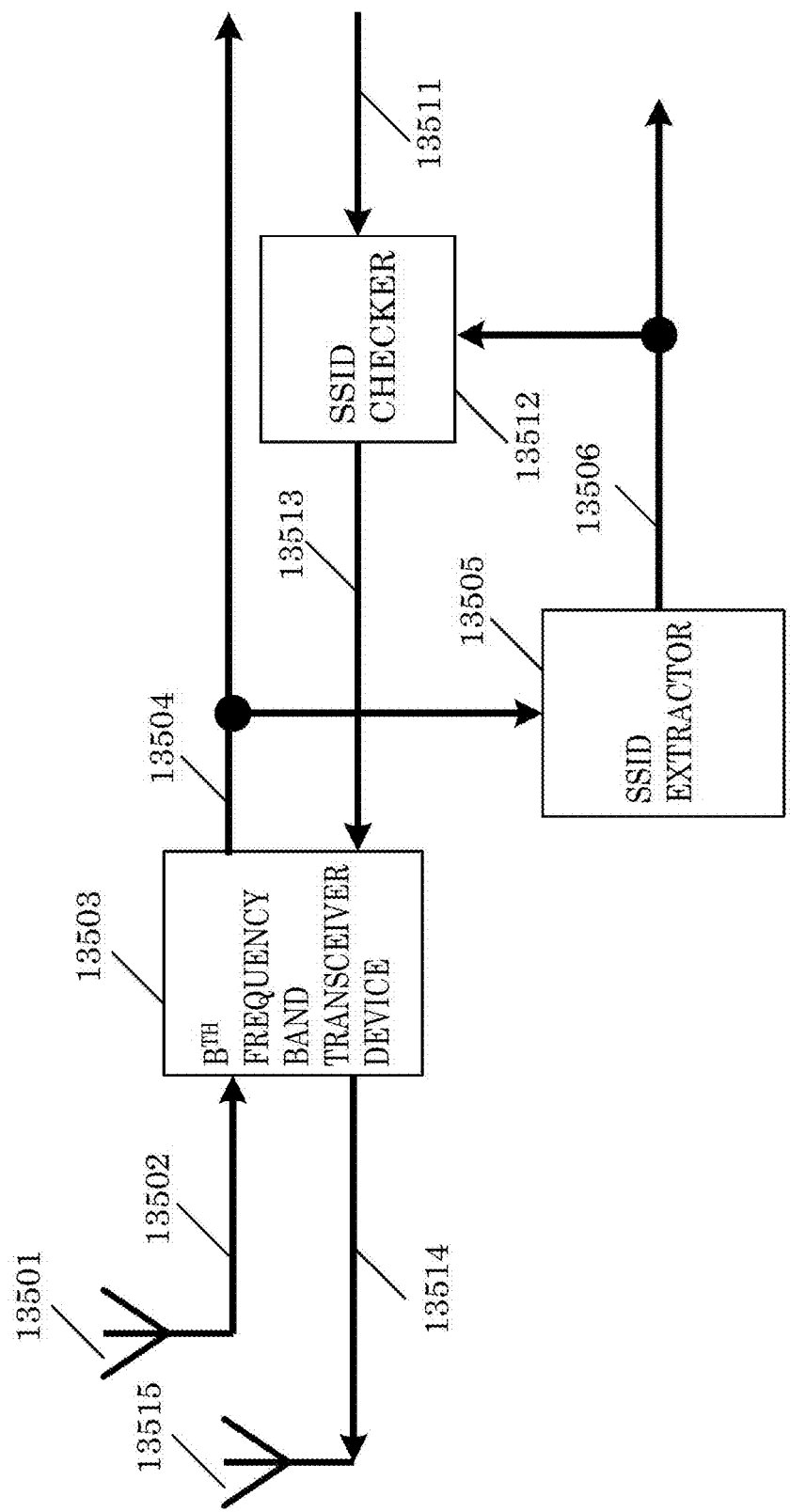
Figure 136:
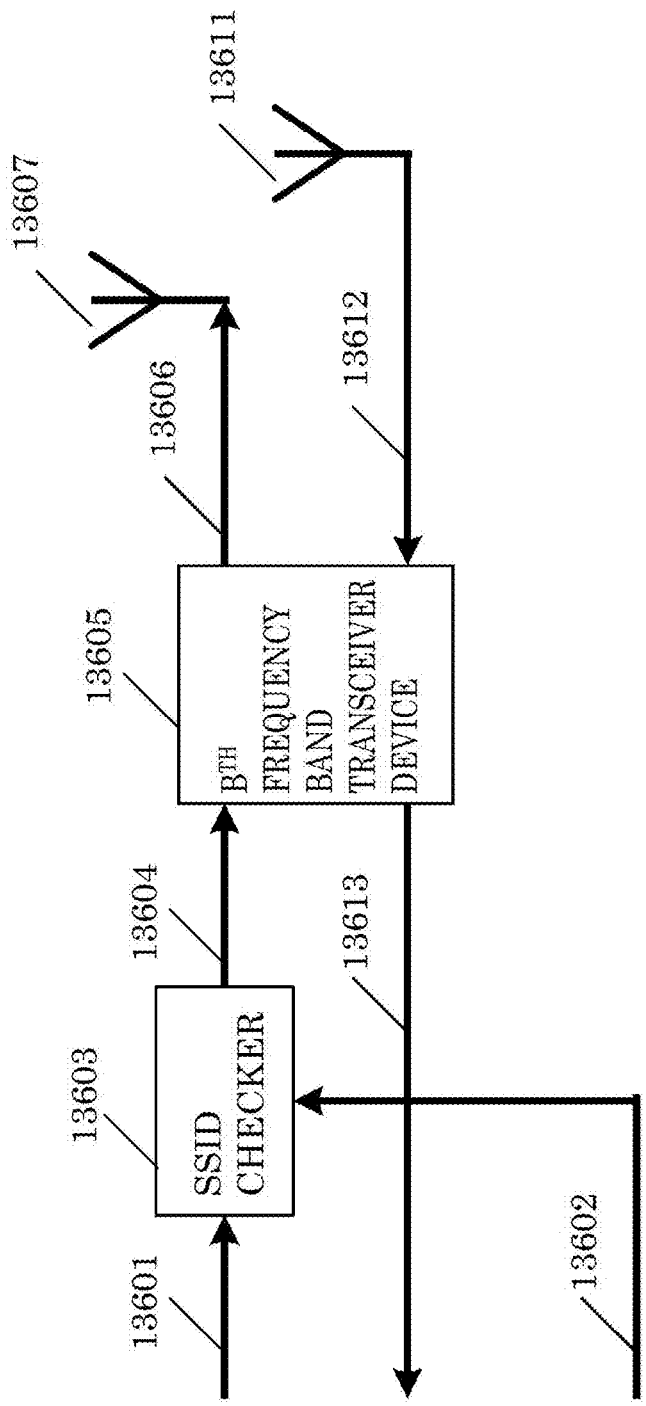
Figure 137:
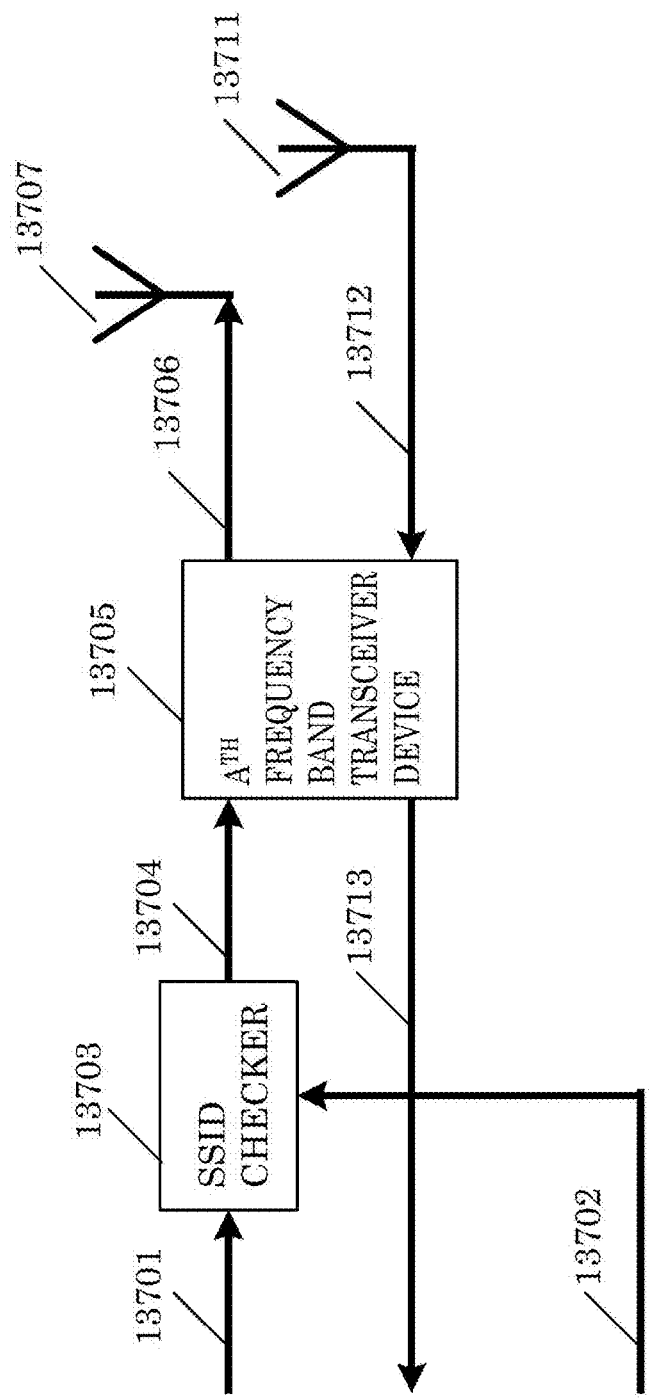
Figure 138:
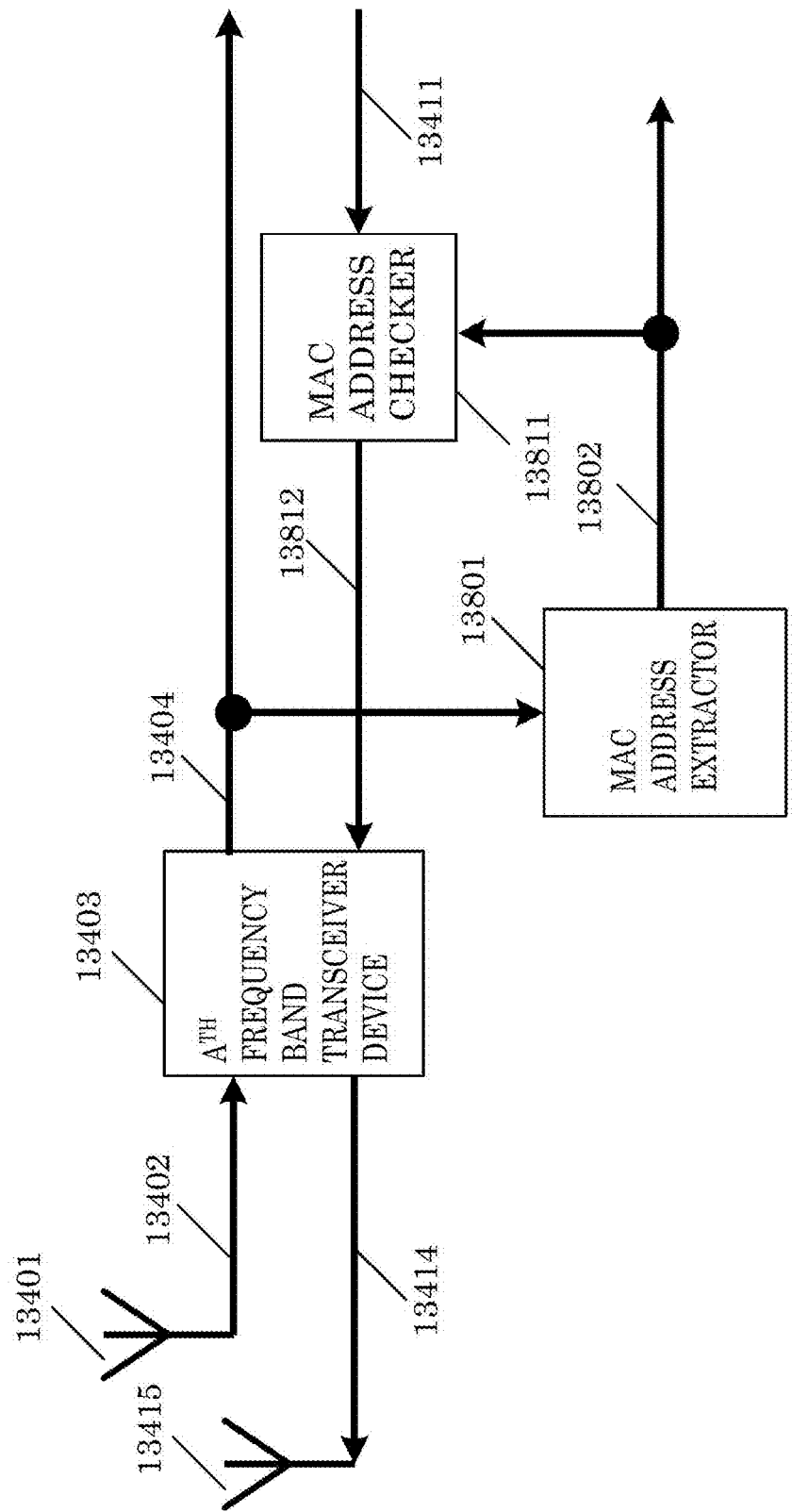
Figure 139:
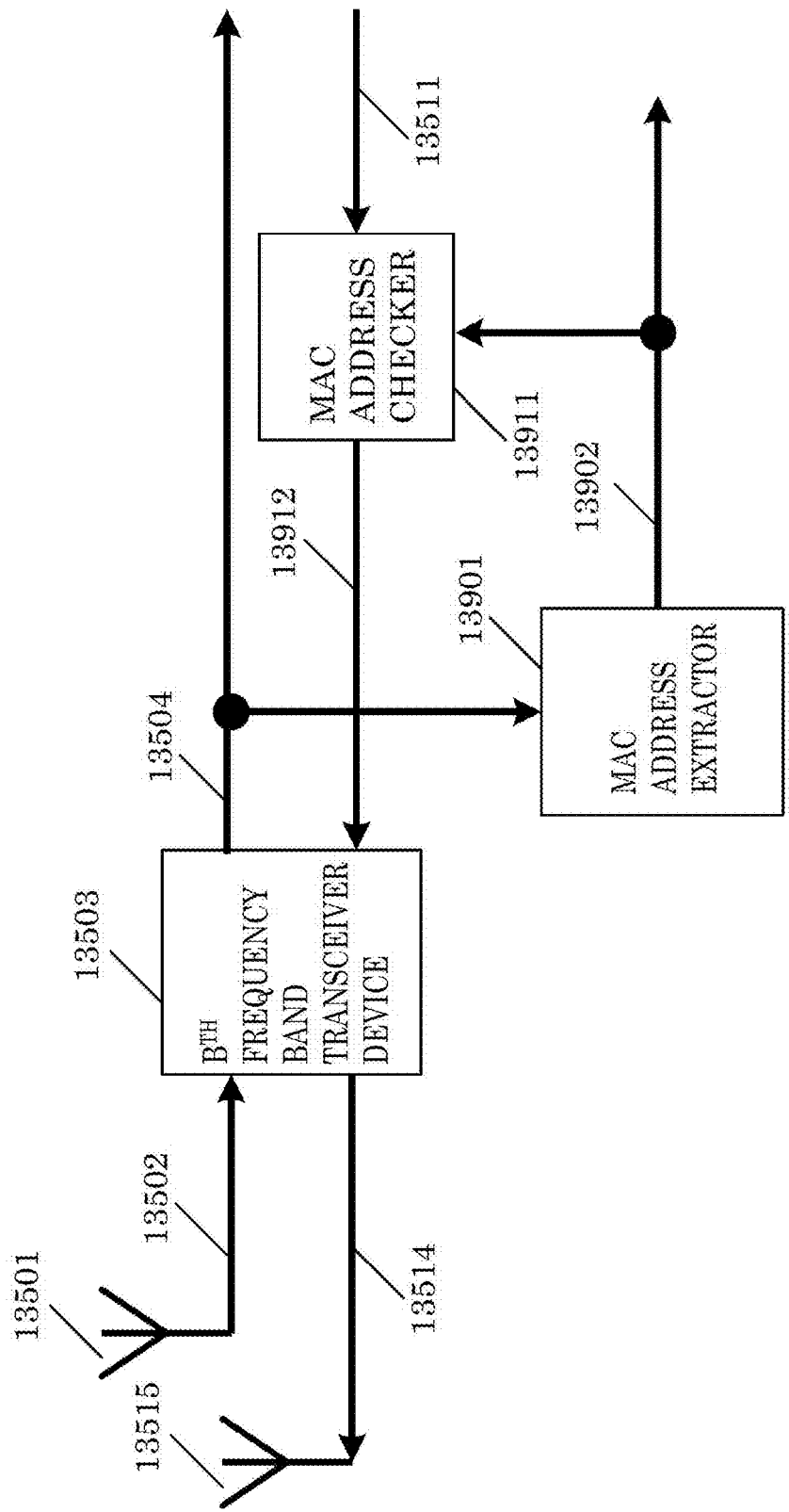
Figure 140:
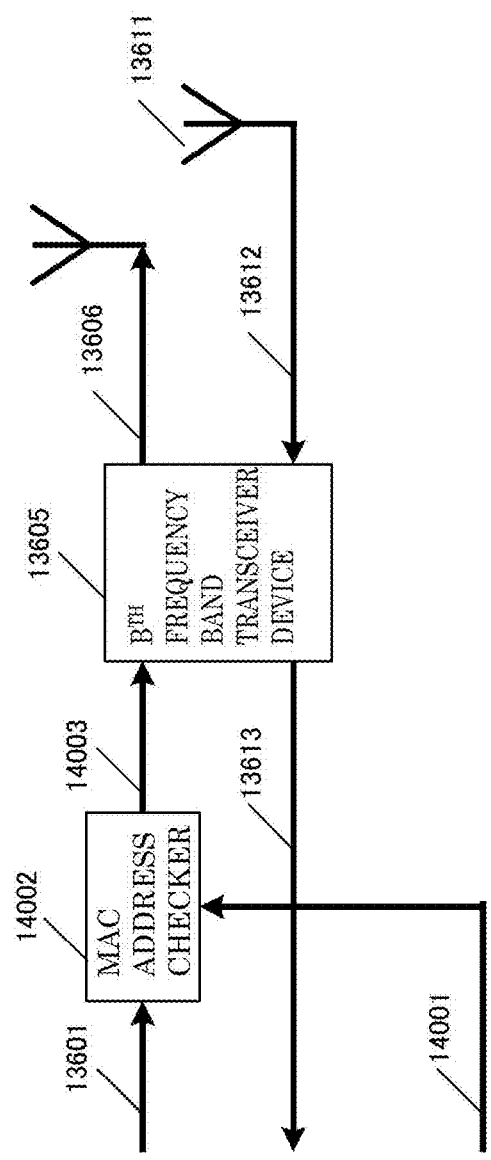
Figure 141:
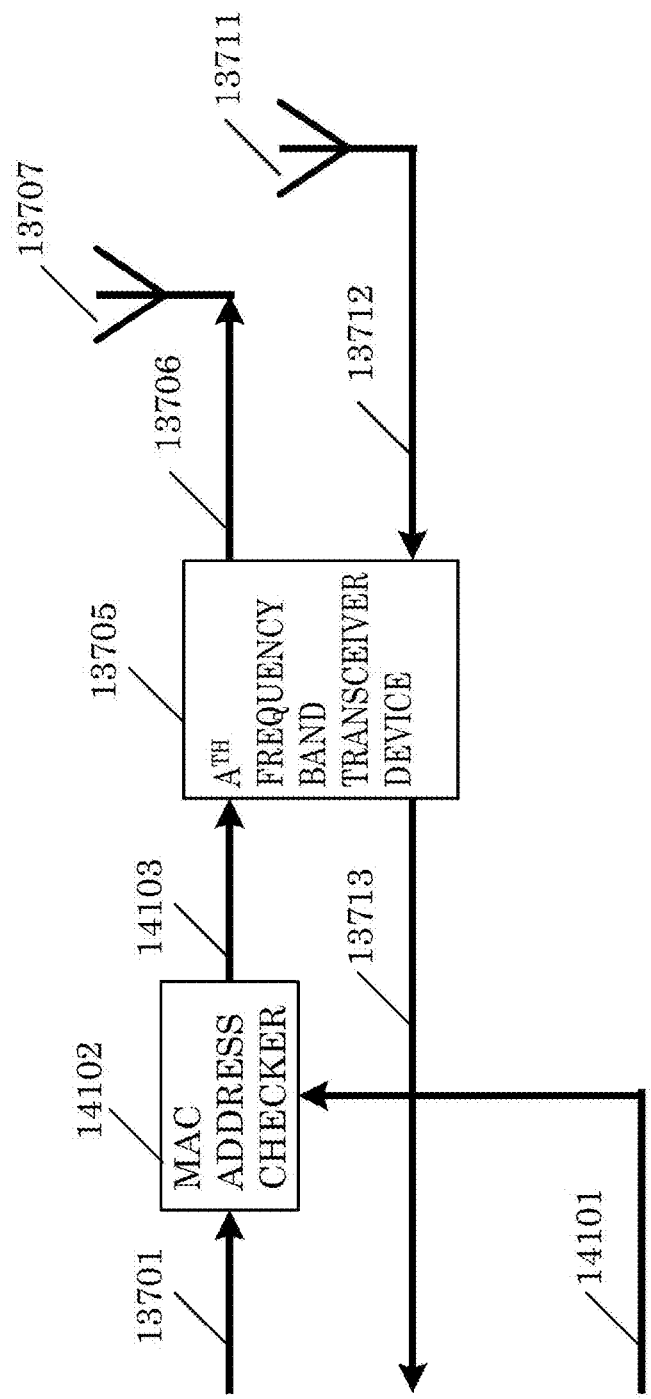
Figure 142:
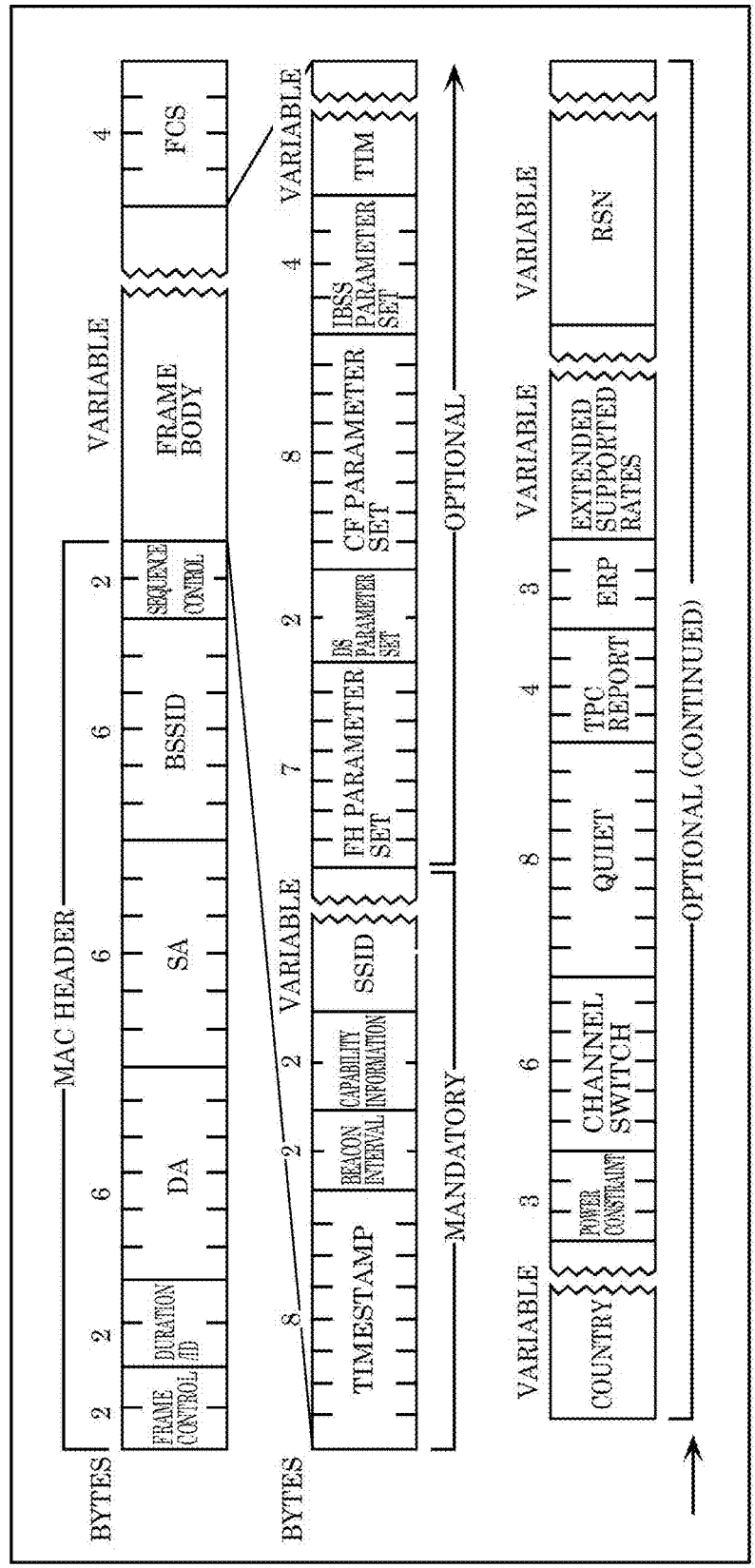
Figure 143:
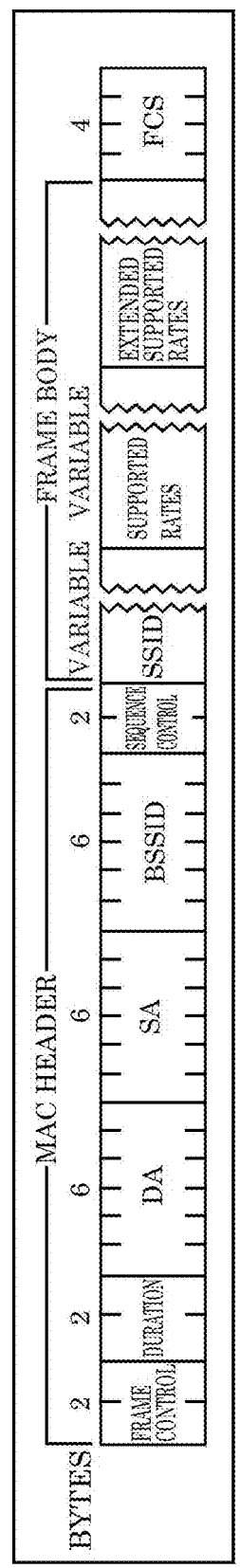
Figure 144:
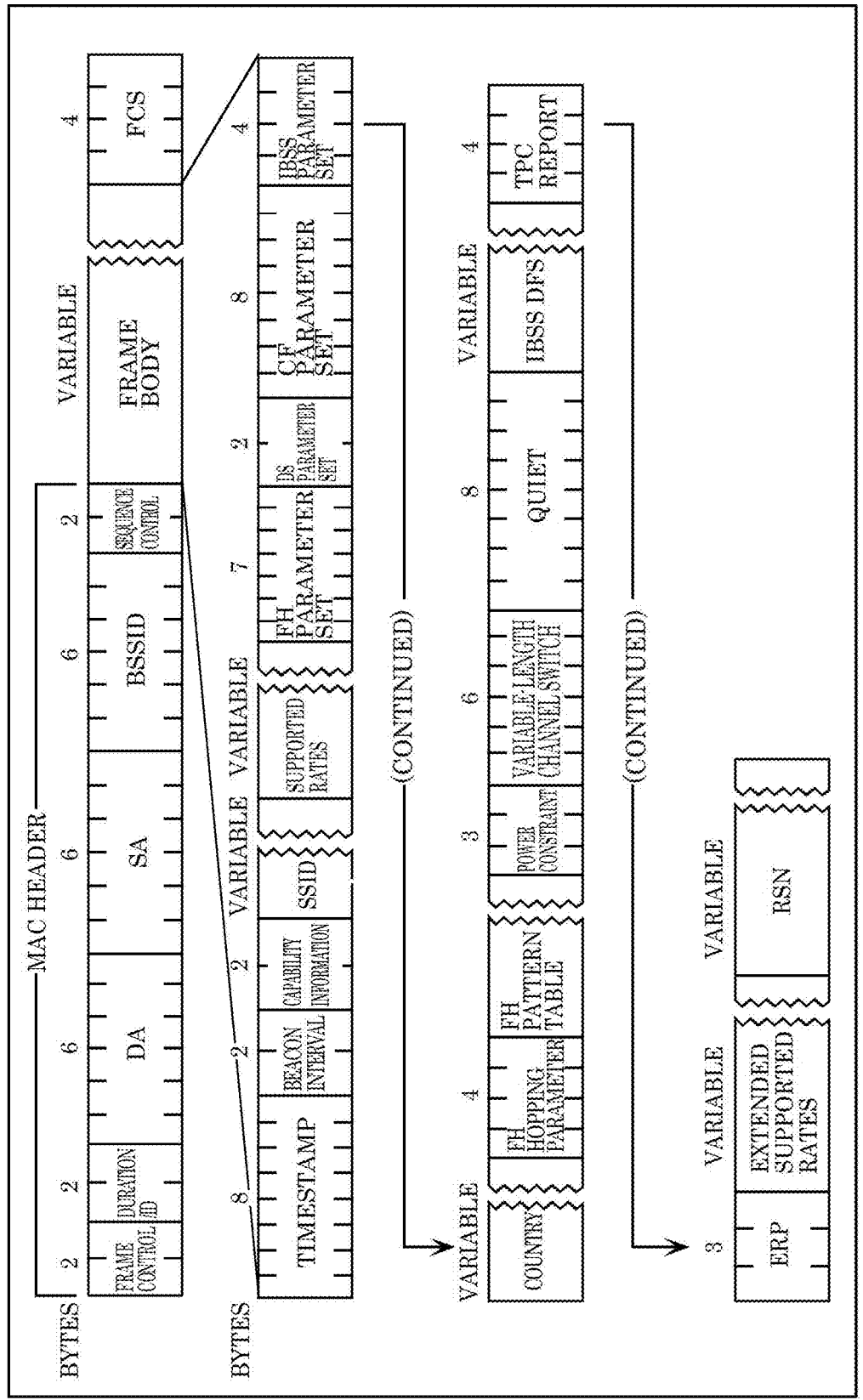
Figure 145:
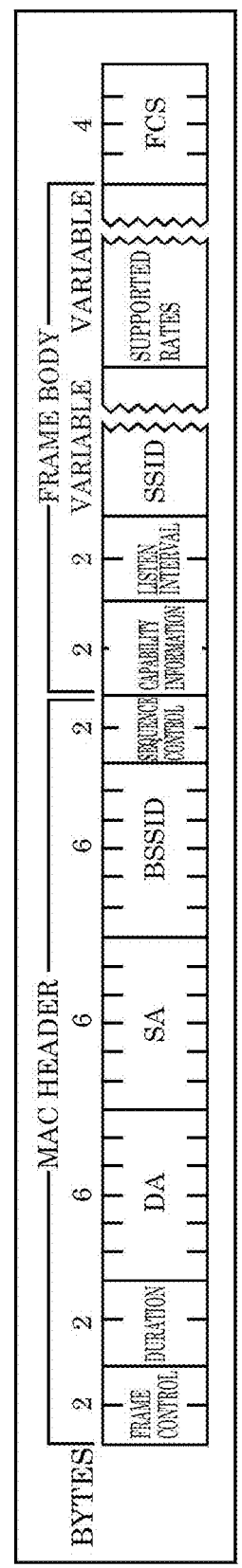
Figure 146:
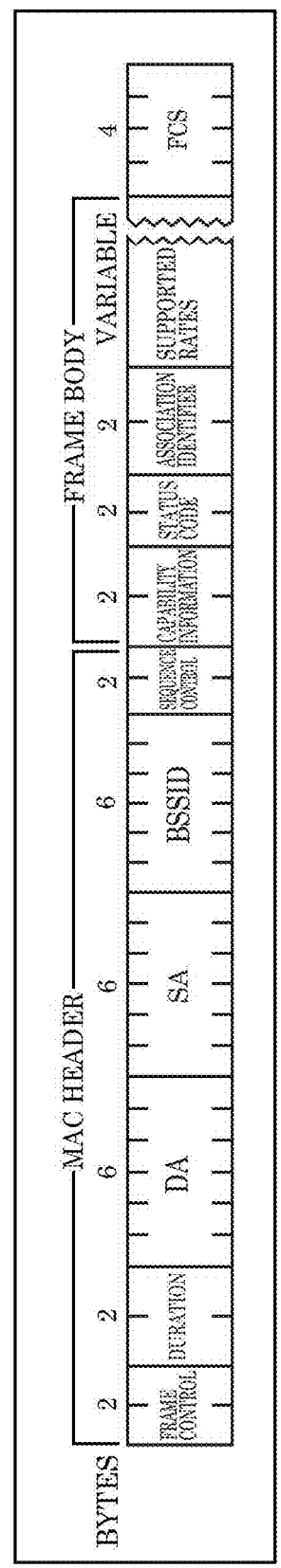
Figure 147:
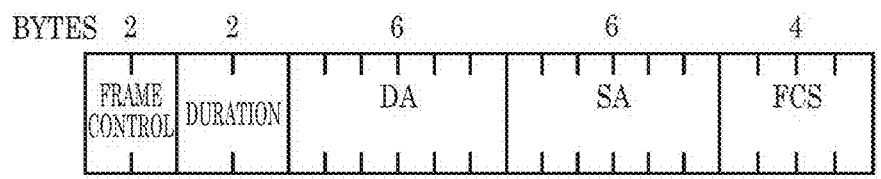
Figure 148:
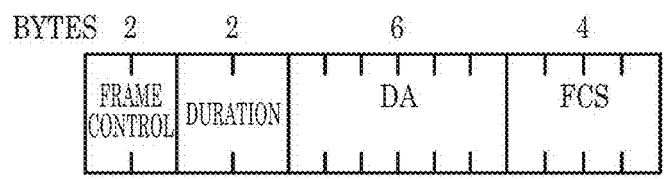
Figure 149:
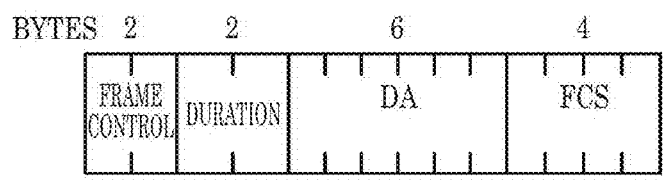
Figure 150:
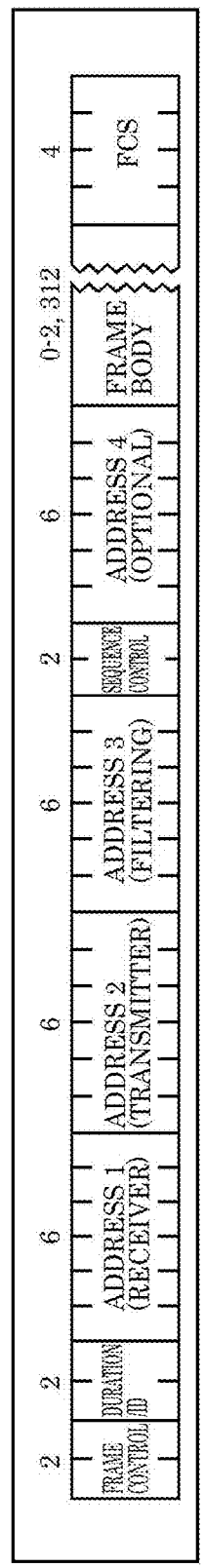
Figure 151A:
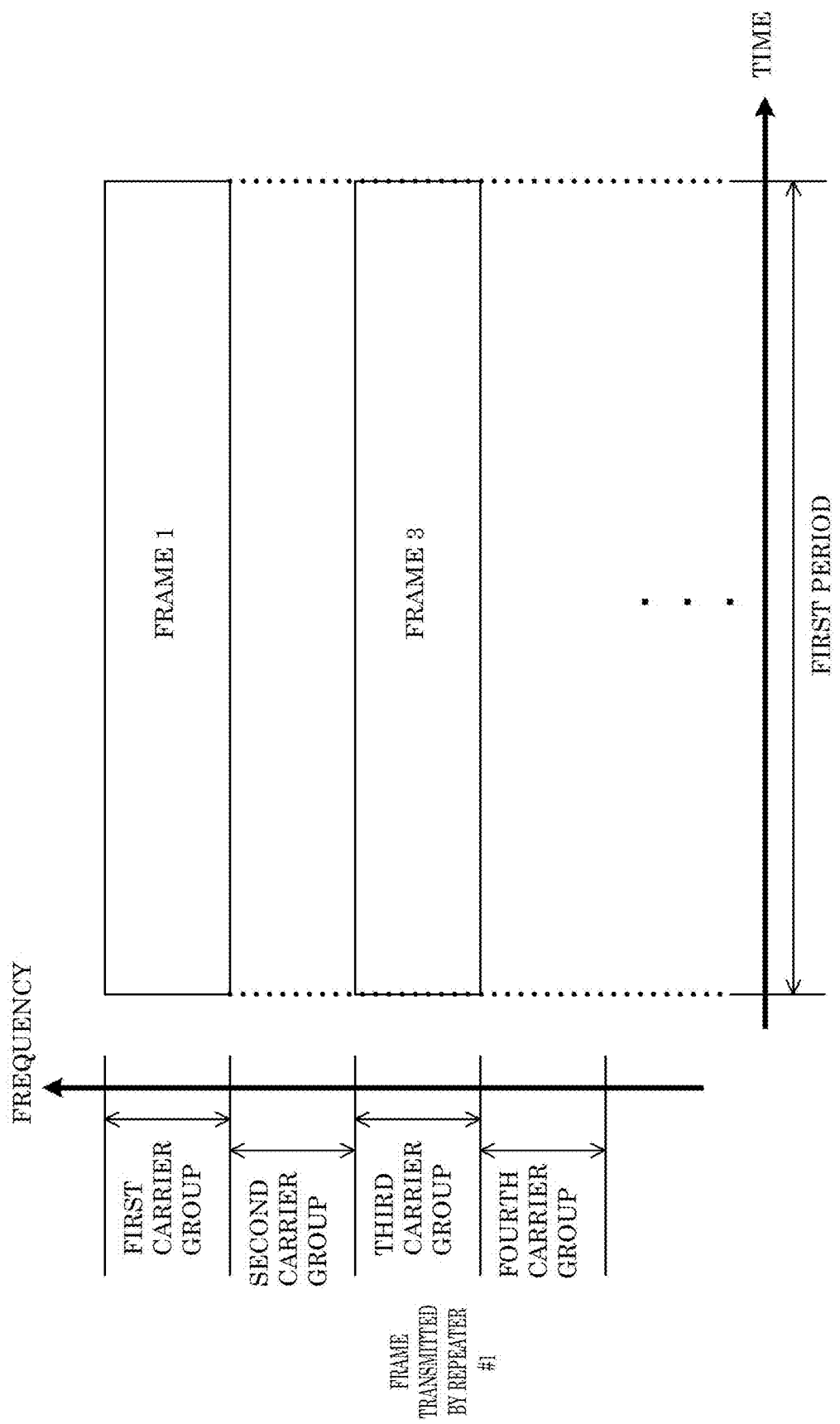

FIG. 126 illustrates one example of frame transmission time;

FIG. 127 illustrates one example of frame transmission time;

FIG. 128 illustrates one example of frame transmission time;

FIG. 129 illustrates one example of frame transmission time;

FIG. 130 illustrates one example of a system configuration;

FIG. 131 illustrates one example of a system configuration;

FIG. 132A illustrates one example of a system configuration;

FIG. 132B illustrates one example of a system configuration;

FIG. 132C illustrates one example of a system configuration;

FIG. 133 illustrates one example of a configuration of a repeater;

FIG. 134 illustrates one example of a configuration of a repeater in detail;

FIG. 135 illustrates one example of a configuration of a repeater in detail;

FIG. 136 illustrates one example of a configuration of a repeater in detail;

FIG. 137 illustrates one example of a configuration of a repeater in detail;

FIG. 138 illustrates one example of a configuration of a repeater in detail;

FIG. 139 illustrates one example of a configuration of a repeater in detail;

FIG. 140 illustrates one example of a configuration of a repeater in detail;

FIG. 141 illustrates one example of a configuration of a repeater in detail;

FIG. 142 illustrates one example of a frame configuration;

FIG. 143 illustrates an example of a probe request frame configuration;

FIG. 144 illustrates an example of a probe response frame configuration;

FIG. 145 illustrates an example of an association request frame configuration;

FIG. 146 illustrates an example of an association response frame configuration;

FIG. 147 illustrates one example of an RTS frame configuration;

FIG. 148 illustrates one example of a CTS frame configuration;

FIG. 149 illustrates one example of an ACK frame configuration;

FIG. 150 illustrates one example of a data frame configuration;

FIG. 151A illustrates one example of a frame configuration; and

Figure 151B:
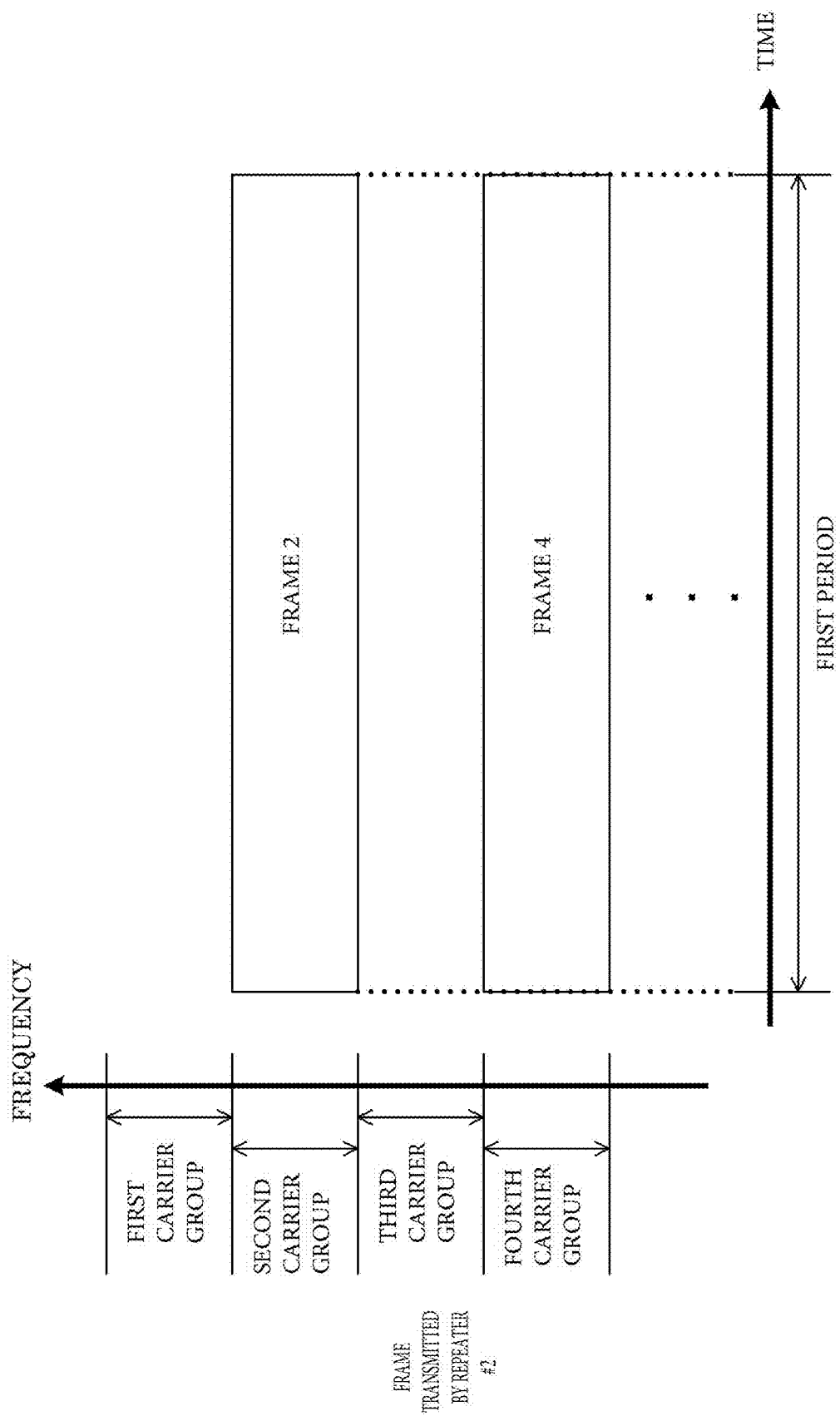

FIG. 151B illustrates one example of a frame configuration.

DETAILED DESCRIPTION OF THE EMBODIMENTS

A communication system according to one aspect of the present disclosure is configured to wirelessly communicate with a terminal, and includes: an access point; a first communication device; and a second communication device. The access point is configured to wirelessly communicate with the first communication device on at least a first channel included in a first frequency band and wirelessly communicate with the second communication device on at least a second channel included in a second frequency band different than the first frequency band. The first communication device is configured to wirelessly communicate with the terminal on at least a third channel included in the second frequency band. The second communication device is configured to wirelessly communicate with the terminal on at least a fourth channel included in the first frequency band.

According to this aspect, in the communication system, since the frequency band (i.e., the first frequency band) of radio waves transmitted to the first communication device by the access point and the frequency band (i.e., the second frequency band) of radio waves transmitted to the terminal by the first communication device are different, interference between these radio waves can be avoided, and a reduction in data transmission efficiency can be inhibited. Similarly, since the frequency band (i.e., the second frequency band) of radio waves transmitted to the second communication device by the access point and the frequency band (i.e., the first frequency band) of radio waves transmitted to the terminal by the second communication device are different, interference between these radio waves can be avoided, and a reduction in data transmission efficiency can be inhibited. Moreover, since, in the communication system, communication between the access point and the first communication device and communication between the second communication device and the terminal use the same frequency band (i.e., the first frequency band), and communication between the access point and the second communication device and communication between the first communication device and the terminal use the same frequency band (i.e., the second frequency band), compared to when each of these communications uses a different frequency band, the number of frequency bands used by the communication system overall can be reduced. Accordingly, the communication system is capable of improving the performance of the communication system by inhibiting a reduction in data transmission efficiency while reducing the frequency bands used.

For example, the third channel may be the same channel as the second channel, and the fourth channel may be the same channel as the first channel.

According to this aspect, since the communication system uses the same channel for communication between the access point and the first communication device and communication between the second communication device and the terminal, and uses the same channel for communication between the access point and the second communication device and communication between the first communication device and the terminal, compared to when each of these communications uses a different channel, the number of channels used by the communication system overall can be reduced. Accordingly, the communication system is capable of improving the performance of the communication system while reducing the channels used.

For example, the first communication device and the second communication device may be disposed in a single housing.

According to this aspect, in the communication system, the first communication device and the second communication device can be handled as a single device. Accordingly, the communication system is capable of improving the performance of the communication system while simplifying the configuration of the system.

For example, the access point may be configured to communicate with the first communication device and the second communication device using multi-access via orthogonal frequency division multiple access (OFDMA).

According to this aspect, the communication system is capable of improving the performance of the communication system by while improving channel usage efficiency by using multi-access via OFDMA between the access point and the communication devices.

For example, the terminal may include a plurality of terminals, and at least one of the first communication device or the second communication device may be configured to communicate with the plurality of terminals using multi-access via OFDMA.

According to this aspect, the communication system is capable of improving the performance of the communication system by while improving channel usage efficiency by using multi-access via OFDMA between at least one of the communication devices and the terminals. For example, the access point may be configured to transmit one item of data to each of the first communication device and the second communication device. When the first communication device receives the one item of data, the first communication device may be configured to transmit the one item of data received to the terminal. When the second communication device receives the one item of data, the second communication device may be configured to transmit the one item of data received to the terminal.

According to this aspect, the communication system transmits one item of data from the access point to the terminal via the first communication device, and transmits the same data from the access point to the terminal via the second communication device. This enables the communication system to improve the performance of the communication system by improving the data reception rate in the terminal.

A terminal according to one aspect of the present disclosure is configured to wirelessly communicate with a communication system. The communication system includes an access point, a first communication device, and a second communication device. The access point is configured to wirelessly communicate with the first communication device on at least a first channel included in a first frequency band and wirelessly communicate with the second communication device on at least a second channel included in a second frequency band different than the first frequency band. The terminal is configured to: wirelessly communicate with the first communication device on at least a third channel included in the second frequency band; and wirelessly communicate with the second communication device on at least a fourth channel included in the first frequency band.

This aspect achieves the same advantageous effects as the communication system described above.

A control method according to one aspect of the present disclosure is a control method of a communication system that includes an access point, a first communication device, and a second communication device, and wirelessly communicates with a terminal. The control method includes: wirelessly communicating with the first communication device, by the access point, on at least a first channel included in a first frequency band and wirelessly communicating with the second communication device, by the access point, on at least a second channel included in a second frequency band different than the first frequency band; wirelessly communicating with the terminal, by the first communication device, on at least a third channel included in the second frequency band; and wirelessly communicating with the terminal, by the second communication device, on at least a fourth channel included in the first frequency band.

This aspect achieves the same advantageous effects as the communication system described above.

A control method according to one aspect of the present disclosure is a control method of a terminal that wirelessly communicates with a communication system. The communication system includes an access point, a first communication device, and a second communication device. The access point is configured to wirelessly communicate with the first communication device on at least a first channel included in a first frequency band and wirelessly communicate with the second communication device on at least a second channel included in a second frequency band different than the first frequency band. The control method includes: wirelessly communicating with the first communication device on at least a third channel included in the second frequency band; and wirelessly communicating with the second communication device on at least a fourth channel included in the first frequency band.

This aspect achieves the same advantageous effects as the terminal described above.

These general and specific aspects may be implemented using a system, a method, an integrated circuit, a computer program, or a computer-readable recording medium such as a CD-ROM, or any combination thereof.

Hereinafter, embodiments will be described in detail with reference to the drawings.

Each of the following embodiments describes a general or specific example. The numerical values, shapes, materials, elements, the arrangement and connection of the elements, the steps, the order of the steps, etc., shown in the following embodiments are mere examples, and therefore do not limit the scope of the present disclosure. Moreover, among elements described in the following embodiments, those not recited in any one of the independent claims are described as optional elements.

Embodiment 1

Figure 1:
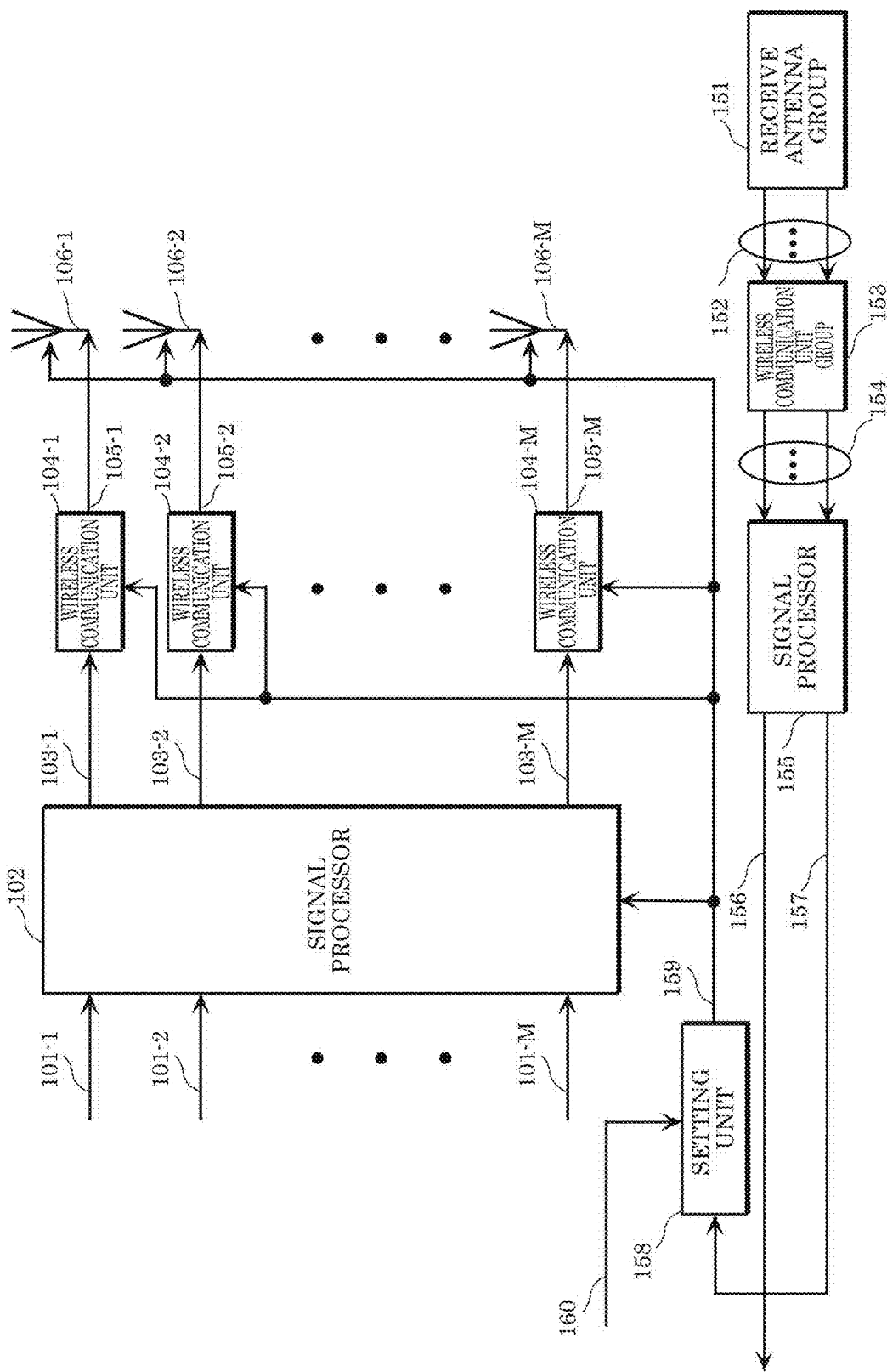
FIG. 1 is a diagram illustrating an example of a configuration of a base station.

FIG. 1 illustrates an example of a configuration of a base station (or an access point, for instance) in the present embodiment.

101-1 denotes #1 information, 101-2 denotes #2 information, . . . , and 101-M denotes #M information. 101-$i$ denotes #i information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information 101-2, . . . , #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, . . . , and signal 103-M obtained as a result of the signal processing, that is, signal 103-$i$ obtained as a result of the signal processing. Note that not all the signals from signal #1 obtained as a result of the signal processing to signal #M obtained as a result of the signal processing are necessarily present. At this time, signal processor 102 performs error correction coding on #i information 101-$i$, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Wireless communication unit 104-1 receives inputs of signal 103-1 obtained as a result of the signal processing and control signal 159. Wireless communication unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, wireless communication unit 104-2 receives inputs of signal 103-2 obtained as a result of the signal processing and control signal 159. Wireless communication unit 104-2 performs processing such as band limiting, frequency conversion, and amplification, based on control signal 159, and outputs transmission signal 105-2. Then, transmission signal 105-2 is output as a radio wave from antenna unit 106-2. A description of wireless communication unit 104-3 to wireless communication unit 104-(M−1) is omitted.

Wireless communication unit 104-M receives inputs of signal 103-M obtained as a result of the signal processing and control signal 159. Wireless communication unit 104-M performs processing such as band limiting, frequency conversion, and amplification, based on control signal 159, and outputs transmission signal 105-M. Then, transmission signal 105-M is output as a radio wave from antenna unit 106-M.

Note that the wireless communication units may not perform the above processing when a signal obtained as a result of the signal processing is not present.

Wireless communication unit group 153 receives inputs of received signal group 152 received by receive antenna group 151. Wireless communication unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously", "the number of transmission streams when multicasting is performed", and "a transmitting method performed when transmitting a modulated signal for multicasting", for instance, and outputs control signal 159 that includes such information items determined.

Antenna units 106-1, 106-2, . . . , and 106-M each receive an input of control signal 159. The operation at this time is to be described with reference to FIG. 2.

Figure 2:
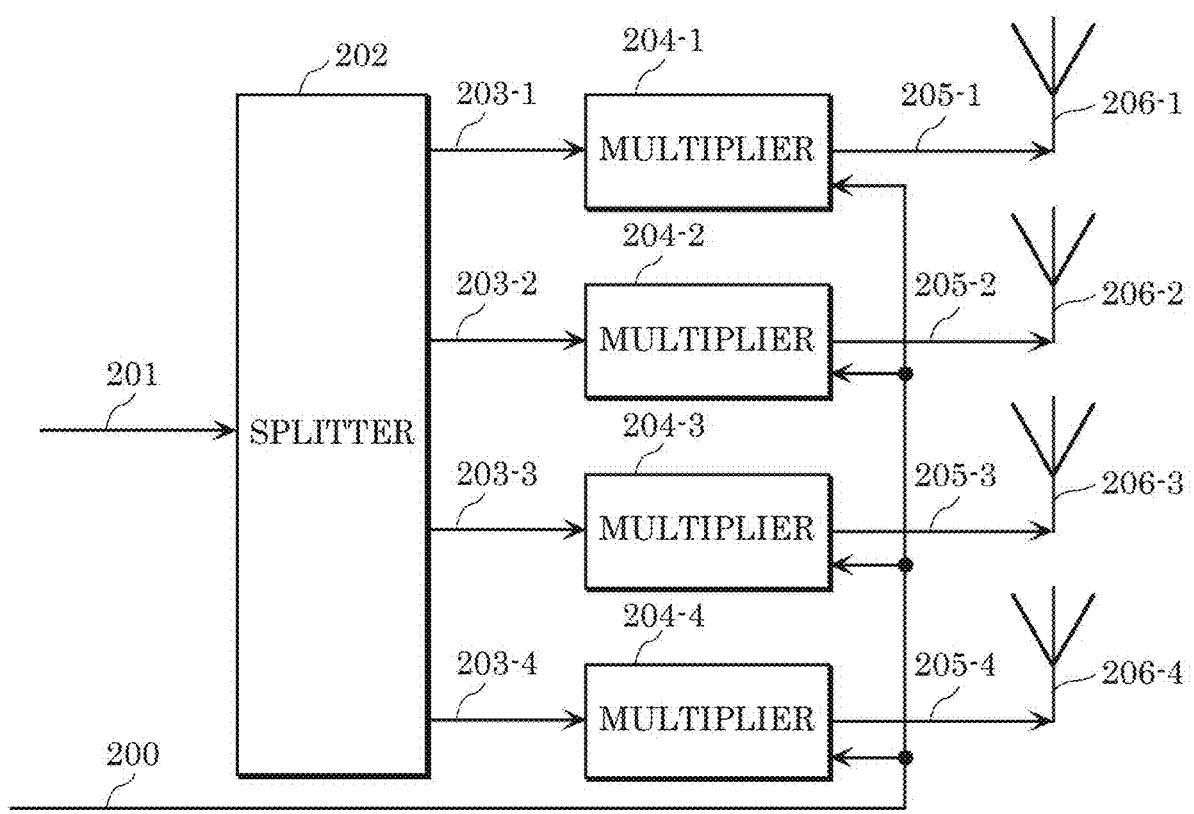
FIG. 2 is a diagram illustrating an example of a configuration of an antenna unit of the base station.

FIG. 2 illustrates an example of a configuration of antenna units 106-1, 106-2, . . . , and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-$i$, where i is an integer of 1 or greater and M or smaller.

Splitter 202 receives an input of transmission signal 201 (corresponding to transmission signal 105-$i$ in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1(t), signal 205-1 obtained as a result of the multiplication can be expressed by W1×v1(t) (t denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the multiplication. Note that coefficient W2 can be defined by a complex number. Accordingly, W2 can also be a real number. Thus, if signal 203-2 is v2(t), signal 205-2 obtained as a result of the multiplication can be expressed by W2×v2(t) (t denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3(t), signal 205-3 obtained as a result of the multiplication can be expressed by W3×v3(t) (t denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4(t), signal 205-4 obtained as a result of the multiplication can be expressed by W4×v4(t) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
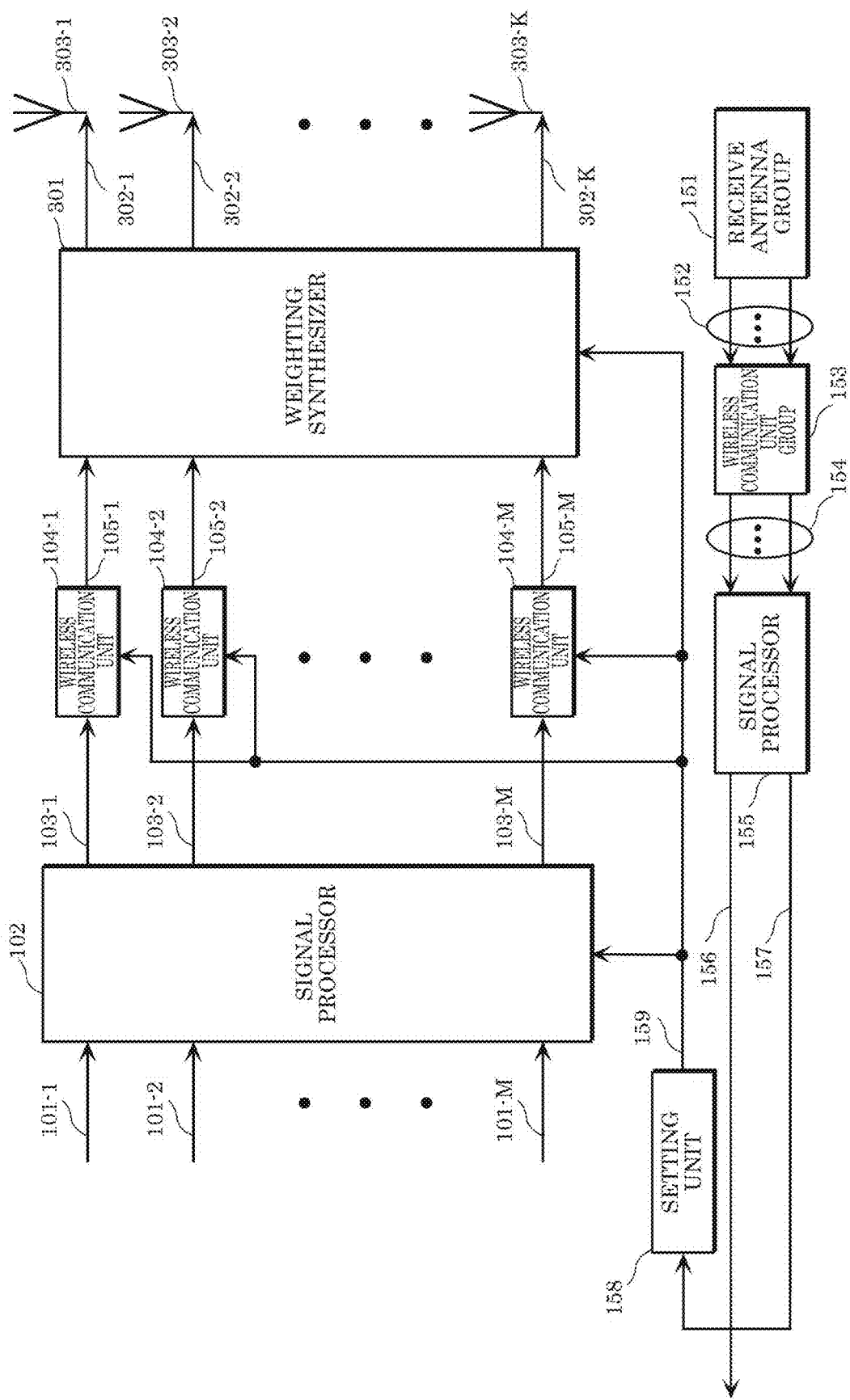
FIG. 3 is a diagram illustrating an example of a configuration of the base station.

FIG. 3 illustrates a configuration of the base station different from the configuration of the base station in FIG. 1 in the present embodiment. In FIG. 3, the same reference numerals are assigned to elements which operate in the same manner as those in FIG. 1, and a description thereof is omitted below.

Weighting synthesizer 301 receives inputs of modulated signal 105-1, modulated signal 105-2, . . . , modulated signal 105-M, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i(t)$ 302-$i$ (i is an integer of 1 or greater and K or smaller) obtained as a result of the weighting synthesis is expressed as follows (t denotes time).

[Math. 1]

$$y_i(t) = A_{i1} \times x_1(t) + A_{i2} \times x_2(t) + \ldots + A_{iM} \times x_M(t) = \sum_{j=1}^{M} A_{ij} \times x_j(t)$$

Expression (1)

Note that in Expression (1), $A_{ij}$ is a value which can be defined by a complex number. Accordingly, $A_{ij}$ can also be a real number, and $x_j(t)$ is modulated signal 105-$j$, where j is an integer of 1 or greater and M or smaller.

Figure 4:
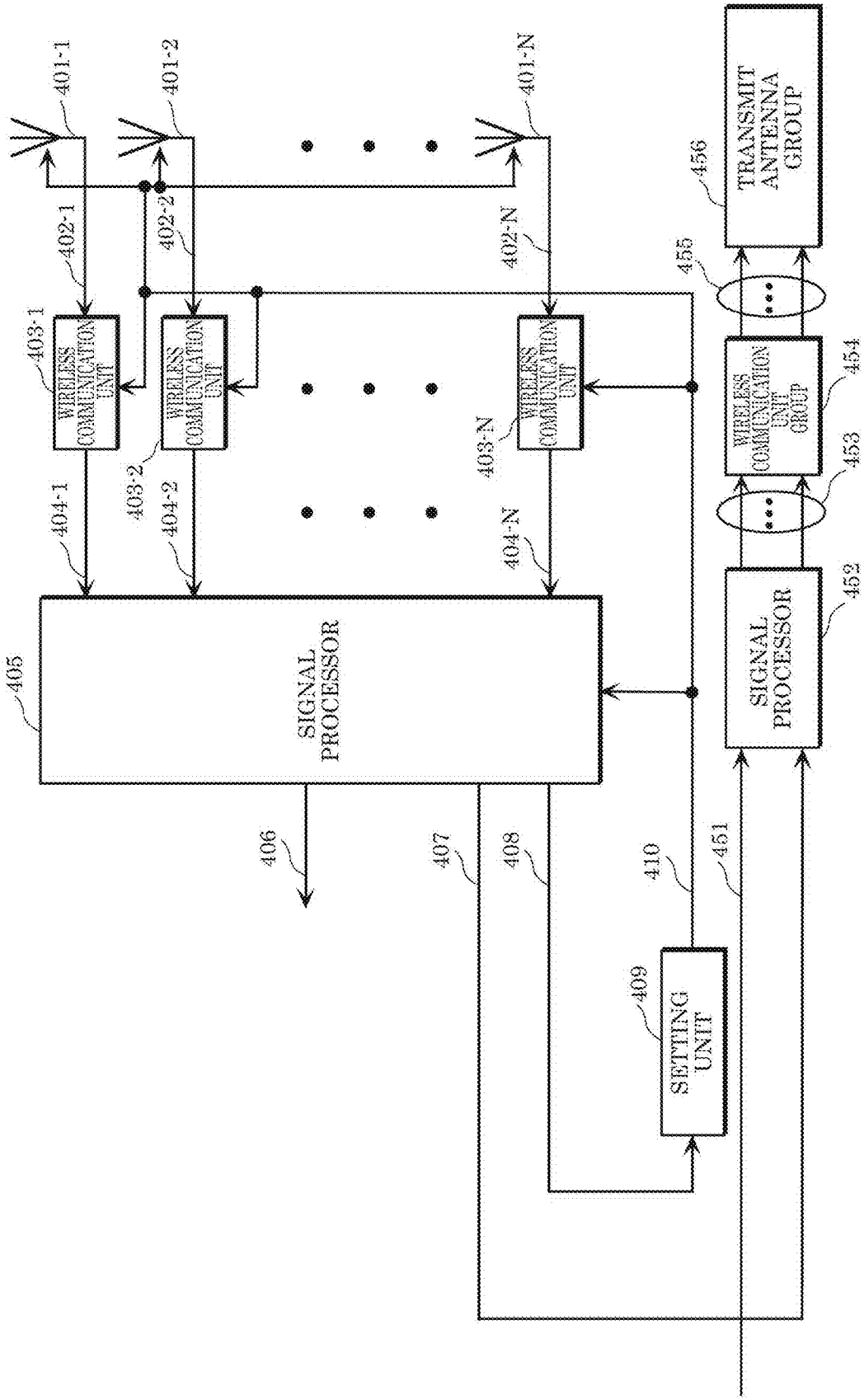
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Wireless communication unit 403-1 receives inputs of received signal 402-1 received by antenna unit 401-1 and control signal 410. Based on control signal 410, wireless communication unit 403-1 performs processing such as frequency conversion on received signal 402-1, and outputs baseband signal 404-1.

Similarly, wireless communication unit 403-2 receives inputs of received signal 402-2 received by antenna unit 401-2 and control signal 410. Based on control signal 410, wireless communication unit 403-2 performs processing such as frequency conversion on received signal 402-2, and outputs baseband signal 404-2. Note that a description of wireless communication units 403-3 to 403-(N−1) is omitted.

Wireless communication unit 403-N receives inputs of received signal 402-N received by antenna unit 401-N and control signal 410. Based on control signal 410, wireless communication unit 403-N performs processing such as frequency conversion on received signal 402-N, and outputs baseband signal 404-N.

Note that not all of wireless communication units 403-1, 403-2, . . . , and 403-N may operate. Accordingly, not all of baseband signals 404-1, 404-2, . . . , and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Wireless communication unit group 454 receives an input of baseband signal group 453. Wireless communication unit group 454 performs processing such as band limiting, frequency conversion, and amplification, and outputs transmission signal group 455. Transmission signal group 455 is output as a radio wave from transmit antenna group 456.

Figure 5:
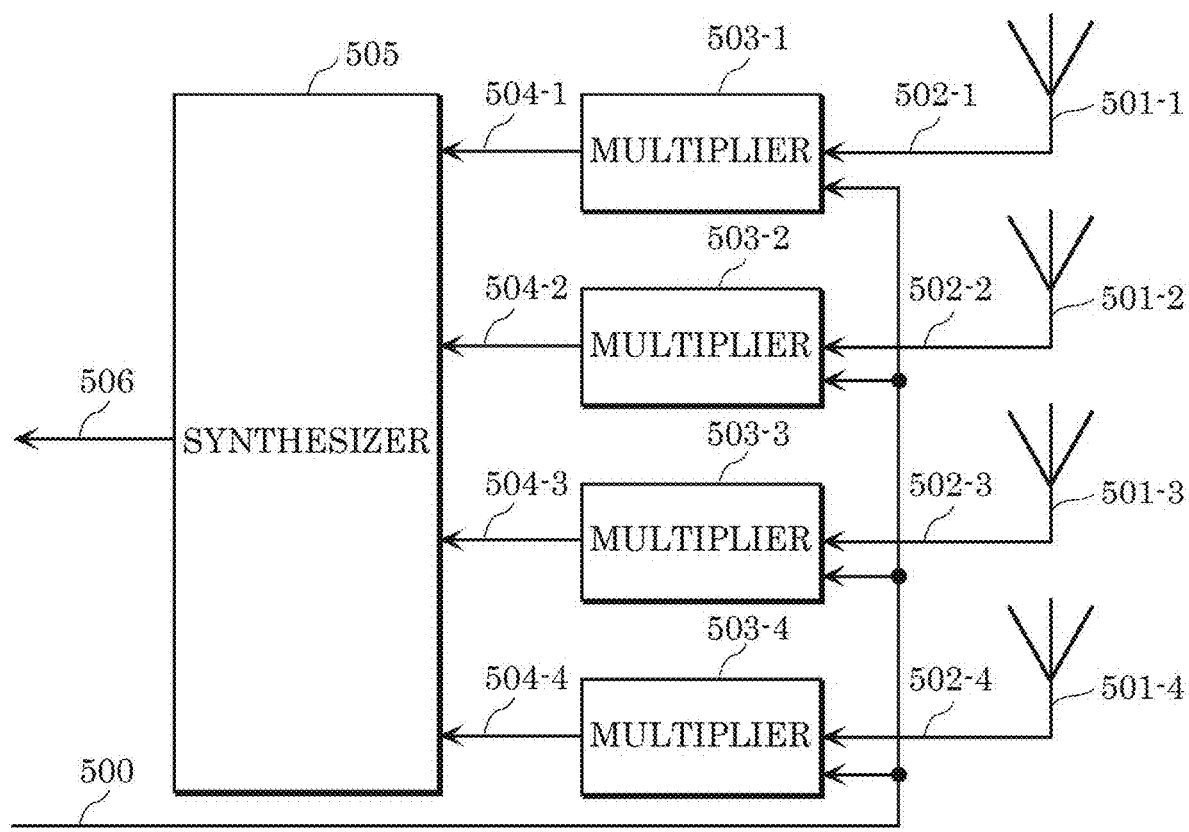
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-$i$, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1(t), signal 504-1 obtained as a result of the multiplication can be expressed by D1×e1(t) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2(t), signal 504-2 obtained as a result of the multiplication can be expressed by D2×e2(t) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3(t), signal 504-3 obtained as a result of the multiplication can be expressed by D3×e3(t) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, D4 can also be a real number. Thus, if received signal 502-4 is expressed by e4(t), signal 504-4 obtained as a result of the multiplication can be expressed by D4×e4(t) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-$i$ in FIG. 4). Thus, synthesized signal 506 is expressed by D1×e1(t)+D2×e2(t)+D3×e3(t)+D4×e4(t).

Figure 6:
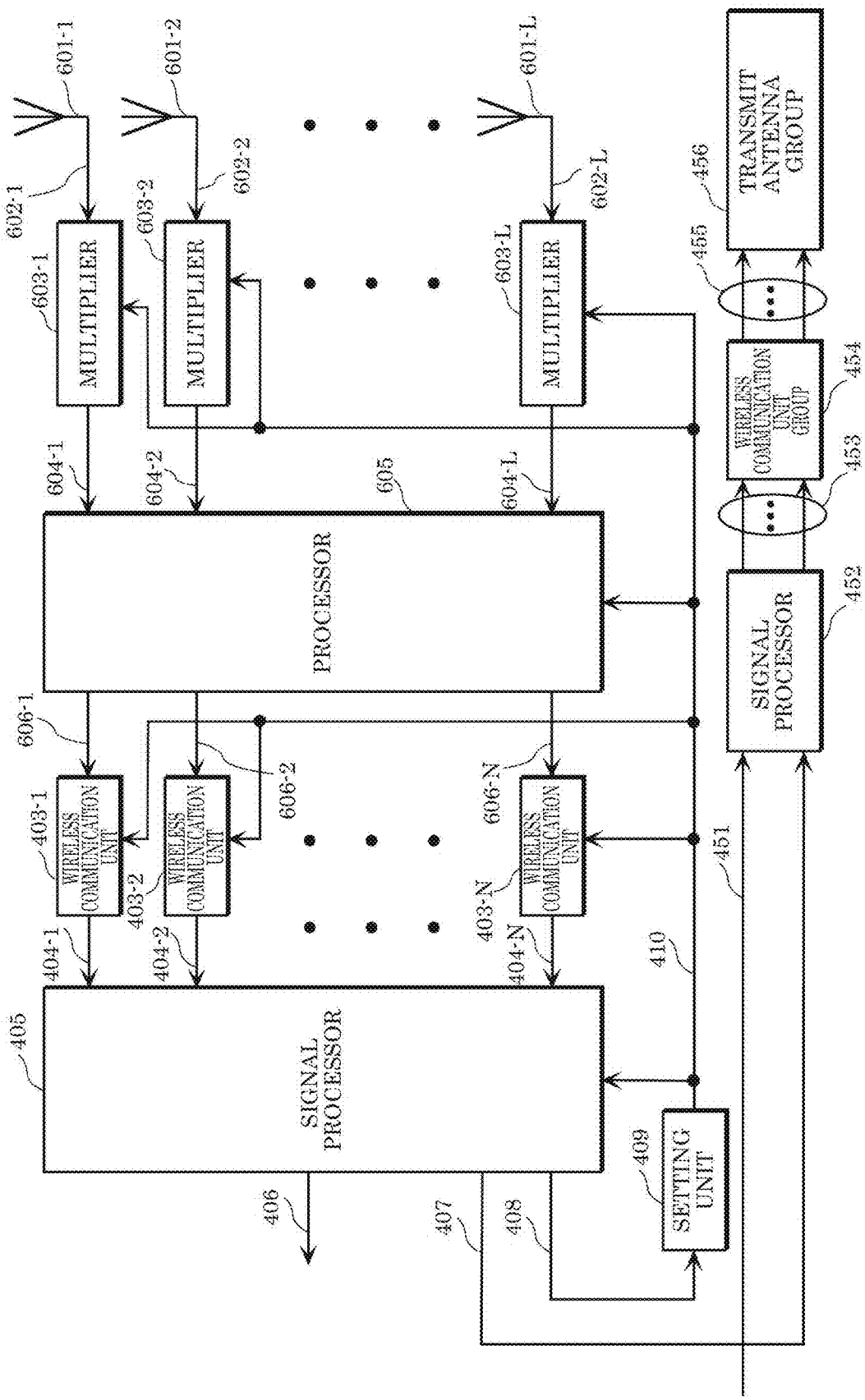
FIG. 6 is a diagram illustrating an example of a configuration of a terminal.

FIG. 6 illustrates a configuration of a terminal different from the configuration of the terminal in FIG. 4 in the present embodiment. Elements which operate in the same manner as those in FIG. 4 are assigned the same reference numerals in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1(t), signal 604-1 obtained as a result of the multiplication can be expressed by G1×c1(t) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2(t), signal 604-2 obtained as a result of the multiplication can be expressed by G2×c2(t) (t denotes time). A description of multiplier 603-3 to multiplier 603-(L−1) is omitted.

Multiplier 603-L receives inputs of received signal 602-L received by antenna 601-L and control signal 410. Based on information on a multiplication coefficient included in control signal 410, multiplier 603-L multiplies received signal 602-L by coefficient GL, and outputs signal 604-L obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-$i$ receives inputs of received signal 602-$i$ received by antenna 601-$i$ and control signal 410. Based on information on a multiplication coefficient included in control signal 410, multiplier 603-$i$ multiplies received signal 602-$i$ by coefficient Gi, and outputs signal 604-$i$ obtained as a result of the multiplication. Note that coefficient Gi can be defined by a complex number. Accordingly, Gi can also be a real number. Thus, if received signal 602-$i$ is expressed by ci (t), signal 604-$i$ obtained as a result of the multiplication can be expressed by Gi×ci(t) (t denotes time). Note that i is an integer of 1 or greater and L or smaller, and L is an integer of 2 or greater.

Processor 605 receives inputs of signals 604-1, 604-2, . . . , and 604-L obtained as a result of the multiplication and control signal 410. Based on control signal 410, processor 605 performs signal processing, and outputs signals 606-1, 606-2, . . . , and 606-N obtained as a result of the signal processing, where N is an integer of 2 or greater. At this time, signal 604-$i$ obtained as a result of the multiplication is expressed by $p_i(t)$ (i is an integer of 1 or greater and L or smaller). Then, signal 606-$j$ ($r_j(t)$) as a result of the processing is expressed as follows (j is an integer of 1 or greater and N or smaller).

[Math. 2]

$$r_j(t) = $$
$$B_{j1} \times p_1(t) + B_{j2} \times p_2(t) + \ldots + B_{jL} \times p_L(t) = \sum_{i=1}^{L} B_{ji} \times p_i(t) \quad \text{Expression (2)}$$

Note that in Expression (2), $B_{ji}$ is a value which can be defined by a complex number. Accordingly, $B_{ji}$ can also be a real number.

Figure 7:
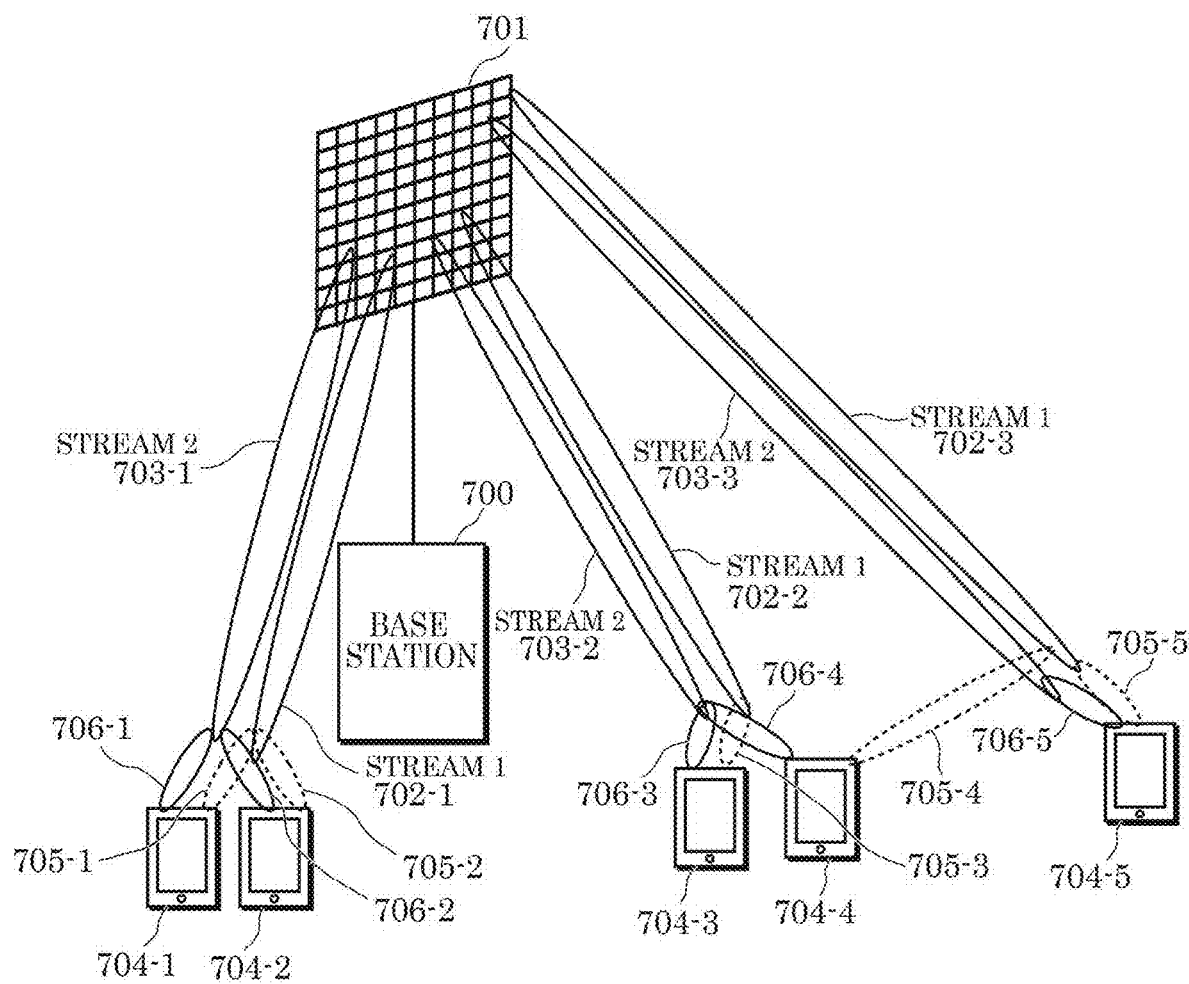
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (and/or weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-3 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
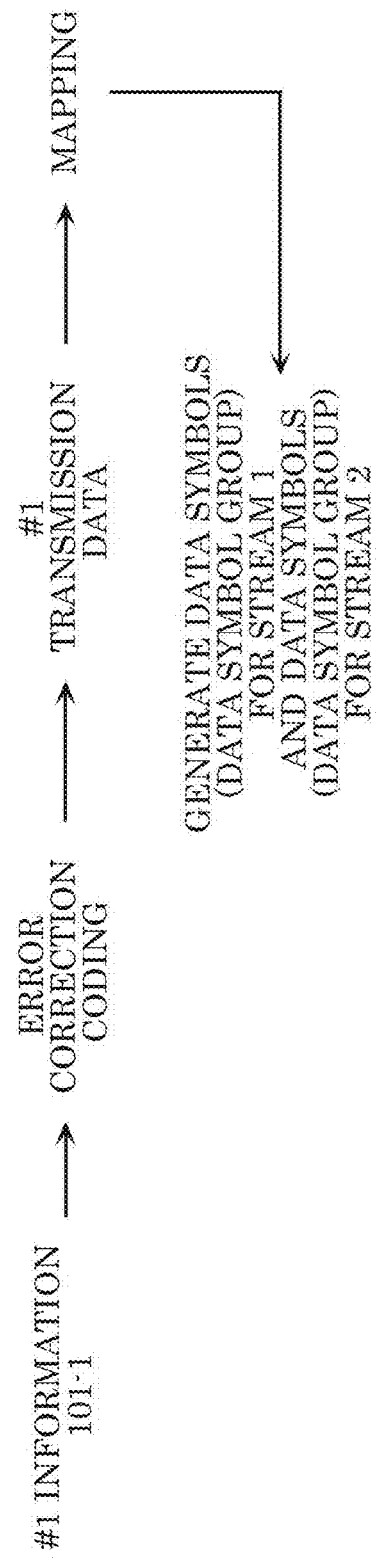
FIG. 8 is a diagram for describing a relation of a plurality of streams.

FIG. 8 is a drawing for describing a relation between #i information 101-*i* in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data. Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
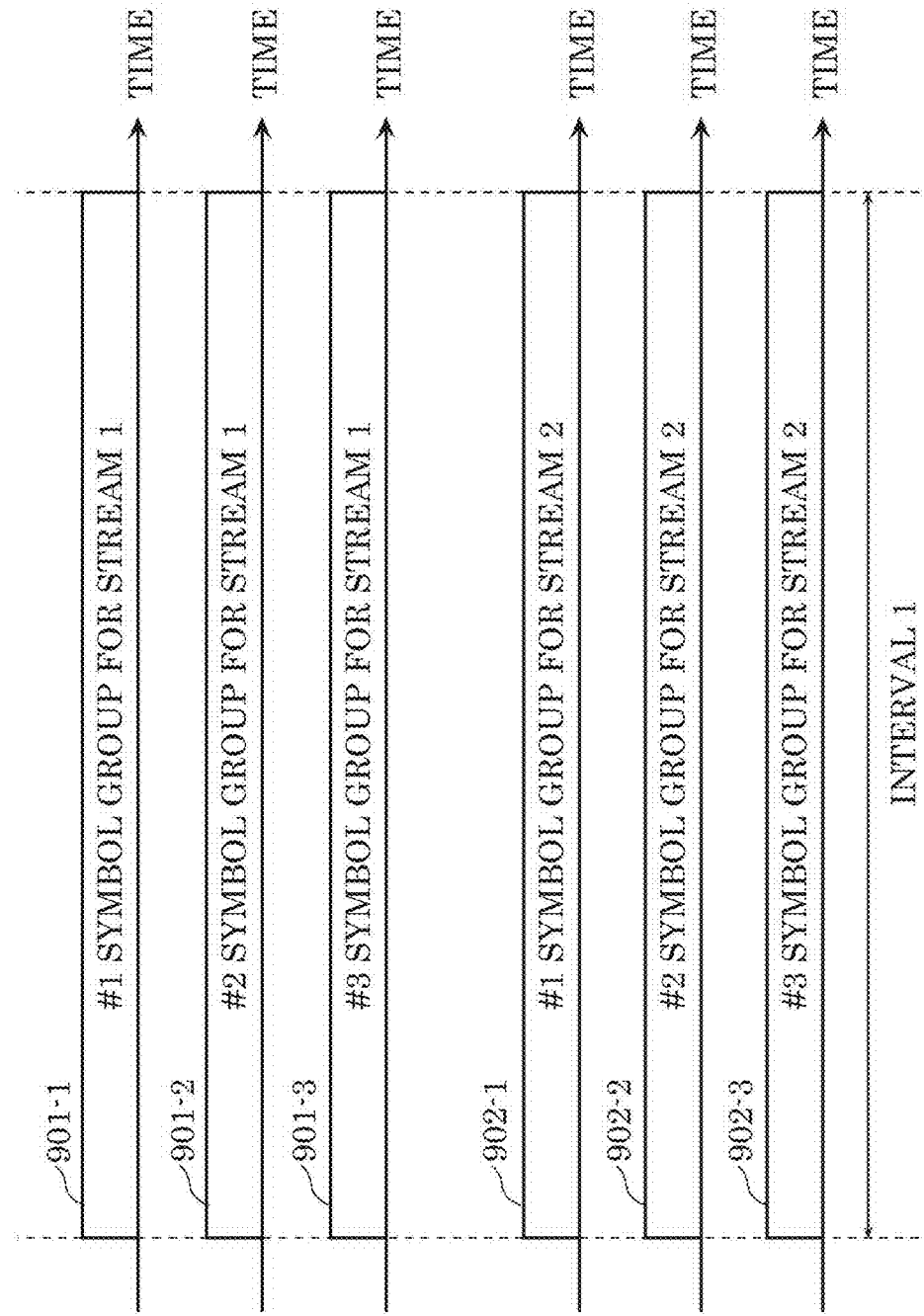
FIG. 9 is a diagram illustrating an example of a frame configuration.

FIG. 9 illustrates an example of a frame configuration when the horizontal axis indicates time.

1 symbol group 901-1 for stream 1 in FIG. 9 is a symbol group for transmission beam 702-1 for transmitting data of stream 1 in FIG. 7.

2 symbol group 901-2 for stream 1 in FIG. 9 is a symbol group for transmission beam 702-2 for transmitting data of stream 1 in FIG. 7.

3 symbol group 901-3 for stream 1 in FIG. 9 is a symbol group for transmission beam 702-3 for transmitting data of stream 1 in FIG. 7.

1 symbol group 902-1 for stream 2 in FIG. 9 is a symbol group for transmission beam 703-1 for transmitting data of stream 2 in FIG. 7.

2 symbol group 902-2 for stream 2 in FIG. 9 is a symbol group for transmission beam 703-2 for transmitting data of stream 2 in FIG. 7.

3 symbol group 902-3 for stream 2 in FIG. 9 is a symbol group for transmission beam 703-3 for transmitting data of stream 2 in FIG. 7.

1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time interval 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
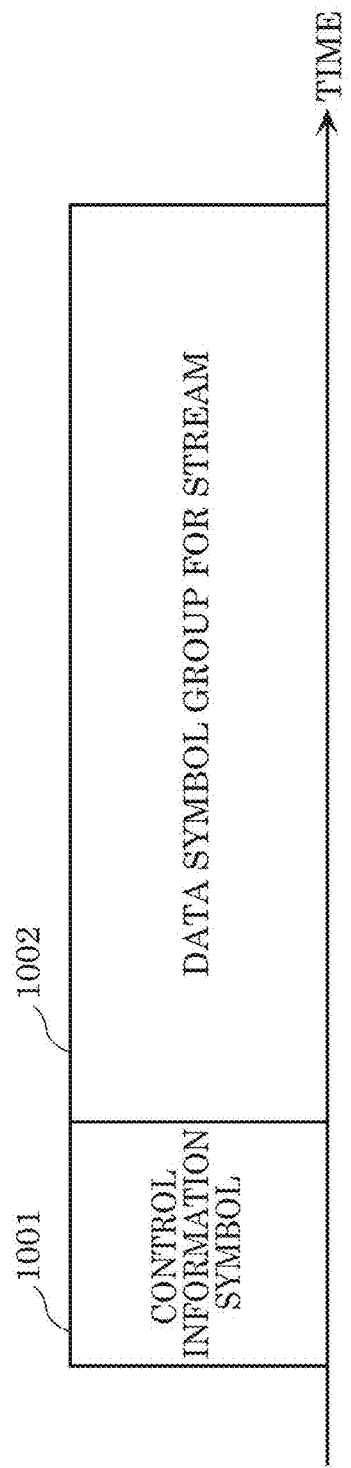
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
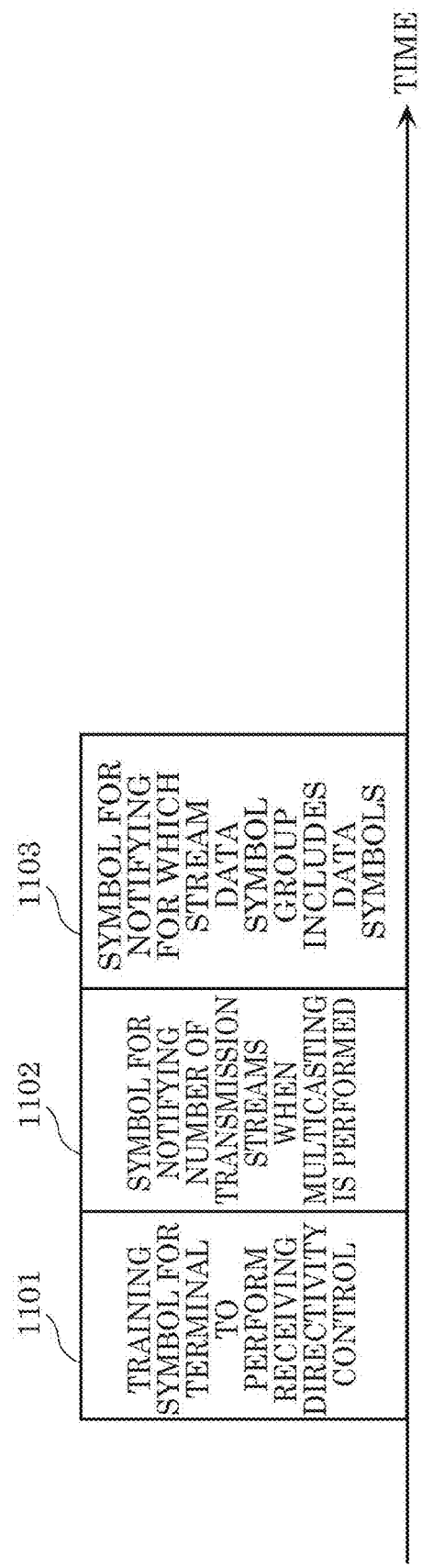
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-1 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulation method for "data symbol group for a stream" 1002 in FIG. 10 may be any modulation method, and a mapping method according to the modulation method for "data symbol group for a stream" 1002 may be changed for each symbol. Accordingly, a phase of a constellation may be changed for each symbol on an in-phase I-quadrature Q plane after mapping.

Figure 12:
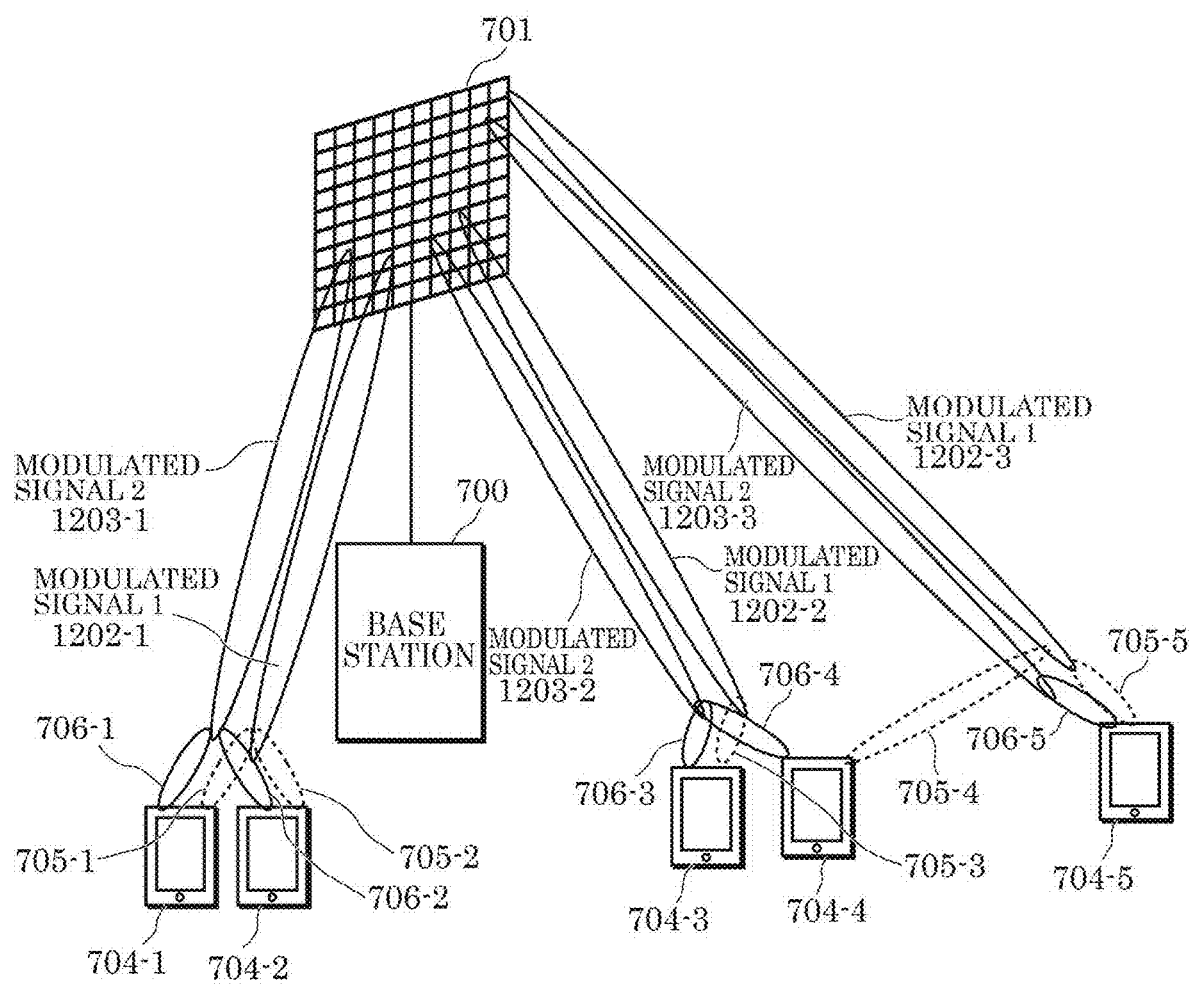
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference numerals in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-2 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 12 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time. Further, base station 700 transmits transmission beam 1202-3 for transmitting "modulated signal 1" and transmission beam 1203-3 for transmitting "modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 12, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
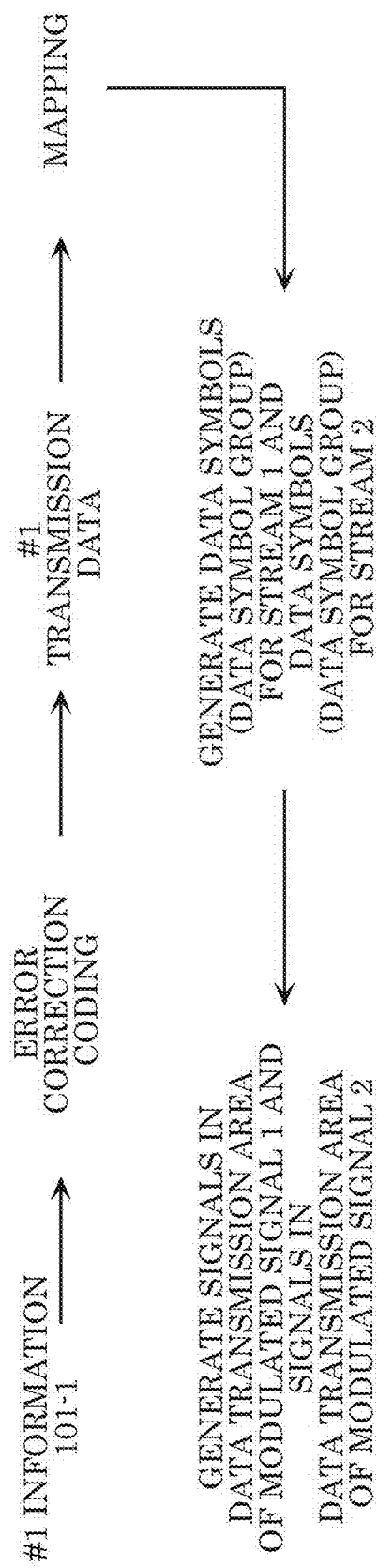
FIG. 13 is a diagram illustrating a relation of a plurality of modulated signals.

FIG. 13 is a drawing for describing a relation between #i information 101-$i$ in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1(i) and a data symbol having symbol number i for stream 2 is s2(i). Then, "modulated signal 1" tx1(i) having symbol number i is expressed as follows, for example.

[Math. 3]

$$tx1(i)=\alpha(i)\times s1(i)+\beta(i)\times s2(i) \qquad \text{Expression (3)}$$

Then, "modulated signal 2" tx2(i) having symbol number i is expressed as follows, for example.

[Math. 4]

$$tx2(i) = \gamma(i) \times s1(i) + \delta(i) \times s2(i) \quad \text{Expression (4)}$$

Note that in Expressions (3) and (4), $\alpha(i)$ can be defined by a complex number (and thus may be a real number), $\beta(i)$ can be defined by a complex number (and thus may be a real number), $\gamma(i)$ can be defined by a complex number (and thus may be a real number), and $\delta(i)$ can be defined by a complex number (and thus may be a real number). Furthermore, although $\alpha(i)$ is indicated, $\alpha(i)$ may not be a function of symbol number i (may be a fixed value), although $\beta(i)$ is indicated, $\beta(i)$ may not be a function of symbol number i (may be a fixed value), although $\gamma(i)$ is indicated, $\gamma(i)$ may not be a function of symbol number i (may be a fixed value), and although $\delta(i)$ is indicated, $\delta(i)$ may not be a function of symbol number i (may be a fixed value).

Then, "a symbol group for modulated signal 1" which includes "signals in a data transmission area of modulated signal 1" which are constituted by data symbols is transmitted from the base station in FIG. 1 or 3. Further, "a symbol group for modulated signal 2" which includes "signals in a data transmission area of modulated signal 2" which are constituted by data symbols is transmitted from the base station in FIG. 1 or 3.

Note that signal processing such as phase modification and cyclic delay diversity (CDD) may be performed on "modulated signal 1" and "modulated signal 2". Note that the method for signal processing is not limited to those.

Figure 14:
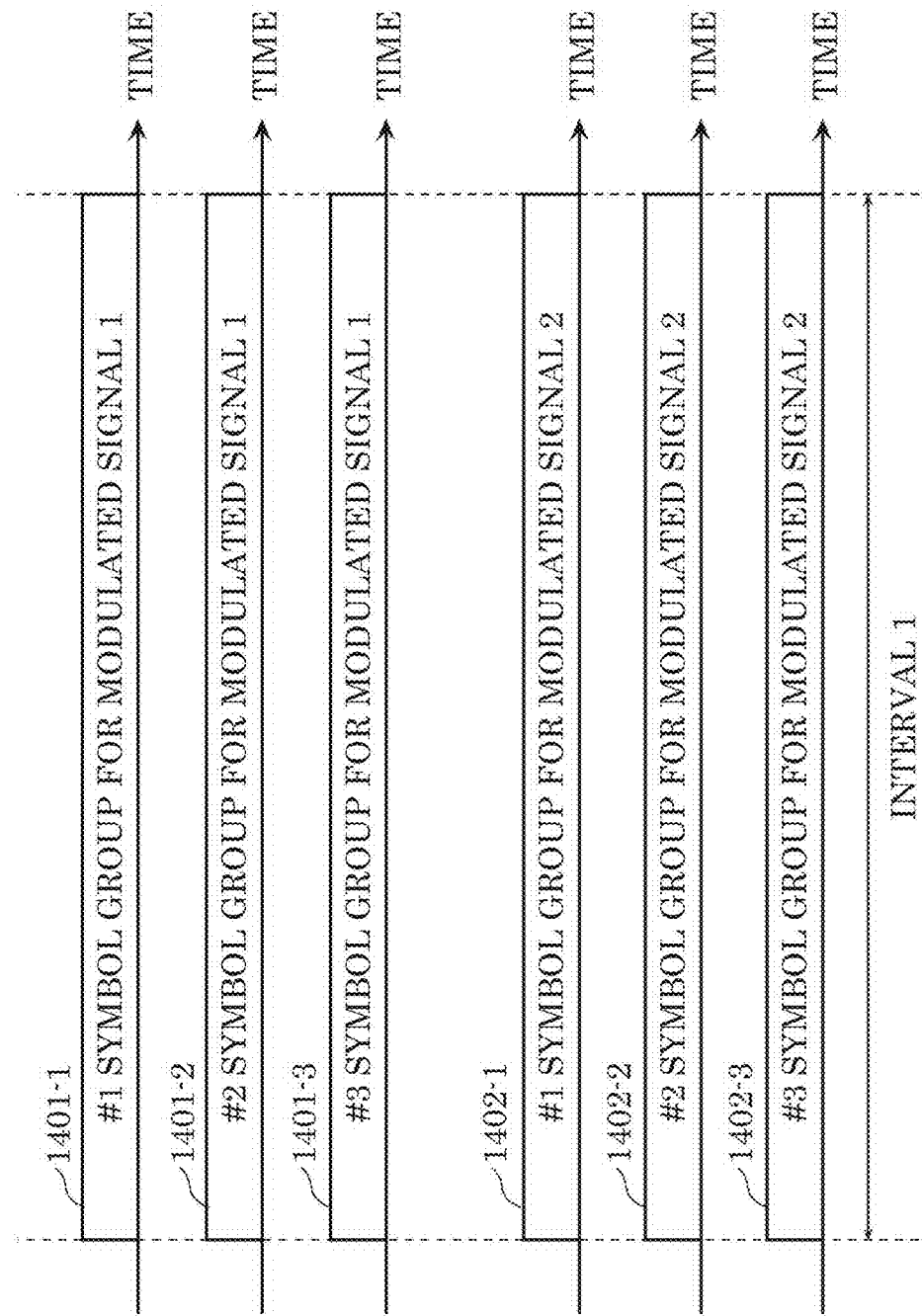
FIG. 14 is a diagram illustrating an example of a frame configuration.

FIG. 14 illustrates an example of a frame configuration when the horizontal axis indicates time.

1 symbol group (1401-1) for modulated signal 1 in FIG. 14 is a symbol group for transmission beam 1202-1 for transmitting data of modulated signal 1 in FIG. 12.

2 symbol group (1401-2) for modulated signal 1 in FIG. 14 is a symbol group for transmission beam 1202-2 for transmitting data of modulated signal 1 in FIG. 12.

3 symbol group (1401-3) for modulated signal 1 in FIG. 14 is a symbol group for transmission beam 1202-3 for transmitting data of modulated signal 1 in FIG. 12.

1 symbol group (1402-1) for modulated signal 2 in FIG. 14 is a symbol group for transmission beam 1203-1 for transmitting data of modulated signal 2 in FIG. 12.

2 symbol group (1402-2) for modulated signal 2 in FIG. 14 is a symbol group for transmission beam 1203-2 for transmitting data of modulated signal 2 in FIG. 12.

3 symbol group (1402-3) for modulated signal 2 in FIG. 14 is a symbol group for transmission beam 1203-3 for transmitting data of modulated signal 2 in FIG. 12.

1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time interval 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, "signal A in the data transmission area of modulated signal 1" and "signal A in the data transmission area of modulated signal 2" are generated from information in accordance with the procedure in FIG. 13.

"Signal A-1 in the data transmission area of modulated signal 1" which is a signal constituted by a signal equivalent to a signal which constitutes "signal A in the data transmission area of modulated signal 1", "signal A-2 in the data transmission area of modulated signal 1" which is a signal constituted by a signal equivalent to a signal which constitutes "signal A in the data transmission area of modulated signal 1", and "signal A-3 in the data transmission area of modulated signal 1" which is a signal constituted by a signal equivalent to a signal which constitutes "signal A in the data transmission area of modulated signal 1" are prepared (thus, the signal which constitutes "signal A-1 in the data transmission area of modulated signal 1", the signal which constitutes "signal A-2 in the data transmission area of modulated signal 1", and the signal which constitutes "signal A-3 in the data transmission area of modulated signal 1" are the same).

At this time, #1 symbol group (1401-1) for modulated signal 1 in FIG. 14 includes "signal A-1 in the data transmission area of modulated signal 1", #2 symbol group (1401-2) for modulated signal 1 in FIG. 14 includes "signal A-2 in the data transmission area of modulated signal 1", and #3 symbol group (1401-3) for modulated signal 1 in FIG. 14 includes "signal A-3 in the data transmission area of modulated signal 1". Specifically, #1 symbol group (1401-1) for modulated signal 1, #2 symbol group (1401-2) for modulated signal 1, and #3 symbol group (1401-3) for modulated signal 1 include equivalent signals.

Further, "signal A-1 in the data transmission area of modulated signal 2" which is a signal constituted by a signal equivalent to a signal which constitutes "signal A in the data transmission area of modulated signal 2", "signal A-2 in the data transmission area of modulated signal 2" which is a signal constituted by a signal equivalent to a signal which constitutes "signal A in the data transmission area of modulated signal 2", and "signal A-3 in the data transmission area of modulated signal 2" which is a signal constituted by a signal equivalent to a signal which constitutes "signal A in the data transmission area of modulated signal 2" are prepared (thus, the signal which constitutes "signal A-1 in the data transmission area of modulated signal 2", the signal which constitutes "signal A-2 in the data transmission area of modulated signal 2", and the signal which constitutes "signal A-3 in the data transmission area of modulated signal 2" are the same).

At this time, #1 symbol group (1402-1) for modulated signal 2 in FIG. 14 includes "signal A-1 in the data transmission area of modulated signal 2", #2 symbol group (1402-2) for stream 2 in FIG. 14 includes "signal A-2 in the data transmission area of modulated signal 2", and #3 symbol group (1402-3) for modulated signal 2 in FIG. 14 includes "signal A-3 in the data transmission area of modulated signal 2". Specifically, #1 symbol group (1402-1) for modulated signal 2, #2 symbol group (1402-2) for modulated signal 2, and #3 symbol group (1402-3) for modulated signal 2 include equivalent signals.

Figure 15:
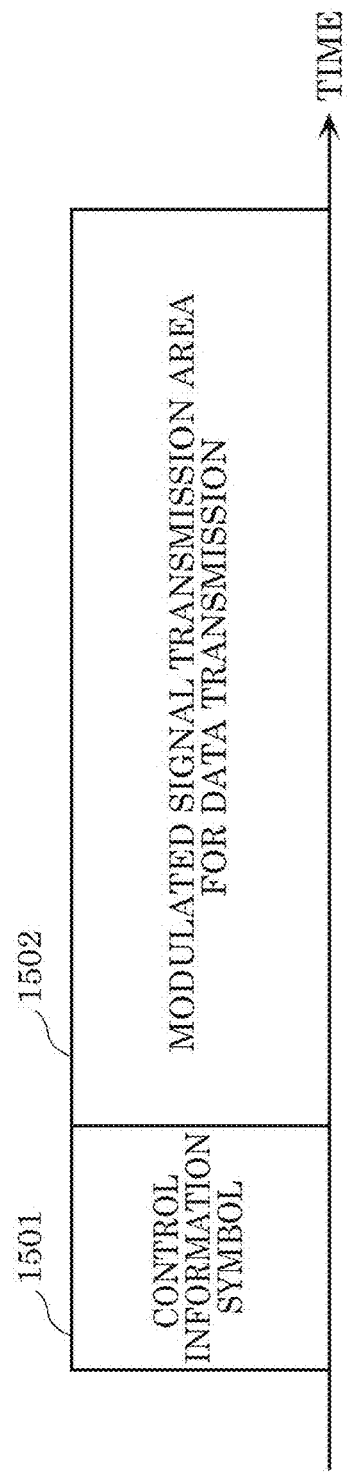
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1" or "signal A in the data transmission area of modulated signal 2" described with reference to FIG. 14.

Note that in the frame configuration in FIG. 15, a multi-carrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
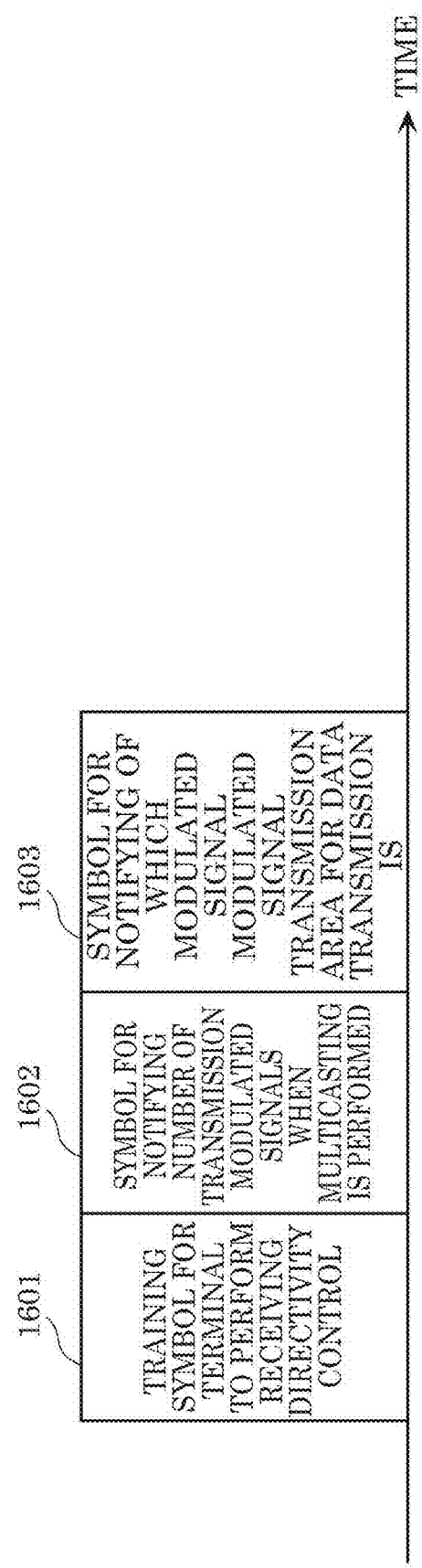
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-L and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1" from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
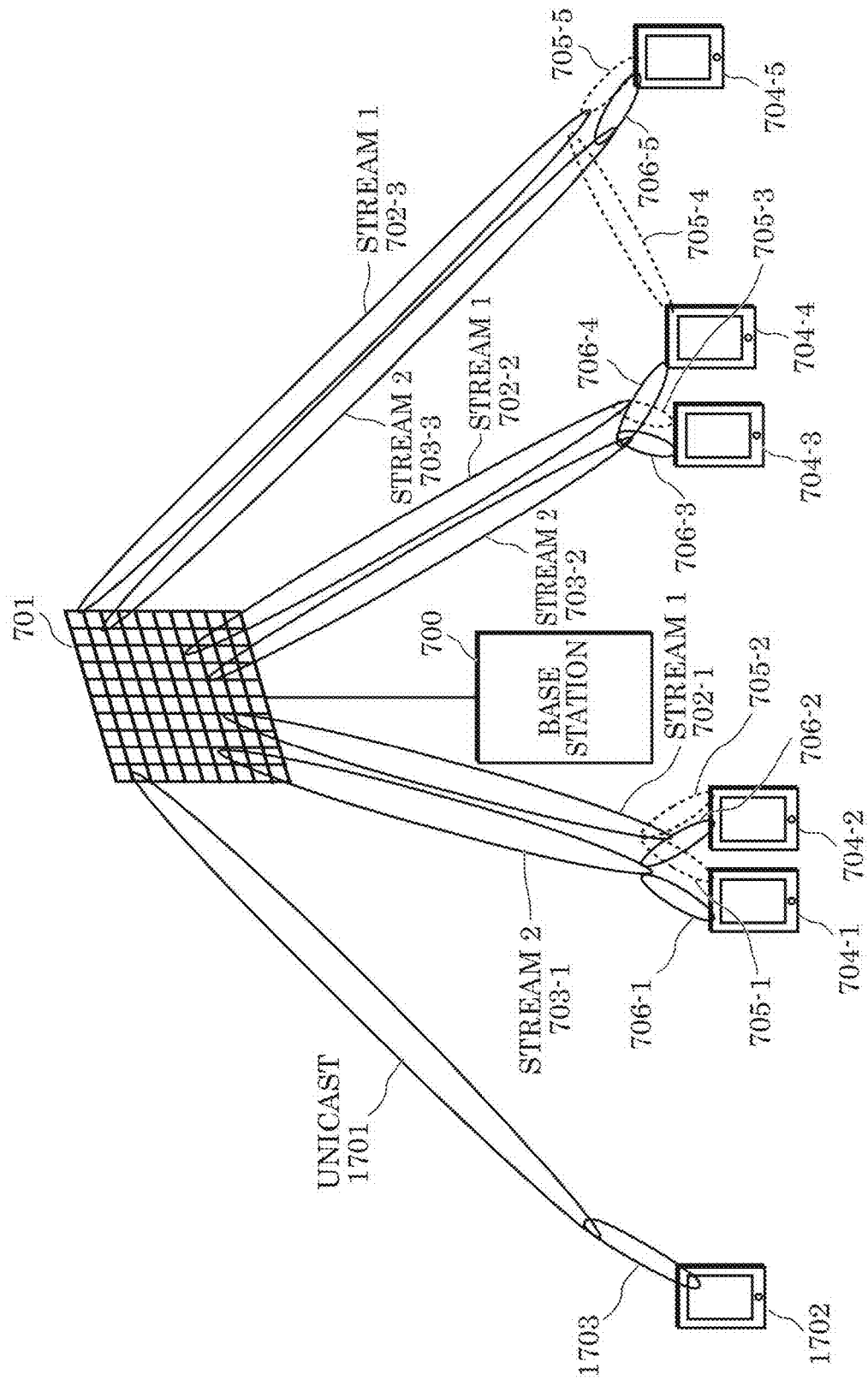
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference numerals, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1701 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, terminal 1702 performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
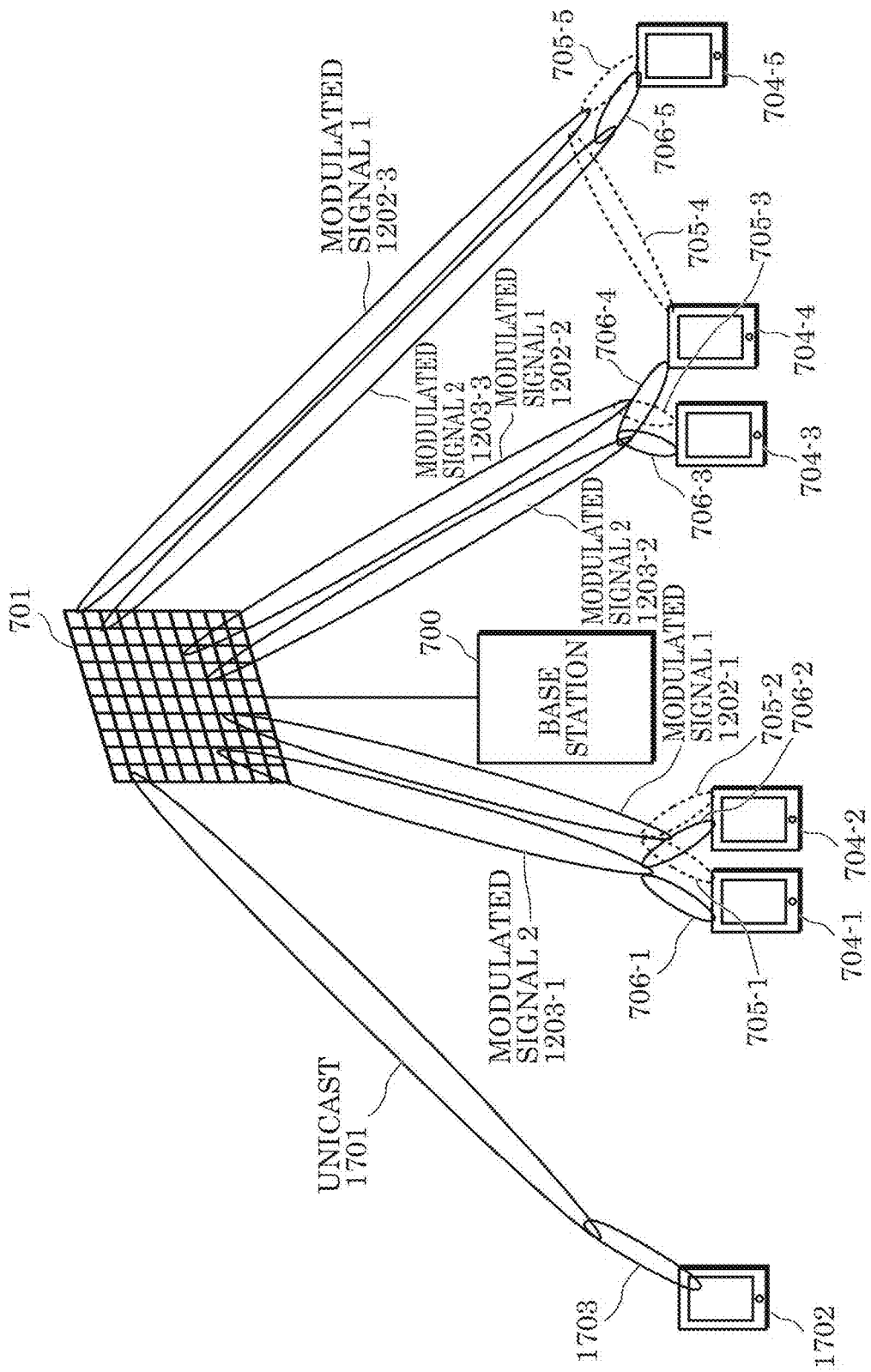
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference numerals in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, as described with reference to FIG. 12, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, terminal 1702 performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
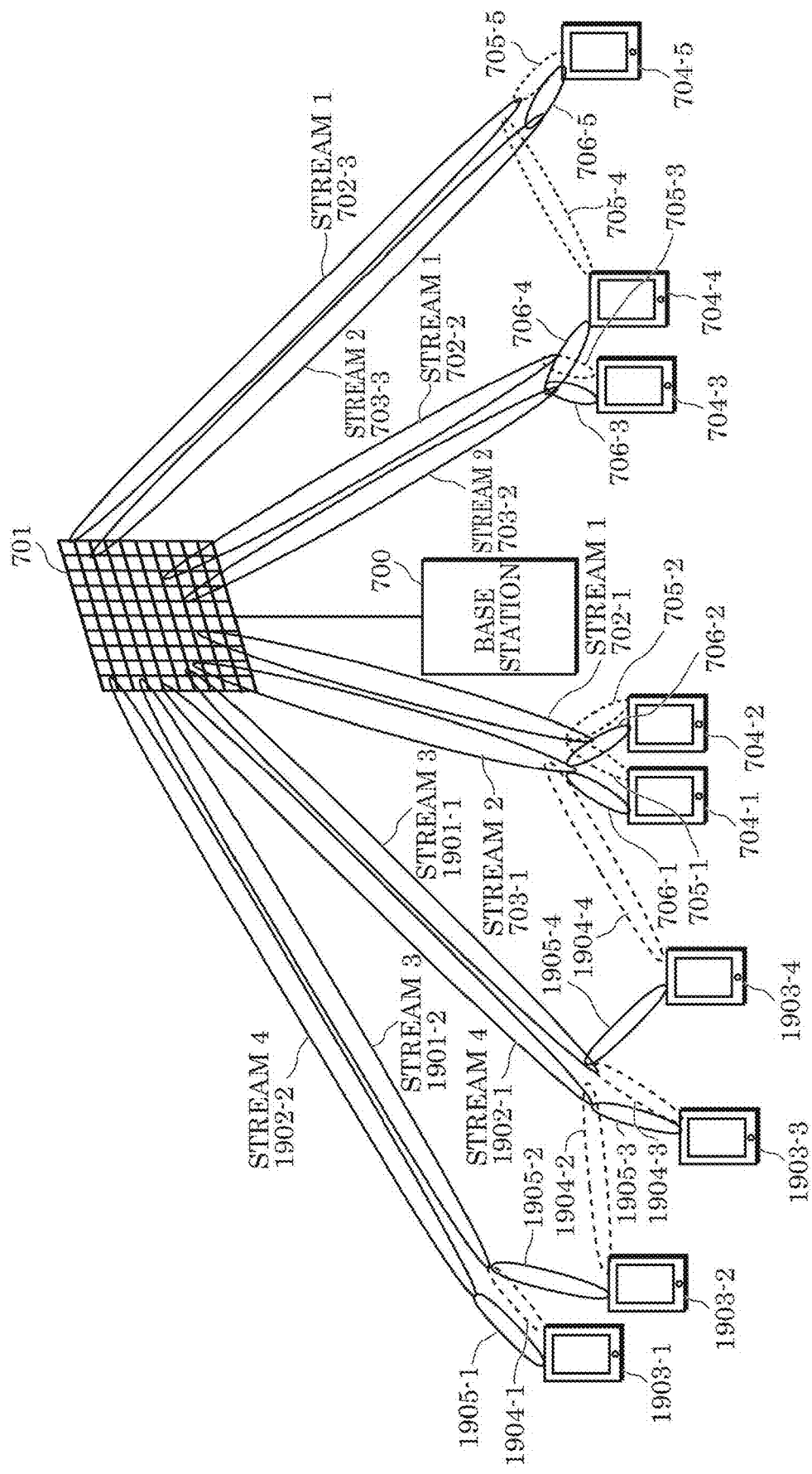
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference numerals in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference numerals 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time. Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
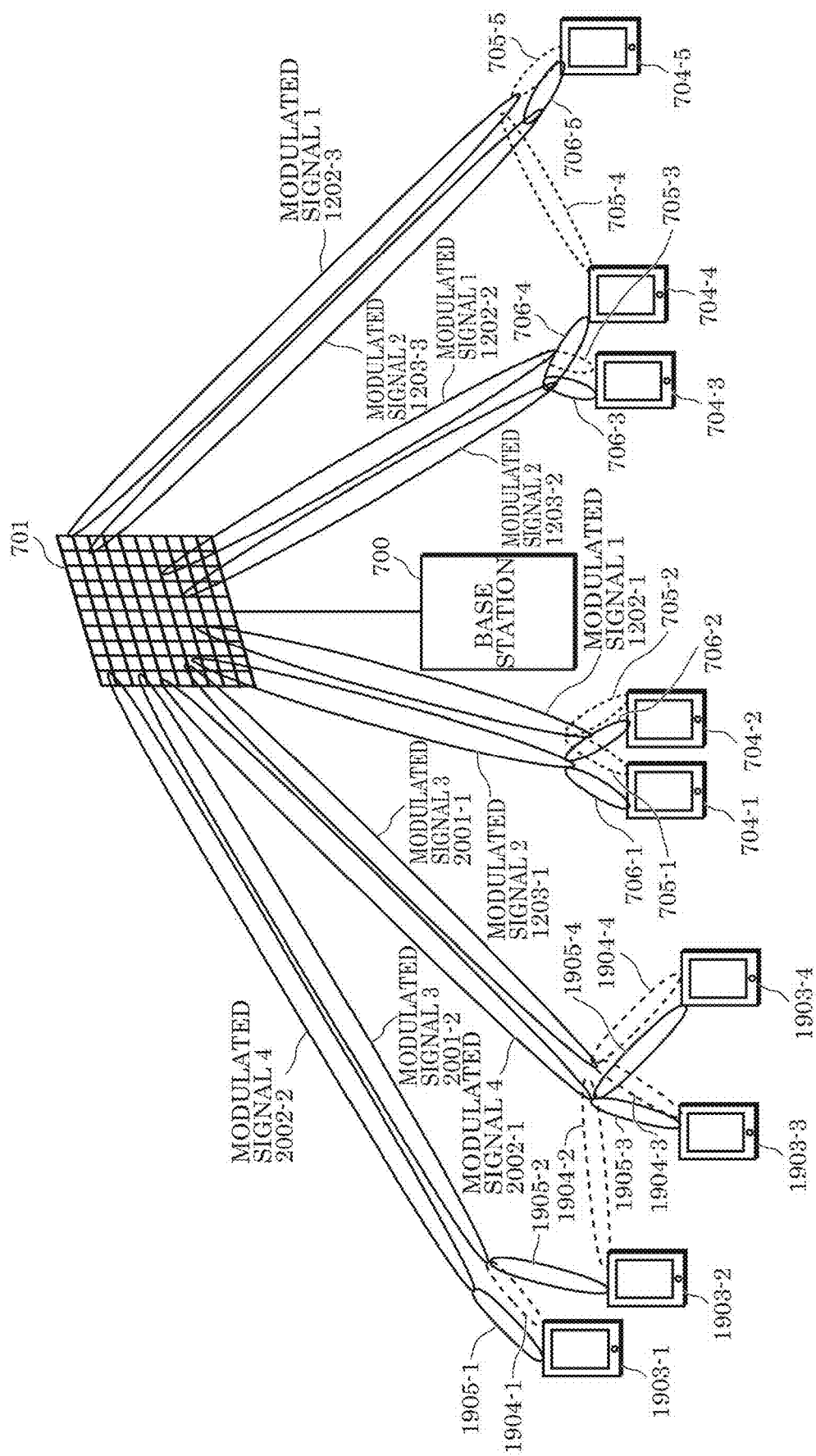
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference numerals in FIG. 20, so that a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1, and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission beam 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3".

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed", and if the base station performs transmission illustrated in FIG. 20, information indicating "the number of transmission modulated signals is 4" is input to setting unit 158 according to setting signal 160.

Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
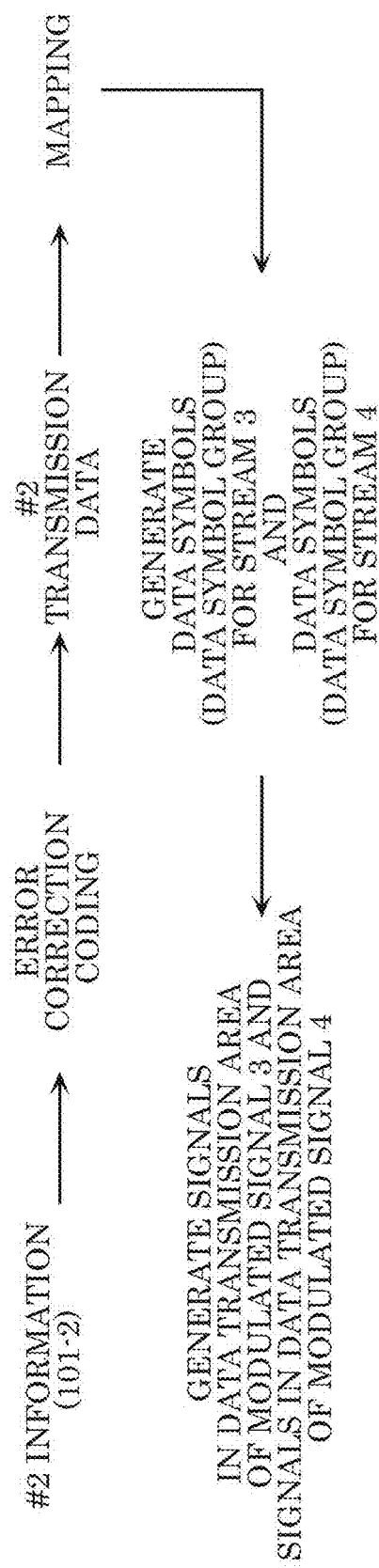
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(i), and a data symbol having symbol number i for stream 4 is s4(i). Then, "modulated signal 3" tx3(i) having symbol number i is expressed as follows, for example.

[Math. 5]

$$tx3(i)=e(i)\times s3(i)+f(i)\times s4(i) \qquad \text{Expression (5)}$$

Then, "modulated signal 4" tx4(i) having symbol number i is expressed as follows, for example.

[Math. 6]

$$tx4(i)=g(i)\times s3(i)+h(i)\times s4(i) \qquad \text{Expression (6)}$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

Supplementary Information

As a matter of course, the present disclosure may be carried out by combining a plurality of the exemplary embodiments and other contents described herein.

Moreover, each exemplary embodiment and the other contents are only examples. For example, while a "modulation method, an error correction coding method (an error correction code, a code length, a coding rate and the like to be used), control information and the like" are exemplified, it is possible to carry out the present disclosure with the same configuration even when other types of a "modulation method, an error correction coding method (an error correction code, a code length, a coding rate and the like to be used), control information and the like" are applied.

As for a modulation method, even when a modulation method other than the modulation methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation (QAM) may be applied, or in each modulation method, uniform mapping or non-uniform mapping may be performed. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulation method having 2 signal points, 4 signal points, 8 signal points, 16 signal points, 64 signal points, 128 signal points, 256 signal points, and 1024 signal points, for instance) is not limited to a signal point arranging method according to the modulation methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connectable with a device for running an application in a television, a radio, a personal computer, or a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CSI)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communication partner (for example, a modulation method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also, the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
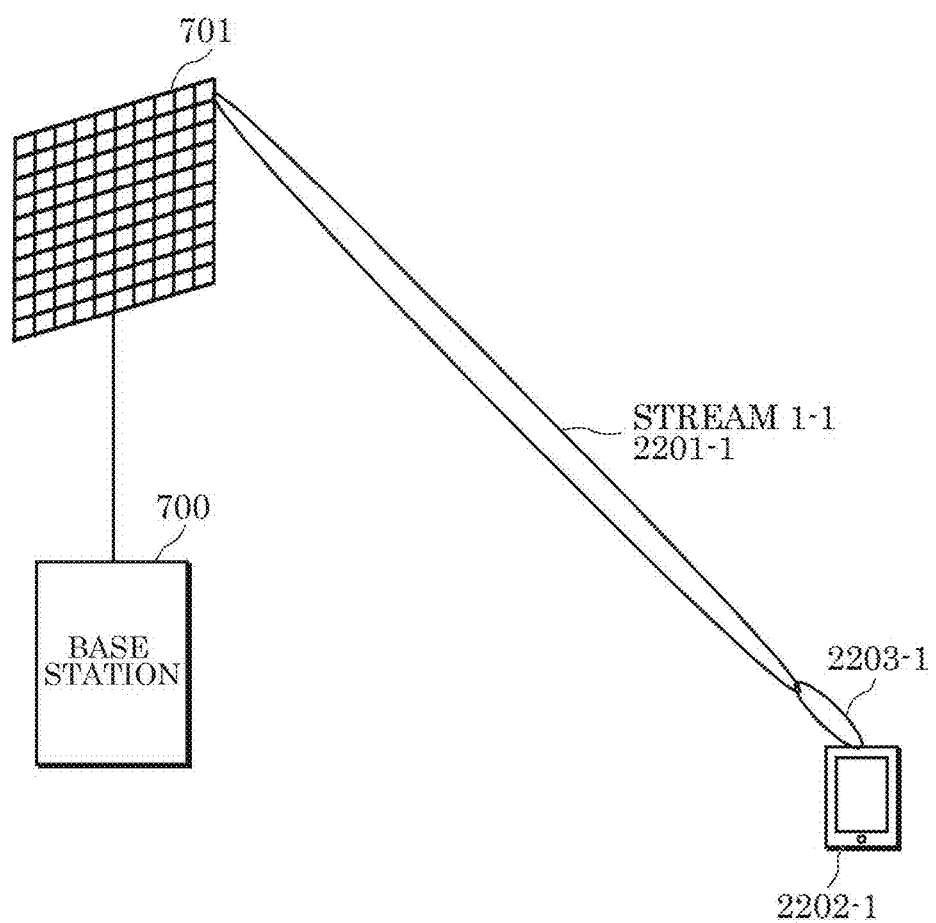
FIG. 22 is a diagram illustrating an example of a state of communication between the base station and a terminal.

FIG. 22 illustrates the case where the base station transmits a transmission stream for multicasting to one terminal.

In FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
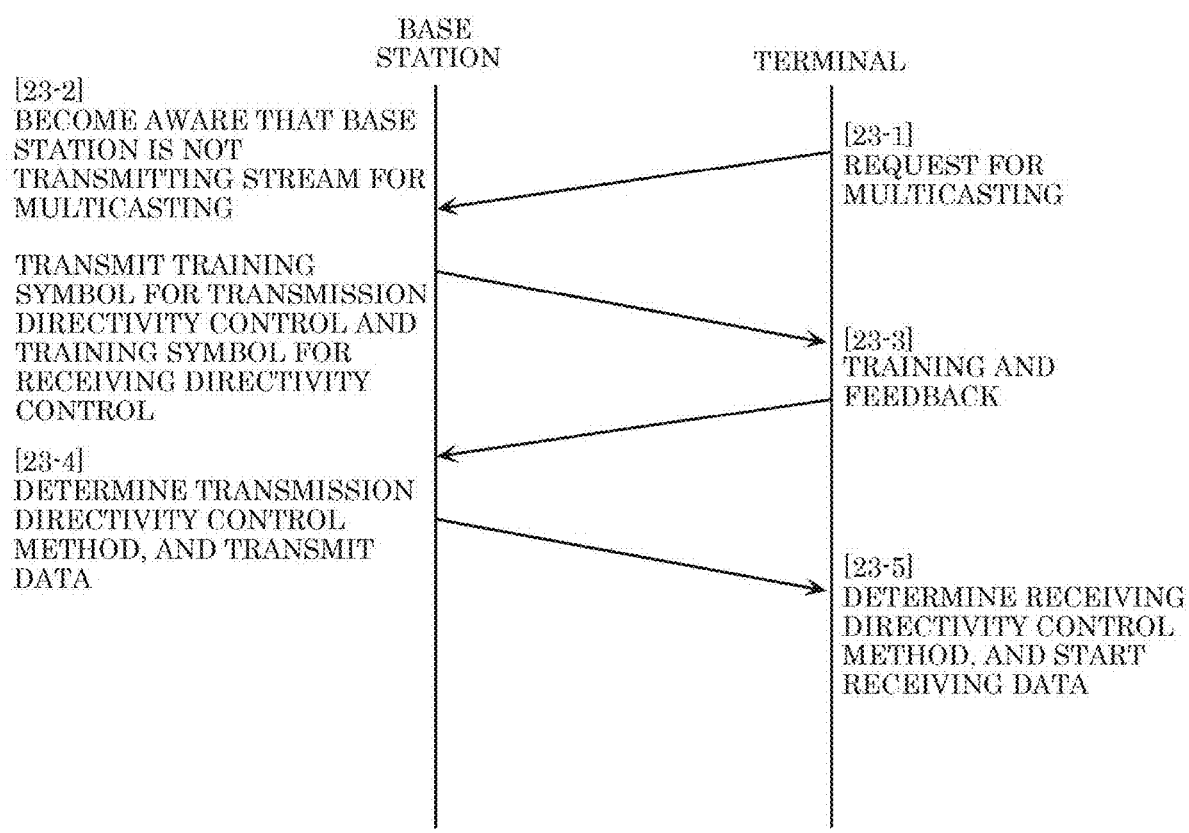
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control.

[23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
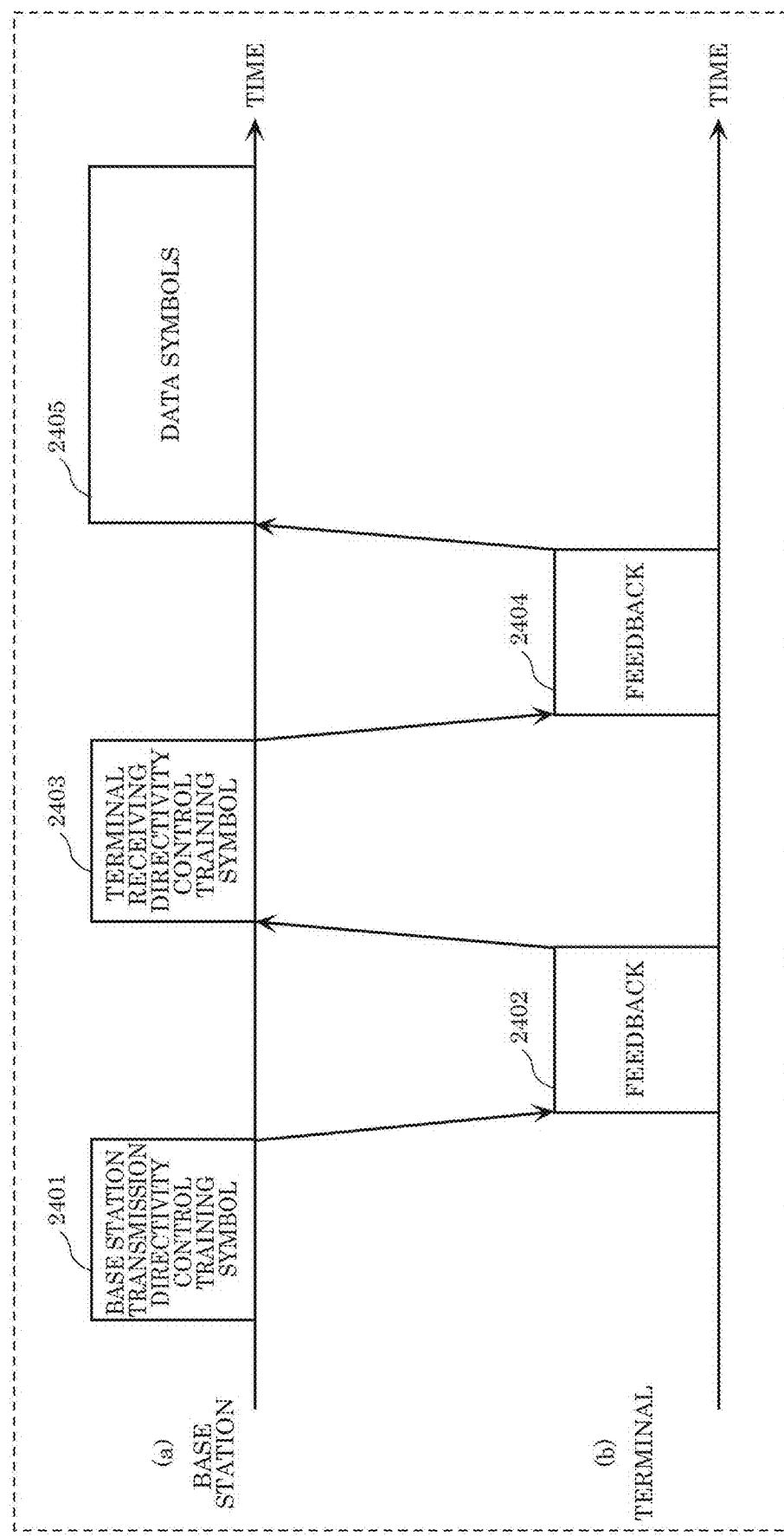
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
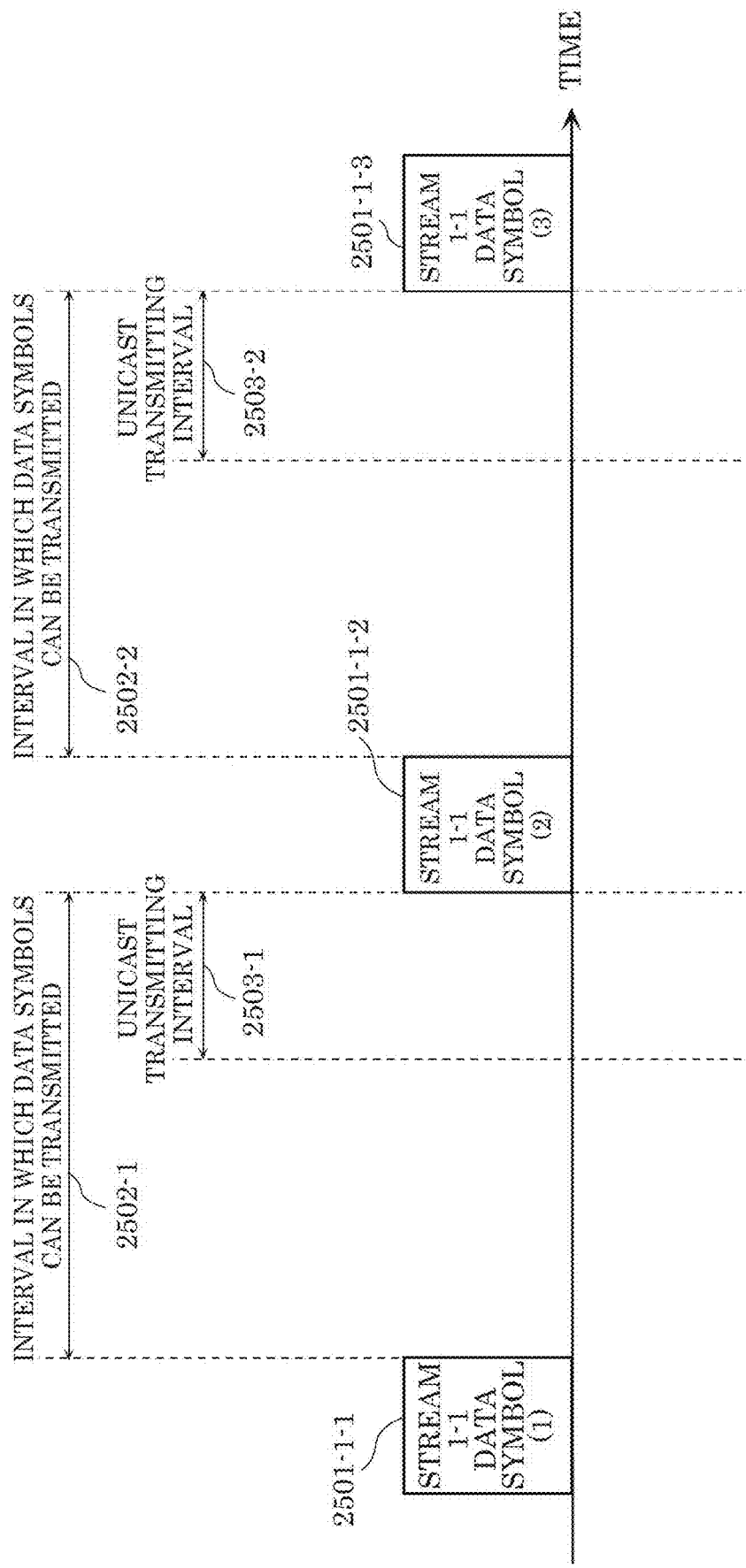
FIG. 25 is a diagram illustrating examples of symbols which the base station transmits.

FIG. 25 illustrates examples of symbols which the base station transmits when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, interval 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, interval 2502-2 in which data symbols can be transmitted is arranged.

After that, the base station transmits a third data symbol for transmission beam 1 for stream 1 (for multicasting) as "stream1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, interval 2502-1 in which data symbols can be transmitted includes unicast transmitting interval 2503-1, and interval 2502-2 in which data symbols can be transmitted includes unicast transmitting interval 2503-2.

In FIG. 25, a frame includes unicast transmitting intervals 2503-1 and 2503-2. For example, in FIG. 25, the base station may transmit symbols for multicasting in an interval within interval 2502-1 in which data symbols can be transmitted and other than unicast transmitting interval 2503-1, and an interval within interval 2502-2 in which data symbols can be transmitted and other than unicast transmitting interval 2503-2. This point will be described later using an example.

Thus, including a unicast transmitting interval in a frame is a useful feature for stably operating a wireless communication system. This point will be later described using an example. Note that the unicast transmitting intervals may not be in the temporal positions as illustrated in FIG. 25, and may be arranged in any temporal positions. Note that in the unicast transmitting intervals, the base station may transmit symbols or the terminal may transmit symbols.

Furthermore, a configuration may be adopted in which the base station can directly set a unicast transmitting interval, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting interval corresponding to 500 Mbps can be set.

Accordingly, a configuration may be adopted in which the base station can indirectly set a unicast transmitting interval. Note that another specific example will be described later.

Note that in accordance with the state in FIG. 22, FIG. 25 illustrates a frame configuration in which "stream 1-1 data symbol (1) (for multicasting)" 2501-1-1, "stream 1-1 data symbol (2) (for multicasting)" 2501-1-2, and "stream 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
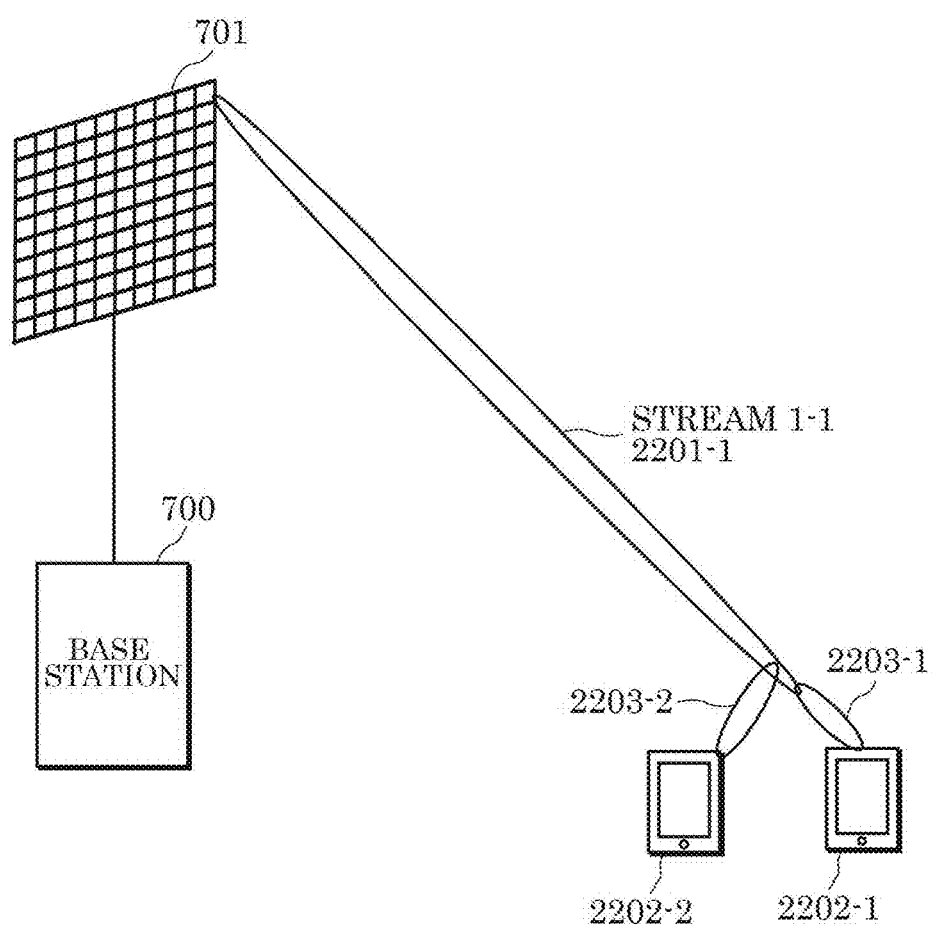
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference numerals.

In FIG. 26, the terminal newly added is 2202-2. Terminal 2202-2 generates receiving directivity 2203-2 by performing directivity control, and receives transmission beam 2201-1 for "stream 1-1 (for multicasting)".

The following describes FIG. 26.

Figure 27:
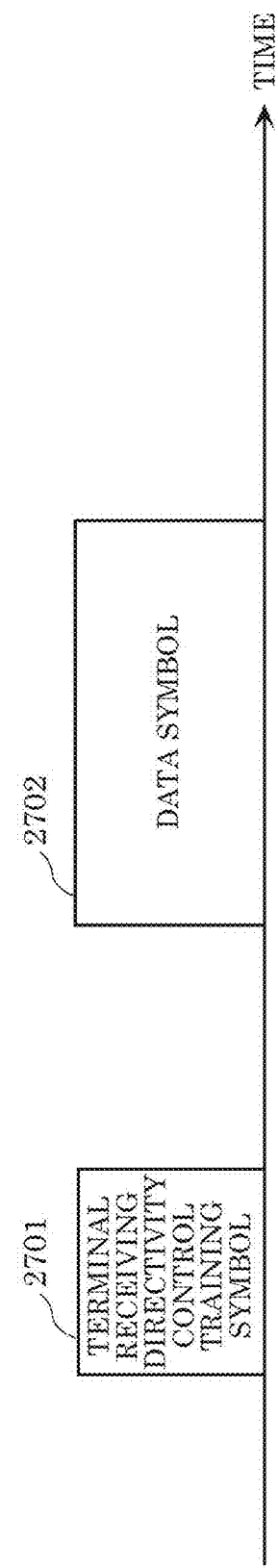
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol" 2701 and "data symbol" 2702, and does not transmit "base station transmission training symbol" illustrated in FIG. 24. Note that in FIG. 27, the horizontal axis indicates time.

Figure 28:
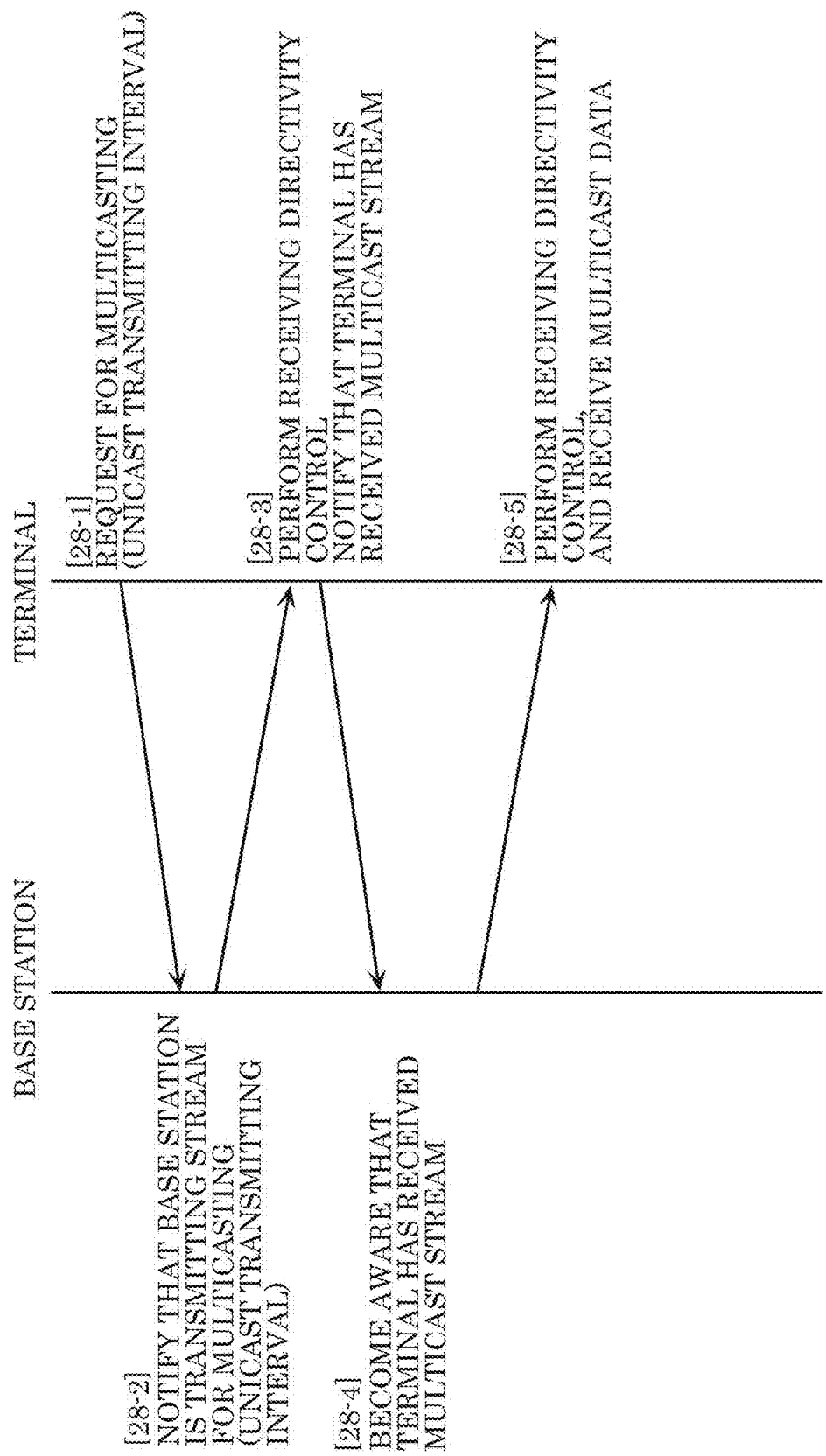
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting interval in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
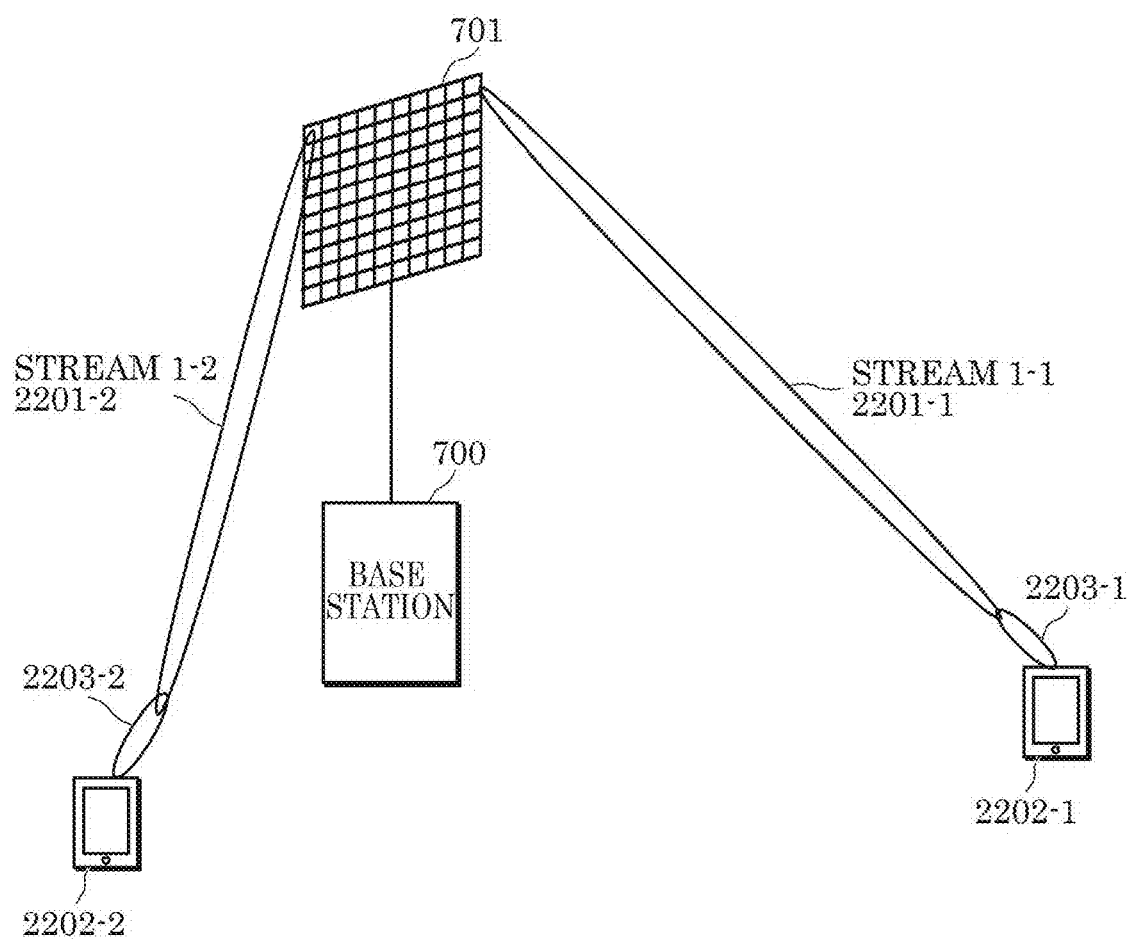
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference numerals.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
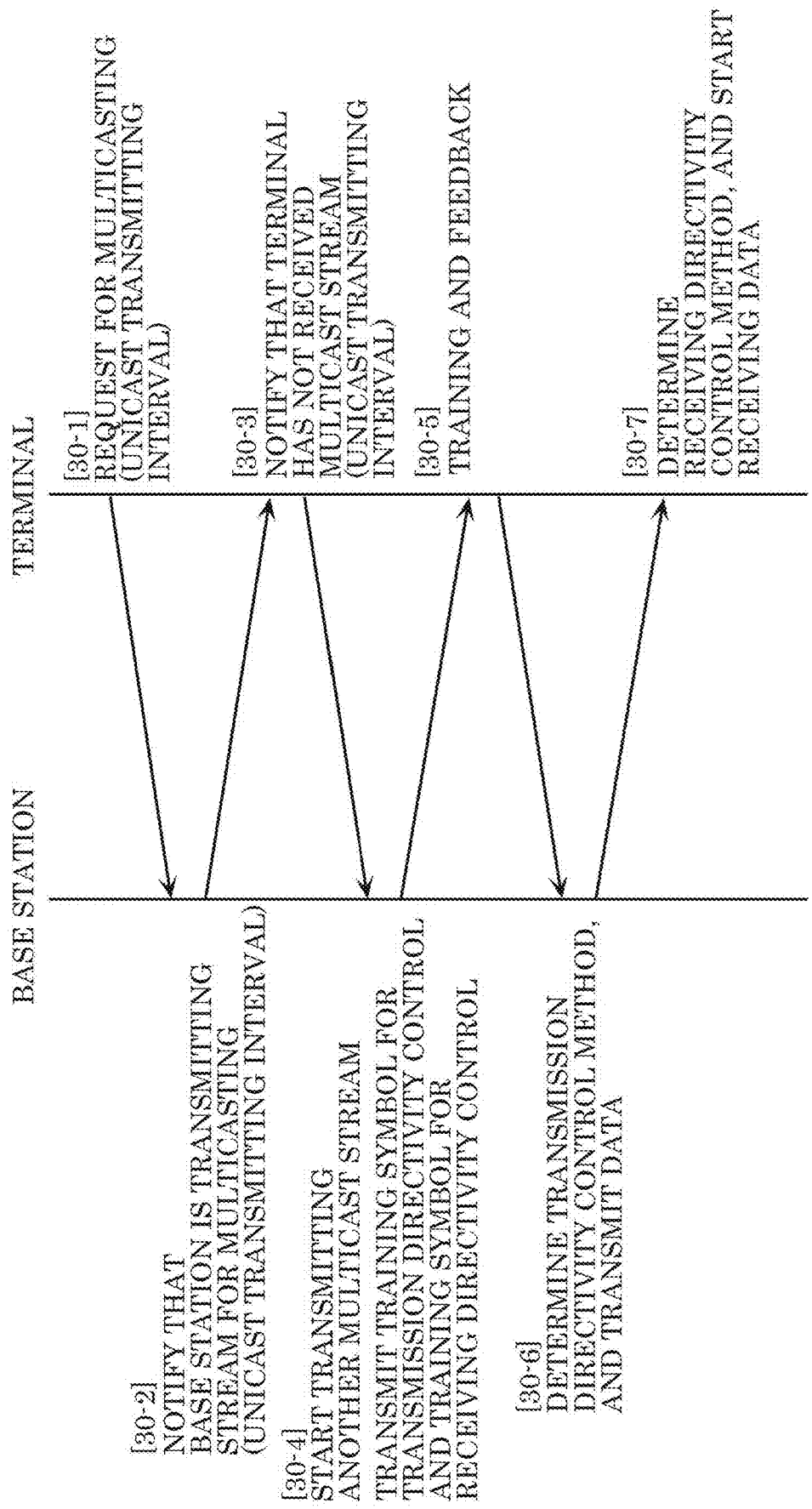
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting interval in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting interval in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . , and 603-L are determined, for example.

Figure 31:
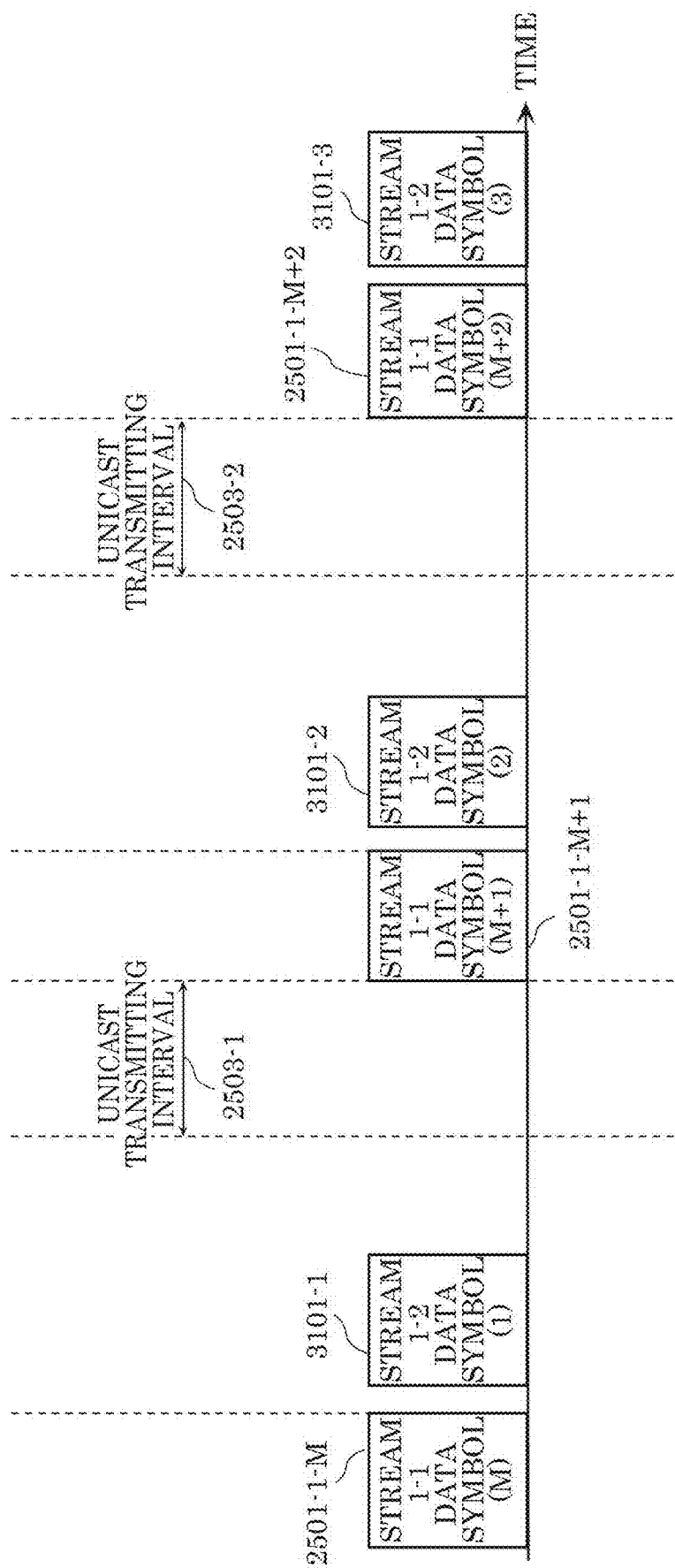
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are present in intervals other than unicast transmitting intervals 2503-1 and 2503-2.

The features are as follows as described above.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
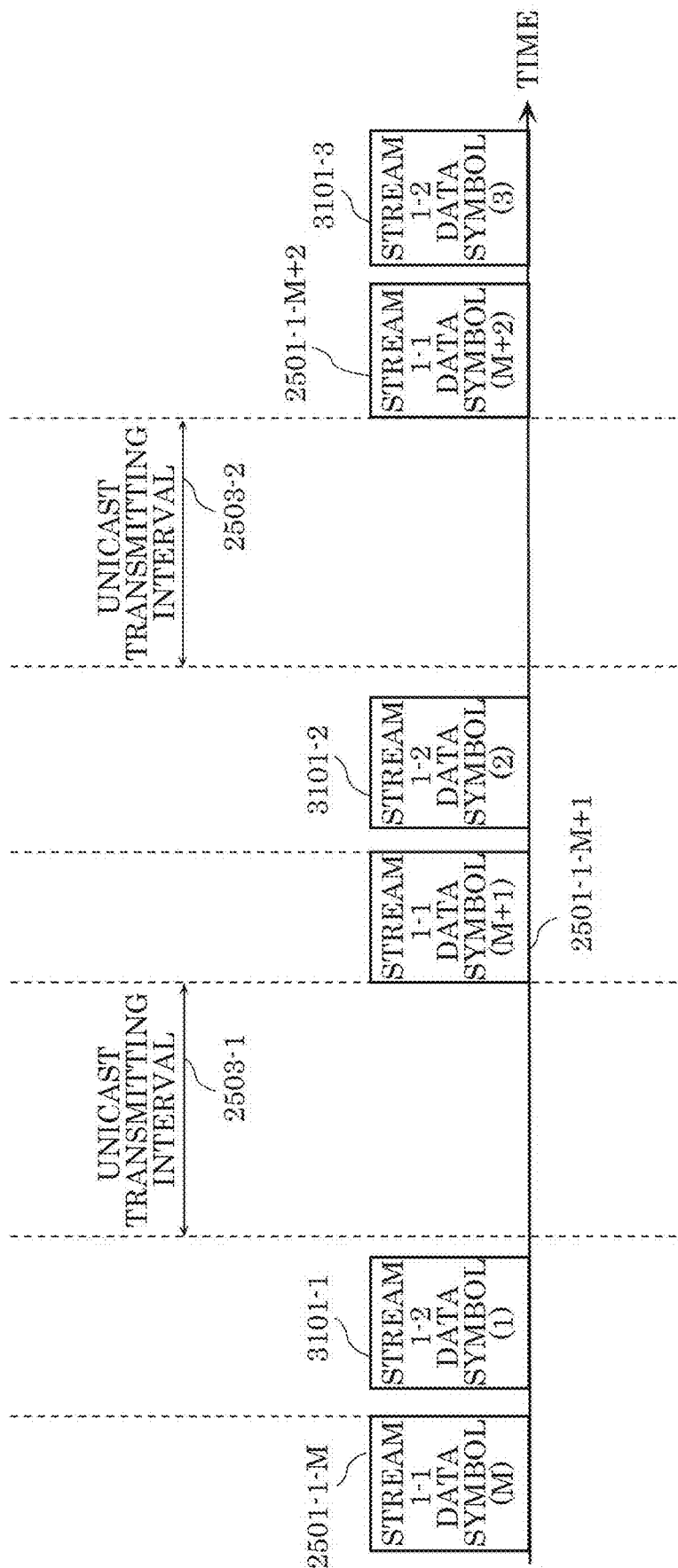
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. 30 is completed", which are different from FIG. 31, where the horizontal axis indicates time. Note that elements which operate in the same manner as in FIGS. 25 and 31 are assigned the same reference numerals in FIG. 32.

Different points in FIG. 32 from FIG. 31 are that unicast transmitting intervals 2503-1 and 2503-2 are set to longer time periods, and thus the base station does not further add and transmit symbols for multicasting.

Figure 33:
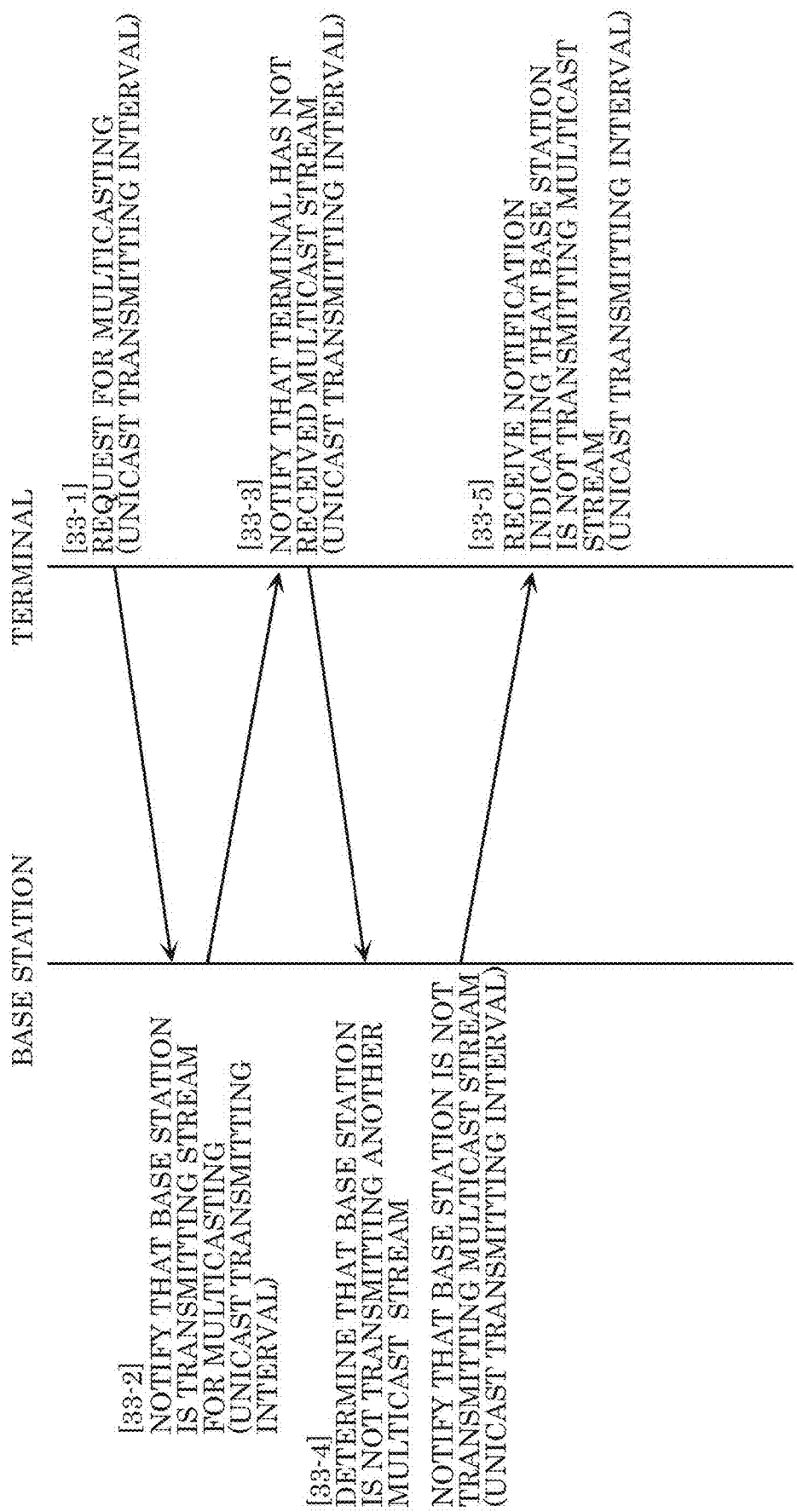
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting interval in FIG. 32.

[33-2] Upon receiving [33-1], the base station notifies terminal 2202-3 that "the base station is transmitting stream 1 for multicasting". Note that the base station transmits the "notification indicating that the base station is transmitting stream 1 for multicasting" in a unicast transmitting interval in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting interval in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting interval in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
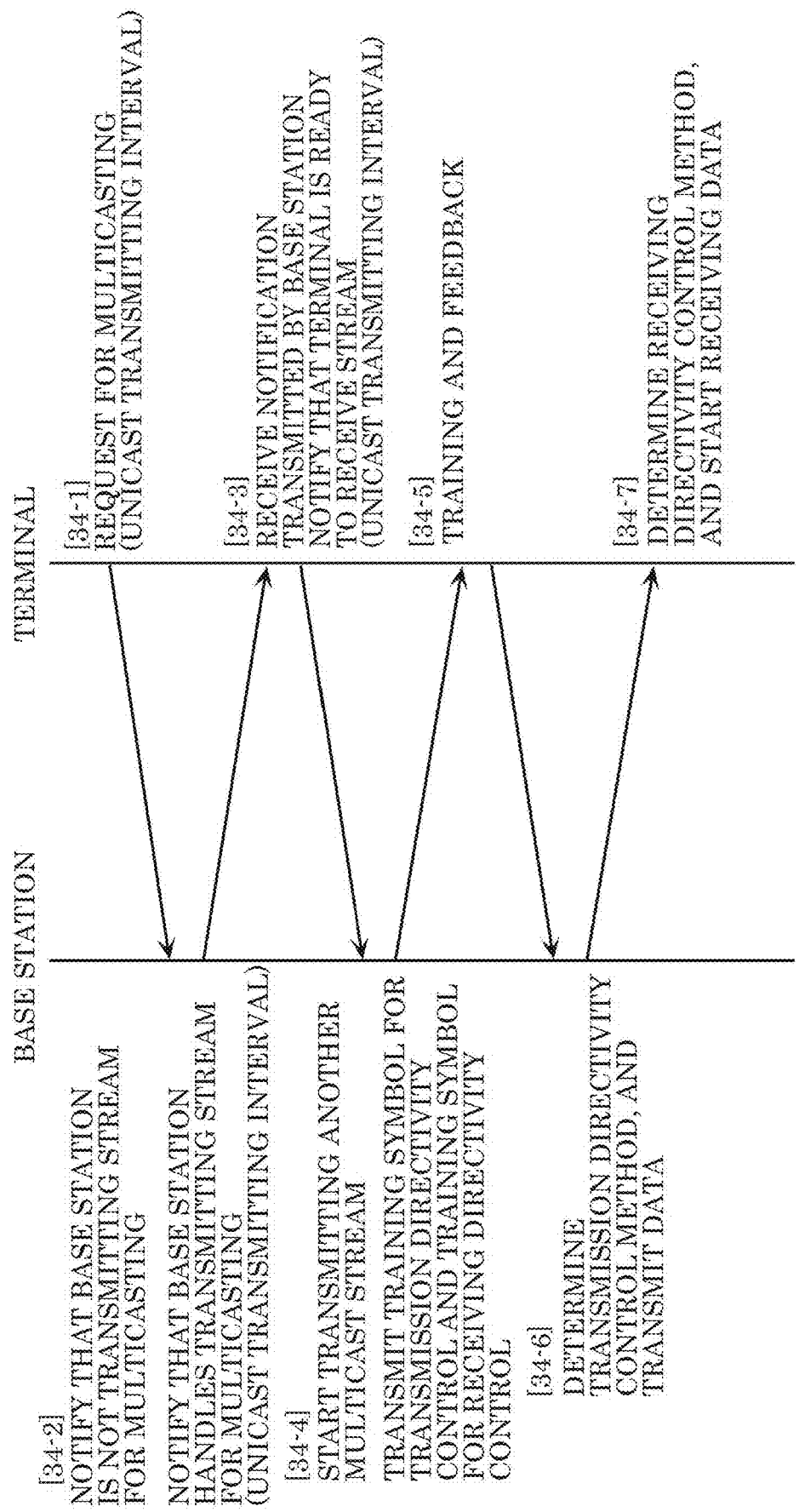
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting interval 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting interval 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting interval 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-5] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, . . . , and 603-L are determined, for example.

Figure 35:
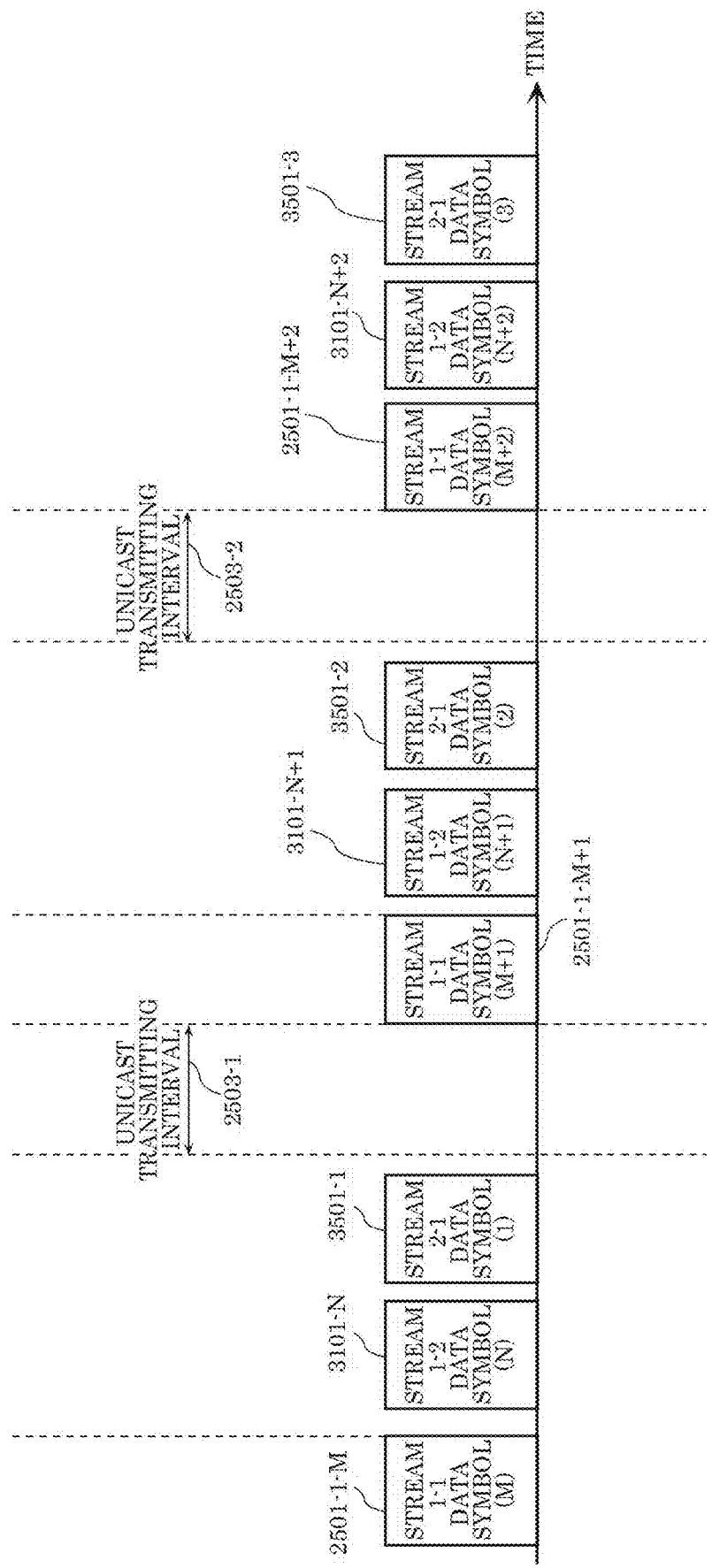
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. In addition, "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are present. Note that N and M are integers of 2 or greater.

As illustrated in FIG. 35, in intervals other than unicast transmitting intervals 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols for transmitting "stream 1".

A terminal obtains "data of stream 1" by obtaining "data symbols for stream 1-1". Further, the terminal obtains "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

"Stream 2-1 data symbol (1) (for multicasting)" 3501-1, "stream 2-1 data symbol (2) (for multicasting)" 3501-2, and "stream 2-1 data symbol (3) (for multicasting)" 3501-3 are data symbols for transmitting "stream 2".

A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. 25 and 31 are assigned the same reference numerals in FIG. 32.

Different points in FIG. 32 from FIG. 35 are that unicast transmitting intervals 2503-1 and 2503-2 are set to longer time periods, and thus the base station does not add and transmit any more symbols for multicasting, that is, for example, symbols for a new stream.

Figure 36:
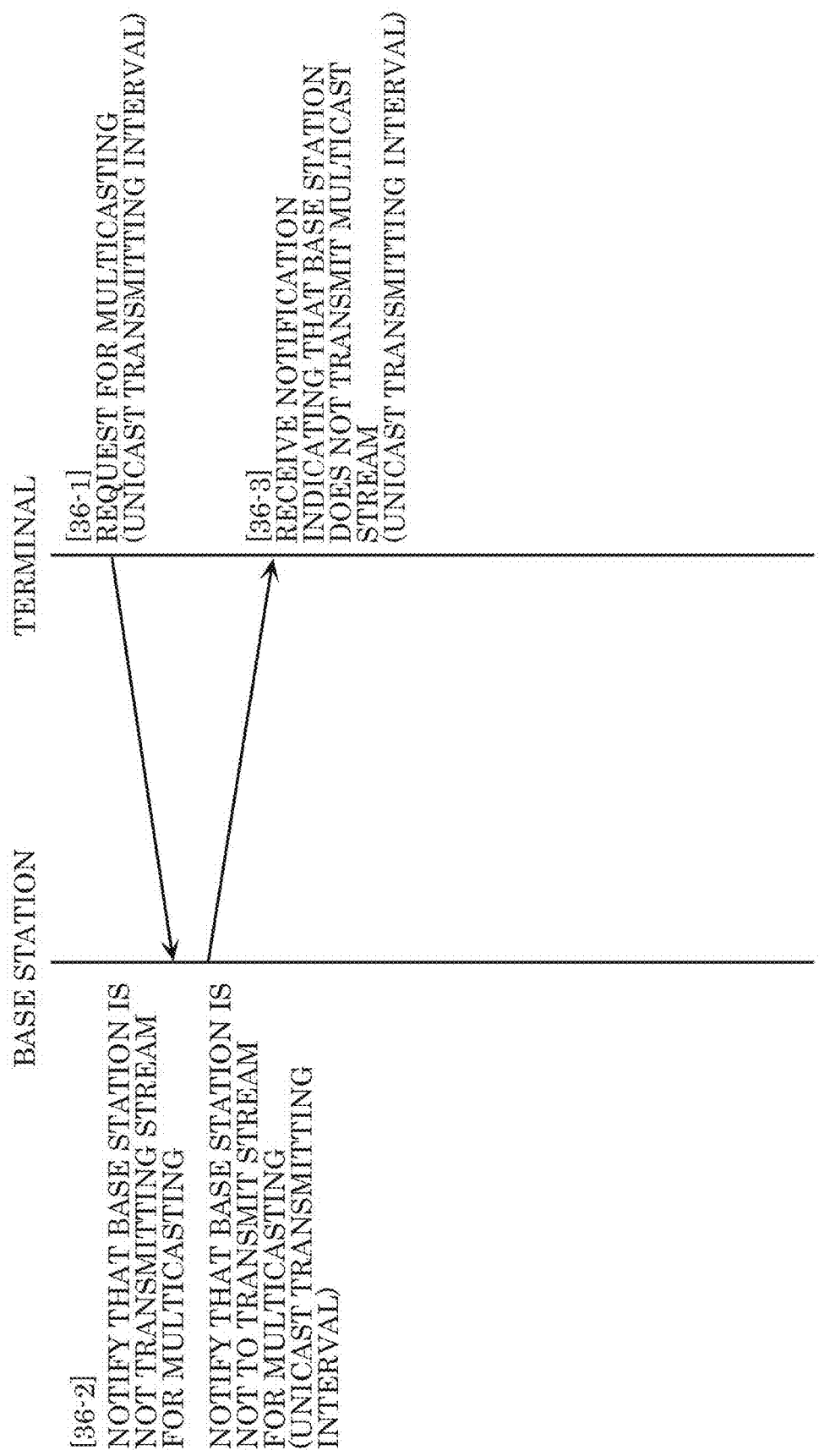
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting interval in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting interval in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting interval in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting intervals 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting interval.

The unicast transmitting intervals may be determined as described above.

Supplementary Information 1

Supplementary information 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits to a plurality of terminals by broadcasting in order to perform data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits to a plurality of terminals by broadcasting in order to perform data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits to a plurality of terminals by broadcasting in order to perform data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits to a plurality of terminals by broadcasting in order to perform data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits to a plurality of terminals by broadcasting in order to perform data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits to a plurality of terminals by broadcasting in order to perform data communication with the plurality of terminals.

Further, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information for broadcast channels, that is, control information which the base station transmits to a plurality of terminals by broadcasting in order to perform data communication with the plurality of terminals.

Further, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits to a plurality of terminals by broadcasting in order to perform data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, (M+2) 2501-1-(M+2), stream 1-2 data symbol (N) 3101-N, stream 1-2 data symbol (N+1) 3101-(N+1), and stream 1-2 data symbol (N+2) 3101-(N+2) are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Information 2

Supplementary information 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 may be data destined for the base station or data destined for a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data destined for the base station or data destined for a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data destined for the base station or data destined for a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data destined for the base station or data destined for a terminal among a plurality of terminals communicating with the base station. At this time, such data may include control information.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data destined for the base station or data destined for a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data destined for the base station or data destined for a terminal among a plurality of terminals communicating with the base station. At this time, such data may include control information.

Note that in FIG. 35, stream 1-1 data symbol (M) 2501-1-M, stream 1-1 data symbol (M+1) 2501-1-(M+1), stream 1-1 data symbol (M+2) 2501-1-(M+2), and stream 1-2 data symbol (N) 3101-N, stream 1-2 data symbol (N+1) 3101-(N+1), stream 1-2 data symbol (N+2) 3101-(N+2), stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Information 3

In a time period in which the base station transmits #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG. 14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol destined for a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Supplementary Information 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

In time periods in which the base station transmits stream 1-1 data symbol (M) 2501-1-M, stream 1-1 data symbol (M+1) 2501-1-(M+1), and stream 1-1 data symbol (M+2) 2501-1-(M+2) as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1-(M+1), and stream 1-1 data symbol (M+2) 2501-1-(M+2), the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3".

Note that in FIGS. 31 and 32, the same also applies to the case where the horizontal axis indicates frequency in FIGS. 31 and 32, and in time periods in which the base station transmits stream 1-2 data symbol (1) 3101-1, stream 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-(M+1), and stream 1-1 data symbol (M+2) 2501-(M+2) as shown in the frame configuration in FIG. 35, the base station may transmit another symbol group using a transmission beam different from transmission beams for transmitting "stream 1-1 data symbol (M) 2501-1-M, stream 1-1 data symbol (M+1) 2501-(M+1), and stream 1-1 data symbol (M+2) 2501-(M+2)".

Note that in FIG. 35, the same also applies to the case where the horizontal axis indicates frequency, and in time periods in which the base station transmits stream 1-1 data symbol (M) 2501-1-M, stream 1-1 data symbol (M+1) 2501-(M+1), and stream 1-1 data symbol (M+2) 2501-(M+2), the base station may transmit another symbol group using a transmission beam different from "transmission beams for transmitting stream 1-1 data symbol (M) 2501-1-M, stream 1-1 data symbol (M+1) 2501-(M+1), and stream 1-1 data symbol (M+2) 2501-(M+2)".

In time periods in which the base station transmits stream 1-2 data symbol (N) 3101-N, stream 1-2 data symbol (N+1) 3101-(N+1), and stream 1-2 data symbol (N+2) 3101-(N+2) as shown in the frame configuration in FIG. 35, the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

Note that the same also applies to the case where the horizontal axis indicates frequency in FIG. 35, and in time periods in which the base station transmits stream 1-2 data symbol (N) 3101-N, stream 1-2 data symbol (N+1) 3101-(N+1), and stream 1-2 data symbol (N+2) 3101-(N+2), the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol destined for a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting intervals 2503-1 and 2503-2 as illustrated in FIGS. 25, 31, 32, and 35 may not be set.

Supplementary Information 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below.

<Method 1-1>
Stream 1-1 data symbol (M) 2501-1-M and stream 1-2 data symbol (N) 3101-N include the same data.
Then, stream 1-1 data symbol (M+1) 2501-1-(M+1) and stream 1-2 data symbol (N+1) 3101-(N+1) include the same data.
Stream 1-1 data symbol (M+2) 2501-1-(M+2) and stream 1-2 data symbol (N+2) 3101-(N+2) include the same data.

<Method 1-2>
Stream 1-2 data symbol (L) 3101-L which includes the same data as the data included in stream 1-1 data symbol (K) 2501-1-K is present. Note that K and L are integers.

<Method 2-1>
Stream 1-1 data symbol (M) 2501-1-M and stream 1-2 data symbol (N) 3101-N include the same data in part.
Then, stream 1-1 data symbol (M+1) 2501-1-(M+1) and stream 1-2 data symbol (N+1) 3101-(N+1) include the same data in part.
Stream 1-1 data symbol (M+2) 2501-1-(M+2) and stream 1-2 data symbol (N+2) 3101-(N+2) include the same data in part.

<Method 2-2>
Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2)" in FIG. 35 may be symbols which include data symbols destined for a certain terminal, symbols which include a control information symbol, or symbols which include a data symbol for multicasting.

Embodiment 4

The present embodiment is to describe specific examples of the communication system described in Embodiments 1 to 3.

The communication system according to the present embodiment includes a base station (or a plurality of base stations) and a plurality of terminals. For example, consider a communication system which includes, for instance, base station 700 as illustrated in, for instance, FIGS. 7, 12, 17, 19, 20, 26, and 29 and terminals 704-1 and 704-2.

Figure 37:
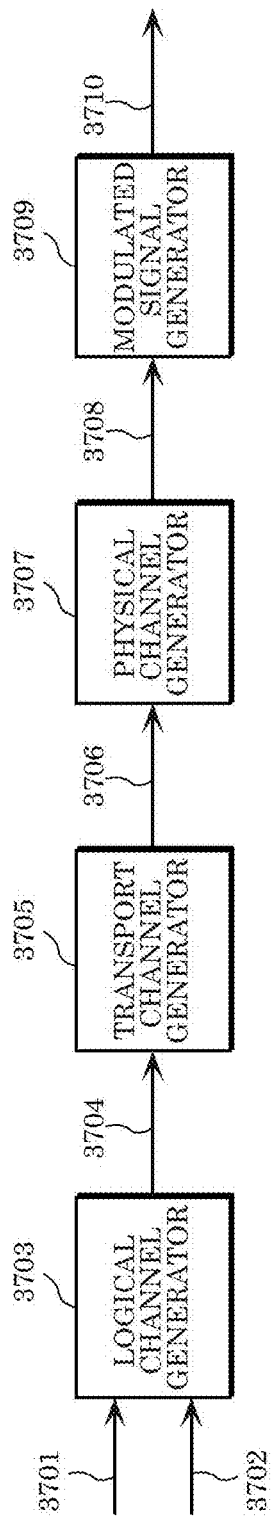
FIG. 37 illustrates an example of a configuration of the base station.

FIG. 37 illustrates an example of a configuration of a base station (700).

Logical channel generator 3703 receives inputs of data 3701 and control data 3702, and outputs logical channel signal 3704. For example, the channel for logical channel signal 3704 is constituted by at least one of "a broadcast control channel (BCCH), a paging control channel (PCCH), a common control channel (CCCH), a multicast control channel (MCCH), and a dedicated control channel (DCCH)" which are logical channels for control, and "a dedicated traffic channel (DTCH) and a multicast traffic channel (MTCH)" which are logical channels for data.

Note that "a BCCH is a downlink channel for informing system control information", "a PCCH is a downlink channel for paging information", "a CCCH is a downlink common control channel used when radio resource control (RRC) connection is not present", "an MCCH is a point-to-multipoint downlink control channel for multicast channel scheduling for multimedia broadcast multicast service (MBMS)", "a DCCH is a downlink dedicated control channel used by a terminal with RRC connection", "a DTCH is a downlink dedicated traffic channel of a user equipment (UE) terminal or a downlink user-data dedicated channel", and "an MTCH is a point-to-multipoint downlink channel for MBMS user data".

Transport channel generator 3705 receives inputs of logical channel signal 3704, and generates and outputs transport channel signal 3706. The channel for transport channel signal 3706 is constituted by, for example, at least one of a broadcast channel (BCH), a downlink shared channel (DL-SCH), a paging channel (PCH), and a multicast channel (MCH), for instance.

Note that "a BCH is a channel for system information notified throughout the entire cell", "a DL-SCH is a channel for which user data, control information, and system information are used", "a PCH is a channel for paging information notified throughout the entire cell", and "an MCH is a control channel for MBMS traffic notified throughout the entire cell".

Physical channel generator 3707 receives inputs of transport channel signal 3706, and generates and outputs physical channel signal 3708. The channel for physical channel signal 3708 is constituted by, for example, at least one of a physical broadcast channel (PBCH), a physical multicast channel (PMCH), a physical downlink shared channel (PDSCH), and a physical downlink control channel (PDCCH), for instance.

Note that "a PBCH is for BCH transport channel transmission", "a PMCH is for MCH transport channel transmission", "a PDSCH is for DL-SCH and transport channel transmission", and "a PDCCH is for transmission of downlink Layer 1 (L1)/Layer 2 (L2) control signal".

Modulated signal generator 3709 receives inputs of physical channel signal 3708, and generates and outputs modulated signal 3710 based on physical channel signal 3708. Then, base station 700 transmits modulated signal 3710 as a radio wave.

First, consider the case where the base station performs unicast communication with the plurality of terminals, or in other words, communicates separately with the plurality of terminals.

At this time, for example, the channels for symbol group #1 for stream 1 indicated by 901-1, symbol group #2 for stream 1 indicated by 901-2, and symbol group #3 for stream 1 indicated by 901-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Here, broadcast channels are to be described. A broadcast channel corresponds to a "PBCH", a "PMCH", or "a portion of a PD-SCH" among physical channels (for physical channel signal 3708).

A broadcast channel corresponds to a "BCH", "a portion of a DL-SCH", "a PCH", or "a MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

Similarly, for example, the channels for symbol group #1 for stream 2 indicated by 902-1, symbol group #2 for stream 2 indicated by 902-2, and symbol group #3 for stream 2 indicated by 902-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among physical channels (for physical channel signal 3708).

Further, a broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

At this time, features of symbol group #1 for stream 1 indicated by 901-1, symbol group #2 for stream 1 indicated by 901-2, and symbol group #3 for stream 1 indicated by 901-3 in FIG. 9 are as described in the above embodiments, and furthermore, features of symbol group #1 for stream 2 indicated by 902-1, symbol group #2 for stream 2 indicated by 902-2, and symbol group #3 for stream 2 indicated by 902-3 in FIG. 9 are as described in the above embodiments.

Note that stream 2 may not be transmitted since symbol group #1 for stream 2 (902-1), symbol group #2 for stream 2 (902-2), and symbol group #3 for stream 2 (902-3) in FIG. 9 are not transmitted. In particular, when a signal having a broadcast channel is transmitted, the base station may not transmit a symbol group for stream 2 (at this time, base station 701 does not transmit 703-1, 703-2, and 703-3 in FIG. 7, for example).

For example, symbol group #1 for modulated signal 1 indicated by 1401-1, symbol group #2 for modulated signal 1 indicated by 1401-2, and symbol group #3 for modulated signal 1 indicated by 1401-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

A broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, symbol group #1 for modulated signal 2 indicated by 1402-1, symbol group #2 for modulated signal 2 indicated by 1402-2, and symbol group #3 for modulated signal 2 indicated by 1402-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of symbol group #1 for modulated signal 1 indicated by 1401-1, symbol group #2 for modulated signal 1 indicated by 1401-2, and symbol group #3 for modulated signal 1 indicated by 1401-3 in FIG. 14 are as described in the above embodiments, and symbol group #1 for modulated signal 2 indicated by 1402-1, symbol group #2 for modulated signal 2 indicated by 1402-2, and symbol group #3 for modulated signal 2 indicated by 1402-3 in FIG. 14 are as described in the above embodiments.

For example, stream 1-1 data symbol (1) indicated by 2501-1-1, stream 1-1 data symbol (2) indicated by 2501-1-2, and stream 1-1 data symbol (3) indicated by 2501-1-3 in FIG. 25 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (1) indicated by 2501-1-1, stream 1-1 data symbol (2) indicated by 2501-1-2, and stream 1-1 data symbol (3) indicated by 2501-1-3 in FIG. 25 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channels corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, stream 2-1 data symbol (1) indicated by 3501-1, stream 2-1 data symbol (2) indicated by 3501-2, and stream 2-1 data symbol (3) indicated by 3501-3 in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 are as described in the above embodiments, and features of stream 2-1 data symbol (1) indicated by 3501-1, stream 2-1 data symbol (2) indicated by 3501-2, and stream 2-1 data symbol (3) indicated by 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Note that the symbol groups for stream 1 in FIG. 9 may include data to be transmitted to a single terminal (unicast data) (or one or more symbols). Similarly, the symbol groups for stream 2 in FIG. 9 may include data to be transmitted to a single terminal (unicast data) (or one or more symbols).

Note that the symbol groups for stream 1 in FIG. 14 may include data to be transmitted to a single terminal (unicast data) (or one or more symbols). Similarly, the symbol groups for stream 2 in FIG. 14 may include data to be transmitted to a single terminal (unicast data) (or one or more symbols).

Note that the symbols for stream 1-1 in FIG. 25 may include data to be transmitted to a single terminal (unicast data) (or one or more symbols). The symbols for stream 1-1 and stream 1-2 in FIGS. 31 and 32 may include data to be transmitted to a single terminal (unicast data) (or one or more symbols).

A PBCH may have a configuration of "being used to transmit minimum information (including a system bandwidth, a system frame number, and the number of transmission antennas) which a UE is to read first after cell searching", for example.

A PMCH may have a configuration of "being used to utilize a multicast-broadcast single-frequency network (MBSFN), for example".

A PDSCH may have a configuration of "being, for example, a shared downlink data channel for transmitting user data and for collectively transmitting all data, irrespective of C-plane (control plane) and U-plane (user plane)".

A PDCCH may have a configuration of "being used to notify, for example, a user selected by eNodeB (gNodeB) (base station) through scheduling of information indicating allocation of radio resources".

Through the above implementation, in multicast and broadcast data transmission, the base station transmits data symbols and control information symbols using a plurality of transmission beams, and a terminal selectively receives a transmission beam with good quality among the plurality of transmission beams and receives data symbols based on the received transmission beam, thus achieving advantageous effects that the terminal can achieve high data receiving quality.

Embodiment 5

The present embodiment gives a supplemental description of configurations of the symbol groups for stream 1 and the symbol groups for stream 2 in FIG. 9 which a base station (700) transmits.

Figure 38:
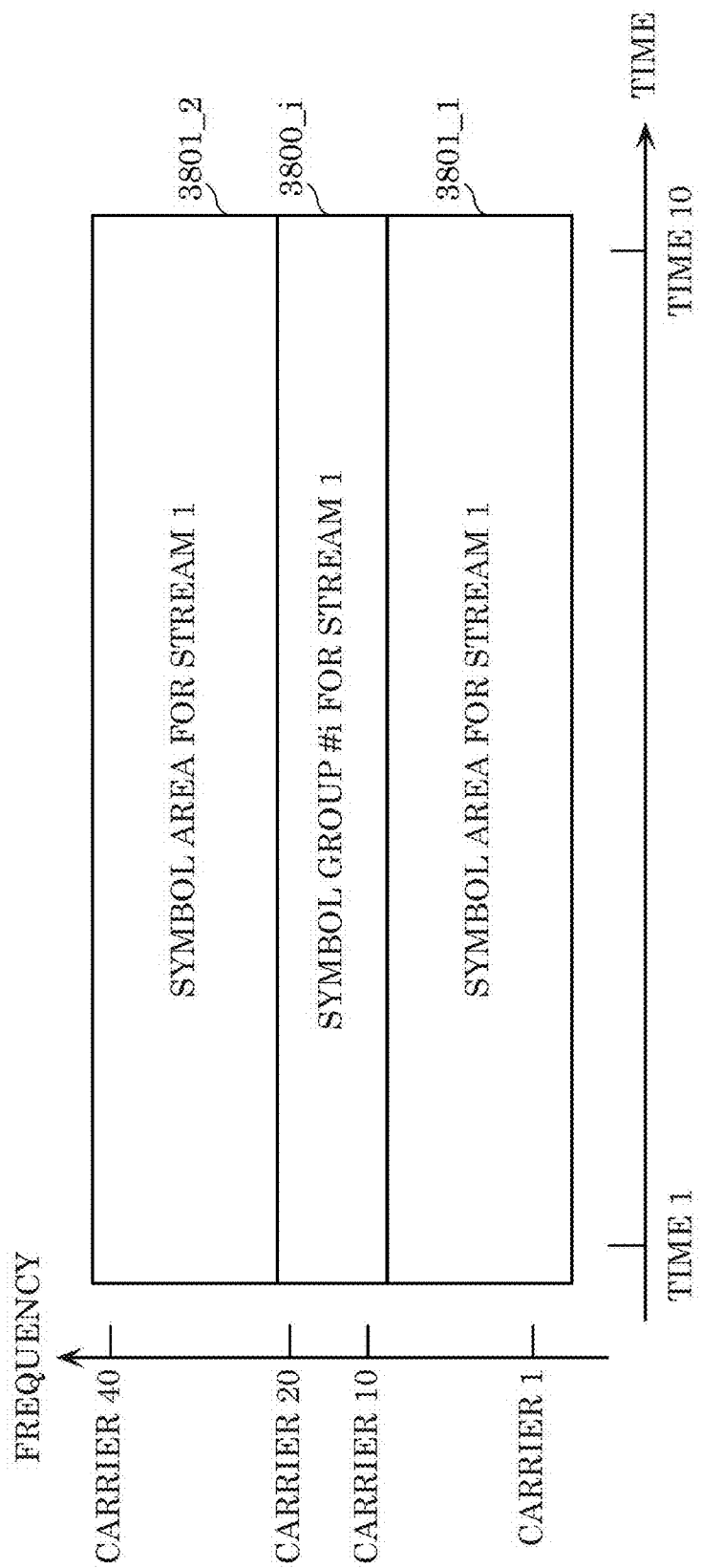
FIG. 38 illustrates an example of a frame configuration.

FIG. 38 illustrates an example of a frame configuration for stream 1 which the base station (700) transmits, the horizontal axis indicates time and the vertical axis indicates frequency in the frame configuration in FIG. 38, and the frame configuration from time 1 to time 10 and carrier 1 to carrier 40 is illustrated. Accordingly, FIG. 38 illustrates a frame configuration according to a multi-carrier transmission method such as the orthogonal frequency division multiplexing (OFDM) method.

Symbol area 3801_1 for stream 1 in FIG. 38 is present from time 1 to time 10 and from carrier 1 to carrier 9.

Symbol group #i (3800_i) for stream 1 is present from time 1 to time 10 and from carrier 10 to carrier 20. Note that symbol group #i (3800_i) for stream 1 corresponds to symbol group #i (901-i) for stream 1 in FIG. 9.

Symbol area 3801_2 for stream 1 is present from time 1 to time 10 and from carrier 21 to carrier 40.

At this time, for example, as described in Embodiment 4, for instance, when the base station transmits (unicasts), to one or more terminals, data therefor, symbol areas 3801_1 and 3801_2 for stream 1 in FIG. 38 can be used.

Symbol group #i (3800_i) for stream 1 in FIG. 38 is to be used by the base station to transmit data for multicasting, as described in, for instance, Embodiments 1 and 4.

Figure 39:
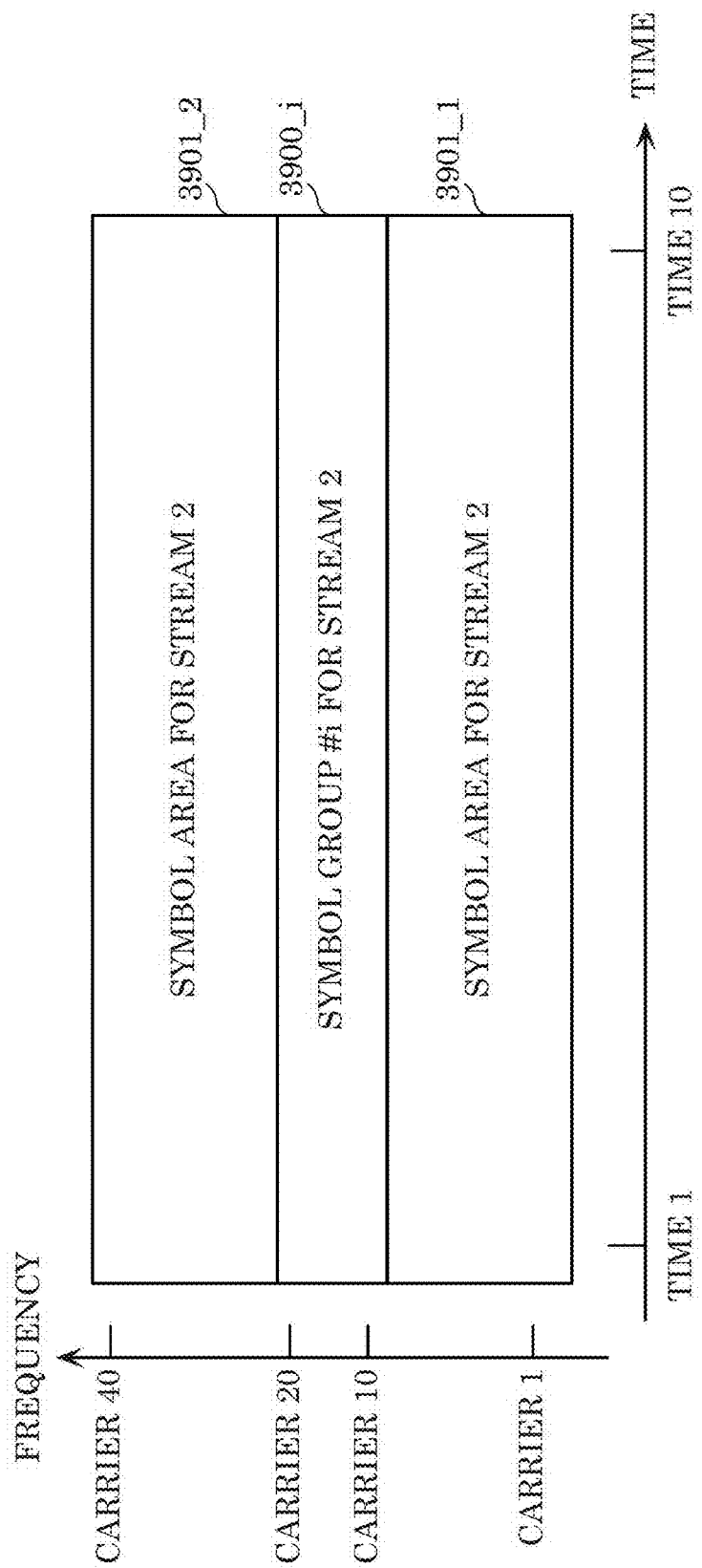
FIG. 39 illustrates an example of a frame configuration.

FIG. 39 illustrates an example of a frame configuration for stream 2 which the base station (700) transmits, the horizontal axis indicates time and the vertical axis indicates frequency in the frame configuration in FIG. 39, and the frame configuration from time 1 to time 10 and carrier 1 to carrier 40 is illustrated. Accordingly, FIG. 39 illustrates a frame according to a multi-carrier transmission method such as the OFDM method.

Symbol area 3901_1 for stream 2 in FIG. 39 is present from time 1 to time 10 and from carrier 1 to carrier 9.

Symbol group #i (3900_i) for stream 2 is present from time 1 to time 10 and from carrier 10 to carrier 20. Note that symbol group #i (3900_i) for stream 2 corresponds to symbol group #i (902-i) for stream 2 in FIG. 9.

Symbol area 3901_2 for stream 2 is present from time 1 to time 10 and from carrier 21 to carrier 40.

At this time, for example, as described in Embodiment 4, for instance, when the base station transmits (unicasts), to one or more terminals, data therefor, symbol areas 3901_1 and 3901_2 for stream 2 in FIG. 39 can be used.

Symbol group #i (3900_i) for stream 2 in FIG. 39 is to be used by the base station to transmit data for multicasting, as described in Embodiments 1 and 4, for instance.

Note that the base station transmits, using the same frequency at the same time, a symbol at time X (in the case of FIG. 38, X is an integer in a range from 1 to 10) and carrier Y (in the case of FIG. 38, Y is an integer in a range from 1 to 40) in FIG. 38, and a symbol at time X and carrier Y in FIG. 39.

Features of symbol group #1 for stream 1 indicated by 901-1, symbol group #2 for stream 1 indicated by 901-2, and symbol group #3 for stream 1 indicated by 901-3 in FIG. 9 are as described in the above embodiments. Thus, the features of symbol group #i for stream 1 in FIG. 38 are the same as the features of the symbol groups for stream 1 in FIG. 9, and are as described in the above embodiments.

Further, features of symbol group #1 for stream 2 indicated by 902-1, symbol group #2 for stream 2 indicated by 902-2, and symbol group #3 for stream 2 indicated by 902-3 in FIG. 9 are as described in the above embodiments. Specifically, the features of symbol group #i for stream 2 in FIG. 39 are the same as the features of the symbol groups for stream 2 in FIG. 9, and are as described in the above embodiments.

Note that if symbols are present after time 11 from carrier 10 to carrier 20 in the frame configuration in FIGS. 38 and 39, the symbols may be used for multicast transmission or dedicated data transmission (unicast transmission).

If the base station transmits a frame as in FIG. 9 using the frame configuration in FIG. 38 or 39, implementation described in Embodiments 1 and 4 may be performed similarly.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 6

The present embodiment gives a supplemental description of the configurations of the symbol groups for modulated signal 1 and the symbol groups for modulated signal 2 in FIG. 14 that a base station (700) transmits.

Figure 40:
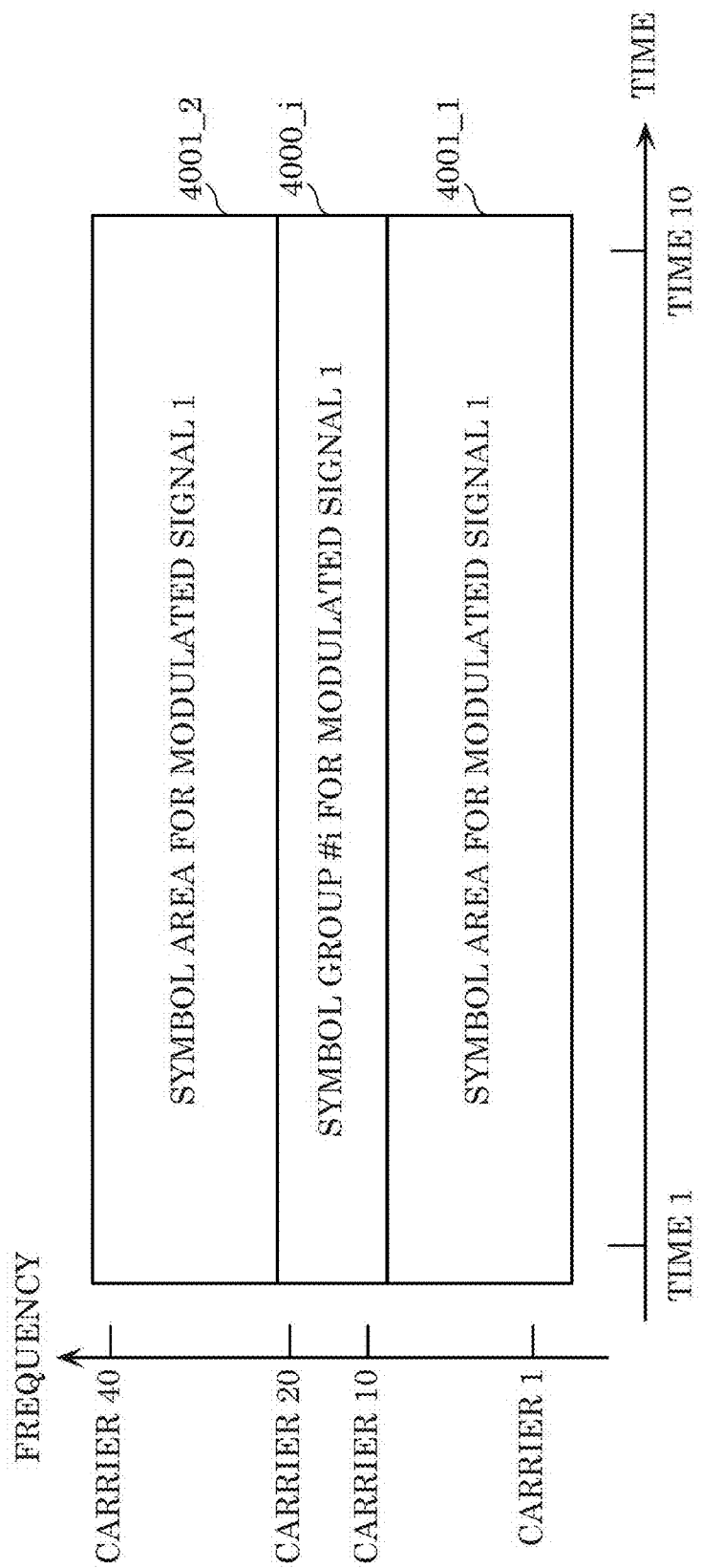
FIG. 40 illustrates an example of a frame configuration.

FIG. 40 illustrates an example of a frame configuration for modulated signal 1 which the base station (700) transmits, the horizontal axis indicates time and the vertical axis indicates frequency in the frame configuration in FIG. 40, and the frame configuration from time 1 to time 10 and carrier 1 to carrier 40 is illustrated. Accordingly, FIG. 40 illustrates a frame configuration according to a multi-carrier transmission method such as the orthogonal frequency division multiplexing (OFDM) method.

Symbol area 4001_1 for modulated signal 1 in FIG. 40 is present from time 1 to time 10 and from carrier 1 to carrier 9.

Symbol group #i (4000_i) for modulated signal 1 is present from time 1 to time 10 and from carrier 10 to carrier 20. Note that symbol group #i (4000_i) for modulated signal 1 corresponds to symbol group #i (1401-i) for modulated signal 1 in FIG. 14.

Symbol area 4001_2 for modulated signal 1 is present from time 1 to time 10 and from carrier 21 to carrier 40.

At this time, for example, as described in Embodiment 4, for instance, when the base station transmits (unicasts), to one or more terminals, data therefor, symbol areas 4001_1 and 4001_2 for stream 1 in FIG. 40 can be used.

Then, symbol group #i (4000_i) for modulated signal 1 in FIG. 40 is to be used by the base station to transmit data for multicasting, as described in Embodiments 1 and 4, for instance.

Figure 41:
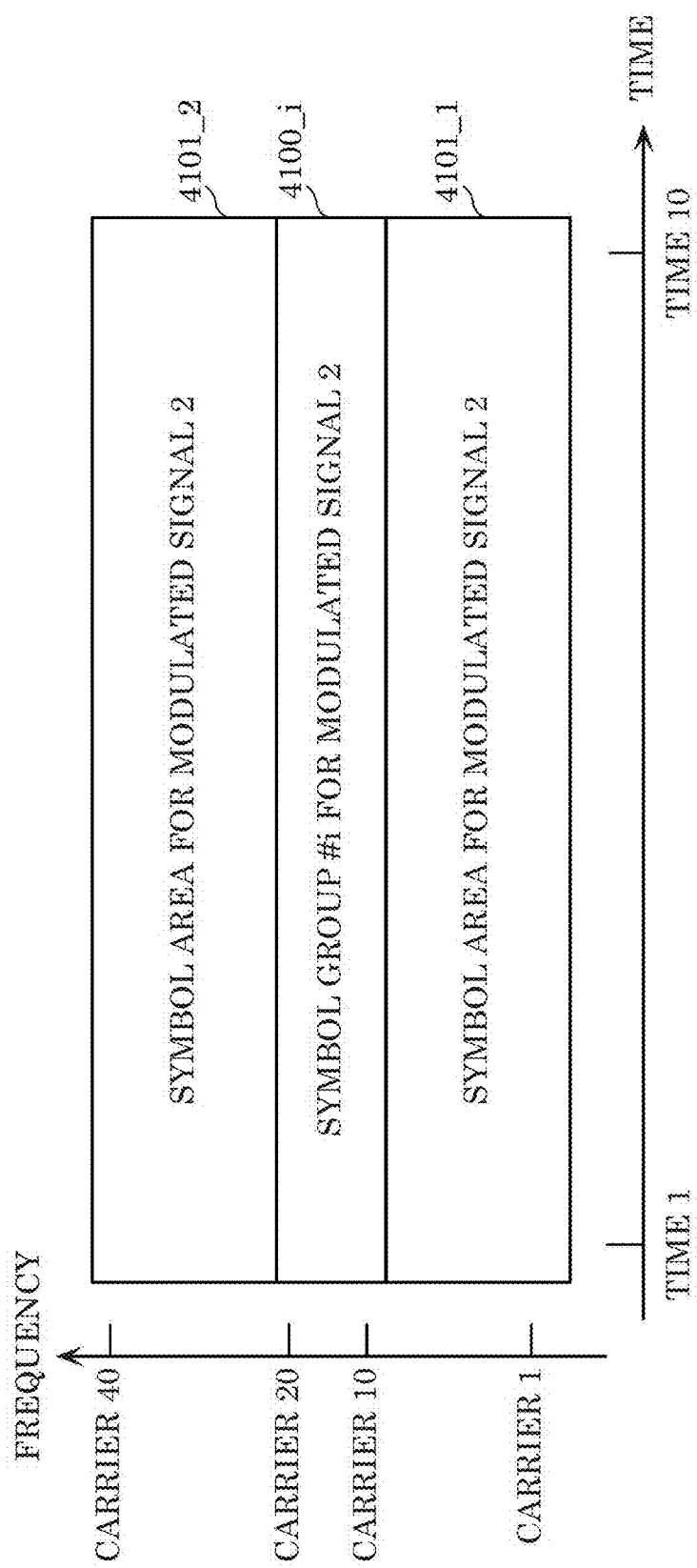
FIG. 41 illustrates an example of a frame configuration.

FIG. 41 illustrates an example of a frame configuration for modulated signal 2 which the base station (700) transmits, the horizontal axis indicates time and the vertical axis indicates frequency in the frame configuration in FIG. 41, and the frame configuration from time 1 to time 10 and carrier 1 to carrier 40 is illustrated. Accordingly, FIG. 41 illustrates a frame according to a multi-carrier transmission method such as the OFDM system.

Symbol area 4101_1 for modulated signal 2 in FIG. 41 is present from time 1 to time 10 and from carrier 1 to carrier 9.

Symbol group #i (4100_i) for modulated signal 2 is present from time 1 to time 10 and from carrier 10 to carrier 20. Note that symbol group #i (4100_i) for modulated signal 2 corresponds to symbol group #i (1402-i) for modulated signal 2 in FIG. 14.

Symbol area 4101_2 for modulated signal 2 is present from time 1 to time 10 and from carrier 21 to carrier 40.

At this time, for example, as described in Embodiment 4, for instance, when the base station transmits (unicasts), to one or more terminals, data therefor, symbol areas 4101_1 and 4101_2 for modulated signal 2 in FIG. 41 can be used.

Then, symbol group #i (4100_i) for modulated signal 2 in FIG. 41 is to be used by the base station to transmit data for multicasting, as described in Embodiments 1 and 4, for instance.

Note that the base station transmits, using the same frequency at the same time, a symbol at time X (in the case of FIG. 40, X is an integer in a range from 1 to 10) and carrier Y (in the case of FIG. 40, Y is an integer in a range from 1 to 40) in FIG. 40, and a symbol at time X and carrier Y in FIG. 41.

Then, features of symbol group #1 for stream 1 indicated by 1401_1, symbol group #2 for modulated signal 1 indicated by 1401_2, and symbol group #3 for modulated signal 1 indicated by 1401_3 in FIG. 14 are as described in the above embodiments. Specifically, the features of symbol group #i for modulated signal 1 in FIG. 40 are the same as the features of the symbol groups for modulated signal 1 in FIG. 14, and are as described in the above embodiments.

Symbol group #1 for modulated signal 2 indicated by 1402_1, symbol group #2 for modulated signal 2 indicated by 1402_2, and symbol group #3 for modulated signal 2 indicated by 1402_3 in FIG. 14 are as described in the above embodiments. Specifically, the features of symbol group #i for modulated signal 2 in FIG. 41 are the same as the features of the symbol groups for modulated signal 2 in FIG. 14, and are as described in the above embodiments.

Note that if symbols are present after time 11 from carrier 10 to carrier 20 in the frame configuration in FIGS. 40 and 41, the symbols may be used for multicast transmission or dedicated data transmission (unicast transmission).

When the base station transmits a frame as in FIG. 14 using the frame configuration in FIG. 40 or 41, data transmission described in Embodiments 1 and 4 may be similarly carried out.

Examples of use of symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41 in the above description are to be described.

Figure 42:
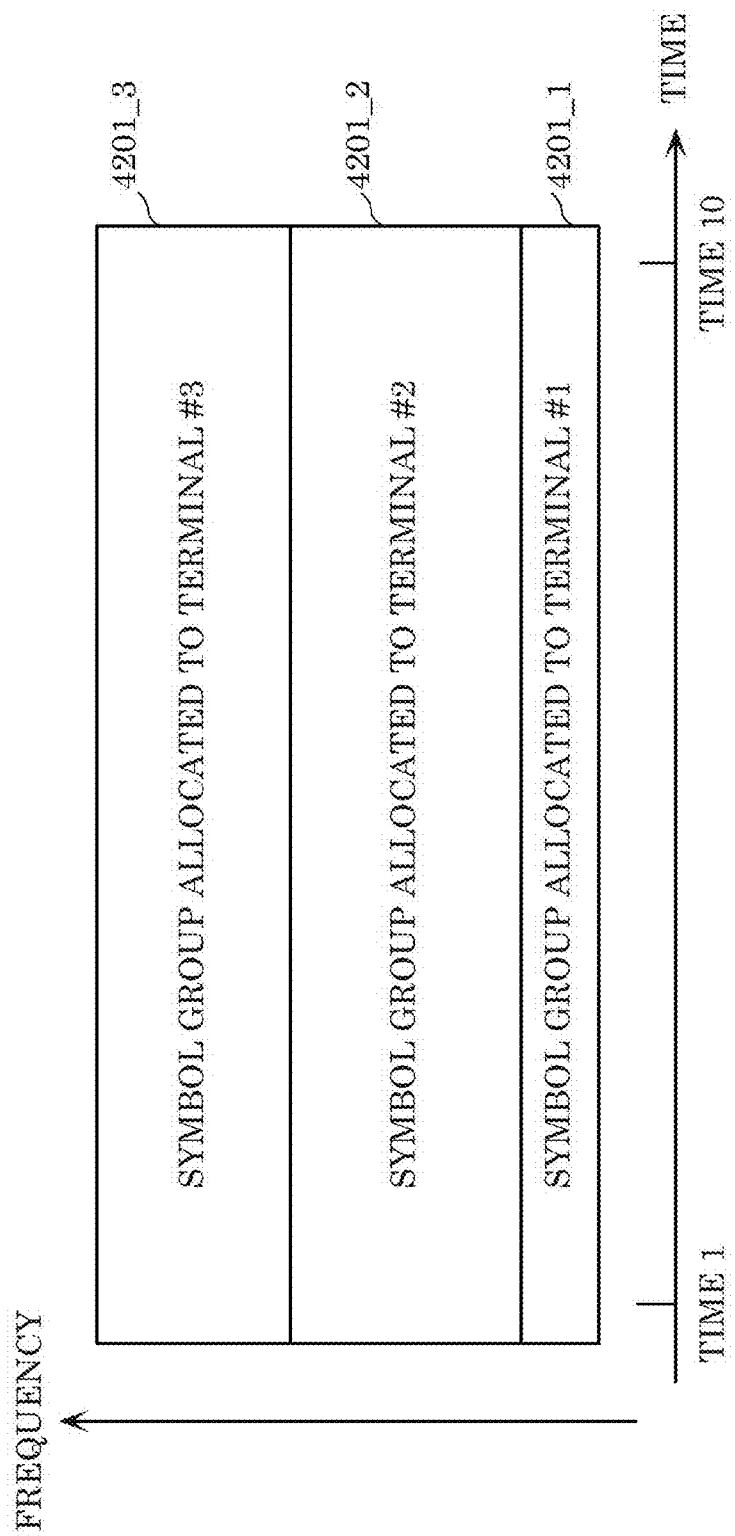
FIG. 42 illustrates an example of allocation of symbol areas to terminals.

FIG. 42 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals. Note that in FIG. 42, the horizontal axis indicates time, and the vertical axis indicates frequency (carrier).

As illustrated in FIG. 42, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to frequency division, and allocated to the terminals. 4201_1 is a symbol group allocated to terminal #1, 4201_2 is a symbol group allocated to terminal #2, and 4201_3 is a symbol group allocated to terminal #3.

For example, the base station (700) communicates with terminal #1, terminal #2, and terminal #3, and when the base station transmits data to terminal #1, the base station transmits data to terminal #1, using "symbol group 4201_1 allocated to terminal #1" in FIG. 42. When the base station transmits data to terminal #2, the base station transmits data to terminal #2 using "symbol group 4201_2 allocated to terminal #2" in FIG. 42. When the base station transmits data to terminal #3, the base station transmits data to terminal #3 using "symbol group 4201_3 allocated to terminal #3" in FIG. 42.

Note that the method of allocating symbol groups to terminals is not limited to the method in FIG. 42, and thus the frequency band (the carrier number) may be changed with time or may be set in any manner. Furthermore, the method of allocating symbol groups to terminals may be changed with time.

Figure 43:
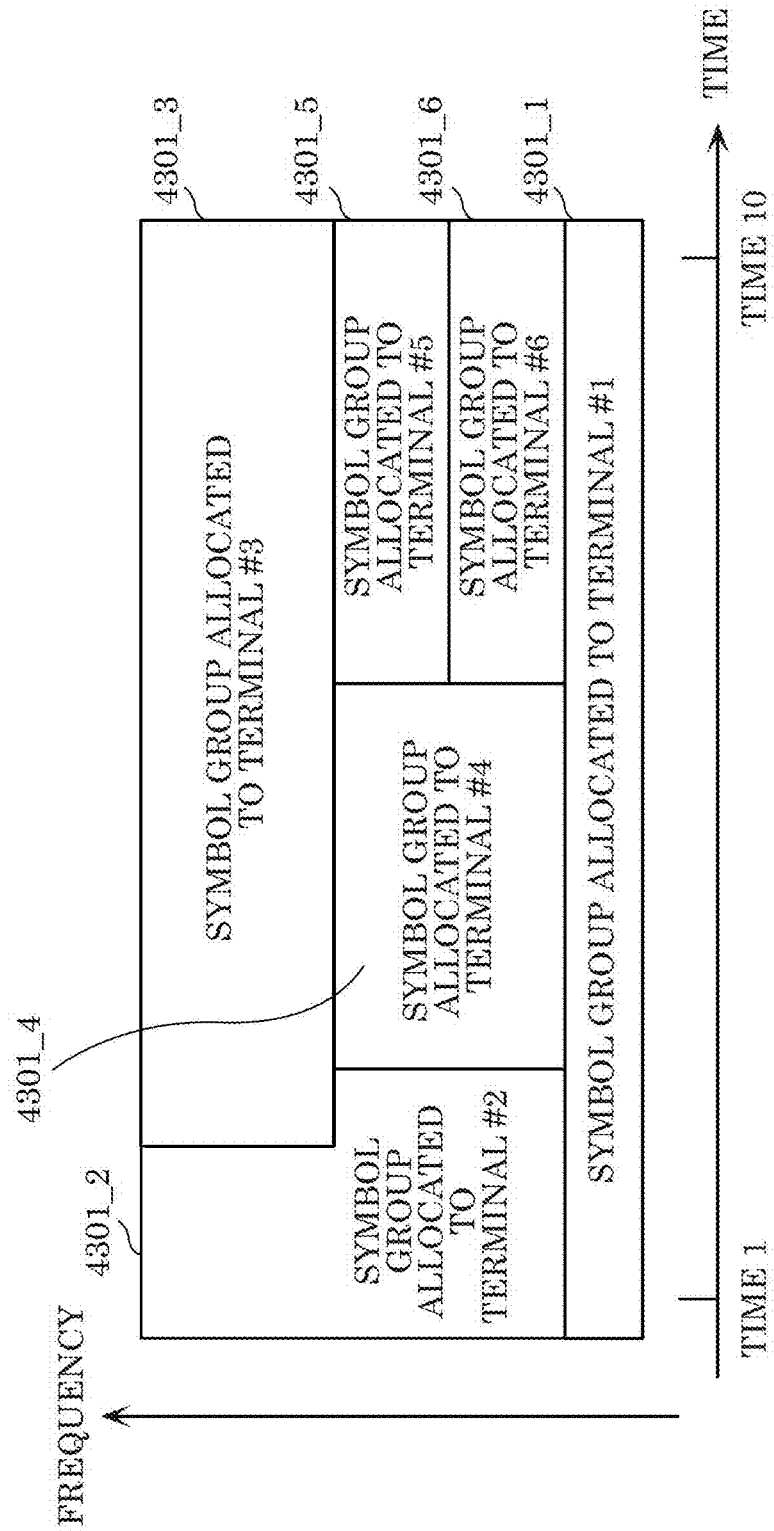
FIG. 43 illustrates an example of allocation of symbol areas to terminals.

FIG. 43 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals, which is different from the allocation in FIG. 42. Note that in FIG. 43, the horizontal axis indicates time, and the vertical axis indicates frequency (carrier).

As illustrated in FIG. 43, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to time and frequency division, and allocated to the terminals. Then, 4301_1 is a symbol group allocated to terminal #1, 4301_2 is a symbol group allocated to terminal #2, 4301_3 is a symbol group allocated to terminal #3, 4301_4 is a symbol group allocated to terminal #4, 4301_5 is a symbol group allocated to terminal #5, and 4301_6 is a symbol group allocated to terminal #6.

For example, the base station (700) communicates with terminal #1, terminal #2, terminal #3, terminal #4, terminal #5, and terminal #6, and when the base station transmits data to terminal #1, the base station transmits data to terminal #1, using "symbol group 4301_1 allocated to terminal #1" in FIG. 43. Then, when the base station transmits data to terminal #2, the base station transmits data to terminal #2 using "symbol group 4301_2 allocated to terminal #2" in FIG. 43. When the base station transmits data to terminal #3, the base station transmits data to terminal #3 using "symbol group 4301_3 allocated to terminal #3" in FIG. 43. When the base station transmits data to terminal #4, the base station transmits data to terminal #4 using "symbol group 4301_4 allocated to terminal #4" in FIG. 43. When the base station transmits data to terminal #5, the base station transmits data to terminal #5 using "symbol group 4301_5 allocated to terminal #5" in FIG. 43. When the base station transmits data to terminal #6, the base station transmits data to terminal #6 using "symbol group 4301_6 allocated to terminal #6" in FIG. 43.

Note that the method of allocating symbol groups to terminals is not limited to the method in FIG. 43, and thus the frequency band (the carrier number) and the time width may be changed or may be set in any manner. Furthermore, the method of allocating symbol groups to terminals may be changed with time.

Figure 44:
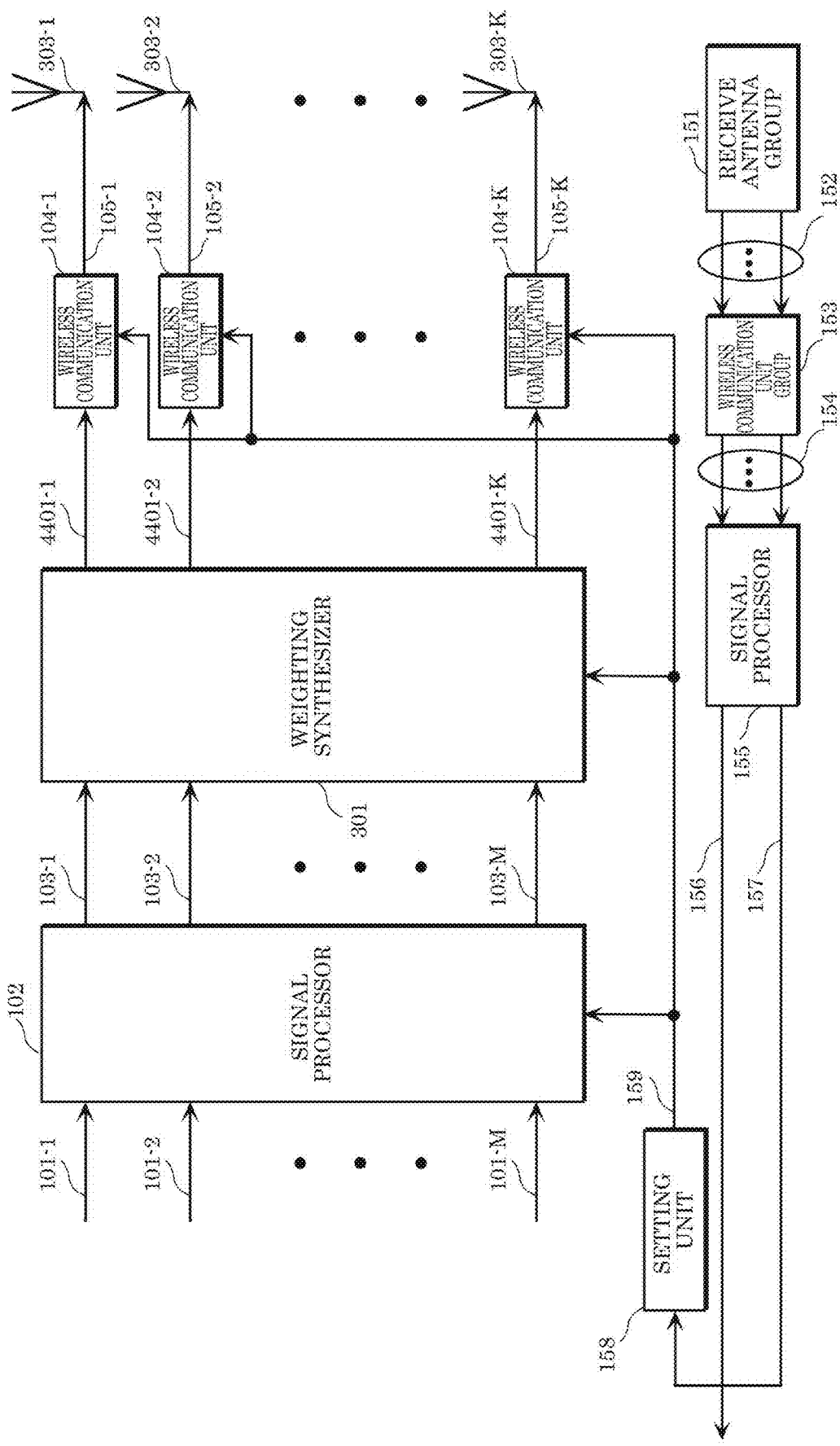
FIG. 44 illustrates an example of a configuration of the base station.

Further, different weighting synthesis may be performed for each carrier in the symbol areas for stream 1, the symbol areas for stream 2, the symbol areas for modulated signal 1, the symbol areas for modulated signal 2 in FIGS. 38, 39, 40, and 41, respectively, and a weighting-synthesis method may be determined for a unit of a plurality of carriers. As illustrated in FIGS. 43 and 44, a weighting synthesis parameter may be set for each allocated terminal. Setting of the weighting synthesis method for carriers is not limited to these examples.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 7

In this specification, the configurations of base stations 700 in FIGS. 7, 12, 17, 18, 19, 20, and 22 and the configurations of the base stations described in other embodiments may each be a configuration as illustrated in FIG. 44.

The following describes operation of the base station in FIG. 44.

Elements which operate in the same manner as those in FIGS. 1 and 3 are assigned the same reference numerals in FIG. 44, and a description thereof is omitted.

Weighting synthesizer 301 receives inputs of signals 103_1, 103_2, . . . , and 103_M obtained as a result of signal processing, and control signal 159, performs weighting synthesis on the signals based on control signal 159, and outputs weighting-synthesis signals 4401_1, 4401_2, . . . , and 4401_K. Note that M is an integer of 2 or more, and K is an integer of 2 or more.

For example, if signal 103_i obtained as a result of the signal processing (i is an integer of 1 or more and M or less) is represented by ui(t) (t is time) and signal 4401_g (g is an integer of 1 or more and K or less) obtained as a result of the weighting synthesis is represented by vg(t), vg (t) can be represented by the following expression.

[Math. 7]

$$v_g(t) = Q_{g1} \times u_1(t) + Q_{g2} \times u_2(t) + \ldots + Q_{gM} \times u_M(t) = \sum_{j=1}^{M} Q_{gj} \times u_j(t)$$

Expression (7)

Wireless communication unit 104_g receives inputs of signal 4401_g obtained as a result of the weighting synthesis and control signal 159, performs predetermined processing on the signal based on control signal 159, and generates and outputs transmission signal 105_g. Then, transmission signal 105_g is transmitted from antenna 303_1.

Note that the transmission method which the base station supports may be a multi-carrier method such as OFDM or a single carrier method. Furthermore, the base station may support both the multi-carrier method and the single carrier method. At this time, there are methods for generating modulated signals to be transmitted according to the single carrier method, and signals generated according to any of the methods can be transmitted. Examples of the single carrier method include "discrete Fourier transform (DFT)-spread orthogonal frequency division multiplexing (OFDM)", "trajectory constrained DFT-spread OFDM", "OFDM based single carrier (SC)", "single carrier (SC)-frequency division multiple access (FDMA)", and "guard interval DFT-spread OFDM".

Expression (7) is indicated by the function of time, yet Expression (7) may be a function of frequency in addition to time in the case of a multi-carrier method such as the OFDM method.

For example, according to the OFDM method, different weighting synthesis may be performed for each carrier, and a weighting-synthesis method may be determined for a unit of a plurality of carriers. Setting of the weighting synthesis method for carriers is not limited to these examples.

Supplementary Information 6

As a matter of course, the present disclosure may be carried out by combining a plurality of the exemplary embodiments and other contents such as supplementary information described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulation method, an error correction coding method (an error correction code, a code length, a coding rate and the like to be used), control information and the like" are exemplified, it is possible to carry out the present disclosure with the same configuration even when other types of "a modulation method, an error correction coding method (an error correction code, a code length, a coding rate and the like to be used), control information and the like" are applied.

As for a modulation method, even when a modulation method other than the modulation methods described herein is used, it is possible to carry out the exemplary embodiments and the other contents described herein. For example, APSK (such as 16APSK, 64APSK, 128APSK, 256APSK, 1024APSK, and 4096APSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulation method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulation method having signal points such as 2 signal points, 4 signal points, 8 signal points, 16 signal points, 64 signal points, 128 signal points, 256 signal points, and 1024 signal points) is not limited to a signal point arranging method of the modulation methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communication partner (for example, a modulation method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication device is described in the exemplary embodiments. However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, . . . , and 106-M may not each include a plurality of antennas, and may not receive an input of signal 159.

The configuration of antenna units 401-1, 401-2, . . . , and 401-N in FIG. 4 is not limited to the configuration described in the embodiments. For example, antenna units 401-1, 401-2, . . . , and 401-N may not each include a plurality of antennas, and may not receive an input of signal 410.

Note that the transmission method which the base station and the terminals support may be a multi-carrier method such as OFDM or a single carrier method. Furthermore, the base station may support both the multi-carrier method and the single carrier method. At this time, there are methods for generating modulated signals according to the single carrier method, and signals generated according to any of the methods can be transmitted. Examples of the single carrier system include "discrete Fourier transform (DFT)-spread orthogonal frequency division multiplexing (OFDM)", "trajectory constrained DFT-spread OFDM", "OFDM based single carrier (SC)", and "single carrier (SC)-frequency division multiple access (FDMA)", and "guard interval DFT-spread OFDM".

Furthermore, at least multicast (broadcast) data is included in information #1 (101_1), information #2 (101_2), . . . , and information #M (101_M) in FIGS. 1, 3, and 44. For example, in FIG. 1, if information #1 (101_1) is data for multicasting, a plurality of streams or modulated signals that include such data are generated by signal processor 102, and output from an antenna.

In FIG. 3, if information #1 (101_1) is data for multicasting, a plurality of streams or modulated signals that include such data are generated by signal processor 102 and/or weighting synthesizer 301, and output from an antenna.

In FIG. 44, if information #1 (101_1) is data for multicasting, a plurality of streams or modulated signals that include such data are generated by signal processor 102 and/or weighting synthesizer 301, and output from an antenna.

Note that the states of the streams and modulated signals are as described with reference to FIGS. 7, 9, 12, 14, 17, 18, and 19.

Furthermore, information #1 (101_1), information #2 (101_2), . . . , and information #M (101_M) in FIGS. 1, 3, and 44 may include data destined for individual terminals. With regard to this point, a description is as given in the embodiments in the specification.

Note that a configuration may be adopted in which at least one of a field programmable gate array (FPGA) and a central processing unit (CPU) can download the entirety of or a portion of software necessary to achieve the communication method described in the present disclosure by wireless communication or wire communication. Furthermore, the configuration may allow downloading the entirety of or a portion of software for update by wireless communication or wire communication. Then, the downloaded software may be stored into a storage, and at least one of an FPGA and a CPU may be operated based on the stored software, so that the digital signal processing described in the present disclosure may be performed.

At this time, a device that includes at least one of an FPGA and a CPU may be connected with a communication modem in a wireless or wired manner, and this device and the communication modem may achieve the communication method described in the present disclosure.

For example, the base station, an AP, and communication devices such as terminals described in this specification may each include at least one of an FPGA and a CPU, and the communication devices may each include an interface for receiving, from the outside, software for operating at least one of the FPGA and the CPU. Furthermore, the communication devices may include a storage for storing the software obtained from the outside, and cause the FPGA and the CPU to operate based on the stored software, thus achieving signal processing described in the present disclosure.

Embodiment A1

In the present embodiment, a method of constructing a network achieved by the communication system according to the present embodiment will be described.

Figure 45:
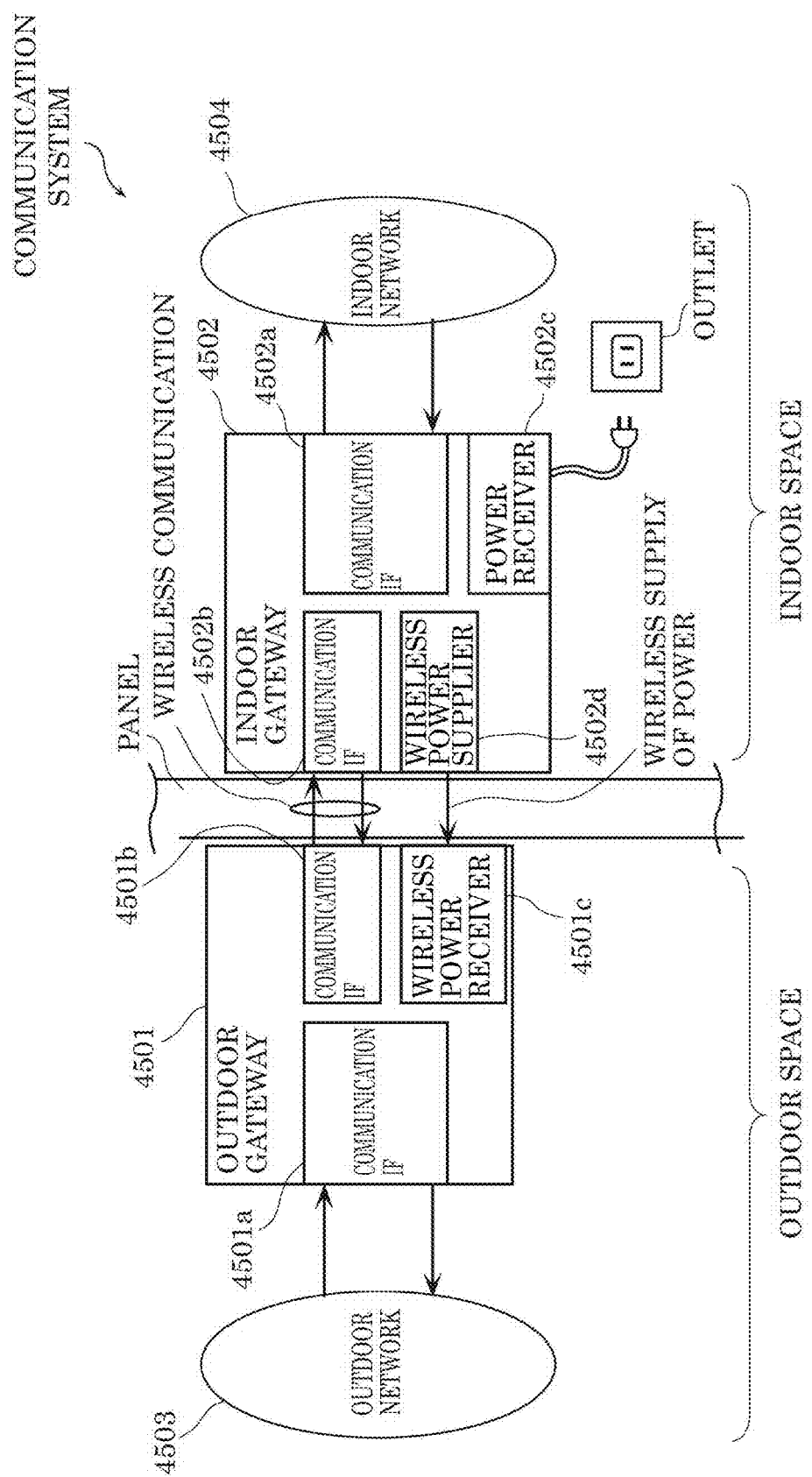
FIG. 45 illustrates one example of connections between networks and gateways.

FIG. 45 illustrates one example of connections between networks and gateways. Hereinafter, the communication system according to the present embodiment will be described with reference to FIG. 45.

As illustrated in FIG. 45, the communication system includes outdoor gateway 4501, indoor gateway 4502, outdoor network 4503, and indoor network 4504.

Outdoor gateway 4501 is a gateway device that communicably connects to outdoor network 4503. Outdoor gateway 4501 includes communication interface (IF) 4501a, communication IF 4501b, and wireless power receiver 4501c. Outdoor gateway 4501 can be implemented as, for example, a computer. However, outdoor gateway 4501 need not be configured as a computer. Outdoor gateway 4501 corresponds to the first communication device. Note that outdoor gateway 4501 may be a node on outdoor network 4503.

Communication IF 4501a is a communication interface device that is communicably connected to outdoor network 4503.

Communication IF 4501b is a communication interface device that is communicably connected to indoor gateway 4502.

Wireless power receiver 4501c is a power reception device that receives a wireless supply of power from indoor gateway 4502. The power may be supplied using a method that uses electromagnetic induction, a wireless power transmission method, or a wireless power supply method, and, more specifically, may utilize a method that conforms to the Qi standard. However, applicable methods of power transmission are not limited to these examples.

Outdoor gateway 4501 receives a communication frame from a surrounding communication device via communication IF 4501a and 4501b, and transmits the communication frame to another suitable communication device. Moreover, outdoor gateway 4501 controls what frame is transmitted by which communication IF by exchanging route information with surrounding communication devices via communication IF 4501a and 4501b.

Indoor gateway 4502 is a gateway device that communicably connects to indoor network 4504. Indoor gateway 4502 includes communication IF 4502a, communication IF 4502b, power receiver 4502c, and wireless power supplier (wireless power transmitter) 4502d. Indoor gateway 4502 can be implemented as, for example, a computer.

However, indoor gateway 4502 need not be configured as a computer. Indoor gateway 4502 corresponds to the second communication device. Note that indoor gateway 4502 may be a node on indoor network 4504.

Communication IF 4502a is a communication interface device that is communicably connected to indoor network 4504.

Communication IF 4502b is a communication interface device that is communicably connected to outdoor gateway 4501.

Power receiver 4502c is a power supply terminal disposed indoors, and receives a supply of power for driving indoor gateway 4502 from, for example, an outlet or a universal serial bus (USB) connector. Power receiver 4502c is connected to an outlet via a power cord and receives, for example, a supply of AC 100V power, or is connected to a universal serial bus (USB) connector and receives a supply of power.

Wireless power supplier (wireless power transmitter) 4502d is a power supply device (power transmission device) that wirelessly supplies power to outdoor gateway 4501. The power that wireless power supplier 4502d supplies accounts for part of the power received by power receiver 4502c from the outlet. Details regarding the supply of the power are the same as described with respect to wireless power receiver 4501c.

Indoor gateway 4502 receives a communication frame from a surrounding communication device via communication IF 4502a and 4502b, and transmits the communication frame to another suitable communication device. Moreover, indoor gateway 4502 controls what frame is transmitted by which communication IF by exchanging route information with surrounding communication devices via communication IF 4502a and 4502b.

Outdoor network 4503 is a network provided, for example, in an outdoor space (also referred to as a first space). Outdoor network 4503 is a wireless network (also referred to as a first network), and, specifically, is a network that conforms to, for example, the IEEE 802.11ad and/or IEEE 802.11ay communication standards. However, this network may use a communication method that conforms to some other standard (for example, the IEEE 802.11a standard, the IEEE 802.11g standard, the IEEE 802.11n standard, the IEEE 802.11ac standard, the IEEE 802.11ax standard, and/or a cellular standard may be used).

Outdoor network 4503 may be connected to a wired network connected using, for example, optical fiber. In such cases, outdoor network 4503 fulfils the role of connecting indoor network 4504 to the wired network described above. Note that outdoor network 4503 may be a closed network that is not connected to the wired network described above.

Indoor network 4504 is a network provided, for example, in an indoor space (also referred to as a second space). Indoor network 4504 is a wireless network (also referred to as a second network), and, specifically, is a network that conforms to, for example, the IEEE 802.11ad and/or IEEE 802.11ay communication standards. However, this network may use a communication method that conforms to some other standard (for example, the IEEE 802.11a standard, the IEEE 802.11g standard, the IEEE 802.11n standard, the IEEE 802.11ac standard, the IEEE 802.11ax standard, and/or a cellular standard may be used).

Note that outdoor gateway 4501 or indoor gateway 4502 is exemplified as having the configuration illustrated in FIG. 1 (or FIG. 3 or FIG. 44). Since operations performed by each element in FIG. 1 (or FIG. 3 or FIG. 44) and operations performed by each element in FIG. 4 have already been described, repeated description thereof will be omitted.

Note that the indoor space and the outdoor space are separated by, for example, a panel. Here, communication IF 4501b and communication IF 4502b are connected by wireless communication via radio waves passing through this panel. The panel is, for example, an outer wall (for example, the outer wall of a building or a home), or a pane of glass (for example, a pane of glass provided in an opening of a building or a home).

Note that when outdoor network 4503 is a wireless network, communication IF 4501a is a wireless communication interface. Moreover, when indoor network 4504 is a wireless network, communication IF 4502a is a wireless communication interface.

For example, communication IF 4501*a* communicates using time division multiple access (TDMA). For example, communication IF 4502*a* communicates using carrier sense multiple access (CSMA). However, communication IF 4501*a* may communicate using a method other than TDMA, and communication IF 4502*a* may communicate using a method other than CSMA.

Each of outdoor network 4503 and indoor network 4504 may be a wireless multihop network (a wireless mesh network). In such cases, communication IF 4501*a* is connected to outdoor network 4503 configured as a wireless multihop network (wireless mesh network) and communication IF 4502*a* is connected to indoor network 4504 configured as a wireless multihop network (wireless mesh network).

The control method used by the communication system includes connecting to outdoor network 4503 by outdoor gateway 4501, wirelessly communicating by outdoor gateway 4501, connecting to indoor network 4504 by indoor gateway 4502, and connecting to outdoor gateway 4501 by indoor gateway 4502 via wireless communication.

Figure 46:
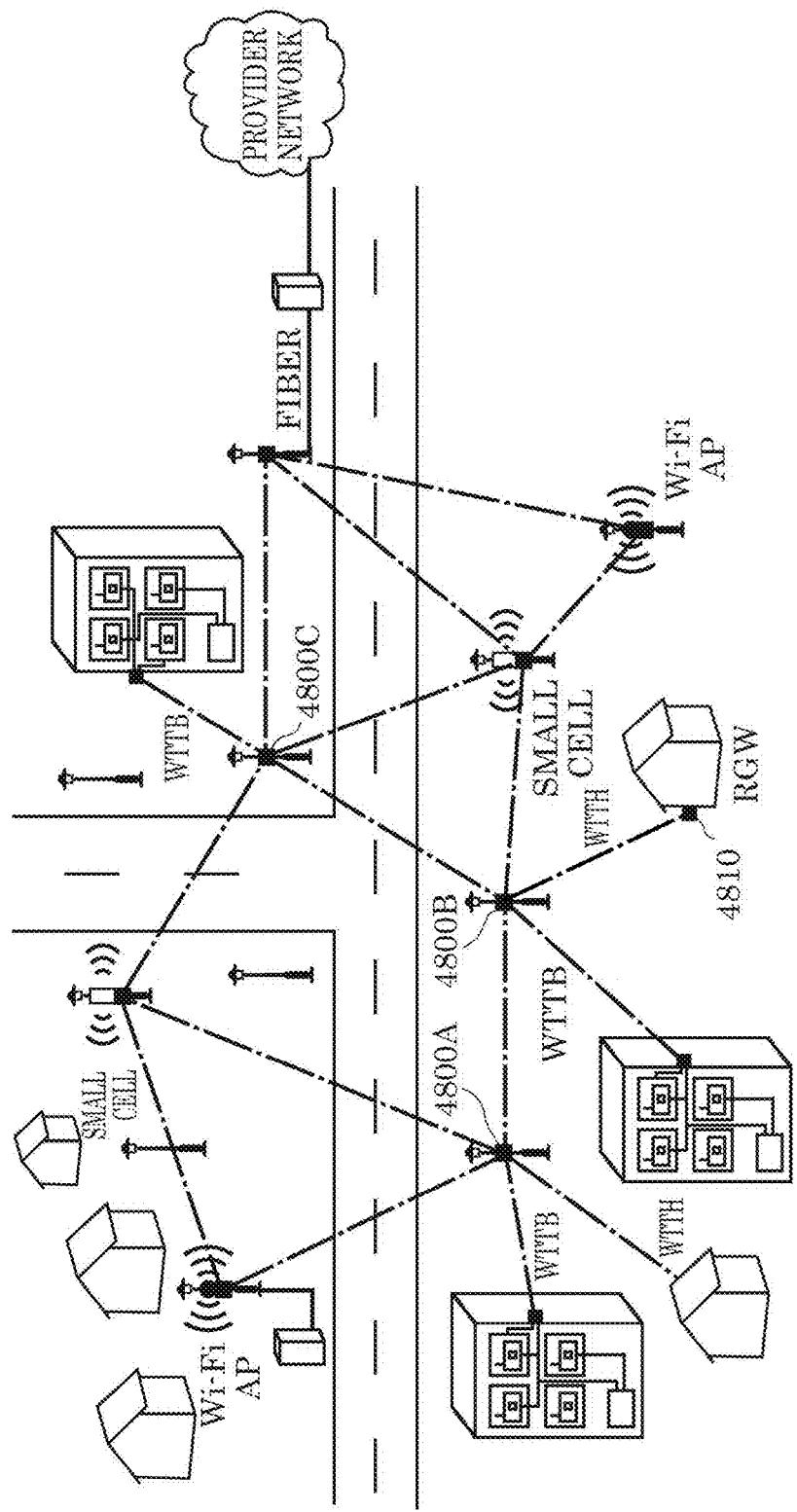
FIG. 46 illustrates one example of a configuration of a communication system.

FIG. 46 illustrates an example of a configuration of the communication system. More specifically, FIG. 46 schematically illustrates one example of a configuration of a mesh network—which is outdoor network 4503—that uses wireless signal repeaters (a wireless signal repeater is also referred to simply as a repeater).

The plurality of repeaters are disposed in a plurality of locations in a predetermined area, and collectively form the mesh wireless backhaul. For example, repeater 4800B transmits a signal received from repeater 4800A to repeater 4800C. Repeater 4800B also transmits a signal received from repeater 4800A to edge node (or node) 4810 that is connected to repeater 4800B. Edge node (or node) 4810 is a gateway device at a home. Repeater 4800B also transmits a signal received from edge node (or node) 4810 that is connected to repeater 4800B, to another repeater 4800C.

This form of wireless connection of a home from repeater 4800B is referred to as wireless to the home (WITH). However, the naming is not limited to this example.

Moreover, an edge node (or node) may be a gateway device on a network in a building. This form of wireless connection of a building from a repeater is referred to as wireless to the building (WTTB). However, the naming is not limited to this example.

Moreover, an edge node (or node) may be, for example, a Wi-Fi access point.

Such use-cases of wirelessly connecting an edge node (or node) in outdoor network 4503 are collectively referred to as wireless to the X (WTTX).

Figure 47:
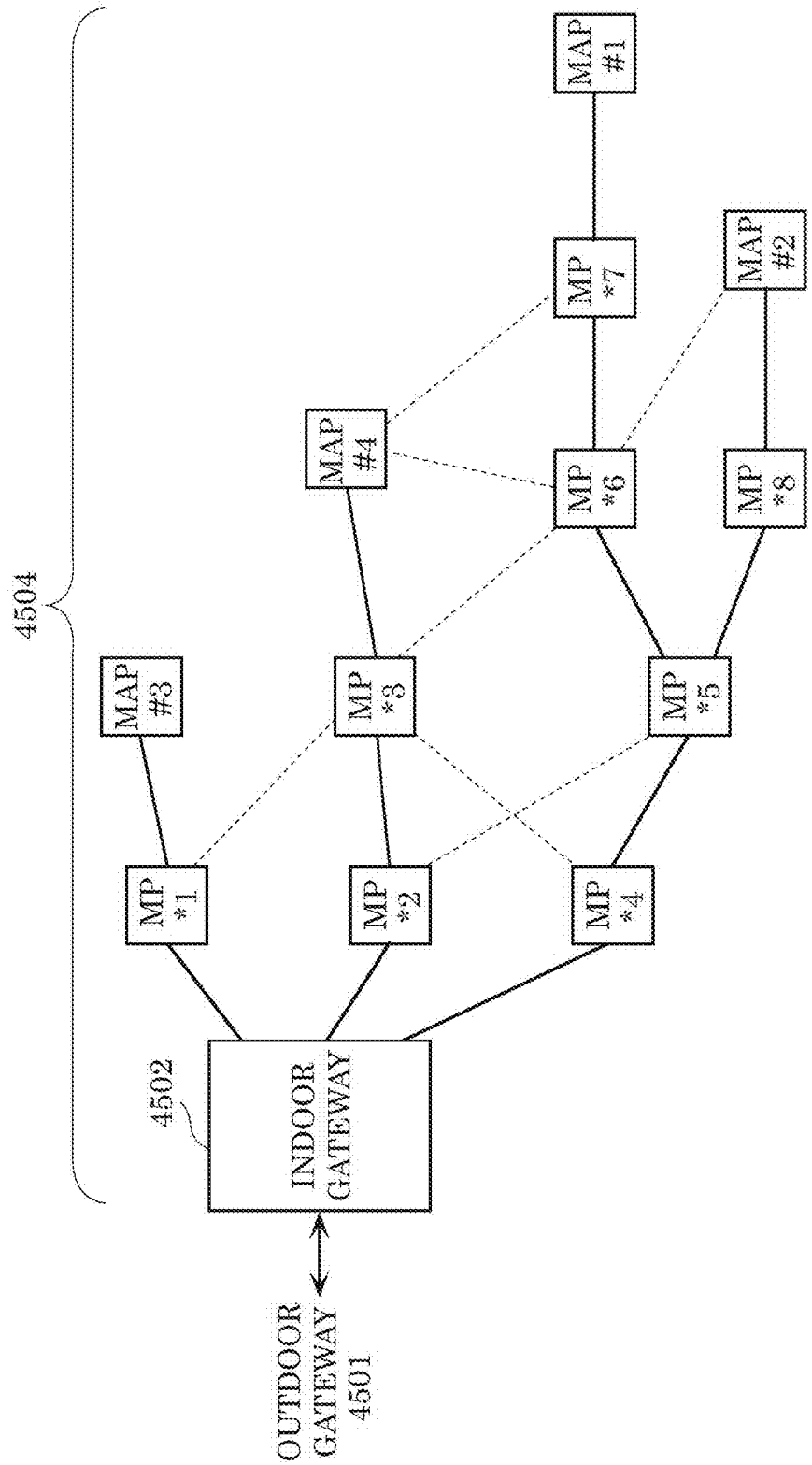
FIG. 47 illustrates one example of a configuration of an indoor network.

FIG. 47 illustrates one example of a configuration of indoor network 4504.

Indoor network 4504 illustrated in FIG. 47 forms a mesh network (multihop network), and includes: mesh point (MP) *1, MP *2, MP *3, MP *4, MP *5, MP *6, MP *7, and MP *8 (hereinafter collectively referred to as "MP *1, etc."); and mesh access point (MAP) #1, MAP #2, MAP #3, and MAP #4 (hereinafter collectively referred to as "MAP #1, etc."). Note that in this example, indoor gateway 4502 is described as a node on the mesh network. Note that MP *1, etc., or MAP #1, etc., are exemplified as having the configuration illustrated in FIG. 1 (or FIG. 3 or FIG. 44). Since operations performed by each element in FIG. 1 (or FIG. 3 or FIG. 44) and operations performed by each element in FIG. 4 have already been described, repeated description thereof will be omitted.

The broken lines that connect MPs and/or MAPs indicate that the MP and/or MAP connected by the broken line are communicably connected, and solid lines that connect MPs and/or MAPs indicate that the communication link that connects the MP and/or MAP is selected as a communication route in the mesh network.

For example, indoor gateway 4502 and MP *1 connected by a solid line are capable of communicating, and the communication link connecting indoor gateway 4502 and MP *1 is selected as a communication route. Moreover, MP *3 and MP *4 connected by a broken line are capable of communicating, but the communication link connecting MP *3 and MP *4 is not selected as a communication route. Moreover, MP *3 and MAP #3, which are neither connected by a solid line nor a broken line, are not capable of communicating.

Each of MP *1, etc., is a node on the mesh network. Each of MP *1, etc., includes a routing table. By transmitting packets in accordance with the routing table, each of MP *1, etc., enables communication between a terminal connected to the mesh network and another communication device. The routing table may be a routing table that is statically configured (a static routing table), and may be a routing table that is dynamically configured by MP *1, etc., exchanging information via routing protocols (a dynamic routing table).

Each of MAP #1, etc., is, for example, a node on the mesh network, and further includes functionality as a base station (access point) that provides wireless access to terminals that are indoors. The functionality that allows MAP #1, etc., to form a mesh network is the same as that of MP *1, etc. Moreover, the functionality that allows each of MAP #1, etc., to function as a base station is the same as a typical base station. Each of MAP #1, etc., includes functionality as a 2.4 GHZ, 5 GHZ, 60 GHz, etc., wireless local area network (LAN) base station (access point), for example.

In order to enable a terminal connected to MAP #1, etc., to communicate with indoor gateway 4502 via the mesh network, MP *1, etc., and MAP #1, etc., perform (1) initialization operations for forming the mesh network, (2) operations for forming the mesh network (specifically, processes for determining communication routes, etc.), and (3) operations for the forwarding of packets by MP *1, etc., and MAP #1, etc.

Hereinafter, operations (1) through (3) described above will be described in greater detail.

(1) Initialization Operations for Forming the Mesh Network

Each of indoor gateway 4502, MP *1, etc., and MAP #1, etc., searches for an adjacent node. Note that a node is any one of indoor gateway 4502, MP *1, etc., and MAP #1, etc. As a result, it is known that, for example, MP *3 is capable of communicating with MP *1, MP *2, MP *4, and MP *6. At this time, for example, MP *3 may also perform beamforming training.

Note that the indoor gateway does not search for devices provided outdoors (for example, an outdoor gateway, an outdoor MP, or an outdoor MAP; none of these are illustrated in the drawings).

More specifically, indoor gateway 4502, MP *1, etc., and MAP #1, etc., notifies surrounding nodes that they belong to an indoor network by frame transmission. Similarly, outdoor gateway 4501, outdoor MPs, and outdoor MAPs notify surrounding nodes that they belong to an outdoor network by frame transmission.

Accordingly, information about the network that each node belongs to is included in the transmitted frame. Moreover, the transmitted frame described above includes control information indicating whether the information included in the transmitted frame is broadcast (multicast) information or unicast information. The transmitted frame described above further includes information indicating whether the node that was the source of transmission is a gateway (specifically, indoor gateway 4502 or outdoor gateway 4501), an MP (specifically, any one of indoor MP *1, etc., or an outdoor MP), or a MAP (specifically, indoor MAP #1 or an outdoor MAP).

Next, each node shares connection information. Here, connection information is broadcast (multicast) to the surrounding area. Indoor gateway 4502, MP #1, etc., MAP *1, etc., obtain surrounding node connection information.

For example, MP *3 recognizes that it is capable of communicating with MP *1. Accordingly, MP *3 transmits information indicating that MP *3 is capable of communicating with MP *1 to other nodes (indoor gateway 4502, indoor MP #1, and indoor MAP *1).

Accordingly, for example, MP *3 transmits information indicating that MP *3 is capable of communicating with MP *1 to MP *1, MP *2, MP *4, MP *6, and MAP #4. MP *6 transmits information indicating that MP *3 is capable of communicating with MP *1 to MP *7, MP *5, and MAP #2. Each of MP *1, MP *2, MP *4, and MAP #4 also transmits information indicating that MP *3 is capable of communicating with MP *1.

Here, after any one of indoor gateway 4502, MP *1, etc., and MAP #1 receives data that is the same as data received in the past, the node needs to have a function that prevents it from broadcasting (multicasting) (i.e., transmitting) the data again.

For example, MAP #4 first receives information indicating that MP *3 is capable of communicating with MP *1 from MP *3. MAP #4 then transmits the information indicating that MP *3 is capable of communicating with MP *1 to MP *1, etc., and MAP #1, etc. Next, MAP #4 receives information indicating that MP *3 is capable of communicating with MP *1 from MAP #4. This time, MAP #4 does not transmit the information indicating that MP *3 is capable of communicating with MP *1 to MP *1, etc., and MAP #1, etc. However, the broadcast (multicast) is only performed on the indoor network.

Figure 48:
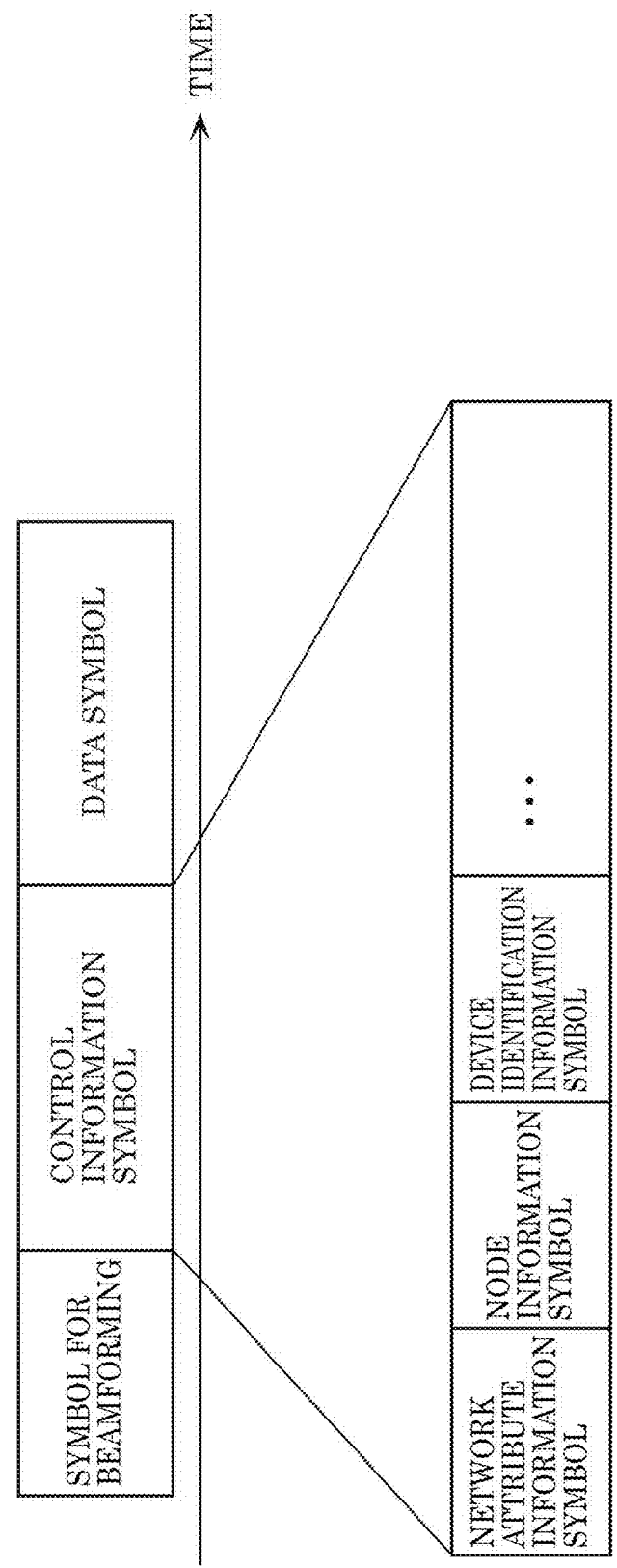
FIG. 48 illustrates one example of a frame configuration.

Upon performing the above operations, each node transmits a frame including, for example, a symbol for beamforming, a control information symbol, and a data symbol. One example of such a frame is illustrated in FIG. 48. FIG. 48 illustrates a configuration of the above-described frame. Time is represented on the horizontal axis. Hereinafter, an example in which a first node transmits a frame having the configuration illustrated in FIG. 48 will be given.

The symbol for beamforming is a symbol for determining the signal processing method for the transmission beamforming and the signal processing method for the reception beamforming, which are used upon the first node communicating with a communication partner node. Note that the communication partner node may be a plurality of nodes.

The control information symbol includes one or more of a network attribute information symbol, a node information symbol, and a device identification information symbol.

The network attribute information symbol is information about the network that the first node belongs to. For example, the network attribute information symbol is a symbol for notifying either that the first node belongs to the indoor network or that the first node belongs to the outdoor network.

The node information symbol is information about the node that the first node belongs to. For example, the node information symbol is a symbol for notifying any one of that the first node is a gateway, that the first node is an MP, and that the first node is a MAP.

The device identification information symbol is a symbol for notifying another node of a unique number used to identify the first node.

Figure 49:
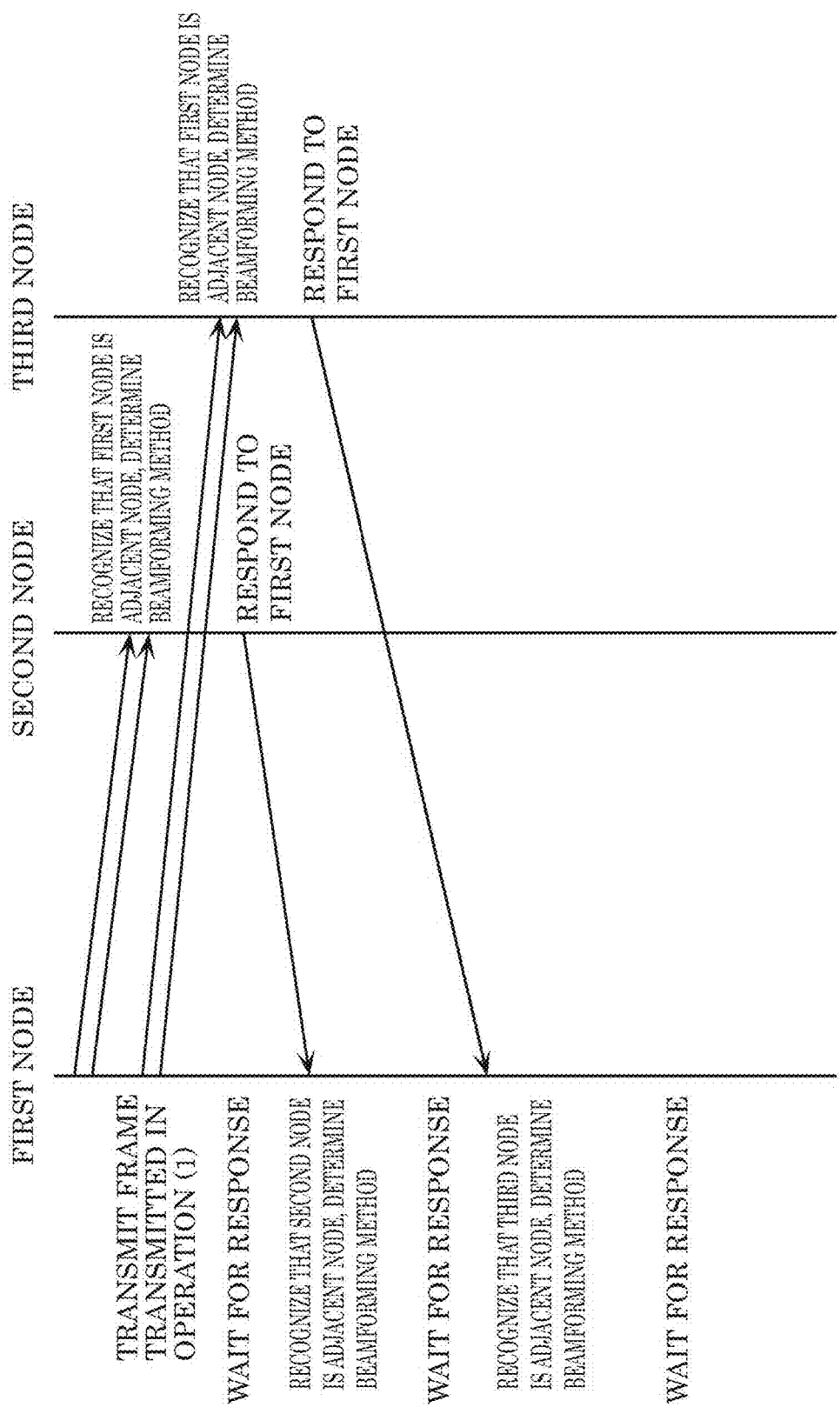
FIG. 49 illustrates one example of a communication sequence.

Hereinafter, initialization operations for forming the mesh network will be described with reference to FIG. 49 and FIG. 50. FIG. 49 illustrates the flow of communication between the first node and other nodes, after the frame is transmitted in operation (1).

As illustrated in FIG. 49, first, the first node transmits the frame transmitted in operation (1) to a second node and a third node. This frame may be transmitted one or more times. Then, in response to receiving the frame, each of the second node and the third node transmits a frame to respond to the first node.

Figure 50:
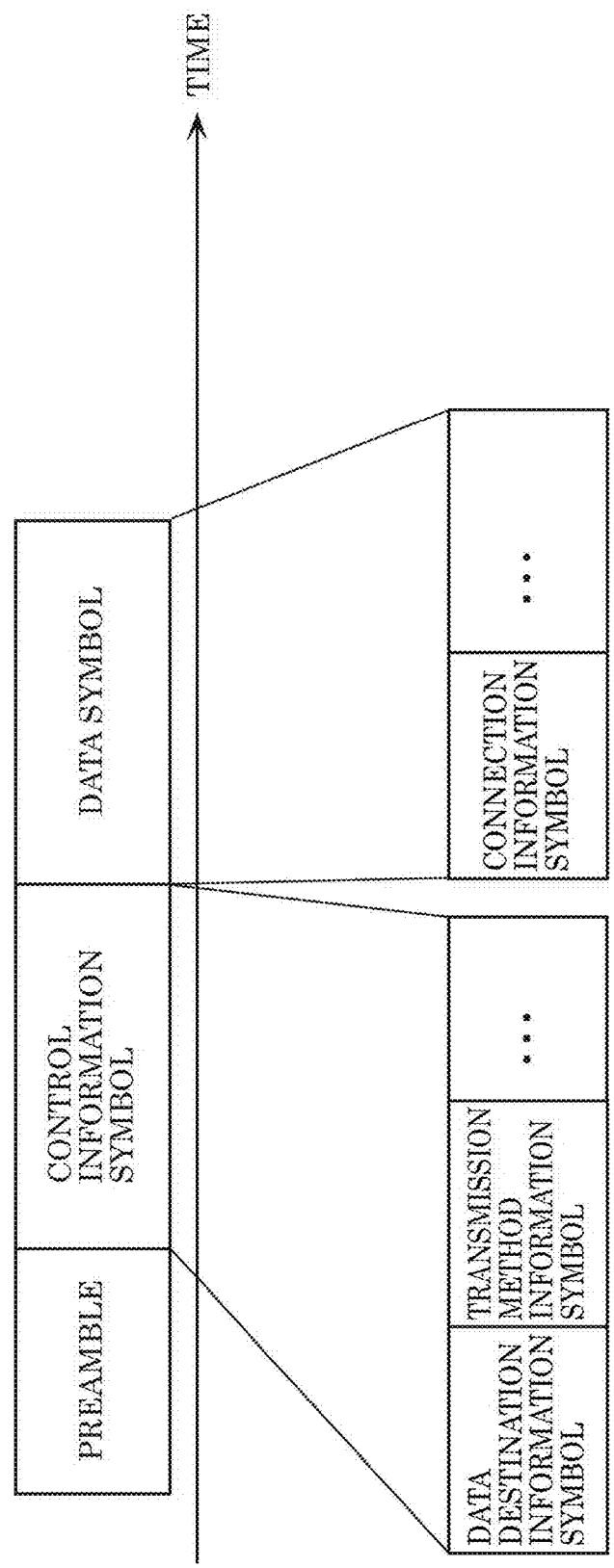
FIG. 50 illustrates one example of a frame configuration.

FIG. 50 illustrates a configuration of a frame used to transmit connection information for the first node to connect to another node. In FIG. 50, time is represented on the horizontal axis.

As illustrated in FIG. 50, this frame includes a preamble, a control information symbol, and a data symbol.

The preamble is a symbol for performing, for example, time synchronization, frame synchronization, and frequency synchronization between the first node and the communication partner of the first node. For example, the control information symbol includes a data destination information symbol and a transmission method information symbol.

The data destination information symbol is information about the destination of the frame transmitted by the first node. For example, when the first node transmits this frame to the second node, the data destination information symbol is information indicating that the frame is to be transmitted to the second node.

The transmission method information symbol is a symbol for transmitting information about the transmission method of the frame transmitted by the first node. Since this frame is a frame for broadcast (multicast), the transmission method information symbol includes information indicating that the frame is a frame for multicast. Note that when the transmitted frame is a frame for unicast, the transmission method information symbol may include information indicating that the frame is for unicast. Moreover, the transmission method information symbol may include information about the transmission method such as the error correction coding method or modulation method used to generate the data symbol, and/or information about the number of streams transmitted.

The data symbol is a symbol including data carried by the frame. For example, the data symbol includes a connection information symbol.

The connection information symbol is a symbol for transmitting information about the node(s) that the first node is connected to. For example, since the first node is connected to the second node and the third node, the connection information symbol includes information indicating that the first node is connected to the second node and information indicating that the first node is connected to the third node. Note that this symbol may include identification/unique information for the first node, identification/unique information for the second node, and identification/unique information for the third node.

The description above presents an example of a frame for broadcast (multicast). Accordingly, the second node that receives this frame transmits the connection information symbol to other nodes. The third node also transmits the connection information symbol to other nodes.

In other words, a node that receives a connection information symbol transmits a frame including the connection information symbol. However, as described above, once a node receives a connection information symbol and transmits a frame including the connection information symbol, if the node receives the connection information symbol again, the node does not transmit a frame including the connection information symbol.

In this way, each node can know the configuration of the mesh network.

(2) Processes for Forming the Mesh Network

Two methods regarding the processes for forming the mesh network will be described. The first method involves indoor gateway 4502 creating a route map for each MAP. The second method also involves indoor gateway 4502 creating a route map for each MAP, but the route map is not shared. Hereinafter, these methods will be described in greater detail.

(2-1) First Method

Figure 51:
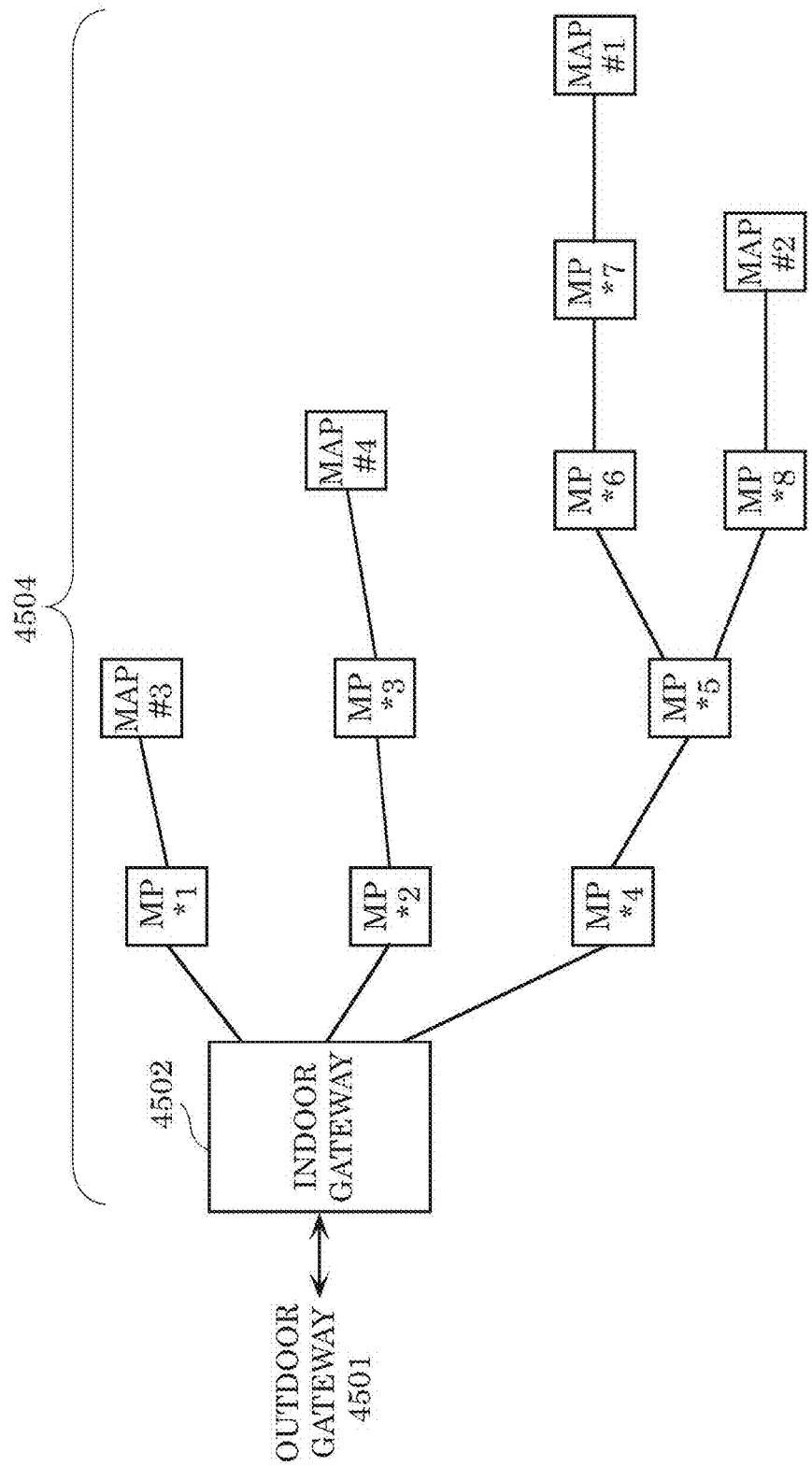
FIG. 51 illustrates one example of a configuration of an indoor network.

In the first method, indoor gateway 4502 creates a route map for each MAP. Note that the mesh network formed as a result of the creation of the route map is, for example, the network illustrated in FIG. 51.

Indoor gateway 4502 creates a route map for MAP #1. This route map indicates that indoor gateway 4502 can transmit data to MAP #1, by, (a), indoor gateway 4502 transmitting data to MP *4, MP *4 transmitting the data to MP *5, MP *5 transmitting the data to MP *6, MP *6 transmitting the data to MP *7, and MP *7 transmitting the data to MAP #1. This route map also indicates that MAP #1 can transmit data to indoor gateway 4502, by, (b), MAP #1 transmitting data to MP *7, MP *7 transmitting the data to MP *6, MP *6 transmitting the data to MP *5, MP *5 transmitting the data to MP *4, and MP *4 transmitting the data to indoor gateway 4502.

In order to share this route map with MAP #1, indoor gateway 4502 transmits a frame including this route map information to MAP #1. The frame including the route map information also includes node route information as control information. Each node that transmits this frame references the control information included in the frame to know the transmission destination of the frame.

(3) Packet Transmission Operations

Subsequently, when indoor gateway 4502 transmits information to MAP #1, data is transmitted based on the route map is performed. In other words, indoor gateway 4502 transmits node route control information based on the route map. Each node sequentially transmits frames based on the transmitted control information.

When MAP #1 transmits information to indoor gateway 4502, data is transmitted based on the route map is performed. In other words, MAP #1 transmits node route control information based on the route map. Each node sequentially transmits frames based on the transmitted control information.

Figure 52:
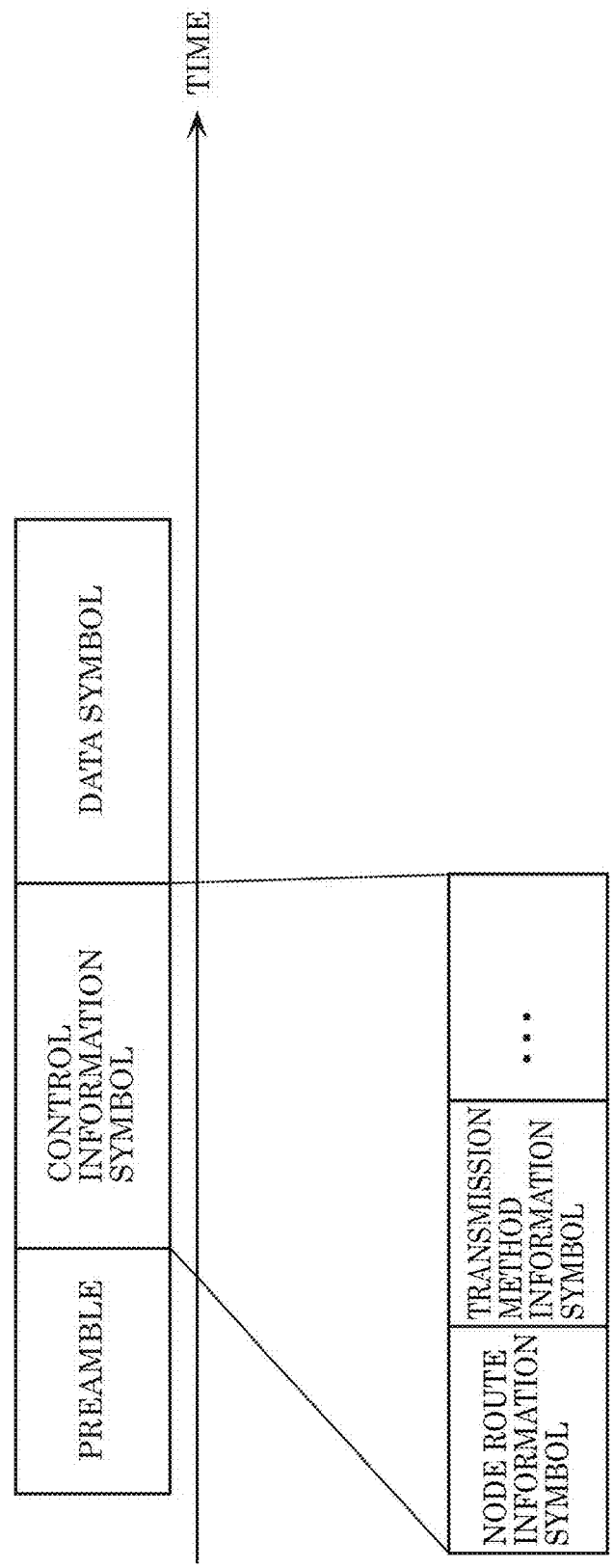
FIG. 52 illustrates one example of a frame configuration.

FIG. 52 illustrates one example of a frame configuration. FIG. 52 illustrates one example of a frame configuration when, for example, indoor gateway 4502 transmits information to MAP #1. Time is represented on the horizontal axis in FIG. 52.

For example, indoor gateway 4502 transmits a preamble. Note that the preamble is a symbol for MP *4 to perform, for example, time synchronization, frame synchronization, and frequency synchronization at the time of reception of the modulated signal of the frame (the preamble may be used for signal detection).

The control information symbol includes a node route information symbol and a transmission method information symbol. The data symbol is a symbol that includes data for indoor gateway 4502 to transmit data to MAP #1.

The node route information symbol is a symbol for transmitting information about the route map used when indoor gateway 4502 transmits the frame to MP *4.

The transmission method information symbol is a symbol for transmitting information about the transmission method of the frame transmitted by indoor gateway 4502. The transmission method information symbol may include, for example, information indicating either broadcast data or unicast data, information about the transmission method such as the error correction coding method or modulation method used to generate the modulated signal of the data symbol, and/or information about the number of streams transmitted.

The data symbol is a symbol that includes data for the indoor gateway to transmit data to MAP #1, and is a symbol that is transmitted by the indoor gateway to MP *4.

When MP *4 transmits a modulated signal to MP *5, when MP *5 transmits a modulated signal to MP *6, when MP *6 transmits a modulated signal to MP *7, and when MP *7 transmits a modulated signal to MAP #1 as well, by configuring the frame configuration as described above, the data transmitted by indoor gateway 4502 can be transmitted to MAP #1.

Note that this frame configuration may be considered to be a frame for when MAP #1 transmits information to indoor gateway 4502.

For example, MAP #1 transmits a preamble. Note that the preamble is a symbol for MP *7 to perform, for example, time synchronization, frame synchronization, and frequency synchronization at the time of reception of the modulated signal of the frame (the preamble may be used for signal detection).

The control information symbol includes a node route information symbol and a transmission method information symbol. The data symbol is a symbol that includes data for MAP #1 to transmit data to indoor gateway 4502.

The node route information symbol is a symbol for transmitting information about the route map used when MAP #1 transmits the frame to MP *7.

The transmission method information symbol is a symbol for transmitting information about the transmission method of the frame transmitted by MAP #1. The transmission method information symbol may include, for example, information indicating either broadcast data or unicast data, information about the transmission method such as the error correction coding method or modulation method used to generate the modulated signal of the data symbol, and/or information about the number of streams transmitted.

The data symbol is a symbol that includes data for MAP #1 to transmit data to indoor gateway 4502, and is a symbol that is transmitted by MAP #1 to MP *7.

When MP *7 transmits a modulated signal to MP *6, when MP *6 transmits a modulated signal to MP *5, when MP *5 transmits a modulated signal to MP *4, and when MP *4 transmits a modulated signal to the indoor gateway as well, by configuring the frame configuration as described above, the data transmitted by MAP #1 can be transmitted to indoor gateway 4502.

(2-2) Second Method

In the second method, indoor gateway 4502 creates a route map for each MAP, but does not share the route map.

Figure 53:
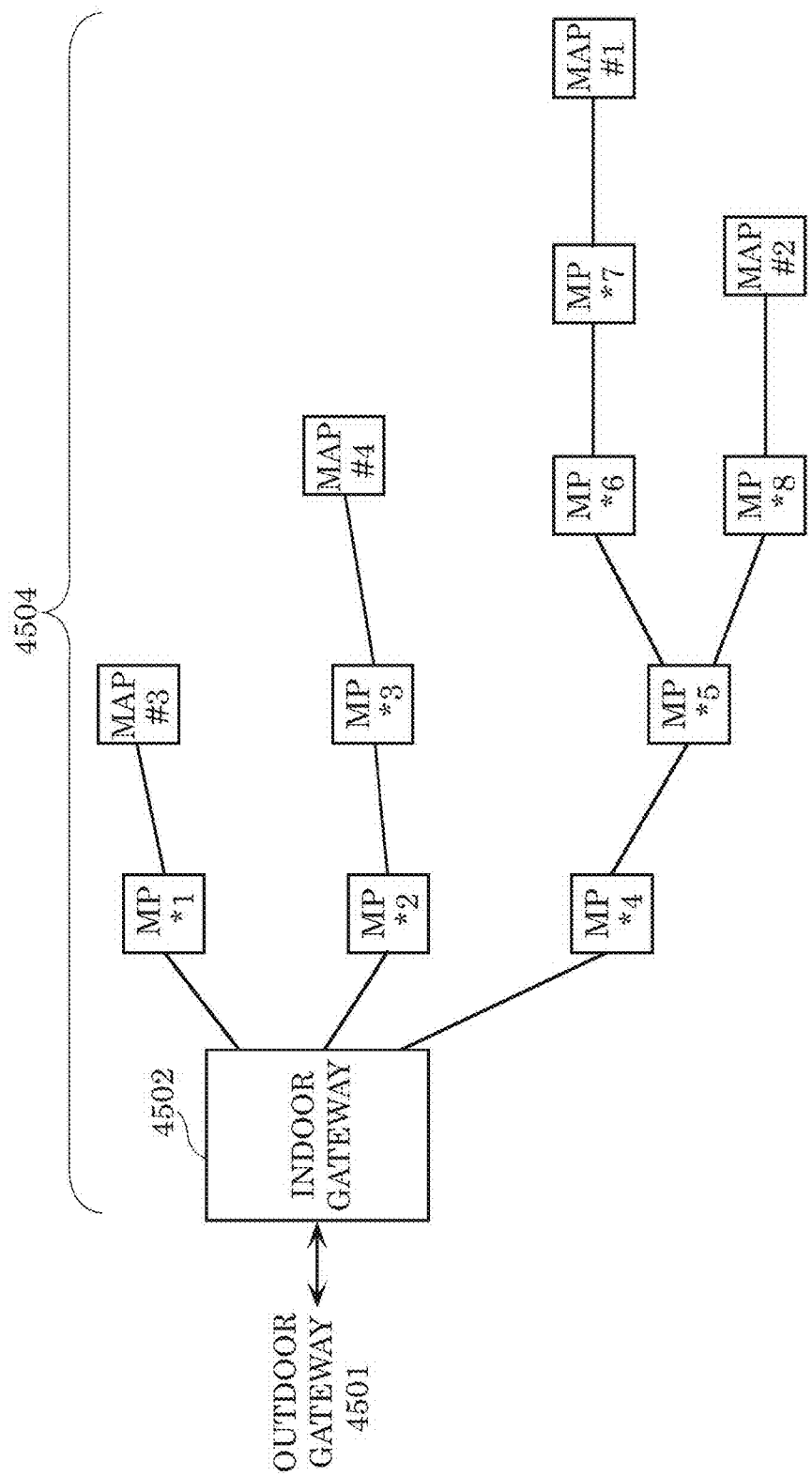
FIG. 53 illustrates one example of a configuration of an indoor network.

FIG. 53 illustrates one example of a configuration of an indoor network. Note the mesh network formed as a result of the creation of the route map is, for example, the network illustrated in FIG. 53.

Indoor gateway 4502 creates a route map for MAP #1. This route map indicates that indoor gateway 4502 can transmit data to MAP #1, by, (a), indoor gateway 4502 transmitting data to MP *4, MP *4 transmitting the data to MP *5, MP *5 transmitting the data to MP *6, MP *6 transmitting the data to MP *7, and MP *7 transmitting the data to MAP #1. This route map also indicates that MAP #1 can transmit data to indoor gateway 4502, by, (b), MAP #1 transmitting data to MP *7, MP *7 transmitting the data to MP *6, MP *6 transmitting the data to MP *5, MP *5 transmitting data to MP *4, and MP *4 transmitting the data to the indoor gateway 4502.

(3) Packet Transmission Operations

Indoor gateway 4502 transmits information based on this route map information. Upon transmitting this information, indoor gateway 4502 also transmits control information including node route information. Accordingly, each node knows the transmission destination of the frame based on the transmitted control information.

Similarly, MAP #1 creates a route map for indoor gateway 4502. MAP #1 then transmits information based on this route map information. Upon transmitting this information, MAP #1 also transmits control information including node route information. Accordingly, each node knows the transmission destination of the frame based on the transmitted control information.

The configuration of the frame and the examples of operations are the same as those described with reference to FIG. 52.

As described above, the communication from indoor gateway 4502 to the terminal can be implemented wirelessly, which makes it possible to achieve the advantageous effect that it is possible to provide an environment with little wiring for transmitting data indoors. Moreover, it is also possible to connect the indoor network and the outdoor network via wireless data communication, which makes it possible to achieve the advantageous effect that it is possible to provide an environment with little wiring for transmitting data.

Next, two cases—a first case and a second case—regarding the timing at which operation (1) described above is performed will be described (see FIG. 54). In the first case, operation (1) and operation (2) are performed at a given time interval. In the second case, operation (1) is performed once again when an MP or MAP is added to the indoor network.

The first case has already been described. Hereinafter, the second case will be described.

Figure 55:
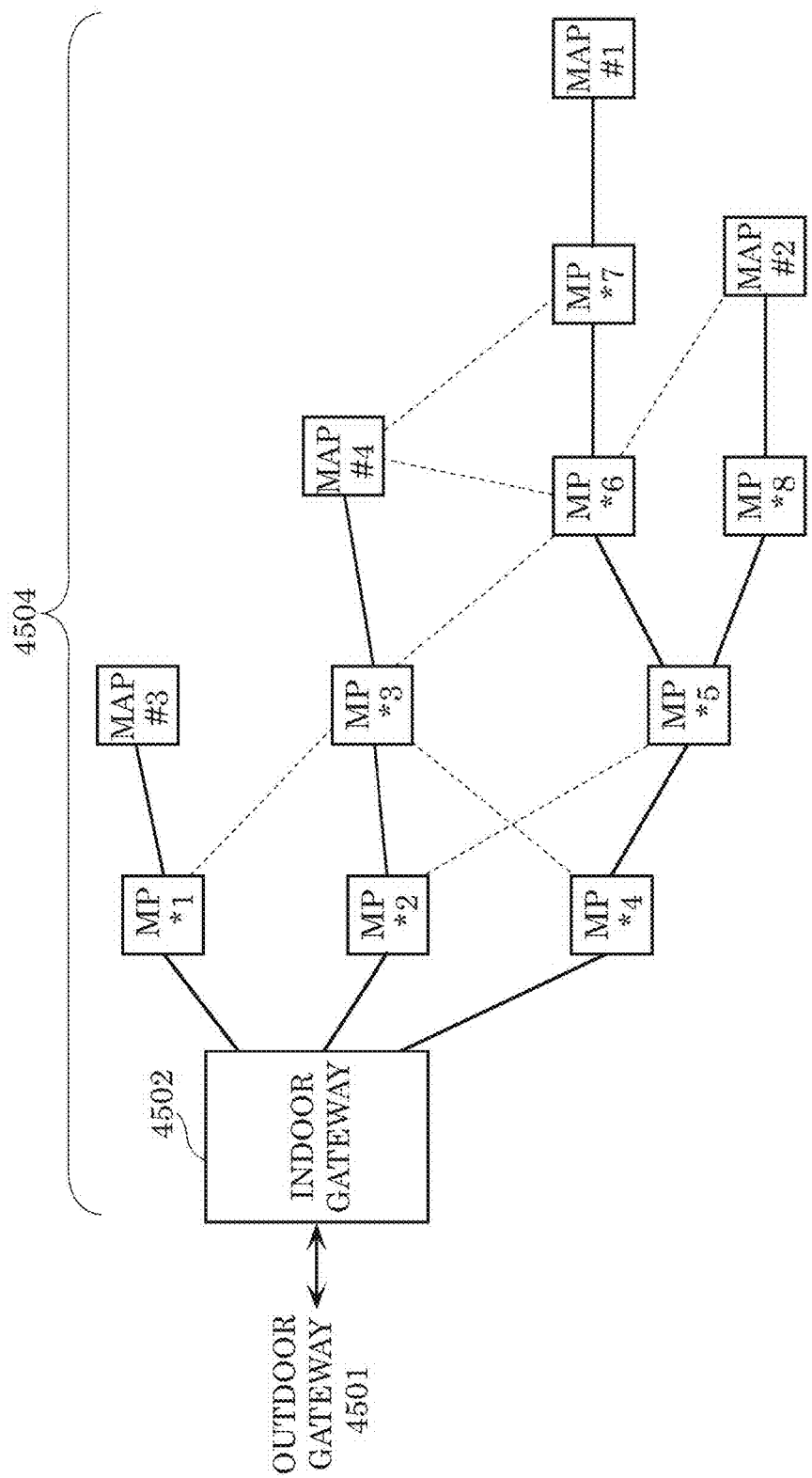
FIG. 55 illustrates one example of a configuration of an indoor network.
Figure 56:
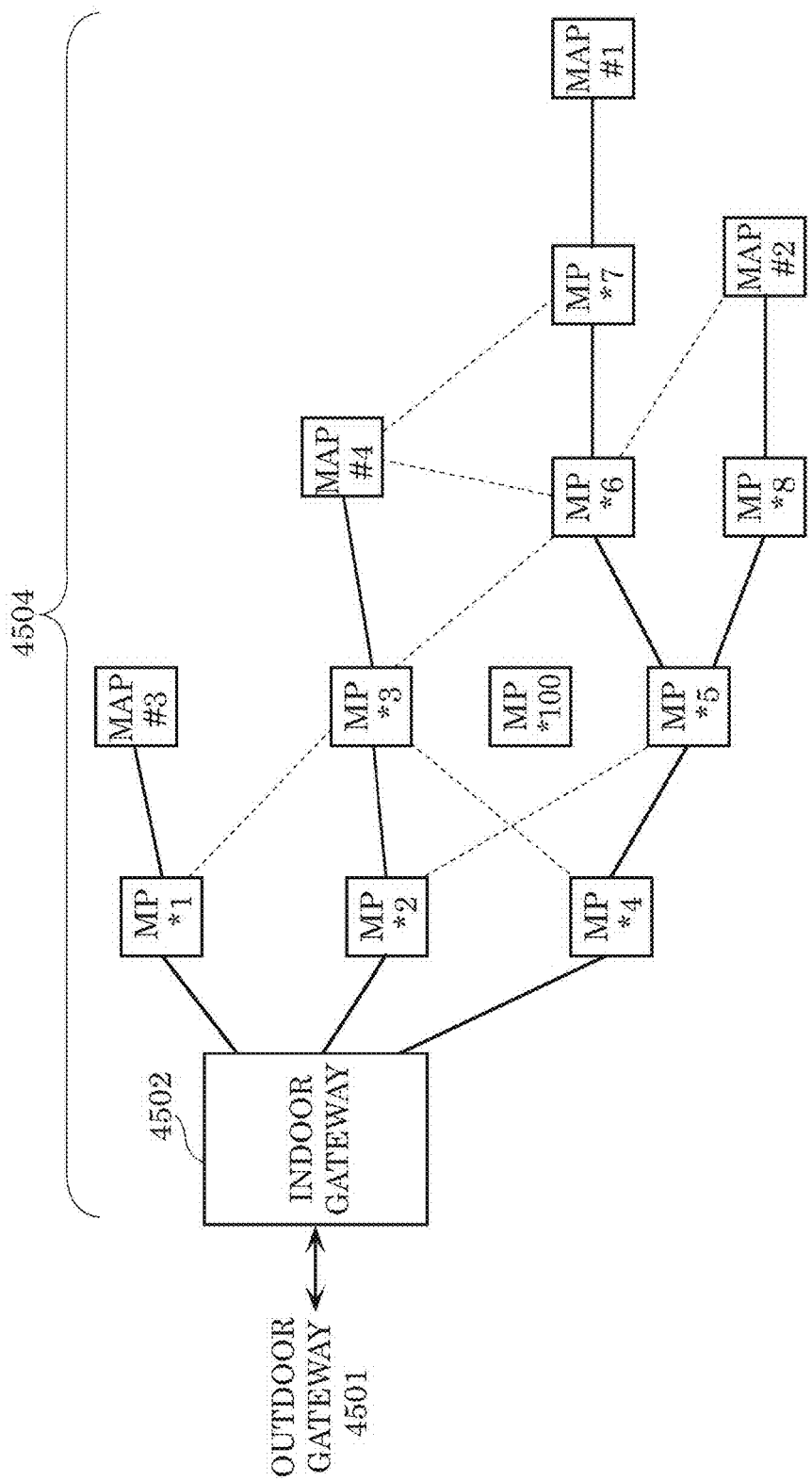
FIG. 56 illustrates one example of a configuration of an indoor network.
Figure 57:
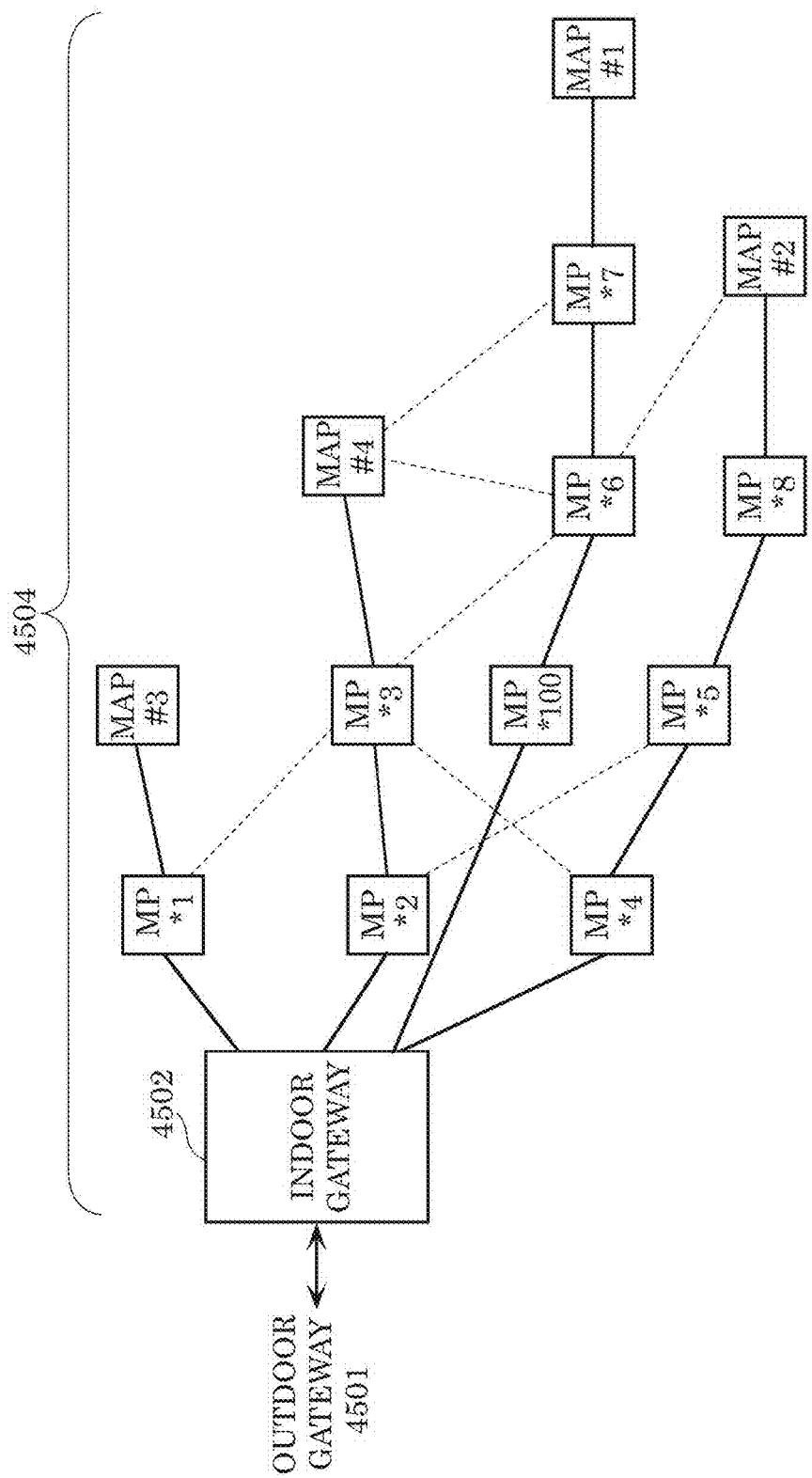
FIG. 57 illustrates one example of a configuration of an indoor network.

Here, consider a case in which the network configuration illustrated in FIG. 55 is altered to the network configuration illustrated in FIG. 56. Note that since the network configuration illustrated in FIG. 55 has already been described, repeated description thereof will be omitted. The network configuration illustrated in FIG. 56 differs from the network configuration illustrated in FIG. 55 in regard to the addition of MP *100. The configuration of indoor network 4504 after MP *100 has been added is illustrated in FIG. 57.

Figure 58:
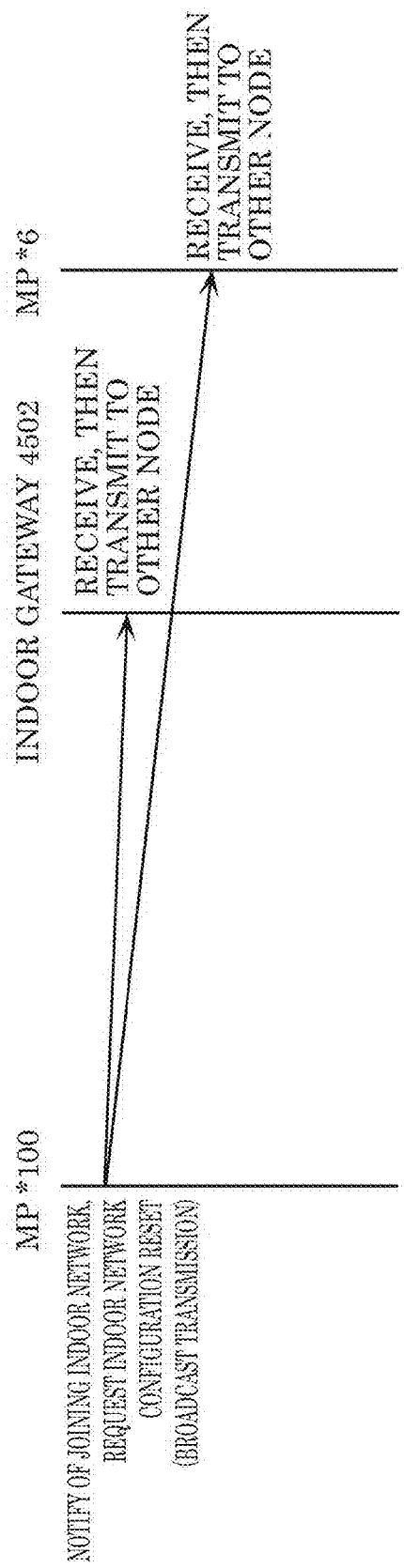
FIG. 58 illustrates one example of a communication sequence.

Processes performed when MP *100 is added to indoor network 4504 will be described with reference to FIG. 58.

First, MP *100 notifies nodes on indoor network 4504 that MP *100 is going to join indoor network 4504. At this time, MP *100 broadcasts (multicasts) a notification that it will join the indoor network.

In actuality, the above-described notification is only transmitted to nodes adjacent to MP *100. As illustrated in FIG. 57, nodes adjacent to MP *100 include the indoor gateway and MP *6, so the above-described notification is received by indoor gateway 4502 and MP *6.

MP *100 also broadcasts (multicasts) a request for the indoor network configuration to be reset. The request for the indoor network configuration to be reset is also received by the indoor gateway and MP *6.

Next, indoor gateway 4502 and MP *6 broadcast (multicast) the notification that MP *100 will join the indoor network and the request for the indoor network configuration to be reset. Thereafter, other nodes also broadcast (multicast) the notification that MP *100 will join the indoor network and the request for the indoor network configuration to be reset; an example of the regulations regarding the broadcast (multicast) is as has already been described.

Note that in the above example, an MP is exemplified as being added to indoor network 4504, but a MAP may be added to indoor network 4504. In such cases, the operations that are described above as being performed by the MP can be rewritten as being performed by the MAP to achieve the same implementation.

Subsequently, operations (1) and (2) are performed, whereby operation (3) can be performed.

With this, by configuring indoor network 4504 so that new MPs or MAPs can be added, it is possible to improve the indoor communication environment. This achieves the advantageous effect that it is possible to improve data transmission quality and improve data transfer speeds.

Note that in the above description, the terminology "indoor network" is used, but indoor gateway 4502, MP *1, etc., and MAP #1, etc., may be provided outdoors. In other words, the location in which indoor gateway 4502, MP *1, etc., and MAP #1, etc., are provided is not limited to being indoors.

Moreover, MP *1, etc., includes functionality as a repeater (data forwarding function), but MP *1, etc., may include functionality as an access point for communicating with terminals. Similarly, indoor gateway 4502 may include functionality as an access point for communicating with terminals.

Moreover, indoor gateway 4502, MP *1, etc., and MAP #1, etc., may include a device that generates data, such as a camera or a sensor. Moreover, indoor gateway 4502, MP *1, etc., and MAP #1, etc., may include an interface for connecting with a device that generates data, such as a camera or a sensor, and may include functionality as a repeater (data forwarding function) described in the present embodiment for transmitting data generated by such a device to a terminal or indoor gateway 4502.

Supplementary Information A1

In FIG. 45, indoor gateway 4502 receives power from an alternating current (AC) power source or a direct current (DC) power source via power receiver 4502c, by, for example, wire. This makes it possible to achieve the advantageous effect that power is further stably supplied to indoor gateway 4502.

Outdoor gateway 4501, on the other hand, does not include a power receiver that receives power by wire from an AC power source or a DC power source, but instead, as is illustrated in FIG. 45, receives a wireless supply of power from indoor gateway 4502. More specifically, wireless power receiver 4501c in outdoor gateway 4501 wirelessly receives a supply of power (transmitted power) from wireless power supplier 4502d in indoor gateway 4502. This configuration reduces the possibility of a short occurring in the power receiver that receives power by wire from an AC power source or a DC power source caused by rainfall or a lightning strike. This achieves the advantageous effect that it is easy to implement protection against moisture and drops of water.

Indoor gateway 4502 and outdoor gateway 4501 illustrated in FIG. 45, FIG. 46, or FIG. 47, the Wi-Fi APs and the repeaters illustrated in FIG. 46, and the MPs and MAPs illustrated in FIG. 47 may include wireless communication functionality in a single frequency band and, alternatively, may include wireless communication functionality in two or more frequency bands.

As used herein, "include wireless communication functionality in a single frequency band" may mean "include wireless communication functionality in the 60 GHz band".

Moreover, "include wireless communication functionality in two or more frequency bands" may mean "include wireless communication functionality in the 2.4 GHz band and include wireless communication functionality in the 60 GHz band", may mean "include wireless communication functionality in the 5 GHz band and include wireless communication functionality in the 60 GHz band", and may mean "include wireless communication functionality in the 2.4 GHz band, include wireless communication functionality in the 5 GHz band, and include wireless communication functionality in the 60 GHz band".

Note that the specific meaning of "include wireless communication functionality in two or more frequency bands" is not limited to the above examples. For example, "include wireless communication functionality in two or more frequency bands" may mean "include wireless communication functionality in an A (Hz) frequency band and include wireless communication functionality in a B (Hz) frequency band, where A is a real number that is greater than or equal to 0, B is a real number that is greater than or equal to 0, and A≠B".

In another example, "include wireless communication functionality in two or more frequency bands" may mean "include wireless communication functionality in an A (Hz) frequency band, include wireless communication functionality in a B (Hz) frequency band, and include wireless communication functionality in a C (Hz) frequency band, where A is a real number that is greater than or equal to 0, B is a real number that is greater than or equal to 0, C is a real number that is greater than or equal to 0, A≠B, A≠C, and B≠C".

Indoor gateway 4502 and outdoor gateway 4501 illustrated in FIG. 45, FIG. 46, or FIG. 47, the Wi-Fi APs and the repeaters illustrated in FIG. 46, and the MPs and MAPs illustrated in FIG. 47 may include optical communication functionality, may form the mesh network (multihop network) described in the present specification via optical communication, and relay frames via optical communication. This method can also achieve the same advantageous effects as described above.

Moreover, when an object that transmits light, such as a glass window (e.g., a pane of glass) is disposed between indoor gateway 4502 and outdoor gateway 4501 illustrated in FIG. 45, optical communication can be used for the communication between indoor gateway 4502 and outdoor gateway 4501.

Consider an example in which a WTTH network formed using outdoor gateway 4501 is formed by wireless communication via radio waves, and indoor network 4504 formed using indoor gateway 4502 is also formed by wireless communication via radio waves. In such cases, communication between indoor gateway 4502 and outdoor gateway 4501 may be optical communication, may be wireless communication via radio waves, and communication may be switched between optical communication and wireless communication via radio waves depending on the situation. Moreover, communication between indoor gateway 4502 and outdoor gateway 4501 may be switched between optical communication and wireless communication via radio waves depending on the material of the object between the indoor gateway and the outdoor gateway.

Embodiment A2

Figure 59:
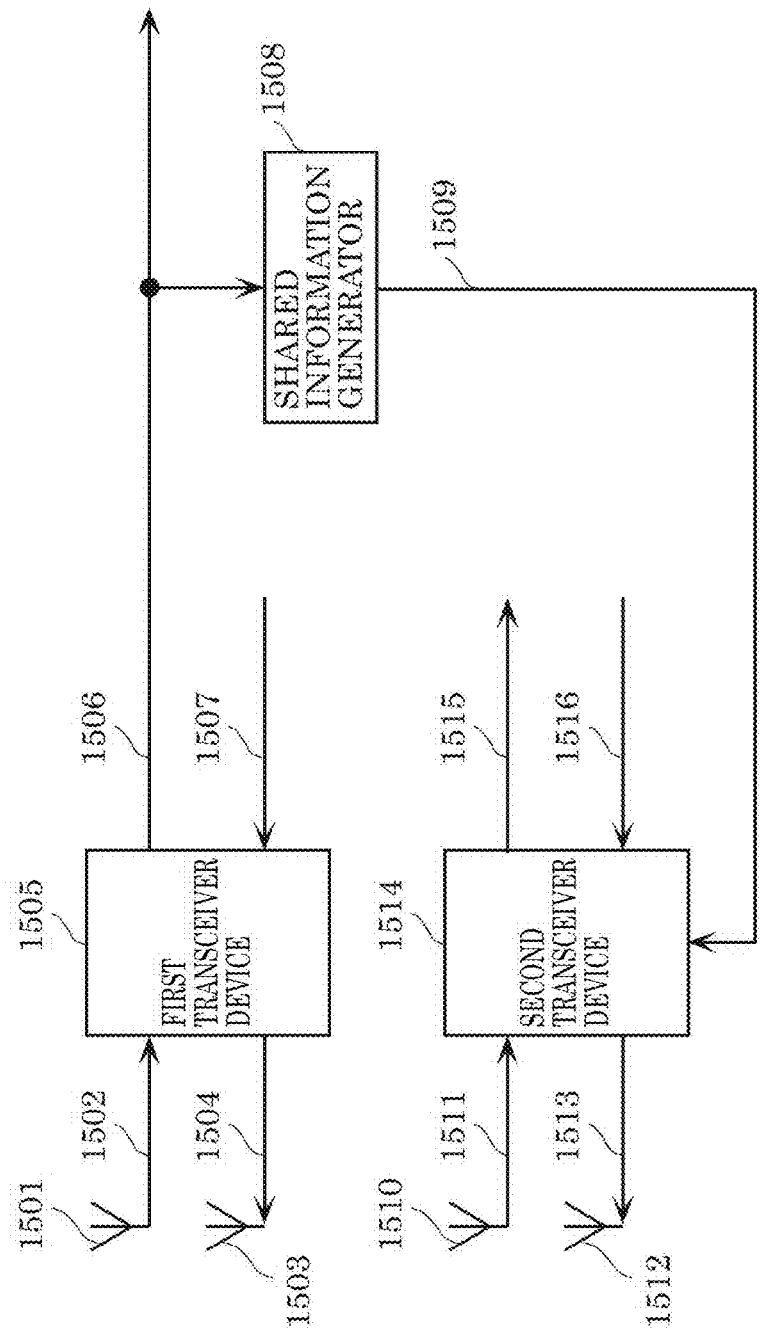
FIG. 59 illustrates one example of a configuration of an indoor gateway.

FIG. 59 illustrates one example of a configuration of nodes illustrated in FIG. 47 (i.e., any one of indoor gateway 4502, MP *1, etc., and MAP #1, etc.). The configuration illustrated in FIG. 59 illustrates, among all functionality of the node, the functionality related to the transmission and reception of frames.

First transceiver device 1505 is a transceiver device for a first wireless communication method that operates in an A (Hz) frequency band. Second transceiver device 1514 is a transceiver device for a second wireless communication method that operates in a B (Hz) frequency band. In this example, A is a real number that is greater than or equal to 0, B is a real number that is greater than or equal to 0, and A>B. For example, the first wireless communication method operates in the 60 GHZ (A=60 G) frequency band, and the second wireless communication method operates in the 2.4 GHZ (B=2.4 G) frequency band.

Although the example in FIG. 59 illustrates a configuration of a node that uses two frequency bands, the node may use three or more frequency bands. In such cases, the node includes as many transceiver devices as required to communicate using the three or more frequency bands.

First transceiver device 1505 receives an input of received signal 1502 received by antenna 1501, performs processing such as demodulation and error correction decoding, and outputs received data 1506. Note that received signal 1502 is a signal conforming to the first wireless communication method that operates in the A (Hz) frequency band.

Moreover, first transceiver device 1505 receives an input of received signal 1502, performs communication environment estimation, and outputs reception state signal 1599.

First transceiver device 1505 receives an input of transmission data 1507, performs processing such as error correction coding, mapping, and frequency conversion, and generates and outputs transmission signal 1504. Antenna 1503 then outputs transmission signal 1504 as radio waves. Note that transmission signal 1504 is a signal conforming to the first wireless communication method that operates in the A (Hz) frequency band.

Shared information generator 1508 receives an input of received data 1506 and reception state signal 1599, and generates and outputs information 1509 to be shared. This will be described in greater detail later.

Second transceiver device 1514 receives an input of received signal 1511 received by antenna 1510, performs processing such as demodulation and error correction decoding, and outputs received data 1515. Note that received signal 1511 is a signal conforming to the second wireless communication method that operates in the B (Hz) frequency band.

Second transceiver device 1514 receives an input of transmission data 1516 and information 1509 to be shared, performs processing such as error correction coding, mapping, and frequency conversion, and generates and outputs transmission signal 1513. Antenna 1512 then outputs transmission signal 1513 as radio waves. Note that transmission signal 1513 is a signal conforming to the second wireless communication method that operates in the B (Hz) frequency band.

Figure 60:
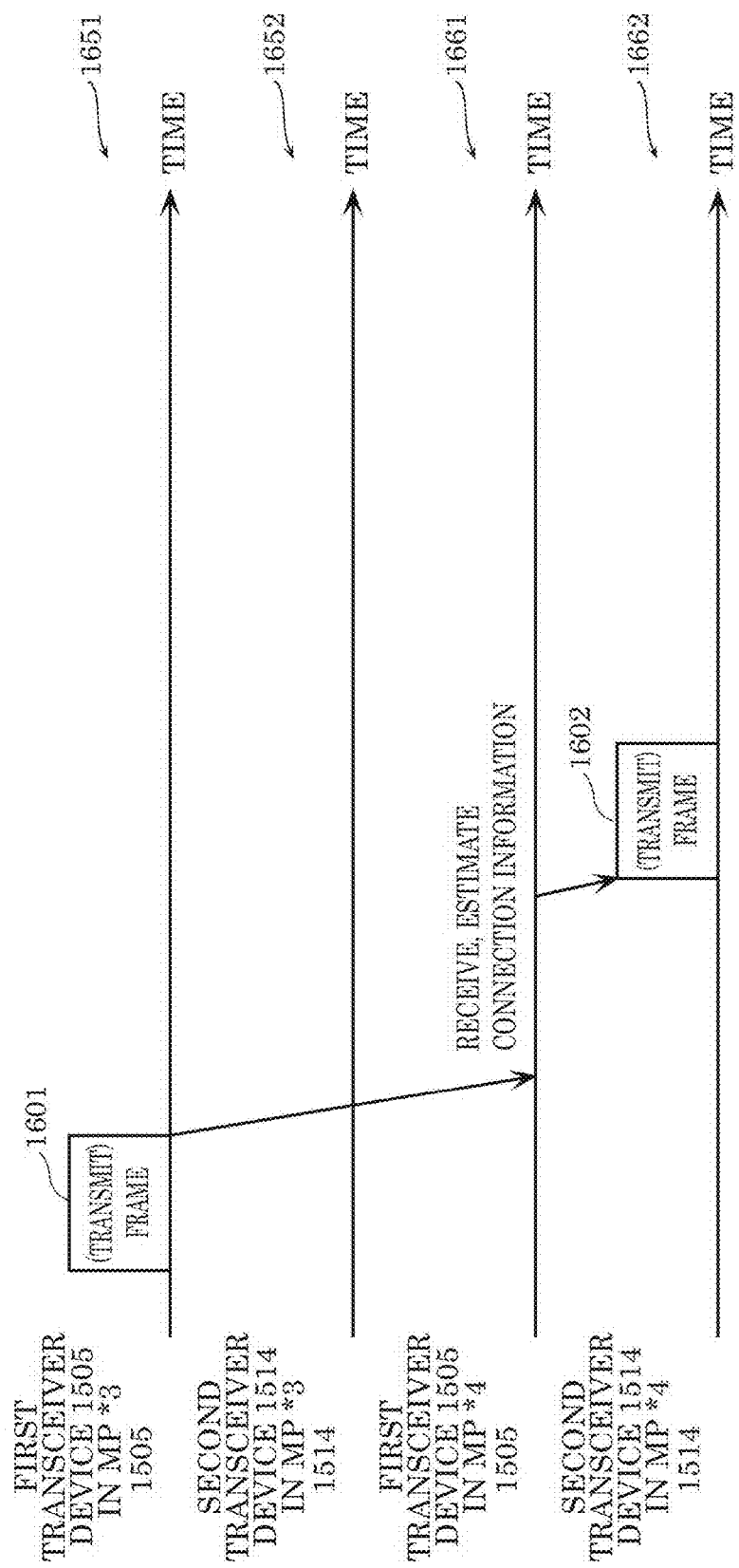
FIG. 60 illustrates one example of frame transmission and reception.

FIG. 60 illustrates an example of communication between MP *3 and MP *4 illustrated in FIG. 47. Note that here, each of MP *3 and MP *4 is a device that has configuration illustrated in FIG. 59.

In FIG. 60, graph 1651 illustrates the flow of communication performed by first transceiver device 1505 included in MP *3. Graph 1652 illustrates the flow of communication performed by second transceiver device 1514 included in MP *3. Graph 1661 illustrates the flow of communication performed by first transceiver device 1505 included in MP *4. Graph 1662 illustrates the flow of communication performed by second transceiver device 1514 included in MP *4. In graphs 1651, 1652, 1661, and 1662, time is represented on the horizontal axis.

First, as illustrated in FIG. 60, first transceiver device 1505 included in MP *3 transmits frame 1601. Note that one example of the configuration of frame 1601 is the configuration illustrated in FIG. 48. Moreover, frame 1601 is a frame that conforms to the first wireless communication method that operates in the A (Hz) frequency band.

Next, for example, first transceiver device 1505 included in MP *4 receives frame 1601. After receiving frame 1601, first transceiver device 1505 included in MP *4 estimates the reception state at the time that first transceiver device 1505 included in MP *3 transmitted the modulated signal. First transceiver device 1505 included in MP *4 knows that the device that transmitted the modulated signal is MP *3 as a result of obtaining the device identification information from the device identification information symbol.

Then, second transceiver device 1514 included in MP *4 transmits frame 1602. Note that frame 1602 is a frame that conforms to the second wireless communication method that operates in the B (Hz) frequency band.

Figure 61:
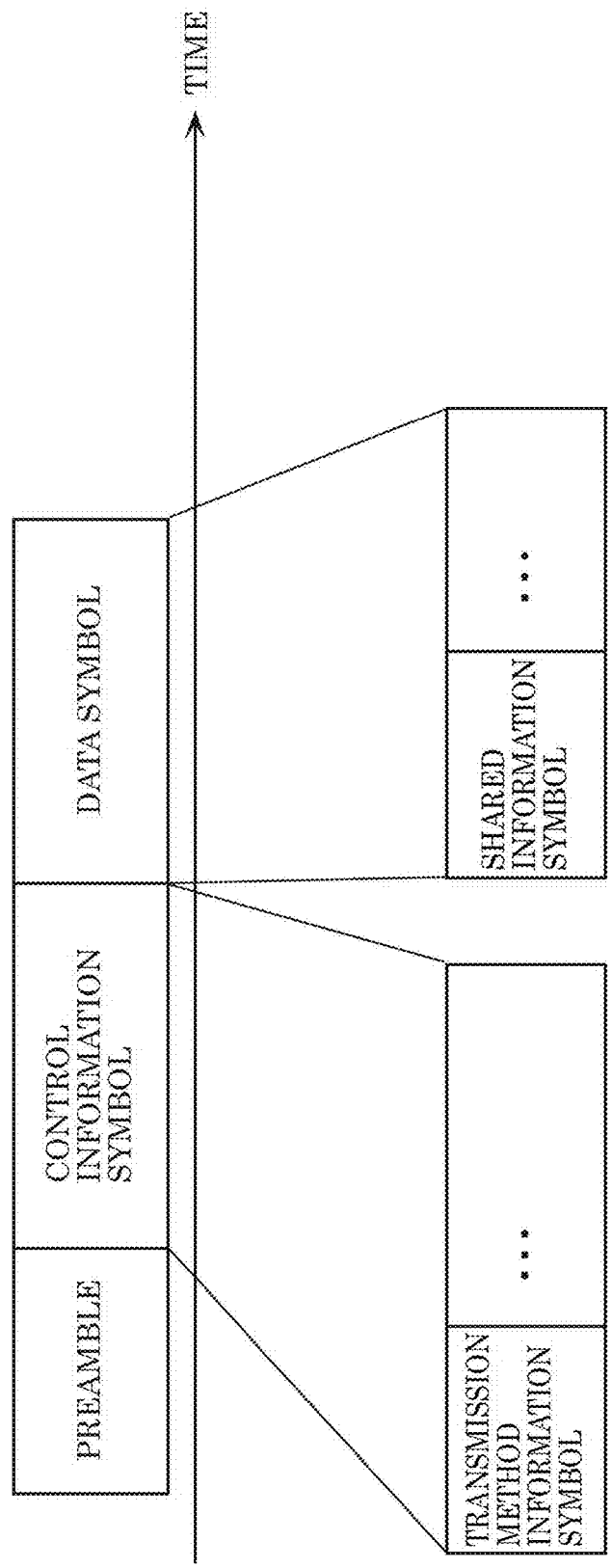
FIG. 61 illustrates one example of a frame configuration.

One example of frame 1602 is illustrated in FIG. 61. Time is represented on the horizontal axis. For example, frame 1602 includes a preamble, a control information symbol, and a data symbol.

The preamble in FIG. 61 is a symbol for the communication partner to perform, for example, time synchronization and frequency synchronization (signal detection may be performed). Note that in this example, the communication partner includes one or more devices, or two or more devices. Here, a "device" is any one of indoor gateway 4502, MP #1, etc., and MAP *1, etc.

The control information symbol included in FIG. 61 includes a transmission method information symbol. The transmission method information symbol includes information indicating whether frame 1602 is to be broadcast (multicast) or to be unicast. Note that frame 1602 is a frame to be broadcast (multicast). Moreover, the transmission method information symbol may include information about the transmission method such as the error correction coding method or modulation method used to generate the data symbol, and/or information about the number of streams transmitted.

The data symbol in FIG. 61 includes a shared information symbol. When performing communication like illustrated in FIG. 60, the shared information symbol includes information indicating an estimation of the reception state at the time that first transceiver device 1505 included in MP *3 transmitted the modulated signal, and information indicating that the device that transmitted the modulated signal is MP *3.

Subsequently, one or more devices or two or more devices receive frame 1602 transmitted by second transceiver device 1514 included in MP *4, whereby each device obtains the information indicating an estimation of the reception state at the time that first transceiver device 1505 included in MP *3 transmitted the modulated signal, and information indicating that the device that transmitted the modulated signal is MP *3. Note that in the example illustrated in FIG. 47, frame 1602 is received by indoor gateway 4502, MP *1, MP *2, MP *3, MP *5, MP *6, MP *7, MP *8, MAP #1, MAP #2, MAP #3, and MAP #4.

This is easily achieved due to A being greater than B. The reason being that the distance over which communication via relatively low frequencies is possible is longer.

This makes it possible to achieve the advantageous effect that one or more or two or more devices can easily achieve the communication state between MP *3 and MP *4. This achieves the advantageous effects that it easier for each node to know the mesh network configuration and that it is possible to easily create a route map in the mesh network.

Although a method of sharing the communication state between MP *3 and MP *4 with other devices has been described in this example, a method of sharing a communication state between devices other than MP *3 and MP *4 with other devices can be implemented in the same manner.

Moreover, for example, the first wireless communication method may operate in the 60 GHZ (A=60 G) frequency band, and the second wireless communication method may operate in the 5 GHZ (B=5 G) frequency band. However, this example is not limiting.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Note that the information to be shared that is included in the shared information symbol is not limited to the example given in the present embodiment. For example, information that needs to be shared in order to form the mesh network (multihop network) may be included in the shared information symbol.

Embodiment A3

Figure 62:
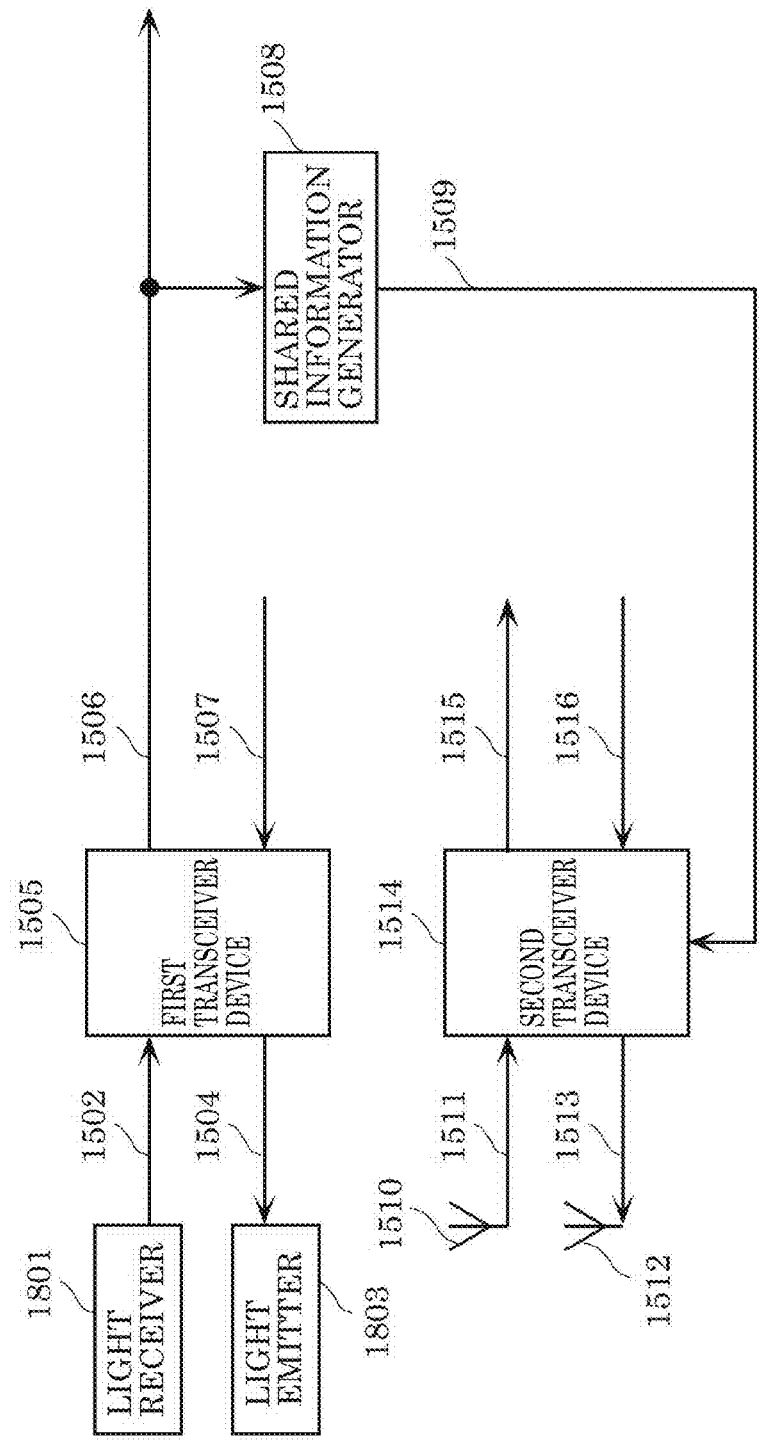
FIG. 62 illustrates one example of a configuration of an indoor gateway.

FIG. 62 illustrates one example of a configuration of any one of indoor gateway 4502, MP *1, etc., and MAP #1, etc., illustrated in FIG. 47. First transceiver device 1505 is a transceiver device for a first wireless communication method for optical I communication, and second transceiver device 1514 is a transceiver device for a second wireless communication method that operates in a B (Hz) frequency band, where B is a real number that is greater than or equal to 0. Although the example illustrated in FIG. 62 includes two transceiver devices, three or more transceiver devices may be included.

First transceiver device 1505 receives an input of received signal 1502 received by light receiver 1801, performs processing such as demodulation and error correction decoding, and outputs received data 1506. Note that light receiver 1801 can be implemented as, for example, a photodiode, a complementary metal oxide semiconductor (CMOS) image sensor, or an organic CMOS sensor.

Moreover, first transceiver device 1505 receives an input of received signal 1502, performs communication environment estimation, and outputs reception state signal 1599.

First transceiver device 1505 receives an input of transmission data 1507, performs processing such as error correction coding, mapping, and frequency conversion, and generates and outputs transmission signal 1504. Light emitter 1803 then outputs transmission signal 1504. Note that light emitter 1803 can be implemented as, for example, a light emitting diode (LED).

Shared information generator 1508 receives an input of received data 1506 and reception state signal 1599, and generates and outputs information 1509 to be shared. This will be described in greater detail later.

Second transceiver device 1514 receives an input of received signal 1511 received by antenna 1510, performs processing such as demodulation and error correction decoding, and outputs received data 1515. Note that received signal 1511 is a signal conforming to the second wireless communication method that operates in the B (Hz) frequency band.

Second transceiver device 1514 receives an input of transmission data 1516 and information 1509 to be shared, performs processing such as error correction coding, mapping, and frequency conversion, and generates and outputs transmission signal 1513. Antenna 1512 then outputs transmission signal 1513 as radio waves. Note that transmission signal 1513 is a signal conforming to the second wireless communication method that operates in the B (Hz) frequency band.

FIG. 60 illustrates an example of communication between MP *3 and MP *4 illustrated in FIG. 47. Note that here, each of MP *3 and MP *4 is a device that has the configuration illustrated in FIG. 62.

In FIG. 60, graph 1651 illustrates the flow of communication performed by first transceiver device 1505 included in MP *3. Graph 1652 illustrates the flow of communication performed by second transceiver device 1514 included in MP *3. Graph 1661 illustrates the flow of communication performed by first transceiver device 1505 included in MP *4. Graph 1662 illustrates the flow of communication performed by second transceiver device 1514 included in MP *4. In graphs 1651, 1652, 1661, and 1662, time is represented on the horizontal axis.

First, as illustrated in FIG. 60, first transceiver device 1505 included in MP *3 transmits frame 1601. Note that one example of the configuration of frame 1601 is the configuration illustrated in FIG. 48. Note that frame 1601 is an optical communication frame.

Next, for example, first transceiver device 1505 included in MP *4 receives frame 1601. After receiving frame 1601, first transceiver device 1505 included in MP *4 estimates the reception state at the time that first transceiver device 1505 included in MP *3 transmitted the modulated signal. First transceiver device 1505 included in MP *4 knows that the device that transmitted the modulated signal is MP *3 as a result of obtaining the device identification information from the device identification information symbol.

Then, second transceiver device 1514 included in MP *4 transmits frame 1602. Note that frame 1602 is a frame that conforms to the second wireless communication method that operates in the B (Hz) frequency band.

One example of frame 1602 is illustrated in FIG. 61. Time is represented on the horizontal axis. For example, frame 1602 includes a preamble, a control information symbol, and a data symbol.

The preamble in FIG. 61 is a symbol for the communication partner to perform time synchronization and frequency synchronization. Note that in this example, the communication partner includes one or more devices, or two or more devices. Here, a "device" is any one of indoor gateway 4502, MP #1, etc., and MAP *1, etc.

The control information symbol included in FIG. 61 includes a transmission method information symbol. The transmission method information symbol includes information indicating whether frame 1602 is to be broadcast (multicast) or to be unicast. Note that frame 1602 is a frame to be broadcast (multicast). Moreover, the transmission method information symbol may include information about the transmission method such as the error correction coding method or modulation method used to generate the data symbol, and/or information about the number of streams transmitted.

The data symbol in FIG. 61 includes a shared information symbol. When performing communication like illustrated in FIG. 60, the shared information symbol includes information indicating an estimation of the reception state at the time that first transceiver device 1505 included in MP *3 transmitted the modulated signal, and information indicating that the device that transmitted the modulated signal is MP *3.

Subsequently, one or more devices or two or more devices receive frame 1602 transmitted by second transceiver device 1514 included in MP *4, whereby each device obtains the information indicating an estimation of the reception state at the time that first transceiver device 1505 included in MP *3 transmitted the modulated signal, and information indicating that the device that transmitted the modulated signal is MP *3.

Note that in the example illustrated in FIG. 47, frame 1602 is received by indoor gateway 4502, MP *1, MP *2, MP *3, MP *5, MP *6, MP *7, MP *8, MAP #1, MAP #2, MAP #3, and MAP #4.

Here, when the second wireless communication method that operates in the B (Hz) frequency band is configured as a wireless communication method achieved via radio waves, implementation is simple. This is because the range in which communication is possible with optical communication is limited due to the straight traveling properties of light.

This makes it possible to achieve the advantageous effect that one or more or two or more devices can easily achieve the communication state between MP *3 and MP *4. This achieves the advantageous effects that it easier for each node to know the mesh network (multihop network) configuration and that it is possible to easily create a route map in the mesh network.

Although a method of sharing the communication state between MP *3 and MP *4 with other devices has been described in this example, a method of sharing a communication state between devices other than MP *3 and MP *4 with other devices can be implemented in the same manner.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Note that the information to be shared that is included in the shared information symbol is not limited to the example given in the present embodiment. For example, information that needs to be shared in order to form the mesh network (multihop network) may be included in the shared information symbol.

Embodiment A4

In Embodiment A2, FIG. 59 illustrates the configuration of the nodes in FIG. 47 (i.e., any one of indoor gateway 4502, MP *1, etc., and MAP #1, etc.), where first transceiver device 1505 is a transceiver device for the first wireless communication method that operates in the A (Hz) frequency band, and second transceiver device 1514 is a transceiver device for the second wireless communication method that operates in the B (Hz) frequency band, where A is a real number that is greater than or equal to 0, B is a real number that is greater than or equal to 0, and A>B.

The communication method used by first transceiver device 1505 and the communication method used by second transceiver device 1514 under such conditions will be described.

Examples of multiplexing methods include, for example, time division multiplexing (TDM), frequency division multiplexing (FDM), carrier sense multiple access (CSMA), and carrier sense multiple access with collision avoidance (CSMA/CA).

Figure 63:
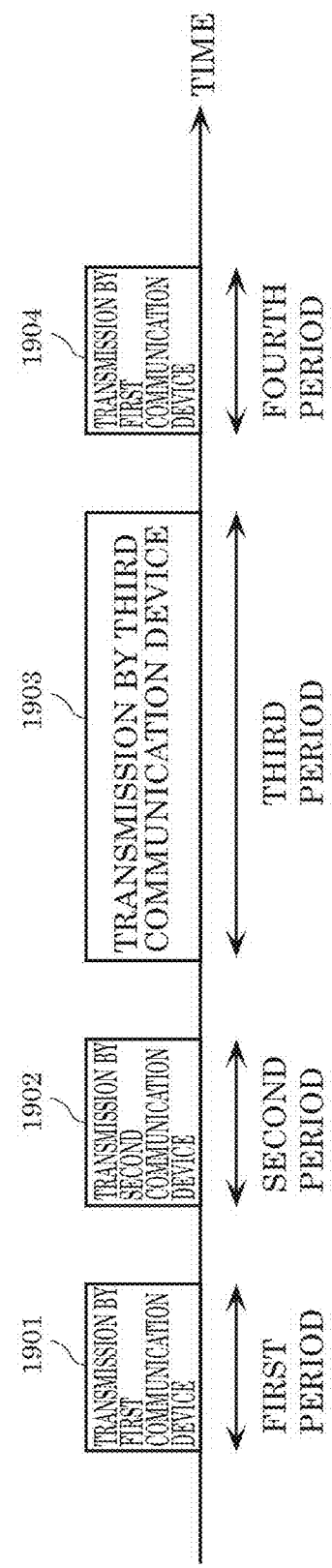
FIG. 63 illustrates one example of frame transmission time.

FIG. 63 illustrates an example of time resource allocation when TDM is implemented. Time is represented on the horizontal axis in FIG. 63.

As illustrated in FIG. 63, in the first period, transmission 1901 of a modulated signal by a first communication device is performed. In the second period, transmission 1902 of a modulated signal by a second communication device is performed. In the third period, transmission 1903 of a modulated signal by a third communication device is performed. In the fourth period, transmission 1904 of a modulated signal by the first communication device is performed.

In this way, which device transmits a modulated signal (frame) is switched via time slots. In particular, a method of achieving communication with a plurality of communication devices by changing time is referred to as time division multiple access (TDMA).

Figure 64:
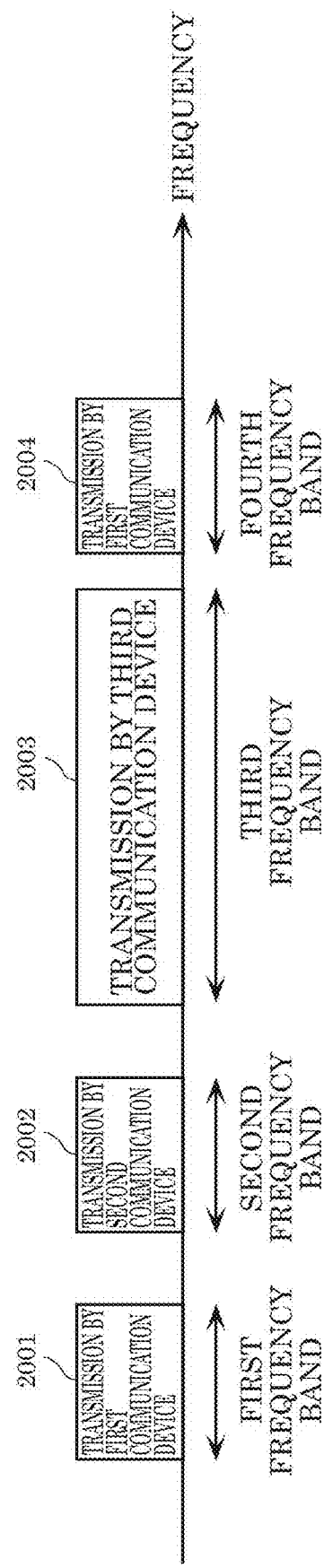
FIG. 64 illustrates one example of frame transmission time.

FIG. 64 illustrates an example of frequency resource allocation when FDM is implemented. Frequency is represented on the horizontal axis in FIG. 64.

As illustrated in FIG. 64, in the first frequency band, transmission 2001 of a modulated signal by the first communication device is performed. In the second frequency band, transmission 2002 of a modulated signal by the second communication device is performed. In the third frequency band, transmission 2003 of a modulated signal by the third communication device is performed. In the fourth frequency band, transmission 2004 of a modulated signal by the first communication device is performed.

In this way, modulated signals (frames) are switched via frequency slots. In particular, a method of achieving communication with a plurality of communication devices by changing frequency is referred to as frequency division multiple access (FDMA).

Figure 65:
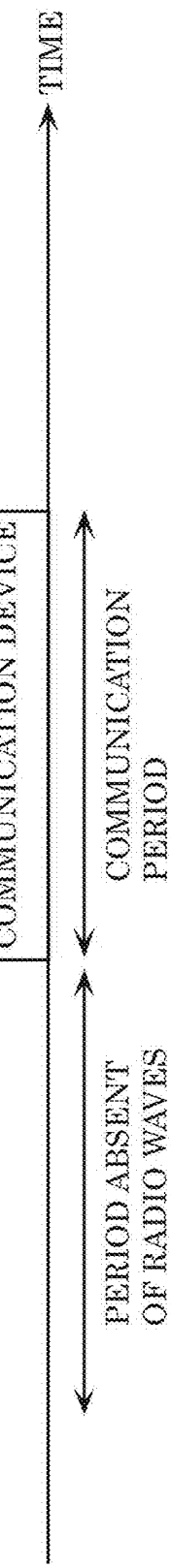
FIG. 65 illustrates one example of frame transmission time.

FIG. 65 illustrates an example of a frame on the time axis when CSMA is implemented. Time is represented on the horizontal axis in FIG. 65.

As illustrated in FIG. 65, there is a period absent of radio waves. The first communication device confirms there is a period absent of radio waves, and performs transmission 2101 of a modulated signal.

In this way, a communication device preparing to start communication checks, before starting communication, whether a surrounding communication device is emitting radio waves or not, and then starts communication. In particular, CSMA that has a collision avoidance feature is referred to as carrier sense multiple access with collision avoidance (CSMA/CA). With CSMA/CA, in order to avoid collision, if a surrounding communication device is emitting radio waves, the communication device waits for a given fixed period of time, and if no surrounding communication device is emitting radio waves, starts transmitting radio waves after a random period of time.

Figure 54:
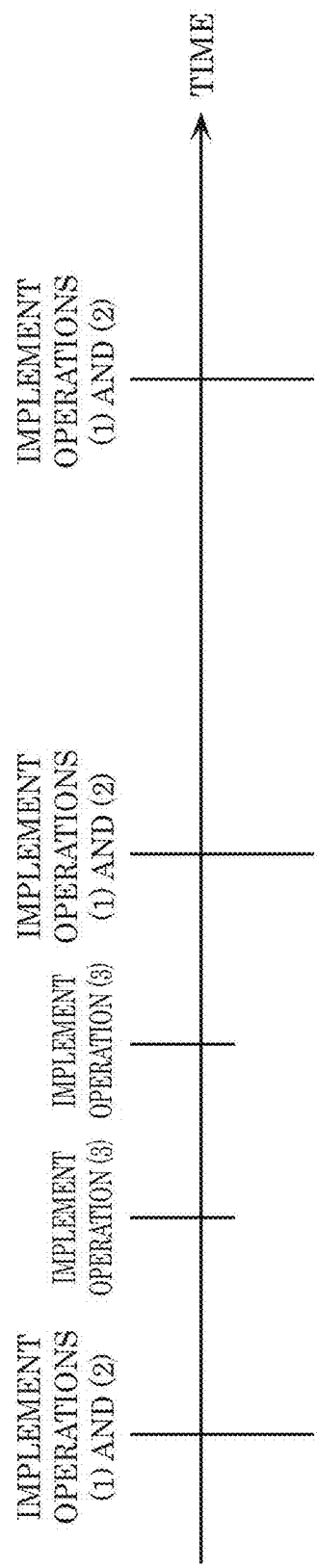
FIG. 54 illustrates one example of operation timing.

As described in Embodiment A2, MP *4 transmits frame 1602 illustrated in FIG. 54 to a plurality of communication devices. In such cases, frame 1602 is a CSMA or CSMA/CA frame. This is because, due to the timing at which frame 1602 is transmitted not being defined by a fixed period and due to frame 1602 being a frame that is broadcast (multicast), transmitting frame 1602 via CSMA or CSMA/CA makes it possible to achieve the advantageous effect that frame 1602 can be precisely received by a plurality of communication devices. This also achieves the advantageous effect that a communication device for controlling whether FDM/FDMA or TDM/TDMA is used not required.

On the other hand, communication in a mesh network (multihop network), may be any one of FDM/FDMA, TDM/TDMA, CSMA or CSMA/CA. In communication in a mesh network, when FDM/FDMA or TDM/TDMA is used, this has the advantage that data can be transmitted intermittently. For example, these schemes are suitable for intermittently relaying a modulated signal.

In communication in a mesh network (multihop network), when CSMA or CSMA/CA is used, this has the advantage that the power consumption of each communication device can be reduced. This can be achieved because modulated signals are transmitted only when data transmission is required.

Accordingly, for example, in the mesh network illustrated in FIG. 47, the advantages described above can be achieved by using FDM/FDMA or TDM/TDMA as the first wireless communication method, and using CSMA or CSMA/CA as the second wireless communication method (i.e., by transmitting frame 1602 using CSMA or CSMA/CA).

As another method, for example, in the mesh network illustrated in FIG. 47, both the first wireless communication method and the second wireless communication method may be CSMA or CSMA/CA.

Furthermore, for example, in the mesh network (multihop network) illustrated in FIG. 47, the advantages described above can be achieved by selecting a suitable one of (i) "FDM/FDMA or TDM/TDMA" and (ii) "CSMA or CSMA/CA" as the first wireless communication method depending on the situation such as the communication situation, propagation environment, and communication mode, and using CSMA or CSMA/CA as the second wireless communication method (i.e., transmitting frame 1602 using CSMA or CSMA/CA). In particular, by selecting a suitable one of (i) "FDM/FDMA or TDM/TDMA" and (ii) "CSMA or CSMA/CA" as the first wireless communication method depending on the situation such as the communication situation, propagation environment, and communication mode, this achieves the advantageous effect that a suitable mesh network (multihop network) can be constructed in accordance with the communication environment.

Note that in the transmission of frame 1602 in FIG. 60, when a communication device for controlling whether FDM/FDMA or TDM/TDMA is used is present, frame 1602 may be transmitted using FDM/FDMA or TDM/TDMA.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Embodiment A5

As is the case in Embodiment A3, the first wireless communication method may be an optical communication method, and the second wireless communication method may be a communication method that uses radio waves in the B (Hz) frequency band.

In such cases, in the mesh network (multihop network) illustrated in FIG. 47, using CSMA or CSMA/CA for the second wireless communication method (i.e., transmitting frame 1602 using CSMA or CSMA/CA) has the advantage that the power consumption of each communication device can be reduced.

Note that in the transmission of frame 1602 in FIG. 60, when a communication device for controlling whether FDM/FDMA or TDM/TDMA is used is present, frame 1602 may be transmitted using FDM/FDMA or TDM/TDMA.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Supplementary Information A2

In the present specification, when wireless communication is performed using radio waves in particular, the number of antennas used for modulated signal transmission may be one, and may be two or more. Similarly, the number of antennas used for modulated signal reception may be one, and may be two or more. When there are two or more antennas that transmit modulated signals, multiple-input multiple-output (MIMO), which transmits a plurality of modulated signals from a plurality of antennas, may be used. Accordingly, in each embodiment in the present specification, even when MIMO is used, the embodiments can be carried out in the same manner, and the same advantageous effects can be achieved.

Embodiment A6

In the present embodiment, an access control method utilizing the network described in the present specification will be described.

Figure 66:
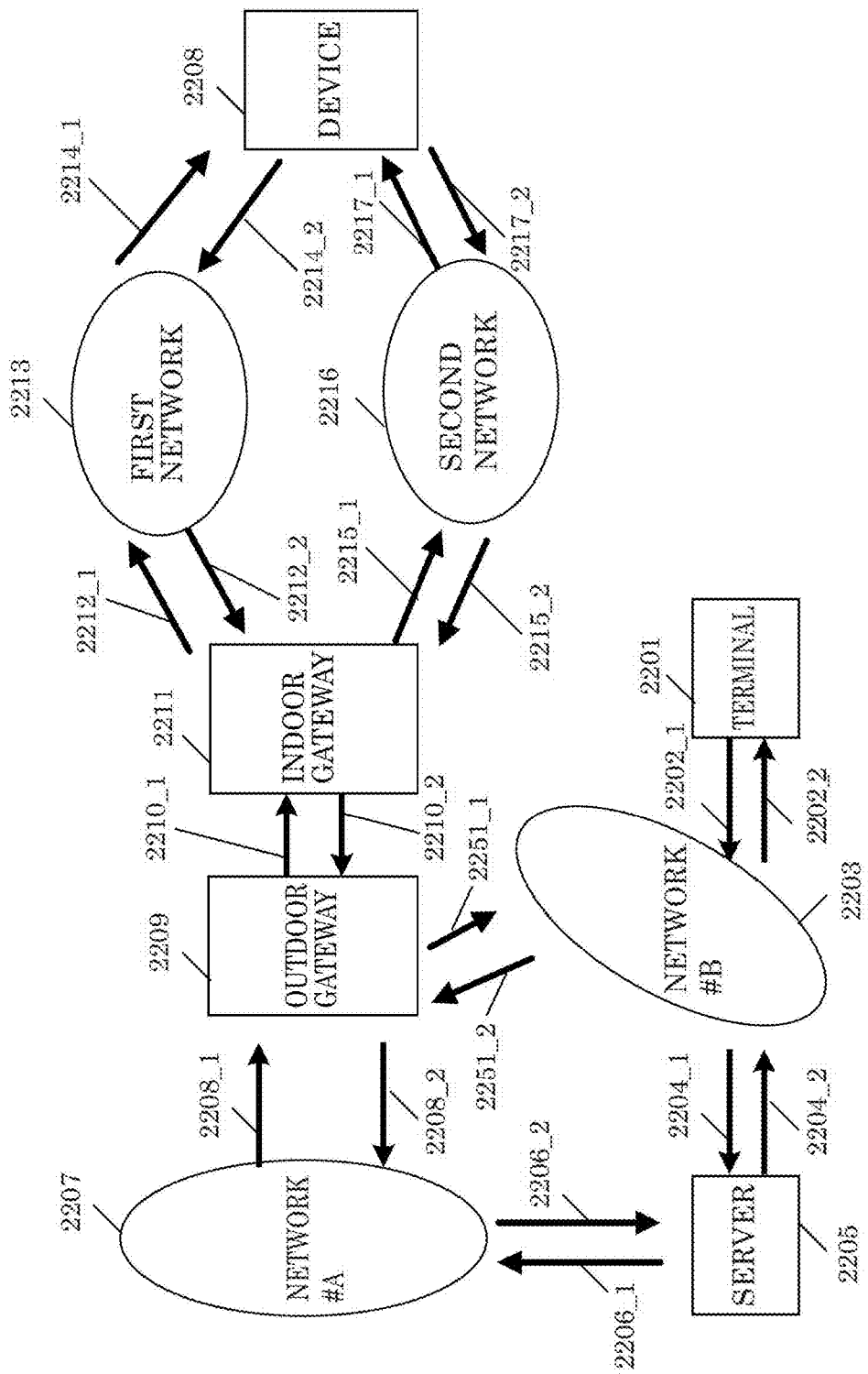
FIG. 66 illustrates one example of a system configuration.

FIG. 66 illustrates a system configuration. For example, in FIG. 66, there are two methods—a first method and a second method—in regard to the relation between first network 2213 and second network 2216.
First Method:
First network 2213 is a network that uses radio waves in the A (Hz) frequency band. Second network 2216 is a network that uses radio waves in the B (Hz) frequency band. Here, A>B.

For example, first network 2213 is a network that uses the 60 GHz (A=60 G) frequency band, and second network 2216 is a network that uses the 2.4 GHZ (B=2.4 G) frequency band. Moreover, a condition that the maximum data transmission speed in wireless communication used in the first network is greater than the maximum data transmission speed in wireless communication used in the second network may be satisfied.

Note that first network 2213 forms a mesh network or a multihop network such as those illustrated in FIG. 47, FIG. 51, FIG. 53, FIG. 55, FIG. 56, and FIG. 57 (however, first network 2213 need not form a mesh network or a multihop network).

Second network 2216 may be formed as a mesh network or a multihop network, and may not be formed as a mesh network or a multihop network.
Second Method:
First network 2213 is a network that uses optical communication.
Second network 2216 is a network that uses radio waves in the B (Hz) frequency band.

Note that first network 2213 forms a mesh network or a multihop network such as those illustrated in FIG. 47, FIG. 51, FIG. 53, FIG. 55, FIG. 56, and FIG. 57 (however, first network 2213 need not form a mesh network or a multihop network).

Second network 2216 may be formed as a mesh network or a multihop network, and may not be formed as a mesh network or a multihop network.

In FIG. 66, device 2208 is communicating with indoor gateway 2211 via first network 2213. Device 2208 is also communicating with indoor gateway 2211 via second network 2216.

Indoor gateway 2211 is communicating with outdoor gateway 2209.

Outdoor gateway 2209 is communicating with server 2205 via network #A labeled 2207.

Outdoor gateway 2209 is communicating with terminal 2201 via network #B labeled 2203.

Server 2205 is communicating with terminal 2201 via network #B labeled 2203.

Note that operations performed by the system illustrated in FIG. 66 will be described in greater detail later.

Figure 67:
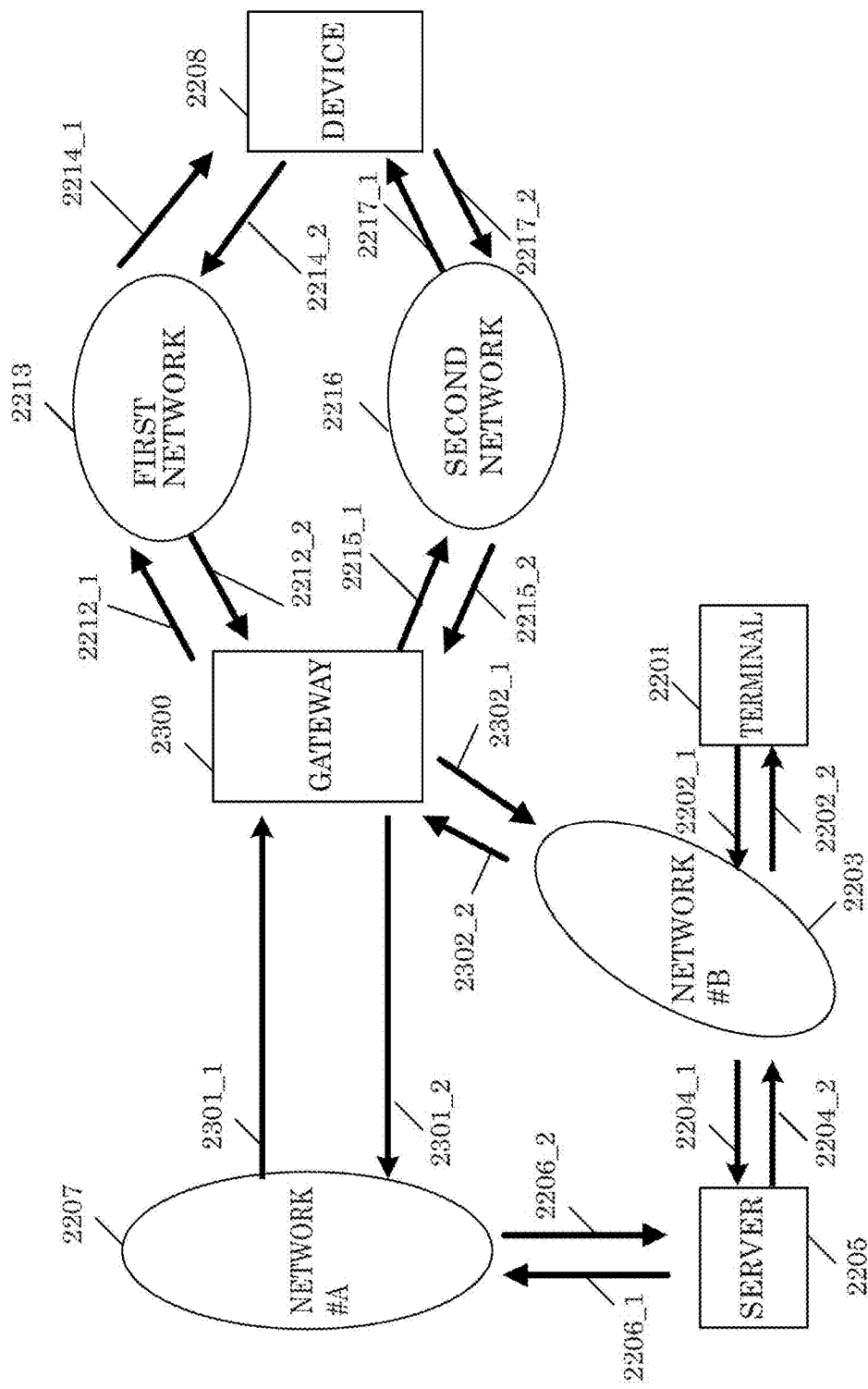
FIG. 67 illustrates one example of a system configuration.

FIG. 67 illustrates a system configuration that differs from the system illustrated in FIG. 66. FIG. 67 differs from FIG. 66 in that there is only one gateway. For example, in FIG. 67, there are two methods—a first method and a second method—in regard to the relation between first network 2213 and second network 2216. The first and second methods have already been described.

In FIG. 67, device 2208 is communicating with gateway 2300 via first network 2213. Device 2208 is also communicating with gateway 2300 via second network 2216.

Gateway 2300 is communicating with server 2205 via network #A labeled 2207.

Gateway 2300 is communicating with terminal 2201 via network #B labeled 2203.

Server 2205 is communicating with terminal 2201 via network #B labeled 2203.

Note that operations performed by the system illustrated in FIG. 67 will be described in greater detail later.

Figure 68:
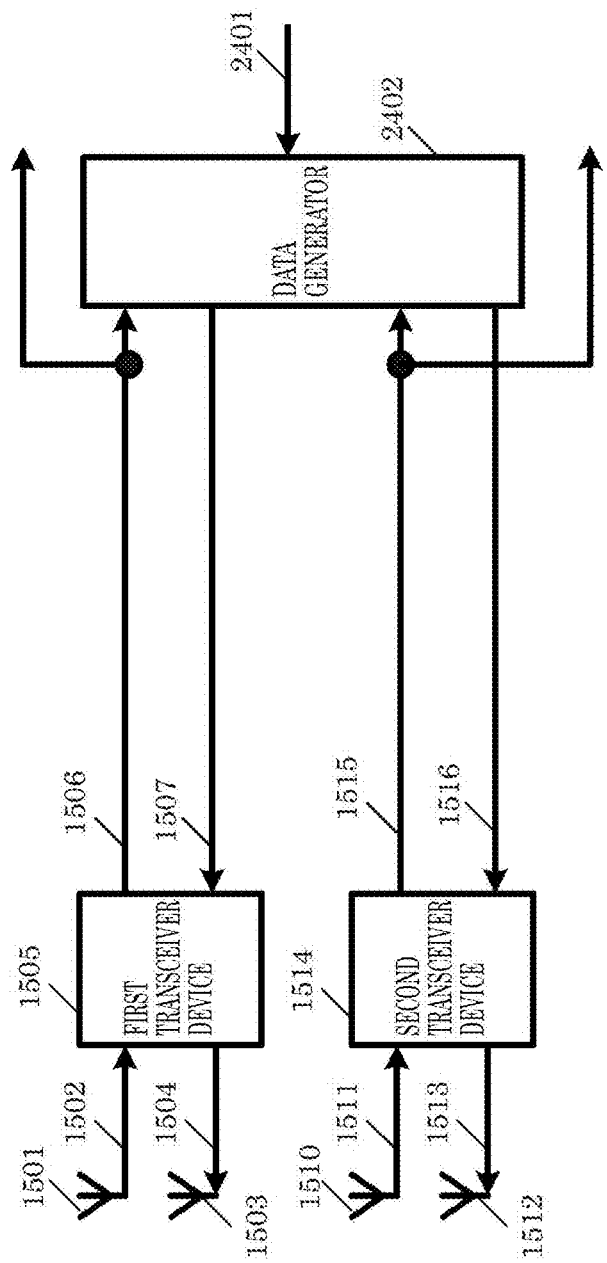
FIG. 68 illustrates one example of a device configuration.

FIG. 68 illustrates one example of a configuration of device 2208 illustrated in FIG. 66 and FIG. 67. Note that in FIG. 68, elements which operate in the same manner as those in FIG. 15 are assigned the same reference numerals.

First transceiver device 1505 receives an input of received signal 1502 that corresponds to 2214_1 in FIG. 67 and is received by antenna (light receiver in the case of optical communication) 1501 in FIG. 68, performs processing such as demodulation and error correction decoding, and outputs received data 1506.

First transceiver device 1505 receives an input of transmission data 1507, performs processing such as error correction coding and 1504 is then output from antenna 1503 as radio waves (in the case of optical communication, transmission signal 1504 is emitted from light emitter 1503).

Note that first transceiver device 1505 is a transceiver device for first network 2213 in FIG. 66 and FIG. 67.

Second transceiver device 1514 receives an input of received signal 1511 corresponding to 2217_1 in FIG. 66 and FIG. 67 that is received by antenna 1510, performs processing such as demodulation and error correction decoding, and outputs received data 1515.

Second transceiver device 1514 receives an input of transmission data 1516, performs processing such as error correction coding and mapping, and outputs transmission signal 1513. Transmission signal 1513 is then output from antenna 1512 as radio waves. Accordingly, transmission signal 1513 corresponds to 2217_2 in FIG. 66 and FIG. 67.

Accordingly, second transceiver device 1514 is a transceiver device for second network 2216 in FIG. 66 and FIG. 67.

Data generator 2402 receives inputs of received data 1506, received data 1515, and information 2401, and outputs transmission data 1507 corresponding to information 2401 and/or transmission signal 1516.

Figure 69:
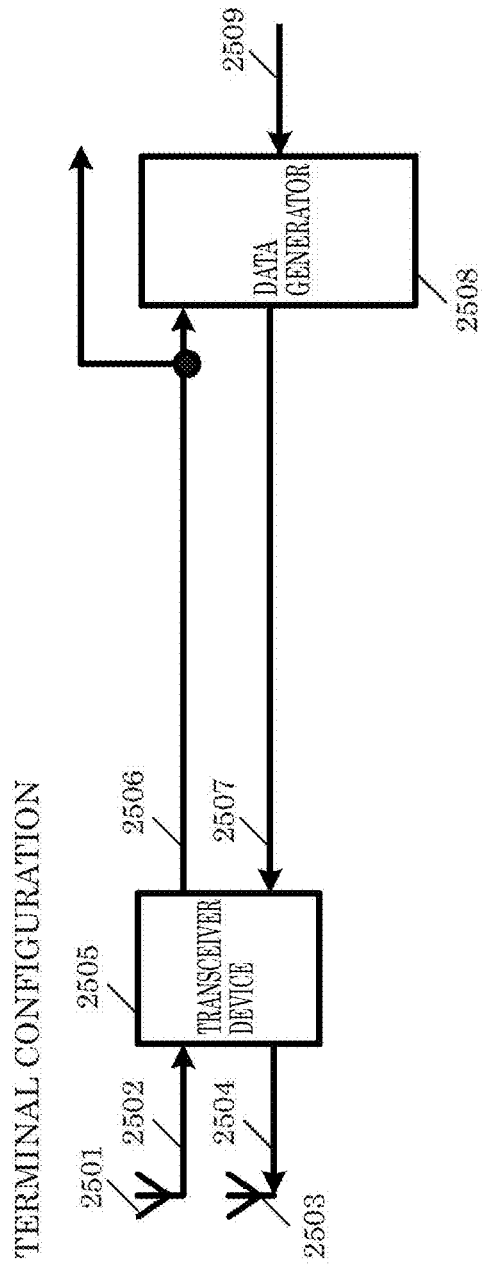
FIG. 69 illustrates one example of a terminal configuration.

FIG. 69 illustrates one example of a configuration of terminal 2201 illustrated in FIG. 66 and FIG. 67.

Transceiver device 2505 in FIG. 69 receives an input of received signal 2502 received by antenna 2501, performs processing such as demodulation and error correction decoding, and outputs received data 2506. Here, received signal 2502 corresponds to 2202_2 in FIG. 66 and FIG. 67.

Moreover, transceiver device 2505 receives an input of transmission data 2507, performs processing such as error correction coding and mapping, and outputs transmission signal 2504. Transmission signal 2504 is then output from antenna 2503 as radio waves. Here, transmission signal 2504 corresponds to 2202_1 in FIG. 66 and FIG. 67.

Data generator 2508 receives inputs of information 2509 and received data 2506, and outputs transmission data 2507 corresponding to information 2509.

Figure 70:
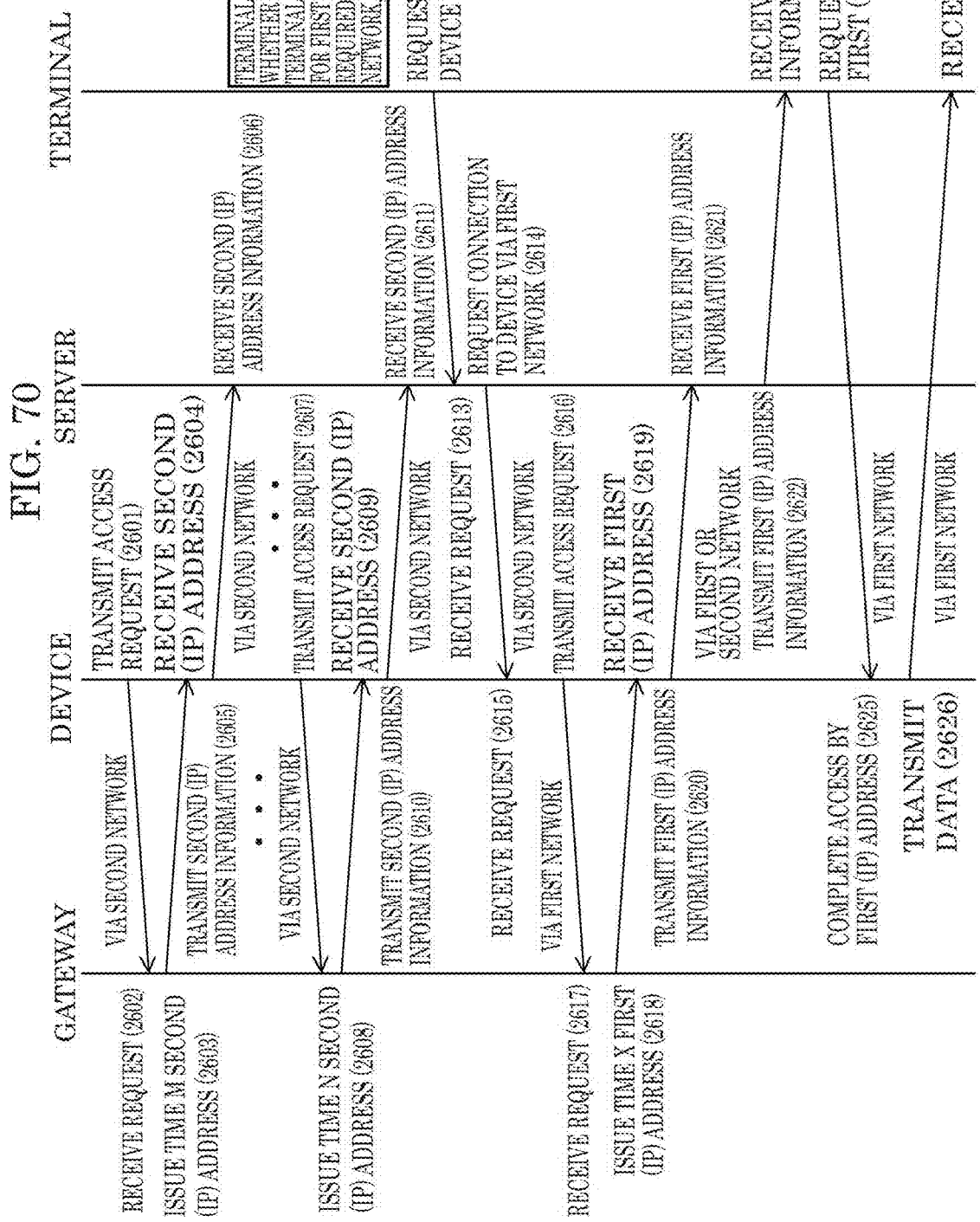
FIG. 70 illustrates one example of system operations.

FIG. 70 illustrates an example of operations performed by the system illustrated in FIG. 66 and the system illustrated in FIG. 67.

First, the operations illustrated in FIG. 70 that are performed by the system illustrated in FIG. 66 will be described. Time is represented on the vertical axis in FIG. 70.

Second transceiver device 1514 in device 2208 illustrated in FIG. 66 and FIG. 67 and having the configuration illustrated in FIG. 68 transmits access request information (2601).

Indoor gateway 2211 receives the access request information via second network 2216 (2602). In accordance with the access request, indoor gateway 2211 transmits information indicating a time M second address (for example, an internet protocol (IP) address) that device 2208 is to use for connection (2603), and device 2208 receives the time M second address information via second network 2216, thereby obtaining the time M second address information (2604). Note that the issuing of the time M second address may be performed by indoor gateway 2211, may be performed by outdoor gateway 2209, and may be performed by another device (the time M second address is an address for connection via second network 2216).

Device 2208 then transmits the time M second address information. Server 2205 then obtains the time M second address information via, for example, second network 2216, indoor gateway 2211, outdoor network 2209, and network #A labeled 2207 (2606).

Second transceiver device 1514 in device 2208 illustrated in FIG. 66 and FIG. 67 and having the configuration illustrated in FIG. 68 transmits access request information (2607).

Indoor gateway 2211 receives the access request information via second network 2216 (2608).

In accordance with the access request, indoor gateway 2211 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by indoor gateway 2211, may be performed by outdoor gateway 2209, and may be performed by another device (the time N second address is an address for connection via second network 2216).

Device 2208 then transmits the time N second address information. Server 2205 then obtains the time N second address information via, for example, second network 2216, indoor gateway 2211, outdoor network 2209, and network #A labeled 2207 (2611).

Note that server 2205 may perform authentication to determine whether device 2208 may access server 2205. Note that key information for the authentication may be possessed by device 2208 and terminal 2201.

Next, terminal 2201 requests, from server 2205, connection to device 2208 via the first network. Accordingly, terminal 2201 transmits information indicating a request to connect to device 2208 via the first network (2612).

Server 2205 receives, via network #B labeled 2203, the information indicating a request to connect to device 2208 via the first network (2613).

Server 2205 then transmits the information indicating a request to connect to device 2208 via the first network (2614).

Device 2208 receives, via network #A labeled 2207, outdoor gateway 2209, indoor gateway 2211, and second network 2216, the information indicating a request to connect to device 2208 via the first network (2615). Note that this is possible because server 2205 has already received the time N second address for access to device 2208 via second network 2216.

Device 2208 then requests access via first network 2213 (2616). Accordingly, device 2208 transmits information indicating a request for access via first network 2213.

Indoor gateway 2211 receives the access request information via the first network (2617).

In accordance with the access request, indoor gateway 2211 transmits information indicating a time X first address (for example, an IP address) that device 2208 is to use for connection (2618), and device 2208 receives the time X first address information via first network 2213, thereby obtaining the time X first address information (2619). Note that the issuing of the time X first address may be performed by indoor gateway 2211, may be performed by outdoor gateway 2209, and may be performed by another device (the time X first address is an address for connection via first network 2216).

Device 2208 then transmits the time X first address information (2620). Server 2205 then obtains the time X first address information via, for example, first network 2213, indoor gateway 2211, outdoor gateway 2209, and network #A labeled 2207 (2621).

Note that server 2205 may perform authentication to determine whether device 2208 may access server 2205. Note that key information for the authentication may be possessed by device 2208 and terminal 2201.

Server 2205 then transmits the time X first address information (2622). Terminal 2201 then obtains the time X first address via network #B labeled 2203 (2623).

The terminal then accesses device 2208 via network #B labeled 2203, outdoor gateway 2209, indoor gateway 2211, and first network 2213, based on the time X first address information (2625).

Device 2208 transmits data (2626), and terminal 2208 obtains this data via, for example, first network 2213, indoor gateway 2211, outdoor gateway 2209, and network #B labeled 2203 (2627).

Next, operations illustrated in FIG. 70 that are performed by the system illustrated in FIG. 67 will be described. Time is represented on the vertical axis in FIG. 70.

Second transceiver device 1514 in device 2208 illustrated in FIG. 66 and FIG. 67 and having the configuration illustrated in FIG. 68 transmits access request information (2601).

Gateway 2300 receives the access request information via second network 2216 (2602). In accordance with the access request, gateway 2300 transmits information indicating a time M second address (for example, an internet protocol (IP) address) that device 2208 is to use for connection (2603), and device 2208 receives the time M second address information via second network 2216, thereby obtaining the time M second address information (2604). Note that the issuing of the time M second address may be performed by another device (the time M second address is an address for connection via second network 2216).

Device 2208 then transmits the time M second address information. Server 2205 then obtains the time M second address information via, for example, second network 2216, gateway 2300, and network #A labeled 2207 (2606).

Second transceiver device 1514 in device 2208 illustrated in FIG. 66 and FIG. 67 and having the configuration illustrated in FIG. 68 transmits access request information (2607).

Indoor gateway 2211 receives the access request information via second network 2216 (2608).

In accordance with the access request, gateway 2300 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by another device (the time N second address is an address for connection via second network 2216).

Device 2208 then transmits the time N second address information. Server 2205 then obtains the time N second address information via, for example, second network 2216, gateway 2300, and network #A labeled 2207 (2611).

Note that server 2205 may perform authentication to determine whether device 2208 may access server 2205. Note that key information for the authentication may be possessed by device 2208 and terminal 2201.

Next, terminal 2201 requests, from server 2205, connection to device 2208 via the first network. Accordingly, terminal 2201 transmits information indicating a request to connect to device 2208 via the first network (2612).

Server 2205 receives, via network #B labeled 2203, the information indicating a request to connect to device 2208 via the first network (2613).

Server 2205 then transmits the information indicating a request to connect to device 2208 via the first network (2614).

Device 2208 receives, via network #A labeled 2207, gateway 2300, and second network 2216, the information indicating a request to connect to device 2208 via the first network (2615). Note that this is possible because server 2205 has already received the time N second address for access to device 2208 via second network 2216.

Device 2208 then requests access via first network 2213 (2616). Accordingly, device 2208 transmits information indicating a request for access via first network 2213.

Gateway 2300 receives the access request information via the first network (2617).

In accordance with the access request, gateway 2300 transmits information indicating a time X first address (for example, an IP address) that device 2208 is to use for connection (2618), and device 2208 receives the time X first address information via first network 2213, thereby obtaining the time X first address information (2619). Note that the issuing of the time X first address may be performed by another device (the time X first address is an address for connection via first network 2216).

Device 2208 then transmits the time X first address information (2620). Server 2205 then obtains the time X first address information via, for example, first network 2213, gateway 2300, and network #A labeled 2207 (2621).

Note that server 2205 may perform authentication to determine whether device 2208 may access server 2205. Note that key information for the authentication may be possessed by device 2208 and terminal 2201.

Server 2205 then transmits the time X first address information (2622). Terminal 2201 then obtains the time X first address via network #B labeled 2203 (2623).

The terminal then accesses device 2208 via network #B labeled 2203, gateway 2300, and first network 2213, based on the time X first address information (2625).

Device 2208 transmits data (2626), and terminal 2208 obtains this data via, for example, first network 2213, gateway 2300, and network #B labeled 2203 (2627).

Figure 71:
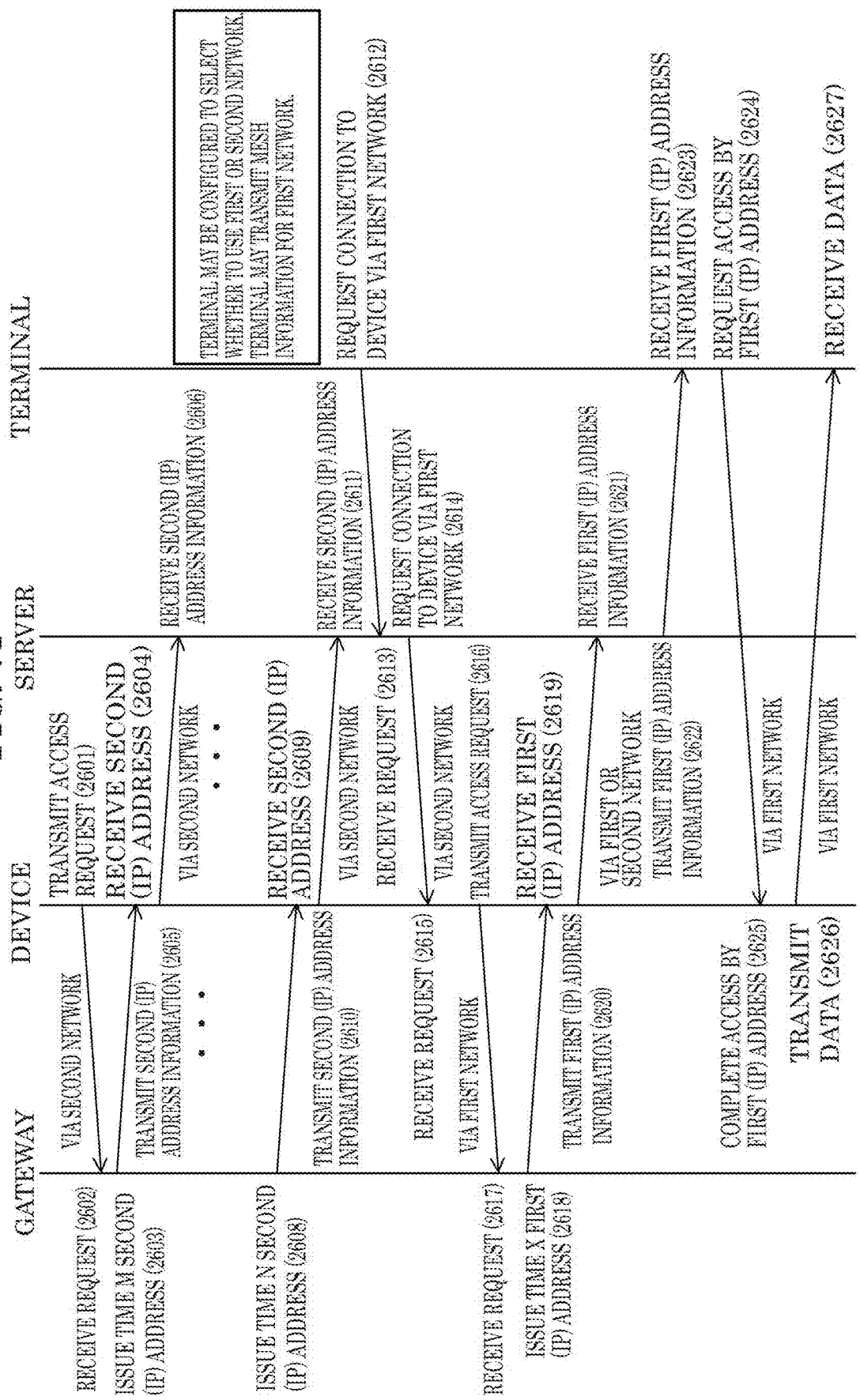
FIG. 71 illustrates one example of system operations.

FIG. 71 illustrates an example of operations performed by the system illustrated in FIG. 66 and the system illustrated in FIG. 67.

Next, operations illustrated in FIG. 71 that are performed by the system illustrated in FIG. 66 will be described. Time is represented on the vertical axis in FIG. 71. Moreover, operations in FIG. 71 that are the same as those in FIG. 70 share like reference signs. Accordingly, operations in FIG. 71 that differ from FIG. 70 will be described. FIG. 71 differs from FIG. 70 in regard to operations 2601 through 2611.

Second transceiver device 1514 in device 2208 illustrated in FIG. 66 and FIG. 67 and having the configuration illustrated in FIG. 68 transmits access request information (2601).

Indoor gateway 2211 receives the access request information via second network 2216 (2602). In accordance with the access request, indoor gateway 2211 transmits information indicating a time M second address (for example, an IP address) that device 2208 is to use for connection (2603), and device 2208 receives the time M second address information via second network 2216, thereby obtaining the time M second address information (2604). Note that the issuing of the time M second address may be performed by indoor gateway 2211, may be performed by outdoor gateway 2209, and may be performed by another device (the time M second address is an address for connection via second network 2216).

Device 2208 then transmits the time M second address information. Server 2205 then obtains the time M second address information via, for example, second network 2216, indoor gateway 2211, outdoor network 2209, and network #A labeled 2207 (2606).

Indoor gateway 2211 then provides the second address to device 2208 at regular or irregular intervals.

Indoor gateway 2211 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by indoor gateway 2211, may be performed by outdoor gateway 2209, and may be performed by another device (the time N second address is an address for connection via second network 2216).

Device 2208 then transmits the time N second address information. Server 2205 then obtains the time N second address information via, for example, second network 2216, indoor gateway 2211, outdoor network 2209, and network #A labeled 2207 (2611).

Note that server 2205 may perform authentication to determine whether device 2208 may access server 2205. Note that key information for the authentication may be possessed by device 2208 and terminal 2201.

Subsequent operations are the same as those described with reference to FIG. 70, so repeated description will be omitted.

Next, operations illustrated in FIG. 71 that are performed by the system illustrated in FIG. 67 will be described. Time is represented on the vertical axis in FIG. 71. Moreover, operations in FIG. 71 that are the same as those in FIG. 70 share like reference signs. Accordingly, operations in FIG. 71 that differ from FIG. 70 will be described. FIG. 71 differs from FIG. 70 in regard to operations 2601 through 2611.

Second transceiver device 1514 in device 2208 illustrated in FIG. 66 and FIG. 67 and having the configuration illustrated in FIG. 68 transmits access request information (2601).

Gateway 2300 receives the access request information via second network 2216 (2602). In accordance with the access request, gateway 2300 transmits information indicating a time M second address (for example, an IP address) that device 2208 is to use for connection (2603), and device 2208 receives the time M second address information via second network 2216, thereby obtaining the time M second address information (2604). Note that the issuing of the time M second address may be performed by another device (the time M second address is an address for connection via second network 2216).

Device 2208 then transmits the time M second address information. Server 2205 then obtains the time M second address information via, for example, second network 2216, gateway 2300, and network #A labeled 2207 (2606).

Gateway 2300 then provides the second address to device 2208 at regular or irregular intervals. Accordingly, gateway 2300 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by another device (the time N second address is an address for connection via second network 2216).

Device 2208 then transmits the time N second address information. Server 2205 then obtains the time N second address information via, for example, second network 2216, gateway 2300, and network #A labeled 2207 (2611).

Note that server 2205 may perform authentication to determine whether device 2208 may access server 2205. Note that key information for the authentication may be possessed by device 2208 and terminal 2201.

Subsequent operations are the same as those described with reference to FIG. 70, so repeated description will be omitted.

Next, advantages of the operations performed in FIG. 70 and FIG. 71 will be described.

When the first method is used, there is a possibility that the wireless communication distance in first network 2213 will decrease due to reasons related to frequency. A mesh network or multihop network may be implemented in order to remedy this. Due to this, there is a possibility that device 2208 preferentially using second network 2216 will provide more stable communication. When necessary, device 2208 can connect to the first network to perform more stable communication, which achieves the advantageous effect that communication performed by terminal 2201 is also stable. Furthermore, in the first network, there is a possibility that wireless communication that provides fast data transmission speeds can be performed, and in such cases, communication device 2208 and terminal 2201 have the benefit of fast data transmission.

When the second method is used, there is a possibility that the communication distance is greater in the second network. Accordingly, in the first network, a mesh network or multihop network may be implemented. Due to this, there is a possibility that device 2208 preferentially using second network 2216 will provide more stable communication. When necessary, device 2208 can connect to the first network to perform more stable communication, which achieves the advantageous effect that communication performed by terminal 2201 is also stable. Furthermore, in the first network, there is a possibility that wireless communication that provides fast data transmission speeds can be performed, and in such cases, communication device 2208 and terminal 2201 have the benefit of fast data transmission.

Figure 72:
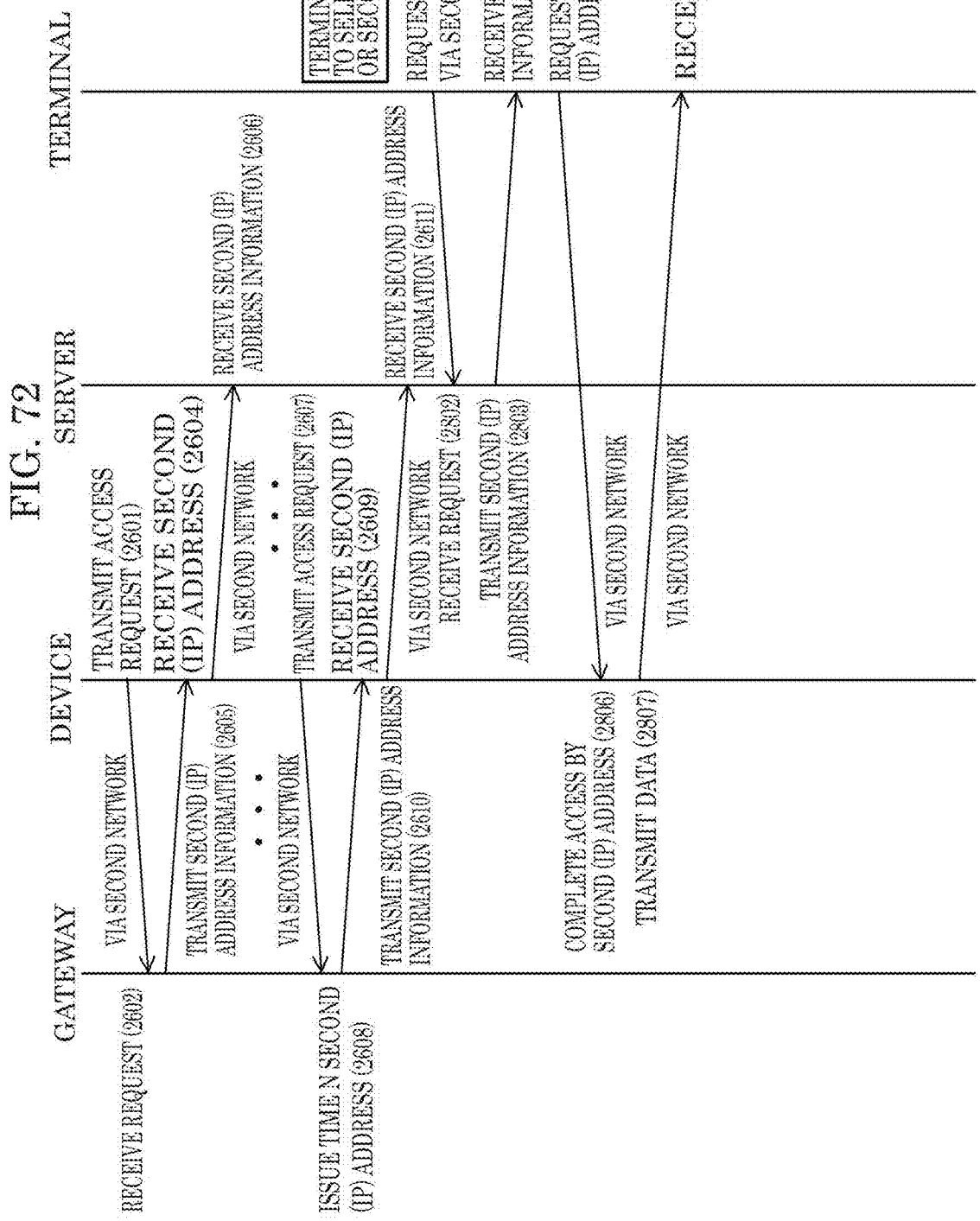
FIG. 72 illustrates one example of system operations.
Figure 73:
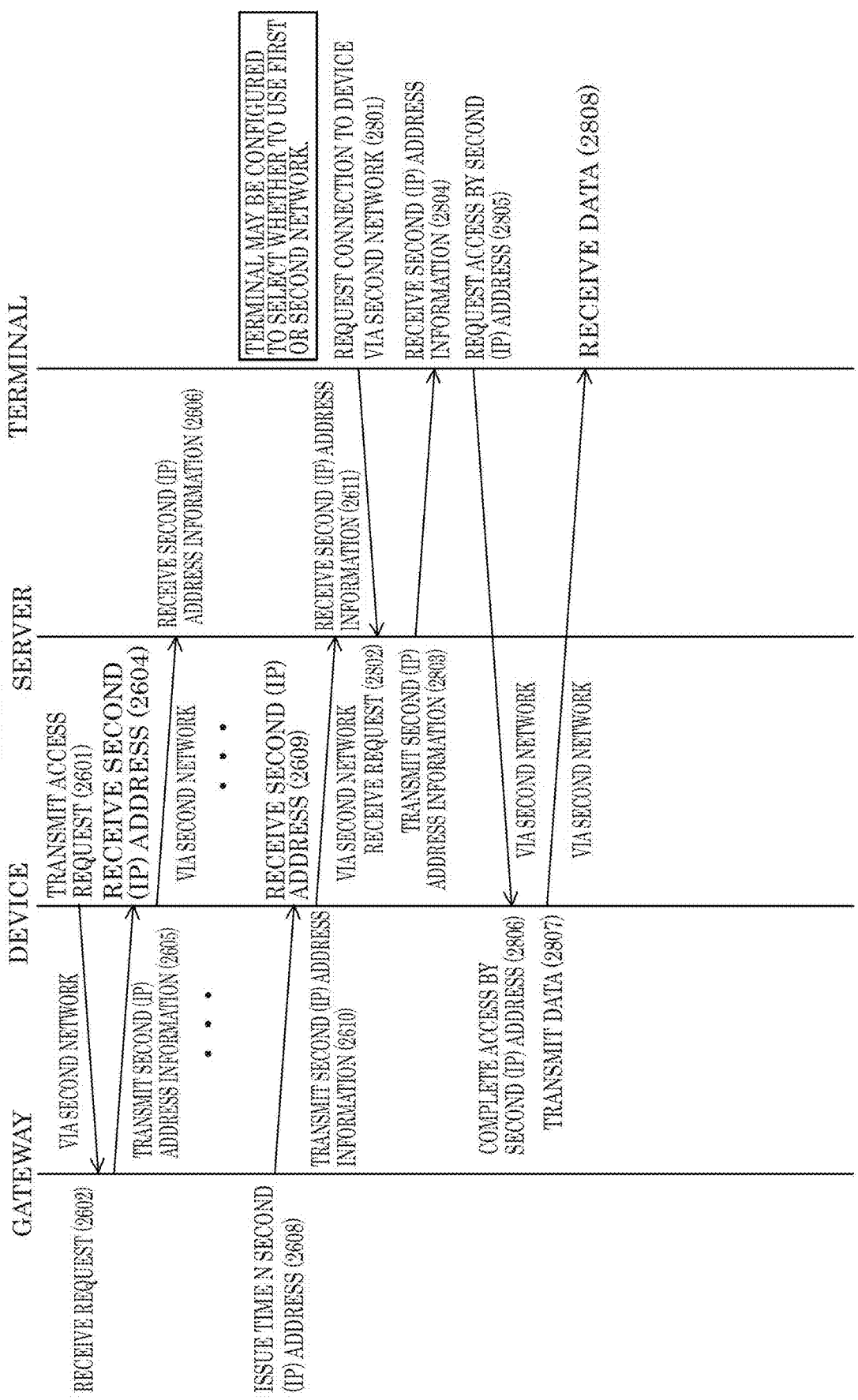
FIG. 73 illustrates one example of system operations.

In FIG. 70 and FIG. 71, device 2208 uses the first network and terminal 2201 accesses using the first network. In FIG. 72 and FIG. 73, device 2208 uses the second network and terminal 2201 accesses using the second network.

FIG. 72 illustrates an example of operations performed by the system illustrated in FIG. 66 and the system illustrated in FIG. 67.

First, operations illustrated in FIG. 72 that are performed by the system illustrated in FIG. 66 will be described. Time is represented on the vertical axis in FIG. 72. Operations in FIG. 72 that are the same as those in FIG. 70 share like reference signs. Accordingly, operations in FIG. 72 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, outdoor gateway 2209, indoor gateway 2211, and second network 2216, based on the time N second address information (2806).

Device 2208 transmits data (2807), and terminal 2208 obtains this data via, for example, second network 2216, indoor gateway 2211, outdoor gateway 2209, and network #B labeled 2203 (2808).

Note that server 2205 may perform authentication to determine whether device 2208 may access server 2205. Note that key information for the authentication may be possessed by device 2208 and terminal 2201.

Next, operations illustrated in FIG. 72 that are performed by the system illustrated in FIG. 67 will be described. Time is represented on the vertical axis in FIG. 72. Operations in FIG. 72 that are the same as those in FIG. 70 share like reference signs. Accordingly, operations in FIG. 72 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, gateway 2300, and second network 2216, based on the time N second address information (2806).

Device 2208 transmits data (2807), and terminal 2208 obtains this data via, for example, second network 2213, gateway 2300, and network #B labeled 2203 (2808).

Note that server 2205 may perform authentication to determine whether device 2208 may access server 2205. Note that key information for the authentication may be possessed by device 2208 and terminal 2201.

Next, the operations illustrated in FIG. 73 will be described. FIG. 73 illustrates an example of operations performed by the system illustrated in FIG. 66 and the system illustrated in FIG. 67.

First, operations illustrated in FIG. 73 that are performed by the system illustrated in FIG. 66 will be described. Time is represented on the vertical axis in FIG. 73. Operations in FIG. 73 that are the same as those in FIG. 70 share like reference signs. Accordingly, operations in FIG. 73 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, outdoor gateway 2209, indoor gateway 2211, and second network 2216, based on the time N second address information (2806).

Device 2208 transmits data (2807), and terminal 2208 obtains this data via, for example, second network 2216, indoor gateway 2211, outdoor gateway 2209, and network #B labeled 2203 (2808).

Note that server 2205 may perform authentication to determine whether device 2208 may access server 2205. Note that key information for the authentication may be possessed by device 2208 and terminal 2201.

Next, operations illustrated in FIG. 73 that are performed by the system illustrated in FIG. 67 will be described. Time is represented on the vertical axis in FIG. 73. Operations in FIG. 73 that are the same as those in FIG. 70 share like reference signs. Accordingly, operations in FIG. 73 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, gateway 2300, and second network 2216, based on the time N second address information (2806).

Device 2208 transmits data (2807), and terminal 2208 obtains this data via, for example, second network 2213, gateway 2300, and network #B labeled 2203 (2808).

Note that server 2205 may perform authentication to determine whether device 2208 may access server 2205. Note that key information for the authentication may be possessed by device 2208 and terminal 2201.

By performing the operations illustrated in FIG. 72 and FIG. 73, it is possible to achieve the advantageous effect that device 2208 can communicate using second network which is characterized by stable communication.

Note that the system illustrated in FIG. 66 or FIG. 67 may switch between (i) the operations in FIG. 70 or FIG. 71 and (ii) the operations in FIG. 72 or FIG. 73 depending on the status of the system.

In other words, in either case, terminal 2201 receives data from device 2208, but whether terminal 2201 receives the data via the first network, like in FIG. 70 or FIG. 71, or receives the data via the second network, like in FIG. 72 or FIG. 73, may be switched depending on the status of the system.

As one example, depending on the situation, terminal 2201 may either request connection to device 2208 via the first network like in 2612 in FIG. 70 or FIG. 71, or request connection to device 2208 via the second network like in 2801 in FIG. 72 or FIG. 73.

Moreover, regarding the provision of the addresses by server 2205, server 2205 may switch between providing the first address to terminal 2201 and providing the second address to terminal 2201 depending on the situation.

Implementing such a configuration makes it possible to achieve both advantageous effects of improved communication quality and improved data transmission speeds.

Supplementary Information A3

In the present specification, an application related to processes associated with transmission and reception performed by a terminal may be provided by, for example, a server, and the terminal may install this application to implement all or some of the processes associated with the transmission and the reception described in the present specification. Note that the application may be provided to the terminal by the terminal connecting to the server via a network, and the application may be provided to the terminal by another communication function included in the terminal or another communication function connected to the terminal connecting to the server via a network.

Although the terminology mesh network and multihop network are used in the present specification, these may be referred to by some other name. Note that a mesh network may be considered to be a multihop network in which terminals directly connect to one another, and transmitted data reaches the desired destination after sequentially passing through a plurality of terminals. Moreover, an embodiment relating a mesh network may be implemented in the same manner even if it relates to a multihop network instead.

Embodiment A7

In the present embodiment, operations performed by terminal 2201, device 2208, and server 2205 illustrated in FIG. 66 and FIG. 67 and described in Embodiment A6 will be described.

First, the operations performed by device 2208 illustrated in FIG. 66 and FIG. 67 will be described. FIG. 68 illustrates a configuration of device 2208.

Figure 74:
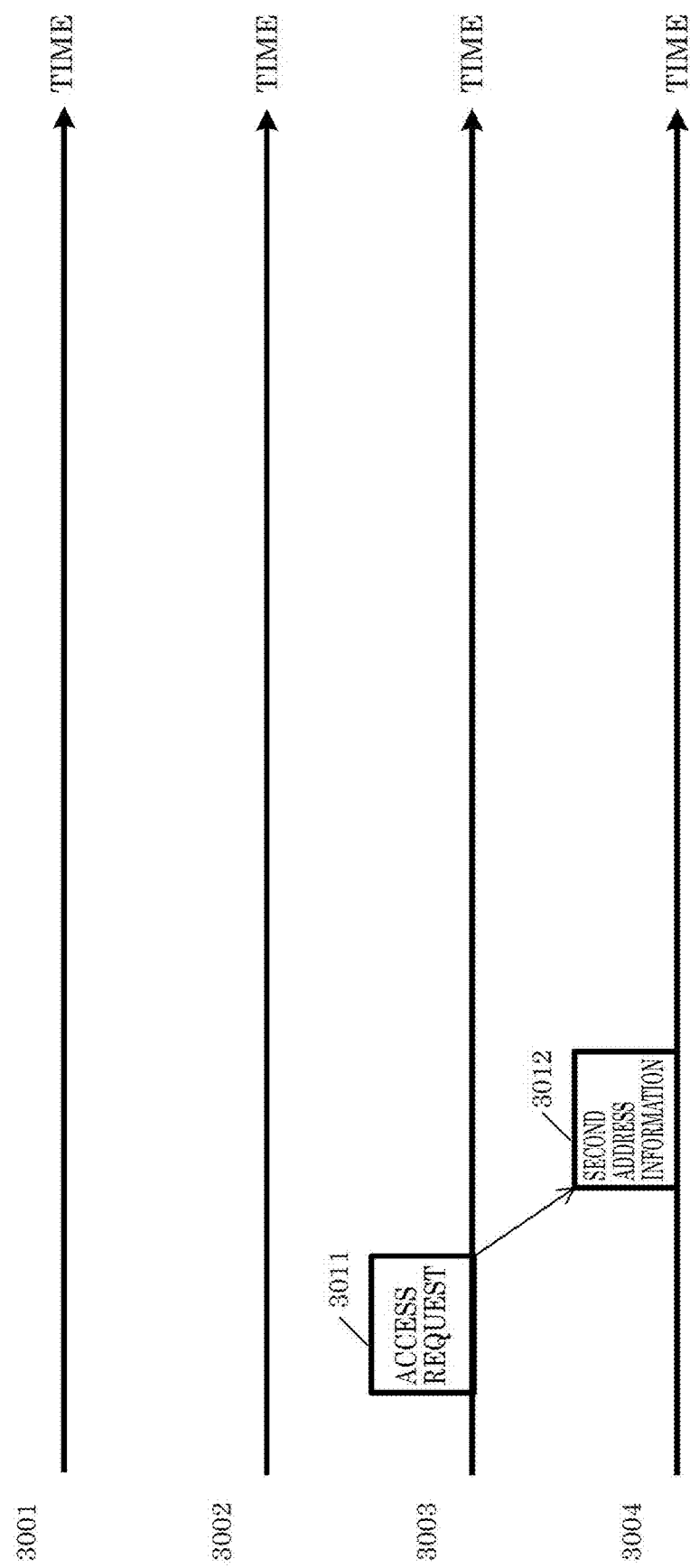
FIG. 74 illustrates one example of transmission information and reception information.

FIG. 74 illustrates the states of the transmission information and reception information of device 2208 upon device 2208 obtaining the second address via the second network (for example, 2604 and 2609) in FIG. 70 through FIG. 73.

In FIG. 74, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 74, second transceiver device 1514 illustrated in FIG. 68 transmits transmission signal 1513 including access request 3011 information to indoor gateway 2211 or gateway 2300 via second network 2216. Accordingly, at this time, data generator 2402 illustrated in FIG. 68 outputs access request information as transmission data 1516, based on information 2401. Second transceiver device 1514 receives an input of transmission data 1516 that includes the access request information, performs processing such as error correction coding and mapping, and outputs transmission signal 1513. Transmission signal 1513 is then output from an antenna as radio waves.

Indoor gateway 2211 illustrated in FIG. 66 or gateway 2300 illustrated in FIG. 67 receives the modulated signal including the access request 3011 information illustrated in FIG. 74. Then, indoor gateway 2211 illustrated in FIG. 66 or gateway 2300 illustrated in FIG. 67 receives access request 3011 information, and transmits a modulated signal including information indicating the second address for connection via second network 2216. Accordingly, as illustrated in 3004 in FIG. 74, second transceiver device 1514 illustrated in FIG. 68 receives the signal including second address information 3012.

Operations performed by indoor gateway 2211 illustrated in FIG. 66 or gateway 2300 illustrated in FIG. 67, and device 2208 at this time will be described.

Figure 77:
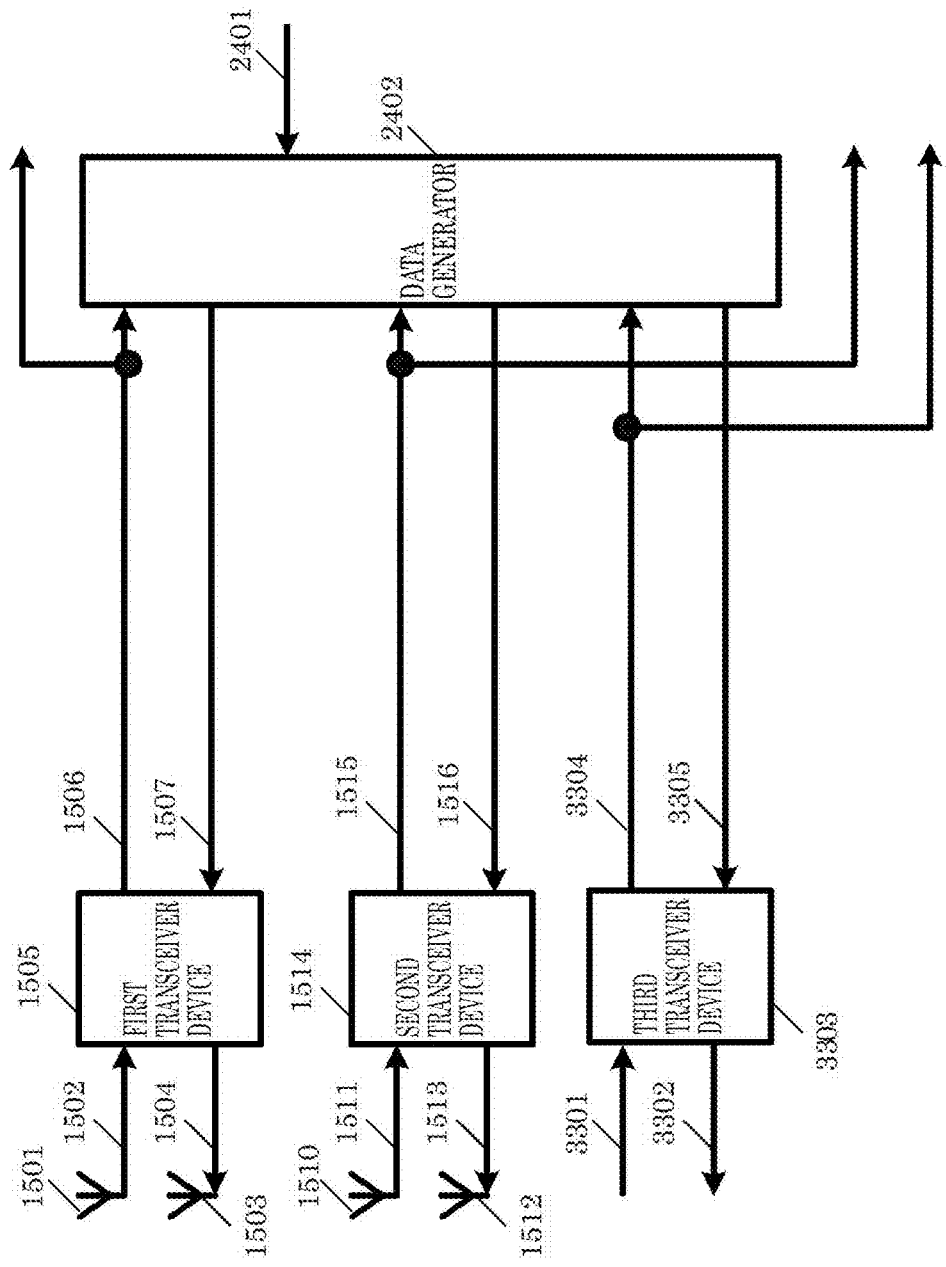
FIG. 77 illustrates one example of a gateway configuration.

FIG. 77 illustrates one example of a configuration of indoor gateway 2211 illustrated in FIG. 66 and gateway 2300 illustrated in FIG. 67. Note that in FIG. 77, elements which operate in the same manner as those in FIG. 15 and FIG. 68 are assigned the same reference numerals, and repeated description thereof is omitted. Although 1501 and 1503 indicate antennas, as described in other embodiments, when optical communication is used, 1501 is a light receiver and antenna 1503 is a light emitter.

In FIG. 77, third transceiver device 3303 is a transceiver device for communicating with outdoor gateway 2209 in FIG. 66.

Moreover, third transceiver device 3303 is a transceiver device that communicates with server 2205 via network #A labeled 2207 and illustrated in FIG. 67, and third transceiver device 3303 is also a transceiver device that communicates with, for example, server 2205 and terminal 2201 via network #B labeled 2203.

Third transceiver device 3303 receives an input of received signal 3301, performs processing such as demodulation and error correction decoding, and outputs received data 3304. Third transceiver device 3303 receives an input of transmission data 3305, performs processing such as error correction coding and mapping, and outputs transmission signal 3302.

In FIG. 77, like is illustrated in FIG. 74, the modulated signal including access request 3011 information transmitted by device 2208 (i.e., received signal 1511) is received by antenna 1510, whereby second transceiver device 1514 receives an input of received signal 1511, performs processing such as demodulation and error correction decoding, and outputs received data 1515 including access request 3011 information.

Data generator 2402 receives an input of received data 1515 including access request 3011 information, issues the second address, and outputs transmission data 1516 including second address information 3012.

Second transceiver device 1514 receives an input of transmission data 1516 that includes second address information 3012, performs processing such as error correction coding and mapping, and outputs transmission signal 1513. Transmission signal 1513 is then output from antenna 1512 as radio waves.

This enables device 2208 illustrated in FIG. 66 and FIG. 67 to obtain the second address information and communicate with indoor gateway 2211 or gateway 2300 via the second network.

Note that the device that issues the second address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the second address information from the device that issued the second address, and, for example, performs the above operations.

Figure 75:
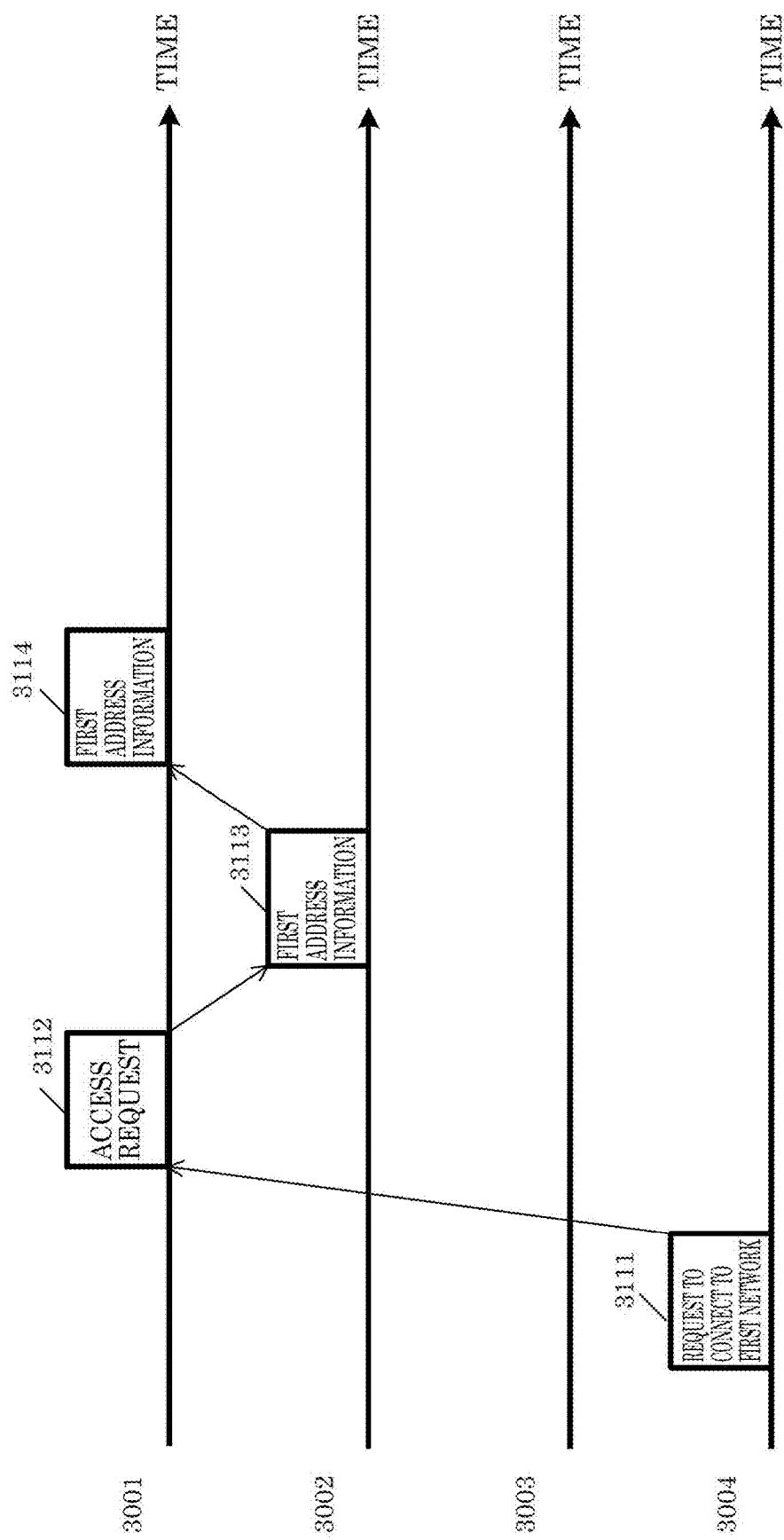
FIG. 75 illustrates one example of transmission information and reception information.

FIG. 75 illustrates the states of the transmission information and reception information of device 2208 upon device 2208, for example, obtaining the first address via the second network (2623) in FIG. 70 and FIG. 71.

In FIG. 75, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 75, indoor gateway 2211 illustrated in FIG. 66 or gateway 2300 illustrated in FIG. 67 receives, via network #A labeled 2207, a modulated signal including information indicating request 3111 to connect to the first network that was transmitted by server 2205. Note that subsequent processes are as described with reference to FIG. 70 and FIG. 71.

Accordingly, second transceiver device 1514 in device 2208 illustrated in FIG. 68 receives the modulated signal including the information indicating request 3111 to connect to the first network that was transmitted by the server. Accordingly, second transceiver device 1514 receives an input of received signal 1511 received by antenna 1510, performs processing such as demodulation and error correction decoding, and outputs received data 1515 including information indicating request 3111 to connect to the first network.

With this, as illustrated in FIG. 75, device 2208 requests connection via first network 2213 from indoor gateway 2211 illustrated in FIG. 66 or gateway 2300 illustrated in FIG. 67.

Accordingly, data generator 2402 illustrated in FIG. 68 receives an input of received data 1515 including information indicating request 3111 to connect to the first network, and determines to connect via first network 2213. Data generator 2402 then outputs transmission data 1507 including information indicating access request 3112 via first network 2213.

First transceiver device 1505 in device 2208 illustrated in FIG. 68 receives an input of transmission data 1507 including information indicating access request 3112, performs processing such as error correction coding and mapping, and generates and outputs transmission signal 1504, whereby transmission signal 1504 is output from antenna (or light emitter) 1503.

With this, indoor gateway 2211 illustrated in FIG. 66 or gateway 2300 illustrated in FIG. 67 receives the modulated signal transmitted by device 2208, and transmits a modulated signal including first address information 3113 for device 2208 to perform communication via first network 2213.

Accordingly, indoor gateway 2211 illustrated in FIG. 66 or gateway 2300 illustrated in FIG. 67 receives, via antenna (or light receiver) 1501 illustrated in FIG. 77, the modulated signal including the information indicating access request 3112 that was transmitted by device 2208. First transceiver device 1505 receives an input of received signal 1502 received by antenna (or light receiver) 1501, performs processing such as demodulation and error correction decoding, and outputs received data 1506 including information indicating access request 3112.

Data generator 2402 illustrated in FIG. 77 that is included in indoor gateway 2211 illustrated in FIG. 66 or gateway 2300 illustrated in FIG. 67 receives an input of received data 1506 including information indicating access request 3112, issues the first address, and outputs transmission data 1507 including first address information 3113.

First transceiver device 1505 receives an input of transmission data 1507 including first address information 3113, performs processing such as error correction coding and mapping, and outputs transmission signal 1504. Transmission signal 1504 is then output from antenna (or light emitter) 1503 as, for example, radio waves (or light).

Note that the device that issues the first address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the first address information from the device that issued the first address, and, for example, performs the above operations.

First transceiver device 1505 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, first transceiver device 1505 included in device 2208 illustrated in FIG. 68 receives an input of received signal 1502 received by antenna (or light receiver) 1501, performs processing such as demodulation and error correction decoding, and outputs received data 1506 including first address information 3113.

First transceiver device 1505 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, first transceiver device 1505 included in device 2208 illustrated in FIG. 68 receives an input of received signal 1502 received by antenna (or light receiver) 1501, performs processing such as demodulation and error correction decoding, and outputs received data 1506 including first address information 3113.

Data generator 2402 included in device 2208 illustrated in FIG. 68 receives an input of received data 1506 including first address information 3113, and outputs transmission data 1507 including first address information 3114 in order to transmit the first address information to server 2205.

First transceiver device 1505 included in device 2208 illustrated in FIG. 68 receives an input of transmission data 1507 including first address information 3114, performs processing such as error correction coding and mapping, and generates and outputs transmission signal 1504. Transmission signal 1504 is output from antenna (or light emitter) 1503 as, for example, radio waves (or light).

Note that a signal corresponding to this transmission signal 1504 is, in the example illustrated in FIG. 66, transmitted to server 2205 via indoor gateway 2211, outdoor gateway 2209, and network #A labeled 2207, and in the example illustrated in FIG. 67, is transmitted to the server via gateway 2300 and network #A labeled 2207.

Figure 76:
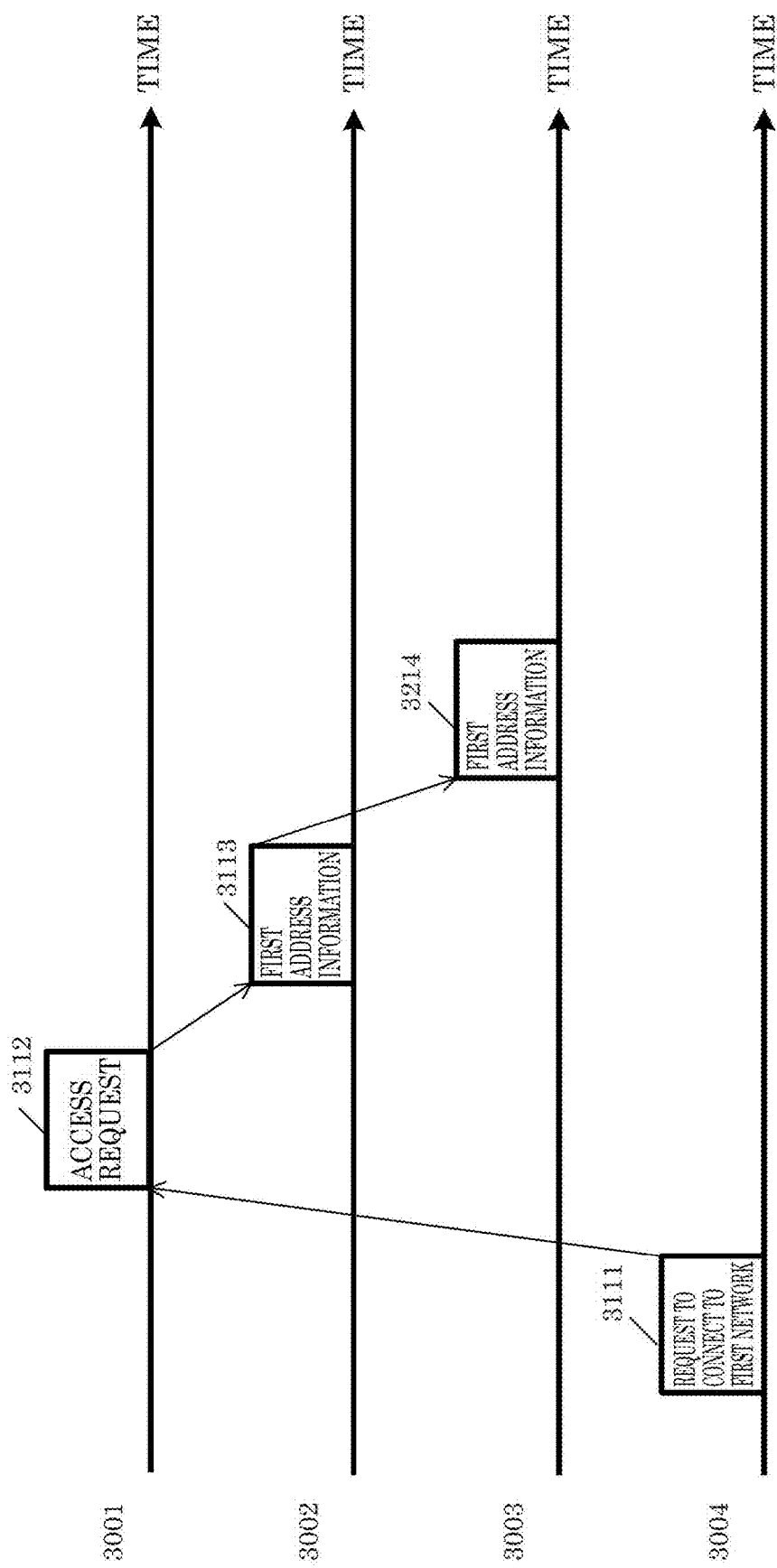
FIG. 76 illustrates one example of transmission information and reception information.

FIG. 76 illustrates the states of the transmission information and reception information of device 2208 upon device 2208, for example, obtaining the first address via the second network (2623) in FIG. 70 and FIG. 71. The example illustrated in FIG. 76 differs from the example illustrated in FIG. 75.

In FIG. 76, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 76, indoor gateway 2211 illustrated in FIG. 66 or gateway 2300 illustrated in FIG. 67 receives, via network #A labeled 2207, a modulated signal including information indicating request 3111 to connect to the first network that was transmitted by server 2205. Note that subsequent processes are as described with reference to FIG. 70 and FIG. 71.

Accordingly, second transceiver device 1514 in device 2208 illustrated in FIG. 68 receives the modulated signal including the information indicating request 3111 to connect to the first network that was transmitted by the server. Accordingly, second transceiver device 1514 receives an input of received signal 1511 received by antenna 1510, performs processing such as demodulation and error correction decoding, and outputs received data 1515 including information indicating request 3111 to connect to the first network.

With this, as illustrated in FIG. 75, device 2208 requests connection via first network 2213 from indoor gateway 2211 illustrated in FIG. 66 or gateway 2300 illustrated in FIG. 67.

Accordingly, data generator 2402 illustrated in FIG. 68 receives an input of received data 1515 including information indicating request 3111 to connect to the first network, and determines to connect via first network 2213. Data generator 2402 then outputs transmission data 1507 including information indicating access request 3112 via first network 2213.

First transceiver device 1505 in device 2208 illustrated in FIG. 68 receives an input of transmission data 1507 including information indicating access request 3112, performs processing such as error correction coding and mapping, and generates and outputs transmission signal 1504, whereby transmission signal 1504 is output from antenna (or light emitter) 1503.

With this, indoor gateway 2211 illustrated in FIG. 66 or gateway 2300 illustrated in FIG. 67 receives the modulated signal transmitted by device 2208, and transmits a modulated signal including first address information 3113 for device 2208 to perform communication via first network 2213.

Accordingly, indoor gateway 2211 illustrated in FIG. 66 or gateway 2300 illustrated in FIG. 67 receives, via antenna 1501 illustrated in FIG. 77, the modulated signal including the information indicating access request 3112 that was transmitted by device 2208. First transceiver device 1505 receives an input of received signal 1502 received by antenna (or light receiver) 1501, performs processing such as demodulation and error correction decoding, and outputs received data 1506 including information indicating access request 3112.

Data generator 2402 illustrated in FIG. 77 that is included in indoor gateway 2211 illustrated in FIG. 66 or gateway 2300 illustrated in FIG. 67 receives an input of received data 1506 including information indicating access request 3112, issues the first address, and outputs transmission data 1516 including first address information 3113.

Second transceiver device 1514 receives an input of transmission data 1516 that includes first address information 3113, performs processing such as error correction coding and mapping, and outputs transmission signal 1513. Transmission signal 1513 is then output from antenna 1512 as, for example, radio waves.

Note that the device that issues the first address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the first address information from the device that issued the first address, and, for example, performs the above operations.

Second transceiver device 1514 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, second transceiver device 1514 included in device 2208 illustrated in FIG. 68 receives an input of received signal 1511 received by antenna 1510, performs processing such as demodulation and error correction decoding, and outputs received data 1515 including first address information 3113.

In the examples illustrated in FIG. 76 and FIG. 77, in device 2208 illustrated in FIG. 68, the first address information is exemplified as being transmitted by first transceiver device 1505 or second transceiver device 1514, but this example is not limiting. In cases in which device 2208 includes another transmitting device, that transmitting device may transmit the transmission signal including the first address information in order to transmit the first address information to server 2205.

As described in Embodiment A6, device 2208 may transmit first address information to server 2205, and, alternatively, may transmit authentication information with the second address information upon transmitting the second address information. Accordingly, for example, when device 2208 has the configuration illustrated in FIG. 68, information 2401 may include authentication information. In such cases, the authentication information is included in transmission data 1507 and/or transmission data 1516. Server 2205 then obtains this information, determines whether the first address information and the second address information are valid or invalid, and when determined to be valid, stores the first address information and the second address information. Similarly, terminal 2201 transmits authentication information to server 2205, and when the authentication is successful, terminal 2201 obtains the first address information and the second address information from server 2205.

Device 2208, indoor gateway 2211, and gateway 2300 operating in this manner achieves the advantageous effects described in Embodiment A6.

Next, operations performed by terminal 2201, server 2205, and device 2208 illustrated in FIG. 66 and FIG. 67 upon implementation of: (i) communication like that in FIG. 70 and/or FIG. 71; and/or (ii) communication like that in FIG. 72 and/or FIG. 73.

Figure 79:
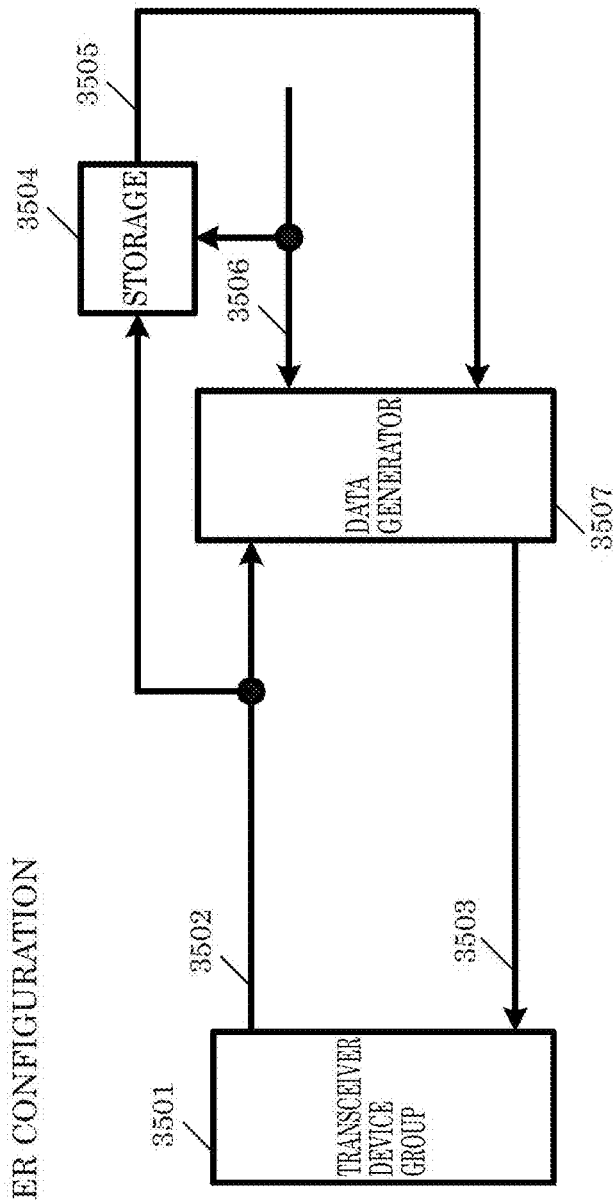
FIG. 79 illustrates one example of a server configuration.

FIG. 79 illustrates one example of a configuration of server 2205 illustrated. 3501 indicates a transceiver device group. For example, transceiver device group 3501 includes N transceiver devices. Note that N is an integer that is greater than or equal to one.

Transceiver device group 3501 receives an input of a received signal, and each transceiver device performs processing such as demodulation and error correction decoding, and outputs received data group 3502 corresponding to the N transceiver devices.

Moreover, transceiver device group 3501 receives an input of transmission data group 3503, and each transceiver device performs processing such as error correction coding and mapping, and transmits a transmission modulated signal group corresponding to the N transceiver devices.

Storage 3504 receives inputs of received data group 3505 and information 3506, and may store received data group 3505 or (partial) information 3506 data. Moreover, storage 3504 receives inputs of received data group 3505 and information 3506, and outputs stored data 3505, based on received data group 3505 or (partial) information 3506 data.

Data generator 3507 receives inputs of stored data 3505, information 3506, and received data group 3502, and based on these data, generates and outputs transmission data group 3503.

Next, operations performed by terminal 2201, server 2205, and device 2208 will be described based on FIG. 78.

Figure 78:
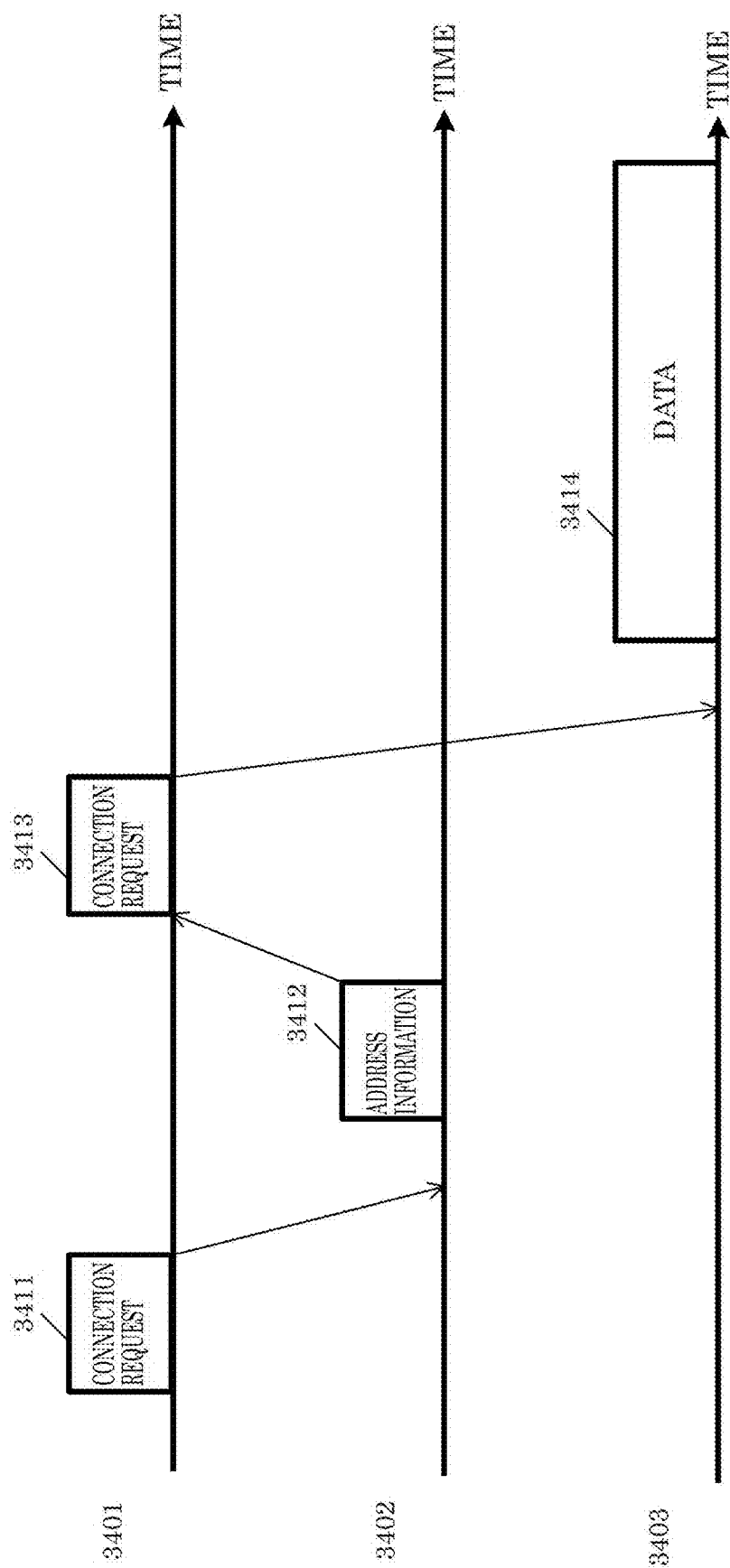
FIG. 78 illustrates one example of operations performed by a terminal, a server, and a device.

In FIG. 78, 3401 indicates a communication state of terminal 2201, 3402 indicates a communication state of server 2205, and 3403 indicates a communication state of device 2208. Time is represented on the horizontal axis in FIG. 78.

As illustrated in FIG. 78, terminal 2201 transmits information indicating connection request 3411 for requesting connection to device 2208. Note that the information indicating connection request 3411 includes information indicating whether connection is performed via first network 2213 or via second network 2216. This information need not directly indicate whether connection is performed via first network 2213 or via second network 2216.

For example, this information may indirectly indicate the above, such as by information indicating a requested transmission speed or information indicating a request that a network with stable communication be used (here, the selection of whether connection is performed via first network 2213 or via second network 2216 may be made by server 2205).

Note that in this example, at a point in time before transmission of the information indicating connection request 3411, terminal 2201 does not possess the first address information or the second address information for accessing device 2208. Moreover, in this example, server 2205 has already received, via second network 2216, at least the second address information for communicating with device 2208. Note that details regarding this point are as described above.

Next, operations pertaining to the transmission of the information indicating connection request 3411 that are performed by terminal 2201 will be described. The configuration of terminal 2201 is the terminal configuration illustrated in FIG. 69. Data generator 2508 receives an input of information 2509, and outputs transmission data 2507 including information indicating connection request 3411.

Transceiver device 2505 receives an input of transmission data 2507 including information indicating connection request 3411, performs processing such as error correction coding and mapping, and outputs transmission signal 2504 including information indicating connection request 3411. Transmission signal 2504 including information indicating connection request 3411 is output from antenna 2503 as radio waves.

Server 2205 then obtains, via network #B labeled 2203, transmission signal 2504 including information indicating connection request 3411, or a signal corresponding to this transmission signal 2504.

Accordingly, server 2205 having the configuration illustrated in FIG. 79 receives an input of a received signal including information indicating connection request 3411, performs processing such as demodulation and error correction decoding, obtains the information indicating connection request 3411, and outputs received data group 3502 including the obtained information indicating connection request 3411. Note that not all signals included in received data group 3502 need to output received data.

Operations performed by server 2205 possessing the information indicating connection request 3411 differ depending on whether terminal 2201 is to connect to device 2208 via first network 2213 or terminal 2201 is to connect to device 2208 via second network 2216. Hereinafter, operations performed by server 2205 when terminal 2201 is to connect to device 2208 via first network 2213 and operations performed by server 2205 when terminal 2201 is to connect to device 2208 via second network 2216 will be described separately.

Operations Performed by Server 2205 when Terminal 2201 is to Connect to Device 2208 Via First Network 2213

As described with reference to FIG. 70, FIG. 71, FIG. 75, and FIG. 76, server 2205 possessing the information indicating connection request 3411 needs to obtain the information indicating the first address of device 2208 in order to perform communication with device 2208 via first network 2213.

Accordingly, in server 2205 illustrated in FIG. 79, transceiver device group 3501 performs processing such as demodulation and error correction decoding on the received signal group, and outputs received data group 3502 including the information indicating connection request 3411.

Data generator 3507 receives an input of received data group 3502 including the information indicating connection request 3411, and when the information indicating connection request 3411 includes a request by terminal 2201 to connect to device 2208 via first network 2213, outputs transmission data group 3503 including information indicating the request by terminal 2201 to connect to device 2208 via first network 2213 that is included in the information indicating connection request 3411.

Transceiver device group 3501 performs processing such as error correction coding and mapping on transmission data group 3503 including the information indicating the request by terminal 2201 to connect to device 2208 via first network 2213, and outputs a transmission signal group.

Then, in the case of FIG. 66, data including the information indicating the request by terminal 2201 to connect to device 2208 via first network 2213 that is included in the transmission signal group is delivered to device 2208 via network #A labeled 2207, outdoor gateway 2209, indoor gateway 2211, and second network 2216. In the case of FIG. 67, data including the information indicating the request by terminal 2201 to connect to device 2208 via first network 2213 that is included in the transmission signal group is delivered to device 2208 via network #A labeled 2207, gateway 2300, and second network 2216.

Device 2208 thus obtains the first address information, and delivers data including the first address information to server 2205, but since that process has already been described, repeated description thereof will be omitted.

Then, as illustrated in FIG. 78, a modulated signal including address information 3412 is transmitted by server 2205. Accordingly, in server 2205 illustrated in FIG. 79, transceiver device group 3501 performs processing such as demodulation and error correction decoding on the received signal group, and outputs received data group 3502 including the first address information.

Data generator 3507 receives an input of received data group 3502 including the first address information, and outputs transmission data group 3503 including the first address information.

Transceiver device group 3501 receives an input of transmission data group 3503 including the first address information, performs processing such as error correction coding and mapping, and generates and outputs a transmission signal group. Note that the transmission signal group including the first address information corresponds to address information 3412 illustrated in FIG. 78.

Terminal 2201 having the configuration in FIG. 69 receives a signal corresponding to the transmission signal group including the first address information that was transmitted by server 2205. Transceiver device 2505 receives an input of a received signal received by antenna 2501, performs processing such as demodulation and error correction decoding, and outputs received data 2506 including the first address information.

Data generator 2508 receives inputs of information 2509 and received data 2506 including the first address information, and since data generator 2508 has obtained the first address information, outputs transmission data 2507 including connection request 3413 data including control information for accessing the first address in order to connect to device 2208.

Transceiver device 2505 receives an input of transmission data 2507 including connection request 3413 data including the control information for accessing the first address, performs processing such as error correction coding and mapping, and generates and outputs transmission signal 2504. Transmission signal 2504 is then output from antenna 2503 as radio waves.

A signal corresponding to transmission signal 2504, for example, is delivered to device 2208 via network #B labeled 2203, outdoor gateway 2209, indoor gateway 2211 (or gateway 2300 instead of outdoor gateway 2209 and indoor gateway 2211), and first network 2213.

First transceiver device 1505 included in device 2208 illustrated in FIG. 68 receives an input of received signal 1502 received by antenna (or light receiver) 1501, performs processing such as demodulation and error correction decoding, and outputs received data 1506 including connection request 3413 information. Data generator 2402 receives inputs of (i) received data 1506 including connection request 3413 information and (ii) information 2401, and generates and outputs transmission data 1507 based on received data 1506 including connection request 3413 information.

First transceiver device 1505 receives an input of transmission data 1507, performs processing such as error correction coding and 1504 is then output from antenna (or light emitter) 1503 as, for example, radio waves (as light if the communication is optical communication). Here, transmission signal 1504 including transmission data 1507 corresponds to data 3414 in FIG. 78.

A signal corresponding to transmission signal 1504 transmitted by first transceiver device 1505 is then received by terminal 2201 via first network 2213, etc., whereby terminal 2201 obtains data 3414.

Operations Performed by Server 2205 when Terminal 2201 is to Connect to Device 2208 Via Second Network 2216

As described with reference to FIG. 70, FIG. 71, FIG. 75, FIG. 76, at the point in time that server 2205 obtains the connection request 3411 information, server 2205 obtains the information indicating the second address for terminal 2201 to connect to device 2208 via second network 2216.

Accordingly, transceiver device group 3501 included in server 2205 having the configuration illustrated in FIG. 79 receives an input of transmission data group 3503 including the second address information, performs processing such as error correction coding and mapping, and generates and outputs a transmission signal group. Note that the transmission signal group including the second address information corresponds to address information 3412 illustrated in FIG. 78.

Terminal 2201 having the configuration in FIG. 69 receives a signal corresponding to the transmission signal group including the second address information that was transmitted by server 2205. Transceiver device 2505 receives an input of a received signal received by antenna 2501, performs processing such as demodulation and error correction decoding, and outputs received data 2506 including the second address information.

Data generator 2508 receives inputs of information 2509 and received data 2506 including the second address information, and since data generator 2508 has obtained the second address information, outputs transmission data 2507 including connection request 3413 data including control information for accessing the second address in order to connect to device 2208.

Transceiver device 2505 receives an input of transmission data 2507 including connection request 3413 data including the control information for accessing the second address, performs processing such as error correction coding and mapping, and generates and outputs transmission signal 2504. Transmission signal 2504 is then output from antenna 2503 as radio waves.

A signal corresponding to transmission signal 2504, for example, is delivered to device 2208 via network #B labeled 2203, outdoor gateway 2209, indoor gateway 2211 (or gateway 2300 instead of outdoor gateway 2209 and indoor gateway 2211), and first second network 2216.

Second transceiver device 1514 included in device 2208 having the configuration illustrated in FIG. 68 receives an input of received signal 1511 received by antenna 1510, performs processing such as demodulation and error correction decoding, and outputs received data 1515 including connection request 3413 information. Data generator 2402 receives inputs of (i) received data 1515 including connection request 3413 information and (ii) information 2401, and generates and outputs transmission data 1516 based on received data 1515 including connection request 3413 information.

Second transceiver device 1514 receives an input of transmission data 1516, performs processing such as error correction coding and mapping, and outputs transmission signal 1513. Transmission signal 1513 is then output from, for example, antenna 1512 as radio waves. Here, transmission signal 1524 including transmission data 1526 corresponds to data 3414 in FIG. 78.

A signal corresponding to transmission signal 1516 transmitted by second transceiver device 1514 is then received by terminal 2201 via second network 2216, etc., whereby terminal 2201 obtains data 3414.

As described in Embodiment A6, terminal 2201 may, upon performing the connection request (3411), also transmit authentication information to server 2205, as illustrated by 3411 in FIG. 78. Accordingly, for example, when terminal 2201 has the configuration illustrated in FIG. 69, information 2509 may include authentication information. In such cases, the authentication information is included in transmission data 2507. Server 2205 then obtains this information, determines whether the connection request is valid or invalid information, and when determined to be valid, stores permits the connection request.

Implementing the present embodiment as described above achieves the advantageous effects described in Embodiment A6. In other words, it is possible to achieve both advantageous effects of improved communication quality and improved data transmission speeds.

Note that the method used for device 2208 to notify the first address and second address to terminal 2201 is not limited to the method exemplified in the present embodiment; any sort of network may be used to make the notification.

Supplementary Information A4

In the present specification, the transceiver device and the transceiver device group include functionality for performing signal processing for transmission and functionality for performing signal processing for reception.

Although the signal processing for transmission is exemplified as being error correction coding and mapping, the signal processing may be other signal processing. Examples include multiplexing, quadrature modulation, frequency conversion, bandlimiting, and amplification. However, the signal processing for transmission is not limited to these examples.

Although the signal processing for reception is exemplified as being demodulation and error correction decoding, the signal processing may be other signal processing. Examples include demultiplexing, frequency conversion, quadrature demodulation, frequency synchronization, time synchronization, channel estimation, and distortion estimation. However, the signal processing for reception is not limited to these examples.

Embodiment A8

In the present embodiment, in the method of configuration of the mesh network and multihop communication described in the present specification, a method of configuration of the mesh network and multihop communication that uses a server will be described.

Figure 80:
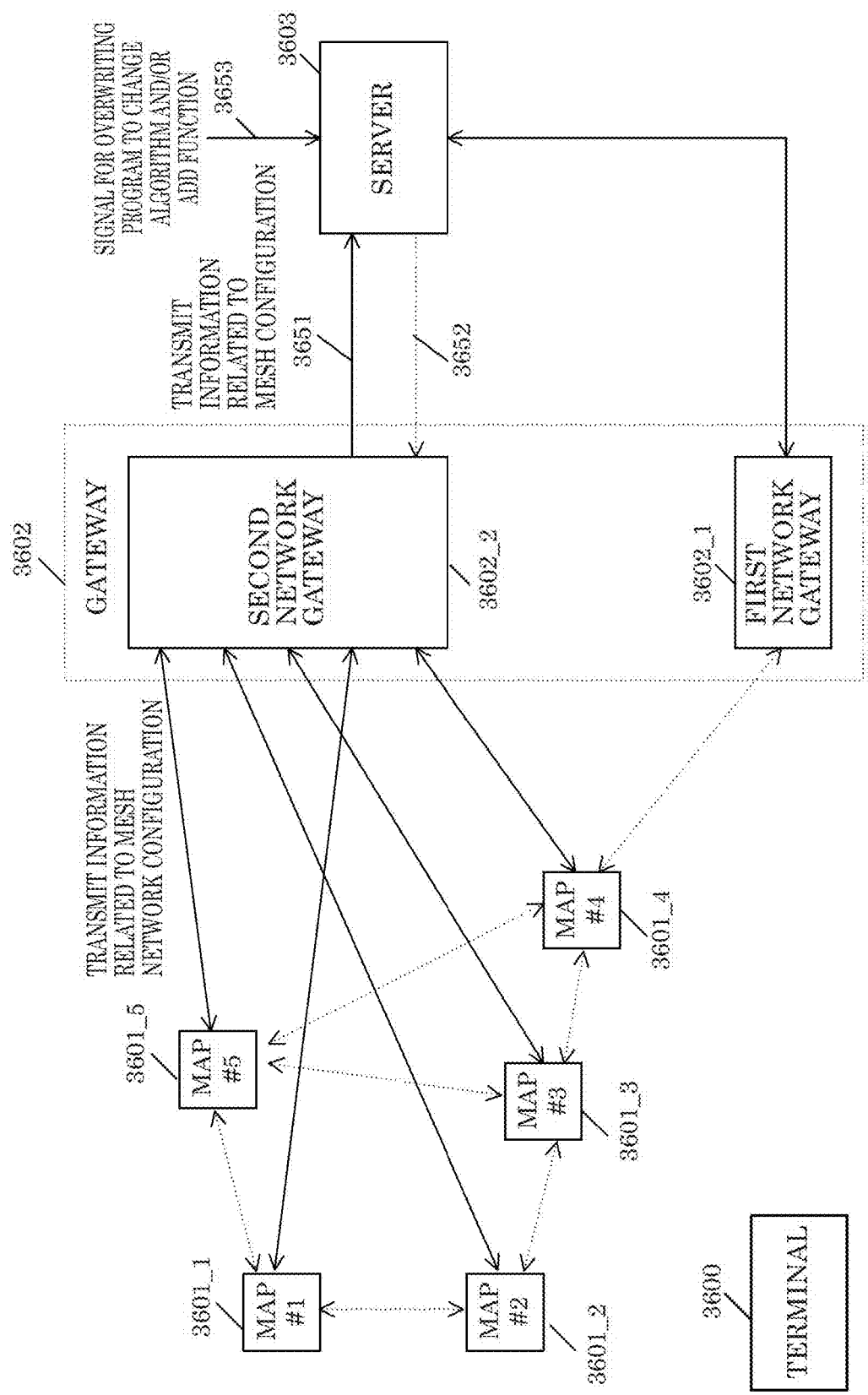
FIG. 80 illustrates one example of a network configuration.

FIG. 80 illustrates the state of a network including: terminal 3600; mesh access points (MAPS) 3601_1, 3601_2, 3601_3, 3601_4, and 3601_5; gateway 3602 including first network gateway 3602_1 and second network gateway 3602_2; and server 3603.

As the relation between the first network and the second network has already been described in detail in Embodiment A6, repeated description thereof will be omitted. Moreover, although MAPs are exemplified as being included in the network illustrated in FIG. 81 (and in FIG. 82), these devices may be mesh points (MPs), and moreover, access points (APs) may also be present on the network. Moreover, in this example, each of the MAPs is capable of communication via the first network and communication via the second network.

As described above in other embodiments, MAP #1 labeled 3601_1, MAP #2 labeled 3601_2, MAP #3 labeled 3601_3, MAP #4 labeled 3601_4, and MAP #5 labeled 3601_5 generate information related to the mesh network in the first network regarding the searching for a connectable MAP and the status, etc., of connection with a connectable MAP via the first network.

Then, as illustrated in FIG. 80, MAP #1 labeled 3601_1, MAP #2 labeled 3601_2, MAP #3 labeled 3601_3, MAP #4 labeled 3601_4, and MAP #5 labeled 3601_5 use the second network to transmit, to second network gateway 3602_2, information related to the configuration of the mesh network in the first network.

Second network gateway 3602_2 transmits, to server 3603, information 3651 related to the configuration of the mesh network in the first network that was obtained from MAP #1 labeled 3601_1, MAP #2 labeled 3601_2, MAP #3 labeled 3601_3, MAP #4 labeled 3601_4, and MAP #5 labeled 3601_5.

Figure 81:
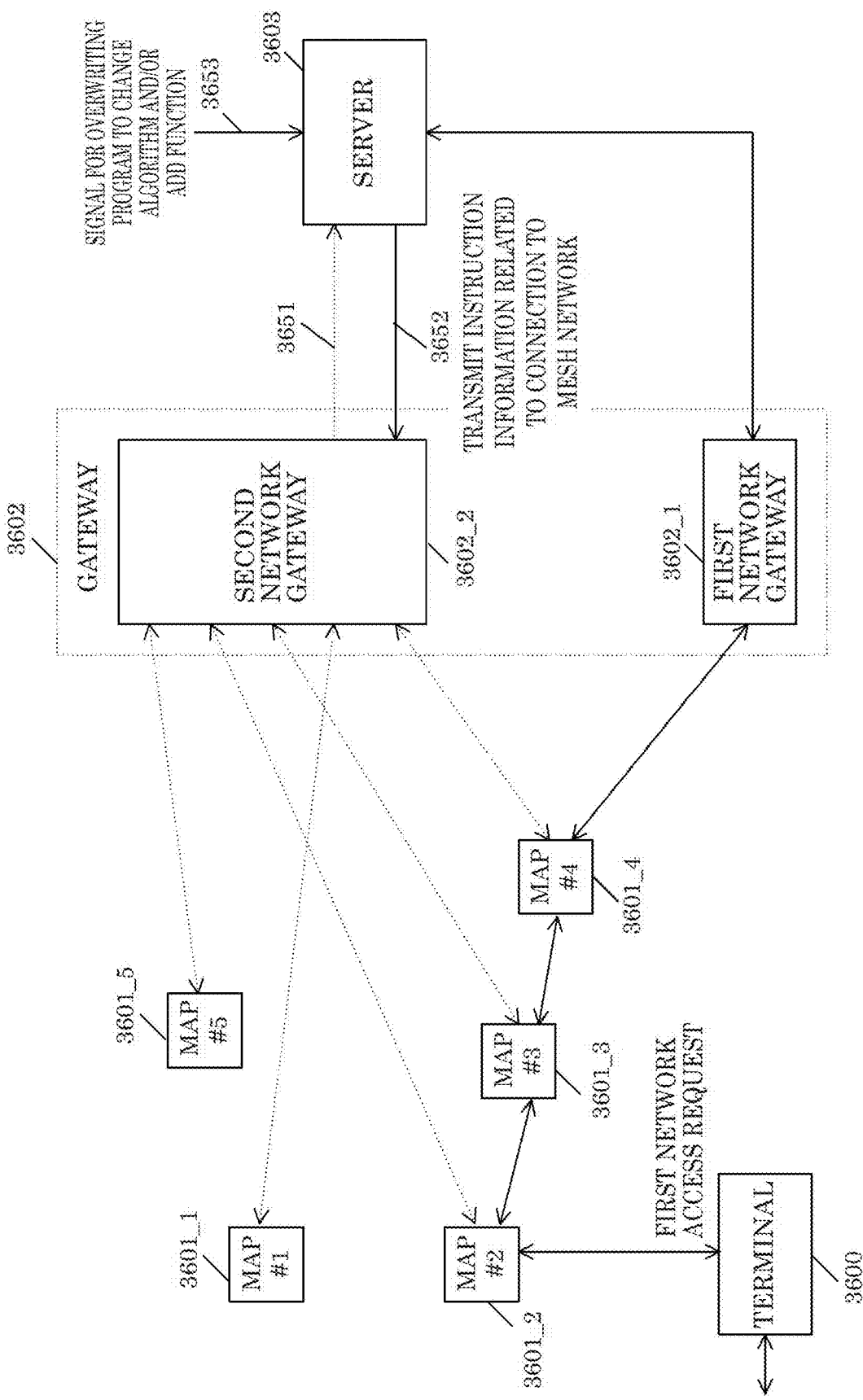
FIG. 81 illustrates one example of a network configuration.

Then, as illustrated in FIG. 81, server 3603 determines the specific method to be used to connect to the mesh network in the first network based on information 3651 related to the configuration of the mesh network in the first network, and transmits, to second network gateway 3602_2, instruction information 3652 related to connection to the mesh network in the first network.

Second network gateway 3602_2 receives an input of information 3652 related to connection to the mesh network in the first network, and transmits, to MAP #1 labeled 3601_1, MAP #2 labeled 3601_2, MAP #3 labeled 3601_3, MAP #4 labeled 3601_4, and MAP #5 labeled 3601_5, a transmission signal including information 3652 related to connection to the mesh network in the first network.

Note that the method to be used to connect to the mesh network in the first network is, for example, in the case of the example illustrated in FIG. 81, information related to the route taken when terminal 3600 transmits a modulated signal to first network gateway 3602_1, namely the route from MAP #2 labeled 3601_2 to MAP #3 labeled 3601_3 to MAP #4 labeled 3601_4.

Moreover, server 3603 determines the method to be used to connect to the mesh network in the first network. Here, server 3603 may receive an input of a signal for changing the processing method for determining the method to be used to connect to the mesh network in the first network, that is to say, the configuration may include signal 3653 for overwriting a program to change an algorithm and/or add a function. Note that new functions may be added to server 3603 by signal 3653 for overwriting a program to change an algorithm and/or add a function. This will be described in greater detail later with reference to FIG. 82.

In the example illustrated in FIG. 81, MAP #2 labeled 3601_2 and MAP #3 labeled 3601_3 establish communication, MAP #3 labeled 3601_3 and MAP #4 labeled 3601_4 establish communication, and MAP #4 labeled 3601_4 and first network gateway 3602_1 establish communication.

Terminal 3600 then requests access from the first network. In FIG. 81, terminal 3600 transmits, to first network to MAP #2 labeled 3601_2, a modulated signal including information indicating an access request to the first network. As a result, a signal corresponding to this modulated signal is delivered to the first network gateway via MAP #2 labeled 3601_2, MAP #3 labeled 3601_3, and MAP #4 labeled 3601_4.

Terminal 3600 and first network gateway 3602_1 then communicate via MAP #2 labeled 3601_2, MAP #3 labeled 3601_3, and MAP #4 labeled 3601_4. Note that first network gateway 3602_1 may transmit, to another device, all or part of the information included in the modulated signal transmitted by terminal 3600.

Figure 82:
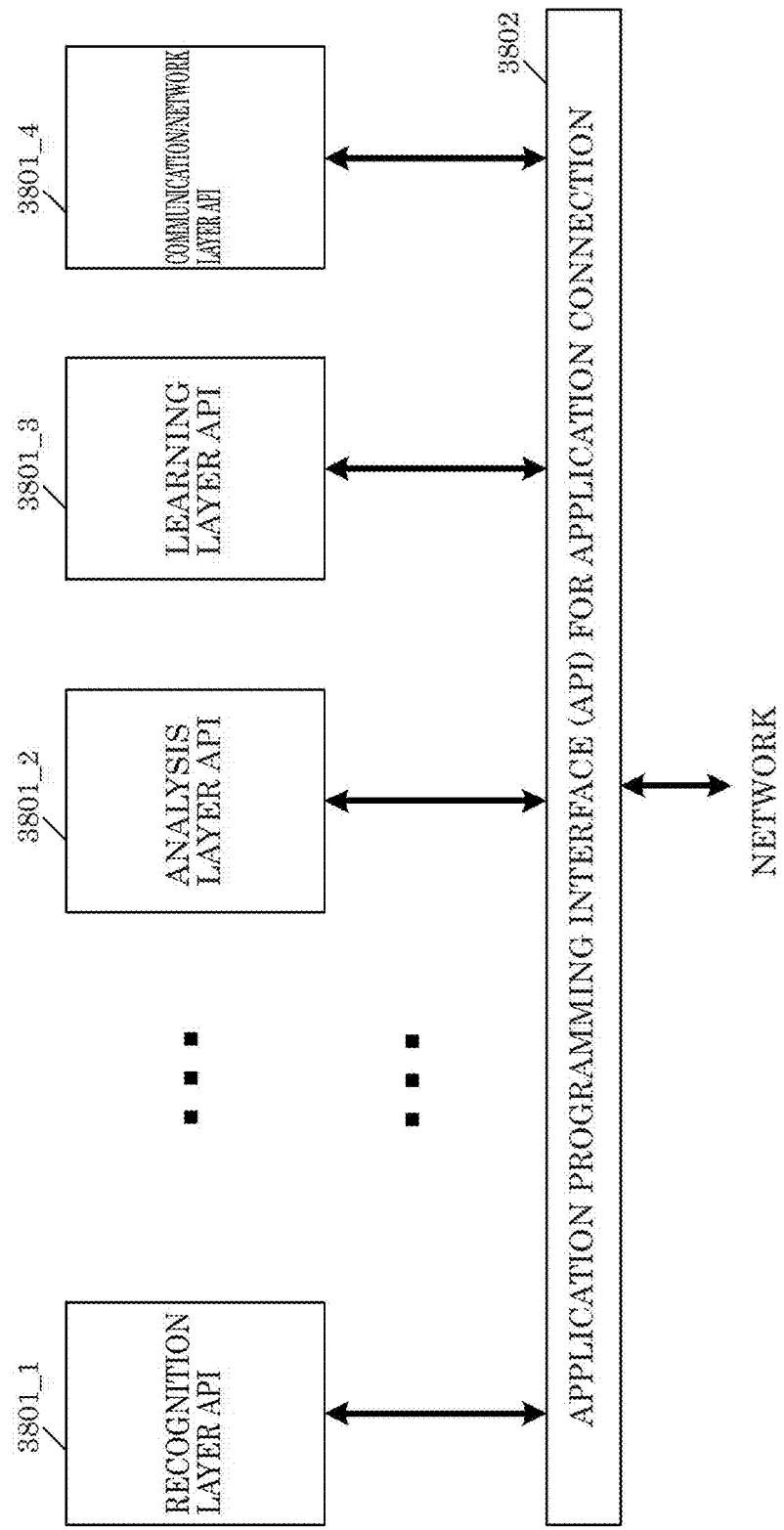
FIG. 82 illustrates one example of a server configuration.

FIG. 82 illustrates one example of a configuration of server 3603 illustrated in FIG. 80 and FIG. 81.

Server 3603 includes, as an application programming interface (API) for performing processes, recognition layer API labeled 3801_1, analysis layer API labeled 3801_2, learning layer API labeled 3801_3, and communication/network layer API labeled 3801_4, etc., and these APIs are connected to API 3802 for application connection, and processes are performed in each API, such as determining the method to be used to connect to the mesh network in the first network. API 3802 for application connection is connected to a network, and outputs a result of the processing it performs.

As described above, as the result of a MAP notifying the server of the connection state of the first network and the server determining the configuration of the mesh network in the first network, an advantageous effect whereby a terminal can easily communicate via the first network is achieved. Moreover, as a result of a MAP using the second network to provide the server with the connection state of the first network, the server can know the connection state of the first network without forming a mesh network, which makes it possible to simplify processes.

Next, another example of the above-described method of configuration of the mesh network and multihop communication that uses a server will be given.

FIG. 80 illustrates the state of a network including: terminal 3600; mesh access points (MAPS) 3601_1, 3601_2, 3601_3, 3601_4, and 3601_5; gateway 3602 including first network gateway 3602_1 and second network gateway 3602_2; and server 3603.

As the relation between the first network and the second network has already been described in detail in Embodiment A6, repeated description thereof will be omitted. Moreover, although MAPs are exemplified as being included in the network illustrated in FIG. 81 (and in FIG. 82), these devices may me mesh points (MPs), and moreover, access points (APs) may also be present on the network. Moreover, in this example, each of the MAPs is capable of communication via the first network and communication via the second network.

As described above in other embodiments, MAP #1 labeled 3601_1, MAP #2 labeled 3601_2, MAP #3 labeled 3601_3, MAP #4 labeled 3601_4, and MAP #5 labeled 3601_5 generate information related to the mesh network in the first network regarding the searching for a connectable MAP and the status, etc., of connection with a connectable MAP via the first network.

Then, as illustrated in FIG. 80, MAP #1 labeled 3601_1, MAP #2 labeled 3601_2, MAP #3 labeled 3601_3, MAP #4 labeled 3601_4, and MAP #5 labeled 3601_5 use the second network to transmit, to second network gateway 3602_2, information related to the configuration of the mesh network in the first network.

Second network gateway 3602_2 transmits, to server 3603, information 3651 related to the configuration of the mesh network in the first network that was obtained from MAP #1 labeled 3601_1, MAP #2 labeled 3601_2, MAP #3 labeled 3601_3, MAP #4 labeled 3601_4, and MAP #5 labeled 3601_5.

Figure 83:
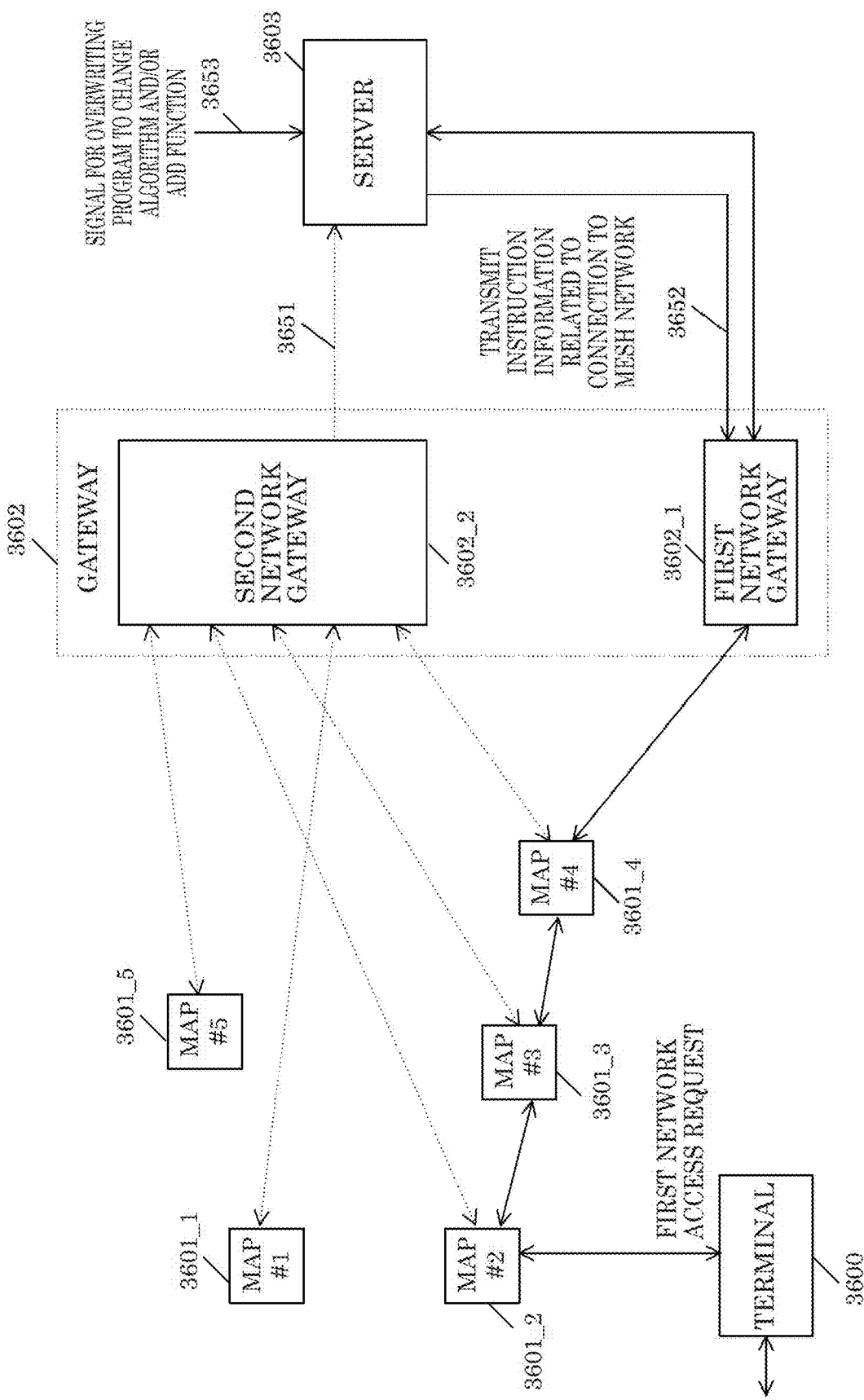
FIG. 83 illustrates one example of a network configuration.

Then, as illustrated in FIG. 83, server 3603 determines the specific method to be used to connect to the mesh network in the first network based on information 3651 related to the configuration of the mesh network in the first network, and transmits, to first network gateway 3602_1, instruction information 3652 related to connection to the mesh network in the first network.

First network gateway 3602_1 receives an input of information 3652 related to connection to the mesh network in the first network, and transmits, to, for example, MAP #4 labeled 3601_4, a transmission signal including information 3652 related to connection to the mesh network in the first network.

Note that the method to be used to connect to the mesh network in the first network is, for example, in the case of the example illustrated in FIG. 81, information related to the route taken when terminal 3600 transmits a modulated signal to first network gateway 3602_1, namely the route from MAP #2 labeled 3601_2 to MAP #3 labeled 3601_3 to MAP #4 labeled 3601_4.

Note that as operations performed by server 3603 have already been described with reference to FIG. 81 and FIG. 82, repeated description thereof will be omitted.

In the example illustrated in FIG. 83, MAP #2 labeled 3601_2 and MAP #3 labeled 3601_3 establish communication, MAP #3 labeled 3601_3 and MAP #4 labeled 3601_4 establish communication, and MAP #4 labeled 3601_4 and first network gateway 3602_1 establish communication. Here, first network gateway 3602_1 transmits a transmission signal including information 3652 related to connection to the mesh network in the first network to MAP #4 labeled 3601_4, and having received this, MAP #4 labeled 3601_4 transmits a transmission signal including information 3652 related to connection to the mesh network in the first network to MAP #3 labeled 3601_3, and having received this, MAP #3 labeled 3601_3 transmits a transmission signal including information 3652 related to connection to the mesh network in the first network to MAP #2 labeled 3601_2. With this, information 3652 related to connection to the mesh network in the first network is shared among MAP #4 labeled 3601_4, MAP #3 labeled 3601_3, and MAP #2 labeled 3601_2.

Terminal 3600 then requests access from the first network. In FIG. 83, terminal 3600 transmits, to first network to MAP #2 labeled 3601_2, a modulated signal including information indicating an access request to the first network. As a result, a signal corresponding to this modulated signal is delivered to the first network gateway via MAP #2 labeled 3601_2, MAP #3 labeled 3601_3, and MAP #4 labeled 3601_4.

Terminal 3600 and first network gateway 3602_1 then communicate via MAP #2 labeled 3601_2, MAP #3 labeled 3601_3, and MAP #4 labeled 3601_4. Note that first network gateway 3602_1 may transmit, to another device, all or part of the information included in the modulated signal transmitted by terminal 3600.

As described above, as the result of a MAP notifying the server of the connection state of the first network and the server determining the configuration of the mesh network in the first network, an advantageous effect whereby a terminal can easily communicate via the first network is achieved.

In the above description, server 3603 is exemplified as transmitting information 3652 related to connection to the mesh network in the first network to a MAP via the first network or the second network, but this example is not limiting. Server 3603 may transmit information 3652 related to connection to the mesh network in the first network to a MAP via a network other than the first network or the second network.

Supplementary Information A5

In the present specification, the terminology "mesh network" is used, but the terminology "mesh network" may be rewritten as "ad hoc network" and the embodiments may be carried out.

In the present specification, the device names "terminal", "gateway", "MAP", "MP", "AP", and "server" are used in the above embodiments, but the names of the devices are not limited to these examples. The names "device", "communication device", "base station", "wireless communication device", and "wireless station" may be used.

Embodiment B1

Hereinafter, communication system BS according to the present embodiment will be described with reference to FIG. 84.

Figure 84:
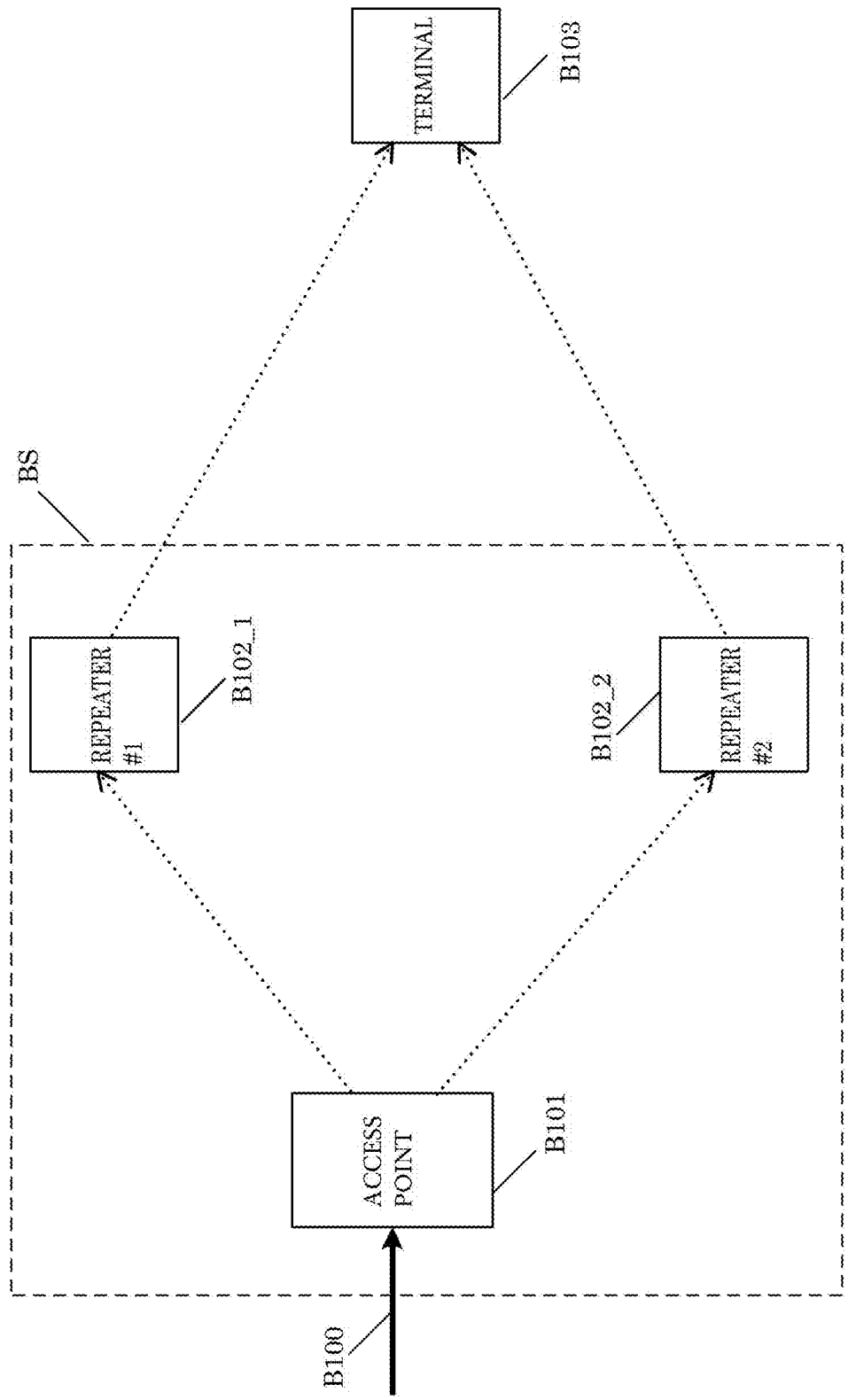
FIG. 84 illustrates one example of a system configuration.

As illustrated in FIG. 84, communication system BS includes access point B101, repeater #1 labeled B102_1 (also referred to as a first repeater or a first communication device), and repeater #2 labeled B102_2 (also referred to as a second repeater or a second communication device). Note that the "repeater" is also referred to as a "communication device" in the present specification. Moreover, communication system BS may be considered as a single virtual access point. Stated differently, access point B101, repeater #1 labeled B102_1, and repeater #2 labeled B102_2 may be considered as a single virtual access point.

Access point B101 wirelessly communicates with repeater #1 labeled B102_1 on at least a first channel included in a first frequency band and wirelessly communicates with repeater #2 labeled B102_2 on at least a second channel included in a second frequency band different than the first frequency band. Repeater #1 labeled B102_1 wirelessly communicates with terminal B103 on at least a third channel included in the second frequency band. Repeater #2 labeled B102_2 wirelessly communicates with terminal B103 on at least a fourth channel included in the first frequency band. As used herein, a frequency band indicates a band of frequencies usable in communication conforming to a given communication standard or a given communication method, and includes one or more channels. Examples of a frequency band include a 5 GHz band and a 6 GHZ. Moreover, a channel indicates, for example, frequencies or a unit of frequencies in a frequency band, which are used in an instance of communication conforming to a given communication standard or a given communication method, and is, for example, a band of approximately 20 MHz having a center frequency of 5.2 GHZ. A channel is typically identified by an assigned number, such as "channel 40". A method known as channel bonding in which a plurality of adjacent channels are used simultaneously may be employed.

Here, the third channel may be the same channel as the second channel, and the fourth channel may be the same channel as the first channel.

The first repeater and the second repeater may be disposed in a single housing.

The access point may communicate with the first repeater and the second repeater using multi-access via OFDMA.

The terminal may include a plurality of terminals, and at least one of the first repeater or the second repeater may communicate with the plurality of terminals using multi-access via OFDMA.

The access point may transmit one item of data to each of the first repeater and the second repeater. When the first repeater receives the one item of data, the first repeater may transmit the received one item of data or data including at least part of the received one item of data to the terminal. When the second repeater receives the one item of data, the second repeater may transmit the received one item of data or data including at least part of the received one item of data to the terminal.

Terminal B103 that wirelessly communicates with communication system BS wirelessly communicates with the first repeater on at least a third channel included in the first frequency band and wirelessly communicates with the second repeater on at least a fourth channel included in the second frequency band.

Hereinafter, communication system BS will be described in greater detail.

As illustrated in FIG. 84, access point B101 receives an input of data B100, generates a modulated signal from data B100, and transmits the generated modulated signal to repeater #1 labeled B102_1 and/or repeater #2 labeled B102_2.

Repeater #1 labeled B102_1 receives the modulated signal transmitted by access point B101, generates a modulated signal destined for terminal B103 based on the received modulated signal, and transmits the generated modulated signal to terminal B103.

Similarly, repeater #2 labeled B102_2 receives the modulated signal transmitted by access point B101, generates a modulated signal destined for terminal B103 based on the received modulated signal, and transmits the generated modulated signal to terminal B103.

Although the data that is input into access point B101 is exemplified as a single series of data (B100), the data is not limited to this example. Access point B101 may be configured to receive an input of a plurality of series of data.

Note that data B100 is also referred to as "one item of data". Access point B101 duplicates data B100 so as to have two copies of data B100, transmits one copy to the terminal via repeater #1 labeled B102_1, and transmits the other copy to the terminal via repeater #2 labeled B102_2. Access point B101 may transmit part of data B100 to the terminal via repeater #1 labeled B102_1, and may transmit the remaining part of data B100 to the terminal via repeater #2 labeled B102_2.

Note that repeater #1 labeled B102_1 and repeater #2 labeled B102_2 may each include a function of an access point. Moreover, the access point may include a function for operating as repeater #1 labeled B102_1 or repeater #2 labeled B102_2. Such an access point may operate as repeater #1 labeled B102_1 or repeater #2 labeled B102_2.

Access point B101 transmits one or more modulated signals to repeater #1 labeled B102_1. Access point B101 transmits one or more modulated signals to repeater #2 labeled B102_2. If transmitting a plurality of modulated signals, multiple-input multiple-output (MIMO) transmission may be used.

Repeater #1 labeled B102_1 generates and transmits one or more modulated signals destined for terminal B103 based on the received modulated signal(s). Repeater #2 labeled B102_2 generates and transmits one or more modulated signals destined for terminal B103 based on the received modulated signal(s). If transmitting a plurality of modulated signals, MIMO transmission may be used.

Figure 85:
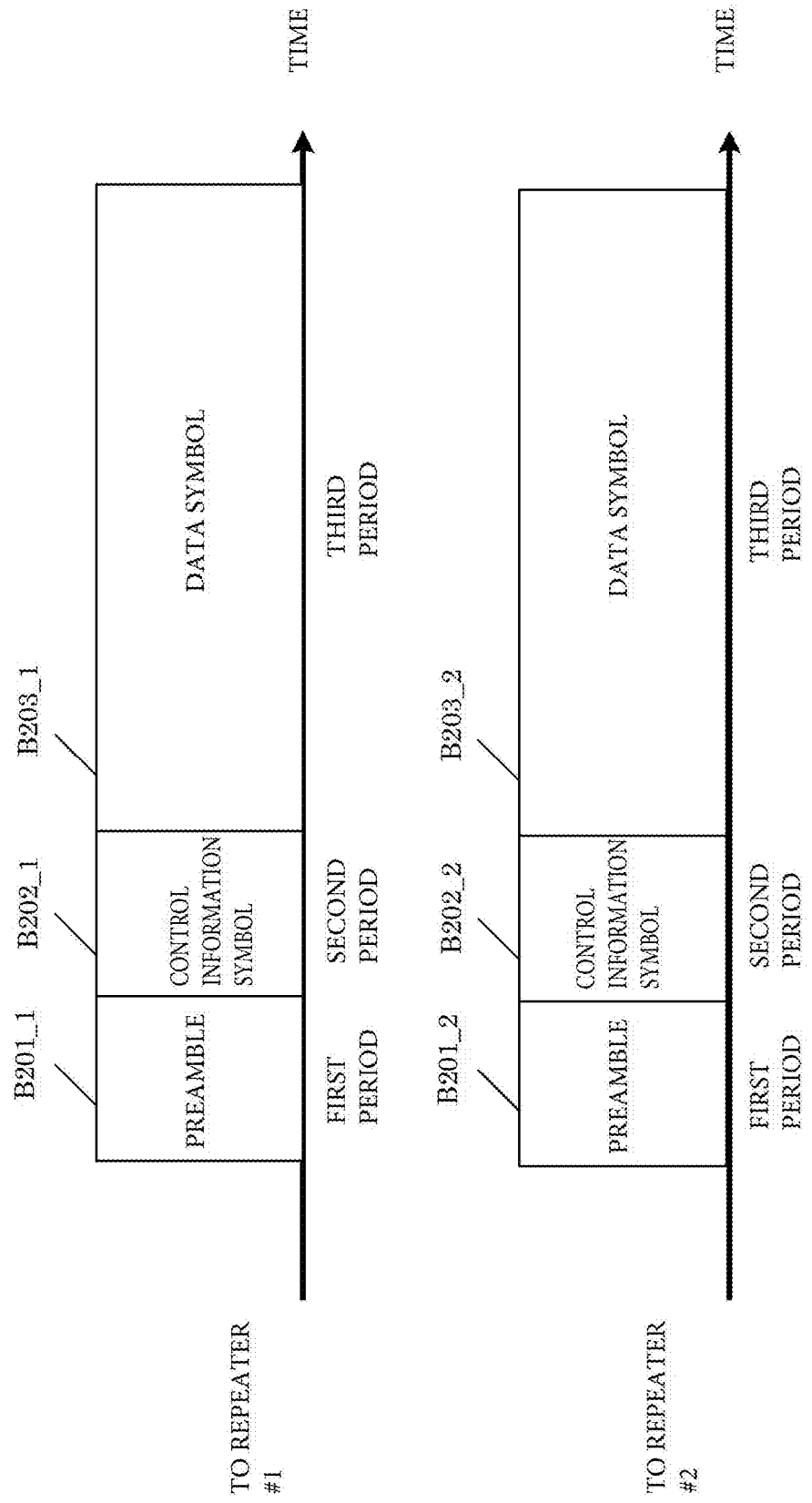
FIG. 85 illustrates one example of frame transmission time.
Figure 86:
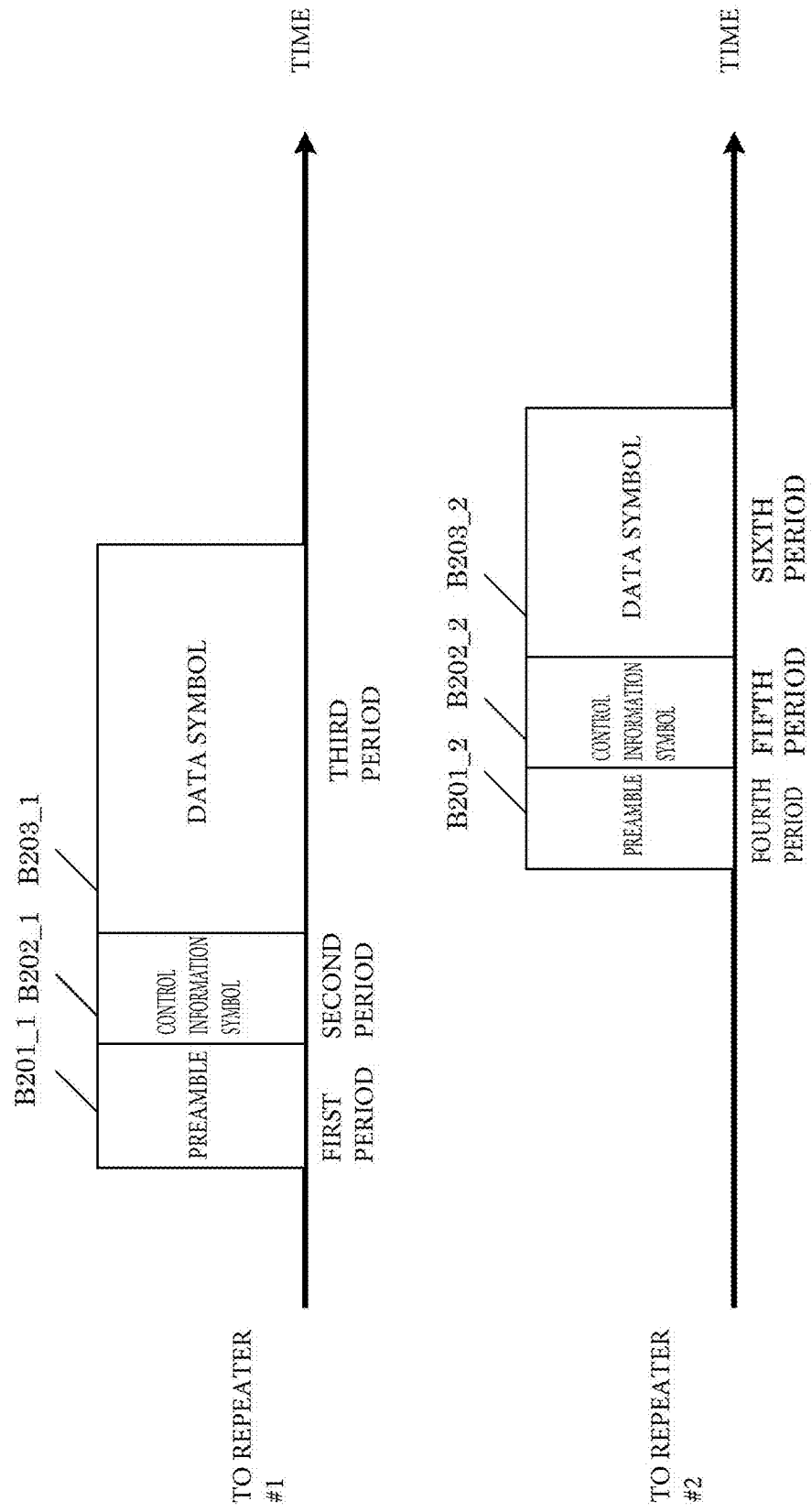
FIG. 86 illustrates one example of frame transmission time.
Figure 87:
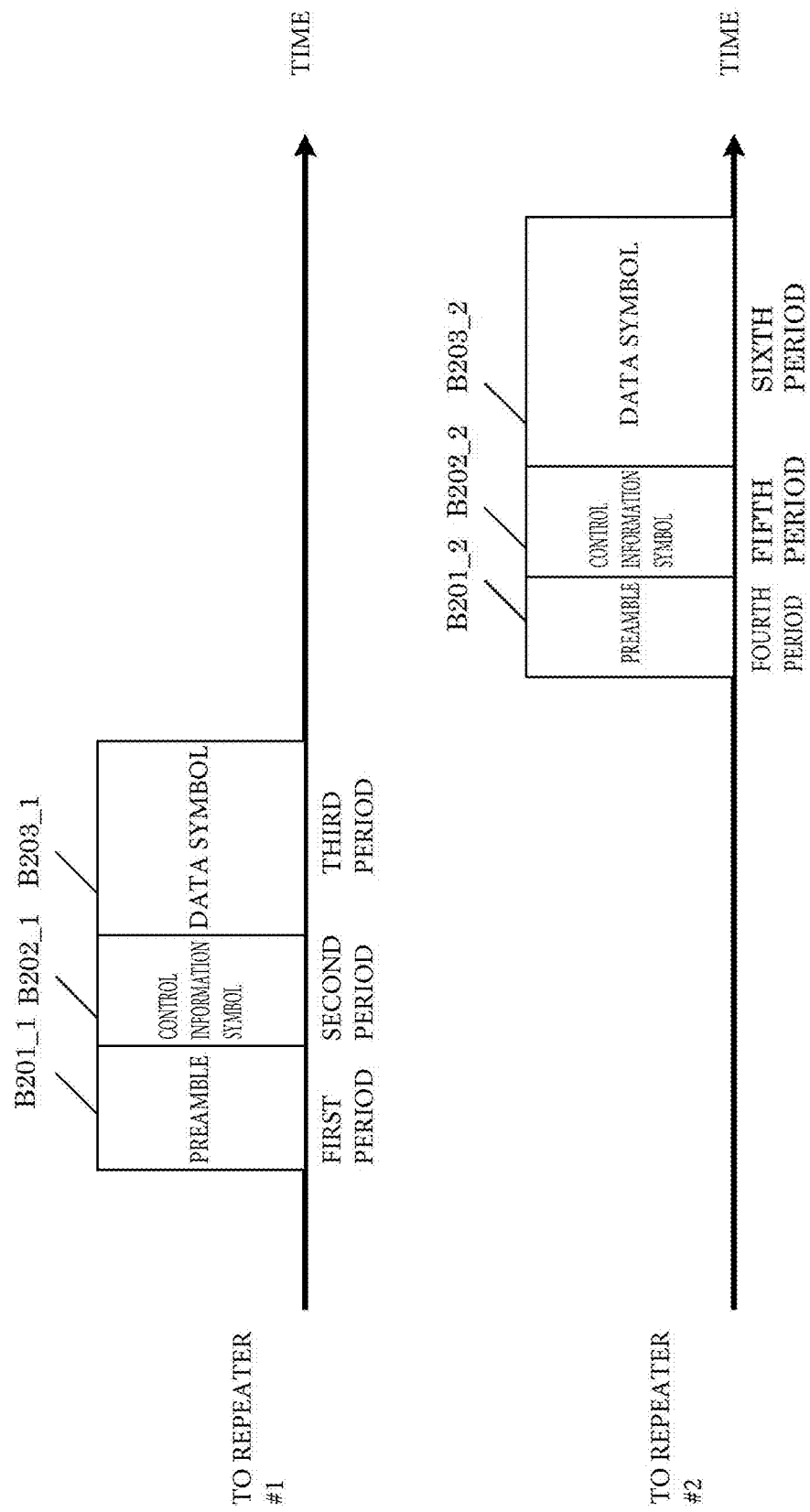
FIG. 87 illustrates one example of frame transmission time.

Each of FIG. 85, FIG. 86, and FIG. 87 illustrates an example of frame configurations of a modulated signal transmitted by access point B101 and destined for repeater #1 labeled B102_1 and a modulated signal transmitted by access point B101 and destined for repeater #2 labeled B102_2. Time is represented on the horizontal axis in FIG. 85, FIG. 86, and FIG. 87.

As illustrated in FIG. 85, FIG. 86, and FIG. 87, a modulated signal destined for repeater #1 labeled B102_1 includes preamble B201_1, control information symbol B202_1, and data symbol B203_1. Similarly, a modulated signal destined for repeater #2 labeled B102_2 includes preamble B201_2, control information symbol B202_2, and data symbol B203_2. Note that the modulated signal destined for repeater #1 labeled B102_1 may be one or a plurality of modulated signals, and the modulated signal destined for repeater #2 labeled B102_2 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 85, preamble B201_1 is present in the first period, and preamble B201_2 is also present in the first period.

Control information symbol B202_1 is present in the second period, and control information symbol B202_2 is also present in the second period. Data symbol B203_1 is present in the third period, and data symbol B203_2 is also present in the third period.

Here, the modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for repeater #2 labeled B102_2 that includes preamble B201_2, control information symbol B202_2, and data symbol B203_2 is transmitted from access point B101 using, for example, the second frequency band (for example, a 6 GHz band). Note that the first frequency band and the second frequency band are different frequency bands.

When the phrase a "modulated signal is transmitted using the first frequency band" is used, this may also mean that the "modulated signal is transmitted using a channel included in the first frequency band". This also applies to similar phrases.

FIG. 86 illustrates frame configurations of a modulated signal destined for repeater #1 labeled B102_1 and a modulated signal destined for repeater #2 labeled B102_2 which differ from those in FIG. 85. Elements which operate in the same manner as those in FIG. 85 are assigned with the same reference signs, and repeated detailed description thereof is omitted. Note that the modulated signal destined for repeater #1 labeled B102_1 may be one or a plurality of modulated signals, and the modulated signal destined for repeater #2 labeled B102_2 may be one or a plurality of modulated signals. If transmitting a plurality of modulated signals, MIMO transmission may be used.

As illustrated in FIG. 86, preamble B201_1 is present in the first period, control information symbol B202_1 is present in the second period, and data symbol B203_1 is present in the third period. Preamble B201_2 is present in the fourth period, control information symbol B202_2 is present in the fifth period, and data symbol B203_2 is present in the sixth period.

The example illustrated in FIG. 86 differs from the example illustrated in FIG. 85 in that the time interval in which the modulated signal destined for repeater #1 labeled B102_1 that includes preamble B201_1, control information symbol B202_1, and data symbol B203_1 and the time interval in which the modulated signal destined for repeater #2 labeled B102_2 that includes preamble B201_2, control information symbol B202_2, and data symbol B203_2 partially temporally overlap.

For example, in FIG. 86, part of data symbol B203_1 is present in the fourth period in which preamble B201_2 is present. Additionally, part of data symbol B203_1 is present in the fifth period in which control information symbol B202_2 is present. Additionally, part of the sixth period in which data symbol B203_2 is present and part of the third period in which data symbol B203_1 is present temporally overlap.

Note that FIG. 86 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for repeater #2 labeled B102_2 that includes preamble B201_2, control information symbol B202_2, and data symbol B203_2 is transmitted from access point B101 using, for example, the second frequency band (for example, a 6 GHz band). Note that the first frequency band and the second frequency band are different frequency bands.

FIG. 87 illustrates frame configurations of a modulated signal destined for repeater #1 labeled B102_1 and a modulated signal destined for repeater #2 labeled B102_2 which differ from those in FIG. 85 and FIG. 86. Elements which operate in the same manner as those in FIG. 85 are assigned with the same reference signs, and repeated detailed description thereof is omitted. Note that the modulated signal destined for repeater #1 labeled B102_1 may be one or a plurality of modulated signals, and the modulated signal destined for repeater #2 labeled B102_2 may be one or a plurality of modulated signals. If transmitting a plurality of modulated signals, MIMO transmission may be used.

As illustrated in FIG. 87, preamble B201_1 is present in the first period, control information symbol B202_1 is present in the second period, and data symbol B203_1 is present in the third period. Preamble B201_2 is present in the fourth period, control information symbol B202_2 is present in the fifth period, and data symbol B203_2 is present in the sixth period.

The example illustrated in FIG. 87 differs from the examples illustrated in FIG. 85 and FIG. 86 in that the time interval in which the modulated signal destined for repeater #1 labeled B102_1 that includes preamble B201_1, control information symbol B202_1, and data symbol B203_1 and the time interval in which the modulated signal destined for repeater #2 labeled B102_2 that includes preamble B201_2, control information symbol B202_2, and data symbol B203_2 do not temporally overlap.

Accordingly, the modulated signal destined for repeater #2 labeled B102_2 is not present in the first period in which preamble B201_1 is present. Similarly, the modulated signal destined for repeater #2 labeled B102_2 is not present in the second period in which control information symbol B202_1 is present. Similarly, the modulated signal destined for repeater #2 labeled B102_2 is not present in the third period in which data symbol B203_1 is present.

Additionally, the modulated signal destined for repeater #1 labeled B102_1 is not present in the fourth period in which preamble B201_2 is present. Similarly, the modulated signal destined for repeater #1 labeled B102_1 is not present in the fifth period in which control information symbol B202_2 is present. Similarly, the modulated signal destined for repeater #1 labeled B102_1 is not present in the sixth period in which data symbol B203_2 is present.

Note that FIG. 87 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for repeater #2 labeled B102_2 that includes preamble B201_2, control information symbol B202_2, and data symbol B203_2 is transmitted from access point B101 using, for example, the second frequency band (for example, a 6 GHz band). Note that the first frequency band and the second frequency band are different frequency bands.

Figure 88:
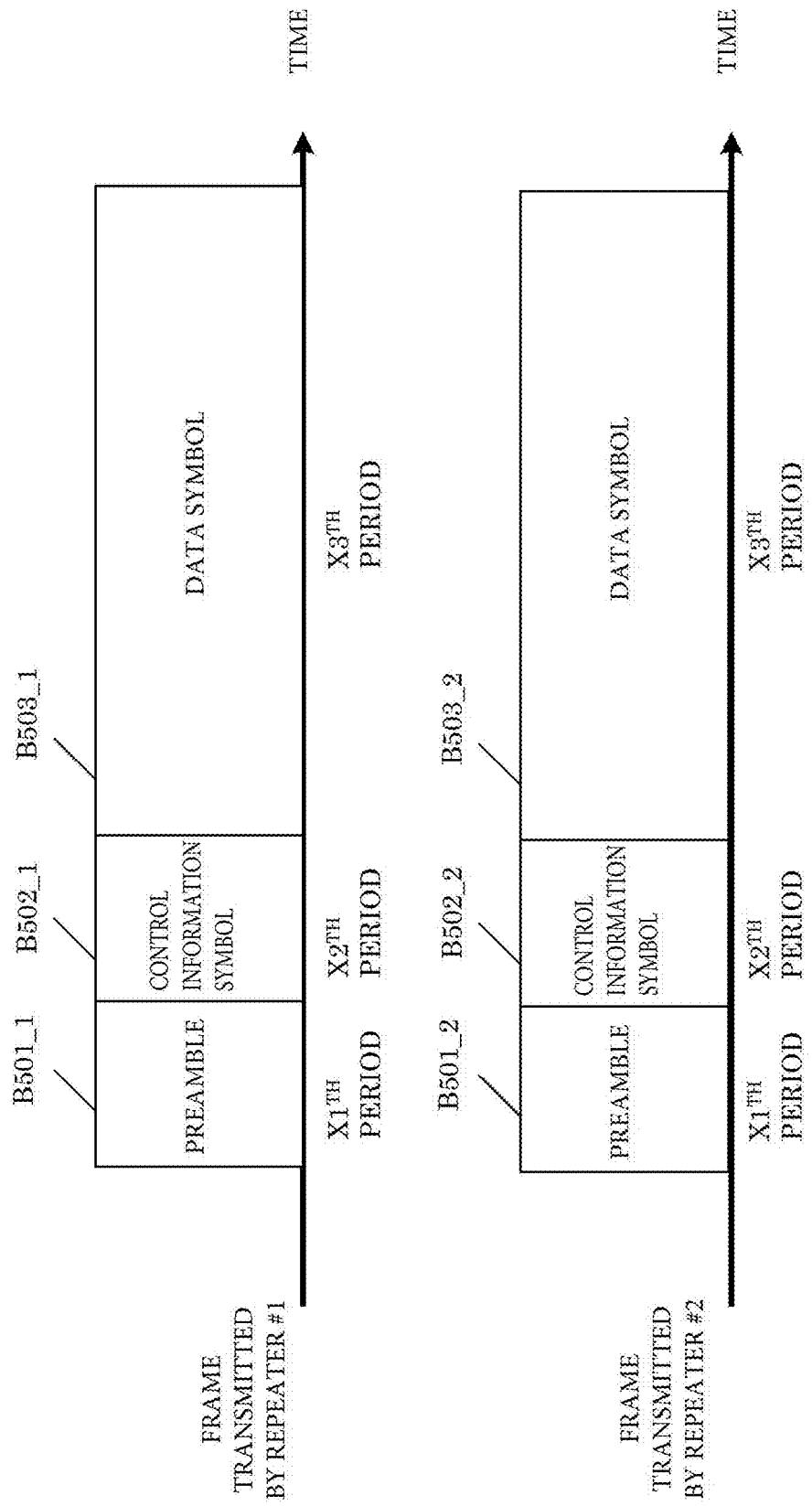
FIG. 88 illustrates one example of frame transmission time.
Figure 89:
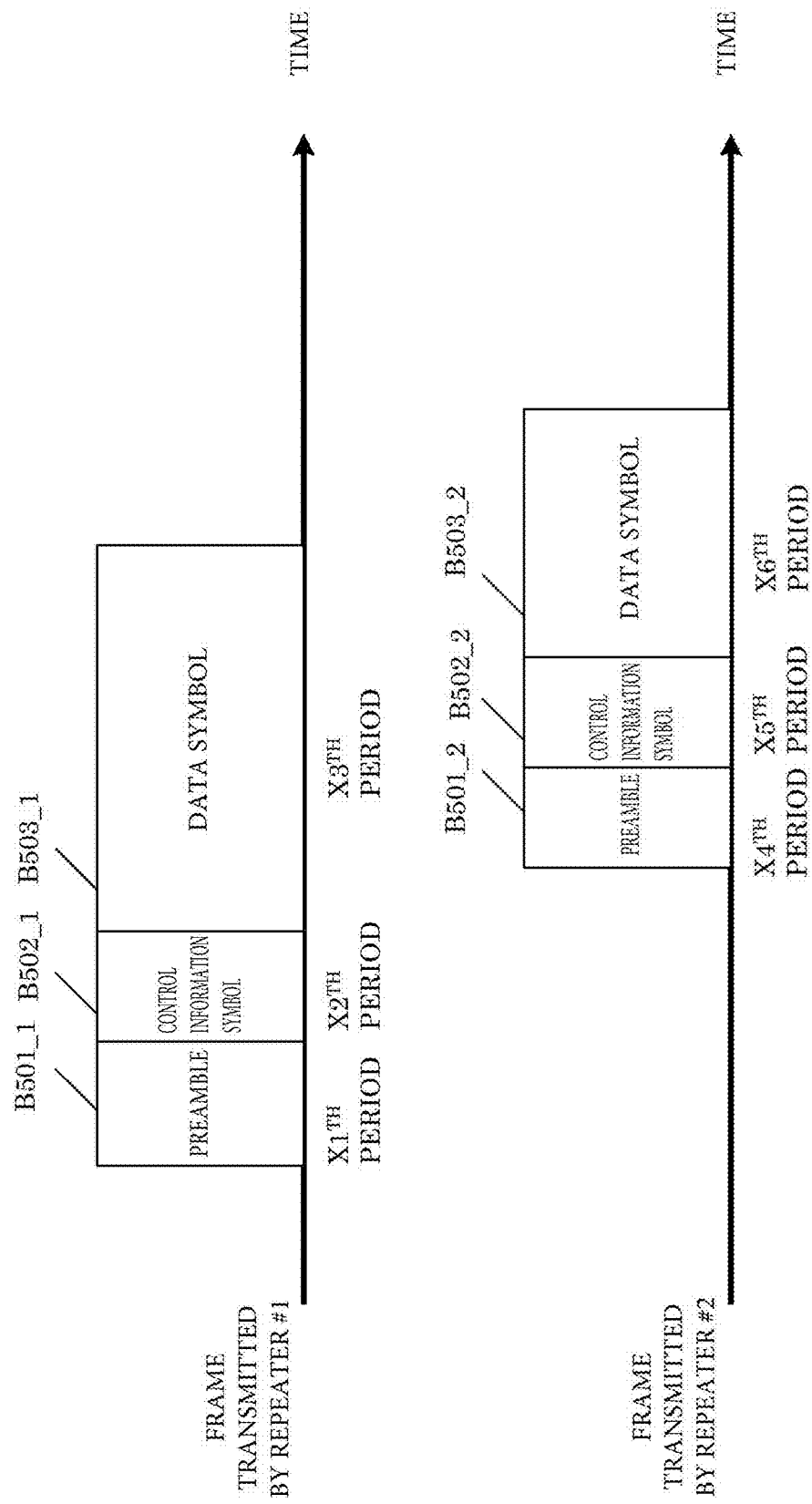
FIG. 89 illustrates one example of frame transmission time.
Figure 90:
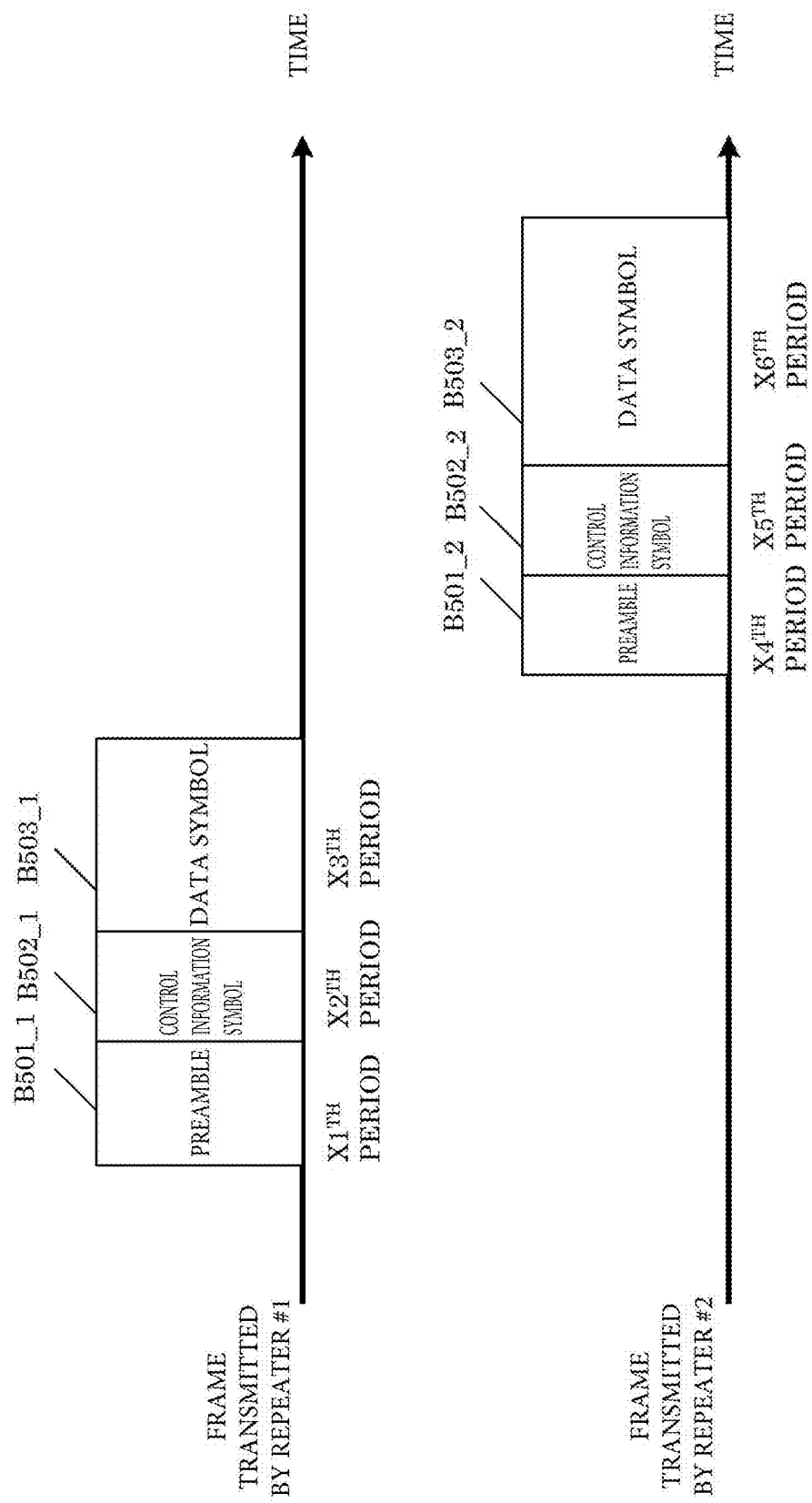
FIG. 90 illustrates one example of frame transmission time.

Each of FIG. 88, FIG. 89, and FIG. 90 illustrates an example of frame configurations of modulated signals transmitted by repeater #1 labeled B102_1 and repeater #2 labeled B102_2. Time is represented on the horizontal axis in FIG. 88, FIG. 89, and FIG. 90.

As illustrated in FIG. 88, FIG. 89, and FIG. 90, a modulated signal transmitted by repeater #1 labeled B102_1 includes preamble B501_1, control information symbol B502_1, and data symbol B503_1. Similarly, a modulated signal transmitted by repeater #2 labeled B102_2 includes preamble B501_2, control information symbol B502_2, and data symbol B503_2. Note that the modulated signal transmitted by repeater #1 labeled B102_1 may be one or a plurality of modulated signals, and the modulated signal transmitted by repeater #2 labeled B102_2 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 88, preamble B501_1 is present in the $X1^{th}$ period, and preamble B501_2 is also present in the $X1^{th}$ period. Control information symbol B502_1 is present in the $X2^{th}$ period, and control information symbol B502_2 is also present in the $X2^{th}$ period. Data symbol B503_1 is present in the $X3^{th}$ period, and data symbol B503_2 is also present in the $X3^{th}$ period.

Note that the term "$X1^{th}$ period" may be rewritten as "period X1". This also applies to similar phrases.

Here, a modulated signal transmitted by repeater #1 labeled B102_1 that includes preamble B501_1, control information symbol B502_1, and data symbol B503_1 uses the second frequency band (6 GHZ band). A modulated signal transmitted by repeater #2 labeled B102_2 that includes preamble B501_2, control information symbol B502_2, and data symbol B503_2 uses the first frequency band (5 GHz band).

FIG. 89 illustrates frame configurations of a modulated signal transmitted by repeater #1 labeled B102_1 and a modulated signal transmitted by repeater #2 labeled B102_2 which differ from those in FIG. 88. Elements which operate in the same manner as those in FIG. 88 are assigned with the same reference signs, and repeated detailed description thereof is omitted. Note that the modulated signal transmitted by repeater #1 labeled B102_1 may be one or a plurality of modulated signals, and the modulated signal transmitted by repeater #2 labeled B102_2 may be one or a plurality of modulated signals. If transmitting a plurality of modulated signals, MIMO transmission may be used.

As illustrated in FIG. 89, preamble B501_1 is present in the $X1^{th}$ period, control information symbol B502_1 is present in the $X2^{th}$ period, and data symbol B503_1 is present in the $X3^{th}$ period. Preamble B501_2 is present in the $X4^{th}$ period, control information symbol B502_2 is present in the $X5^{th}$ period, and data symbol B503_2 is present in the $X6^{th}$ period.

The example illustrated in FIG. 89 differs from the example illustrated in FIG. 88 in that the time interval in which the modulated signal transmitted by repeater #1 labeled B102_1 that includes preamble B501_1, control information symbol B502_1, and data symbol B503_1 and the time interval in which the modulated signal transmitted by repeater #2 labeled B102_2 that includes preamble B501_2, control information symbol B502_2, and data symbol B503_2 partially temporally overlap.

For example, in FIG. 89, part of data symbol B503_1 is present in the $X4^{th}$ period in which preamble B501_2 is present. Additionally, part of data symbol B503_1 is present in the $X5^{th}$ period in which control information symbol B502_2 is present. Additionally, part of the $X6^{th}$ period in which data symbol B503_2 is present and part of the $X3^{th}$ period in which data symbol B503_1 is present temporally overlap.

Note that FIG. 89 illustrates merely one example; the frame configurations are not limited to this example, and need only satisfy the conditions described above.

A modulated signal transmitted by repeater #1 labeled B102_1 that includes preamble B501_1, control information symbol B502_1, and data symbol B503_1 uses the second frequency band (6 GHz band). A modulated signal transmitted by repeater #2 labeled B102_2 that includes preamble B501_2, control information symbol B502_2, and data symbol B503_2 uses the first frequency band (5 GHz band).

FIG. 90 illustrates frame configurations of a modulated signal transmitted by repeater #1 labeled B102_1 and a modulated signal transmitted by repeater #2 labeled B102_2 which differ from those in FIG. 88 and FIG. 89. Elements which operate in the same manner as those in FIG. 88 are assigned with the same reference signs, and repeated detailed description thereof is omitted. Note that the modulated signal transmitted by repeater #1 labeled B102_1 may be one or a plurality of modulated signals, and the modulated signal transmitted by repeater #2 labeled B102_2 may be one or a plurality of modulated signals. If transmitting a plurality of modulated signals, MIMO transmission may be used.

As illustrated in FIG. 90, preamble B501_1 is present in the $X1^{th}$ period, control information symbol B502_1 is present in the $X2^{th}$ period, and data symbol B503_1 is present in the $X3^{th}$ period. Preamble B501_2 is present in the $X4^{th}$ period, control information symbol B502_2 is present in the $X5^{th}$ period, and data symbol B503_2 is present in the $X6^{th}$ period.

The example illustrated in FIG. 90 differs from the examples illustrated in FIG. 88 and FIG. 89 in that the time interval in which the modulated signal transmitted by repeater #1 labeled B102_1 that includes preamble B501_1, control information symbol B502_1, and data symbol B503_1 and the time interval in which the modulated signal transmitted by repeater #2 labeled B102_2 that includes preamble B501_2, control information symbol B502_2, and data symbol B503_2 do not temporally overlap.

Accordingly, the modulated signal transmitted by repeater #2 labeled B102_2 is not present in the $X1^{th}$ period in which preamble B501_1 is present. Similarly, the modulated signal transmitted by repeater #2 labeled B102_2 is not present in the $X2^{th}$ period in which control information symbol B502_1 is present. Similarly, the modulated signal transmitted by repeater #2 labeled B102_2 is not present in the $X3^{th}$ period in which data symbol B503_1 is present.

Moreover, the modulated signal transmitted by repeater #1 labeled B102_1 is not present in the $X4^{th}$ period in which preamble B501_2 is present. Similarly, the modulated signal transmitted by repeater #1 labeled B102_1 is not present in the $X5^{th}$ period in which control information symbol B502_2 is present. Similarly, the modulated signal transmitted by repeater #1 labeled B102_1 is not present in the X6$^{th}$ period in which data symbol B503_2 is present.

Note that FIG. 90 illustrates merely one example; the frame configurations are not limited to this example, and need only satisfy the conditions described above.

A modulated signal transmitted by repeater #1 labeled B102_1 that includes preamble B501_1, control information symbol B502_1, and data symbol B503_1 uses the second frequency band (6 GHz band). A modulated signal transmitted by repeater #2 labeled B102_2 that includes preamble B501_2, control information symbol B502_2, and data symbol B503_2 uses the first frequency band (5 GHz band).

The channel used by access point B101 for the transmission of the modulated signal destined for repeater #1 labeled B102_1 corresponds to the first channel. The channel used by access point B101 for the transmission of the modulated signal destined for repeater #2 labeled B102_2 corresponds to the second channel. The channel used by repeater #1 labeled B102_1 for the transmission of the modulated signal destined for the terminal corresponds to the third channel. The channel used by repeater #2 labeled B102_2 for the transmission of the modulated signal destined for the terminal corresponds to the fourth channel.

Next, operations performed by each device included in a system including the access point, the repeaters, and the terminal described hereinbefore will be described.

Figure 91:
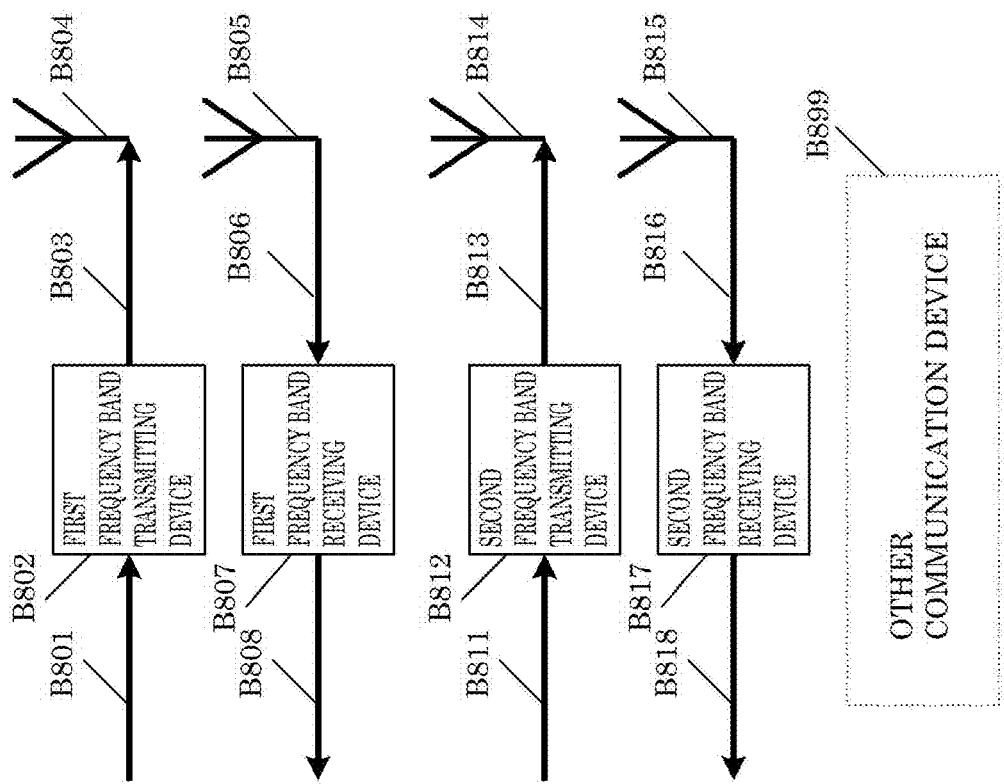
FIG. 91 illustrates one example of a configuration of an access point.

FIG. 91 illustrates one example of a configuration of access point B101 illustrated in FIG. 84.

First frequency band transmitting device B802 receives an input of data B801, and performs processing such as error correction coding, modulation (mapping), and/or frequency conversion to generate and output transmission signal B803 of the first frequency band. Transmission signal B803 of the first frequency band is transmitted as radio waves from antenna B804. Note that transmission signal B803 of the first frequency band may be a plurality of modulated signals, as described above. When the modulated signal is a plurality of modulated signals, the plurality of modulated signals are transmitted from a plurality of antennas (B804). In such cases, MIMO or multiple-input single-output (MISO) transmission may be used. Accordingly, antenna B804 is configured as one or more antennas.

First frequency band receiving device B807 receives an input of received signal B806 of the first frequency band received by antenna B805, performs processing such as demodulation, error correction decoding, etc., and outputs received data B808. Note that antenna B805 is configured as one or more antennas, as described above. Accordingly, when the configuration includes a plurality of antennas, received signal B806 of the first frequency band may be configured of a plurality of modulated signals.

Second frequency band transmitting device B812 receives an input of data B811, and performs processing such as error correction coding, modulation (mapping), and/or frequency conversion to generate and output transmission signal B813 of the second frequency band. Transmission signal B813 of the second frequency band is transmitted as radio waves from antenna B814. Note that transmission signal B813 of the second frequency band may be a plurality of modulated signals, as described above. When the modulated signal is a plurality of modulated signals, the plurality of modulated signals are transmitted from a plurality of antennas (B814), and MIMO or MISO may be used for the transmission. Accordingly, antenna B814 is configured as one or more antennas.

Second frequency band receiving device B817 receives an input of received signal B816 of the second frequency band received by antenna B815, performs processing such as demodulation, error correction decoding, etc., and outputs received data B818. Note that antenna B815 is configured as one or more antennas, as described above. Accordingly, when the configuration includes a plurality of antennas, received signal B816 of the second frequency band may be configured of a plurality of modulated signals.

Other communication device B899 is a wired and/or wireless communication device, and is thus capable of communicating. However, access point B101 need not include other communication device B899.

As illustrated in FIG. 84, communication between access point B101 and repeater #1 labeled B102_1 uses the first frequency band. Accordingly, here, transmission signal B803 of the first frequency band is a signal destined for repeater #1 labeled B102_1. Communication between access point B101 and repeater #2 labeled B102_2 uses the second frequency band. Accordingly, here, transmission signal B813 of the second frequency band is a signal destined for repeater #2 labeled B102_2. Note that the frame configuration of each transmission signal is as described above.

Figure 92:
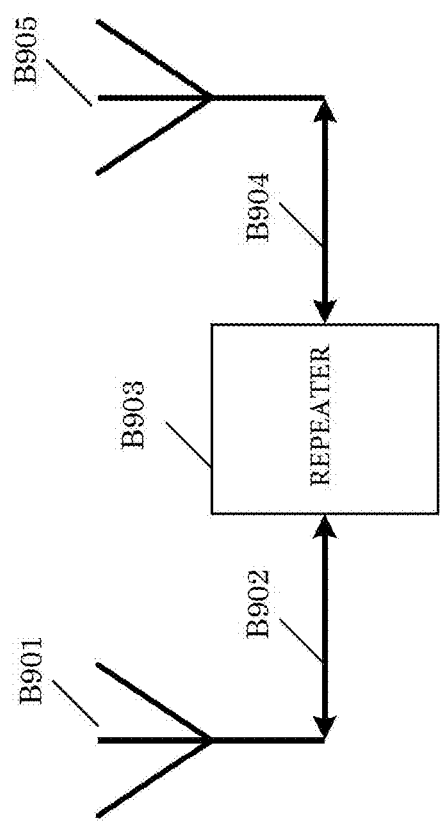
FIG. 92 illustrates one example of a configuration of a repeater.

FIG. 92 illustrates an example of a configuration of repeater #1 labeled B102_1 and repeater #2 labeled B102_2 illustrated in FIG. 84.

In FIG. 92, for example, antenna B901 is an antenna for communicating with access point B101 illustrated in FIG. 84, and antenna B905 is an antenna for communicating with terminal B103 illustrated in FIG. 84.

Accordingly, repeater B903 uses antenna B901 to communicate with access point B101 illustrated in FIG. 84 and uses antenna B905 to communicate with terminal B103 illustrated in FIG. 84.

Figure 93:
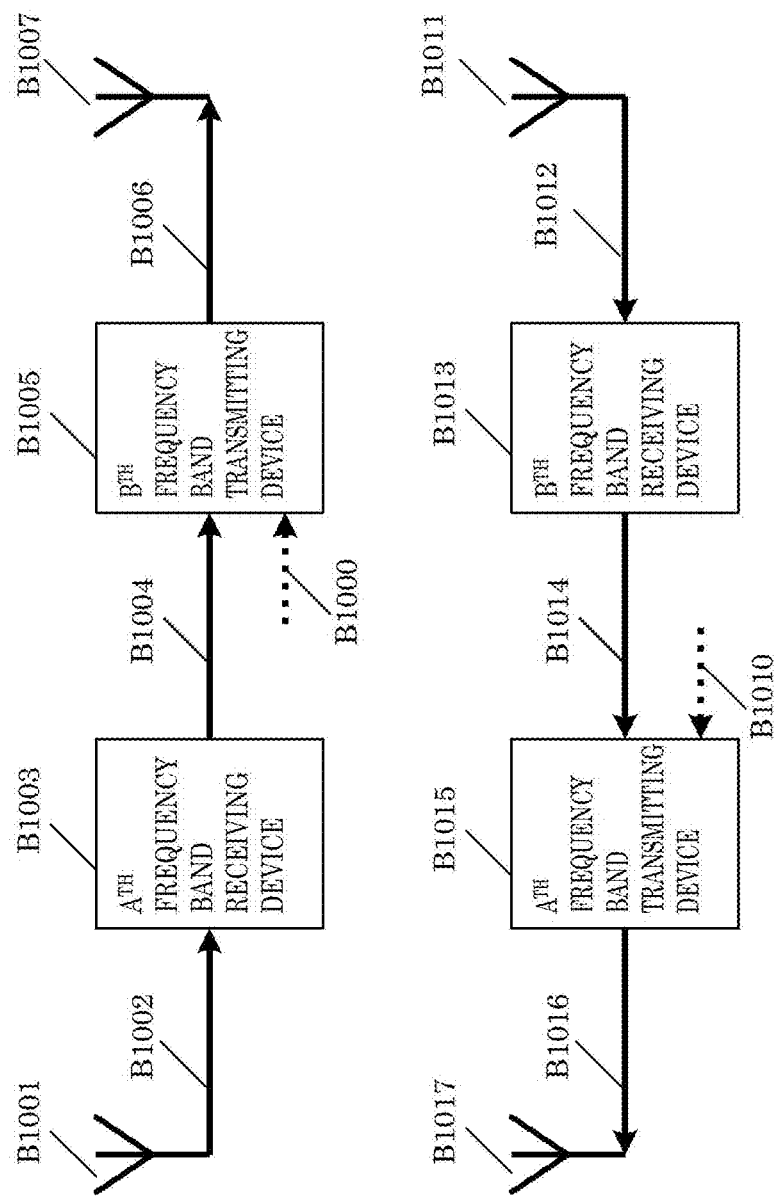
FIG. 93 illustrates one example of a configuration of a repeater.

FIG. 93 illustrates an example of a configuration of the repeater illustrated in FIG. 92. In FIG. 93, antennas B1001 and B1017 are antennas for communicating with access point B101 illustrated in FIG. 84, and antennas B1007 and B1011 are antennas for communicating with the terminal illustrated in FIG. 84.

A$^{th}$ frequency band receiving device B1003 receives an input of received signal B1002 received by antenna B1001. Note that received signal B1002 corresponds to the modulated signal transmitted by access point B101 illustrated in FIG. 84. A$^{th}$ frequency band receiving device B1003 performs signal processing and processing such as demodulation, error correction decoding, etc., on received signal B1002, and outputs data B1004.

Note that the term "A$^{th}$ frequency band" may be rewritten as "frequency band A". This also applies to similar phrases.

Note that in the present embodiment, when the repeater illustrated in FIG. 93 is repeater #1 labeled B102_1, A$^{th}$ frequency band receiving device B1003 is a receiving device for the first frequency band (for example, a 5 GHz band). Accordingly, in such cases, received signal B1002 is a received signal of the first frequency band. When the repeater illustrated in FIG. 93 is repeater #2 labeled B102_2, A$^{th}$ frequency band receiving device B1003 is a receiving device for the second frequency band (for example, a 6 GHz band). Accordingly, in such cases, received signal B1002 is a received signal of the second frequency band.

B$^{th}$ frequency band transmitting device B1005 receives an input of data B1004. However, second data B1000 may be input into B$^{th}$ frequency band transmitting device B1005. B$^{th}$ frequency band transmitting device B1005 implements processing such as error correction coding, modulation (mapping), and/or frequency conversion, etc., on all or part of data B1004 or data B1004 and second data B1000, and generates and outputs transmission signal B1006. Transmission signal B1006 is then output from antenna B1007.

Note that in the present embodiment, when the repeater illustrated in FIG. 93 is repeater #1 labeled B102_1, $B^{th}$ frequency band transmitting device B1005 is a receiving device for the second frequency band (for example, a 6 GHz band). Accordingly, in such cases, received signal B1006 is a received signal of the second frequency band. When the repeater illustrated in FIG. 93 is repeater #2 labeled B1002_2, $B^{th}$ frequency band transmitting device B1005 is a receiving device for the first frequency band (for example, a 5 GHz band). Accordingly, in such cases, received signal B1006 is a received signal of the first frequency band.

Antenna B1001 illustrated in FIG. 93 may include one or more antennas, and thus received signal B1002 may include one or more modulated signals. Accordingly, $A^{th}$ frequency band receiving device B1003 may perform signal processing for MIMO transmission on the received signal. As a matter of course, $A^{th}$ frequency band receiving device B1003 may perform signal processing for single stream transmission on the received signal.

Antenna B1007 illustrated in FIG. 93 may include one or more antennas. Accordingly, transmission signal B1006 may include one or more modulated signals. $B^{th}$ frequency band transmitting device B1005 may generate a plurality of modulated signals for MIMO transmission as transmission signal B1006. As a matter of course, $B^{th}$ frequency band transmitting device B1005 may output a single-stream modulated signal as transmission signal B1006.

Antenna B1011 is an antenna for receiving a modulated signal transmitted by terminal B103 illustrated in FIG. 84. $B^{th}$ frequency band receiving device B1013 is a device for demodulating a modulated signal transmitted by terminal B103. $A^{th}$ frequency band transmitting device B1015 is a device that generates a modulated signal to be transmitted to access point B101 illustrated in FIG. 84. Antenna B1017 is an antenna for transmitting a modulated signal to access point B101. Description of operations performed by antennas B1011 through B1017 will be omitted at this time.

Antenna B1001, which is a receive antenna, and antenna B1017, which is a transmit antenna, may be configured as a common antenna. In other words, a single physical antenna may be used to perform the functions of both antennas B1001 and B1017. Antenna B1007, which is a transmit antenna, and antenna B1011, which is a receive antenna, may be configured as a common antenna. In other words, a single physical antenna may be used to perform the functions of both antennas B1007 and B1011.

An example of a configuration of terminal B103 illustrated in FIG. 84 in this case is FIG. 91. As operations performed by the elements illustrated in FIG. 91 have already been described, repeated description will be omitted. Antenna B805 receives a modulated signal of the first frequency band (for example, a 5 GHz band) transmitted by repeater #2 labeled B102_2. First frequency band receiving device B807 receives an input of received signal B806 received by antenna B805, performs processing such as demodulation, error correction decoding, etc., and outputs received data B808.

Antenna B815 receives a modulated signal of the second frequency band (for example, a 6 GHz band) transmitted by repeater #1 labeled B102_1. Second frequency band receiving device B817 receives an input of received signal B816 received by antenna B815, performs processing such as demodulation, error correction decoding, etc., and outputs received data B818.

Antenna B805 may include one or more antennas, and thus received signal B806 may include one or more modulated signals. Accordingly, first frequency band receiving device B807 may perform signal processing for MIMO transmission on the received signal. As a matter of course, first frequency band receiving device B807 may perform signal processing for single stream transmission on the received signal.

Antenna B815 may include one or more antennas, and thus received signal B816 may include one or more modulated signals. Accordingly, second frequency band receiving device B817 may perform signal processing for MIMO transmission on the received signal. As a matter of course, second frequency band receiving device B817 may perform signal processing for single stream transmission on the received signal.

By implementing the above, terminal B103 illustrated in FIG. 84 can obtain modulated signals of a plurality of frequency bands, such as a modulated signal of the first frequency band and a modulated signal of the second frequency band, and can thus achieve the advantageous effect that the transmission amount of data obtained by terminal B103 can be increased. Moreover, by implementing a configuration in which the first repeater receives a modulated signal of the first frequency band transmitted by access point B101, generates a modulated signal of the second frequency band, and transmits the generated modulated signal to terminal B103, and the second repeater receives a modulated signal of the second frequency band transmitted by access point B101, generates a modulated signal of the first frequency band, and transmits the generated modulated signal to the terminal, the above-described advantageous effects are further amplified. Hereinafter, this point will be described.

Figure 94:
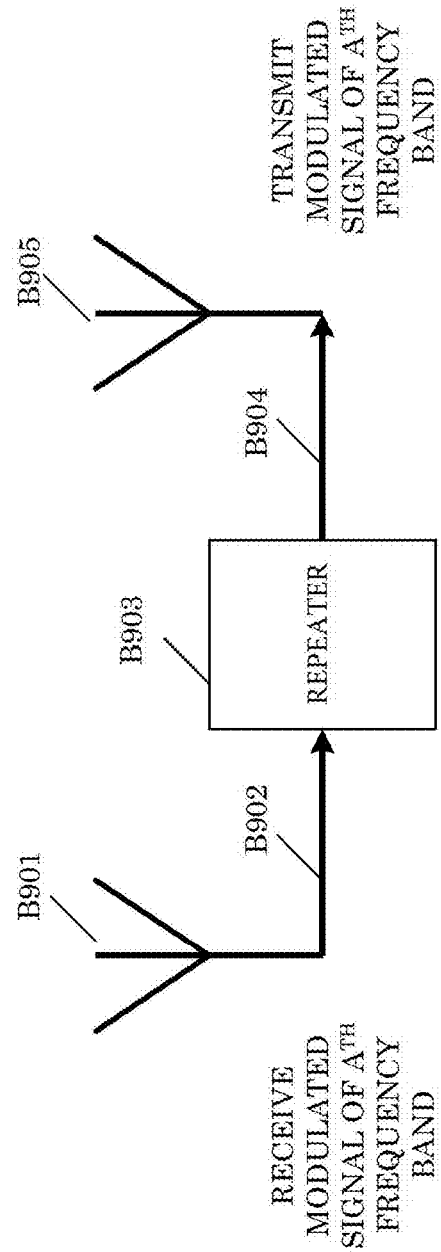
FIG. 94 illustrates one example of a configuration of a repeater.

FIG. 94 illustrates a configuration of repeaters B102_1 and B102_2 illustrated in FIG. 84 that differs from the configurations described thus far. Elements which operate in the same manner as those in FIG. 92 are assigned with the same reference signs.

Antenna B901 receives a modulated signal transmitted by access point B101 illustrated in FIG. 84. Here, the modulated signal transmitted by access point B101 illustrated in FIG. 84 is a modulated signal of the $A^{th}$ frequency band.

Repeater B903 receives an input of received signal B902 received by antenna B901. Repeater B903 performs demodulation, error correction decoding, etc., and obtains received data. Based on this received data, repeater B903 generates modulated signal B904 to be transmitted to terminal B103 illustrated in FIG. 84. Modulated signal B904 is output as radio waves from antenna B905. Here, modulated signal B904 is also an $A^{th}$ frequency band signal.

Stated differently, both the modulated signal received by repeater B903 and the modulated signal transmitted by repeater B903 are signals of the same frequency band.

Figure 95:
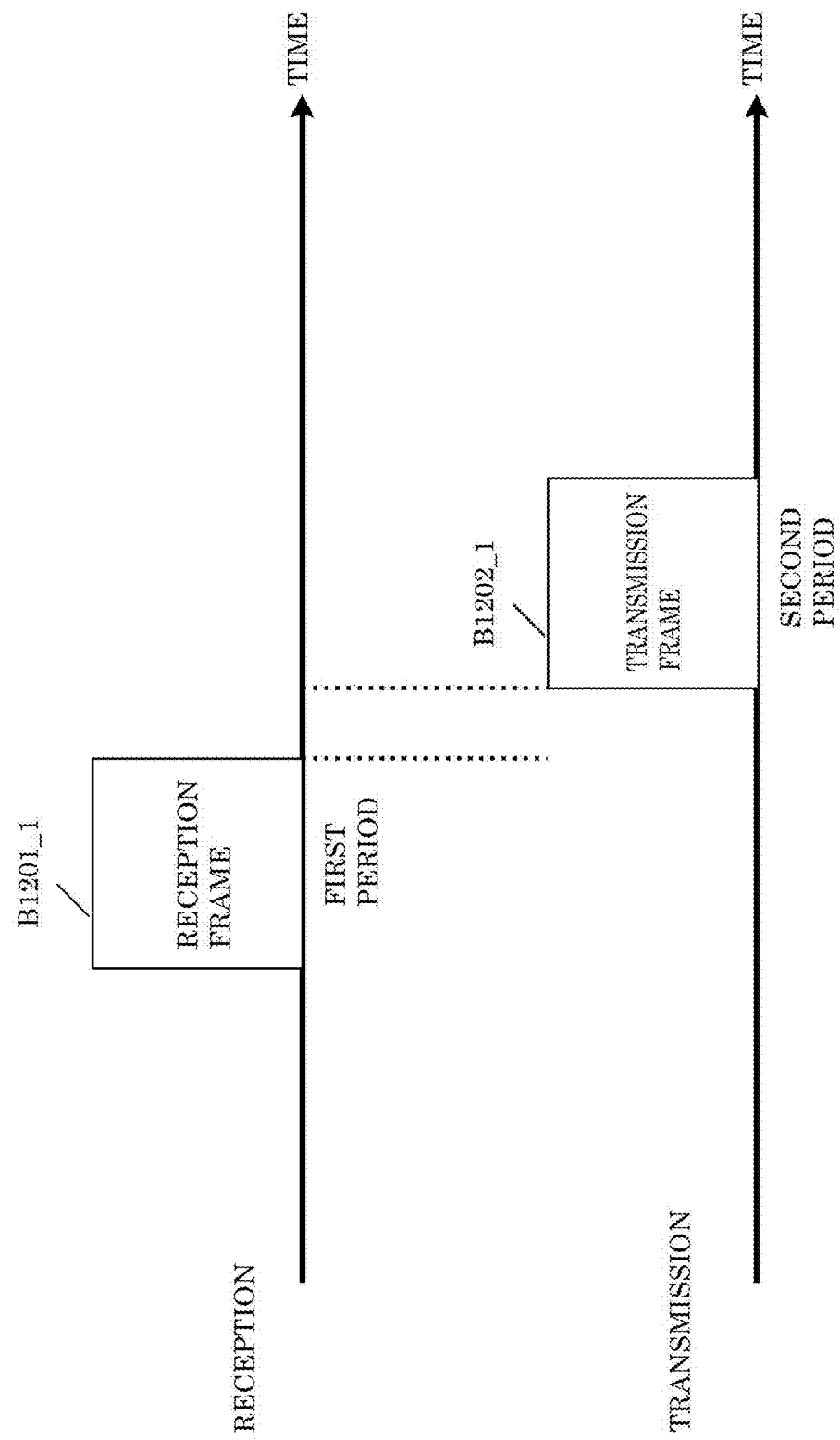
FIG. 95 illustrates one example of frame transmission time.

One example of the transmission of a frame this case will be given with reference to FIG. 95. FIG. 95 illustrates an example of a reception frame and a transmission frame of repeater B903. Time is represented on the horizontal axis in FIG. 95.

As illustrated in FIG. 95, repeater B903 receives, in the first period, a frame transmitted by access point B101, that is to say, reception frame B1201_1 is present in the first period.

Repeater B903 thus obtains reception frame B1201_1 and generates a transmission frame, but at this time, since repeater B903 uses the same frequency band for both transmission and reception, it is difficult to implement a configuration in which reception frame B1201_1 and transmission frame B1202_1 partially temporally overlap. The reason why is because when the transmission frame and the reception frame temporally overlap, repeater B903 also receives the transmission frame upon repeater B903 receiving the reception frame, that is to say, the transmission frame interferes with the reception, thereby reducing the reception quality of the reception frame. Accordingly, as illustrated in FIG. 95, transmission frame B1202_1 is disposed in the second period so as to avoid temporal overlap with reception frame B1201_1. Stated differently, time division is implemented.

Accordingly, since time division is implemented when repeaters B102_1 and B102_2 illustrated in FIG. 84 are configured as illustrated in FIG. 92, the data transmission speeds of the system decrease.

However, the configuration of the repeater according to the present embodiment is, for example, the configuration illustrated in FIG. 93. Stated differently, repeaters B102_1 and B102_2 illustrated in FIG. 84 receive modulated signals and transmit modulated signals in different frequency bands.

Figure 96:
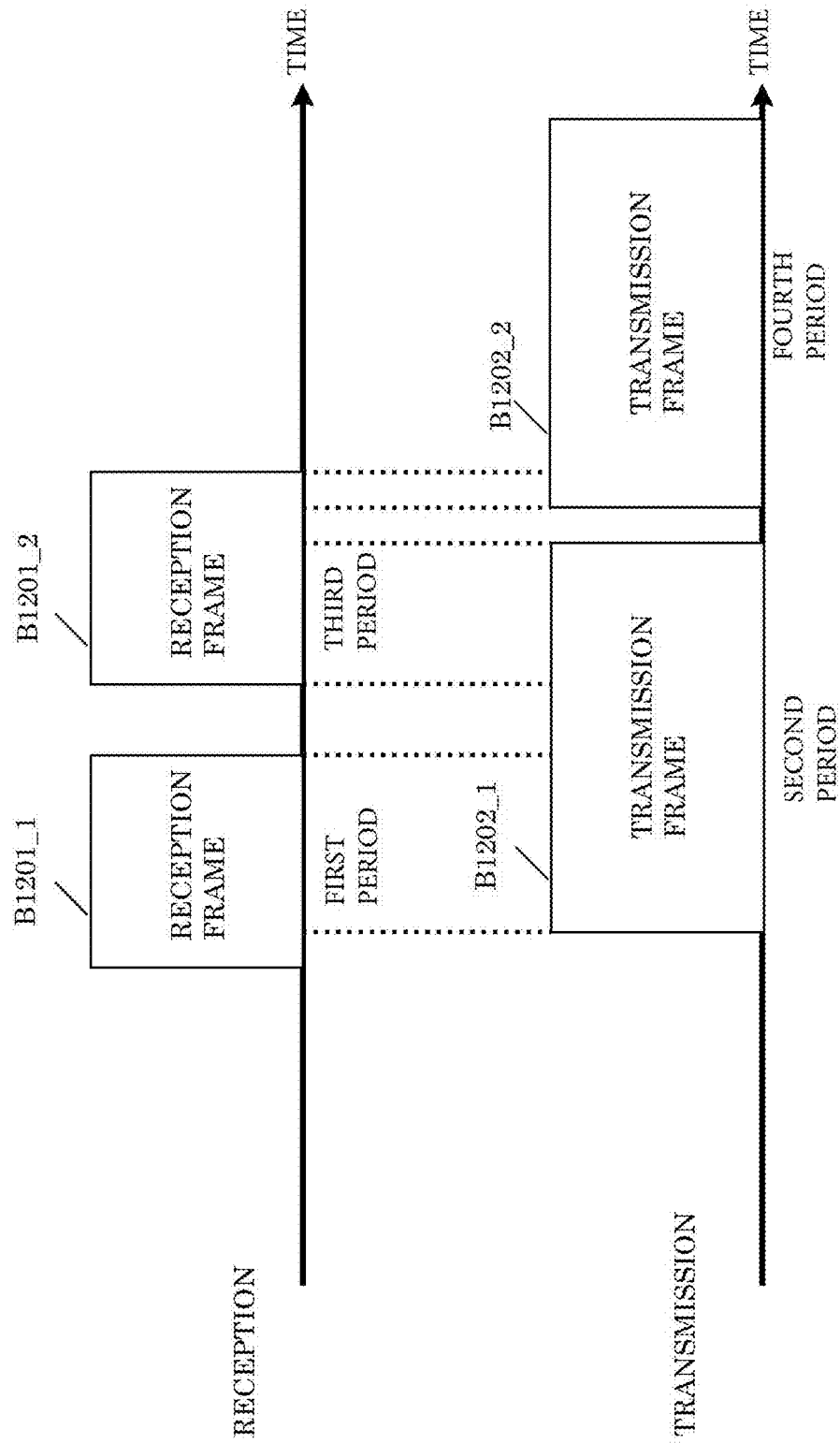
FIG. 96 illustrates one example of frame transmission time.

Accordingly, repeaters B102_1 and B102_2 illustrated in FIG. 84 are capable of transmitting frames like those illustrated in FIG. 96, for example. Note that time is represented on the horizontal axis in FIG. 96. As illustrated in FIG. 96, reception frame B1201_1 to be received by the repeater, which corresponds to a modulated signal transmitted by access point B101 illustrated in FIG. 84, is present in the first period. Reception frame B1201_2 to be received by the repeater, which corresponds to a modulated signal transmitted by access point B101 illustrated in FIG. 84, is present in the third period.

For example, transmission frame B1202_1, which corresponds to a modulated signal transmitted by the repeater, is disposed in the second period, and transmission frame B1202_2, which corresponds to a modulated signal transmitted by the repeater, is disposed in the fourth period.

A characterizing feature of this configuration is that a reception frame and a transmission frame can temporally overlap. For example, in FIG. 96, reception frame B1201_1 and transmission frame B1202_1 temporally overlap. Additionally, reception frame B1201_2 and transmission frame B1202_1 temporally overlap, and reception frame B1201_2 and transmission frame B1202_2 temporally overlap. In other words, repeaters B102_1 and B102_2 illustrated in FIG. 84 may temporally overlap a transmission frame and a reception frame. This is possible because the frequency band used by the transmission frame and the frequency band used by the reception frame are different, so when the repeater receives a reception frame, even if a transmission frame is present during that period, the transmission frame does not interfere with the reception by the repeater, and therefore a decrease in the reception quality of the reception frame is less likely. Accordingly, there is no need to implement time division for the transmission frames and the reception frames, which makes it possible to inhibit a reduction in the data transmission speed of the system.

As previously described, terminal B103 illustrated in FIG. 84 can obtain modulated signals of a plurality of frequency bands, such as a modulated signal of the first frequency band and a modulated signal of the second frequency band, and can thus achieve the advantageous effect that the transmission amount of data obtained by terminal B103 can be increased. Furthermore, by implementing the above-described configuration, it is not necessary to implement time division for the transmission frames and the reception frames, which achieves the advantageous effect that data transmission speed of the overall system can be increased.

Note that the present embodiment is merely one example. For example, even if access point B101 is a terminal and terminal B103 is an access point, the present embodiment can be implemented in the same manner. Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented. Moreover, the frame configurations illustrated in FIG. 85, FIG. 86, FIG. 87, FIG. 88, FIG. 89, and FIG. 90 are non-limiting examples; each frame configuration may include other symbols not illustrated in these figures. For example, a symbol for channel estimation, phase noise estimation, frequency/time synchronization, frequency offset estimation, etc., such as a reference symbol, pilot symbol, or mid-amble or the like, may be included in the frame.

Supplemental Information B1

As a matter of course, the embodiments described in the present specification may be combined and carried out with other content such as supplemental information.

So long as the access point, repeater, and terminal are configured to include one or a plurality of transmit antennas for each frequency band, and generate and transmit one or a plurality of modulated signals in each frequency band, the present disclosure can be carried out. Moreover, so long as the access point, repeater, and terminal are configured to include one or a plurality of receive antennas for each frequency band and receive a modulated signal, the present disclosure can be carried out.

The embodiments are merely examples. For example, while a "modulation method, an error correction coding method (error correction code, code length, coding rate, etc., to be used), control information, etc." are exemplified, it is possible to carry out the present disclosure with the same configuration even when other types of a "modulation method, an error correction coding method (error correction code, code length, coding rate, etc., to be used), control information, etc." are applied.

Regarding the modulation method, even when a modulation method other than the modulation methods described in the present specification is used, it is possible to carry out the exemplary embodiments and the other contents described herein. For example, amplitude phase shift keying (APSK) (for example, 16APSK, 64APSK, 128APSK, 256APSK, 1024APSK, and 4096APSK), pulse amplitude modulation (PAM) (for example, 4PAM, 8PAM, 16PAM, 64PAM, 128PAM, 256PAM, 1024PAM, and 4096PAM), phase shift keying (PSK) (for example, BPSK, QPSK, 8PSK, 16PSK, 64PSK, 128PSK, 256PSK, 1024PSK, and 4096PSK), and quadrature amplitude modulation (QAM) (for example, 4QAM, 8QAM, 16QAM, 64QAM, 128QAM, 256QAM, 1024QAM, and 4096QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

Conceivable devices that include the transmitting device, receiving device, and communication device according to the present specification include, for example, a communication/broadcast device such as a broadcast station, base station, access point, terminal, or mobile phone, a television, a radio, a personal computer etc., a repeater, a repeater station, a communication device of a node, a satellite, a repeater of a satellite, and an earth station. The transmitting device and receiving device according to the present disclosure are devices having a communication function, and such devices may be configured to be connectable with a device for running an application in a television, a radio, a personal computer, or a mobile phone, via a certain interface. Moreover, in the present embodiment, symbols other than data symbols, such as a pilot symbol (preamble, unique word, post-amble, reference symbol, mid-amble, etc.), a control information symbol, a null symbol, may be arranged in any order in the frame. Here, the terms "pilot symbol" and "control information symbol" are used, but the naming of such symbols is not important; the functions that they perform are.

A pilot symbol may be a known symbol that is modulated using PSK modulation in a transceiver, and the receiver may use this symbol to perform, for example, frequency synchronization, time synchronization, channel estimation (channel state information (CSI) estimation) for each modulated signal, and signal detection. Alternatively, the pilot symbol may enable a symbol transmitted by a transmitter to be known by a receiver by the receiver being synchronized.

Moreover, the control information symbol may be a symbol for transmitting information that is used for realizing communication other than communication for data (data of an application, for instance) and that is to be transmitted to a communication partner (for example, a modulation method used for communication, an error correction coding method, a coding rate of the error correction coding method, setting information in an upper layer, and the like).

Note that the present disclosure is not limited to the embodiments;

various modifications may be made to the embodiments. For example, each embodiment is described as being implemented as a communication device, but this example is not limiting, each embodiment may implement a corresponding communication method as software.

Note that a program for executing the above-described communication method may be stored in read only memory (ROM) in advance to cause a central processing unit (CPU) to operate this program.

Moreover, the program for executing the above-described communication method may be stored in a computer-readable storage medium, the program stored in the recording medium may be recorded in random access memory (RAM) in a computer, and the computer may be caused to operate according to this program.

The configurations of the above-described exemplary embodiments, for instance, may be each realized as a large-scale integrated (LSI) circuit, which is typically an integrated circuit having an input terminal and an output terminal. The configurations may be formed as separate chips, or all or some of the configurations of the exemplary embodiments may be formed together as one chip. Although the terminology "LSI" is used here, the integrated circuit may also be referred to as an integrated circuit (IC), a system LSI, a super LSI, or an ultra LSI, depending on a degree of integration. Moreover, the circuit integration technique is not limited to LSI; the circuit may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. Further, when development of a semiconductor technology or another derived technology provides a circuit integration technology which replaces the LSI, as a matter of course, functional blocks may be integrated by using such a technology. Application of biotechnology, for instance, is one such possibility.

The transmission method supported by the access point, terminal, and repeater may be a multi-carrier method such as orthogonal frequency division multiplexing (OFDM), and, alternatively, may be a single carrier method. Moreover, the access point, terminal, and repeater may support both a multi-carrier method and a single carrier method. There are a number of methods for generating modulated signals to be transmitted according to the single carrier method, any of which may be implemented. Examples of single carrier methods include discrete Fourier transform (DFT)-spread orthogonal frequency division multiplexing (OFDM), trajectory constrained DFT-spread OFDM, OFDM based single carrier (SC), single carrier (SC)-frequency division multiple access (FDMA), and guard interval DFT-spread OFDM.

At least one of the FPGA or the CPU may be configured to download, via wireless or wired communication, all or part of software required to implement the communication method described in the present disclosure. At least one of the FPGA or the CPU may be further configured to download, via wireless or wired communication, all or part of software for updates. The downloaded software may be stored in storage, and at least one of the FPGA or the CPU may be operated based on the stored software to implement the digital signal processing described in the present disclosure.

Here, a device that includes at least one of the FPGA or the CPU may be connected to a communication modem wirelessly or over wire, and the communication method described in the present disclosure may be implemented via this device and the communication modem.

For example, a transmitting device, receiving device, or communication device such as the access point, repeater, or terminal described in the present specification may include at least one of the FPGA or the CPU, and include an interface for obtaining, from an external source, software for operating the at least one of the FPGA or the CPU. The communication device may further include a storage for storing the software obtained from the external source, and implement the signal processing described in the present disclosure by operating the FPGA and/or CPU based on the stored software.

In the present specification, sections and operations related to the description of the access point may be sections and operations of, for example, a base station, a repeater, a terminal, a communication device, a personal computer, or a mobile phone or the like. In the present specification, sections and operations related to the description of the terminal may be sections and operations of, for example, an access point, a base station, a repeater, a communication device, a personal computer, or a mobile phone or the like.

Embodiment B2

In the present embodiment, a variation of Embodiment B1 will be described.

Figure 97:
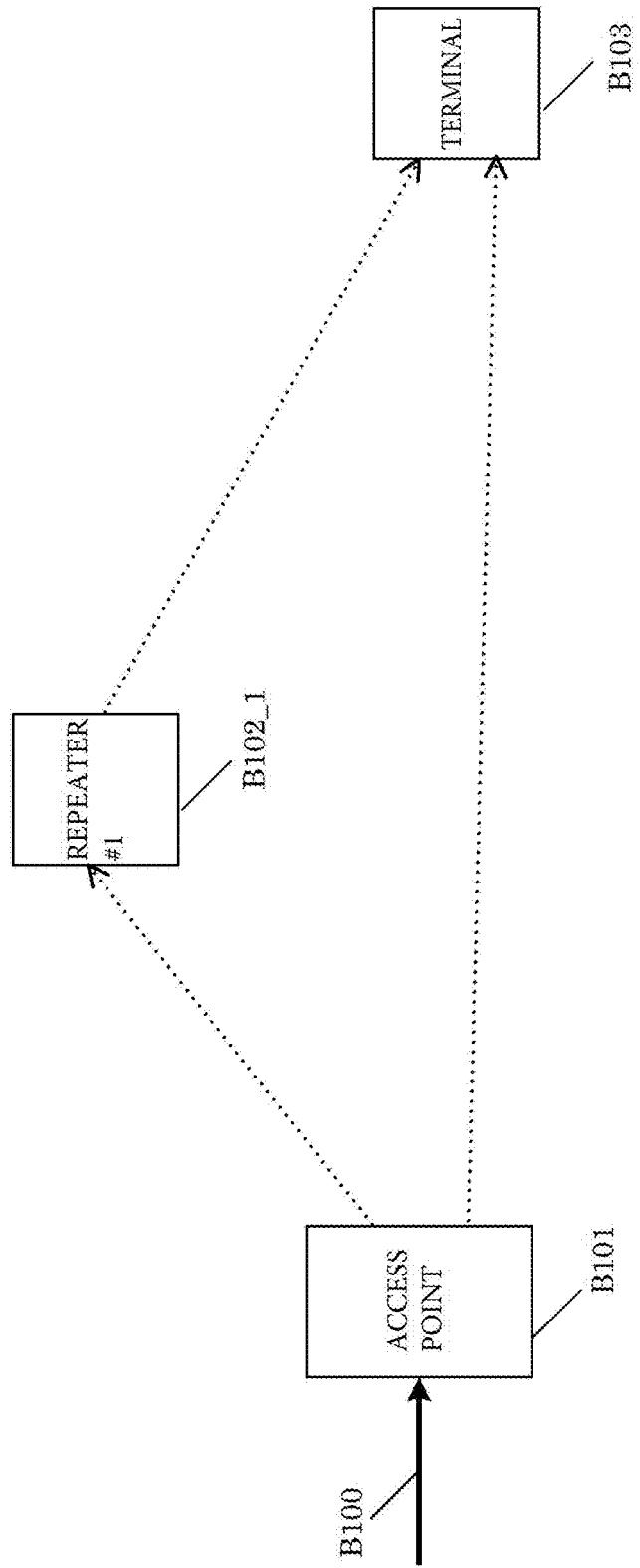
FIG. 97 illustrates one example of a system configuration.

As illustrated in FIG. 97, access point B101 receives an input of data B100, generates a modulated signal from data B100, and transmits the generated modulated signal to repeater #1 labeled B102_1 and/or terminal B103.

Repeater #1 labeled B102_1 receives the modulated signal transmitted by access point B101, generates a modulated signal destined for terminal B103 based on the received modulated signal, and transmits the generated modulated signal to terminal B103.

Although the data that is input into access point B101 is exemplified as a single series of data (B100), the data is not limited to this example. Access point B101 may be configured to receive an input of a plurality of series of data.

Access point B101 transmits one or more modulated signals to repeater #1 labeled B102_1. If transmitting a plurality of modulated signals, multiple-input multiple-output (MIMO) transmission may be used.

Repeater #1 labeled B102_1 generates and transmits one or more modulated signals destined for terminal B103 based on the received modulated signal(s). If transmitting a plurality of modulated signals, MIMO transmission may be used.

Figure 98:
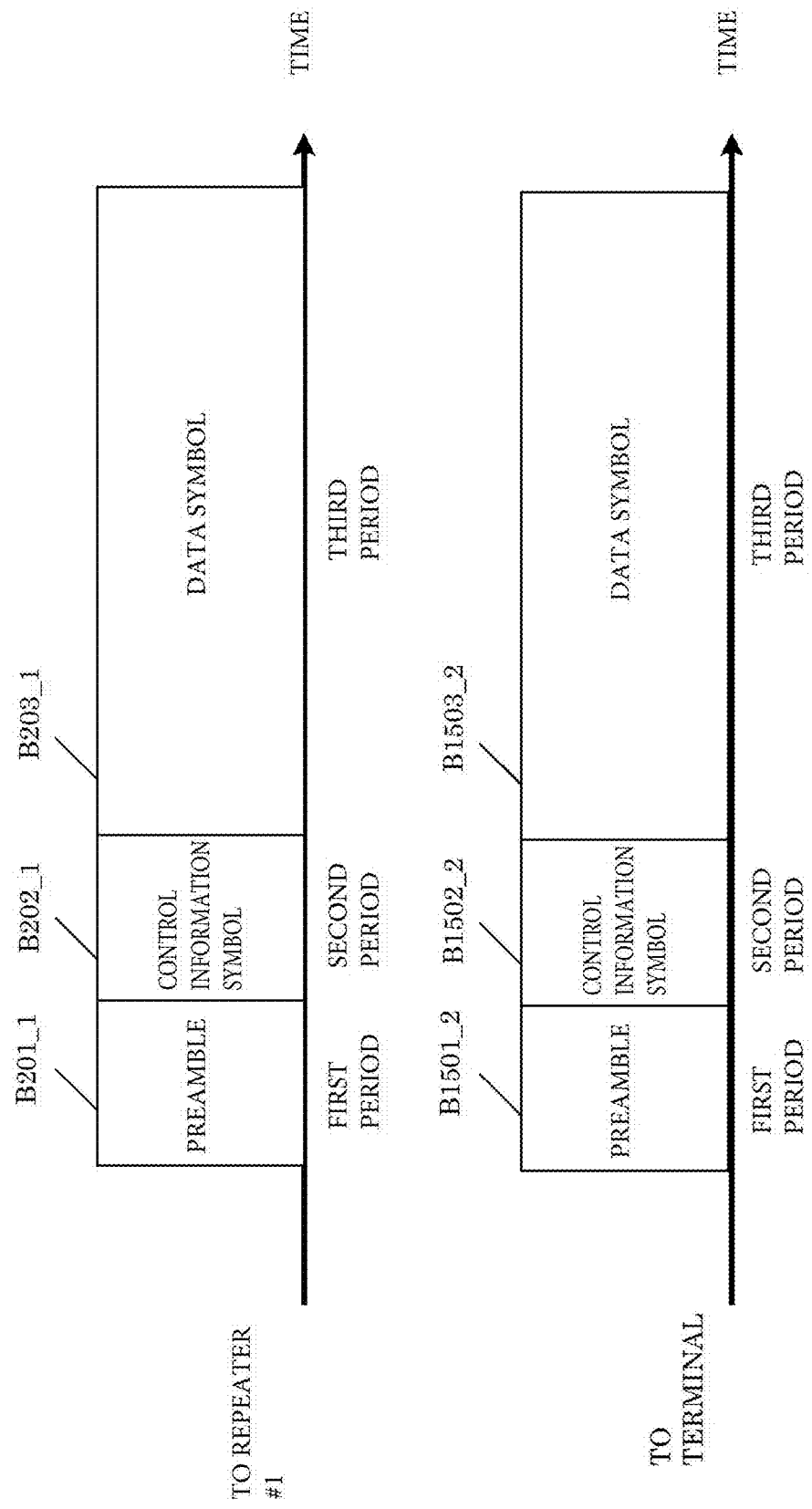
FIG. 98 illustrates one example of frame transmission time.
Figure 99:
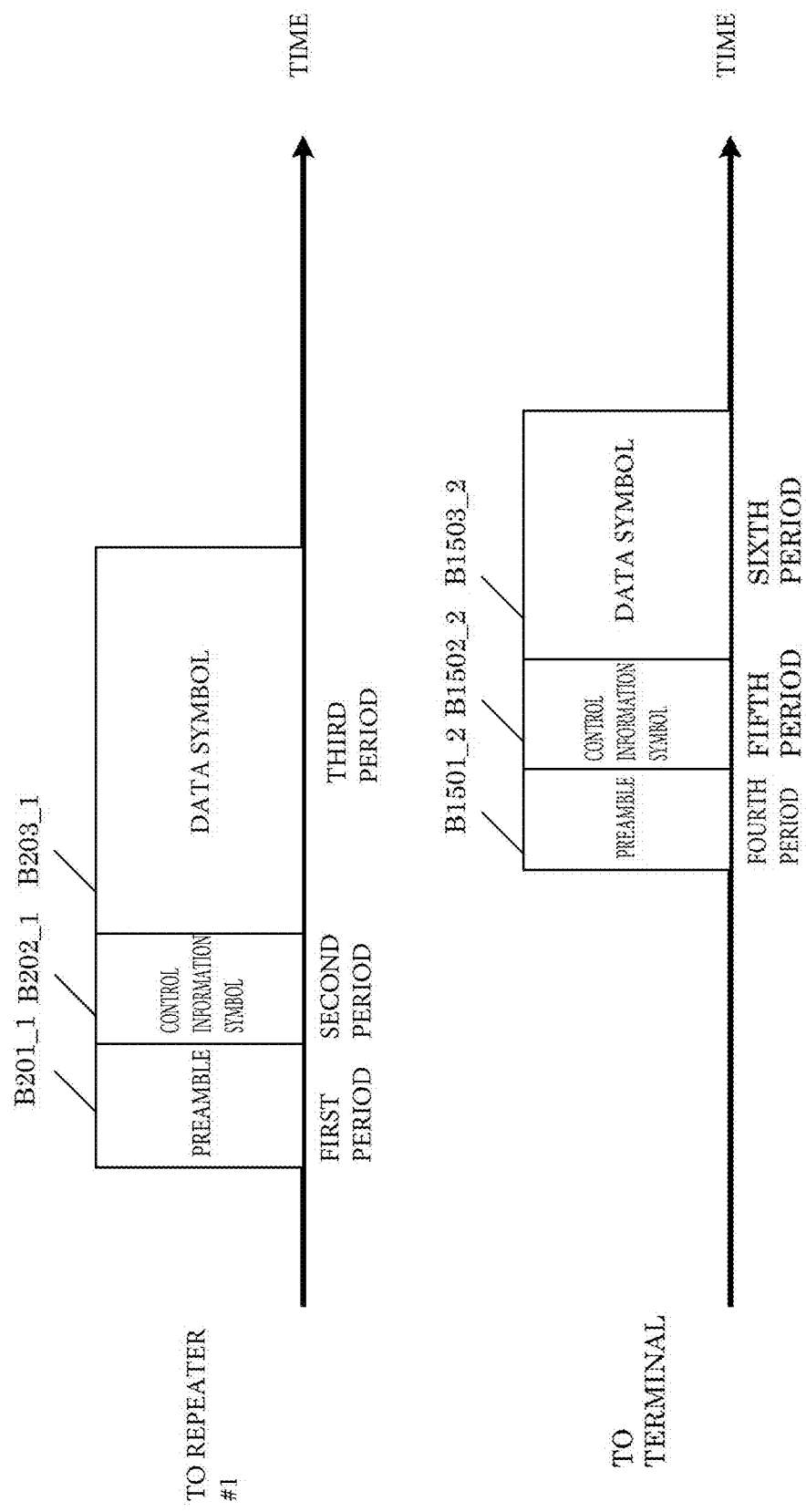
FIG. 99 illustrates one example of frame transmission time.
Figure 100:
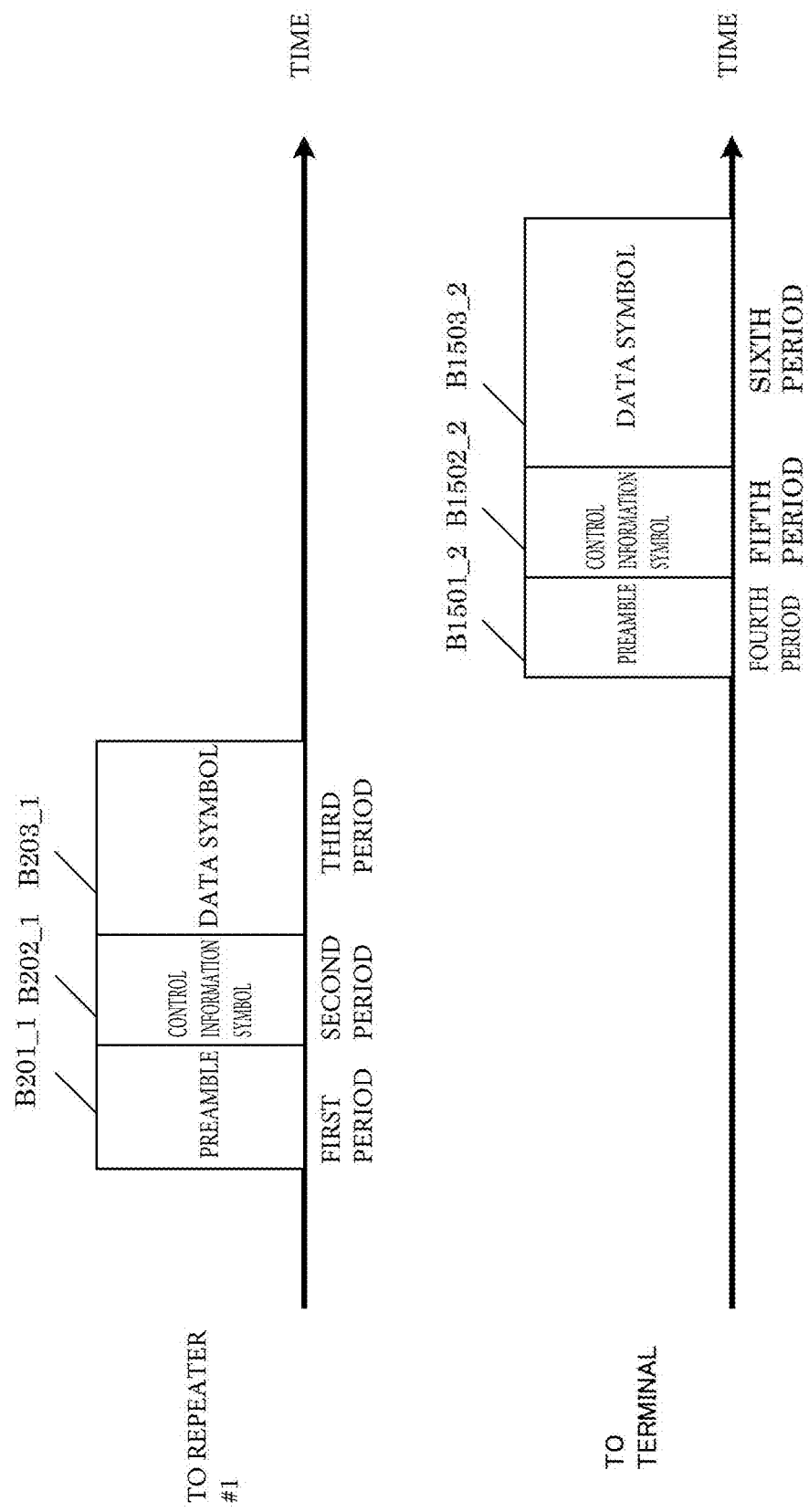
FIG. 100 illustrates one example of frame transmission time.

Each of FIG. 98, FIG. 99, and FIG. 100 illustrates an example of frame configurations of a modulated signal transmitted by access point B101 and destined for repeater #1 labeled B102_1 and a modulated signal transmitted by access point B101 and destined for terminal B103. Time is represented on the horizontal axis in FIG. 98, FIG. 99, and FIG. 100. Elements in FIG. 98, FIG. 99, and FIG. 100 that operate the same as those in FIG. 85 share like reference signs.

As illustrated in FIG. 98, FIG. 99, and FIG. 100, a modulated signal destined for repeater #1 labeled B102_1 includes preamble B201_1, control information symbol B202_1, and data symbol B203_1. The modulated signal destined for terminal B103 includes preamble B1501_2, control information symbol B1502_2, and data symbol B1503_2.

Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 98, preamble B201_1 is present in the first period, and preamble B1501_2 is also present in the first period. Control information symbol B202_1 is present in the second period, and control information symbol B1502_2 is also present in the second period. Data symbol B203_1 is present in the third period, and data symbol B1503_2 is also present in the third period.

Here, the modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for terminal B103 that includes preamble B1501_2, control information symbol B1502_2, and data symbol B1503_2 is transmitted from access point B101 using, for example, the third frequency band (for example, a 2.4 GHz band). Note that the first frequency band and the third frequency band are different frequency bands.

FIG. 99 illustrates frame configurations of a modulated signal destined for repeater #1 labeled B102_1 and a modulated signal destined for terminal B103 which differ from those in FIG. 98. Elements which operate in the same manner as those in FIG. 85 and FIG. 98 are assigned with the same reference signs, and repeated detailed description thereof is omitted. Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

As illustrated in FIG. 99, preamble B201_1 is present in the first period, control information symbol B202_1 is present in the second period, and data symbol B203_1 is present in the third period. Preamble B1501_2 is present in the fourth period, control information symbol B1502_2 is present in the fifth period, and data symbol B1503_2 is present in the sixth period.

The example illustrated in FIG. 99 differs from the example illustrated in FIG. 98 in that the time interval in which the modulated signal destined for repeater #1 labeled B102_1 that includes preamble B201_1, control information symbol B202_1, and data symbol B203_1 and the time interval in which the modulated signal destined for terminal B103 2 that includes preamble B1501_2, control information symbol B1502_2, and data symbol B1503_2 partially temporally overlap.

For example, in FIG. 99, part of data symbol B203_1 is present in the fourth period in which preamble B1501_2 is present. Additionally, part of data symbol B203_1 is present in the fifth period in which control information symbol B1502_2 is present. Additionally, part of the sixth period in which data symbol B1503_2 is present and part of the third period in which data symbol B203_1 is present temporally overlap.

Note that FIG. 99 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for terminal B103 that includes preamble B1501_2, control information symbol B1502_2, and data symbol B1503_2 is transmitted from access point B101 using, for example, the third frequency band (for example, a 2.4 GHz band). Note that the first frequency band and the third frequency band are different frequency bands.

FIG. 100 illustrates frame configurations of a modulated signal destined for repeater #1 labeled B102_1 and a modulated signal destined for terminal B103 which differ from those in FIG. 98 and FIG. 99. Elements which operate in the same manner as those in FIG. 85 and FIG. 98 are assigned with the same reference signs, and repeated detailed description thereof is omitted. Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

As illustrated in FIG. 100, preamble B201_1 is present in the first period, control information symbol B202_1 is present in the second period, and data symbol B203_1 is present in the third period. I Preamble B1501_2 is present in the fourth period, control information symbol B1502_2 is present in the fifth period, and data symbol B1503_2 is present in the sixth period.

The example illustrated in FIG. 100 differs from the examples illustrated in FIG. 98 and FIG. 99 in that the time interval in which the modulated signal destined for repeater #1 labeled B102_1 that includes preamble B201_1, control information symbol B202_1, and data symbol B203_1 and the time interval in which the modulated signal destined for terminal B103 that includes preamble B1501_2, control information symbol B1502_2, and data symbol B1503_2 do not temporally overlap.

Accordingly, the modulated signal destined for terminal B103 is not present in the first period in which preamble B201_1 is present. Similarly, the modulated signal destined for terminal B103 is not present in the second period in which control information symbol B202_1 is present. Similarly, the modulated signal destined for terminal B103 is not present in the third period in which data symbol B203_1 is present.

Additionally, the modulated signal destined for repeater #1 labeled B102_1 is not present in the fourth period in which preamble B1501_2 is present. Similarly, the modulated signal destined for repeater #1 labeled B102_1 is not present in the fifth period in which control information symbol B1502_2 is present. Similarly, the modulated signal destined for repeater #1 labeled B102_1 is not present in the sixth period in which data symbol B1503_2 is present.

Note that FIG. 100 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band (for example, a 5 GHz band). The modulated signal destined for terminal B103 that includes preamble B1501_2, control information symbol B1502_2, and data symbol B1503_2 is transmitted from access point B101 using, for example, the third frequency band (for example, a 2.4 GHz band). Note that the first frequency band and the third frequency band are different frequency bands.

Figure 101:
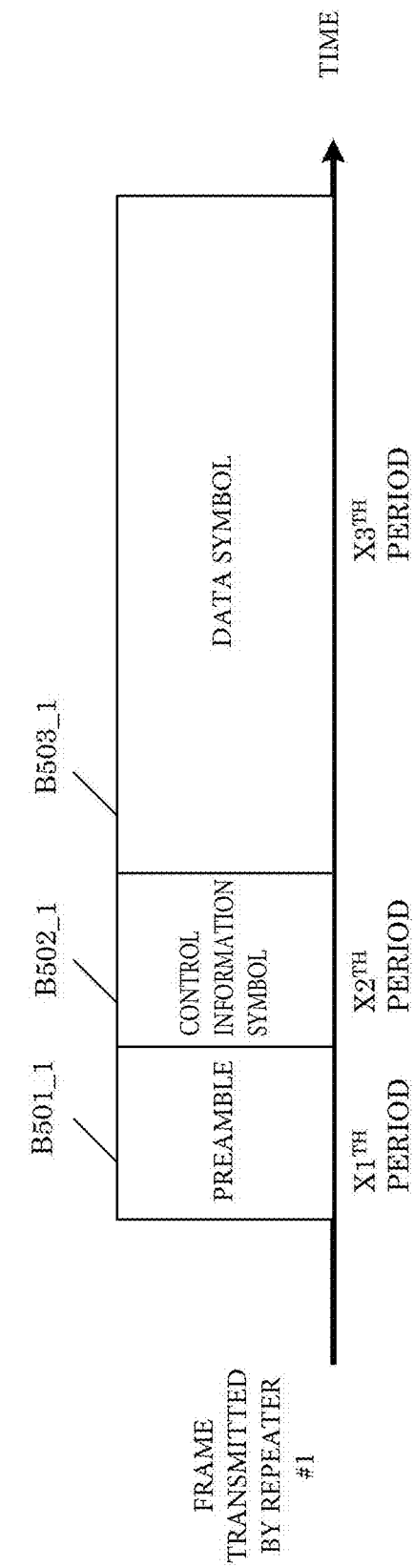
FIG. 101 illustrates one example of frame transmission time.

FIG. 101 illustrates an example of a frame configuration of a modulated signal transmitted by repeater #1 labeled B102_1 and repeater #2 labeled B102_2. Time is represented on the horizontal axis in FIG. 101.

As illustrated in FIG. 101, a modulated signal transmitted by repeater #1 labeled B102_1 includes preamble B501_1, control information symbol B502_1, and data symbol B503_1. Note that the modulated signal transmitted by repeater #1 labeled B102_1 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 101, preamble B501_1 is present in the $X1^{th}$ period, control information symbol B502_1 is present in the $X2^{th}$ period, and data symbol B503_1 is present in the $X3^{th}$ period.

A modulated signal transmitted by repeater #1 labeled B102_1 that includes preamble B501_1, control information symbol B502_1, and data symbol B503_1 uses the second frequency band (6 GHz band).

Next, operations performed by each device included in a system including the access point, the repeater(s), and the terminal described hereinbefore will be described.

FIG. 91 illustrates one example of a configuration of access point B101 illustrated in FIG. 97. As FIG. 91 has already been described, repeated description will be partially omitted.

Other communication device B899 is a wired and/or wireless communication device, and is thus capable of communicating. Here, other communication device B899 includes at least a communication device for transmitting a modulated signal of the third frequency band and receiving a modulated signal.

Note that the transmission signal of the third frequency band may be a plurality of modulated signals. When the modulated signal is a plurality of modulated signals, the plurality of modulated signals are transmitted from a plurality of antennas. Here, MIMO or MISO transmission may be used. Accordingly, the antenna is configured as one or more antennas.

As described with reference to FIG. 97, communication between access point B101 and repeater #1 labeled B102_1 uses the first frequency band. Accordingly, here, transmission signal B803 of the first frequency band is a signal destined for repeater #1 labeled B102_1. Communication between access point B101 and terminal B103 uses the third frequency band. Accordingly, here, other communication device B899 illustrated in FIG. 91 generates and transmits a modulated signal destined for terminal B103. Note that the frame configuration of each transmission signal is as described above.

Figure 102:
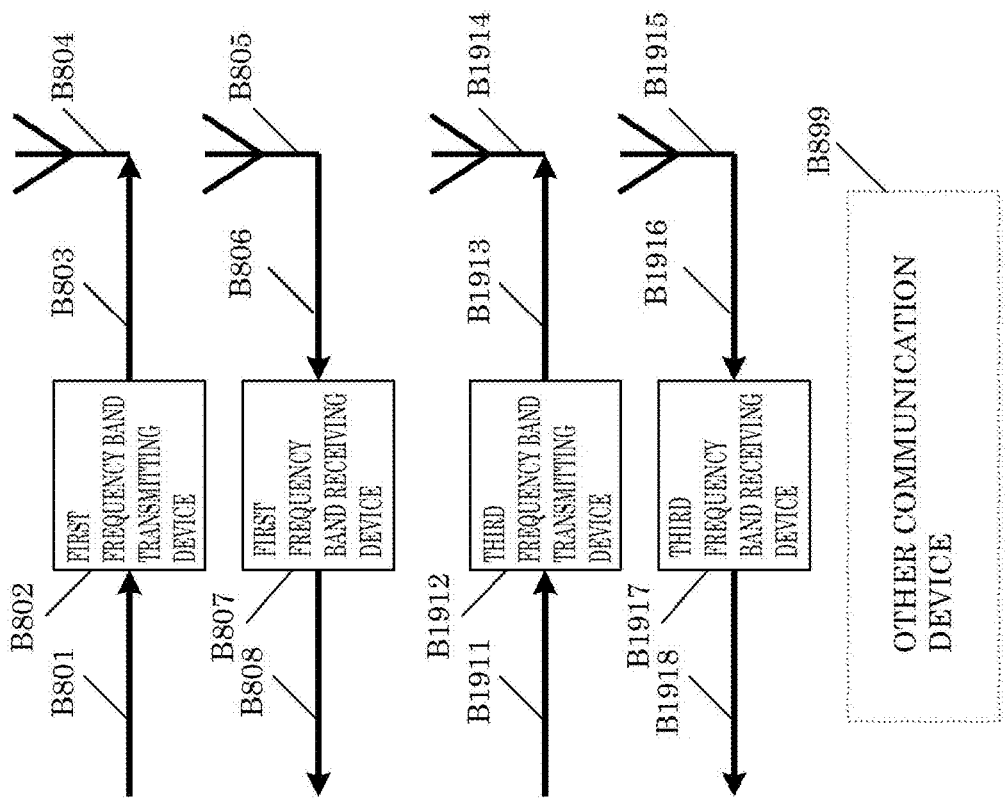
FIG. 102 illustrates one example of a configuration of an access point.

FIG. 102 illustrates one example of a configuration of access point B101 illustrated in FIG. 97, which differs from the example illustrated in FIG. 91. Note that in FIG. 102, elements which operate in the same manner as those in FIG. 91 are assigned the same reference numerals, and repeated description of elements that have already been described is omitted.

Third frequency band transmitting device B1912 receives an input of data B1911, performs processing such as error correction encoding and mapping based on the modulation method, and generates and outputs modulated signal B1913 that uses the third frequency band. Antenna B1914 then outputs modulated signal B1913 that uses the third frequency band as radio waves. Note that modulated signal B1913 that uses the third frequency band is the modulated signal destined for terminal B103 that is illustrated in FIG. 97.

Third frequency band receiving device B1917 receives an input of received signal B1916 received by antenna B1915, performs processing such as demodulation and error correction decoding and the like on the modulated signal of the third frequency band, and outputs data B1918.

Note that modulated signal B1913 of the third frequency band may be a plurality of modulated signals. When the modulated signal is a plurality of modulated signals, the plurality of modulated signals are transmitted from a plurality of antennas. Here, MIMO or MISO transmission may be used. Accordingly, the antenna is configured as one or more antennas. Moreover, antenna B1915 may include a plurality of antennas, and in such cases, a plurality of modulated signals are obtained via antennas B1915.

Other communication device B899 is a wired and/or wireless communication device, and is thus capable of communicating. However, other communication device B899 need not include access point B101.

As described with reference to FIG. 97, communication between access point B101 and repeater #1 labeled B102_1 uses the first frequency band. Accordingly, here, transmission signal B803 of the first frequency band is a signal destined for repeater #1 labeled B102_1. Communication between access point B101 and terminal B103 uses the third frequency band. Accordingly, here, third frequency band transmitting device B1912 illustrated in FIG. 102 generates and transmits a modulated signal destined for terminal B103. Note that the frame configuration of each transmission signal is as described above.

FIG. 92 illustrates an example of a configuration of repeater #1 labeled B102_1 illustrated in FIG. 97.

In FIG. 92, for example, antenna B901 is an antenna for communicating with access point B101 illustrated in FIG. 97, and antenna B905 is an antenna for communicating with terminal B103 illustrated in FIG. 97.

Accordingly, repeater B903 uses antenna B901 to communicate with access point B101 illustrated in FIG. 97 and uses antenna B905 to communicate with terminal B103 illustrated in FIG. 97.

FIG. 93 illustrates an example of a configuration of the repeater illustrated in FIG. 92. In FIG. 93, antennas B1001 and B1017 are antennas for communicating with access point B101 illustrated in FIG. 97, and antennas B1007 and B1011 are antennas for communicating with the terminal illustrated in FIG. 97.

$A^{th}$ frequency band receiving device B1003 receives an input of received signal B1002 received by antenna B1001. Note that received signal B1002 corresponds to the modulated signal transmitted by access point B101 illustrated in FIG. 97. $A^{th}$ frequency band receiving device B1003 performs signal processing and processing such as demodulation, error correction decoding, etc., on received signal B1002, and outputs data B1004.

Note that in the present embodiment, when the repeater illustrated in FIG. 93 is repeater #1 labeled B102_1, $A^{th}$ frequency band receiving device B1003 is a receiving device for the first frequency band (for example, a 5 GHz band). Accordingly, in such cases, received signal B1002 is a received signal of the first frequency band.

$B^{th}$ frequency band transmitting device B1005 receives an input of data B1004. However, second data B1000 may be input into $B^{th}$ frequency band transmitting device B1005. $B^{th}$ frequency band transmitting device B1005 implements processing such as error correction coding, modulation (mapping), and/or frequency conversion, etc., on all or part of data B1004 or data B1004 and second data B1000, and generates and outputs transmission signal B1006. Transmission signal B1006 is then output from antenna B1007.

Note that in the present embodiment, when the repeater illustrated in FIG. 93 is repeater #1 labeled B102_1, $B^{th}$ frequency band transmitting device B1005 is a receiving device for the second frequency band (for example, a 6 GHz band). Accordingly, in such cases, received signal B1006 is a received signal of the second frequency band.

Antenna B1001 illustrated in FIG. 93 may include one or more antennas, and thus received signal B1002 may include one or more modulated signals. Accordingly, $A^{th}$ frequency band receiving device B1003 may perform signal processing for MIMO transmission on the received signal. As a matter of course, $A^{th}$ frequency band receiving device B1003 may perform signal processing for single stream transmission on the received signal.

Antenna B1007 illustrated in FIG. 93 may include one or more antennas. Accordingly, transmission signal B1006 may include one or more modulated signals. $B^{th}$ frequency band transmitting device B1005 may generate a plurality of modulated signals for MIMO transmission as transmission signal B1006. As a matter of course, $B^{th}$ frequency band transmitting device B1005 may output a single-stream modulated signal as transmission signal B1006.

Antenna B1011 is an antenna for receiving a modulated signal transmitted by terminal B103 illustrated in FIG. 97. $B^{th}$ frequency band receiving device B1013 is a device for demodulating a modulated signal transmitted by terminal B103. $A^{th}$ frequency band transmitting device B1015 is a device that generates a modulated signal to be transmitted to access point B101 illustrated in FIG. 97. Antenna B1017 is an antenna for transmitting a modulated signal to access point B101. Description of operations performed by antennas B1011 through B1017 will be omitted at this time.

An example of a configuration of terminal B103 illustrated in FIG. 97 in this case is FIG. 91. As operations performed by the elements illustrated in FIG. 91 have already been described, repeated description will be omitted.

Antenna B815 receives a modulated signal of the second frequency band (for example, a 6 GHz band) transmitted by repeater #1 labeled B102_1. Second frequency band receiving device B817 receives an input of received signal B816 received by antenna B815, performs processing such as demodulation, error correction decoding, etc., and outputs received data B818.

Antenna B815 may include one or more antennas, and thus received signal B816 may include one or more modulated signals. Accordingly, second frequency band receiving device B817 may perform signal processing for MIMO transmission on the received signal. As a matter of course, second frequency band receiving device B817 may perform signal processing for single stream transmission on the received signal.

Other communication device B899 receives a modulated signal of the third frequency band that is transmitted by access point B101 illustrated in FIG. 97, performs processing such as demodulation, error correction decoding, etc., and obtains data.

Other communication device B899 may include one or more antennas, and thus the received signal may include one or more modulated signals. Accordingly, the third frequency band receiving device that is included in other communication device B899 may perform signal processing for MIMO transmission on the received signal. As a matter of course, the third frequency band receiving device may perform signal processing for single stream transmission on the received signal.

Figure 103:
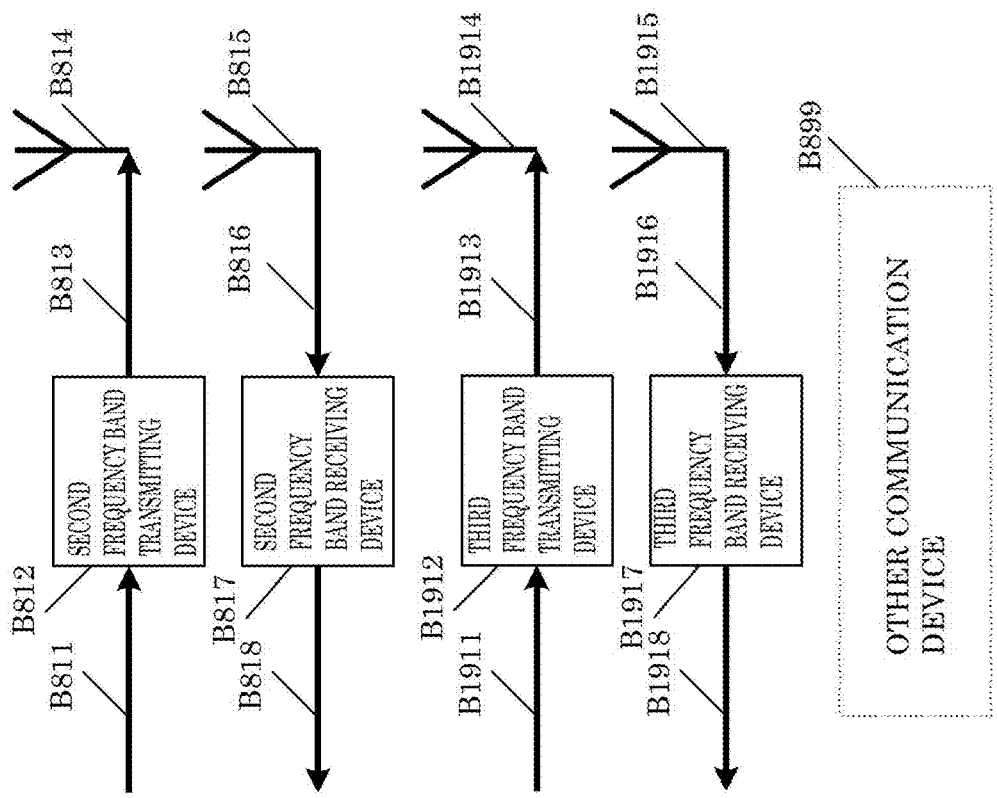
FIG. 103 illustrates one example of a configuration of an access point.

An example of a configuration of terminal B103 illustrated in FIG. 97 is FIG. 103, which differs from the example illustrated in FIG. 91. Note that in FIG. 103, elements which operate in the same manner as those in FIG. 91 and FIG. 102 are assigned the same reference numerals, and repeated description thereof is partially omitted.

Antenna B815 receives a modulated signal of the second frequency band (for example, a 6 GHz band) transmitted by repeater #1 labeled B102_1. Second frequency band receiving device B817 receives an input of received signal B816 received by antenna B815, performs processing such as demodulation, error correction decoding, etc., and outputs received data B818.

Antenna B815 may include one or more antennas, and thus received signal B816 may include one or more modulated signals. Accordingly, second frequency band receiving device B817 may perform signal processing for MIMO transmission on the received signal. As a matter of course, second frequency band receiving device B817 may perform signal processing for single stream transmission on the received signal.

Antenna B1914 receives a signal including a modulated signal of the third frequency band that is transmitted by access point B101 illustrated in FIG. 97. Third frequency band receiving device B1917 receives an input of the received signal B1916 received by antenna B1915, performs processing such as demodulation, error correction decoding, etc., and outputs data B1918.

Antenna B1915 may include one or more antennas, and thus received signal B1916 may include one or more modulated signals. Accordingly, third frequency band receiving device B1917 may perform signal processing for MIMO transmission on the received signal. As a matter of course, third frequency band receiving device B1917 may perform signal processing for single stream transmission on the received signal.

Terminal B103 may include B899, and, alternatively, may not include other communication device B899.

By implementing the above, terminal B103 illustrated in FIG. 97 can obtain modulated signals of a plurality of frequency bands, such as a modulated signal of the first frequency band and a modulated signal of the third frequency band, and can thus achieve the advantageous effect that the transmission amount of data obtained by terminal B103 can be increased. Moreover, by implementing a configuration in which the first repeater receives a modulated signal of the first frequency band transmitted by access point B101, generates a modulated signal of the second frequency band, and transmits the generated modulated signal to terminal B103, the above-described advantageous effects are further amplified. This has already been described in Embodiment B1.

As stated above, the configuration of the repeater may be a configuration like that in, for example, FIG. 93. Advantageous points of this configuration include, for example, the $A^{th}$ frequency band transmitting device need not include a plurality of transmitting devices and receiving devices, the $B^{th}$ frequency band transmitting device need not include a plurality of transmitting devices and receiving devices, the repeater can be miniaturized, and the scale of the circuitry can be kept down.

Note that the present embodiment is merely one example. For example, even if access point B101 is a terminal and terminal B103 is an access point, the present embodiment can be implemented in the same manner. Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented.

Moreover, the frame configurations illustrated in FIG. 98, FIG. 99, FIG. 100, and FIG. 101 are non-limiting examples; each frame configuration may include other symbols not illustrated in these figures. For example, a symbol for channel estimation, phase noise estimation, frequency/time synchronization, frequency offset estimation, etc., such as a reference symbol, pilot symbol, or mid-amble or the like, may be included in the frame.

Embodiment B3

In the present embodiment, a variation of Embodiment B1 and Embodiment B2 will be described.

Embodiment B1 and Embodiment B2 describe a case in which an access point directly transmits a modulated signal to a terminal or a case in which a terminal obtains data from an access point via a single repeater.

The implementation method is not limited to the methods described in Embodiment B1 and Embodiment B2; a terminal may obtain data from an access point via two or more repeaters. The present embodiment will describe an example in which a terminal obtains data from an access point via two or more repeaters.

Figure 104:
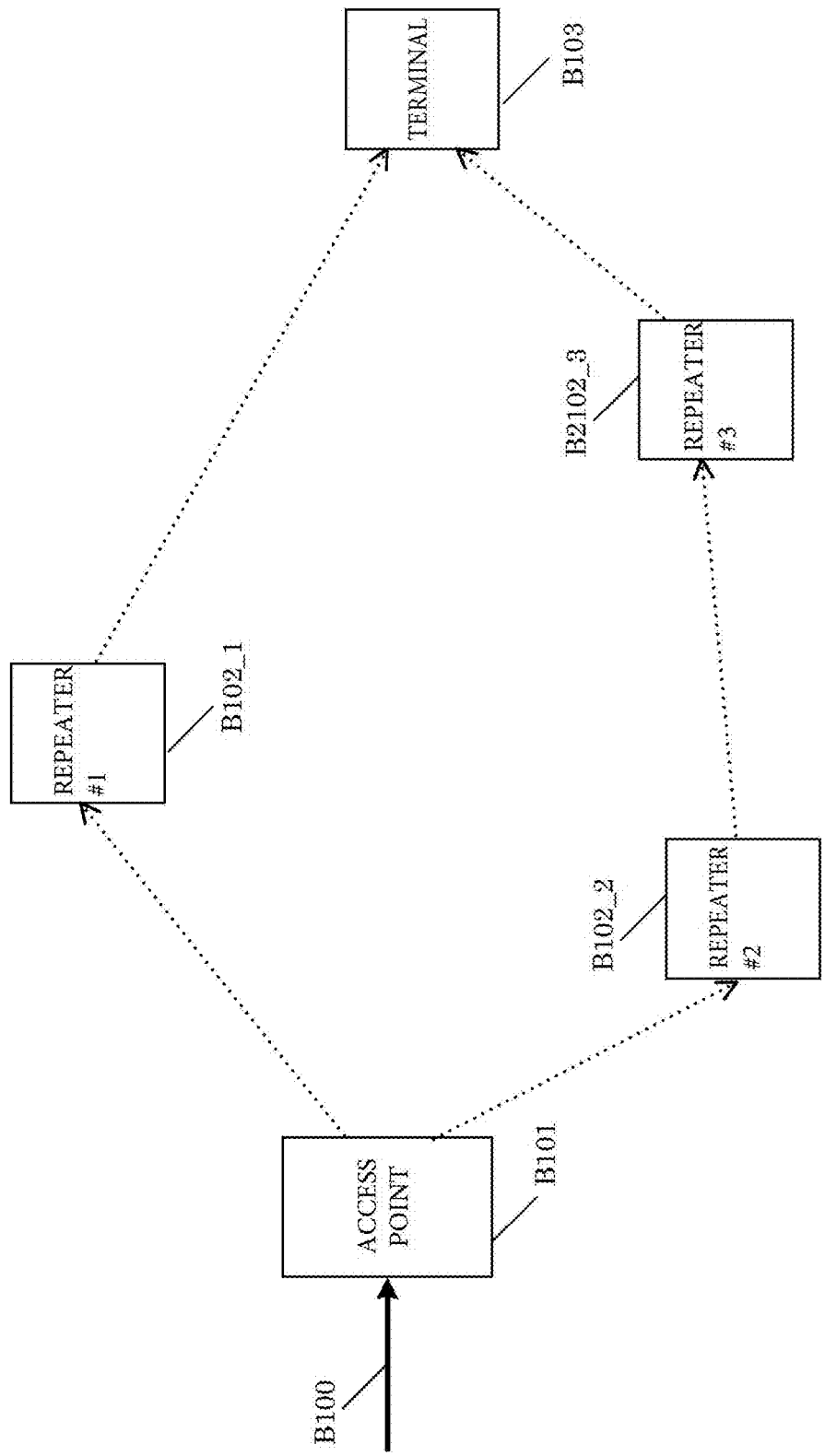
FIG. 104 illustrates one example of a system configuration.

As illustrated in FIG. 104, access point B101 receives an input of data B100, generates a modulated signal, and transmits the generated modulated signal to repeater #1 labeled B102_1. Repeater #1 labeled B102_1 receives the modulated signal transmitted by access point B101, generates a first modulated signal based on the received modulated signal, and transmits the generated first modulated signal to terminal B103.

Access point B101 receives an input of data B100, generates a modulated signal, and transmits the generated modulated signal to repeater #2 labeled B102_2. Repeater #2 labeled B102_2 receives the modulated signal transmitted by access point B101, generates a modulated signal based on the received modulated signal, and transmits the generated modulated signal to repeater #3 labeled B2102_3.

Repeater #3 labeled B2102_3 receives the modulated signal transmitted by repeater #2 labeled B102_2, generates a second modulated signal based on the received modulated signal, and transmits the generated second modulated signal to terminal B103.

Operations performed by repeater #1 labeled B102_1 at this time are as described in Embodiment B1.

Repeater #2 labeled B102_2 obtains the modulated signal of the $A^{th}$ frequency band transmitted by access point B101, and based on this modulated signal, generates and transmits a modulated signal of a $B^{th}$ frequency band. Note that the $A^{th}$ frequency band and the $B^{th}$ frequency band are different frequency bands.

Repeater #3 labeled B2102_3 obtains the modulated signal of the $B^{th}$ frequency band transmitted by repeater #2 labeled B102_2, and based on this modulated signal, generates and transmits a modulated signal of a $C^{th}$ frequency band. Note that the $B^{th}$ frequency band and the $C^{th}$ frequency band are different frequency bands.

Accordingly, terminal B103 receives and obtains data of the second modulated signal transmitted by repeater #1 labeled B102_1 and a modulated signal of the $C^{th}$ frequency band transmitted by repeater #3 labeled B2102_3.

Features of this configuration are as follows: the frequency band used by the second modulated signal and the $C^{th}$ frequency band are different; the frequency band used by the modulated signal received by a repeater and the frequency band used by the modulated signal transmitted by the repeater are different; and the access point transmits modulated signals that use a plurality of frequency bands.

This makes it possible to achieve the same advantageous effects described in Embodiment B1 and Embodiment B2.

Figure 105:
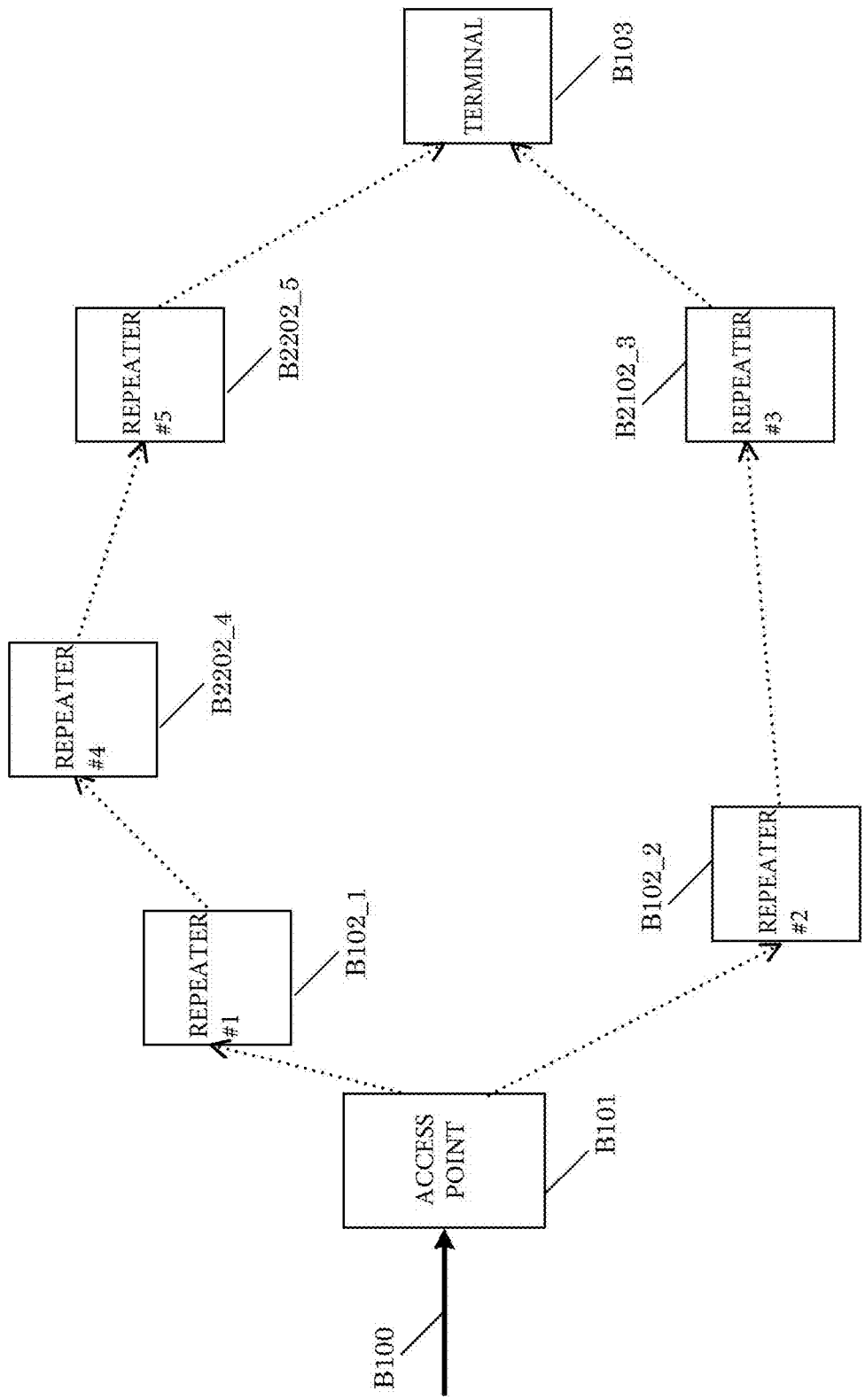
FIG. 105 illustrates one example of a system configuration.

FIG. 105 illustrates an example of a system that differs from the example illustrated in FIG. 104. Elements in FIG. 105 that operate the same as those in FIG. 84 and FIG. 104 share like reference signs.

As operations performed by repeater #2 labeled B102_2 and repeater #3 labeled B2102_3 have already been described with reference to FIG. 104, repeated description will be omitted.

Repeater #1 labeled B102_1 obtains a modulated signal of a $D^{th}$ frequency band transmitted by access point B101, and based on this modulated signal, generates and transmits a modulated signal of an $E^{th}$ frequency band. Note that the $D^{th}$ frequency band and the $E^{th}$ frequency band are different frequency bands.

Repeater #4 labeled B2202_4 obtains the modulated signal of the $E^{th}$ frequency band transmitted by repeater #1 labeled B102_1, and based on this modulated signal, generates and transmits a modulated signal of an $F^{th}$ frequency band. Note that the $E^{th}$ frequency band and the $F^{th}$ frequency band are different frequency bands.

Repeater #5 labeled B2202_5 obtains the modulated signal of the $F^{th}$ frequency band transmitted by repeater #4 labeled B2202_4, and based on this modulated signal, generates and transmits a modulated signal of a $G^{th}$ frequency band. Note that the $F^{th}$ frequency band and the $G^{th}$ frequency band are different frequency bands.

Accordingly, terminal B103 receives and obtains data of a modulated signal of the $G^{th}$ frequency band transmitted by repeater #5 labeled B2202_5 and a modulated signal of the $C^{th}$ frequency band transmitted by repeater #3 labeled B2102_3.

Features of this configuration are as follows: the frequency band used by the second modulated signal and the $C^{th}$ frequency band are different; the frequency band used by the modulated signal received by a repeater and the frequency band used by the modulated signal transmitted by the repeater are different; and the access point transmits modulated signals that use a plurality of frequency bands.

This makes it possible to achieve the same advantageous effects described in Embodiment B1 and Embodiment B2.

Note that relationships between the access point, the repeaters, and the terminal are not limited to the relationships illustrated in FIG. 104 and FIG. 105; for example, so long as the three features described above are satisfied, the embodiment can be implemented in the same manner.

Note that the present embodiment is merely one example. For example, even if access point B101 is a terminal and terminal B103 is an access point, the present embodiment can be implemented in the same manner. Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented.

Embodiment B4

The present embodiment will describe the frequency bands described in Embodiment B1 and Embodiment B3.

Figure 106:
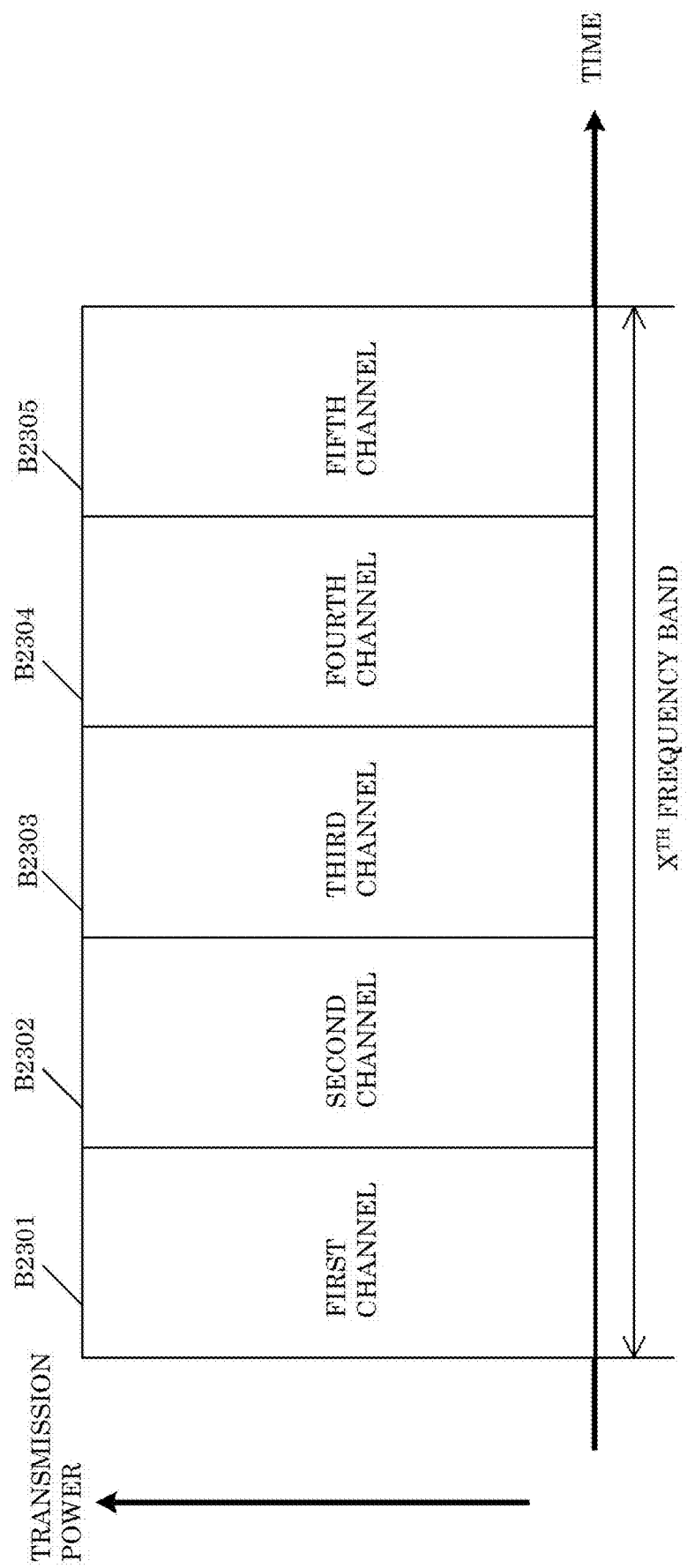
FIG. 106 illustrates one example of frame transmission time.

FIG. 106 illustrates one example of a relationship between an $X^{th}$ frequency band and channels. Note that the $X^{th}$ frequency band corresponds to any one of the first frequency band, the second frequency band, the third frequency band, the $A^{th}$ frequency band, the $B^{th}$ frequency band, the $C^{th}$ frequency band, the $D^{th}$ frequency band, the $E^{th}$ frequency band, the $F^{th}$ frequency band, or the $G^{th}$ frequency band or the like described in Embodiment B1 and Embodiment B3 and the like.

In FIG. 106, frequency is represented on the horizontal axis, and transmission power is represented on the vertical axis. In this example, the $X^{th}$ frequency band includes first channel B2301, second channel B2302, third channel B2303, fourth channel B2304, and fifth channel B2305. For example, when the spectrum of a modulated signal is in first channel B2301, the modulated signal is a modulated signal that uses first channel B2301. Similarly, when the spectrum of a modulated signal is in second channel B2302, the modulated signal is a modulated signal that uses second channel B2302. The same applies to the other channels as well. In this example, when a device such as an access point, a repeater, or a terminal transmits a modulated signal, the device uses one or more channels. For example, the access point may transmit a modulated signal that uses the first channel, the access point may transmit a modulated signal that uses the first channel and the second channel, and the access point may transmit a modulated signal that uses the first channel, the second channel, the third channel, and the fourth channel. The same applies to the other devices as well.

Next, the example presented in Embodiment B1 will be described in greater detail.

Access point B101 illustrated in FIG. 84 transmits a modulated signal of the first frequency band to repeater #1 labeled B102_1. Repeater #2 labeled B102_2 transmits a modulated signal of the first frequency band to terminal B103.

Here, the following two methods are conceivable.
First Method:

The channel used by the modulated signal of the first frequency band transmitted by access point B101 and the channel used by the modulated signal of the first frequency band transmitted by repeater #2 labeled B102_2 are different.

For example, the channel used by the modulated signal of the first frequency band transmitted by access point B101 is first channel B2301, and the channel used by the modulated signal of the first frequency band transmitted by repeater #2 labeled B102_2 is fifth channel B2305. Alternatively, the modulated signal of the first frequency band transmitted by access point B101 uses first channel B2301 and second channel B2302, and the modulated signal of the first frequency band transmitted by repeater #2 labeled B102_2 uses fourth channel B2304 and fifth channel B2305.

By using the first method, in the case of FIG. 84, when terminal B103 receives the modulated signal transmitted by repeater #2 labeled B102_2, since the modulated signal transmitted by access point B101 does not interfere, it is possible to achieve the advantageous effect that high data reception quality can be achieved.

Second Method:

The channel used by the modulated signal of the first frequency band transmitted by access point B101 and the channel used by the modulated signal of the first frequency band transmitted by repeater #2 labeled B102_2 are the same.

For example, the channel used by the modulated signal of the first frequency band transmitted by access point B101 is first channel B2301, and the channel used by the modulation method of the first frequency band transmitted by repeater #2 labeled B102_2 is first channel B2301. Alternatively, the modulated signal of the first frequency band transmitted by access point B101 uses first channel B2301 and second channel B2302, and the modulation method of the first frequency band transmitted by repeater #2 labeled B102_2 uses first channel B2301 and second channel B2302.

For example, access point B101 performs directivity control, transmits a modulated signal of the first frequency band, and when this modulated signal is not received by terminal B103, even if the second method is used, terminal B103 can receive the modulated signal of the first frequency band transmitted by repeater #2 labeled B102_2 with little interference, which achieves the advantageous effect that high data reception quality can be achieved.

By using the second method, in the case of FIG. 84, when terminal B103 receives the modulated signal transmitted by repeater #2 labeled B102_2, since the modulated signal transmitted by access point B101 does not interfere, it is possible to achieve the advantageous effect that high data reception quality can be achieved. Since the system illustrated in FIG. 84 efficiently makes use of frequencies with this configuration, it is possible to achieve the advantageous effect that high frequency-usage efficiency can be achieved.

However, depending on the spatial positional relationships between access point B101, repeater #1 labeled B102_1, repeater #2 labeled B102_2, and terminal B103, there is a possibility that the modulated signal of the first frequency band transmitted by access point B101 and the modulation method of the first frequency band transmitted by repeater #2 labeled B102_2 may interfere.

Taking this into consideration, depending on the situation, the system illustrated in FIG. 84 may select the more suitable one of the first method and the second method.

Access point B101 illustrated in FIG. 84 transmits a modulated signal of the second frequency band to repeater #2 labeled B102_2. Repeater #1 labeled B102_1 transmits a modulated signal of the second frequency band to terminal B103.

Here, the following two methods are conceivable.

Third Method:

The channel used by the modulated signal of the second frequency band transmitted by access point B101 and the channel used by the modulated signal of the second frequency band transmitted by repeater #1 labeled B102_1 are different.

For example, the channel used by the modulated signal of the second frequency band transmitted by access point B101 is second channel B2302, and the channel used by the modulated signal of the second frequency band transmitted by repeater #1 labeled B102_1 is fourth channel B2304. Alternatively, the modulated signal of the second frequency band transmitted by access point B101 uses second channel B2302 and third channel B2303, and the modulated signal of the second frequency band transmitted by repeater #1 labeled B102_1 uses fourth channel B2304 and fifth channel B2305.

By using the third method, in the case of FIG. 84, when terminal B103 receives the modulated signal transmitted by repeater #1 labeled B102_1, since the modulated signal transmitted by access point B101 does not interfere, it is possible to achieve the advantageous effect that high data reception quality can be achieved.

Fourth Method:

The channel used by the modulated signal of the second frequency band transmitted by access point B101 and the channel used by the modulated signal of the second frequency band transmitted by repeater #1 labeled B102_1 are the same.

For example, the channel used by the modulated signal of the second frequency band transmitted by access point B101 is first channel B2301, and the channel used by the modulation method of the second frequency band transmitted by repeater #1 labeled B102_1 is first channel B2301. Alternatively, the modulated signal of the second frequency band transmitted by access point B101 uses first channel B2301 and second channel B2302, and modulation method of the second frequency band transmitted by repeater #1 labeled B102_1 uses first channel B2301 and second channel B2302.

For example, access point B101 performs directivity control, transmits a modulated signal of the second frequency band, and when this modulated signal is not received by terminal B103, even if the fourth method is used, terminal B103 can receive the modulated signal of the second frequency band transmitted by repeater #1 labeled B102_1 with little interference, which achieves the advantageous effect that high data reception quality can be achieved.

By using the fourth method, in the case of FIG. 84, when terminal B103 receives the modulated signal transmitted by repeater #1 labeled B102_1, since the modulated signal transmitted by access point B101 does not interfere, it is possible to achieve the advantageous effect that high data reception quality can be achieved. Since the system illustrated in FIG. 84 efficiently makes use of frequencies with this configuration, it is possible to achieve the advantageous effect that high frequency-usage efficiency can be achieved.

However, depending on the spatial positional relationships between access point B101, repeater #1 labeled B102_1, repeater #2 labeled B102_2, and terminal B103, there is a possibility that the modulated signal of the second frequency band transmitted by access point B101 and the modulation method of the second frequency band transmitted by repeater #1 labeled B102_1 may interfere.

Taking this into consideration, depending on the situation, the system illustrated in FIG. 84 may select the more suitable one of the third method and the fourth method.

Next, the example presented in Embodiment B3 will be described in greater detail.

As illustrated in FIG. 105, access point B101 transmits a modulated signal, and terminal B103 obtains the modulated signal via repeater #1 labeled B102_1, repeater #4 labeled B2202_4, and repeater #5 labeled B2202_5. The access point transmits a modulated signal, and terminal B103 obtains the modulated signal via repeater #2 labeled B102_2 and repeater #3 labeled B2102_3.

Here, as described in Embodiment B3, the following occurs.

Repeater #2 labeled B102_2 obtains a modulated signal of the $A^{th}$ frequency band transmitted by access point B101, and based on this modulated signal, generates and transmits a modulated signal of the $B^{th}$ frequency band. Note that the $A^{th}$ frequency band and the $B^{th}$ frequency band are different frequency bands.

Repeater #3 labeled B2102_3 obtains the modulated signal of the $B^{th}$ frequency band transmitted by repeater #2 labeled B102_2, and based on this modulated signal, generates and transmits a modulated signal of the $C^{th}$ frequency band. Note that the $B^{th}$ frequency band and the $C^{th}$ frequency band are different frequency bands.

Repeater #1 labeled B102_1 obtains a modulated signal of the $D^{th}$ frequency band transmitted by access point B101, and based on this modulated signal, generates and transmits a modulated signal of the $E^{th}$ frequency band. Note that the $D^{th}$ frequency band and the $E^{th}$ frequency band are different frequency bands.

Repeater #4 labeled B2202_4 obtains the modulated signal of the $E^{th}$ frequency band transmitted by repeater #1 labeled B102_1, and based on this modulated signal, generates and transmits a modulated signal of the $F^{th}$ frequency band. Note that the $E^{th}$ frequency band and the $F^{th}$ frequency band are different frequency bands.

Repeater #5 labeled B2202_5 obtains the modulated signal of the $F^{th}$ frequency band transmitted by repeater #4 labeled B2202_4, and based on this modulated signal, generates and transmits a modulated signal of the $G^{th}$ frequency band. Note that the $F^{th}$ frequency band and the $G^{th}$ frequency band are different frequency bands.

Here, the following two methods are conceivable.

Fifth Method:

Among the modulated signal of the $A^{th}$ frequency band, the modulated signal of the $B^{th}$ frequency band, the modulated signal of the $C^{th}$ frequency band, the modulated signal of the $D^{th}$ frequency band, the modulated signal of the $E^{th}$ frequency band, the modulated signal of the $F^{th}$ frequency band, and the modulated signal of the $G^{th}$ frequency band described above, two or more modulated signals use the first frequency band. Here, consider all possible sets of two modulated signals that use the first frequency band are selected. In all possible sets of two modulates signals, different channels are used by the two modulated signals.

By using the fifth method, in FIG. 105, since interference between modulated signals can be reduced, it is possible to achieve the advantageous effect that high data reception quality when performing communication can be achieved and the advantageous effect that the terminal can obtain more data can be achieved.

Sixth Method:

Among the modulated signal of the $A^{th}$ frequency band, the modulated signal of the $B^{th}$ frequency band, the modulated signal of the $C^{th}$ frequency band, the modulated signal of the $D^{th}$ frequency band, the modulated signal of the $E^{th}$ frequency band, the modulated signal of the $F^{th}$ frequency band, and the modulated signal of the $G^{th}$ frequency band described above, two or more modulated signals use the first frequency band. Consider all possible sets of two modulated signals that use the first frequency band are selected. Here, among all possible sets of two modulated signals, there is a set of two modulated signals that use the same channel.

Here, when the devices including the access point, the repeaters, and the terminal successfully perform directivity control that reduces mutual interference, it is possible to achieve the advantageous effect that high data reception quality when performing each communication can be achieved and the advantageous effect that the terminal can obtain more data can be achieved.

However, depending on the spatial positional relationships between the access point, the repeaters, and the terminal, there is a possibility that the modulated signal of the first frequency band transmitted by access point B101 and the modulation method of the first frequency band transmitted by repeater #2 labeled B102_2 may interfere.

Taking this into consideration, depending on the situation, the system illustrated in FIG. 105 may select the more suitable one of the fifth method and the sixth method.

Embodiment B5

The present embodiment will describe the frequency bands described in Embodiment B1, Embodiment B2, Embodiment B3, and Embodiment B4.

First, the example presented in Embodiment B1 will be described in greater detail.

Embodiment B1 states that access point B101 illustrated in FIG. 84 transmits a modulated signal of the first frequency band to repeater #1 labeled B102_1, and repeater #2 labeled B102_2 transmits a modulated signal of the first frequency band to terminal B103, and also states that access point B101 illustrated in FIG. 84 transmits a modulated signal of the second frequency band to repeater #2 labeled B102_2, and repeater #1 labeled B102_1 transmits a modulated signal of the second frequency band to terminal B103. These points may be modified as follows when carrying out Embodiment B1, and in such cases, the same advantageous effects as Embodiment B1 can be achieved.

Assume that access point B101 illustrated in FIG. 84 transmits a modulated signal in an $M^{th}$ channel of an $L^{th}$ frequency band to repeater #1 labeled B102_1, and repeater #2 labeled B102_2 transmits a modulated signal in the $M^{th}$ channel of the $L^{th}$ frequency band to terminal B103, and that access point B101 illustrated in FIG. 84 transmits a modulated signal in an $N^{th}$ channel of the $L^{th}$ frequency band to repeater #2 labeled B102_2, and repeater #1 labeled B102_1 transmits a modulated signal in the $N^{th}$ channel of the $L^{th}$ frequency band to terminal B103. In this example, the $M^{th}$ channel and the $N^{th}$ channel are different channels.

Note that the term "$M^{th}$ channel" can be rewritten as "channel M". This also applies to similar phrases.

Next, the example presented in Embodiment B2 will be described in greater detail.

Embodiment B2 states that access point B101 illustrated in FIG. 97 transmits a modulated signal of the first frequency band to repeater #1 labeled B102_1, and repeater #1 labeled B102_1 transmits a modulated signal of the second frequency band to terminal B103, and also states that access point B101 illustrated in FIG. 97 transmits a modulated signal of the third frequency band to terminal B103 Embodiment B2. These points may be modified as follows when carrying out Embodiment B2, and in such cases, the same advantageous effects as Embodiment B2 can be achieved.

Assume that access point B101 illustrated in FIG. 97 transmits a modulated signal in an $M^{th}$ channel of an $L^{th}$ frequency band to repeater #1 labeled B102_1, and repeater #1 labeled B102_1 transmits a modulated signal in an $N^{th}$ channel of the $L^{th}$ frequency band to terminal B103, and that access point B101 illustrated in FIG. 97 transmits a modulated signal in a $P^{th}$ channel of the $L^{th}$ frequency band to terminal B103. In this example, the $M^{th}$ channel and the $N^{th}$ channel are different channels, the $M^{th}$ channel and the $P^{th}$ channel are different channels, and the $N^{th}$ channel and the $P^{th}$ channel are different channels.

Next, the example presented in Embodiment B3 will be described in greater detail.

Embodiment B3 states "the modulated signal of the $A^{th}$ frequency band, the modulated signal of the $B^{th}$ frequency band, the modulated signal of the $C^{th}$ frequency band, the modulated signal of the $D^{th}$ frequency band, the modulated signal of the $E^{th}$ frequency band, the modulated signal of the $F^{th}$ frequency band, and the modulated signal of the $G^{th}$ frequency band".

These points may be modified as follows when carrying out Embodiment B3, and in such cases, the same advantageous effects as Embodiment B3 can be achieved.

Consider the modulated signal of the $A^{th}$ frequency band to be a modulated signal of an $A^{th}$ channel, consider the modulated signal of the $B^{th}$ frequency band to be a modulated signal of a $B^{th}$ channel, consider the modulated signal of the $C^{th}$ frequency band to be a modulated signal of a $C^{th}$ channel, consider the modulated signal of the $D^{th}$ frequency band to be a modulated signal of a $D^{th}$ channel, consider the modulated signal of the $E^{th}$ frequency band to be a modulated signal of an $E^{th}$ channel, consider the modulated signal of the $F^{th}$ frequency band to be a modulated signal of an $F^{th}$ channel, and consider the modulated signal of the $G^{th}$ frequency band to be a modulated signal of a $G^{th}$ channel.

Even when the above described implementation example of Embodiment B1, implementation example of Embodiment B2, and implementation example of Embodiment B3 are applied to Embodiment B4, Embodiment B4 can be carried out in the same manner.

Supplemental Information B2

In Embodiment B1 through Embodiment B5, the terms first frequency band, second frequency band, third frequency band, $A^{th}$ frequency band, $B^{th}$ frequency band, $C^{th}$ frequency band, $D^{th}$ frequency band, $E^{th}$ frequency band, $F^{th}$ frequency band, and $G^{th}$ frequency band are used, but a method that uses, for example, a 2.4 GHz band, a 5 GHz band, a 6 GHz band, a 7 GHz band, a 60 GHZ, etc., is conceivable, but these examples are non-limiting. Moreover, optical frequency bands such as frequency bands of visible light may be used.

Access point B101 illustrated in FIG. 84, FIG. 97, FIG. 104, and FIG. 105 is exemplified as receiving an input of data B100, but data B100 may be one or more inputs of data. Access point B101 illustrated in FIG. 84, FIG. 104, and FIG. 105 is exemplified as transmitting a modulated signal destined for repeater #1 labeled B102_1 and a modulated signal destined for repeater #2 labeled B102_2, but the data included in the modulated signal destined for repeater #1 labeled B102_1 may or may not include the data included in the modulated signal destined for repeater #2 labeled B102_2. For example, to state it differently, when the data included in the modulated signal destined for repeater #1 labeled B102_1 is referred to as "first data" and the data included in the data included in the modulated signal destined for repeater #2 labeled B102_2 is referred to as "second data", the first data and the second data may be the same data, or may be different data. When the first data and the second data are the same data, access point B101 can be considered to transmit a plurality of the first modulated signals to the repeaters. However, the data transmission method used by access point B101 is not limited to this example.

Access point B101 illustrated in FIG. 97 is exemplified as transmitting a modulated signal destined for repeater #1 labeled B102_1 and a modulated signal destined for terminal B103, but the data included in the modulated signal destined for repeater #1 labeled B102_1 may or may not include the data included in the modulated signal destined for terminal B103. For example, to state it differently, when the data included in the modulated signal destined for repeater #1 labeled B102_1 is referred to as "third data" and the data included in the data included in the modulated signal destined for terminal B103 is referred to as "fourth data", the third data and the fourth data may be the same data, or may be different data. When the third data and the fourth data are the same data, access point B101 can be considered to transmit the first modulated signal to the repeater and the terminal. However, the data transmission method used by access point B101 is not limited to this example.

Embodiment B6

In the present embodiment, one example of a configuration of the modulated signal that each of access point B101, repeater #1 labeled B102_1, and repeater #2 labeled B102_2 illustrated in FIG. 84 and described in Embodiment B1 transmits will be described.

Examples of frames of the modulated signals that access point B101 transmits have been given with reference to FIG. 85, FIG. 86, and FIG. 87 in Embodiment B1.

For example, the modulated signals illustrated in FIG. 85, FIG. 86, and FIG. 87 that are transmitted by access point B101, destined for repeater #1 labeled B102_1, and include preamble B201_1, control information symbol, B202_1, and data symbol B203_1 will be described.

Figure 107:
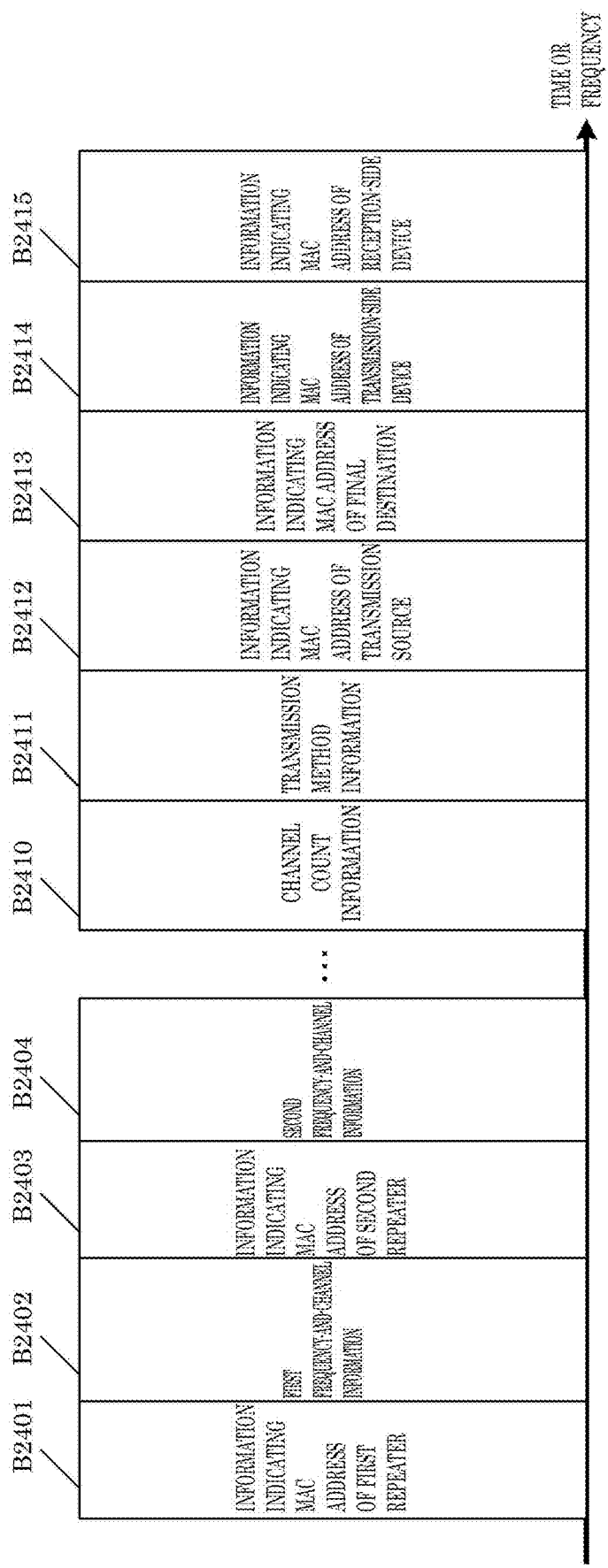
FIG. 107 illustrates one example of frame transmission time.

FIG. 107 illustrates an example of information transmitted in any of preamble B201_1, control information symbol B202_1, and data symbol B203_1. Note that each item of information may be arranged along the time axis and transmitted by access point B101, and when a multi-carrier transmission method such as orthogonal frequency division multiplexing (OFDM) is used, each item of information may be arranged along the frequency axis and transmitted by access point B101. For this reason, in FIG. 107, the horizontal axis is labeled as "time or frequency". The arrangement of the items of information is not limited to the example illustrated in FIG. 107. The information illustrated in FIG. 107 may be transmitted in a single frame, and may be transmitted using a plurality of frames. Moreover, the information illustrated in FIG. 107 may be included in each frame.

Information B2401 indicating the media access control (MAC) address of the first repeater is, for example, information indicating the MAC address of repeater #1 labeled B102_1 in FIG. 84. Although this example uses MAC address information, this information may be information other than MAC address information so long as it is a unique number that can identify a device.

First frequency-and-channel information B2402 is information indicating the frequency and channel used by the modulated signal transmitted by the first repeater, which is repeater #1 labeled B102_1 in FIG. 84 in this example. Accordingly, in the case of Embodiment B1, first frequency-and-channel information B2402 indicates, for example, the first channel of the first frequency band, i.e., 5 GHz band. Note that the first channel is merely one non-limiting example.

Information B2403 indicating the MAC address of the second repeater is, for example, information indicating the MAC address of repeater #2 labeled B102_2 in FIG. 84. Although this example uses MAC address information, this information may be information other than MAC address information so long as it is a unique number that can identify a device.

Second frequency-and-channel information B2404 is information indicating the frequency and channel used by the modulated signal transmitted by the second repeater, which is repeater #2 labeled B102_2 in FIG. 84 in this example. Accordingly, in the case of Embodiment B1, second frequency-and-channel information B2404 indicates, for example, the third channel of the second frequency band, i.e., 6 GHz band. Note that the third channel is merely one non-limiting example.

Although only two repeaters are present in the example illustrated in FIG. 84, when another repeater is present, the information indicating the MAC address of each repeater and the information indicating the frequency and channel used by each repeater is also included. Although this example uses MAC address information, this information may be information other than MAC address information so long as it is a unique number that can identify a device.

Channel count information B2410 is information indicating the number of channels used in the transmission by the transmission source, which is access point B101 in the example illustrated in FIG. 84. In Embodiment B1, since access point B101 transmits a modulated signal of the first frequency band, i.e., 5 GHz band, and a modulated signal of the second frequency band, i.e., 6 GHz band, channel count information B2410 indicates "2".

Information indicating the number of modulated signals transmitted for each channel may also be transmitted along with channel count information B2410. For example, information indicating the number of modulated signals destined for the first repeater as "1" and the number of modulated signals destined for the second repeater as "2" may be transmitted.

Transmission method information B2411 is information related to the transmission method of the modulated signal transmitted by access point B101. For example, information indicating either "the modulated signal destined for the first repeater and the modulated signal destined for the second repeater include the same information" or "the information included in the modulated signal destined for the first repeater and the information included in the modulated signal destined for the second repeater are not the same (are independent)" may be included as transmission method information B2411. Moreover, transmission method information B2411 may include information indicating the transmission method of the modulated signal destined for the first repeater (for example, "single stream transmission or transmission of a plurality of modulated signals" or "single carrier transmission or multi-carrier transmission such as OFDM" or the like), and information related to the transmission method of the modulated signal destined for the second repeater. When access point B101 transmits a modulated signal destined for a repeater other than the first or second repeater, information indicating the transmission method of that modulated signal may be included in transmission method information B2411.

Information B2412 indicating the MAC address of the transmission source is information indicating the MAC address of the device that transmitted the source of information, which is access point B101 in the example illustrated in FIG. 84.

Information B2413 indicating the MAC address of the final destination is information indicating the MAC address of the device that is the final destination of the information, which is terminal B103 in the example illustrated in FIG. 84. Although this example uses MAC address information, this information may be information other than MAC address information so long as it is a unique number that can identify a device.

Information B2414 indicating the MAC address of the transmission-side device is information indicating the MAC address of the device that transmits the modulated signal including the information illustrated in FIG. 107 and the data symbol data (however, the data symbol data need not be included). In the case of the above description, this is information indicating the MAC address of access point B101. Although this example uses MAC address information, this information may be information other than MAC address information so long as it is a unique number that can identify a device.

Information B2415 indicating the MAC address of the reception-side device is information indicating the MAC address of the device that receives the modulated signal including the information illustrated in FIG. 107 and the data symbol data (however, the data symbol data need not be included). In the case of the above description, this is information indicating the MAC address of repeater #1 labeled B102_1. Although this example uses MAC address information, this information may be information other than MAC address information so long as it is a unique number that can identify a device.

Next, the modulated signal destined for repeater #2 labeled B102_2 that is transmitted by access point B101 will be described.

Here, the information illustrated in FIG. 107 is exemplified as being transmitted in any of preamble B201_2, control information symbol B202_2, and data symbol B203_2 illustrated in FIG. 85, FIG. 86, and FIG. 87.

Note that each item of information may be arranged along the time axis and transmitted by access point B101, and when a multi-carrier transmission method such as OFDM is used, each item of information may be arranged along the frequency axis and transmitted by access point B101. For this reason, in FIG. 107, the horizontal axis is labeled as "time or frequency". The arrangement of the items of information is not limited to the example illustrated in FIG. 107. The information illustrated in FIG. 107 may be transmitted in a single frame, and may be transmitted using a plurality of frames. Moreover, the information illustrated in FIG. 107 may be included in each frame.

Since information B2401 indicating the MAC address of the first repeater, first frequency-and-channel information B2402, information B2403 indicating the MAC address of the second repeater, second frequency-and-channel information B2404, channel count information B2410, transmission method information B2411, information B2412 indicating the MAC address of the transmission source, and information B2413 indicating the MAC address of the final destination in FIG. 107 are the same as the information in the modulated signal transmitted to repeater #1 labeled B102_1 by access point B101, repeated description will be omitted.

Information B2414 indicating the MAC address of the transmission-side device is information indicating the MAC address of the device that transmits the modulated signal including the information illustrated in FIG. 107 and the data symbol data (however, the data symbol data need not be included). In the case of the above description, this is information indicating the MAC address of access point B101. Although this example uses MAC address information, this information may be information other than MAC address information so long as it is a unique number that can identify a device.

Information B2415 indicating the MAC address of the reception-side device is information indicating the MAC address of the device that receives the modulated signal including the information illustrated in FIG. 107 and the data symbol data (however, the data symbol data need not be included). In the case of the above description, this is information indicating the MAC address of repeater #2 labeled B102_2. Although this example uses MAC address information, this information may be information other than MAC address information so long as it is a unique number that can identify a device.

Next, the modulated signal destined for terminal B103 that is transmitted by repeater #1 labeled B102_1 will be described.

Here, the information illustrated in FIG. 107 is exemplified as being transmitted in any of preamble B501_1, control information symbol B502_1, and data symbol B503_1 illustrated in FIG. 88, FIG. 89, and FIG. 90.

Note that each item of information may be arranged along the time axis and transmitted by repeater #1 labeled B102_1, and when a multi-carrier transmission method such as OFDM is used, each item of information may be arranged along the frequency axis and transmitted by repeater #1 labeled B102_1. For this reason, in FIG. 107, the horizontal axis is labeled as "time or frequency". The arrangement of the items of information is not limited to the example illustrated in FIG. 107. The information illustrated in FIG. 107 may be transmitted in a single frame, and may be transmitted using a plurality of frames. Moreover, the information illustrated in FIG. 107 may be included in each frame.

Since information B2401 indicating the MAC address of the first repeater, first frequency-and-channel information B2402, information B2403 indicating the MAC address of the second repeater, second frequency-and-channel information B2404, channel count information B2410, transmission method information B2411, information B2412 indicating the MAC address of the transmission source, and information B2413 indicating the MAC address of the final destination in FIG. 107 are the same as the information in the modulated signal transmitted to repeater #1 labeled B102_1 by access point B101, repeated description will be omitted.

Information B2414 indicating the MAC address of the transmission-side device is information indicating the MAC address of the device that transmits the modulated signal including the information illustrated in FIG. 107 and the data symbol data (however, the data symbol data need not be included). In the case of the above description, this is information indicating the MAC address of repeater #1 labeled B102_1. Although this example uses MAC address information, this information may be information other than MAC address information so long as it is a unique number that can identify a device.

Information B2415 indicating the MAC address of the reception-side device is information indicating the MAC address of the device that receives the modulated signal including the information illustrated in FIG. 107 and the data symbol data (however, the data symbol data need not be included). In the case of the above description, this is information indicating the MAC address of terminal B103. Although this example uses MAC address information, this information may be information other than MAC address information so long as it is a unique number that can identify a device.

Next, the modulated signal destined for terminal B103 that is transmitted by repeater #2 labeled B102_2 will be described.

Here, the information illustrated in FIG. 107 is exemplified as being transmitted in any of preamble B501_2, control information symbol B502_2, and data symbol B503_2 illustrated in FIG. 88, FIG. 89, and FIG. 90.

Note that each item of information may be arranged along the time axis and transmitted by repeater #2 labeled B102_2, and when a multi-carrier transmission method such as OFDM is used, each item of information may be arranged along the frequency axis and transmitted by repeater #2 labeled B102_2. For this reason, in FIG. 107, the horizontal axis is labeled as "time or frequency". The arrangement of the items of information is not limited to the example illustrated in FIG. 107. The information illustrated in FIG. 107 may be transmitted in a single frame, and may be transmitted using a plurality of frames. Moreover, the information illustrated in FIG. 107 may be included in each frame.

Since information B2401 indicating the MAC address of the first repeater, first frequency-and-channel information B2402, information B2403 indicating the MAC address of the second repeater, second frequency-and-channel information B2404, channel count information B2410, transmission method information B2411, information B2412 indicating the MAC address of the transmission source, and information B2413 indicating the MAC address of the final destination in FIG. 107 are the same as the information in the modulated signal transmitted to repeater #1 labeled B102_1 by access point B101, repeated description will be omitted.

Information B2414 indicating the MAC address of the transmission-side device is information indicating the MAC address of the device that transmits the modulated signal including the information illustrated in FIG. 107 and the data symbol data (however, the data symbol data need not be included). In the case of the above description, this is information indicating the MAC address of repeater #2 labeled B102_2. Although this example uses MAC address information, this information may be information other than MAC address information so long as it is a unique number that can identify a device.

Information B2415 indicating the MAC address of the reception-side device is information indicating the MAC address of the device that receives the modulated signal including the information illustrated in FIG. 107 and the data symbol data (however, the data symbol data need not be included). In the case of the above description, this is information indicating the MAC address of terminal B103. Although this example uses MAC address information, this information may be information other than MAC address information so long as it is a unique number that can identify a device.

Next, operations performed by the receiving device upon receiving information such as that illustrated in FIG. 107 will be described. Here, the receiving device refers to the receiving device of repeater #1 labeled B102_1, the receiving device of repeater #2 labeled B102_2, and the receiving device of terminal B103 illustrated in FIG. 84.

The receiving device of repeater #1 labeled B102_1, the receiving device of repeater #2 labeled B102_2, and the receiving device of terminal B103 illustrated in FIG. 84 obtain information B2401 indicating the MAC address of the first repeater, first frequency-and-channel information B2402, information B2403 indicating the MAC address of the second repeater, second frequency-and-channel information B2404, channel count information B2410, transmission method information B2411, information B2412 indicating the MAC address of the transmission source, and information B2413 indicating the MAC address of the final destination. With this, each receiving device knows how the modulated signal is transmitted.

The receiving device of repeater #1 labeled B102_1, the receiving device of repeater #2 labeled B102_2, and the receiving device of terminal B103 illustrated in FIG. 84 determine whether the modulated signal is a modulated signal destined for itself or not by obtaining information B2415 indicating the MAC address of the reception-side device.

The receiving device of repeater #1 labeled B102_1, the receiving device of repeater #2 labeled B102_2, and the receiving device of terminal B103 illustrated in FIG. 84 know who transmitted the modulated signal by obtaining information B2414 indicating the MAC address of the transmission-side device.

By implementing the present embodiment, it is possible to stably operate the system including the access point, the repeaters, and the terminal, which makes it possible to achieve the advantageous effect that data transmission speeds in the system can be improved.

Although the present embodiment gives an example of operations performed by the system illustrated in FIG. 84 that includes an access point, repeaters, and a terminal, the configuration of the system that includes an access point, a repeater, and a terminal is not limited to this example, as is also the case with other examples presented in other embodiments.

Note that the present embodiment is merely one example. For example, even if access point B101 is a terminal and terminal B103 is an access point, the present embodiment can be implemented in the same manner. Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented.

Embodiment B7

In the present embodiment, information transmitted by the access point (AP), repeaters, and terminal described in, for example, Embodiment B1 through Embodiment B6, as well as operations performed by these devices, will be described.

Figure 108A:
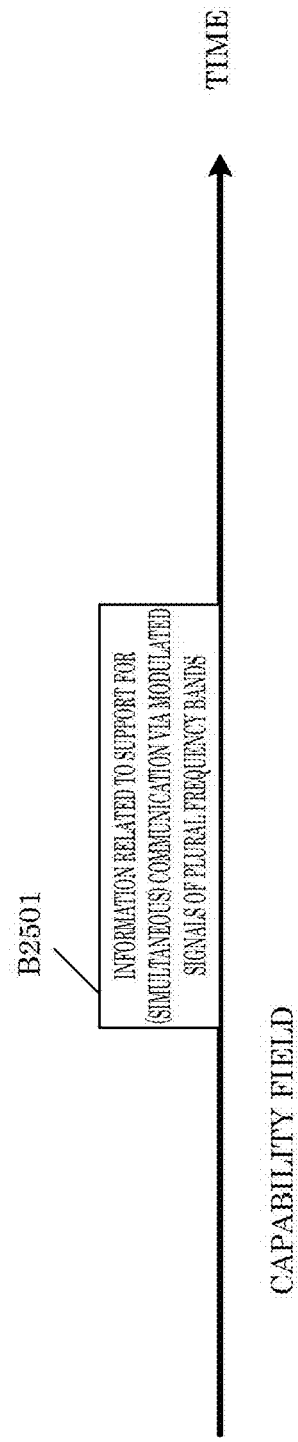
FIG. 108A illustrates one example of information transmission time.

In order for the AP, repeaters, and terminal to achieve communication characterized by efficient data transmission with the communication partner, for example, the AP, repeaters, and terminal transmit the information illustrated in FIG. 108A and FIG. 108B.

For example, the AP, repeaters, and terminal transmit information for notifying whether (simultaneous) communication via modulated signals of a plurality of frequency bands is supported or not. This is illustrated in FIG. 108A. Although the phrase "(simultaneous) communication" is used, the communication may or may not be simultaneous. This applies hereinafter as well.

In FIG. 108A, time is represented on the horizontal axis. For example, the capability field is illustrated in FIG. 108A. Part of the capability field includes information B2501 related to support for (simultaneous) communication via modulated signals of a plurality of frequency bands. Information B2501 related to support for (simultaneous) communication via modulated signals of a plurality of frequency bands is information for notifying whether (simultaneous) communication via modulated signals of a plurality of frequency bands is supported or not. However, information B2501 related to support for (simultaneous) communication via modulated signals of a plurality of frequency bands may be transmitted outside of the capability field.

Here, the capability field is a field including, for example, a management frame, a control frame, and a data frame that are in the media access control (MAC) frame. The capability field is a field for notifying the communication partner of capabilities related to communication or the form of the communication (reception capability or transmission capability, etc.).

For example, the AP, repeaters, and terminal transmit information for notifying whether (simultaneous) communication via modulated signals of a plurality of channels is supported or not. This is illustrated in FIG. 108B.

In FIG. 108B, time is represented on the horizontal axis. For example, the capability field is illustrated in FIG. 108B. Part of the capability field includes information B2502 related to support for (simultaneous) communication via modulated signals of a plurality of channels. Information B2502 related to support for (simultaneous) communication via modulated signals of a plurality of channels is information for notifying whether (simultaneous) communication via modulated signals of a plurality of channels is supported or not. However, information B2502 related to support for (simultaneous) communication via modulated signals of a plurality of channels may be transmitted outside of the capability field.

Any of the following configurations are acceptable: the AP transmits information B2501 related to support for (simultaneous) communication via modulated signals of a plurality of frequency bands; the AP transmits information B2502 related to support for (simultaneous) communication via modulated signals of a plurality of channels; and the AP transmits information B2501 related to support for (simultaneous) communication via modulated signals of a plurality of frequency bands and information B2502 related to support for (simultaneous) communication via modulated signals of a plurality of channels.

Similarly, any of the following configurations are acceptable: the repeater transmits information B2501 related to support for (simultaneous) communication via modulated signals of a plurality of frequency bands; the repeater transmits information B2502 related to support for (simultaneous) communication via modulated signals of a plurality of channels; and the repeater transmits information B2501 related to support for (simultaneous) communication via modulated signals of a plurality of frequency bands and information B2502 related to support for (simultaneous) communication via modulated signals of a plurality of channels.

Similarly, any of the following configurations are acceptable: the terminal transmits information B2501 related to support for (simultaneous) communication via modulated signals of a plurality of frequency bands; the terminal transmits information B2502 related to support for (simultaneous) communication via modulated signals of a plurality of channels; and the terminal transmits information B2501 related to support for (simultaneous) communication via modulated signals of a plurality of frequency bands and information B2502 related to support for (simultaneous) communication via modulated signals of a plurality of channels.

The AP receives "information B2501 related to support for (simultaneous) communication via modulated signals of a plurality of frequency bands" that is transmitted by a repeater. Upon the AP knowing that it supports this communication, the AP transmits modulated signals of a plurality of frequency bands, as described in Embodiment B1 through Embodiment B6.

The AP receives "information B2502 related to support for (simultaneous) communication via modulated signals of a plurality of channels" that is transmitted by a repeater. Upon the AP knowing that it supports this communication, the AP transmits modulated signals of a plurality of channels, as described in Embodiment B1 through Embodiment B6.

A repeater receives "information B2501 related to support for (simultaneous) communication via modulated signals of a plurality of frequency bands" that is transmitted by the terminal. Upon the repeater knowing that it supports this communication, the repeater transmits modulated signals so that the terminal can receive modulated signals of a plurality of frequency bands, as described in Embodiment B1 through Embodiment B6.

A repeater receives "information B2502 related to support for (simultaneous) communication via modulated signals of a plurality of channels" that is transmitted by the terminal. Upon the repeater knowing that it supports this communication, the repeater transmits modulated signals so that the terminal can receive modulated signals of a plurality of channels, as described in Embodiment B1 through Embodiment B6.

Note that there are also cases in which the AP and the terminal communicate. The following occurs in such cases.

The AP receives "information B2501 related to support for (simultaneous) communication via modulated signals of a plurality of frequency bands" that is transmitted by the terminal. Upon the AP knowing that it supports this communication, the AP transmits modulated signals of a plurality of frequency bands, as described in Embodiment B1 through Embodiment B6.

The AP receives "information B2502 related to support for (simultaneous) communication via modulated signals of a plurality of channels" that is transmitted by the terminal. Upon the AP knowing that it supports this communication, the AP transmits modulated signals of a plurality of channels, as described in Embodiment B1 through Embodiment B6.

The terminal receives "information B2501 related to support for (simultaneous) communication via modulated signals of a plurality of frequency bands" that is transmitted by the AP. Upon the terminal knowing that it supports this communication, the terminal transmits modulated signals of a plurality of frequency bands, as described in Embodiment B1 through Embodiment B6.

The terminal receives "information B2502 related to support for (simultaneous) communication via modulated signals of a plurality of channels" that is transmitted by the AP. Upon the terminal knowing that it supports this communication, the terminal transmits modulated signals of a plurality of channels, as described in Embodiment B1 through Embodiment B6.

The following configurations are also acceptable.

For example, the AP, repeaters, and terminal transmit information for notifying whether (simultaneous) reception via modulated signals of a plurality of frequency bands is supported or not. This is illustrated in FIG. 109A.

Figure 109A:
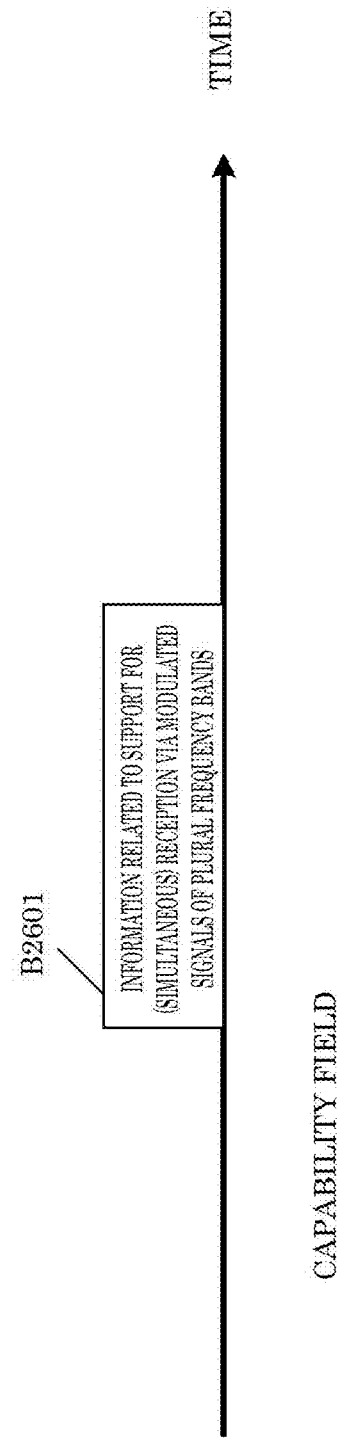
FIG. 109A illustrates one example of information transmission time.

In FIG. 109A, time is represented on the horizontal axis. For example, the capability field is illustrated in FIG. 109A. Part of the capability field includes information B2601 related to support for (simultaneous) reception via modulated signals of a plurality of frequency bands. Information B2601 related to support for (simultaneous) reception via modulated signals of a plurality of frequency bands is information for notifying whether (simultaneous) reception via modulated signals of a plurality of frequency bands is supported or not. However, information B2601 related to support for (simultaneous) reception via modulated signals of a plurality of frequency bands may be transmitted outside of the capability field.

For example, the AP, repeaters, and terminal transmit information for notifying whether (simultaneous) reception via modulated signals of a plurality of channels is supported or not. This is illustrated in FIG. 109B.

In FIG. 109B, time is represented on the horizontal axis. For example, the capability field is illustrated in FIG. 109B. Part of the capability field includes information B2602 related to support for (simultaneous) reception via modulated signals of a plurality of channels. Information B2602 related to support for (simultaneous) reception via modulated signals of a plurality of channels is information for notifying whether (simultaneous) reception via modulated signals of a plurality of channels is supported or not. However, information B2602 related to support for (simultaneous) reception via modulated signals of a plurality of channels may be transmitted outside of the capability field.

For example, the AP, repeaters, and terminal transmit information for notifying whether (simultaneous) transmission via modulated signals of a plurality of frequency bands is supported or not. This is illustrated in FIG. 110A.

In FIG. 110A, time is represented on the horizontal axis. For example, the capability field is illustrated in FIG. 110A. Part of the capability field includes information B2701 related to support for (simultaneous) transmission via modulated signals of a plurality of frequency bands. Information B2701 related to support for (simultaneous) transmission via modulated signals of a plurality of frequency bands is information for notifying whether (simultaneous) transmission via modulated signals of a plurality of frequency bands is supported or not. However, information B2701 related to support for (simultaneous) transmission via modulated signals of a plurality of frequency bands may be transmitted outside of the capability field.

For example, the AP, repeaters, and terminal transmit information for notifying whether (simultaneous) transmission via modulated signals of a plurality of channels is supported or not. This is illustrated in FIG. 110B.

Figure 110B:
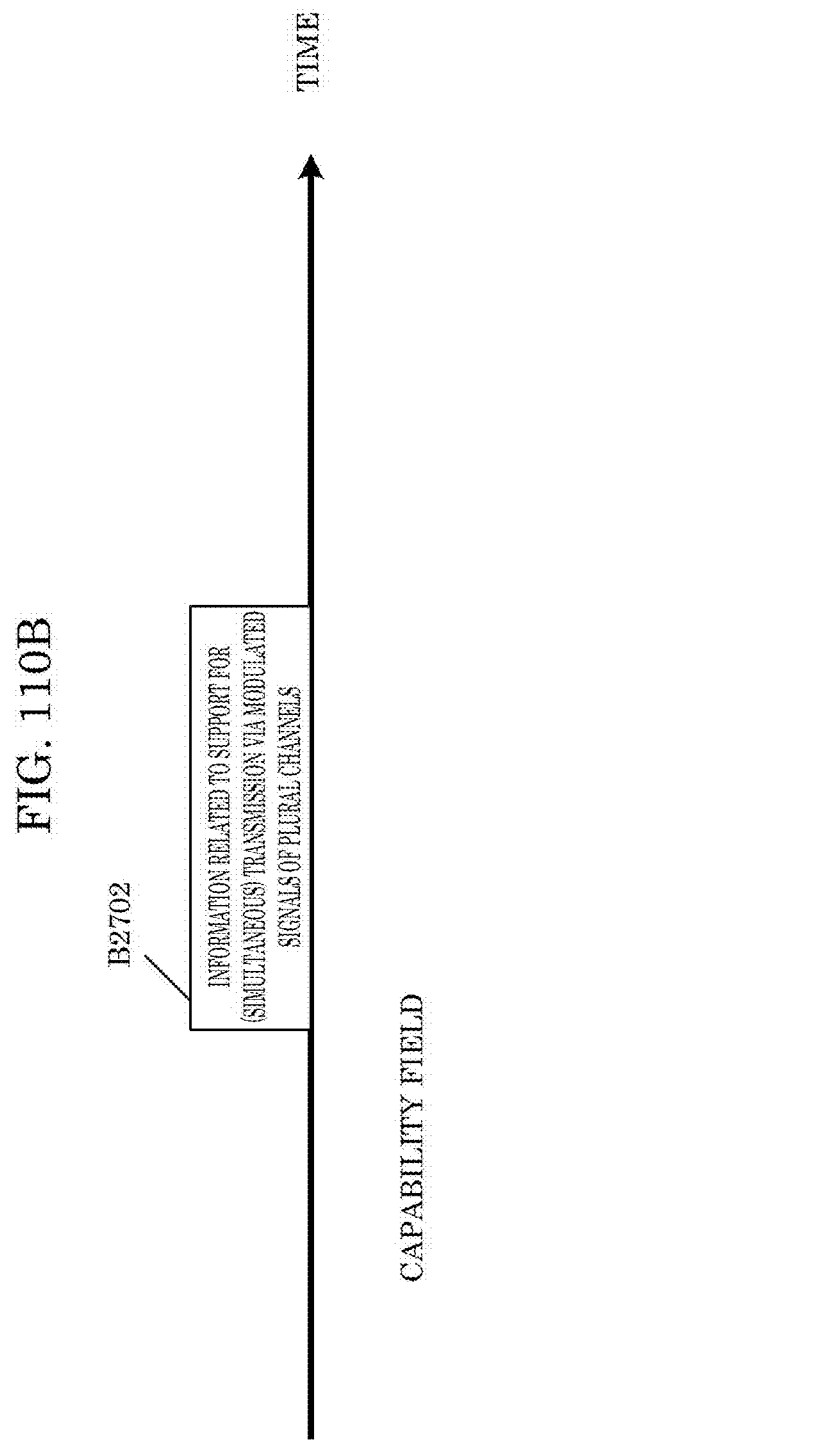
FIG. 110B illustrates one example of information transmission time.

In FIG. 110B, time is represented on the horizontal axis. For example, the capability field is illustrated in FIG. 110B. Part of the capability field includes information B2702 related to support for (simultaneous) transmission via modulated signals of a plurality of channels. Information B2702 related to support for (simultaneous) transmission via modulated signals of a plurality of channels is information for notifying whether (simultaneous) transmission via modulated signals of a plurality of channels is supported or not. However, information B2702 related to support for (simultaneous) transmission via modulated signals of a plurality of channels may be transmitted outside of the capability field.

The AP may transmit information B2601 related to support for (simultaneous) reception via modulated signals of a plurality of frequency bands and information B2701 related to support for (simultaneous) transmission via modulated signals of a plurality of frequency bands.

The AP may transmit information B2602 related to support for (simultaneous) reception via modulated signals of a plurality of channels and information B2702 related to support for (simultaneous) transmission via modulated signals of a plurality of channels.

The AP may transmit information B2601 related to support for (simultaneous) reception via modulated signals of a plurality of frequency bands, information B2701 related to support for (simultaneous) transmission via modulated signals of a plurality of frequency bands, information B2602 related to support for (simultaneous) reception via modulated signals of a plurality of channels, and information B2702 related to support for (simultaneous) transmission via modulated signals of a plurality of channels.

A repeater may transmit information B2601 related to support for (simultaneous) reception via modulated signals of a plurality of frequency bands and information B2701 related to support for (simultaneous) transmission via modulated signals of a plurality of frequency bands.

A repeater may transmit information B2602 related to support for (simultaneous) reception via modulated signals of a plurality of channels and information B2702 related to support for (simultaneous) transmission via modulated signals of a plurality of channels.

A repeater may transmit information B2601 related to support for (simultaneous) reception via modulated signals of a plurality of frequency bands, information B2701 related to support for (simultaneous) transmission via modulated signals of a plurality of frequency bands, information B2602 related to support for (simultaneous) reception via modulated signals of a plurality of channels, and information B2702 related to support for (simultaneous) transmission via modulated signals of a plurality of channels.

The terminal may transmit information B2601 related to support for (simultaneous) reception via modulated signals of a plurality of frequency bands and information B2701 related to support for (simultaneous) transmission via modulated signals of a plurality of frequency bands.

The terminal may transmit information B2602 related to support for (simultaneous) reception via modulated signals of a plurality of channels and information B2702 related to support for (simultaneous) transmission via modulated signals of a plurality of channels.

The terminal may transmit information B2601 related to support for (simultaneous) reception via modulated signals of a plurality of frequency bands, information B2701 related to support for (simultaneous) transmission via modulated signals of a plurality of frequency bands, information B2602 related to support for (simultaneous) reception via modulated signals of a plurality of channels, and information B2702 related to support for (simultaneous) transmission via modulated signals of a plurality of channels.

The AP receives "information B2601 related to support for (simultaneous) reception via modulated signals of a plurality of frequency bands" that is transmitted by a repeater. Upon the AP knowing that it supports this reception, the AP transmits modulated signals of a plurality of frequency bands, as described in Embodiment B1 through Embodiment B6.

The AP receives "information B2602 related to support for (simultaneous) reception via modulated signals of a plurality of channels" that is transmitted by a repeater. Upon the AP knowing that it supports this reception, the AP transmits modulated signals of a plurality of channels, as described in Embodiment B1 through Embodiment B6.

A repeater receives "information B2601 related to support for (simultaneous) reception via modulated signals of a plurality of frequency bands" that is transmitted by the terminal. Upon the repeater knowing that it supports this reception, the repeater transmits modulated signals so that the terminal can receive modulated signals of a plurality of frequency bands, as described in Embodiment B1 through Embodiment B6.

A repeater receives "information B2602 related to support for (simultaneous) reception via modulated signals of a plurality of channels" that is transmitted by the terminal. Upon the repeater knowing that it supports this reception, the repeater transmits modulated signals so that the terminal can receive modulated signals of a plurality of channels, as described in Embodiment B1 through Embodiment B6.

The terminal receives "information B2701 related to support for (simultaneous) transmission via modulated signals of a plurality of frequency bands" that is transmitted by a repeater. Upon the terminal knowing that it supports this transmission, the terminal determines that reception of modulated signals of a plurality of frequency bands is required, as described in Embodiment B1 through Embodiment B6.

The terminal receives "information B2702 related to support for (simultaneous) transmission via modulated signals of a plurality of channels" that is transmitted by a repeater. Upon the terminal knowing that it supports this transmission, the terminal determines that reception of modulated signals of a plurality of channels is required, as described in Embodiment B1 through Embodiment B6.

The AP receives "information B2701 related to support for (simultaneous) transmission via modulated signals of a plurality of frequency bands" that is transmitted by a repeater. Upon the AP knowing that it supports this transmission, the AP determines that reception of modulated signals of a plurality of frequency bands is required, as described in Embodiment B1 through Embodiment B6.

The AP receives "information B2702 related to support for (simultaneous) transmission via modulated signals of a plurality of channels" that is transmitted by a repeater. Upon the AP knowing that it supports this transmission, the AP determines that reception of modulated signals of a plurality of channels is required, as described in Embodiment B1 through Embodiment B6.

A repeater receives "information B2701 related to support for (simultaneous) transmission via modulated signals of a plurality of frequency bands" that is transmitted by the terminal. Upon the repeater knowing that it supports this transmission, the repeater determines that reception of modulated signals of a plurality of frequency bands is required, as described in Embodiment B1 through Embodiment B6.

A repeater receives "information B2702 related to support for (simultaneous) transmission via modulated signals of a plurality of channels" that is transmitted by the terminal. Upon the repeater knowing that it supports this transmission, the repeater determines that reception of modulated signals of a plurality of channels is required, as described in Embodiment B1 through Embodiment B6.

A repeater receives "information B2701 related to support for (simultaneous) transmission via modulated signals of a plurality of frequency bands" that is transmitted by the AP. Upon the repeater knowing that it supports this transmission, the repeater determines that reception of modulated signals of a plurality of frequency bands is required, as described in Embodiment B1 through Embodiment B6.

A repeater receives "information B2702 related to support for (simultaneous) transmission via modulated signals of a plurality of channels" that is transmitted by the AP. Upon the repeater knowing that it supports this transmission, the repeater determines that reception of modulated signals of a plurality of channels is required, as described in Embodiment B1 through Embodiment B6.

Note that there are also cases in which the AP and the terminal communicate. The following occurs in such cases.

The AP receives "information B2601 related to support for (simultaneous) reception via modulated signals of a plurality of frequency bands" that is transmitted by the terminal. Upon the AP knowing that it supports this reception, the AP transmits modulated signals of a plurality of frequency bands, as described in Embodiment B1 through Embodiment B6.

The AP receives "information B2602 related to support for (simultaneous) reception via modulated signals of a plurality of channels" that is transmitted by the terminal. Upon the AP knowing that it supports this reception, the AP transmits modulated signals of a plurality of channels, as described in Embodiment B1 through Embodiment B6.

The terminal receives "information B2601 related to support for (simultaneous) reception via modulated signals of a plurality of frequency bands" that is transmitted by the AP. Upon the terminal knowing that it supports this reception, the terminal transmits modulated signals so that the terminal can receive modulated signals of a plurality of frequency bands, as described in Embodiment B1 through Embodiment B6.

The terminal receives "information B2602 related to support for (simultaneous) reception via modulated signals of a plurality of channels" that is transmitted by the AP. Upon the terminal knowing that it supports this reception, the terminal transmits modulated signals so that the terminal can receive modulated signals of a plurality of channels, as described in Embodiment B1 through Embodiment B6.

The method of repeating the modulated signals used by a repeater is not limited to the methods described in Embodiment B1 through Embodiment B6.

For example, a repeater may receive a first modulated signal, and transmit a modulated signal corresponding to the first modulated signal, using the same frequency as the frequency used by the first modulated signal.

However, when a repeater receives a first modulated signal and a second modulated signal, and upon repeating the modulated signals, transmits a third modulated signal corresponding to the first modulated signal and a fourth modulated signal corresponding to the second modulated signal, the frequency used by the third modulated signal and the frequency used by the fourth modulated signal are different, or the channel used by the third modulated signal and the channel used by the fourth modulated signal are different.

Embodiment B8

Embodiment B1 described a case in which, in FIG. 84, a repeater communicates with a single terminal. The present embodiment will describe a case in which a repeater transmits a modulated signal to a plurality of terminals.

Figure 111:
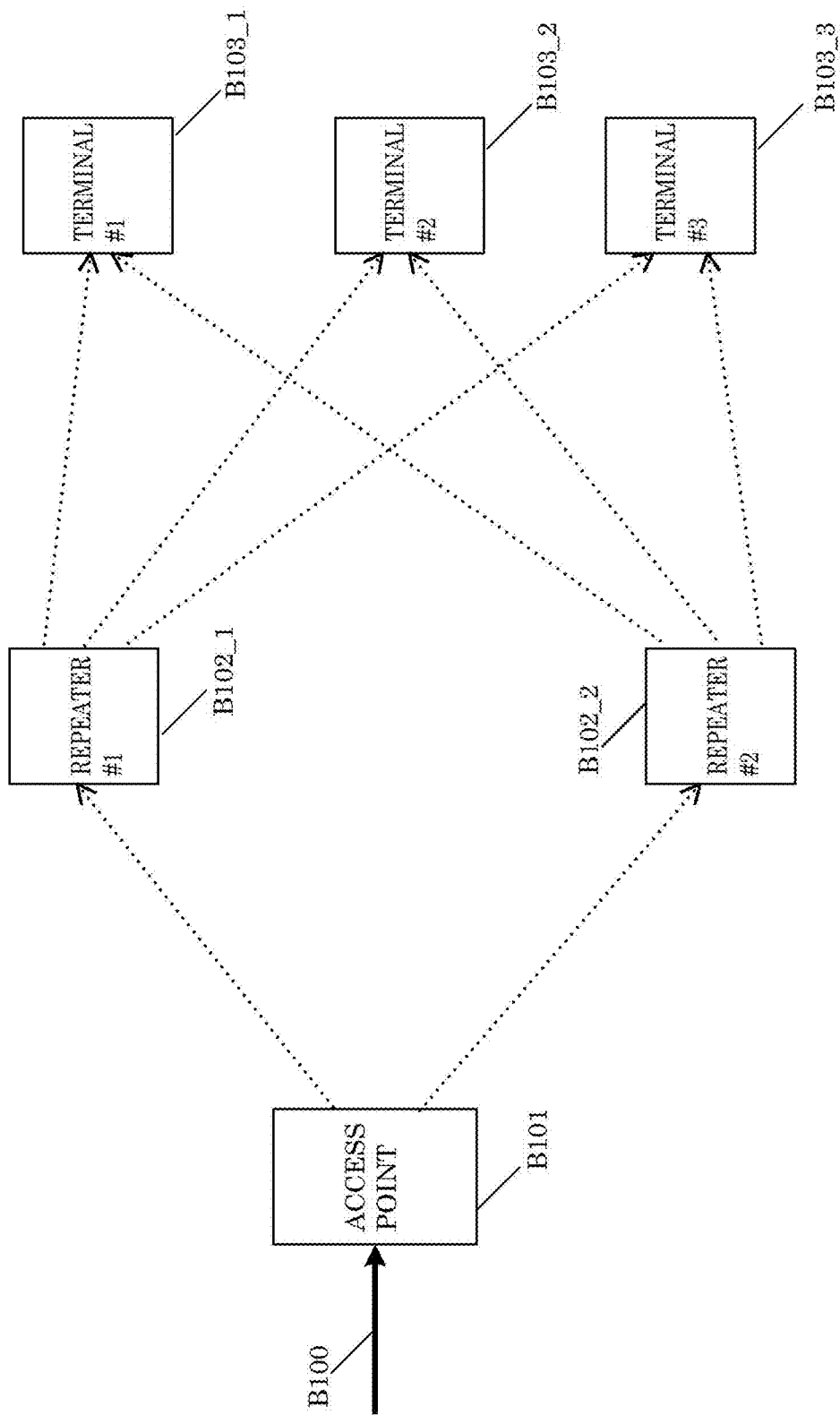
FIG. 111 illustrates one example of a system configuration.

FIG. 111 illustrates an example of a state according to the present embodiment of access point (AP) B101, repeaters B102_1 and B102_2, terminal #1 labeled B103_1, terminal #2 labeled B103_2, and terminal #3 labeled B103_3. In FIG. 111, elements that operate the same as those in FIG. 84 share like reference signs. The characterizing feature is that terminal #1 labeled B103_1, terminal #2 labeled B103_2, and terminal #3 labeled B103_3 are present.

Examples of configurations of a transmission frame transmitted by AP B101 are illustrated in FIG. 85, FIG. 86, and FIG. 87. As the method used by the AP to transmit modulated signals has already been described in Embodiment B1, repeated description will be omitted in this embodiment.

Examples of configurations of a transmission frame transmitted by repeater #1 labeled B102_1 and repeater #2 labeled B102_2 are illustrated in FIG. 88, FIG. 89, and FIG. 90. As the method used by repeater #1 labeled B102_1 to transmit modulated signals and the method used by repeater #2 labeled B102_2 to transmit modulated signals have already been described in Embodiment B1, repeated description will be omitted in this embodiment.

Moreover, as the configuration of access point (AP) B101, the configuration of repeaters B102_1 and B102_2, the configuration of terminal #1 labeled B103_1, terminal #2 labeled B103_2, and terminal #3 labeled B103_3 have already been described in Embodiment B1, repeated description will be omitted in this embodiment.

The frequency usage method is the same as described in Embodiment B1, and as the method has already been described in detail in Embodiment B1, repeated description will be omitted. Note that "frequency" can be replaced with "channel". As this has already been described in detail in Embodiment B5, repeated description will be omitted.

In the present embodiment, orthogonal frequency division multiple access (OFDMA) is used for the modulated signals transmitted by the AP, OFDMA is used for the modulated signals transmitted by repeater #1, and OFDMA is used for the modulated signals transmitted by repeater #2.

Example

AP B101 transmits a modulated signal in any of the frames illustrated in FIG. 85, FIG. 86, and FIG. 87. Here, the frame configuration in regard to time and frequency of data symbol B203_1 in the frame destined for repeater #1 is the configuration illustrated in FIG. 112A.

Figure 112A:
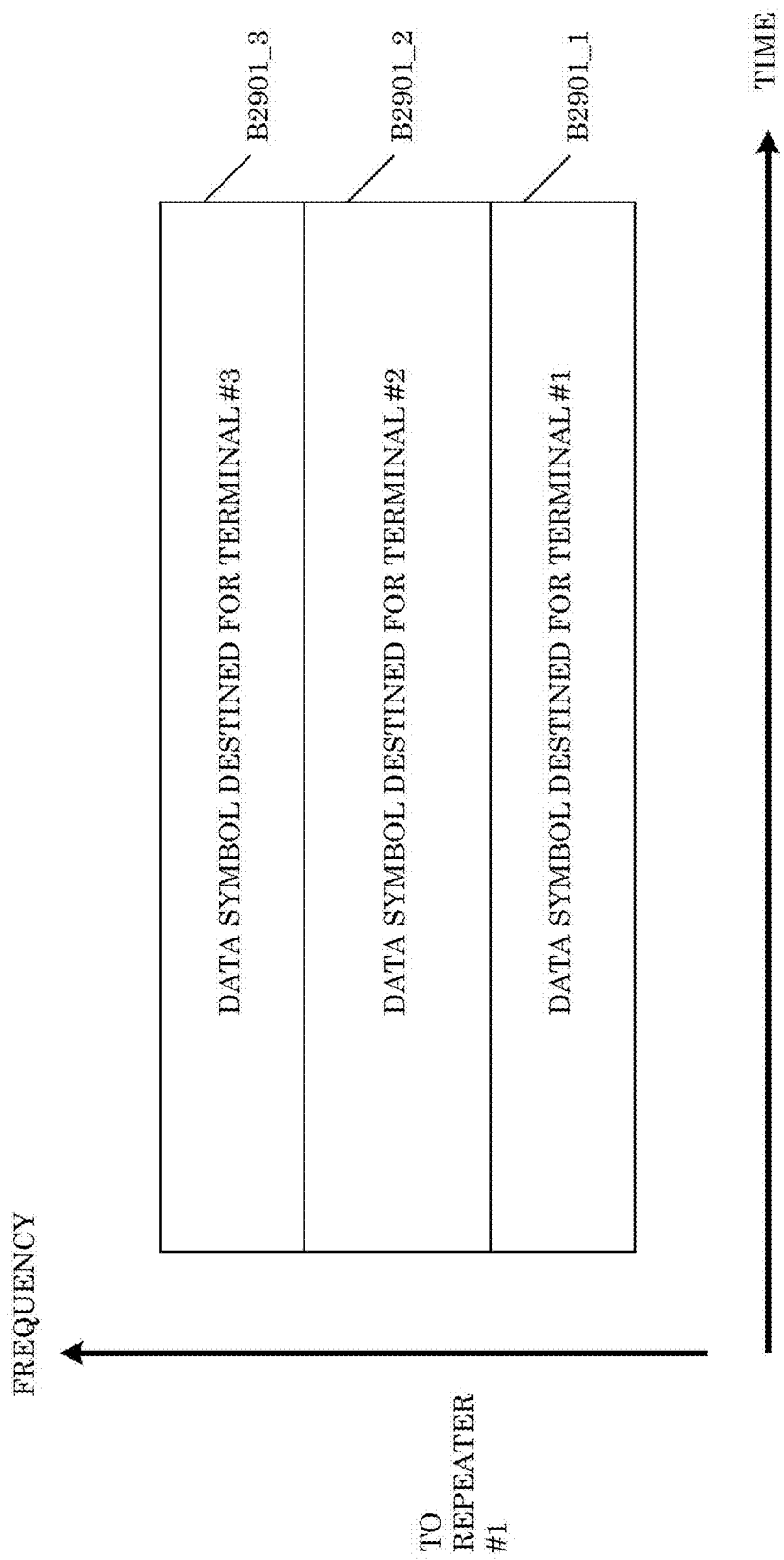
FIG. 112A illustrates one example of frame transmission time and frequency.

In FIG. 112A, time is represented on the horizontal axis, and frequency is (carriers are) represented on the vertical axis.

B2901_1 is a data symbol destined for terminal #1 labeled B103_1, and this data symbol uses one or more carriers. B2901_2 is a data symbol destined for terminal #2 labeled B103_2, and this data symbol uses one or more carriers. B2901_3 is a data symbol destined for terminal #3 labeled B103_3, and this data symbol uses one or more carriers.

Note that the arrangement of data symbol B2901_1 destined for terminal #1 labeled B103_1, data symbol B2901_2 destined for terminal #2 labeled B103_2, and data symbol B2901_3 destined for terminal #3 labeled B103_3 along the frequency axis is not limited to the arrangement illustrated in FIG. 112A. Although the example illustrated in FIG. 112A includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

Figure 112B:
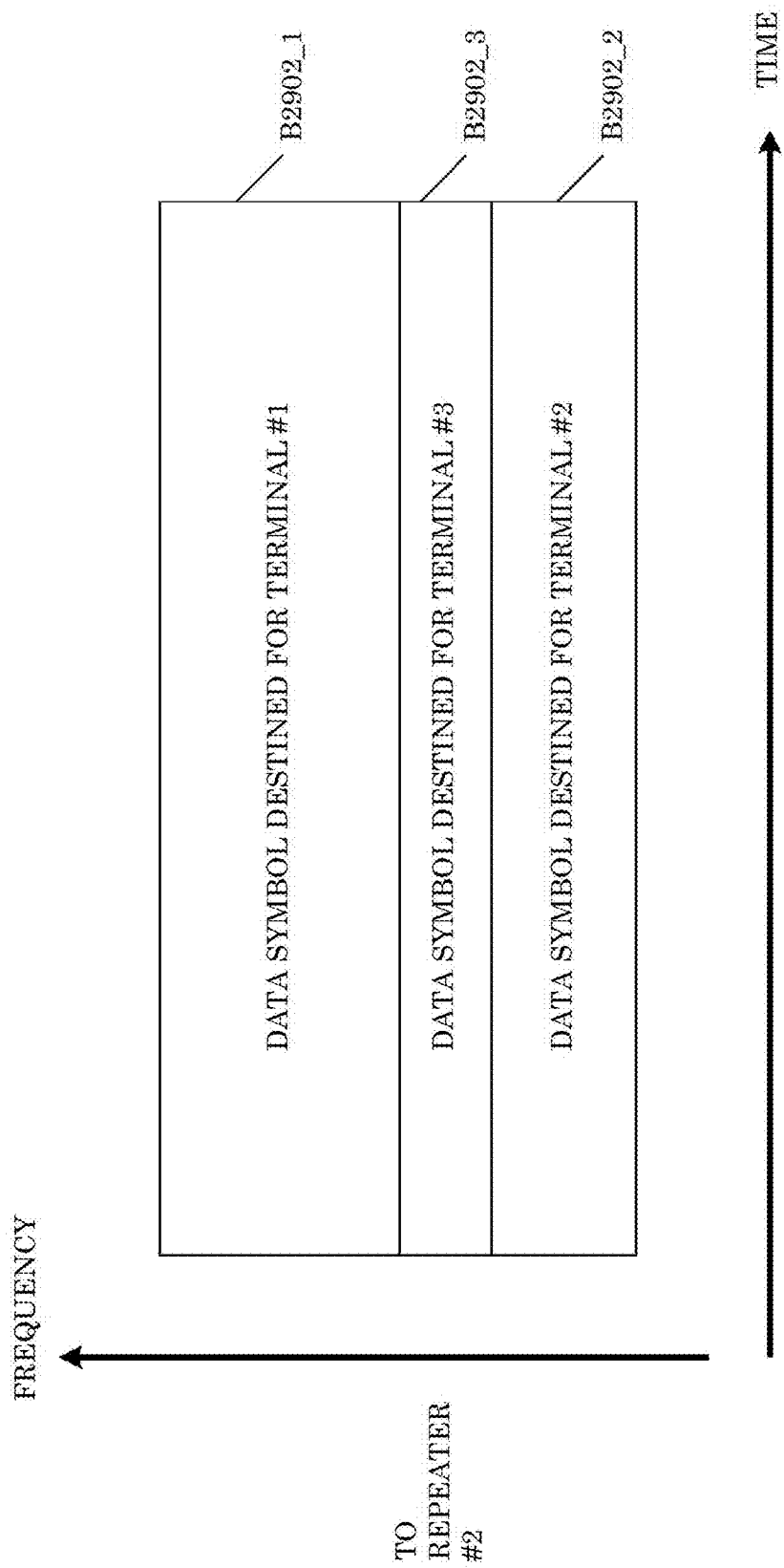
FIG. 112B illustrates one example of frame transmission time and frequency.

FIG. 112B illustrates an example of a frame configuration in regard to time and frequency of data symbol B203_2 in the frame destined for repeater #2 in any one of the frames illustrated in FIG. 85, FIG. 86, and FIG. 87.

In FIG. 112B, time is represented on the horizontal axis, and frequency is (carriers are) represented on the vertical axis.

B2902_1 is a data symbol destined for terminal #1 labeled B103_1, and this data symbol uses one or more carriers.

B2902_2 is a data symbol destined for terminal #2 labeled B103_2, and this data symbol uses one or more carriers. B2902_3 is a data symbol destined for terminal #3 labeled B103_3, and this data symbol uses one or more carriers.

Note that the arrangement of data symbol B2902_1 destined for terminal #1 labeled B103_1, data symbol B2902_2 destined for terminal #2 labeled B103_2, and data symbol B2902_3 destined for terminal #3 labeled B103_3 along the frequency axis is not limited to the arrangement illustrated in FIG. 112B. Although the example illustrated in FIG. 112B includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

Figure 113A:
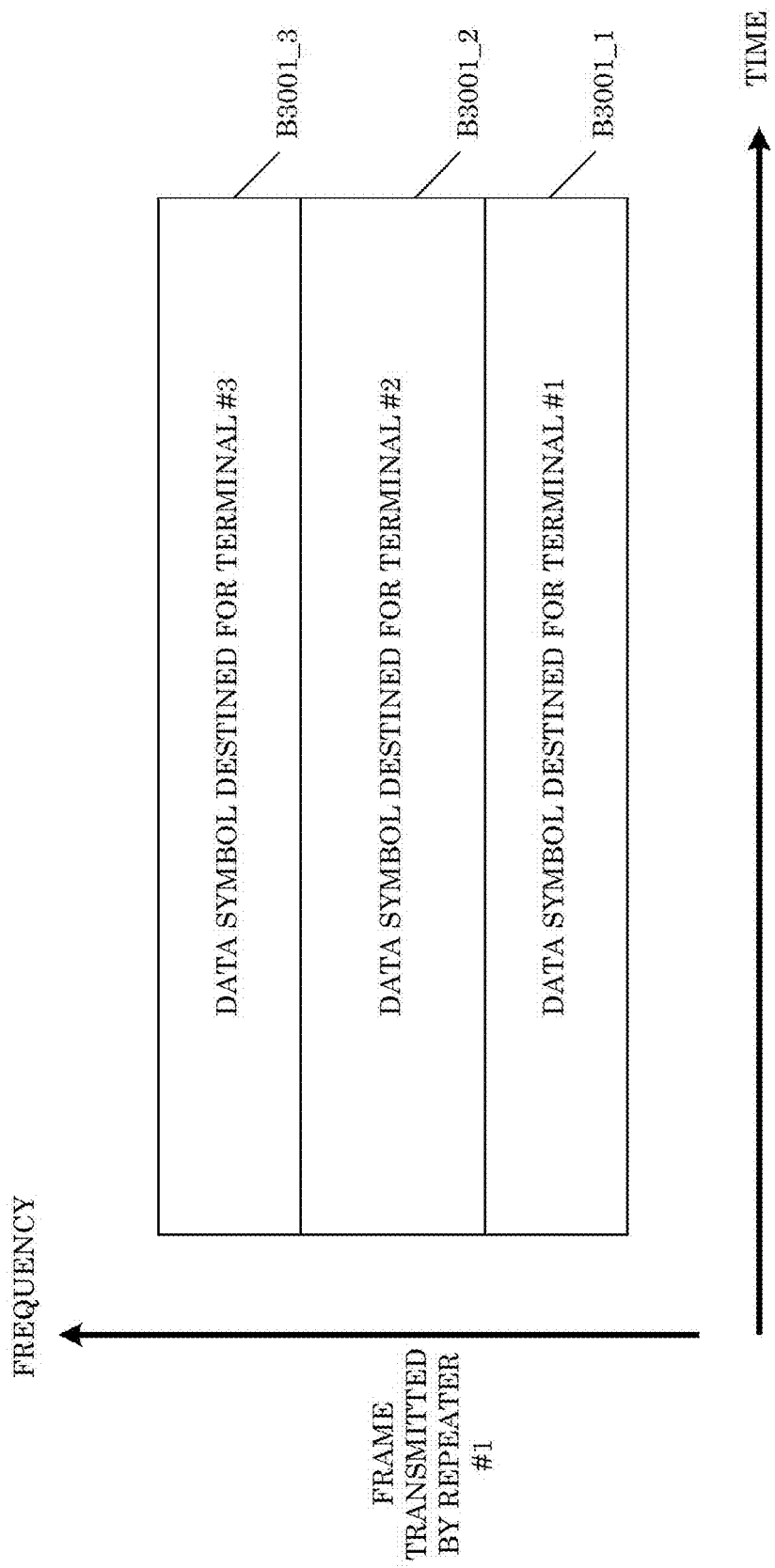
FIG. 113A illustrates one example of frame transmission time and frequency.

In FIG. 111, repeater #1 labeled B102_1 receives a modulated signal transmitted by AP B101, and generates and transmits a modulated signal based on the received modulated signal. Here, the frame of the modulated signal transmitted by repeater #1 labeled B102_1 is any of the frames illustrated in FIG. 88, FIG. 89, and FIG. 90. FIG. 113A illustrates a frame configuration in regard to time and frequency of data symbol B503_1 in the transmission frame of the modulated signal transmitted by repeater #1 labeled B102_1 in FIG. 88, FIG. 89, and FIG. 90.

In FIG. 113A, time is represented on the horizontal axis, and frequency is (carriers are) represented on the vertical axis.

B3001_1 is a data symbol destined for terminal #1 labeled B103_1, and this data symbol uses one or more carriers. B3001_2 is a data symbol destined for terminal #2 labeled B103_2, and this data symbol uses one or more carriers. B3001_3 is a data symbol destined for terminal #3 labeled B103_3, and this data symbol uses one or more carriers.

Note that the arrangement of data symbol B3001_1 destined for terminal #1 labeled B103_1, data symbol B3001_2 destined for terminal #2 labeled B103_2, and data symbol B3001_3 destined for terminal #3 labeled B103_3 along the frequency axis is not limited to the arrangement illustrated in FIG. 113A. Although the example illustrated in FIG. 113A includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

Figure 113B:
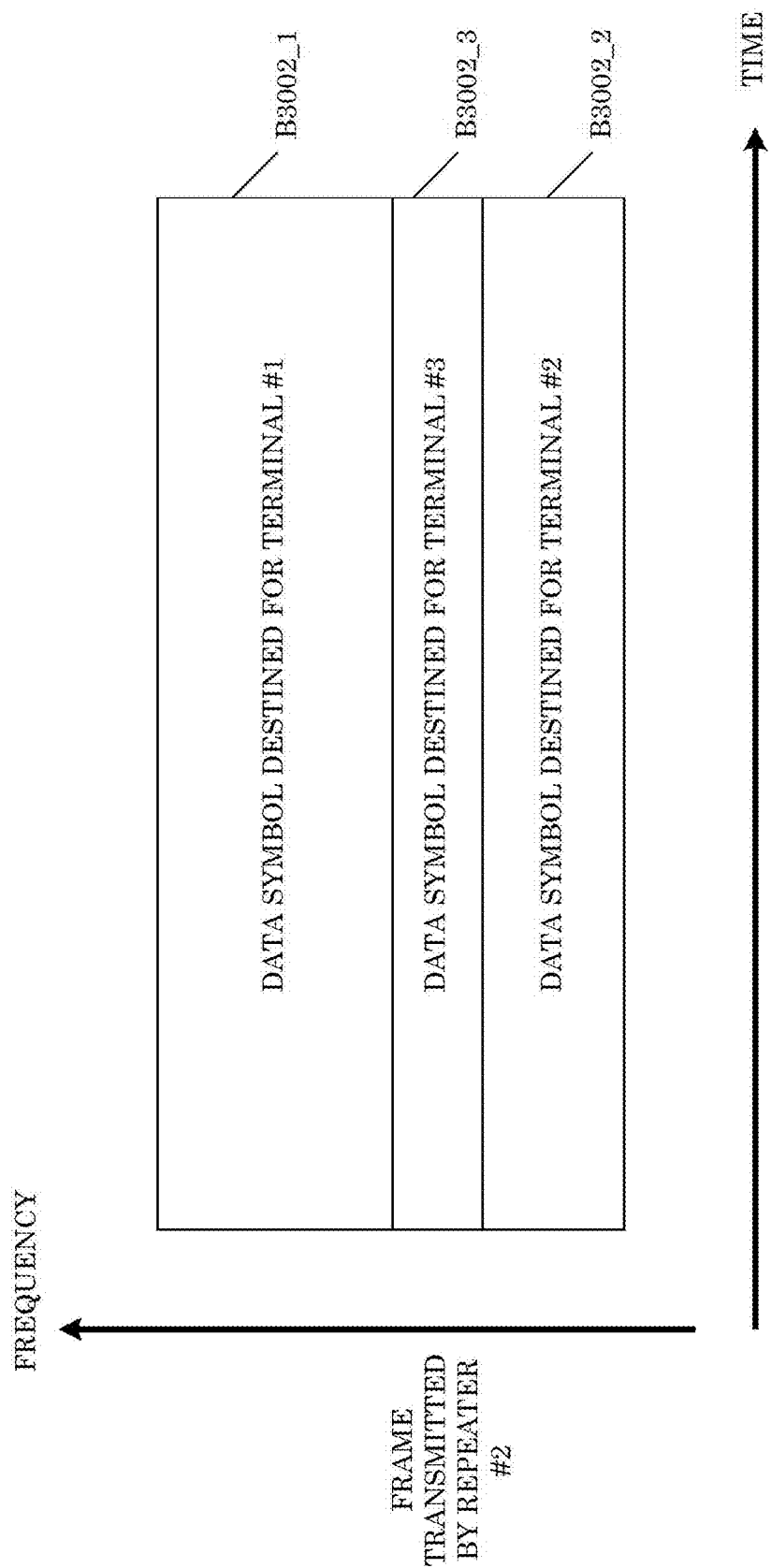
FIG. 113B illustrates one example of frame transmission time and frequency.

FIG. 113B illustrates an example of a frame configuration in regard to time and frequency of data symbol B503_2 in the frame of the modulated signal transmitted by repeater #2 labeled B102_2 in any one of the frames illustrated in FIG. 88, FIG. 89, and FIG. 90.

In FIG. 113B, time is represented on the horizontal axis, and frequency is (carriers are) represented on the vertical axis.

B3002_1 is a data symbol destined for terminal #1 labeled B103_1, and this data symbol uses one or more carriers. B3002_2 is a data symbol destined for terminal #2 labeled B103_2, and this data symbol uses one or more carriers. B3002_3 is a data symbol destined for terminal #3 labeled B103_3, and this data symbol uses one or more carriers.

Note that the arrangement of data symbol B3002_1 destined for terminal #1 labeled B103_1, data symbol B3002_2 destined for terminal #2 labeled B103_2, and data symbol B3002_3 destined for terminal #3 labeled B103_3 along the frequency axis is not limited to the arrangement illustrated in FIG. 113B. Although the example illustrated in FIG. 113B includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

As described above, since terminal #1 labeled B103_1, terminal #2 labeled B103_2, and terminal #3 labeled B103_3 can obtain modulated signals of a plurality of frequency bands, such as a modulated signal of the first frequency band and a modulated signal of the second frequency band, it is possible to achieve the advantageous effect that the transmission amount of data obtained by terminal #1 labeled B103_1, terminal #2 labeled B103_2, and terminal #3 labeled B103_3 can be increased, and further possible to achieve the advantageous effect that data transmission speeds in the system overall can be improved since it is not necessary to implement time division for the transmission frames and the reception frames.

Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented.

Moreover, the frame configurations illustrated in FIG. 85, FIG. 86, FIG. 87, FIG. 88, FIG. 89, and FIG. 90 are non-limiting examples; each frame configuration may include other symbols not illustrated in these figures. For example, a symbol for channel estimation, phase noise estimation, frequency/time synchronization, frequency offset estimation, etc., such as a reference symbol, pilot symbol, or mid-amble or the like, may be included in the frame.

For example, control information symbol B202_1 illustrated in FIG. 85, FIG. 86, and FIG. 87 may include information related to the allocation of data symbol B203_1 to the plurality of terminals (for example, information related to the allocation of data symbols like that illustrated in FIG. 112A to the plurality of terminals). Moreover, control information symbol B202_2 illustrated in FIG. 85, FIG. 86, and FIG. 87 may include information related to the allocation of data symbol B203_2 to the plurality of terminals (for example, information related to the allocation of data symbols like that illustrated in FIG. 112B to the plurality of terminals).

Additionally, control information symbol B502_1 illustrated in FIG. 88, FIG. 89, and FIG. 90 may include information related to the allocation of data symbol B503_1 to the plurality of terminals (for example, information related to the allocation of data symbols like that illustrated in FIG. 113A to the plurality of terminals). Moreover, control information symbol B502_2 illustrated in FIG. 88, FIG. 89, and FIG. 90 may include information related to the allocation of data symbol B503_2 to the plurality of terminals (for example, information related to the allocation of data symbols like that illustrated in FIG. 113B to the plurality of terminals).

Furthermore, in FIG. 112A, although the data symbols destined for the terminals are arranged via frequency division, the data symbols may be arranged via time division along the time axis. In other words, in FIG. 112A, frequency (carriers) may be represented on the horizontal axis, and time may be represented on the vertical axis.

Similarly, in FIG. 112B, although the data symbols destined for the terminals are arranged via frequency division, the data symbols may be arranged via time division along the time axis. In other words, in FIG. 112B, frequency (carriers) may be represented on the horizontal axis, and time may be represented on the vertical axis.

Moreover, in FIG. 113A, although the data symbols destined for the terminals are arranged via frequency division, the data symbols may be arranged via time division along the time axis. In other words, in FIG. 113A, frequency (carriers) may be represented on the horizontal axis, and time may be represented on the vertical axis.

Similarly, in FIG. 113B, although the data symbols destined for the terminals are arranged via frequency division, the data symbols may be arranged via time division along the time axis. In other words, in FIG. 113B, frequency (carriers) may be represented on the horizontal axis, and time may be represented on the vertical axis.

Figure 114:
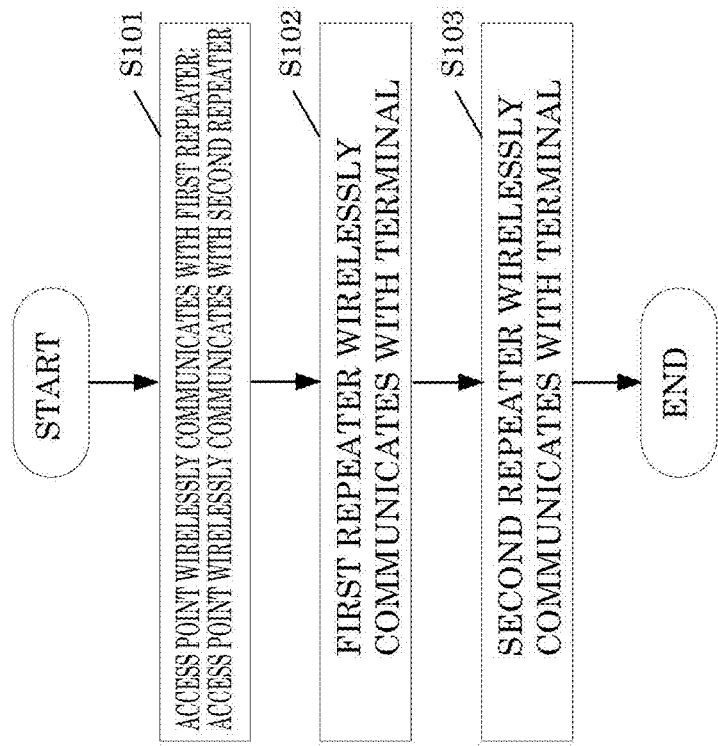

Note that the control method of the communication system shown in Embodiment B1 through Embodiment B8 is as illustrated in FIG. 114.

In step S101, an access point wirelessly communicates with a first repeater on at least a first channel included in a first frequency band, and wirelessly communicates with a second repeater on at least a second channel included in a second frequency band different than the first frequency band.

In step S102, the first repeater wirelessly communicates with a terminal on at least a third channel included in the second frequency band.

In step S103, the second repeater wirelessly communicates with the terminal on at least a fourth channel included in the first frequency band.

This makes it possible to improve upon the performance of the communication system.

Figure 115:
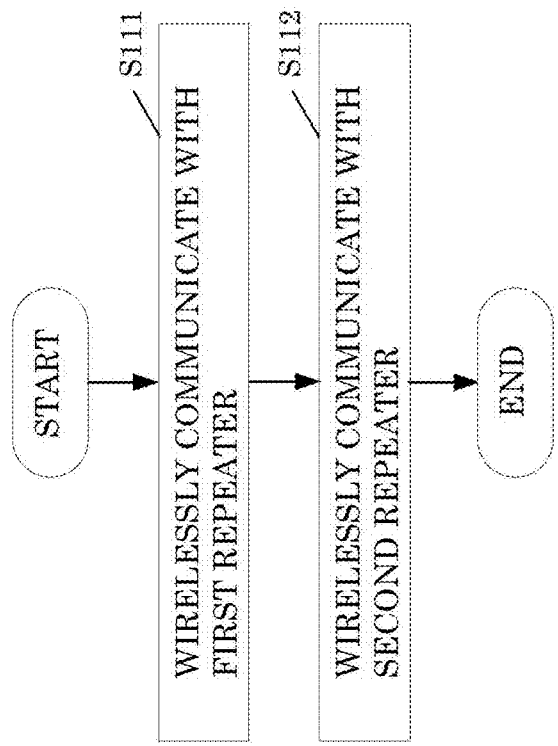

Moreover, the control method of the communication system shown in Embodiment B1 through Embodiment B8 is as illustrated in FIG. 115.

Step S111 includes wirelessly communicating with the first repeater on at least the third channel included in the second frequency band.

Step S112 includes wirelessly communicating with the second repeater on at least the fourth channel included in the first frequency band.

This makes it possible to improve upon the performance of the communication system.

Embodiment B9

Embodiment B1 described a case in which, in FIG. 84, a repeater communicates with a single terminal. The present embodiment will describe a second example of a case in which a repeater transmits a modulated signal to a plurality of terminals.

Figure 116:
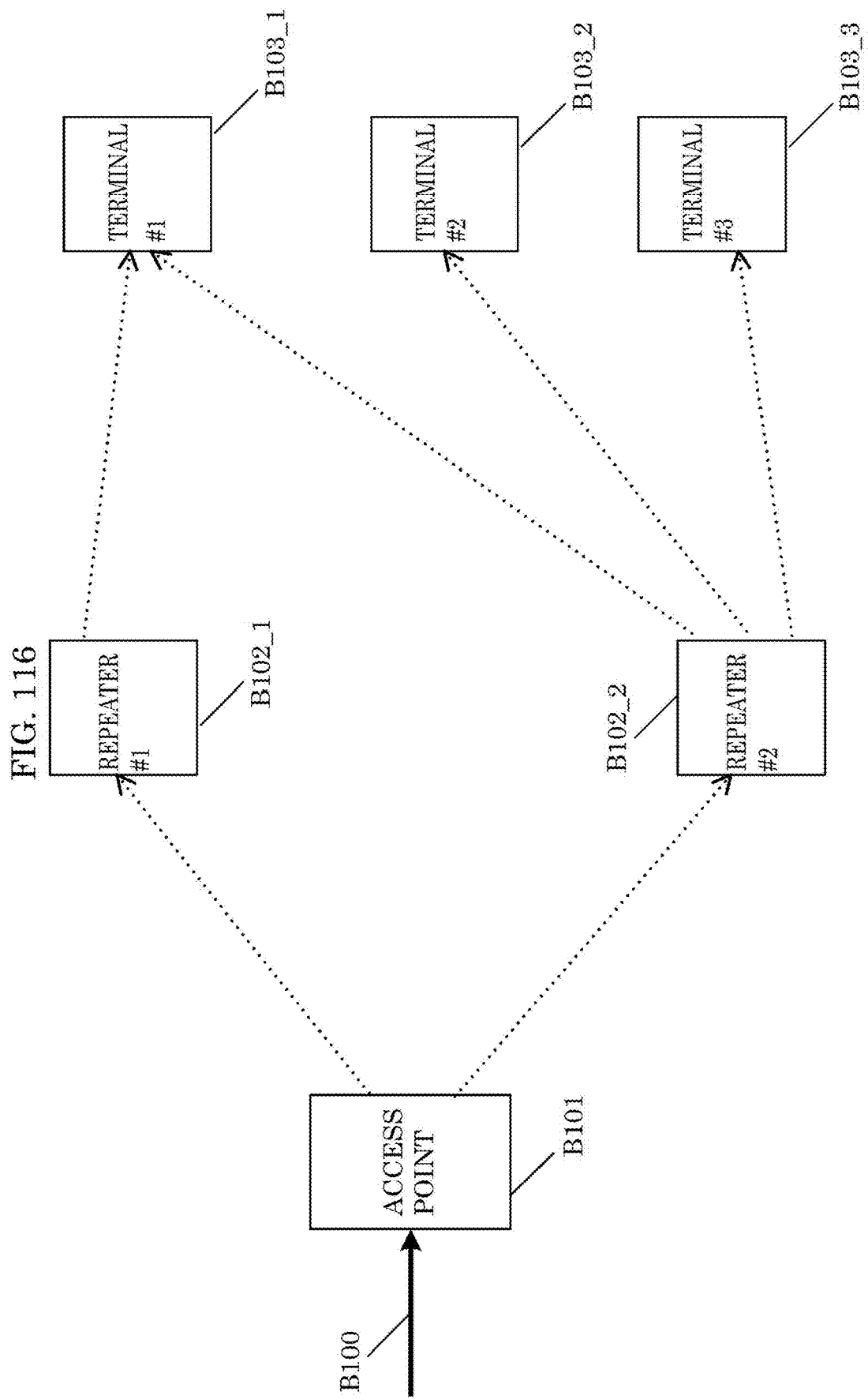

FIG. 116 illustrates an example of a state according to the present embodiment of access point (AP) B101, repeaters B102_1 and B102_2, terminal #1 labeled B103_1, terminal #2 labeled B103_2, and terminal #3 labeled B103_3. In FIG. 116, elements that operate the same as those in FIG. 84 share like reference signs. The characterizing feature is that terminal #1 labeled B103_1, terminal #2 labeled B103_2, and terminal #3 labeled B103_3 are present.

Examples of configurations of a transmission frame transmitted by AP B101 are illustrated in FIG. 85, FIG. 86, and FIG. 87. As the method used by the AP to transmit modulated signals has already been described in Embodiment B1, repeated description will be omitted in this embodiment. The data symbols illustrated in FIG. 85, FIG. 86, and FIG. 87 include one or more of any of a symbol destined for terminal #1 labeled B103_1, a symbol destined for terminal #2 labeled B103_2, and a symbol destined for terminal #3 labeled B103_3. This point can be considered in the same manner in Embodiment B8 as well.

Examples of configurations of a transmission frame transmitted by repeater #1 labeled B102_1 and repeater #2 labeled B102_2 are illustrated in FIG. 88, FIG. 89, and FIG. 90. As the method used by repeater #1 labeled B102_1 to transmit modulated signals and the method used by repeater #2 labeled B102_2 to transmit modulated signals have already been described in Embodiment B1, repeated description will be omitted in this embodiment. The data symbols illustrated in FIG. 88, FIG. 89, and FIG. 90 include one or more of any of a symbol destined for terminal #1 labeled B103_1, a symbol destined for terminal #2 labeled B103_2, and a symbol destined for terminal #3 labeled B103_3. This point can be considered in the same manner in Embodiment B8 as well.

Moreover, as the configuration of access point (AP) B101, the configuration of repeaters B102_1 and B102_2, the configuration of terminal #1 labeled B103_1, terminal #2 labeled B103_2, and terminal #3 labeled B103_3 have already been described in Embodiment B1, repeated description will be omitted in this embodiment.

The frequency usage method is the same as described in Embodiment B1, and as the method has already been described in detail in Embodiment B1, repeated description will be omitted. Note that "frequency" can be replaced with "channel". As this has already been described in detail in Embodiment B5, repeated description will be omitted.

In the example presented in the present embodiment, OFDMA is used in the modulated signal transmitted by the AP, OFDM is used in the modulated signal transmitted by repeater #1, and OFDMA is used in the modulated signal transmitted by repeater #2.

EXAMPLE

AP B101 transmits a modulated signal in any of the frames illustrated in FIG. 85, FIG. 86, and FIG. 87. Here, the frame configuration in regard to time and frequency of data symbol B203_1 in the frame destined for repeater #1 is the configuration illustrated in FIG. 117.

Figure 117:
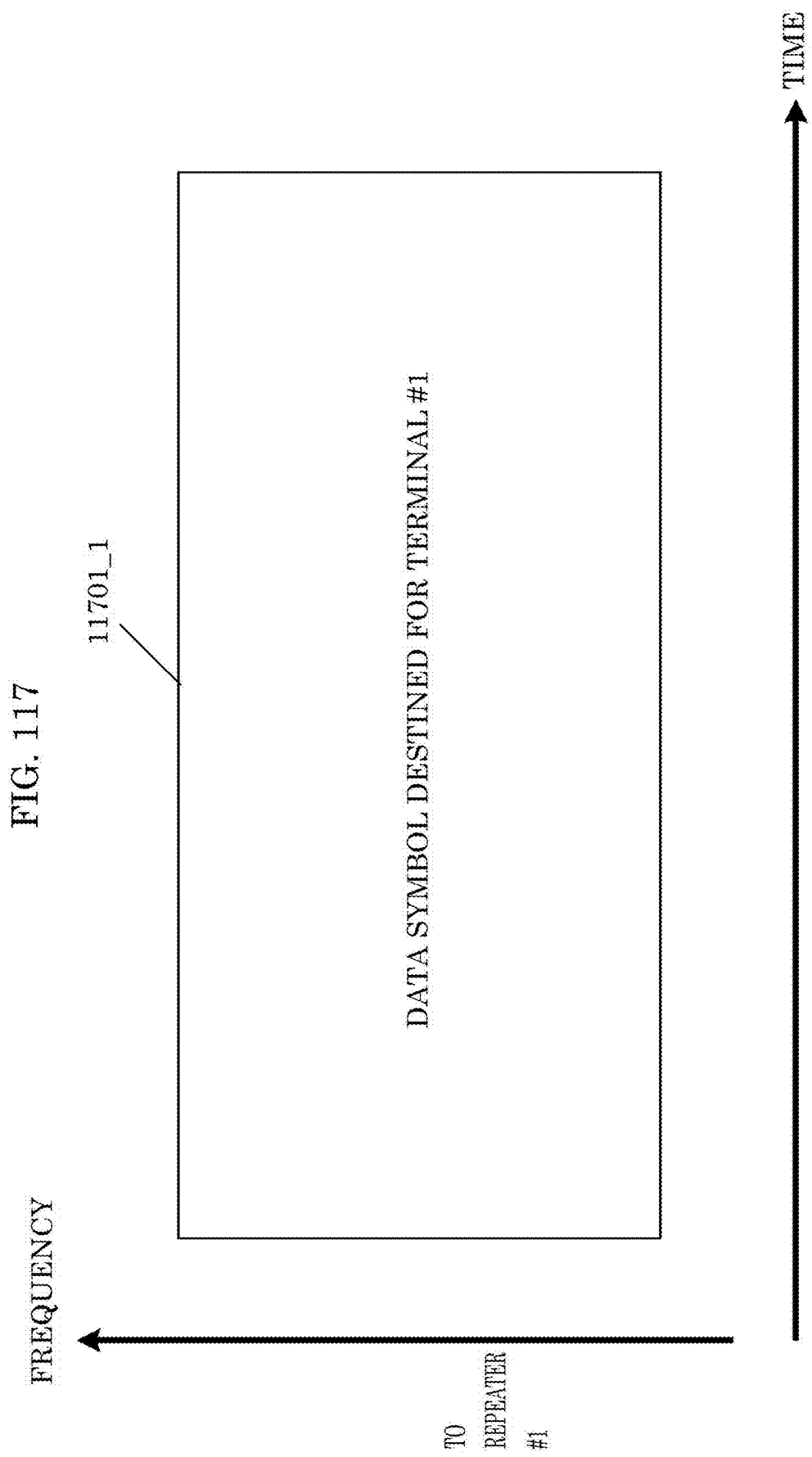

In FIG. 117, time is represented on the horizontal axis, and frequency is (carriers are) represented on the vertical axis.

11701_1 is a data symbol destined for terminal #1 labeled B103_1, and this data symbol uses one or more carriers. The characterizing feature is that OFDMA is not used.

Note that a data symbol for multicast (broadcast) may be present, a control symbol may be present, a pilot symbol (reference symbol) for channel estimation, phase noise, and/or frequency offset estimation, or a null symbol (absence of a symbol) may be present.

Figure 118:
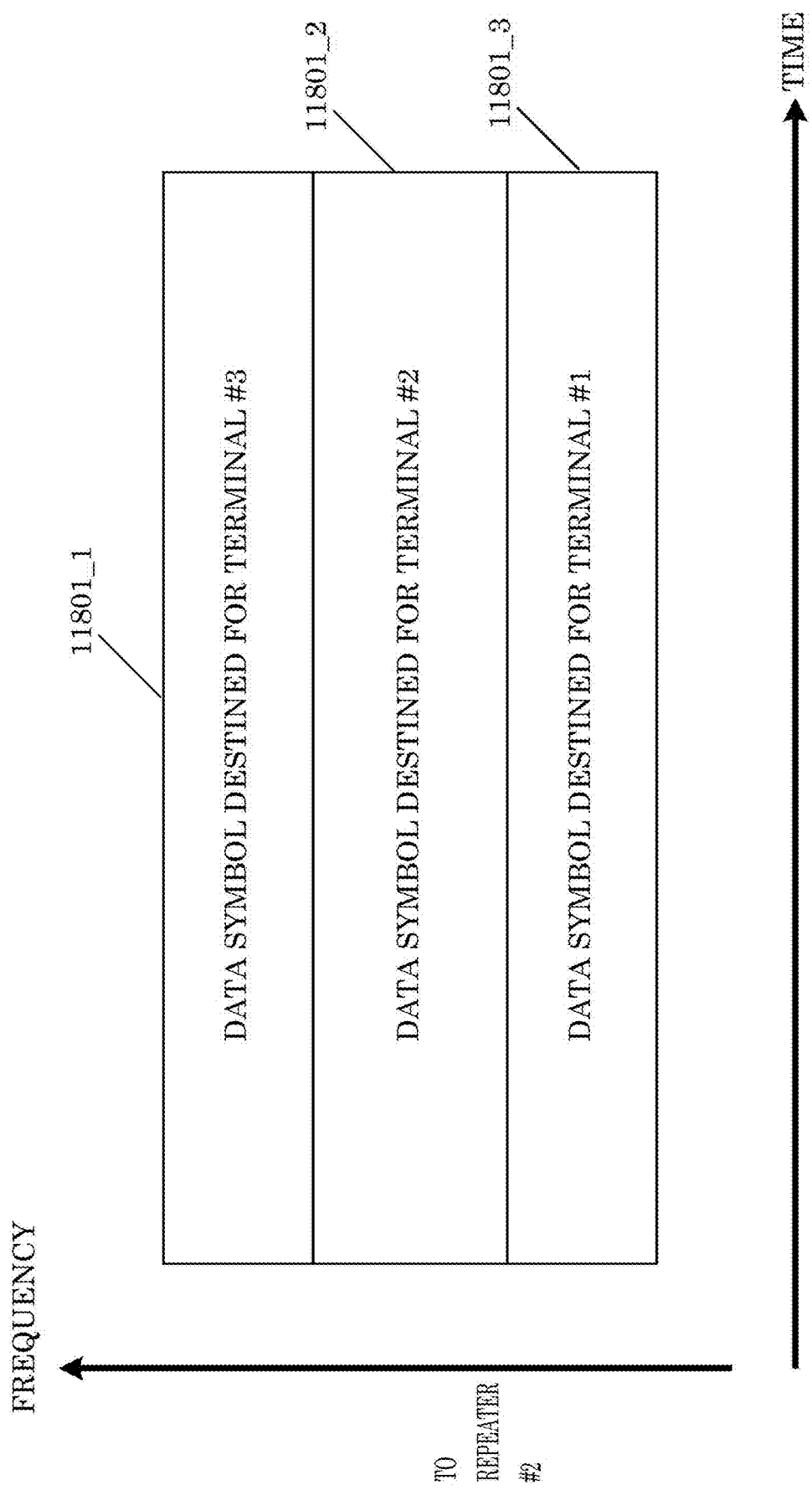

FIG. 118 illustrates an example of a frame configuration in regard to time and frequency of data symbol B203_2 in the frame destined for repeater #2 in any one of the frames illustrated in FIG. 85, FIG. 86, and FIG. 87.

In FIG. 118, time is represented on the horizontal axis, and frequency is (carriers are) represented on the vertical axis.

11801_1 is a data symbol destined for terminal #3 labeled B103_3, and this data symbol uses one or more carriers.
11801_2 is a data symbol destined for terminal #2 labeled B103_2, and this data symbol uses one or more carriers.
11801_3 is a data symbol destined for terminal #1 labeled B103_1, and this data symbol uses one or more carriers.

Note that the arrangement of data symbol 11801_3 destined for terminal #1 labeled B103_1, data symbol 18001_2 destined for terminal #2 labeled B103_2, and data symbol 18001_1 destined for terminal #3 labeled B103_3 along the frequency axis is not limited to the arrangement illustrated in FIG. 118. Although the example illustrated in FIG. 118 includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

In FIG. 116, repeater #1 labeled B102_1 receives a modulated signal transmitted by AP B101, and generates and transmits a modulated signal based on the received modulated signal. Here, the frame of the modulated signal transmitted by repeater #1 labeled B102_1 is any of the frames illustrated in FIG. 88, FIG. 89, and FIG. 90. The data symbols illustrated in FIG. 88, FIG. 89, and FIG. 90 include one or more of any of a symbol destined for terminal #1 labeled B103_1, a symbol destined for terminal #2 labeled B103_2, and a symbol destined for terminal #3 labeled B103_3. This point can be considered in the same manner in Embodiment B8 as well.

Figure 119:
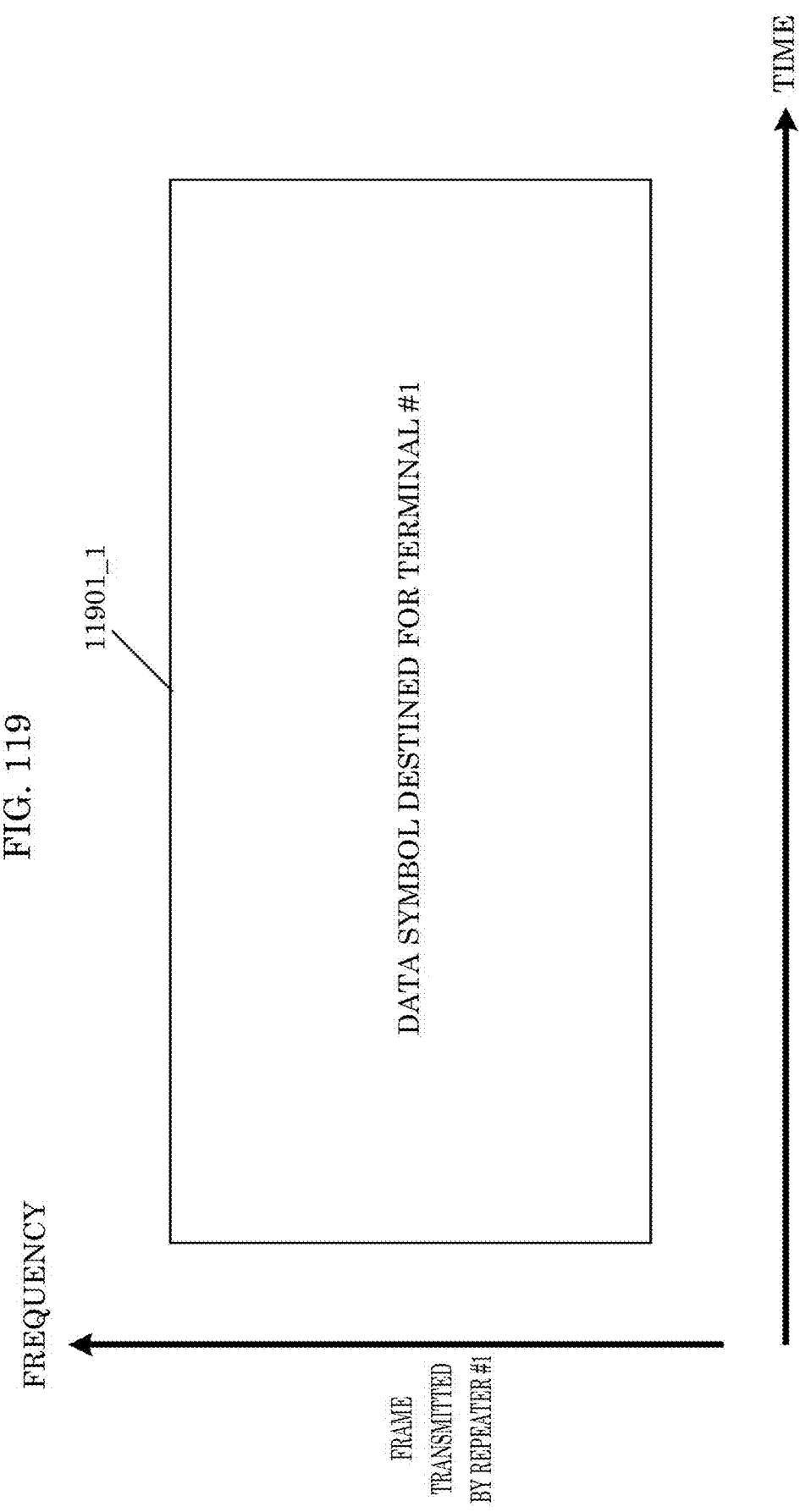

FIG. 119 illustrates a frame configuration in regard to time and frequency of data symbol B503_1 in the transmission frame of the modulated signal transmitted by repeater #1 labeled B102_1 in FIG. 88, FIG. 89, and FIG. 90.

In FIG. 119, time is represented on the horizontal axis, and frequency is (carriers are) represented on the vertical axis.

11901_1 is a data symbol destined for terminal #1 labeled B103_1, and this data symbol uses one or more carriers. The characterizing feature is that OFDMA is not used.

Note that a data symbol for multicast (broadcast) may be present, a control symbol may be present, a pilot symbol (reference symbol) for channel estimation, phase noise, and/or frequency offset estimation, or a null symbol (absence of a symbol) may be present.

Figure 120:
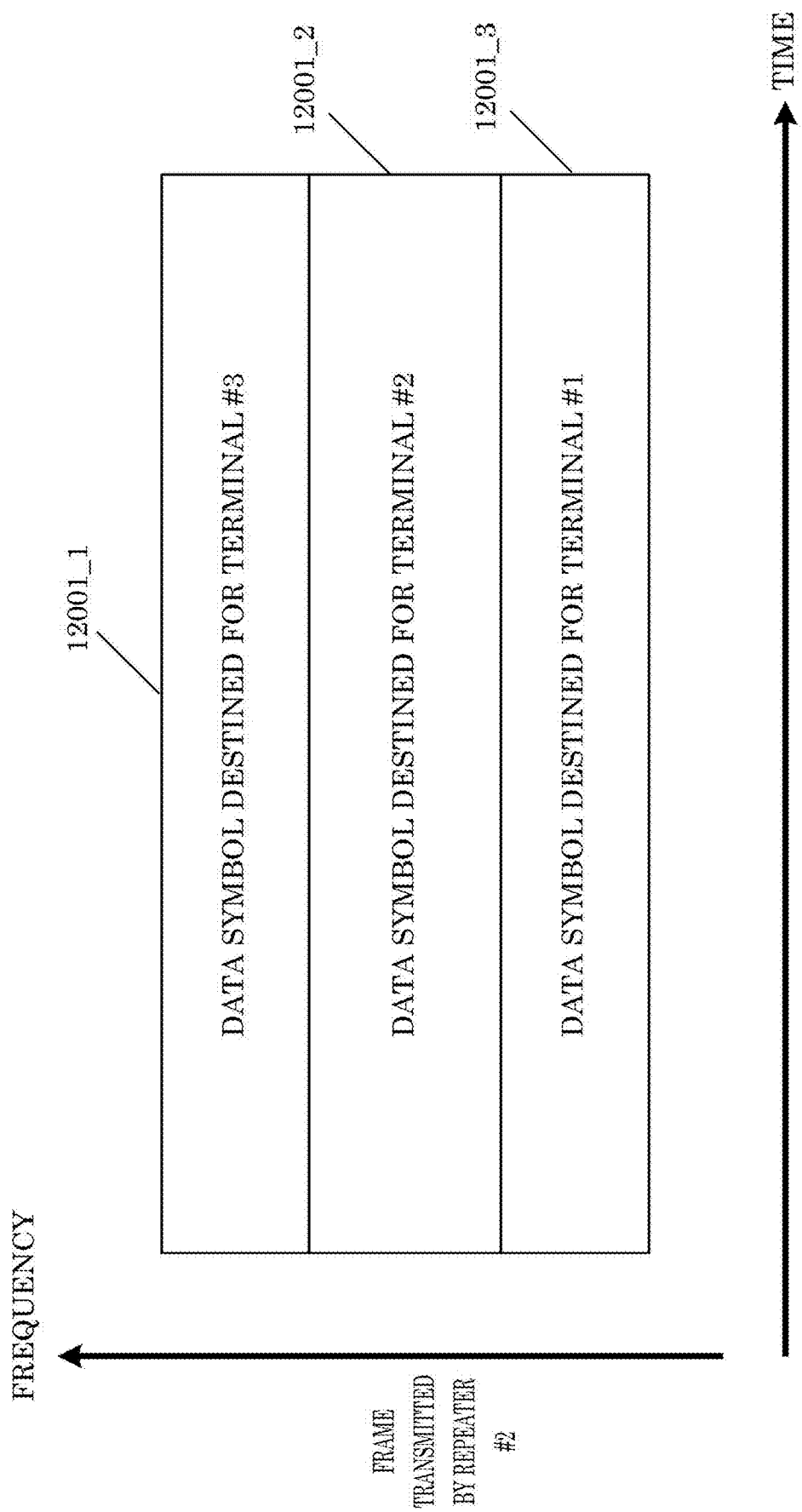

FIG. 120 illustrates an example of a frame configuration in regard to time and frequency of data symbol B503_2 in the frame of the modulated signal transmitted by repeater #2 labeled B102_2 in any one of the frames illustrated in FIG. 88, FIG. 89, and FIG. 90. The data symbols illustrated in FIG. 88, FIG. 89, and FIG. 90 include one or more of any of a symbol destined for terminal #1 labeled B103_1, a symbol destined for terminal #2 labeled B103_2, and a symbol destined for terminal #3 labeled B103_3. This point can be considered in the same manner in Embodiment B8 as well.

In FIG. 120, time is represented on the horizontal axis, and frequency is (carriers are) represented on the vertical axis.

12001_1 is a data symbol destined for terminal #3 labeled B103_3, and this data symbol uses one or more carriers.
12001_2 is a data symbol destined for terminal #2 labeled B103_2, and this data symbol uses one or more carriers.
12001_3 is a data symbol destined for terminal #1 labeled B103_1, and this data symbol uses one or more carriers.

Note that the arrangement of data symbol 12001_3 destined for terminal #1 labeled B103_1, data symbol 12001_2 destined for terminal #2 labeled B103_2, and data symbol 12001_1 destined for terminal #3 labeled B103_3 along the frequency axis is not limited to the arrangement illustrated in FIG. 120. Although the example illustrated in FIG. 120 includes data symbols for three terminals (destined for terminal #1, destined for terminal #2, and destined for terminal #3), it is sufficient so long as there are data symbols for two or more terminals, and moreover, a data symbol for multicast (broadcast) may be present, a control symbol may be present, a pilot symbol (reference symbol) for channel estimation, phase noise, and/or frequency offset estimation, or a null symbol (absence of a symbol) may be present.

As described above, since terminal #1 labeled B103_1, terminal #2 labeled B103_2, and terminal #3 labeled B103_3 can obtain modulated signals of a plurality of frequency bands, such as a modulated signal of the first frequency band and a modulated signal of the second frequency band, it is possible to achieve the advantageous effect that the transmission amount of data obtained by terminal #1 labeled B103_1, terminal #2 labeled B103_2, and terminal #3 labeled B103_3 can be increased, and further possible to achieve the advantageous effect that data transmission speeds in the system overall can be improved since it is not necessary to implement time division for the transmission frames and the reception frames.

By using both OFDM and OFDMA, it is possible to achieve the advantageous effects that it is possible to more flexibly assign symbols to the terminal, and that it is possible to provide more flexible data transmission speeds for each terminal.

Although the terms access point, repeater, and terminal are used in the present embodiment, the access point may be referred to as a base station, communication device, terminal, broadcast station, or node or the like and the present embodiment may be implemented, the repeater may be referred to as a communication device, access point, node, terminal, or base station or the like and the present embodiment may be implemented, and the terminal may be referred to as a communication device, access point, node, or base station or the like and the present embodiment may be implemented.

As a matter of course, in FIG. 117, FIG. 118, FIG. 119, and FIG. 120, a data symbol including one or more data symbols destined for a plurality of destinations may include a null symbol (the absence of a symbol; a symbol in which data is not transmitted), or a symbol for channel estimation, phase noise estimation, frequency/time synchronization, and/or frequency offset estimation, such as a reference symbol, pilot symbol, or mid-amble. This applies to FIG. 112A, FIG. 112B, FIG. 113A, and FIG. 113B as well.

Moreover, the frame configurations illustrated in FIG. 85, FIG. 86, FIG. 87, FIG. 88, FIG. 89, and FIG. 90 are non-limiting examples; each frame configuration may include other symbols not illustrated in these figures. For example, a symbol for channel estimation, phase noise estimation, frequency/time synchronization, frequency offset estimation, etc., such as a reference symbol, pilot symbol, or mid-amble or the like, may be included in the frame. As a matter of course, as described in other embodiments, a null symbol (the absence of a symbol; a symbol in which data is not transmitted) may be present as well.

For example, control information symbol B202_1 illustrated in FIG. 85, FIG. 86, and FIG. 87 may include information related to the allocation of data symbol B203_1 to the plurality of terminals (for example, information related to the allocation of data symbols like that illustrated in FIG. 112A to the plurality of terminals). Moreover, control information symbol B202_2 illustrated in FIG. 85, FIG. 86, and FIG. 87 may include information related to the allocation of data symbol B203_2 to the plurality of terminals (for example, information related to the allocation of data symbols like that illustrated in FIG. 112B to the plurality of terminals).

Additionally, control information symbol B502_1 illustrated in FIG. 88, FIG. 89, and FIG. 90 may include information related to the allocation of data symbol B503_1 to the plurality of terminals (for example, information related to the allocation of data symbols like that illustrated in FIG. 119 to the plurality of terminals). Moreover, control information symbol B502_2 illustrated in FIG. 88, FIG. 89, and FIG. 90 may include information related to the allocation of data symbol B503_2 to the plurality of terminals (for example, information related to the allocation of data symbols like that illustrated in FIG. 120 to the plurality of terminals).

In FIG. 118, although the data symbols destined for the terminals are arranged via frequency division, the data symbols may be arranged via time division along the time axis. In other words, in FIG. 118, frequency (carriers) may be represented on the horizontal axis, and time may be represented on the vertical axis.

In FIG. 120, although the data symbols destined for the terminals are arranged via frequency division, the data symbols may be arranged via time division along the time axis. In other words, in FIG. 120, frequency (carriers) may be represented on the horizontal axis, and time may be represented on the vertical axis.

By allocating favorable frequency resources of symbols transmitted by the terminals to frames as described above, it is possible to achieve the advantageous effect that it is possible to favorably allocate data transmission speeds to each terminal. Moreover, it is possible to achieve the advantageous effect that the quality of data transmission to each terminal can be improved since frequency resources can be allocated so as to achieve diversity gain. These advantageous effects also apply to Embodiment B8.

The allocation of transmission symbols to each terminal is not limited to the examples illustrated in FIG. 117, FIG. 118, FIG. 119, and FIG. 120; other examples include FIG. 112A, FIG. 112B, FIG. 113A, and FIG. 113B described in Embodiment B8.

Although the number of terminals is exemplified as three in FIG. 111 and FIG. 116, the allocation of data symbols of the modulated signal destined for repeater #1 (for example, see FIG. 117), the allocation of data symbols of the modulated signal destined for repeater #2 (for example, see FIG. 118), the allocation of data symbols of the modulated signal transmitted by repeater #1 (for example, see FIG. 119), and the allocation of data symbols of the modulated signal transmitted by repeater #2 (for example, see FIG. 120) may be changed depending on the number of terminals.

Furthermore, the allocation of data symbols of the modulated signal destined for repeater #1 (for example, see FIG. 117), the allocation of data symbols of the modulated signal destined for repeater #2 (for example, see FIG. 118), the allocation of data symbols of the modulated signal transmitted by repeater #1 (for example, see FIG. 119), and the allocation of data symbols of the modulated signal transmitted by repeater #2 (for example, see FIG. 120) may be changed depending on time.

Supplemental Information B3

Embodiment B1 states that repeater #1 labeled B102_1 and repeater #2 labeled B102_2 may each include a function of an access point, that the access point may include a function for operating as repeater #1 labeled B102_1 or repeater #2 labeled B102_2, and that an access point may operate as repeater #1 labeled B102_1 or repeater #2 labeled B102_2. Supplemental information for these points will be described next.

Detailed examples that satisfy "the repeater #1 labeled B102_1 and repeater #2 labeled B102_2 may each include a function of an access point, the access point may include a function for operating as repeater #1 labeled B102_1 or repeater #2 labeled B102_2, and an access point may operate as repeater #1 labeled B102_1 or repeater #2 labeled B102_2" will be given.

Example 1

Figure 121:
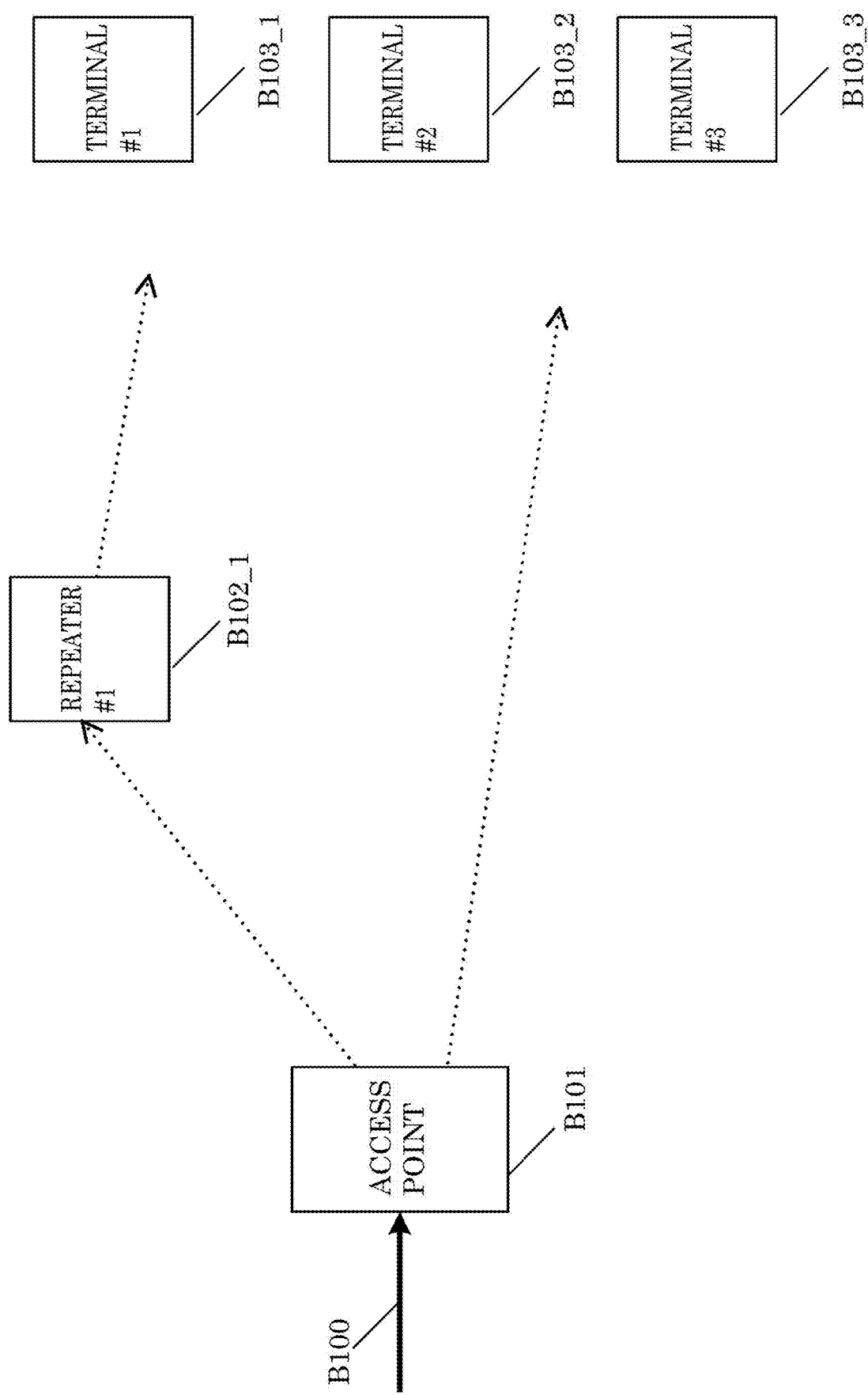

A detailed example is illustrated in FIG. 121. In FIG. 121, elements which operate in the same manner as those in other figures are assigned with the same reference signs. Note that FIG. 121 is based on FIG. 97.

In FIG. 121, access point B101 transmits a modulated signal to one or more terminals from among terminal #1 labeled B103_1, terminal #2 labeled B103_2, and terminal #3 labeled B103_3. With this, access point B101 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Similarly, repeater #1 labeled B102_1 transmits a modulated signal to one or more terminals from among terminal #1 labeled B103_1, terminal #2 labeled B103_2, and terminal #3 labeled B103_3. With this, repeater #1 labeled B102_1 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Accordingly, access point B100 uses, for example, OFDM or OFDMA when transmitting the modulated signal. Repeater #1 labeled B102_1 also uses, for example, OFDM or OFDMA when transmitting the modulated signal.

Moreover, for example, the data transmitted to one or more terminals by repeater #1 labeled B102_1 is obtained from access point B101. Here, communication between access point B101 and repeater #1 labeled B102_1 may be wired or wireless communication.

As described in the present specification, access point B101 illustrated in FIG. 121 may be referred to as a communication device, and may be referred to as a controller, control device, server, base station, wireless communication device, computer, mobile phone, smartphone, node, mesh node, master access point, etc. However, the naming is not limited to these examples. Other examples are as described throughout the present specification.

Moreover, repeater #1 labeled B102_1 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Example 2

Figure 122:
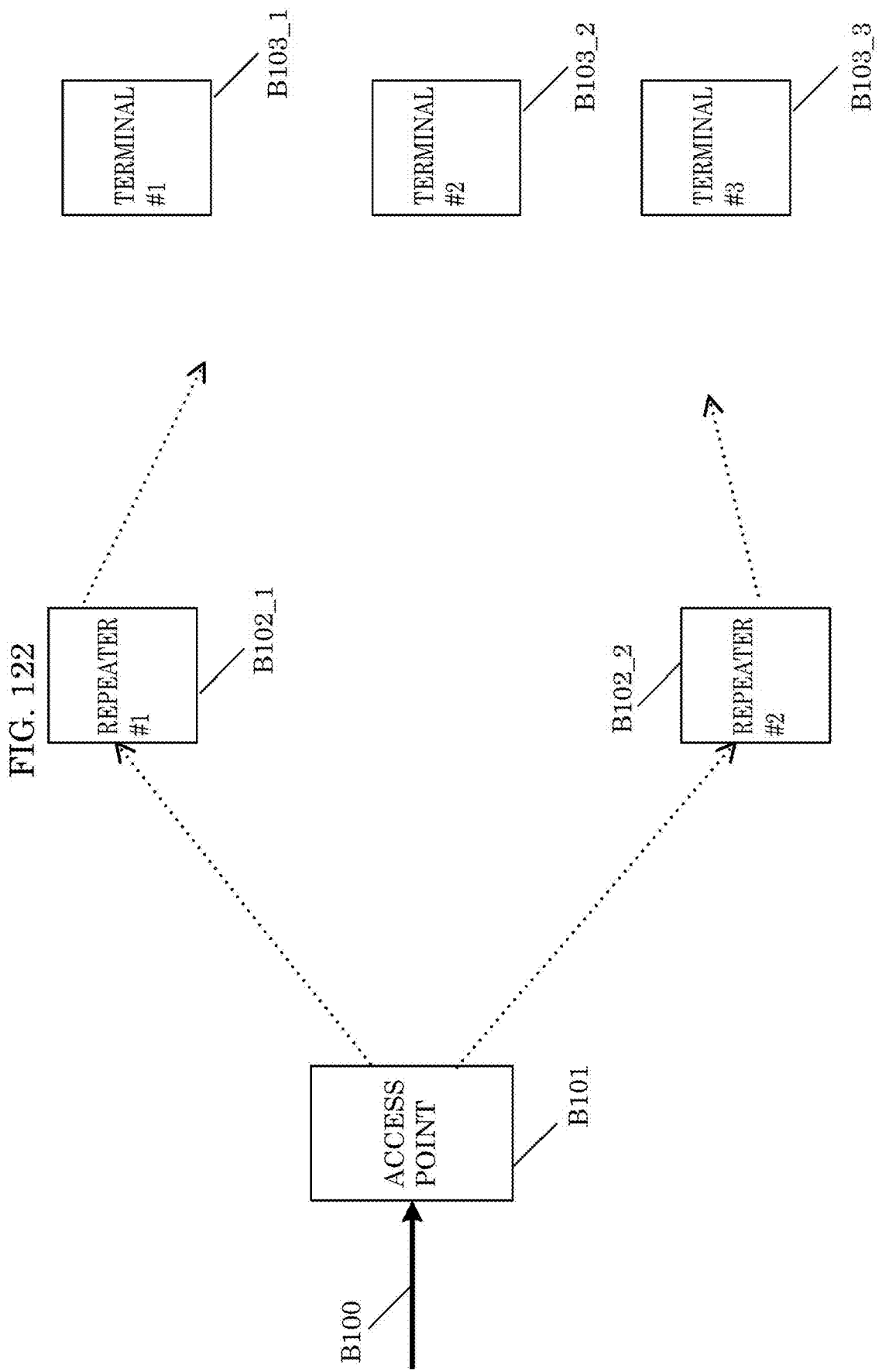

A detailed example is illustrated in FIG. 122. In FIG. 122, elements which operate in the same manner as those in other figures are assigned with the same reference signs.

In FIG. 122, communication between access point B101 and repeater #1 labeled B102_1 may be wired or wireless communication.

Similarly, communication between access point B101 and repeater #2 labeled B102_2 may be wired or wireless communication.

Repeater #1 labeled B102_1 transmits a modulated signal to one or more terminals from among terminal #1 labeled B103_1, terminal #2 labeled B103_2, and terminal #3 labeled B103_3. With this, repeater #1 labeled B102_1 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Similarly, repeater #2 labeled B102_2 transmits a modulated signal to one or more terminals from among terminal #1 labeled B103_1, terminal #2 labeled B103_2, and terminal #3 labeled B103_3. With this, repeater #2 labeled B102_2 transmits desired data to one or more terminals from among terminal #1 labeled B103_1, terminal #2 labeled B103_2, and terminal #3 labeled B103_3. As examples of frames of the modulated signal transmitted by repeater #2 labeled B102_2 in this case have already been described in other embodiments, repeated description will be omitted.

Accordingly, repeater #1 labeled B102_1 uses, for example, OFDM or OFDMA when transmitting the modulated signal. Repeater #2 labeled B102_2 also uses, for example, OFDM or OFDMA when transmitting the modulated signal.

For example, the data transmitted to one or more terminals by repeater #1 labeled B102_1 is obtained from access point B101. Here, communication between access point B101 and repeater #1 labeled B102_1 may be wired or wireless communication.

Moreover, the data transmitted to one or more terminals by repeater #2 labeled B102_2 is obtained from access point B101. Here, communication between access point B101 and repeater #2 labeled B102_2 may be wired or wireless communication.

As described in the present specification, access point B101 illustrated in FIG. 122 may be referred to as a communication device, and may be referred to as a controller, control device, server, base station, master access point, computer, mobile phone, smartphone, node, mesh node, etc. However, the naming is not limited to these examples. Other examples are as described throughout the present specification.

Moreover, repeater #1 labeled B102_1 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Repeater #2 labeled B102_2 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Example 3

Figure 123:
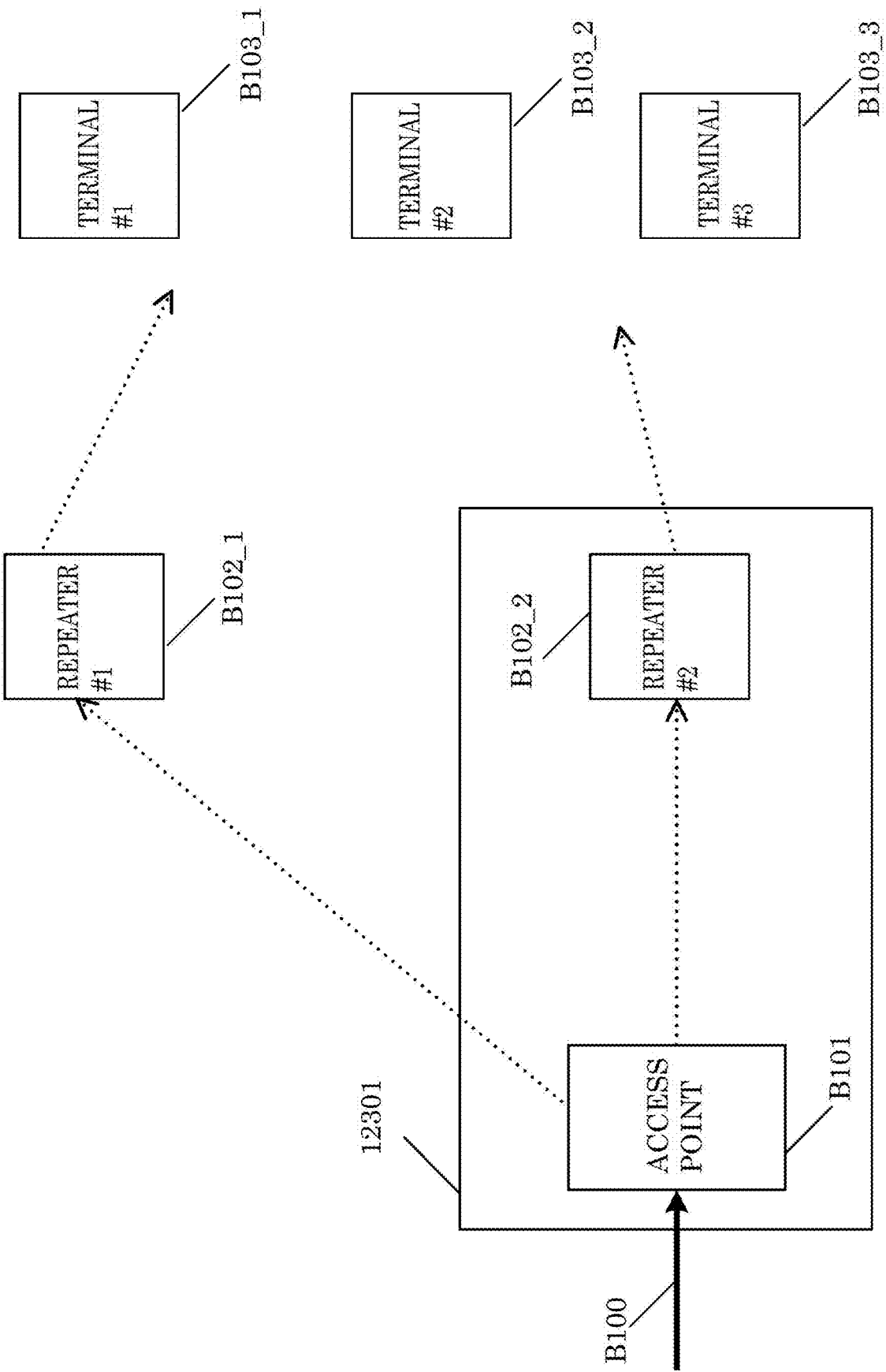

A detailed example is illustrated in FIG. 123. In FIG. 123, elements which operate in the same manner as those in other figures are assigned with the same reference signs.

The characterizing feature of the configuration illustrated in FIG. 123 is the inclusion of communication device 12301 that includes access point B101 and repeater #2 labeled B102_2.

In FIG. 123, communication between communication device 12301 and repeater #1 labeled B102_1 may be wired or wireless communication.

Here, in communication device 12301, communication between access point B101 and repeater #2 labeled B102_2 may be wired (via a bus connection or via a connector) or wireless communication.

Repeater #1 labeled B102_1 transmits a modulated signal to one or more terminals from among terminal #1 labeled B103_1, terminal #2 labeled B103_2, and terminal #3 labeled B103_3. With this, repeater #1 labeled B102_1 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Similarly, repeater #2 labeled B102_2 included in communication device 12301 transmits a modulated signal to one or more terminals from among terminal #1 labeled B103_1, terminal #2 labeled B103_2, and terminal #3 labeled B103_3. With this, repeater #2 labeled B102_2 transmits desired data to one or more terminals from among terminal #1 labeled B103_1, terminal #2 labeled B103_2, and terminal #3 labeled B103_3. As examples of frames of the modulated signal transmitted by repeater #2 labeled B102_2 in this case have already been described in other embodiments, repeated description will be omitted.

Accordingly, repeater #1 labeled B102_1 uses, for example, OFDM or OFDMA when transmitting the modulated signal. Repeater #2 labeled B102_2 also uses, for example, OFDM or OFDMA when transmitting the modulated signal.

For example, the data transmitted to one or more terminals by repeater #1 labeled B102_1 is obtained from access point B101 included in communication device 12301. Here, communication between access point B101 and repeater #1 labeled B102_1 may be wired or wireless communication.

The data transmitted to one or more terminals by repeater #2 labeled B102_2 included in communication device 12301 is obtained from access point B101 included in communication device 12301. Here, communication between access point B101 and repeater #2 labeled B102_2 may be wired or wireless communication.

As described in the present specification, access point B101 illustrated in FIG. 123 may be referred to as a communication device, and may be referred to as a controller, control device, server, computer, mobile phone, smartphone, node, mesh node, etc. However, the naming is not limited to these examples. Other examples are as described throughout the present specification.

Moreover, repeater #1 labeled B102_1 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Repeater #2 labeled B102_2 may be referred to as a communication device, and may be referred to as an access point, base station, wireless communication device, server, computer, mobile phone, smartphone, node, mesh node, control, control device, etc. However, the naming is not limited to these examples. Other examples are as described throughout the present specification.

Communication device 12301 may be referred to as a controller, control device, server, base station, computer, node, mesh node, mobile phone, smartphone, master access point, etc. However, the naming is not limited to these examples.

Embodiment B10

In the present embodiment, a variation of Embodiment B2 will be described.

As illustrated in FIG. 97, access point B101 receives an input of data B100, generates a modulated signal from data B100, and transmits the generated modulated signal to repeater #1 labeled B102_1 and/or terminal B103.

Repeater #1 labeled B102_1 receives the modulated signal transmitted by access point B101, generates a modulated signal destined for terminal B103 based on the received modulated signal, and transmits the generated modulated signal to terminal B103.

Although the data that is input into access point B101 is exemplified as a single series of data (B100), the data is not limited to this example. Access point B101 may be configured to receive an input of a plurality of series of data.

Access point B101 transmits one or more modulated signals to repeater #1 labeled B102_1. If transmitting a plurality of modulated signals, MIMO transmission may be used.

Repeater #1 labeled B102_1 generates and transmits one or more modulated signals destined for terminal B103 based on the received modulated signal(s). If transmitting a plurality of modulated signals, MIMO transmission may be used.

FIG. 98, FIG. 99, and FIG. 100 illustrate examples of frame configurations of modulated signals transmitted by access point B101 and destined for repeater #1 labeled B102_1 and modulated signals transmitted by access point B101 and destined for terminal B103. Time is represented on the horizontal axis in FIG. 98, FIG. 99, and FIG. 100. Elements in FIG. 98, FIG. 99, and FIG. 100 that operate the same as those in FIG. 85 share like reference signs.

As illustrated in FIG. 98, FIG. 99, and FIG. 100, a modulated signal destined for repeater #1 labeled B102_1 includes preamble B201_1, control information symbol B202_1, and data symbol B203_1. The modulated signal destined for terminal B103 includes preamble B1501_2, control information symbol B1502_2, and data symbol B1503_2.

Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 98, preamble B201_1 is present in the first period, and preamble B1501_2 is also present in the first period. Control information symbol B202_1 is present in the second period, and control information symbol B1502_2 is also present in the second period. Data symbol B203_1 is present in the third period, and data symbol B1503_2 is also present in the third period.

Here, the modulated signal destined for repeater #1 labeled B102_1 that includes preamble B201_1, control information symbol B202_1, and data symbol B203_1 is transmitted from access point B101 using, for example, the first frequency band. The modulated signal destined for terminal B103 that includes preamble B1501_2, control information symbol B1502_2, and data symbol B1503_2 is transmitted from access point B101 using, for example, the third frequency band.

FIG. 99 illustrates frame configurations of a modulated signal destined for repeater #1 labeled B102_1 and a modulated signal destined for terminal B103 which differ from those in FIG. 98. Elements which operate in the same manner as those in FIG. 85 and FIG. 98 are assigned with the same reference signs, and repeated detailed description thereof is omitted. Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

As illustrated in FIG. 99, preamble B201_1 is present in the first period, control information symbol B202_1 is present in the second period, and data symbol B203_1 is present in the third period. Preamble B1501_2 is present in the fourth period, control information symbol B1502_2 is present in the fifth period, and data symbol B1503_2 is present in the sixth period.

The example illustrated in FIG. 99 differs from the example illustrated in FIG. 98 in that the time interval in which the modulated signal destined for repeater #1 labeled B102_1 that includes preamble B201_1, control information symbol B202_1, and data symbol B203_1 and the time interval in which the modulated signal destined for terminal B103 2 that includes preamble B1501_2, control information symbol B1502_2, and data symbol B1503_2 partially temporally overlap.

For example, in FIG. 99, part of data symbol B203_1 is present in the fourth period in which preamble B1501_2 is present. Additionally, part of data symbol B203_1 is present in the fifth period in which control information symbol B1502_2 is present. Additionally, part of the sixth period in which data symbol B1503_2 is present and part of the third period in which data symbol B203_1 is present temporally overlap.

Note that FIG. 99 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band. The modulated signal destined for terminal B103 that includes preamble B1501_2, control information symbol B1502_2, and data symbol B1503_2 is transmitted from access point B101 using, for example, the third frequency band.

FIG. 100 illustrates frame configurations of a modulated signal destined for repeater #1 labeled B102_1 and a modulated signal destined for terminal B103 which differ from those in FIG. 98 and FIG. 99. Elements which operate in the same manner as those in FIG. 85 and FIG. 98 are assigned with the same reference signs, and repeated detailed description thereof is omitted. Note that the modulated signal destined for repeater #1 labeled B102_1 may be one or a plurality of modulated signals, and the modulated signal destined for terminal B103 may be one or a plurality of modulated signals. If transmitting a plurality of modulated signals, MIMO transmission may be used.

As illustrated in FIG. 100, preamble B201_1 is present in the first period, control information symbol B202_1 is present in the second period, and data symbol B203_1 is present in the third period. Preamble B1501_2 is present in the fourth period, control information symbol B1502_2 is present in the fifth period, and data symbol B1503_2 is present in the sixth period.

The example illustrated in FIG. 100 differs from the examples illustrated in FIG. 98 and FIG. 99 in that the time interval in which the modulated signal destined for repeater #1 labeled B102_1 that includes preamble B201_1, control information symbol B202_1, and data symbol B203_1 and the time interval in which the modulated signal destined for terminal B103 that includes preamble B1501_2, control information symbol B1502_2, and data symbol B1503_2 do not temporally overlap.

Accordingly, the modulated signal destined for terminal B103 is not present in the first period in which preamble B201_1 is present. Similarly, the modulated signal destined for terminal B103 is not present in the second period in which control information symbol B202_1 is present. Similarly, the modulated signal destined for terminal B103 is not present in the third period in which data symbol B203_1 is present.

Additionally, the modulated signal destined for repeater #1 labeled B102_1 is not present in the fourth period in which preamble B1501_2 is present. Similarly, the modulated signal destined for repeater #1 labeled B102_1 is not present in the fifth period in which control information symbol B1502_2 is present. Similarly, the modulated signal destined for repeater #1 labeled B102_1 is not present in the sixth period in which data symbol B1503_2 is present.

Note that FIG. 100 illustrates merely one example; the frame configurations are not limited to this example, and need only satisfy the conditions described above.

The modulated signal destined for repeater #1 labeled B102_1 that includes preamble B201_1, control information symbol B202_1, and data symbol B203_1 is transmitted from access point B101 using, for example, the first frequency band. The modulated signal destined for terminal B103 that includes preamble B1501_2, control information symbol B1502_2, and data symbol B1503_2 is transmitted from access point B101 using, for example, the third frequency band.

FIG. 101 illustrates an example of a frame configuration of a modulated signal transmitted by repeater #1 labeled B102_1. Time is represented on the horizontal axis in FIG. 101.

As illustrated in FIG. 101, a modulated signal transmitted by repeater #1 labeled B102_1 includes preamble B501_1, control information symbol B502_1, and data symbol B503_1. Note that the modulated signal transmitted by repeater #1 labeled B102_1 may be one or a plurality of modulated signals. If transmitting a plurality of modulated signals, MIMO transmission may be used.

A preamble is, for example, a modulated signal that is known to the communication partner, and is a symbol for the communication partner to perform signal detection, frequency offset estimation, time synchronization, and/or frequency synchronization. A control information symbol includes information such as information indicating the modulated signal, error correction coding method (for example, error correction code type, error correction code length and/or block length), and/or transmission method (for example, modulation and coding scheme (MCS)) used to generate a data symbol. A data symbol is a symbol for transmitting data.

In the example illustrated in FIG. 101, preamble B501_1 is present in the $X1^{th}$ period, control information symbol B502_1 is present in the $X2^{th}$ period, and data symbol B503_1 is present in the $X3^{th}$ period.

A modulated signal transmitted by repeater #1 labeled B102_1 that includes preamble B501_1, control information symbol B502_1, and data symbol B503_1 uses the second frequency band.

Next, the relationship between the modulated signal destined for terminal B103 that is transmitted by access point B101 and the modulated signal destined for terminal B103 that is transmitted by repeater #1 labeled B102_1, when the modulated signal destined for repeater #1 labeled B102_1 and the modulated signal destined for terminal B103 that are transmitted by access point B101 in FIG. 97 have the frame configuration illustrated in FIG. 100, will be described.

Figure 124:
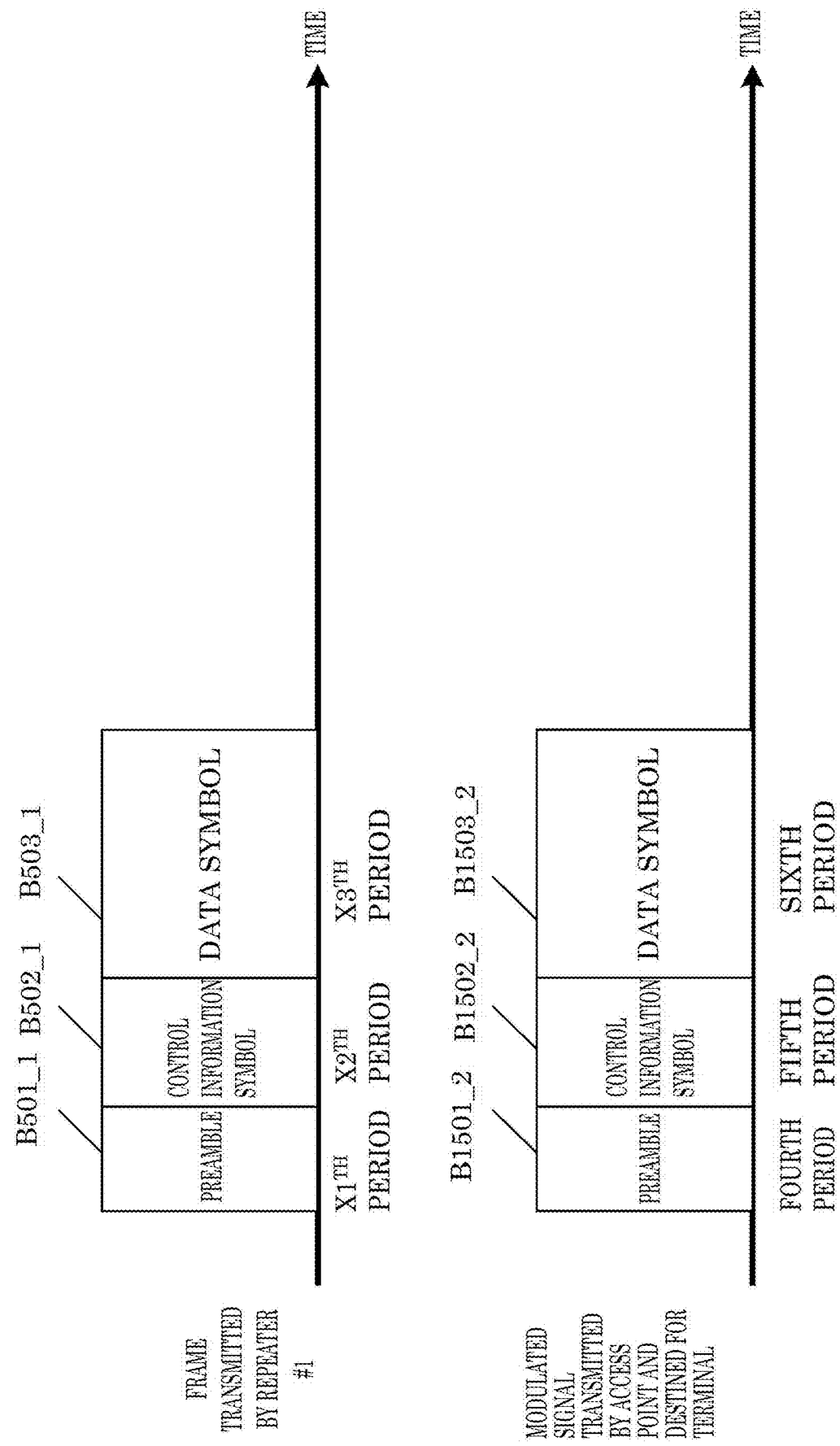
Figure 125:
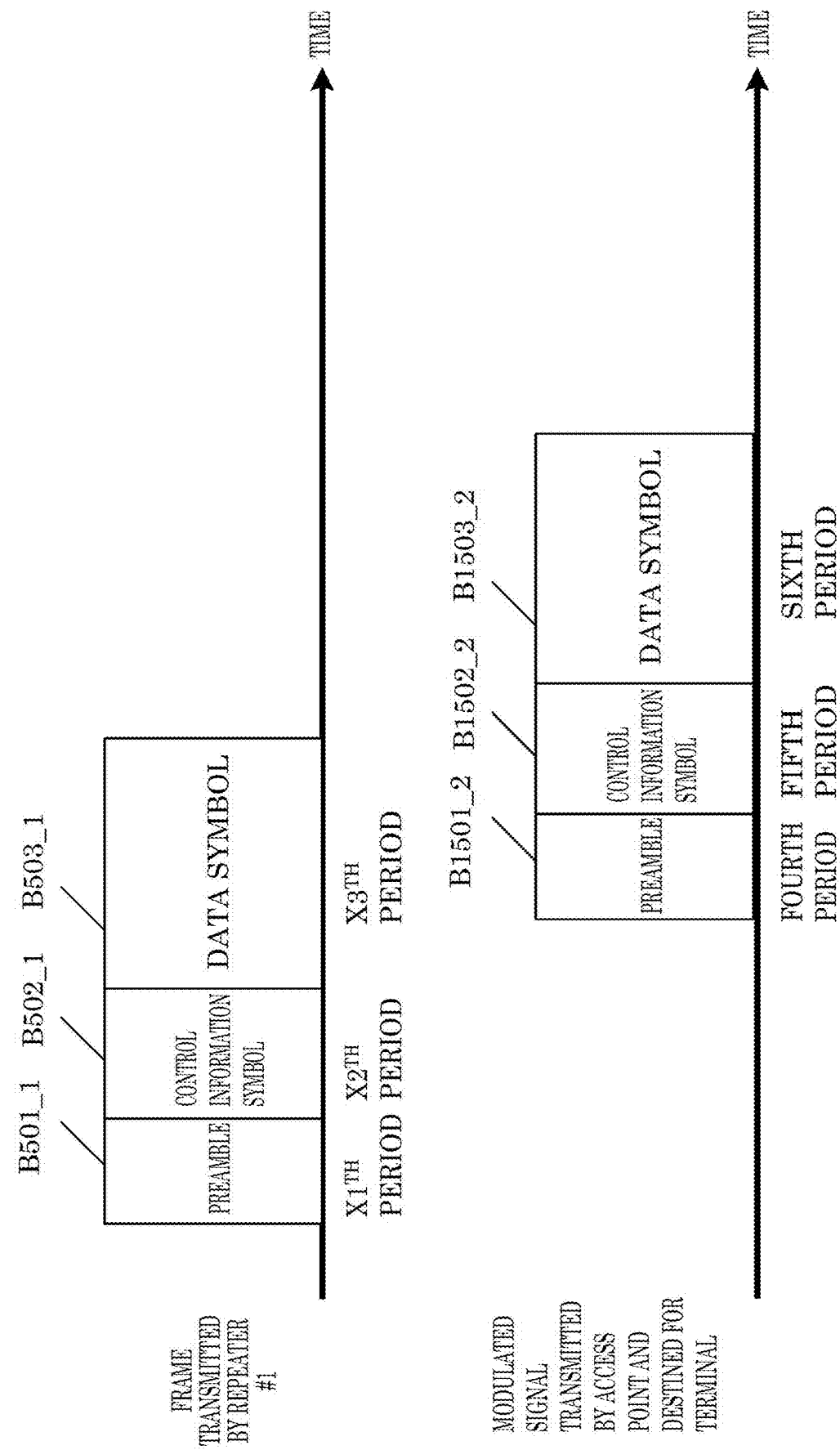

FIG. 124, FIG. 125, and FIG. 126 illustrate examples of the frame of the modulated signal destined for terminal B103 that is transmitted by repeater #1 labeled B102_1 and the frame of the modulated signal destined for terminal B103 that is transmitted by access point B101. Time is represented on the horizontal axis in these figures. In each of the figures, the top frame is the frame of the modulated signal destined for terminal B103 that is transmitted by repeater #1 labeled B102_1, and the bottom frame is the frame of the modulated signal destined for terminal B103 that is transmitted by access point B101.

The frame of the modulated signal destined for terminal B103 that is transmitted by repeater #1 labeled B102_1 illustrated on the top of each of FIG. 124, FIG. 125, and FIG. 126 corresponds to the frame of the modulated signal destined for terminal B103 that is transmitted by repeater #1 labeled B102_1 which is illustrated in FIG. 101. Accordingly, since the frame of the modulated signal destined for terminal B103 that is transmitted by repeater #1 labeled B102_1 illustrated on the top of each of FIG. 124, FIG. 125, and FIG. 126 operates in the same manner as the frame of the modulated signal destined for terminal B103 that is transmitted by repeater #1 labeled B102_1 which is illustrated in FIG. 101, the same reference signs are used.

Therefore, preamble B501_1 is present in the $X1^{th}$ period, control information symbol B502_1 is present in the $X2^{th}$ period, and data symbol B503_1 is present in the $X3^{th}$ period.

In the frame of the modulated signal destined for terminal B103 that is transmitted by repeater #1 labeled B102_1 illustrated on the top of each of FIG. 124, FIG. 125, and FIG. 126, the modulated signal may be one or more modulated signals, and when a plurality of modulated signals are present, MIMO transmission may be used.

Moreover, the frame of the modulated signal destined for terminal B103 that is transmitted by access point B101 illustrated in on bottom of each of FIG. 124, FIG. 125, and FIG. 126 corresponds to the frame of the modulated signal destined for terminal B103 that is transmitted by access point B101 that is illustrated in FIG. 99 and FIG. 100. Accordingly, since the frame of the modulated signal destined for terminal B103 that is transmitted by access point B101 illustrated on the bottom of each of FIG. 124, FIG. 125, and FIG. 126 operates in the same manner as the frame of the modulated signal destined for terminal B103 that is transmitted by access point B101 which is illustrated in FIG. 99 and FIG. 100, the same reference signs are used. Accordingly, preamble B1501_2 is present in the fourth period, control information symbol B1502_2 is present in the fifth period, and data symbol B1503_2 is present in the sixth period.

In the frame of the modulated signal destined for terminal B103 that is transmitted by access point B101 on the bottom of each of FIG. 124, FIG. 125, and FIG. 126, the modulated signal may be one or more modulated signals, and when a plurality of modulated signals are present, MIMO transmission may be used.

In FIG. 124, the $X1^{th}$ period and the fourth period are the same period, the $X2^{th}$ period and the fifth period are the same period, and the $X3^{th}$ period and the sixth period are the same period. Accordingly, preambles B501_1 and B1501_2 are present at the same time, control information symbols B502_1 and B1502_2 are present at the same time, and data symbols B503_1 and B1503_2 are present at the same time.

The example illustrated in FIG. 125 differs from the example illustrated in FIG. 124 in that the time interval in which the frame including preamble B501_1, control information symbol B502_1, and data symbol B503_1 and the time interval in which the frame including preamble B1501_2, control information symbol B1502_2, and data symbol B1503_2 partially temporally overlap.

For example, in FIG. 125, part of data symbol B503_1 is present in the fourth period in which preamble B1501_2 is present. Additionally, part of data symbol B503_1 is present in the fifth period in which control information symbol B1502_2 is present.

Note that FIG. 125 illustrates merely one example; the frame configurations are not limited to this example, and need only satisfy the conditions described above.

The example illustrated in FIG. 126 differs from the examples illustrated in FIG. 124 and FIG. 125 in that the time interval in which the frame including preamble B501_1, control information symbol B502_1, and data symbol B503_1 and the time interval in which the frame including preamble B1501_2, control information symbol B1502_2, and data symbol B1503_2 do not partially temporally overlap.

Note that FIG. 126 illustrates merely one example; the frame configurations are not limited to this example, and need only satisfy the conditions described above.

Note that the frames illustrated in FIG. 124, FIG. 125, and FIG. 126 are merely examples. The frames of the modulated signal destined for terminal B103 that is transmitted by repeater #1 labeled B102_1 that are illustrated in FIG. 124, FIG. 125, and FIG. 126 may include symbols other than those illustrated in the examples in the figures, and the frames of the modulated signal destined for terminal B103 that is transmitted by access point B101 that are illustrated in FIG. 124, FIG. 125, and FIG. 126 may include symbols other than those illustrated in the examples in the figures.

Note that the first frequency band and the second frequency band may be the same frequency band, and, alternatively, may be different frequency bands. Moreover, the first frequency band and the third frequency band may be the same frequency band, and, alternatively, may be different frequency bands. Furthermore, the second frequency band and the third frequency band may be the same frequency band, and, alternatively, may be different frequency bands.

Next, operations performed by each device included in a system including the access point, the repeater(s), and the terminal described hereinbefore will be described.

FIG. 91 illustrates one example of a configuration of access point B101 illustrated in FIG. 97. As FIG. 91 has already been described, repeated description will be partially omitted.

Other communication device B899 is a wired and/or wireless communication device, and is thus capable of communicating. Here, other communication device B899 includes at least a communication device for transmitting a modulated signal of the third frequency band and receiving a modulated signal.

Note that the transmission signal of the third frequency band may be a plurality of modulated signals. When the modulated signal is a plurality of modulated signals, the plurality of modulated signals are transmitted from a plurality of antennas. Here, MIMO or MISO transmission may be used. Accordingly, the antenna is configured as one or more antennas.

As described with reference to FIG. 97, communication between access point B101 and repeater #1 labeled B102_1 uses the first frequency band. Accordingly, here, transmission signal B803 of the first frequency band is a signal destined for repeater #1 labeled B102_1. Communication between access point B101 and terminal B103 uses the third frequency band. Accordingly, here, other communication device B899 illustrated in FIG. 91 generates and transmits a modulated signal destined for terminal B103. Note that the frame configuration of each transmission signal is as described above.

FIG. 102 illustrates one example of a configuration of access point B101 illustrated in FIG. 97, which differs from the example illustrated in FIG. 91. Note that in FIG. 102, elements which operate in the same manner as those in FIG. 91 are assigned the same reference numerals, and repeated description of elements that have already been described is omitted.

Third frequency band transmitting device B1912 receives an input of data B1911, performs processing such as error correction encoding and mapping based on the modulation method, and generates and outputs modulated signal B1913 that uses the third frequency band. Antenna B1914 then outputs modulated signal B1913 that uses the third frequency band as radio waves. Note that modulated signal B1913 that uses the third frequency band is the modulated signal destined for terminal B103 that is illustrated in FIG. 97.

Third frequency band receiving device B1917 receives an input of received signal B1916 received by antenna B1915, performs processing such as demodulation and error correction decoding and the like on the modulated signal of the third frequency band, and outputs data B1918.

Note that modulated signal B1913 of the third frequency band may be a plurality of modulated signals. When the modulated signal is a plurality of modulated signals, the plurality of modulated signals are transmitted from a plurality of antennas. Here, MIMO or MISO transmission may be used. Accordingly, the antenna is configured as one or more antennas. Moreover, antenna B1915 may include a plurality of antennas, and in such cases, a plurality of modulated signals are obtained via antennas B1915.

Other communication device B899 is a wired and/or wireless communication device, and is thus capable of communicating. However, other communication device B899 need not include access point B101.

As described with reference to FIG. 97, communication between access point B101 and repeater #1 labeled B102_1 uses the first frequency band. Accordingly, here, transmission signal B803 of the first frequency band is a signal destined for repeater #1 labeled B102_1. Communication between access point B101 and terminal B103 uses the third frequency band. Accordingly, here, third frequency band transmitting device B1912 illustrated in FIG. 102 generates and transmits a modulated signal destined for terminal B103. Note that the frame configuration of each transmission signal is as described above.

Note that when the first frequency band and the third frequency band are the same frequency band, the transmitting device and receiving device for the third frequency band may be omitted. Moreover, the first frequency band and the third frequency band may be the same frequency band.

FIG. 92 illustrates an example of a configuration of repeater #1 labeled B102_1 illustrated in FIG. 97.

In FIG. 92, for example, antenna B901 is an antenna for communicating with access point B101 illustrated in FIG. 97, and antenna B905 is an antenna for communicating with terminal B103 illustrated in FIG. 97.

Accordingly, repeater B903 uses antenna B901 to communicate with access point B101 illustrated in FIG. 97 and uses antenna B905 to communicate with terminal B103 illustrated in FIG. 97.

FIG. 93 illustrates an example of a configuration of the repeater illustrated in FIG. 92. In FIG. 93, antennas B1001 and B1017 are antennas for communicating with access point B101 illustrated in FIG. 97, and antennas B1007 and B1011 are antennas for communicating with the terminal illustrated in FIG. 97.

$A^{th}$ frequency band receiving device B1003 receives an input of received signal B1002 received by antenna B1001. Note that received signal B1002 corresponds to the modulated signal transmitted by access point B101 illustrated in FIG. 97. $A^{th}$ frequency band receiving device B1003 performs signal processing and processing such as demodulation, error correction decoding, etc., on received signal B1002, and outputs data B1004.

Note that in the present embodiment, when the repeater illustrated in FIG. 93 is repeater #1 labeled B102_1, $A^{th}$ frequency band receiving device B1003 is a first frequency band receiving device. Accordingly, in such cases, received signal B1002 is a received signal of the first frequency band.

$B^{th}$ frequency band transmitting device B1005 receives an input of data B1004. However, second data B1000 may be input into $B^{th}$ frequency band transmitting device B1005. $B^{th}$ frequency band transmitting device B1005 implements processing such as error correction coding, modulation (mapping), and/or frequency conversion, etc., on all or part of data B1004 or data B1004 and second data B1000, and generates and outputs transmission signal B1006. Transmission signal B1006 is then output from antenna B1007.

Note that in the present embodiment, when the repeater illustrated in FIG. 93 is repeater #1 labeled B102_1, $B^{th}$ frequency band transmitting device B1005 is a second frequency band transmitting device. Accordingly, in such cases, received signal B1006 is a received signal of the second frequency band.

Antenna B1001 illustrated in FIG. 93 may include one or more antennas, and thus received signal B1002 may include one or more modulated signals. Accordingly, $A^{th}$ frequency band receiving device B1003 may perform signal processing for MIMO transmission on the received signal. As a matter of course, $A^{th}$ frequency band receiving device B1003 may perform signal processing for single stream transmission on the received signal.

Antenna B1007 illustrated in FIG. 93 may include one or more antennas. Accordingly, transmission signal B1006 may include one or more modulated signals. $B^{th}$ frequency band transmitting device B1005 may generate a plurality of modulated signals for MIMO transmission as transmission signal B1006. As a matter of course, $B^{th}$ frequency band transmitting device B1005 may output a single-stream modulated signal as transmission signal B1006.

Antenna B1011 is an antenna for receiving a modulated signal transmitted by terminal B103 illustrated in FIG. 97. $B^{th}$ frequency band receiving device B1013 is a device for demodulating a modulated signal transmitted by terminal B103. $A^{th}$ frequency band transmitting device B1015 is a device that generates a modulated signal to be transmitted to access point B101 illustrated in FIG. 97. Antenna B1017 is an antenna for transmitting a modulated signal to access point B101. Description of operations performed by antennas B1011 through B1017 will be omitted at this time.

An example of a configuration of terminal B103 illustrated in FIG. 97 in this case is FIG. 91. As operations performed by the elements illustrated in FIG. 91 have already been described, repeated description will be omitted.

Antenna B815 receives a modulated signal of the second frequency band transmitted by repeater #1 labeled B102_1. Second frequency band receiving device B817 receives an input of received signal B816 received by antenna B815, performs processing such as demodulation, error correction decoding, etc., and outputs received data B818.

Antenna B815 may include one or more antennas, and thus received signal B816 may include one or more modulated signals. Accordingly, second frequency band receiving device B817 may perform signal processing for MIMO transmission on the received signal. As a matter of course, second frequency band receiving device B817 may perform signal processing for single stream transmission on the received signal.

Other communication device B899 receives a modulated signal of the third frequency band that is transmitted by access point B101 illustrated in FIG. 97, performs processing such as demodulation, error correction decoding, etc., and obtains data.

Other communication device B899 may include one or more antennas, and thus the received signal may include one or more modulated signals. Accordingly, the third frequency band receiving device that is included in other communication device B899 may perform signal processing for MIMO transmission on the received signal. As a matter of course, the third frequency band receiving device may perform signal processing for single stream transmission on the received signal.

An example of a configuration of terminal B103 illustrated in FIG. 97 is FIG. 103, which differs from the example illustrated in FIG. 91. Note that in FIG. 103, elements which operate in the same manner as those in FIG. 91 and FIG. 102 are assigned the same reference numerals, and repeated description thereof is partially omitted.

Antenna B815 receives a modulated signal of the second frequency band transmitted by repeater #1 labeled B102_1. Second frequency band receiving device B817 receives an input of received signal B816 received by antenna B815, performs processing such as demodulation, error correction decoding, etc., and outputs received data B818.

Antenna B815 may include one or more antennas, and thus received signal B816 may include one or more modulated signals. Accordingly, second frequency band receiving device B817 may perform signal processing for MIMO transmission on the received signal. As a matter of course, second frequency band receiving device B817 may perform signal processing for single stream transmission on the received signal.

Antenna B1914 receives a signal including a modulated signal of the third frequency band that is transmitted by access point B101 illustrated in FIG. 97. Third frequency band receiving device B1917 receives an input of the received signal B1916 received by antenna B1915, performs processing such as demodulation, error correction decoding, etc., and outputs data B1918.

Antenna B1915 may include one or more antennas, and thus received signal B1916 may include one or more modulated signals. Accordingly, third frequency band receiving device B1917 may perform signal processing for MIMO transmission on the received signal. As a matter of course, third frequency band receiving device B1917 may perform signal processing for single stream transmission on the received signal.

Terminal B103 may include B899, and, alternatively, may not include other communication device B899.

By implementing the above, terminal B103 illustrated in FIG. 97 can obtain modulated signals of a plurality of frequency bands, such as a modulated signal of the first frequency band and a modulated signal of the third frequency band, and can thus achieve the advantageous effect that the transmission amount of data obtained by terminal B103 can be increased. Moreover, by implementing a configuration in which the first repeater receives a modulated signal of the first frequency band transmitted by access point B101, generates a modulated signal of the second frequency band, and transmits the generated modulated signal to terminal B103, the above-described advantageous effects are further amplified. This has already been described in Embodiment B1.

As stated above, the configuration of the repeater may be a configuration like that in, for example, FIG. 93. Advantageous points of this configuration include, for example, the $A^{th}$ frequency band transmitting device need not include a plurality of transmitting devices and receiving devices, the $B^{th}$ frequency band transmitting device need not include a plurality of transmitting devices and receiving devices, the repeater can be miniaturized, and the scale of the circuitry can be kept down.

Note that the first frequency band and the second frequency band may be the same frequency band, and, alternatively, may be different frequency bands.

Note that the present embodiment is merely one example. For example, even if access point B101 is a terminal and terminal B103 is an access point, the present embodiment can be implemented in the same manner. Although the terms access point, repeater, and terminal are used in the present embodiment, the access point may be referred to as a base station, communication device, terminal, broadcast station, node, server, computer, control device, controller, mesh node, master access point, or mobile phone or the like and the present embodiment may be implemented, the repeater may be referred to as a communication device, access point, node, terminal, base station, server, computer, control device, controller, mesh node, slave access point, mobile phone, smartphone, server, or computer or the like and the present embodiment may be implemented, and the terminal may be referred to as a communication device, access point, node, base station, mesh node, mobile phone, smartphone, server, or computer or the like and the present embodiment may be implemented.

Moreover, the frame configurations illustrated in FIG. 98, FIG. 99, FIG. 100, FIG. 101, FIG. 124, FIG. 125, and FIG. 126 are non-limiting examples; each frame configuration may include other symbols not illustrated in these figures. For example, a symbol for channel estimation, phase noise estimation, frequency/time synchronization, frequency offset estimation, etc., such as a reference symbol, pilot symbol, or mid-amble or the like, and/or a trigger frame for controlling transmission timing may be included in the frame.

Supplemental Information B4

Next, supplemental information for each embodiment will be given.

In Embodiment B1, the first frequency band and the second frequency band may be the same frequency band, and, alternatively, may be different frequency bands.

In Embodiment B2, the first frequency band and the third frequency band may be the same frequency band, and, alternatively, may be different frequency bands. Moreover, the first frequency band and the second frequency band may be the same frequency band, and, alternatively, may be different frequency bands. Furthermore, the second frequency band and the third frequency band may be the same frequency band, and, alternatively, may be different frequency bands.

In Embodiment B3, the $A^{th}$ frequency band and the $B^{th}$ frequency band may be the same frequency band, and, alternatively, may be different frequency bands. Moreover, the $B^{th}$ frequency band and the $C^{th}$ frequency band may be the same frequency band, and, alternatively, may be different frequency bands. Furthermore, the $A^{th}$ frequency band and the $C^{th}$ frequency band may be the same frequency band, and, alternatively, may be different frequency bands.

In Embodiment B6, the first frequency band and the second frequency band may be the same frequency band, and, alternatively, may be different frequency bands.

In Embodiment B8, the first frequency band and the second frequency band may be the same frequency band, and, alternatively, may be different frequency bands.

In Embodiment B9, the first frequency band and the second frequency band may be the same frequency band, and, alternatively, may be different frequency bands.

Embodiment B11

In the present embodiment, information transmitted by the access point (AP), repeaters, and terminal described in, for example, Embodiment B1 through Embodiment B10 and the variations thereof, as well as operations performed by these devices, will be described.

In order for the AP, repeaters, and terminal to achieve communication characterized by efficient data transmission with the communication partner, for example, the AP, repeaters, and terminal transmit the information illustrated in FIG. 127.

For example, the AP, repeaters, and terminal transmit information for notifying whether (simultaneous) communication via a plurality of modulated signals is supported or not. This is illustrated in FIG. 127. Although the phrase "(simultaneous) communication" is used, the communication may or may not be simultaneous. This applies hereinafter as well.

In FIG. 127, time is represented on the horizontal axis. For example, the capability field is illustrated in FIG. 127. Part of the capability field includes information 12701 related to support for (simultaneous) communication via a plurality of modulated signals. Information 12701 related to support for (simultaneous) communication via a plurality of modulated signals is information for notifying whether (simultaneous) communication via a plurality of modulated signals is supported or not. However, information 12701 related to support for (simultaneous) communication via a plurality of modulated signals may be transmitted outside of the capability field.

Here, the capability field is a field including, for example, a management frame, a control frame, and a data frame that are in the MAC frame. The capability field is a field for notifying the communication partner of capabilities related to communication or the form of the communication (reception capability or transmission capability, etc.).

The AP transmits information 12701 related to support for (simultaneous) communication via a plurality of modulated signals.

Similarly, a repeater transmits information 12701 related to support for (simultaneous) communication via a plurality of modulated signals.

The terminal transmits information 12701 related to support for (simultaneous) communication via a plurality of modulated signals.

The AP receives "information 12701 related to support for (simultaneous) communication via a plurality of modulated signals" that is transmitted by a repeater. Upon the AP knowing that it supports this communication, the AP transmits a plurality of modulated signals, as described in Embodiment B1 through Embodiment B10 and the variations thereof.

A repeater receives "information 12701 related to support for (simultaneous) communication via a plurality of modulated signals" that is transmitted by a terminal. Upon the repeater knowing that it supports this communication, the repeater transmits a plurality of modulated signals so that the terminal can receive plurality of modulated signals, as described in Embodiment B1 through Embodiment B10 and the variations thereof.

Note that there are also cases in which the AP and the terminal communicate. The following occurs in such cases.

The AP receives "information 12701 related to support for (simultaneous) communication via a plurality of modulated signals" that is transmitted by a terminal. Upon the AP knowing that it supports this communication, the AP transmits a plurality of modulated signals, as described in Embodiment B1 through Embodiment B10 and the variations thereof.

The terminal receives "information 12701 related to support for (simultaneous) communication via a plurality of modulated signals" that is transmitted by the AP. Upon the terminal knowing that it supports this communication, the terminal transmits a plurality of modulated signals, as described in Embodiment B1 through Embodiment B10 and the variations thereof.

The following configurations are also acceptable.

For example, the AP, repeaters, and terminal transmit information for notifying whether (simultaneous) reception via a plurality of modulated signals is supported or not. This is illustrated in FIG. 128.

In FIG. 128, time is represented on the horizontal axis. For example, the capability field is illustrated in FIG. 128. Part of the capability field includes information 12801 related to support for (simultaneous) reception via a plurality of modulated signals. Information 12801 related to support for (simultaneous) reception via a plurality of modulated signals is information for notifying whether (simultaneous) reception via a plurality of modulated signals is supported or not. However, information 12801 related to support for (simultaneous) reception via a plurality of modulated signals may be transmitted outside of the capability field.

For example, the AP, repeaters, and terminal transmit information for notifying whether (simultaneous) transmission via a plurality of modulated signals is supported or not. This is illustrated in FIG. 129.

In FIG. 129, time is represented on the horizontal axis. For example, the capability field is illustrated in FIG. 129. Part of the capability field includes information 12901 related to support for (simultaneous) transmission via a plurality of modulated signals. Information 12901 related to support for (simultaneous) transmission via a plurality of modulated signals is information for notifying whether (simultaneous) transmission via a plurality of modulated signals is supported or not. However, information 12901 related to support for (simultaneous) transmission via a plurality of modulated signals may be transmitted outside of the capability field.

The AP may transmit information 12801 related to support for (simultaneous) reception via a plurality of modulated signals and information 12901 related to support for (simultaneous) transmission via a plurality of modulated signals.

A repeater may transmit information 12801 related to support for (simultaneous) reception via a plurality of modulated signals and information 12901 related to support for (simultaneous) transmission via a plurality of modulated signals.

The terminal may transmit information 12801 related to support for (simultaneous) reception via a plurality of modulated signals and information 12901 related to support for (simultaneous) transmission via a plurality of modulated signals.

The AP receives "information 12801 related to support for (simultaneous) reception via a plurality of modulated signals" that is transmitted by a repeater. Upon the AP knowing that it supports this reception, the AP transmits a plurality of modulated signals, as described in Embodiment B1 through Embodiment B10 and the variations thereof.

A repeater receives "information 12801 related to support for (simultaneous) reception via a plurality of modulated signals" that is transmitted by the terminal. Upon the repeater knowing that it supports this reception, the repeater transmits a plurality of modulated signals so that the terminal can receive plurality of modulated signals, as described in Embodiment B1 through Embodiment B10 and the variations thereof.

The terminal receives "information 12901 related to support for (simultaneous) transmission via a plurality of modulated signals" that is transmitted by a repeater. Upon the terminal knowing that it supports this transmission, the terminal determines that reception of a plurality of modulated signals is required, as described in Embodiment B1 through Embodiment B10 and the variations thereof.

The AP receives "information 12901 related to support for (simultaneous) transmission via a plurality of modulated signals" that is transmitted by a repeater. Upon the AP knowing that it supports this transmission, the AP determines that reception of a plurality of modulated signals is required, as described in Embodiment B1 through Embodiment B10 and the variations thereof.

A repeater receives "information 12901 related to support for (simultaneous) transmission via a plurality of modulated signals" that is transmitted by the terminal. Upon the repeater knowing that it supports this transmission, the repeater determines that reception of a plurality of modulated signals is required, as described in Embodiment B1 through Embodiment B10 and the variations thereof.

A repeater receives "information 12901 related to support for (simultaneous) transmission via a plurality of modulated signals" that is transmitted by the AP. Upon the repeater knowing that it supports this transmission, the repeater determines that reception of a plurality of modulated signals is required, as described in Embodiment B1 through Embodiment B10 and the variations thereof.

Note that there are also cases in which the AP and the terminal communicate. The following occurs in such cases.

The AP receives "information 12801 related to support for (simultaneous) reception via a plurality of modulated signals" that is transmitted by the terminal. Upon the AP knowing that it supports this reception, the AP transmits modulated signals of a plurality of frequency bands, as described in Embodiment B1 through Embodiment B10 and the variations thereof.

The terminal receives "information 12801 related to support for (simultaneous) reception via a plurality of modulated signals" that is transmitted by the AP. Upon the terminal knowing that it supports this reception, the terminal transmits a plurality of modulated signals so that the terminal can receive plurality of modulated signals, as described in Embodiment B1 through Embodiment B10 and the variations thereof.

The method of repeating the modulated signals used by a repeater is not limited to the methods described in Embodiment B1 through Embodiment B10 and the variations thereof.

For example, a repeater may receive a first modulated signal, and transmit a modulated signal corresponding to the first modulated signal, using the same frequency as the frequency used by the first modulated signal.

However, when a repeater receives a first modulated signal and a second modulated signal, and upon repeating the modulated signals, transmits a third modulated signal corresponding to the first modulated signal and a fourth modulated signal corresponding to the second modulated signal, the frequency used by the third modulated signal and the frequency used by the fourth modulated signal are different, or the channel used by the third modulated signal and the channel used by the fourth modulated signal are different.

Note that when the communication device receives the capability field described above from a communication partner and transmits modulated signals, the communication device may transmit a trigger frame for notifying of the transmission timing of each of the modulated signals. For example, as a result of the communication partner receiving this trigger frame, the communication partner knows the temporal positional relationship of the plurality of modulated signals.

Supplemental Information B5

Next, a variation of Embodiment B1 through Embodiment B10 and the like will be described.

A first example of the variation will be described with reference to FIG. 130. In FIG. 130, elements which operate in the same manner as those in other figures are assigned with the same reference signs.

The characterizing feature of the configuration illustrated in FIG. 130 is the inclusion of communication device 13001 that includes access point B101, repeater #1 labeled B102_1, and repeater #2 labeled B102_2.

Here, in communication device 13001, communication between access point B101 and repeater #1 labeled B102_1 may be wired (via a bus connection or via a connector) or wireless communication.

Moreover, in communication device 13001, communication between access point B101 and repeater #2 labeled B102_2 may be wired (via a bus connection or via a connector) or wireless communication.

Repeater #1 labeled B102_1 included in communication device 13001 transmits a modulated signal to one or more terminals from among terminal #1 labeled B103_1, terminal #2 labeled B103_2, and terminal #3 labeled B103_3. With this, repeater #1 labeled B102_1 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Similarly, repeater #2 labeled B102_2 included in communication device 13001 transmits a modulated signal to one or more terminals from among terminal #1 labeled B103_1, terminal #2 labeled B103_2, and terminal #3 labeled B103_3. With this, repeater #2 labeled B102_2 transmits desired data to one or more terminals from among terminal #1 labeled B103_1, terminal #2 labeled B103_2, and terminal #3 labeled B103_3. As examples of frames of the modulated signal transmitted by repeater #2 labeled B102_2 in this case have already been described in other embodiments, repeated description will be omitted.

Accordingly, repeater #1 labeled B102_1 uses, for example, OFDM or OFDMA when transmitting the modulated signal. Repeater #2 labeled B102_2 also uses, for example, OFDM or OFDMA when transmitting the modulated signal.

For example, the data transmitted to one or more terminals by repeater #1 labeled B102_1 included in communication device 13001 is obtained from access point B101 included in communication device 13001. Here, communication between access point B101 and repeater #1 labeled B102_1 may be wired or wireless communication.

Moreover, the data transmitted to one or more terminals by repeater #2 labeled B102_2 included in communication device 13001 is obtained from access point B101 included in communication device 13001. Here, communication between access point B101 and repeater #2 labeled B102_2 may be wired or wireless communication.

As described in the present specification, access point B101 illustrated in FIG. 130 may be referred to as a communication device, and may be referred to as a controller, control device, server, computer, mobile phone, smartphone, node, mesh node, etc. However, the naming is not limited to these examples. Other examples are as described throughout the present specification.

Moreover, repeater #1 labeled B102_1 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Repeater #2 labeled B102_2 may be referred to as a communication device, and may be referred to as an access point, base station, wireless communication device, server, computer, mobile phone, smartphone, node, mesh node, control, control device, etc. However, the naming is not limited to these examples. Other examples are as described throughout the present specification.

Communication device 13001 may be referred to as a wireless communication device, access point, controller, control device, server, base station, computer, node, mesh node, mobile phone, smartphone, master access point, etc. However, the naming is not limited to these examples.

Next, a second example of the variation will be described with reference to FIG. 131. In FIG. 131, elements which operate in the same manner as those in other figures are assigned with the same reference signs. Note that FIG. 131 is based on FIG. 97.

The characterizing feature of the configuration illustrated in FIG. 131 is the inclusion of communication device 13101 that includes access point B101 and repeater #1 labeled B102_1.

Here, in communication device 13001, communication between access point B101 and repeater #1 labeled B102_1 may be wired (via a bus connection or via a connector) or wireless communication.

In FIG. 131, access point B101 included in communication device 13101 transmits a modulated signal to one or more terminals from among terminal #1 labeled B103_1, terminal #2 labeled B103_2, and terminal #3 labeled B103_3. With this, access point B101 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Similarly, repeater #1 labeled B102_1 included in communication device 13101 transmits a modulated signal to one or more terminals from among terminal #1 labeled B103_1, terminal #2 labeled B103_2, and terminal #3 labeled B103_3. With this, repeater #1 labeled B102_1 transmits desired data to one or more terminals from among terminal #1 labeled B103_1, terminal #2 labeled B103_2, and terminal #3 labeled B103_3. As detailed examples of frames of the modulated signal transmitted by repeater #1 labeled B102_1 in this case have already been described in other embodiments, repeated description will be omitted.

Accordingly, access point B100 uses, for example, OFDM or OFDMA when transmitting the modulated signal. Repeater #1 labeled B102_1 also uses, for example, OFDM or OFDMA when transmitting the modulated signal.

For example, the data transmitted to one or more terminals by repeater #1 labeled B102_1 included in communication device 13101 is obtained from access point B101 included in communication device 13101. Here, communication between access point B101 and repeater #1 labeled B102_1 may be wired or wireless communication.

As described in the present specification, access point B101 illustrated in FIG. 131 may be referred to as a communication device, and may be referred to as a controller, control device, server, base station, wireless communication device, computer, mobile phone, smartphone, node, mesh node, master access point, etc. However, the naming is not limited to these examples. Other examples are as described throughout the present specification.

Moreover, repeater #1 labeled B102_1 may be referred to as a communication device, and may be referred to as an access point, base station, wireless communication device, server, computer, mobile phone, smartphone, node, mesh node, slave access point, control, control device, etc. However, the naming is not limited to these examples. Other examples are as described throughout the present specification.

Communication device 13101 may be referred to as a wireless communication device, access point, controller, control device, server, base station, computer, node, mesh node, mobile phone, smartphone, master access point, etc. However, the naming is not limited to these examples.

Supplemental Information B6

Although the terminology access point, repeater, terminal, and communication device are used in the present specification, the naming of these devices is not limited to these examples. Each of the access point, repeater, terminal, and communication device may be referred to as an access point, repeater, terminal, communication device, wireless communication device, control device, controller, gateway, node, mesh node, master access point, slave access point, broadcast station, base station, computer, server, mobile phone, smartphone, tablet, television, or camera, etc.

In Embodiment B1 through Embodiment B11 and the variations thereof, a case in which the access point transmits a modulated signal is described. Here, the access point may transmit this modulated signal as a first beam and transmit a different modulated signal as a second beam, and there may be a period in which the first beam and the second beam are transmitted simultaneously. Note that the method used to transmit the plurality of beams simultaneously is the same as described throughout the present specification.

In Embodiment B1 through Embodiment B11 and the variations thereof, a case in which a repeater transmits a modulated signal is described. Here, the repeater may transmit this modulated signal as a third beam and transmit a different modulated signal as a fourth beam, and there may be a period in which the third beam and the fourth beam are transmitted simultaneously. Note that the method used to transmit the plurality of beams simultaneously is the same as described throughout the present specification.

In Embodiment B1 through Embodiment B11 and the variations thereof, a case in which the terminal transmits a modulated signal is described. Here, the terminal may transmit this modulated signal as a fifth beam and transmit a different modulated signal as a sixth beam, and there may be a period in which the fifth beam and the sixth beam are transmitted simultaneously. Note that the method used to transmit the plurality of beams simultaneously is the same as described throughout the present specification.

In Embodiment B1 through Embodiment B11 and the variations thereof, a case in which the communication device transmits a modulated signal is described. Here, the communication device may transmit this modulated signal as a seventh beam and transmit a different modulated signal as an eighth beam, and there may be a period in which the seventh beam and the eighth beam are transmitted simultaneously. Note that the method used to transmit the plurality of beams simultaneously is the same as described throughout the present specification.

In Embodiment 1 through Embodiment 7 and the variations thereof, a case in which the same data is transmitted using a plurality of beams is described, but when this is applied to Embodiment B1 through Embodiment B11 and the variations thereof, different data may be transmitted using a plurality of beams.

In Embodiment 1 through Embodiment 7 and the variations thereof, an example of a case in which a single signal processor performs transmission or reception using a plurality of beams is given, but a plurality of signal processors may be used. In such cases, the plurality of signal processors may operate individually, and, alternatively, may be ganged.

For example, when the plurality of signal processors operate individually, each of the plurality of signal processors may communicate via transmission and reception of signals at different timings in parallel.

The plurality of signal processors may be configured so as to only be able to perform a specific operation among the above-described plurality of operations, and, alternatively, may be configured so as to be capable of switching between the operations.

Moreover, the plurality of signal processors may each include one or more unique antennas, and, alternatively, the plurality of signal processors may share one or more common antennas.

The present disclosure as described above includes the following aspects, for example.

A first transmitting device according to one aspect of the present disclosure includes: a first transmission unit that transmits data destined for a first terminal to the first terminal; and a second transmission unit that transmits data destined for a second terminal to an other transmitting device. The data destined for the first terminal is transmitted in a first frequency resource included in a first OFDM signal transmitted on a first frequency channel. The data destined for the second terminal is transmitted in a second frequency resource included in a second OFDM signal transmitted on the first frequency channel by the other transmitting device. A subcarrier of the first frequency resource is different than a subcarrier of the second frequency resource. A first period in which the first OFDM signal is transmitted and a second period in which the second OFDM signal is transmitted at least partially overlap. The second frequency resource of the first OFDM signal does store any data, and the first frequency resource of the second OFDM signal does not store any data.

With a second transmitting device according to one aspect of the present disclosure, the first transmission unit in the first transmitting device stores data destined for at least one other terminal in a third OFDM signal, and transmits the third OFDM signal in a second period that at least partially overlaps with the first period.

With a third transmitting device according to one aspect of the present disclosure, in the second transmitting device, a first frequency resource and a second frequency resource of the third OFDM signal store data destined for the at least one other terminal.

With a fourth transmitting device according to one aspect of the present disclosure, in the second transmitting device, the first frequency resource of the third OFDM signal stores data destined for the at least one other terminal, and the second frequency resource of the third OFDM signal does not store any data.

With a fifth transmitting device according to one aspect of the present disclosure, in the first transmitting device, the second transmission unit transmits a signal that specifies a timing at which to transmit the second OFDM signal to the other transmitting device.

A first transmitting method according to one aspect of the present disclosure is implemented by a transmitting device and includes: transmitting data destined for a first terminal to the first terminal; and transmitting data destined for a second terminal to an other transmitting device. The data destined for the first terminal is transmitted in a first frequency resource included in a first OFDM signal transmitted on a first frequency channel. The data destined for the second terminal is transmitted in a second frequency resource included in a second OFDM signal transmitted on the first frequency channel by the other transmitting device. A subcarrier of the first frequency resource is different than a subcarrier of the second frequency resource. A period in which the first OFDM signal is transmitted and a period in which the second OFDM signal is transmitted at least partially overlap. The second frequency resource of the first OFDM signal does store any data, and the first frequency resource of the second OFDM signal does not store any data.

Although the above uses the phrases "a frequency resource stores data" and "a frequency resource does not store any data", these can be restated as follows. For example, these may be restated as "a frequency resource includes a mapped modulated signal generated by modulating data" and "a frequency resource does not include a mapped modulated signal generated by modulating data", and may be restated as "a subcarrier of a frequency resource includes a mapped modulated signal generated by modulating data" and "a subcarrier of a frequency resource does not include a mapped modulated signal generated by modulating data".

Note that in the above embodiments, each element may be configured as dedicated hardware or may be realized by executing a software program suitable for the element. Each of the elements may be realized by means of a program executing unit, such as a central processing unit (CPU) and a processor, reading and executing the software program recorded on a recording medium such as a hard disk or a semiconductor memory. Here, the software program for realizing the system or device according to each of the embodiments is, for example, the program described below.

Supplemental Information B7

(1) In a system like that illustrated in FIG. 132A, FIG. 132B, and FIG. 132C, in particular with regard to the disclosure related to the configuration of the repeater, one example of the configuration of the repeater illustrated in FIG. 132A, FIG. 132B, and FIG. 132C is illustrated in FIG. 133. That is, repeater 13201 communicates with one or more access points. Repeater 13201 transmits a signal corresponding to the modulated signal transmitted by an access point to terminal B103. Moreover, repeater 13201 transmits a signal corresponding to the modulated signal transmitted by terminal B103 to an access point.

Here, as illustrated in the figures, in the communication between the one or more access points and repeater 13201, the $A^{th}$ frequency band and the $B^{th}$ frequency band are used. Moreover, in the communication between terminal B103 and the repeater, the $A^{th}$ frequency band and the $B^{th}$ frequency band are used.

When repeater 13201 receives a modulated signal of the $A^{th}$ frequency band transmitted by an access point, repeater 13201 converts the modulated signal to the $B^{th}$ frequency band and transmits the converted modulated signal to terminal B103. When repeater 13201 receives a modulated signal of the $B^{th}$ frequency band transmitted by an access point, repeater 13201 converts the modulated signal to the $A^{th}$ frequency band and transmits the converted modulated signal to terminal B103.

When repeater 13201 receives a modulated signal of the $A^{th}$ frequency band transmitted by terminal B103, repeater 13201 converts the modulated signal to the $B^{th}$ frequency band and transmits the converted modulated signal to an access point. When repeater 13201 receives a modulated signal of the $B^{th}$ frequency band transmitted by the terminal, repeater 13201 converts the modulated signal to the $A^{th}$ frequency band and transmits the converted modulated signal to an access point.

Note that these points are also covered in the other embodiments.

Repeater 13201 has the configuration illustrated in, for example, FIG. 133. In such cases, as a first configuration, the elements in the repeater illustrated in FIG. 133 have the configurations illustrated in FIG. 134, FIG. 135, FIG. 136, and FIG. 137. As a second configuration, the elements in the repeater illustrated in FIG. 133 have the configurations illustrated in FIG. 138, FIG. 139, FIG. 140, and FIG. 141.

$A^{th}$ frequency band communication device 13303 illustrated in FIG. 133 is a communication device for communicating with an access point. Antenna 13301 is an antenna for transmitting and receiving modulated signals of the $A^{th}$ frequency band for communicating with an access point.

$B^{th}$ frequency band communication device 13305 is a communication device for communicating with the terminal. Antenna 13307 is an antenna for transmitting and receiving modulated signals of the $B^{th}$ frequency band for communicating with the terminal.

$B^{th}$ frequency band communication device 13353 is a communication device for communicating with an access point. Antenna 13351 is an antenna for transmitting and receiving modulated signals of the $B^{th}$ frequency band for communicating with an access point.

$A^{th}$ frequency band communication device 13355 is a communication device for communicating with the terminal. Antenna 13357 is an antenna for transmitting and receiving modulated signals of the $A^{th}$ frequency band for communicating with the terminal.

$A^{th}$ frequency band communication device 13303 receives a modulated signal transmitted by an access point, and transmits part of the data to $A^{th}$ frequency band communication device 13355 (signal 13311).

Similarly, $B^{th}$ frequency band communication device 13353 receives a modulated signal transmitted by an access point, and transmits part of the data to $B^{th}$ frequency band communication device 13305 (signal 13361).

Hereinafter, a repeater having the first configuration illustrated in FIG. 134, FIG. 135, FIG. 136, and FIG. 137, and a repeater having the second configuration illustrated in FIG. 138, FIG. 139, FIG. 140, and FIG. 141 will be described.

(1-1) Repeater Having First Configuration Illustrated in FIG. 134, FIG. 135, FIG. 136, and FIG. 137

The SSID for communication performed by access point B101 (in FIG. 132A) (or access point #1 labeled B101_1 (in FIG. 132B and FIG. 132C)) using the $A^{th}$ frequency band, and the SSID for communication performed by access point B101 (or access point #2 labeled B101_2) using the $B^{th}$ frequency band are different. A and B are different. Hereinafter, the "SSID for communication performed by access point B101 (or access point #1 labeled B101_1) using the $A^{th}$ frequency band" will be referred to as "SSID #X", and the "SSID for communication performed by access point B101 (or access point #2 labeled B101_2) using the $B^{th}$ frequency band" will be referred to as "SSID #Y".

Operations are as illustrated in FIG. 134, FIG. 135, FIG. 136, and FIG. 137.

FIG. 134 illustrates a configuration related to $A^{th}$ frequency band communication device 13303 in FIG. 133.

An example of operations performed when an access point (AP) transmits a data frame and a MAC frame using the $A^{th}$ frequency band will be given. The MAC frame will be described in greater detail later.

$A^{th}$ frequency band transceiver device 13403 illustrated in FIG. 134 corresponds to part of $A^{th}$ frequency band communication device 13303 in FIG. 133, and antennas 13401 and 13415 illustrated in FIG. 134 correspond to antenna 13301 in FIG. 133.

Here, the SSID of the access point (AP) when the $A^{th}$ frequency band is used will be referred to as SSID #X.

Part of signal line 13404 corresponds to part of signal line 13304 illustrated in FIG. 133.

Signal line 13411 corresponds to part of signal line 13304 illustrated in FIG. 133.

Signal line 13406 corresponds to signal line 13311 illustrated in FIG. 133, and, for example, carries a signal including SSID #X information.

For example, antennas 13401 and 13415 communicate with an access point. The data frame and MAC frame transmitted by the AP using the $A^{th}$ frequency band are received at antenna 13401 illustrated in FIG. 134.

SSID extractor 13405 extracts service set identifier (SSID) included in, for example, the data frame and MAC frame (for example, a beacon frame) in the $A^{th}$ frequency band. With this, SSID #X is obtained. However, the frame from which SSID #X can be obtained is not limited to a beacon frame.

Signal 13411 illustrated in FIG. 134 is a signal that is obtained by $B^{th}$ frequency band communication device 13305 in FIG. 133 receiving the $B^{th}$ frequency band modulated signal transmitted by the terminal. SSID checker 13412 rewrites an SSID (in this example, SSID #Y) included in, for example, the probe request or association request in the MAC frame transmitted by the terminal in the $B^{th}$ frequency band. Accordingly, when an SSID is included in signal 13411, the SSID in the signal input into SSID checker 13412 is SSID #Y, but after passing through SSID checker 13412, the SSID is rewritten to SSID #X. When no SSID is included in the frame, SSID checker 13412 outputs (13413) the input signal without performing any operations on the input signal.

$A^{th}$ frequency band transceiver device 13403 receives an input of signal 13413, generates an $A^{th}$ frequency band modulated signal, and outputs the $A^{th}$ frequency band modulated signal from antenna 13415 as radio waves.

FIG. 135 illustrates a configuration related to $B^{th}$ frequency band communication device 13353 in FIG. 133.

An example of operations performed when an AP transmits a data frame and a MAC frame using the $B^{th}$ frequency band will be given.

$B^{th}$ frequency band receiving device 13503 illustrated in FIG. 135 corresponds to part of $B^{th}$ frequency band communication device 13353 in FIG. 133, and antennas 13501 and 13515 illustrated in FIG. 135 correspond to antenna 13351 in FIG. 133.

Here, the SSID of the AP when the $B^{th}$ frequency band is used will be referred to as SSID #Y.

Part of signal line 13504 corresponds to part of signal line 13354 illustrated in FIG. 133.

Signal line 13511 corresponds to part of signal line 13354 illustrated in FIG. 133.

Signal line 13506 corresponds to signal line 13361 illustrated in FIG. 133, and, for example, carries a signal including SSID #Y information.

For example, antennas 13501 and 13515 communicate with an access point. In this case, the data frame and MAC frame transmitted by the AP using the $B^{th}$ frequency band are received at antenna 13501 illustrated in FIG. 135.

SSID extractor 13505 extracts service set identifier (SSID) included in, for example, the data frame and MAC frame (for example, a beacon frame) in the $B^{th}$ frequency band. With this, SSID #Y is obtained. However, the frame from which SSID #Y can be obtained is not limited to a beacon frame.

Signal 13511 illustrated in FIG. 135 is a signal that is obtained by $A^{th}$ frequency band communication device 13555 in FIG. 133 receiving the $A^{th}$ frequency band modulated signal transmitted by the terminal. SSID checker 13512 rewrites an SSID (in this example, SSID #X) included in, for example, the probe request or association request in the MAC frame transmitted by the terminal in the $A^{th}$ frequency band. Accordingly, when an SSID is included in signal 13511, the SSID in the signal input into SSID checker 13512 is SSID #X, but after passing through SSID checker 13512, the SSID is rewritten to SSID #Y. When no SSID is included in the frame, SSID checker 13512 outputs (13513) the input signal without performing any operations on the input signal.

$B^{th}$ frequency band transceiver device 13503 receives an input of signal 13513, generates a $B^{th}$ frequency band modulated signal, and outputs the $B^{th}$ frequency band modulated signal from antenna 13515 as radio waves.

FIG. 136 illustrates a configuration related to $B^{th}$ frequency band communication device 13305 in FIG. 133.

Signal line 13601 corresponds to part of signal line 13304 illustrated in FIG. 133, and corresponds to signal line 13404 illustrated in FIG. 134.

Signal line 13613 corresponds to signal line 13304 illustrated in FIG. 133, and corresponds to signal line 13411 illustrated in FIG. 134. Signal line 13602 corresponds to signal line 13361 illustrated in FIG. 133, and corresponds to signal line 13506 illustrated in FIG. 135. Antennas 13607 and 13611 transmit and receive signals to and from the terminal, for example. Here, signals transmitted to and from the terminal use the $B^{th}$ frequency band. SSID checker 13603 rewrites an SSID (in this example, SSID #X) included in, for example, the beacon, probe response, or association response in a frame, such as the MAC frame, transmitted by the AP in the $A^{th}$ frequency band. Accordingly, when an SSID is included in signal 13601, the SSID in the signal input into SSID checker 13603 is SSID #X, but after passing through SSID checker 13603, the SSID is rewritten to SSID #Y. When no SSID is included in the frame, SSID checker 13603 outputs (13604) the input signal without performing any operations on the input signal.

$B^{th}$ frequency band transceiver device 13605 receives an input of signal 13604, generates a $B^{th}$ frequency band modulated signal, and outputs the $B^{th}$ frequency band modulated signal from antenna 13607 as radio waves.

Antenna 13611 receives the $B^{th}$ frequency band modulated signal transmitted by the terminal, and $B^{th}$ frequency band transceiver device 13605 processes the received signal and outputs signal 13613.

FIG. 137 illustrates a configuration related to $A^{th}$ frequency band communication device 13355 in FIG. 133.

Signal line 13701 corresponds to part of signal line 13354 illustrated in FIG. 133, and corresponds to signal line 13504 illustrated in FIG. 135.

Signal line 13713 corresponds to signal line 13354 illustrated in FIG. 133, and corresponds to signal line 13511 illustrated in FIG. 135.

Signal line 13702 corresponds to signal line 13311 illustrated in FIG. 133, and corresponds to signal line 13406 illustrated in FIG. 134.

For example, antennas 13707 and 13711 communicate with the terminal. Here, the $A^{th}$ frequency band is used.

SSID checker 13703 rewrites an SSID (in this example, SSID #Y) included in, for example, the beacon, probe response, or association response in the MAC frame transmitted by the AP in the $B^{th}$ frequency band. Accordingly, when an SSID is included in signal 13701, the SSID in the signal input into SSID checker 13703 is SSID #Y, but after passing through SSID checker 13703, the SSID is rewritten to SSID #X. When no SSID is included in the frame, SSID checker 13703 outputs (13704) the input signal without performing any operations on the input signal.

$A^{th}$ frequency band transceiver device 13705 receives an input of signal 13704, generates an $A^{th}$ frequency band modulated signal, and outputs the $A^{th}$ frequency band modulated signal from antenna 13707 as radio waves.

Antenna 13711 receives the $A^{th}$ frequency band modulated signal transmitted by the terminal, and $A^{th}$ frequency band transceiver device 13705 processes the received signal and outputs signal 13713.

(1-2) Repeater Having Second Configuration Illustrated in FIG. 138, FIG. 139, FIG. 140, and FIG. 141

The MAC address for communication performed by access point B101 (in FIG. 132A) (or access point #1 labeled B101_1 (in FIG. 132B and FIG. 132C)) using the $A^{th}$ frequency band, and the MAC address for communication performed by access point B101 (or access point #2 labeled B101_2) using the $B^{th}$ frequency band are different. A and B are different. Hereinafter, the "MAC address for communication performed by access point B101 (or access point #1 labeled B101_1) using the $A^{th}$ frequency band" will be referred to as "MAC address X", and the "MAC address for communication performed by access point B101 (or access point #2 labeled B101_2) using the $B^{th}$ frequency band" will be referred to as "MAC address Y".

Operations are as illustrated in FIG. 138, FIG. 139, FIG. 140, and FIG. 141.

FIG. 138 illustrates a configuration related to $A^{th}$ frequency band communication device 13303 in FIG. 133.

An example of operations performed when an AP transmits a data frame and a MAC frame using the $A^{th}$ frequency band will be given. The MAC frame will be described in greater detail later.

In FIG. 138, elements which operate in the same manner as those in FIG. 134 are assigned with the same reference signs, and as they have already been described, repeated description thereof will be omitted here.

Here, the MAC address of AP when the $A^{th}$ frequency band is used is MAC address #X.

Part of signal line 13404 corresponds to part of signal line 13304 illustrated in FIG. 133.

Signal line 13411 corresponds to part of signal line 13304 illustrated in FIG. 133.

Signal line 13802 corresponds to signal line 13311 illustrated in FIG. 133, and, for example, carries a signal including MAC address #X information.

For example, antennas 13401 and 13415 communicate with an access point. The data frame and MAC frame transmitted by the AP using the $A^{th}$ frequency band are received at antenna 13401 illustrated in FIG. 138. MAC address extractor 13801 extracts a source address (SA) in the data frame and MAC frame (for example, the beacon frame) in the $A^{th}$ frequency band. With this, MAC address #X is obtained. However, the frame from which MAC address #X can be obtained is not limited to a beacon frame. Signal 13411 illustrated in FIG. 138 is a signal that is obtained by $B^{th}$ frequency band communication device 13305 in FIG. 133 receiving the $B^{th}$ frequency band modulated signal transmitted by the terminal. MAC address checker 13811 rewrites a destination address (DA) (in this example, the DA is MAC address #Y) included in, for example, an RTS, CTS, or ACK frame, a probe request, or an association request in the MAC frame or in the data frame transmitted by the terminal in the $B^{th}$ frequency band. Accordingly, when a DA is included in signal 13411, the DA in the signal input into MAC address checker 13811 is MAC address #Y, but after passing through MAC address checker 13811, the DA is rewritten to MAC address #X. When no DA is included in the frame, MAC address checker 13811 outputs (13812) the input signal without performing any operations on the input signal.

$A^{th}$ frequency band transceiver device 13403 receives an input of signal 13812, generates an $A^{th}$ frequency band modulated signal, and outputs the $A^{th}$ frequency band modulated signal from antenna 13415 as radio waves.

FIG. 139 illustrates a configuration related to $B^{th}$ frequency band communication device 13353 in FIG. 133.

An example of operations performed when an AP transmits a data frame and a MAC frame using the $A^{th}$ frequency band will be given.

In FIG. 139, elements which operate in the same manner as those in FIG. 135 are assigned with the same reference signs, and as they have already been described, repeated description thereof will be omitted here.

Here, the MAC address of AP when the $B^{th}$ frequency band is used is MAC address #Y. Part of signal line 13504 corresponds to part of signal line 13354 illustrated in FIG. 133.

Signal line 13511 corresponds to part of signal line 13354 illustrated in FIG. 133.

Signal line 13902 corresponds to signal line 13361 illustrated in FIG. 133, and, for example, carries a signal including MAC address #Y information. For example, antennas 13501 and 13515 communicate with an access point. The data frame and MAC frame transmitted by the AP using the $B^{th}$ frequency band are received at antenna 13501 illustrated in FIG. 139. MAC address extractor 13901 extracts a source address (SA) in the data frame and MAC frame (for example, the beacon frame) in the $B^{th}$ frequency band. With this, MAC address #Y is obtained. However, the frame from which MAC address #Y can be obtained is not limited to a beacon frame.

Signal 13511 illustrated in FIG. 139 is a signal that is obtained by $A^{th}$ frequency band communication device 13355 in FIG. 133 receiving the $A^{th}$ frequency band modulated signal transmitted by the terminal. MAC address checker 13911 rewrites a destination address (DA) (in this example, the DA is MAC address #X) included in, for example, an RTS, CTS, or ACK frame, a probe request, or an association request in the MAC frame or in the data frame transmitted by the terminal in the $A^{th}$ frequency band. Accordingly, when a DA is included in signal 13511, the DA in the signal input into MAC address checker 13911 is MAC address #X, but after passing through MAC address checker 13911, the DA is rewritten to MAC address #Y. When no DA is included in the frame, MAC address checker 13911 outputs (13912) the input signal without performing any operations on the input signal.

$B^{th}$ frequency band transceiver device 13503 receives an input of signal 13912, generates a $B^{th}$ frequency band modulated signal, and outputs the $B^{th}$ frequency band modulated signal from antenna 13515 as radio waves.

FIG. 140 illustrates a configuration related to $B^{th}$ frequency band communication device 13305 in FIG. 133.

Signal line 13601 corresponds to part of signal line 13304 illustrated in FIG. 133, and corresponds to signal line 13404 illustrated in FIG. 138.

Signal line 13613 corresponds to part of signal line 13304 illustrated in FIG. 133, and corresponds to signal line 13411 illustrated in FIG. 138.

Signal line 14001 corresponds to signal line 13361 illustrated in FIG. 133, and corresponds to signal line 13902 illustrated in FIG. 139.

For example, antennas 13607 and 13611 communicate with the terminal. Here, the $A^{th}$ frequency band is used.

MAC address checker 14002 rewrites a source address (SA) (in this example, the SA is MAC address #X) included in, for example, an RTS, a probe response, or an association response in the MAC frame or in the data frame transmitted by the AP in the $A^{th}$ frequency band. Accordingly, when an SA is included in signal 13601, the SA in the signal input into MAC address checker 14002 is MAC address #X, but after passing through MAC address checker 14002, the SA is rewritten to MAC address #Y. When no SA is included in the frame, MAC address checker 14002 outputs (14003) the input signal without performing any operations on the input signal.

$B^{th}$ frequency band transceiver device 13605 receives an input of signal 14003, generates a $B^{th}$ frequency band modulated signal, and outputs the $B^{th}$ frequency band modulated signal from antenna 13607 as radio waves.

Antenna 13611 receives the $B^{th}$ frequency band modulated signal transmitted by the terminal, and $B^{th}$ frequency band transceiver device 13605 processes the received signal and outputs signal 13613.

FIG. 141 illustrates a configuration related to $A^{th}$ frequency band communication device 13355 in FIG. 133.

Signal line 13701 corresponds to part of signal line 13354 illustrated in FIG. 133, and corresponds to signal line 13504 illustrated in FIG. 139.

Signal line 13713 corresponds to signal line 13354 illustrated in FIG. 133, and corresponds to signal line 13511 illustrated in FIG. 139.

Signal line 14101 corresponds to signal line 13311 illustrated in FIG. 133, and corresponds to signal line 13802 illustrated in FIG. 138.

For example, antennas 13707 and 13711 communicate with the terminal. Here, the $B^{th}$ frequency band is used. MAC address checker 14102 rewrites a source address (SA)

(in this example, the SA is MAC address #Y) included in, for example, an RTS, a probe response, or an association response in the MAC frame or in the data frame transmitted by the AP in the $B^{th}$ frequency band. Accordingly, when an SA is included in signal 13701, the SA in the signal input into MAC address checker 14102 is MAC address #Y, but after passing through MAC address checker 14102, the SA is rewritten to MAC address #X. When no SA is included in the frame, MAC address checker 14102 outputs (14103) the input signal without performing any operations on the input signal.

$A^{th}$ frequency band transceiver device 13705 receives an input of signal 14103, generates an $A^{th}$ frequency band modulated signal, and outputs the $A^{th}$ frequency band modulated signal from antenna 13707 as radio waves.

Antenna 13711 receives the $A^{th}$ frequency band modulated signal transmitted by the terminal, and $A^{th}$ frequency band transceiver device 13705 processes the received signal and outputs signal 13713.

(1-3) Variation

The SSID for communication performed by access point B101 (or access point #1 labeled B101_1) using the $A^{th}$ frequency band, and the SSID for communication performed by access point B101 (or access point #2 labeled B101_2) using the $B^{th}$ frequency band are different. A and B are different. Furthermore, the MAC address for communication performed by access point B101 (or access point #1 labeled B101_1) using the $A^{th}$ frequency band, and the MAC address for communication performed by access point B101 (or access point #2 labeled B101_2) using the $B^{th}$ frequency band are different.

Here, the configuration differs from the configuration illustrated in FIG. 134 in regard to the addition of MAC address extractor 13801 and MAC address checker 13811 illustrated in FIG. 138.

Moreover, the configuration differs from the configuration illustrated in FIG. 135 in regard to the addition of MAC address extractor 13901 and MAC address checker 13911 illustrated in FIG. 139.

Moreover, the configuration differs from the configuration illustrated in FIG. 136 in regard to the addition of MAC address checker 14002 illustrated in FIG. 140.

Moreover, the configuration differs from the configuration illustrated in FIG. 137 in regard to the addition of MAC address checker 14102 illustrated in FIG. 141.

(1-4) Variation

In sections (1-1), (1-2), and (1-3) above, the terms $A^{th}$ frequency band and $B^{th}$ frequency band are used, but the $A^{th}$ frequency band may be rewritten as the M channel of the $C^{th}$ frequency band, and the $B^{th}$ frequency band may be rewritten as the N channel of the $C^{th}$ frequency band. Even in such cases, sections (1-1), (1-2), and (1-3) above can be carried out in the same manner.

(2):

Although some examples in the present disclosure use the MAC address, even if a basic service set identifier (BSSID), destination address (DA), or source address (SA) is used instead of the MAC address, the embodiments can be carried out in the same manner.

(3):

Next, one example of operations of the system and the capability frame when the terminal transmits a capability frame to a repeater and the access point will be given.

The capability frame may include the following frames: number of 5 GHz band ($A^{th}$ frequency band) wireless communication units; and number of 6 GHz band ($B^{th}$ frequency band) wireless communication units.

When the capability frame includes the above data, based on the number of wireless communication units notified via the above data, the access point and the repeater determine what frequency and channel to use for communication. A communication method described in the present specification may be included among the determined communication methods (for example, multi-channel communication, multi-band communication).

Note that the terminal need not transmit a capability field related to the number of 5 GHz band ($A^{th}$ frequency band) wireless communication units. When a capability frame that does not include a capability field related to the number of 5 GHz band ($A^{th}$ frequency band) wireless communication units is received, for example, the access point and repeater assumes the number of 5 GHz band ($A^{th}$ frequency band) wireless communication units included in the terminal is 1.

Similarly, note that the terminal need not transmit a capability field related to the number of 6 GHz band ($B^{th}$ frequency band) wireless communication units. When a capability frame that does not include a capability field related to the number of 6 GHz band ($B^{th}$ frequency band) wireless communication units is received, for example, the access point and repeater assumes the number of 6 GHz band ($B^{th}$ frequency band) wireless communication units included in the terminal is 1.

Although the above describes an example in which a capability field that indicates the respective number of 5 GHz band ($A^{th}$ frequency band) and 6 GHz band ($B^{th}$ frequency band) wireless communication units are transmitted, the information notified via the capability field may be different than this example. For example, the capability frame transmitted by the communication device may include a capability field indicating the number of streams that can be simultaneously transmitted/received by the communication device in the 5 GHz band ($A^{th}$ frequency band) and the 6 GHz band ($B^{th}$ frequency band). As another example, the capability frame transmitted by the communication device may include a capability field indicating the number of streams that can be simultaneously transmitted by the communication device in the 5 GHZ band ($A^{th}$ frequency band) and the 6 GHz band ($B^{th}$ frequency band) and the number of streams that can be simultaneously received by the communication device in the 5 GHz band ($A^{th}$ frequency band) and the 6 GHz band ($B^{th}$ frequency band).

(4) Operations performed by the access point described in the present disclosure can be implemented by a communication device including any given sort of device, such as: a communications device/broadcast device, examples of which include a broadcast station, a base station, a terminal, a mobile phone, a smartphone, a tablet, a laptop personal computer, a server, a personal computer, a television, a household appliance, a device in a factory, an Internet of Things (IoT) device; an e Node B (eNB); a g Node B (gNB); a Primary Cell (PCell) eNB or gNB; a Secondary Cell (SCell) eNB or gNB; a Primary SCell (PSCell) eNB or gNB; a Master eNB or gNB; a Secondary eNB or gNB; a repeater; a node; a vehicle; an automobile; a motorcycle; a boat; a satellite; aircraft; a drone; a mobile device; or a robot.

Operations performed by a repeater described in the present disclosure can be implemented by a communication device including any given sort of device, such as: a communications device/broadcast device, examples of which include a broadcast station, a base station, an access point, a terminal, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a node; a vehicle; an automobile; a motorcycle; a boat; a satellite; aircraft; a drone; a mobile device; or a robot.

Operations performed by the terminal described in the present disclosure can be implemented by a communication device including any given sort of device, such as: a communications device/broadcast device, examples of which include a broadcast station, a base station, an access point, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a repeater; a node; a vehicle; an automobile; a motorcycle; a boat; a satellite; aircraft; a drone; a mobile device; or a robot.

(5) Hereinafter, an Example of a MAC Frame Will be Given.

Wireless LAN MAC frames include a management frame, control frame, and a data frame.

Examples of a management frame include a beacon frame, probe request frame, probe response frame, association request frame, and association response frame. Next, the management frame will be described.

An example of a configuration of a beacon frame according to the IEEE 802.11 standard is illustrated in FIG. 142. The values in FIG. 142 indicate the data length of the field they are above, and are in units of bytes.

For example, a beacon frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. A beacon frame also includes the following:
Variable-length Frame Body (field);
4 bytes long Frame Check Sequence (FCS) (field);
8 bytes long Timestamp (field);
2 bytes long Beacon Interval (field);
2 bytes long Capability Info (field);
Variable-length SSID (field);
7 bytes long Frequency Hopping (FH) Parameter Set (field);
2 bytes long Direct Sequence (DS) Parameter Set (field);
8 bytes long Contention Free (CF) Parameter Set (field);
4 bytes long IBSS Parameter Set (field);
Variable-length Traffic Indication Map (TIM) (field);
Variable-length Country (field);
3 bytes long Power Constraint (field);
6 bytes long Channel Switch (field);
8 bytes long Quiet (field);
4 bytes long Transmit Power Control (TPC) Report (field);
Variable-length Effective Radiated Power (ERP) (field);
Variable-length Extended Supported Rates (field); and
Variable-length Robust Security Network (RSN) (field).

Note that in a beacon frame transmitted by an AP, the BSSID is typically the BSSID of the AP, and the SSID is typically the SSID of the AP. The DA is typically all 1's (to indicate broadcast), and the SA and the BSSID are typically the MAC address of the AP.

An example of a configuration of a probe request frame according to the IEEE 802.11 standard is illustrated in FIG. 143. The values in FIG. 143 indicate the data length of the field they are above, and are in units of bytes.

For example, a probe request frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. A probe request frame also includes the following:
Variable-length SSID (field); and
Variable-length Supported Rates (field).

The above make up the Frame Body. A probe request frame also includes the following:
4 bytes long FCS (field).

In a probe request frame transmitted by a terminal, the DA is typically the MAC address of the AP, and the SA and BSSID are typically the MAC address of the terminal. The SSID is typically the SSID of the AP.

An example of a configuration of a probe response frame according to the IEEE 802.11 standard is illustrated in FIG. 144. The values in FIG. 144 indicate the data length of the field they are above, and are in units of bytes.

For example, a probe response frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. A probe response frame also includes the following:
Variable-length Body (field);
4 bytes long Frame Check Sequence (FCS) (field);
8 bytes long Timestamp (field);
2 bytes long Beacon Interval (field);
2 bytes long Capability Info (field);
Variable-length SSID (field);
7 bytes long Frequency Hopping (FH) Parameter Set (field);
2 bytes long Direct Sequence (DS) Parameter Set (field);
8 bytes long Contention Free (CF) Parameter Set (field);
4 bytes long IBSS Parameter Set (field);
Variable-length Country (field);
4 bytes long FH Hopping Parameter (field);
FH Pattern Table (field);
3 bytes long Power Constraint (field);
6 bytes long Variable-length Channel Switch (field);
8 bytes long Quiet (field);
4 bytes long Transmit Power Control (TPC) Report (field);
Variable-length Effective Radiated Power (ERP) (field);
Variable-length Extended Supported Rates (field); and
Variable-length Robust Security Network (RSN) (field).

In a probe response frame transmitted by an AP, the DA is typically the MAC address of a terminal, and the SA and BSSID are typically the MAC address of the AP. The SSID is typically the SSID of the AP.

An example of a configuration of an association request frame according to the IEEE 802.11 standard is illustrated in FIG. 145. The values in FIG. 145 indicate the data length of the field they are above, and are in units of bytes.

For example, an association request frame includes the following: 2 bytes long Frame Control (field);
2 bytes long Duration (field);
6 bytes long Destination Address (DA) (field);

6 bytes long Source Address (SA) (field);
6 bytes long BSSID (field); and
2 bytes long Sequence Control (field).

The above make up the MAC header. An association request frame also includes the following:
2 bytes long Capability Info (field);
2 bytes long Listen Interval (field);
Variable-length SSID (field); and
Variable-length Supported Rates (field).

The above make up the Frame Body. An association request frame also includes the following:
4 bytes long FCS (field).

In an association request frame transmitted by a terminal, the DA is typically the MAC address of the AP, and the SA and BSSID are typically the MAC address of the terminal. The SSID is typically the SSID of the AP.

An example of a configuration of an association response frame according to the IEEE 802.11 standard is illustrated in FIG. 146. The values in FIG. 146 indicate the data length of the field they are above, and are in units of bytes.

For example, a CTS frame includes the following:
2 bytes long Frame Control (field);
2 bytes long Duration (field); and
6 bytes long Destination Address (DA) (field).

A configuration example of an IEEE 802.11 ACK frame is illustrated in FIG. 149. The values in FIG. 149 indicate the data length of the field they are above, and are in units of bytes.

For example, an ACK frame includes the following:
2 bytes long Frame Control (field);
2 bytes long Duration (field); and
6 bytes long Destination Address (DA) (field).

A configuration example of an IEEE802.11 data frame is illustrated in FIG. 150. The values in FIG. 150 indicate the data length of the field they are above, and are in units of bytes.

TABLE 1 shows how the Address fields of the data frame are used.

TABLE 1

| Function | ToDS | FromDS | Address 1 (Receiver) | Address 2 (Transmitter) | Address 3 | Address 4 |
| --- | --- | --- | --- | --- | --- | --- |
| IBS | 0 | 0 | Destination address (DA) | Source address (SA) | BSSID | Not used |
| To AP (infrastructure) | 1 | 0 | BSSID | Source address (SA) | Destination address (DA) | Not used |
| From AP (infrastructure) | 0 | 1 | Destination address (DA) | BSSID | Source address (SA) | Not used |
| WDS (bridge) | 1 | 1 | Receiver address (RA) | Transmitter address (TA) | Destination address (DA) | Source address (SA) |

For example, an association response frame includes the following:
2 bytes long Frame Control (field);
2 bytes long Duration (field);
6 bytes long Destination Address (DA) (field);
6 bytes long Source Address (SA) (field);
6 bytes long BSSID (field); and
2 bytes long Sequence Control (field).

The above make up the MAC header. An association response frame also includes the following:
2 bytes long Capability Info (field);
2 bytes long Status Code (field);
2 bytes long Association Identifier (field); and
Variable-length Supported Rates (field).

The above make up the Frame Body. An association response frame also includes the following:
4 bytes long FCS (field).

In an association response frame transmitted by an AP, the DA is typically the MAC address of a terminal, and the SA and BSSID are typically the MAC address of the AP.

Examples of a control frame include an RTS frame, a CTS frame, and an ACK frame.

A configuration example of an IEEE 802.11 RTS frame is illustrated in FIG. 147. The values in FIG. 147 indicate the data length of the field they are above, and are in units of bytes.

For example, an RTS frame includes the following:
2 bytes long Frame Control (field);
2 bytes long Duration (field);
6 bytes long Destination Address (DA) (field); and
6 bytes long Source Address (SA) (field);

A configuration example of an IEEE 802.11 CTS frame is illustrated in FIG. 148. The values in FIG. 148 indicate the data length of the field they are above, and are in units of bytes.

In TABLE 1, IBSS stands for Independent Basic Service Set, AP stands for Access Point, WDS stands for Wireless Distribution System, DS stands for Distribution System, BSSID stands for Basic Service Set Identifier (ID), DA stands for Destination Address, SA stands for Source Address, RA stands for Receiver Address, and TA stands for Transmitter Address.

Next, BSSID and Service Set ID (SSID) will be described.

BSSID:

In an infrastructure network, a BSSID is the MAC address of a wireless communication interface of an access point. In an ad hoc network, a BSSID is randomly generated and the Universal/Local bit is set to 1.

SSID:

An identifier that is longer than the normal 48-bit identifier (0 to 32 bytes long).

Supplemental Information B8

In the present disclosure, for example, in the description given with reference to FIG. 84 through FIG. 150, it is stated that communication between the access point and repeater #1 may be wired communication and may be wireless communication. Similarly, it is stated that communication between the access point and repeater #2 may be wired communication and may be wireless communication.

Moreover, as already described above, operations performed by a repeater in the present disclosure can be implemented by a communication device including any given sort of device, such as: a communications device/broadcast device, examples of which include a broadcast station, a base station, an access point, a terminal, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a node; a vehicle; an automobile; a motorcycle; a boat; a satellite; aircraft; a drone; a mobile device; or a robot.

Next, one example of a configuration included in the configuration examples described above will be given. For example, in the systems illustrated in FIG. 84, FIG. 111, FIG. 116, FIG. 122, FIG. 123, and FIG. 130, repeater #1 is a gNB or communication device, repeater #2 is a gNB or communication device, whereby the terminal communicates with two gNBs or communication devices. In such cases, FIG. 84, FIG. 111, FIG. 116, FIG. 122, FIG. 123, and FIG. 130 illustrate systems that implement multiple TRP (TX/RX point), and the descriptions made with reference to FIG. 84, FIG. 111, FIG. 116, FIG. 122, FIG. 123, and FIG. 130 are examples of operations performed in multiple TRP (TX/RX point). Note that TX means "transmitter" and RX means "receiver".

Moreover, for example, when modulated signals having a frame configuration like that in FIG. 42, FIG. 88, FIG. 113A, or FIG. 113B are transmitted to the terminal by two communication devices (gNB, repeater), the two communication devices (gNB, repeater) transmit the modulated signals using two mutually different frequency bands or two mutually different channels. In other words, the two communication devices (gNB, repeater) can be considered to perform frequency division multiplexing (FDM). More specifically, repeater #1 transmits a frame to the terminal using a first frequency, and repeater #2 transmits a frame to the terminal using a second frequency.

Note that the method used by the two communication devices (gNB, repeater) to implement FDM is not limited to the examples described up to here. Hereinafter, another example of a method used by the two communication devices (gNB, repeater) to implement FDM will be described.

For example, the modulated signals transmitted by the two communication devices (gNB, repeater) may have a frame configuration like that in FIG. 151A or FIG. 151B. Note that both FIG. 151A and FIG. 151B illustrate frame configurations in a first period. Moreover, the frame configurations illustrated in FIG. 151A and FIG. 151B include a first carrier group, a second carrier group, a third carrier group, and a fourth carrier group. Each of the carrier groups is exemplified as including a plurality of carriers, but each carrier group may include a single carrier. Moreover, although FIG. 151A and FIG. 151B illustrate examples in which four carrier groups, namely the first carrier group, the second carrier group, the third carrier group, and the fourth carrier group are arranged along the frequency axis, the number of carrier groups is not limited to four. For example, the number of carrier groups may be two or three, and may be five or more.

FIG. 151A illustrates one example of a frame configuration of a modulated signal transmitted by repeater #1 (gNB or communication device, etc.). Time is represented on the horizontal axis and frequency is represented on the vertical axis in FIG. 151A.

In FIG. 151A, repeater #1 transmits frames using odd numbered carrier groups.

FIG. 151B illustrates one example of a frame configuration of a modulated signal transmitted by repeater #2 (gNB or communication device, etc.). Time is represented on the horizontal axis and frequency is represented on the vertical axis in FIG. 151B.

In FIG. 151B, repeater #2 transmits frames using even numbered carrier groups.

Transmitting frames as described above makes it possible to achieve the advantageous effects that it is highly possible to reduce adverse influence from multi-path, and frequency diversity and spatial diversity gain can be obtained.

Note that when repeater #1 and repeater #2 perform OFDMA in which frames destined for a plurality of terminals are transmitted, like in FIG. 111, FIG. 116, FIG. 122, FIG. 123, and FIG. 130, the frames illustrated in FIG. 151A and FIG. 151B may be applied. Accordingly, repeater #1 may communicate with one or more terminals, and repeater #2 may communicate with one or more terminals.

Note that, for example, when repeater #1 and repeater #2 communicate with the first terminal and the second terminal, the frequency used by repeater #1 to transmit a frame destined for the first terminal and the frequency used by repeater #2 to transmit a frame destined for the first terminal are, for example, different. Similarly, the frequency used by repeater #1 to transmit a frame destined for the second terminal and the frequency used by repeater #2 to transmit a frame destined for the second terminal are, for example, different. The configuration of the frame destined for the first terminal that is transmitted by repeater #1 is the configuration illustrated in FIG. 151A, and the configuration of the frame destined for the first terminal that is transmitted by repeater #2 is the configuration illustrated in FIG. 151B.

However, when OFDMA is used, the frame configuration of the modulated signal destined for the first terminal that is transmitted by repeater #1 and the frame configuration of the modulated signal destined for the first terminal that is transmitted by repeater #2 are not limited to the above examples.

Although OFDMA is used in the above example, a multi-carrier transmission method other than OFDMA may be applied, and, for example, multi-carrier transmission may be implemented by using a plurality of single-carrier transmission modulated signals.

Furthermore, some of the data included in the frame destined for the first terminal that is transmitted by repeater #1 may be included in the frame destined for the first terminal that is transmitted by repeater #2. With this, a system and communication method capable of improving the reception quality in the first terminal and achieve ultra-reliable and low-latency communications (URLLC) may be provided. Moreover, repeater #1 may repeatedly transmit the same data using a frame destined for the first terminal, and repeater #2 may repeatedly transmit the same data using a frame destined for the first terminal. With this, a system and communication method that improve the reception quality in the first terminal and achieve URLLC may be provided.

Although the term preamble is used in the above description, the naming is not limited to this example. For example, the preamble may be a symbol including a physical downlink control channel (PDCCH) and/or demodulation reference signals (DMRS). Moreover, the data symbol may include reference signals (RS), such as channel state information reference signals (CSI-RS), tracking reference signals (TRS), and phase tracking reference signals (PT-RS).

Supplemental Information B9

In the present disclosure, for example, in the description given with reference to FIG. 84 through FIG. 150, it is stated that communication between the access point and repeater #1 may be wired communication and may be wireless communication. Similarly, it is stated that communication between the access point and repeater #2 may be wired communication and may be wireless communication.

Moreover, as already described above, operations performed by a repeater in the present disclosure can be implemented by a communication device including any given sort of device, such as: a communications device/broadcast device, examples of which include a broadcast station, a base station, an access point, a terminal, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a node; a vehicle; an automobile; a motorcycle; a boat; a satellite; aircraft; a drone; a mobile device; or a robot.

Next, one example of a configuration included in the configuration examples described above will be given. For example, in the systems illustrated in FIG. 84, FIG. 111, FIG. 116, FIG. 122, FIG. 123, and FIG. 130, repeater #1 is a gNB or communication device, repeater #2 is a gNB or communication device, whereby the terminal communicates with two gNBs or communication devices. In such cases, FIG. 84, FIG. 111, FIG. 116, FIG. 122, FIG. 123, and FIG. 130 illustrate systems that implement multiple TRP (TX/RX point), and the descriptions made with reference to FIG. 84, FIG. 111, FIG. 116, FIG. 122, FIG. 123, and FIG. 130 are examples of operations performed in multiple TRP (TX/RX point).

Moreover, for example, when a modulated signal having a frame configuration like that in FIG. 42, FIG. 43, FIG. 63, FIG. 88, FIG. 90, FIG. 113A, or FIG. 113B is transmitted to the terminal by two communication devices (gNB, repeater), the frequency range used in the transmission to the terminal by repeater #1 (may be a gNB or a communication device), and the frequency range used in the transmission to the terminal by repeater #2 (gNB, communication device) may be the same, and, alternatively, may be different, and, alternatively, the frequency ranges may partially overlap. When the frequency range used in the transmission to the terminal by repeater #1 (may be a gNB or a communication device), and the frequency range used in the transmission to the terminal by repeater #2 (gNB, communication device) are the same, repeater #1 (may be a gNB or a communication device) and repeater #2 (gNB, communication device) implement time division multiplexing (TDM) and space division multiplexing (SDM) when communicating with the terminal.

Hereinafter, an example of a method used by the two communication devices (gNB, repeater) to implement TDM will be described.

In particular, as described with reference to FIG. 63, a plurality of communication devices (may be gNBs or repeaters) may implement time division and transmit frames and modulated signals. Next, an example in which this is implemented using repeater #1 (may be a gNB or a communication device) and repeater #2 (may be a gNB or a communication device) illustrated in FIG. 84, FIG. 111, FIG. 116, FIG. 122, FIG. 123, and FIG. 130 will be given. Specifically, consider a frame which combines FIG. 63 and FIG. 90.

Repeater #1 transmits, to the terminal, preamble B501_1 in the $X1^{th}$ period, control information symbol B502_1 in the $X2^{th}$ period, and data symbol B503_1 in the $X3^{th}$ period.

Repeater #2 transmits, to the terminal, preamble B501_2 in the $X4^{th}$ period, control information symbol B502_2 in the $X5^{th}$ period, and data symbol 503_2 in the $X6^{th}$ period.

Here, as illustrated in FIG. 90, the time interval including the $X1^{th}$ period, the $X2^{th}$ period, and the $X3^{th}$ period in which repeater #1 is transmitting and the time interval including the $X4^{th}$ period, the $X5^{th}$ period, and the $X6^{th}$ period in which repeater #2 is transmitting are different. Accordingly, as described with reference to FIG. 63, in the frame configuration illustrated in FIG. 90, when the frequency used for transmission by repeater #1 and the frequency used for transmission by repeater #2 are the same, TDM is implemented.

Transmitting frames as described above makes it possible to achieve the advantageous effects that time diversity and spatial diversity gain can be obtained.

Note that repeater #1 and repeater #2 may transmit frames destined for a plurality of terminals, like in FIG. 111, FIG. 116, FIG. 122, FIG. 123, and FIG. 130. When OFDMA is being performed, the frame illustrated in FIG. 90 may be applied. In such cases, repeater #1 is capable of communicating with one or more terminals using the repeater #1 transmission frame in FIG. 90, and repeater #2 is capable of communicating with one or more terminals.

Here, for example, when repeater #1 and repeater #2 are communicating with the first terminal and the second terminal, the time region (time interval) used by the frame transmitted by repeater #1 and destined for the first terminal and the time region (time interval) used by the frame transmitted by repeater #2 and destined for the first terminal are mutually different. Similarly, the time region (time interval) used by the frame transmitted by repeater #1 and destined for the second terminal and the time region (time interval) used by the frame transmitted by repeater #2 and destined for the second terminal are mutually different.

However, when OFDMA is used, the frame configuration of the modulated signal transmitted to each terminal by repeater #1 and the frame configuration of the modulated signal transmitted to each terminal by repeater #2 are not limited to the examples given in the present specification.

Although OFDMA is used in the above description, some other multi-carrier transmission method may be used instead of OFDMA. For example, multi-carrier transmission may be implemented by using a plurality of single-carrier transmission modulated signals. Note that the realization of multi-carrier transmission using a plurality of single-carrier transmission modulated signals can be applied to any given description in the present disclosure that relates to multi-carrier transmission.

Furthermore, some of the data included in the frame destined for the first terminal that is transmitted by repeater #1 may be included in the frame destined for the first terminal that is transmitted by repeater #2. With this, a system and communication method that improve the reception quality in the first terminal and achieve URLLC may be provided. Moreover, repeater #1 may repeatedly transmit the same data using a frame destined for the first terminal, and repeater #2 may repeatedly transmit the same data using a frame destined for the first terminal. With this, a system and communication method that improve the reception quality in the first terminal and achieve URLLC may be provided.

Although the term preamble is used in the above description of frame configurations, the naming is not limited to this example. For example, the preamble may be a symbol including a physical downlink control channel (PDCCH) and/or demodulation reference signals (DMRS). Moreover, the data symbol may include reference signals (RS), such as channel state information reference signals (CSI-RS), tracking reference signals (TRS), and phase tracking reference signals (PT-RS).

In the present disclosure, for example, in the description given with reference to FIG. 84 through FIG. 150, it is stated that communication between the access point and repeater #1 may be wired communication and may be wireless communication. Similarly, it is stated that communication between the access point and repeater #2 may be wired communication and may be wireless communication.

Moreover, as already described above, operations performed by a repeater in the present disclosure can be implemented by a communication device including any given sort of device, such as: a communications device/broadcast device, examples of which include a broadcast station, a base station, an access point, a terminal, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a node; a vehicle; an automobile; a motorcycle; a boat; a satellite; aircraft; a drone; a mobile device; or a robot.

Next, one example of a configuration included in the configuration examples described above will be given. For example, in the systems illustrated in FIG. 84, FIG. 111, FIG. 116, FIG. 122, FIG. 123, and FIG. 130, repeater #1 is a gNB or communication device, repeater #2 is a gNB or communication device, whereby the terminal communicates with two gNBs or communication devices. In such cases, FIG. 84, FIG. 111, FIG. 116, FIG. 122, FIG. 123, and FIG. 130 illustrate systems that implement multiple TRP (TX/RX point), and the descriptions made with reference to FIG. 84, FIG. 111, FIG. 116, FIG. 122, FIG. 123, and FIG. 130 are examples of operations performed in multiple TRP (TX/RX point). Note that TX means "transmitter" and RX means "receiver".

Next, an example of a method used by the two communication devices (gNB, repeater) to implement space division multiplexing (SDM) will be described.

For example, as described with reference to FIG. 88, a plurality of communication devices (may be gNBs or repeaters) may implement SDM and transmit frames and modulated signals. Next, an example in which this is implemented using repeater #1 (may be a gNB or a communication device) and repeater #2 (may be a gNB or a communication device) illustrated in FIG. 84, FIG. 111, FIG. 116, FIG. 122, FIG. 123, and FIG. 130 will be given.

Repeater #1 transmits, to the terminal, preamble B501_1 in the X1$^{th}$ period, control information symbol B502_1 in the X2$^{th}$ period, and a data symbol in the X3$^{th}$ period.

Repeater #2 transmits, to the terminal, preamble B501_2 in the X1$^{th}$ period, control information symbol B502_2 in the X2$^{th}$ period, and data symbol B503_2 in the X3$^{th}$ period.

Here, as illustrated in FIG. 88, the time interval including the X1$^{th}$ period, the X2$^{th}$ period, and the X3$^{th}$ period in which repeater #1 is transmitting and the time interval including the X1$^{th}$ period, the X2$^{th}$ period, and the X3$^{th}$ period in which repeater #2 is transmitting are the same. The frequency range used by repeater #1 to transmit the frame and the frequency range used by repeater #2 to transmit the frame are the same. In this case, SDM is implemented. Although it is favorable that the terminal receives the modulated signal of the frames transmitted by repeater #1 and repeater #2 using a plurality of antennas, the terminal is not limited to such a configuration.

Transmitting frames as described above makes it possible to achieve the advantageous effects that time diversity and spatial diversity gain can be obtained.

Note that repeater #1 and repeater #2 may transmit frames destined for a plurality of terminals, like in FIG. 111, FIG. 116, FIG. 122, FIG. 123, and FIG. 130. When OFDMA is being performed, the frame illustrated in FIG. 88 may be applied. Accordingly, repeater #1 may communicate with one or more terminals, and repeater #2 may communicate with one or more terminals.

Here, for example, when repeater #1 and repeater #2 are communicating with the first terminal and the second terminal, the time region (time interval) used by the frame transmitted by repeater #1 and destined for the first terminal and the time region (time interval) used by the frame transmitted by repeater #2 and destined for the first terminal are the same. Moreover, the frequency used by the frame transmitted by repeater #1 and destined for the first terminal and the frequency used by the frame transmitted by repeater #2 and destined for the first terminal are the same. Similarly, the time region (time interval) used by the frame transmitted by repeater #1 and destined for the second terminal and the time region (time interval) used by the frame transmitted by repeater #2 and destined for the second terminal are the same. Moreover, the frequency used by the frame transmitted by repeater #1 and destined for the second terminal and the frequency used by the frame transmitted by repeater #2 and destined for the second terminal are the same.

However, when OFDMA is used, the frame configuration of the modulated signal transmitted to each terminal by repeater #1 and the frame configuration of the modulated signal transmitted to each terminal by repeater #2 are not limited to the examples given in the present specification.

Although OFDMA is used in the above example, a multi-carrier transmission method other than OFDMA may be applied, and, for example, multi-carrier transmission may be implemented by using a plurality of single-carrier transmission modulated signals. Note that the realization of multi-carrier transmission using a plurality of single-carrier transmission modulated signals can be applied to any given description in the present disclosure that relates to multi-carrier transmission.

Furthermore, some of the data included in the frame destined for the first terminal that is transmitted by repeater #1 may be included in the frame destined for the first terminal that is transmitted by repeater #2. With this, a system and communication method that improve the reception quality in the first terminal and achieve URLLC may be provided. Moreover, repeater #1 may repeatedly transmit the same data using a frame destined for the first terminal, and repeater #2 may repeatedly transmit the same data using a frame destined for the first terminal. With this, a system and communication method that improve the reception quality in the first terminal and achieve URLLC may be provided.

Although the term preamble is used in the above description, the naming is not limited to this example. For example, the preamble may be a symbol including a physical downlink control channel (PDCCH) and/or demodulation reference signals (DMRS). Moreover, the data symbol may include reference signals (RS), such as channel state information reference signals (CSI-RS), tracking reference signals (TRS), and phase tracking reference signals (PT-RS).

Supplemental Information B10

The following is described in Supplemental Information B8 and Supplemental Information B9.

Although the term preamble is used in the above description, the naming is not limited to this example. For example, the preamble may be a symbol including a physical downlink control channel (PDCCH) and/or demodulation reference signals (DMRS). Moreover, the data symbol may include reference signals (RS), such as channel state information reference signals (CSI-RS), tracking reference signals (TRS), and phase tracking reference signals (PT-RS).

Hereinafter, a variation of this will be described.

For example, repeater #1 (may be a gNB or a communication device) and repeater #2 (may be a gNB or a communication device) transmit frames like those in FIG. 88, FIG. 89, and FIG. 90. However, since the following will describe a case in which preamble B501_1 in FIG. 88, FIG. 89, and FIG. 90 is PDCCH, this will hereinafter be referred to as "PDCCH B501_1". Similarly, since the following will describe a case in which preamble B501_2 in FIG. 88, FIG. 89, and FIG. 90 is PDCCH, this will hereinafter be referred to as "PDCCH B501_2". Under such conditions, the following may be applied.

First Case:

As illustrated in FIG. 88, FIG. 89, and FIG. 90, repeater #1 transmits PDCCH B501_1, and repeater #2 transmits PDCCH B501_2. Here, PDCCH B501_1 includes downlink control information (DCI) #1.

PDCCH B501_2 includes DCI #2.

Second Case:

As illustrated in FIG. 88, FIG. 89, and FIG. 90, repeater #1 transmits PDCCH B501_1, and repeater #2 transmits PDCCH B501_2. Here, PDCCH B501_1 includes downlink control information (DCI) #1. PDCCH B501_2 includes DCI #1.

Third Case:

As illustrated in FIG. 88, FIG. 89, and FIG. 90, repeater #1 transmits PDCCH B501_1, and repeater #2 transmits PDCCH B501_2. Here, PDCCH B501_1 includes downlink control information (DCI) #1. PDCCH B501_2 does not include DCI.

Fourth Case:

As illustrated in FIG. 88, FIG. 89, and FIG. 90, repeater #1 transmits PDCCH B501_1, and repeater #2 does not transmit PDCCH B501_2. Here, PDCCH B501_1 includes downlink control information (DCI) #1.

Fifth Case:

As illustrated in FIG. 88, FIG. 89, and FIG. 90, repeater #1 does not transmit PDCCH B501_1, and repeater #2 transmits PDCCH B501_2. PDCCH B501_2 includes DCI #2.

Transmission methods using TDM, FDM, and SDM are as described in Supplemental Information B8 and Supplemental Information B9.

Although the above description exemplifies the preamble as PDCCH, the arrangement of the PDCCH in the frame is not limited to the examples illustrated in FIG. 88, FIG. 89, and FIG. 90; the PDCCH may be arranged in any manner along the frequency-time axis (may be arranged in any position along the frequency axis and the time axis), and may be arranged in any manner along the time axis.

This makes it possible to achieve the advantageous effect that multiple TRP transmission can be implemented favorably.

Supplemental Information B11

In the present disclosure, for example, in the description given with reference to FIG. 84 through FIG. 150, it is stated that communication between the access point and repeater #1 may be wired communication and may be wireless communication. Similarly, it is stated that communication between the access point and repeater #2 may be wired communication and may be wireless communication.

Moreover, as already described above, operations performed by a repeater in the present disclosure can be implemented by a communication device including any given sort of device, such as: a communications device/broadcast device, examples of which include a broadcast station, a base station, an access point, a terminal, a mobile phone, a smartphone, a tablet, a laptop personal computer, a server, a personal computer, a television, a household appliance, a device in a factory, an IoT device; an eNB; a gNB; a PCell eNB or gNB; a SCell eNB or gNB; a PSCell eNB or gNB; a Master eNB or gNB; a Secondary eNB or gNB; a node; a vehicle; an automobile; a motorcycle; a boat; a satellite; aircraft; a drone; a mobile device; or a robot.

Next, one example of a configuration included in the configuration examples described above will be given. For example, in the systems illustrated in FIG. 84, FIG. 111, FIG. 116, FIG. 122, FIG. 123, and FIG. 130, repeater #1 is a gNB or communication device, repeater #2 is a gNB or communication device, whereby the terminal communicates with two gNBs or communication devices. In such cases, FIG. 84, FIG. 111, FIG. 116, FIG. 122, FIG. 123, and FIG. 130 illustrate systems that implement multiple TRP (TX/RX point), and the descriptions made with reference to FIG. 84, FIG. 111, FIG. 116, FIG. 122, FIG. 123, and FIG. 130 are examples of operations performed in multiple TRP (TX/RX point).

In FIG. 84, FIG. 116, FIG. 122, FIG. 123, and FIG. 130, consider the access point as being a gNB or a communication device. However, this element will still be referred to as an access point hereinafter. Moreover, consider repeater #1 as being a gNB or a communication device. However, this element will still be referred to as repeater #1 hereinafter. Furthermore, consider repeater #2 as being a gNB or a communication device. However, this element will still be referred to as repeater #2 hereinafter.

In this case, the frequency used to transmit a frame to repeater #1 by the access point and the frequency used to transmit a frame to repeater #2 by the access point may be the same, and, alternatively, may be different.

Moreover, the frequency range used to transmit a frame to repeater #1 by the access point and the frequency range used to transmit a frame to the terminal by repeater #1 may be the same, and, alternatively, may be different. Similarly, the frequency range used to transmit a frame to repeater #2 by the access point and the frequency range used to transmit a frame to the terminal by repeater #2 may be the same, and, alternatively, may be different.

This program causes a computer to execute a control method of a communication system that includes an access point, a first communication device, and a second communication device, and wirelessly communicates with a terminal. The control method includes: wirelessly communicating with the first communication device, by the access point, on at least a first channel included in a first frequency band and wirelessly communicating with the second communication device, by the access point, on at least a second channel included in a second frequency band different than the first frequency band; wirelessly communicating with the terminal, by the first communication device, on at least a third channel included in the second frequency band; and wirelessly communicating with the terminal, by the second communication device, on at least a fourth channel included in the first frequency band.

This program causes a computer to execute a control method of a terminal that wirelessly communicates with a communication system. The communication system includes an access point, a first communication device, and a second communication device. The access point is configured to wirelessly communicate with the first communication device on at least a first channel included in a first frequency band and wirelessly communicate with the second communication device on at least a second channel included in a second frequency band different than the first frequency band. The control method includes: wirelessly communicating with the first communication device on at least a third channel included in the second frequency band; and wirelessly communicating with the second communication device on at least a fourth channel included in the first frequency band.

Hereinbefore, a communication system according to one or more aspects has been described based on exemplary embodiments, but the present specification is not limited to the above exemplary embodiments. Various modifications of the exemplary embodiments as well as embodiments resulting from combinations of elements from different exemplary embodiments that may be conceived by those skilled in the art are intended to be included within the scope of the one or more aspect as long as these do not depart from the novel teachings and advantages of the present disclosure.

INDUSTRIAL APPLICABILITY

The present disclosure is applicable in communication systems.

What is claimed is:

1. A user equipment for multiple transmission and reception points (TRPs), comprising:
   a receiver configured to receive information from a first transmitter and a second transmitter, the information indicating whether simultaneous communication is supported; and
   a processor configured to control the receiver to receive a first Physical Downlink Shared Channel (PDSCH) and a second PDSCH from the first transmitter and the second transmitter in a first frequency channel and a second frequency channel different from the first frequency channel, respectively when the information indicates that the simultaneous communication is supported, wherein
   the first PDSCH received and the second PDSCH received have been transmitted while being partially overlapped in a time domain.

2. The user equipment according to claim 1, wherein when the information indicates that the simultaneous communication is not supported, the receiver is further configured to receive the first PDSCH and the second PDSCH that are transmitted while being non-overlapped in the time domain.

3. A non-transitory computer-readable medium having a program stored thereon for causing a computer to execute a method comprising:
   receiving information from a first transmitter and a second transmitter, the information indicating whether simultaneous communication is supported; and
   controlling the receiving to receive a first Physical Downlink Shared Channel (PDSCH) and a second PDSCH from the first transmitter and the second transmitter in a first frequency channel and a second frequency channel different from the first frequency channel, respectively when the information indicates that the simultaneous communication is supported, wherein
   the first PDSCH received and the second PDSCH received have been transmitted while being partially overlapped in a time domain.

* * * * *